US011902044B2

(12) United States Patent
Shribman et al.

(10) Patent No.: US 11,902,044 B2
(45) Date of Patent: *Feb. 13, 2024

(54) SYSTEM AND METHOD FOR IMPROVING CONTENT FETCHING BY SELECTING TUNNEL DEVICES

(71) Applicant: BRIGHT DATA LTD., Netanya (IL)

(72) Inventors: Derry Shribman, Tel Aviv (IL); Ofer Vilenski, Moshav Hadar Am (IL)

(73) Assignee: BRIGHT DATA LTD., Netanya (IL)

( * ) Notice: Subject to any disclaimer, the term of this patent is extended or adjusted under 35 U.S.C. 154(b) by 166 days.

This patent is subject to a terminal disclaimer.

(21) Appl. No.: 17/672,762

(22) Filed: Feb. 16, 2022

(65) Prior Publication Data

US 2022/0173924 A1 Jun. 2, 2022

Related U.S. Application Data

(63) Continuation of application No. 16/938,985, filed on Jul. 26, 2020, now Pat. No. 11,558,215, which is a (Continued)

(51) Int. Cl.
*H04L 12/28* (2006.01)
*H04L 67/141* (2022.01)
(Continued)

(52) U.S. Cl.
CPC ............ *H04L 12/2803* (2013.01); *G06F 7/58* (2013.01); *G06F 7/588* (2013.01); *G06F 8/71* (2013.01);
(Continued)

(58) Field of Classification Search
CPC ............. H04L 12/2803; H04L 12/2856; H04L 12/4633; H04L 47/283; H04L 61/256;
(Continued)

(56) References Cited

U.S. PATENT DOCUMENTS 3,962,539 A 6/1976 Ehrsam et al.
4,347,827 A 9/1982 Lo Cascio
(Continued)

FOREIGN PATENT DOCUMENTS

CA 2328548 A1 6/2002
CA 2353623 A1 1/2003
(Continued)

OTHER PUBLICATIONS

Li et at, "Toward the Identification of Anonymous Web Proxies", University of Cambridge & University of Genoa, Apr. 3, 2009 (2 pages).

(Continued)

*Primary Examiner* — Aftab N. Khan
(74) *Attorney, Agent, or Firm* — May Patents Ltd. c/o Dorit Shem-Tov

(57) ABSTRACT

A method for fetching a content from a web server to a client device is disclosed, using tunnel devices serving as intermediate devices. The tunnel device is selected based on an attribute, such as IP Geolocation. A tunnel bank server stores a list of available tunnels that may be used, associated with values of various attribute types. The tunnel devices initiate communication with the tunnel bank server, and stays connected to it, for allowing a communication session initiated by the tunnel bank server. Upon receiving a request from a client to a content and for specific attribute types and values, a tunnel is selected by the tunnel bank server, and is used as a tunnel for retrieving the required content from the web server, using standard protocol such as SOCKS, WebSocket or HTTP Proxy. The client only communicates with a super proxy server that manages the content fetching scheme.

89 Claims, 86 Drawing Sheets

Related U.S. Application Data continuation of application No. 16/481,470, filed as application No. PCT/IL2018/050910 on Aug. 16, 2018, now Pat. No. 10,880,266.

(60) Provisional application No. 62/550,834, filed on Aug. 28, 2017, provisional application No. 62/563,157, filed on Sep. 26, 2017, provisional application No. 62/624,208, filed on Jan. 31, 2018, provisional application No. 62/684,211, filed on Jun. 13, 2018.

(51) Int. Cl.

| | |
|---|---|
| ***H04L 61/256*** | (2022.01) |
| ***H04L 67/025*** | (2022.01) |
| ***H04L 69/16*** | (2022.01) |
| ***G06F 9/48*** | (2006.01) |
| ***H04L 61/2592*** | (2022.01) |
| ***H04L 9/40*** | (2022.01) |
| ***H04L 67/02*** | (2022.01) |
| ***H04L 67/288*** | (2022.01) |
| ***H04L 67/2885*** | (2022.01) |
| ***G06F 7/58*** | (2006.01) |
| ***H04L 61/2575*** | (2022.01) |
| ***H04L 61/2585*** | (2022.01) |
| ***H04L 61/2589*** | (2022.01) |
| ***H04L 12/46*** | (2006.01) |
| ***H04L 67/142*** | (2022.01) |
| ***H04W 4/80*** | (2018.01) |
| ***G06F 16/955*** | (2019.01) |
| ***G06F 8/71*** | (2018.01) |
| ***G06F 9/455*** | (2018.01) |
| ***H04L 47/283*** | (2022.01) |
| ***H04L 69/167*** | (2022.01) |
| ***H04L 69/168*** | (2022.01) |
| ***H04W 48/18*** | (2009.01) |
| ***H04W 84/10*** | (2009.01) |
| ***H04W 84/18*** | (2009.01) |
| ***H04L 61/4511*** | (2022.01) |
| ***H04L 61/5007*** | (2022.01) |
| ***H04L 67/01*** | (2022.01) |
| ***H04L 67/56*** | (2022.01) |
| ***H04L 67/63*** | (2022.01) |
| ***H04L 67/133*** | (2022.01) |
| ***H04L 67/563*** | (2022.01) |
| ***H04L 67/5681*** | (2022.01) |
| ***H04L 67/568*** | (2022.01) |
| *H04L 101/69* | (2022.01) |

(52) U.S. Cl.

CPC ........ *G06F 9/4555* (2013.01); *G06F 9/45545* (2013.01); *G06F 9/4881* (2013.01); *G06F 16/955* (2019.01); *H04L 12/2856* (2013.01); *H04L 12/4633* (2013.01); *H04L 47/283* (2013.01); *H04L 61/256* (2013.01); *H04L 61/2575* (2013.01); *H04L 61/2585* (2013.01); *H04L 61/2589* (2013.01); *H04L 61/2592* (2013.01); *H04L 61/4511* (2022.05); *H04L 61/5007* (2022.05); *H04L 63/029* (2013.01); *H04L 63/0272* (2013.01); *H04L 63/0281* (2013.01); *H04L 63/164* (2013.01); *H04L 67/01* (2022.05); *H04L 67/02* (2013.01); *H04L 67/025* (2013.01); *H04L 67/133* (2022.05); *H04L 67/141* (2013.01); *H04L 67/142* (2013.01); *H04L 67/288* (2013.01); *H04L 67/2885* (2013.01); *H04L 67/56* (2022.05); *H04L 67/563* (2022.05); *H04L 67/568* (2022.05); *H04L 67/5681* (2022.05); *H04L 67/63* (2022.05); *H04L 69/16* (2013.01); *H04L 69/162* (2013.01); *H04L 69/167* (2013.01); *H04L 69/168* (2013.01); *H04W 4/80* (2018.02); *H04W 48/18* (2013.01); *H04W 84/10* (2013.01); *H04W 84/18* (2013.01); *G06F 9/45558* (2013.01); *G06F 2009/45591* (2013.01); *G06F 2009/45595* (2013.01); *H04L 2101/69* (2022.05)

(58) Field of Classification Search

CPC ............. H04L 61/2575; H04L 61/2585; H04L 61/2589; H04L 61/2592; H04L 61/4511; H04L 61/5007; H04L 63/0272; H04L 63/0281; H04L 63/029; H04L 63/164; H04L 67/01; H04L 67/02; H04L 67/025; H04L 67/133; H04L 67/141; H04L 67/142; H04L 67/288; H04L 67/2885; H04L 67/56; H04L 67/563; H04L 67/568; H04L 67/5681; H04L 67/63; H04L 69/16; H04L 69/162; H04L 69/167; H04L 69/168; H04L 2101/69; H04L 61/2514; H04L 61/2553; H04L 67/567; H04L 69/329; H04L 69/325; H04L 69/326; H04L 67/1008; H04L 67/1021; G06F 7/58; G06F 7/588; G06F 8/71; G06F 9/45545; G06F 9/4555; G06F 9/4881; G06F 16/955; G06F 9/45558; G06F 2009/45591; G06F 2009/45595; H04W 4/80; H04W 48/18; H04W 84/10; H04W 84/18

See application file for complete search history.

(56) References Cited

U.S. PATENT DOCUMENTS

| | | | |
|---|---|---|---|
| 4,405,829 | A | 9/1983 | Rivest |
| 4,853,884 | A | 1/1989 | Brown |
| 4,855,894 | A | 8/1989 | Asahi |
| 4,905,176 | A | 2/1990 | Schulz |
| 5,519,693 | A | 5/1996 | Galuszka |
| 5,577,243 | A | 11/1996 | Sherwood et al. |
| 5,578,755 | A | 11/1996 | Offenberg |
| 5,734,829 | A | 3/1998 | Robinson |
| 5,826,014 | A | 10/1998 | Coley |
| 5,961,593 | A | 10/1999 | Gabber et al. |
| 5,962,786 | A | 10/1999 | Le Traon et al. |
| 5,974,566 | A | 10/1999 | Ault |
| 6,012,083 | A | 1/2000 | Savitzky |
| 6,012,090 | A | 1/2000 | Chung |
| 6,085,193 | A | 7/2000 | Malkin |
| 6,134,584 | A | 10/2000 | Chang |
| 6,154,782 | A | 11/2000 | Kawaguchi |
| 6,185,625 | B1 | 2/2001 | Tso |
| 6,236,652 | B1 | 5/2001 | Preston et al. |
| 6,240,444 | B1 | 5/2001 | Fin |
| 6,266,704 | B1 | 7/2001 | Reed |
| 6,311,216 | B1 | 10/2001 | Smith |
| 6,351,775 | B1 | 2/2002 | Yu |
| 6,356,934 | B1 | 3/2002 | Delph |
| 6,389,422 | B1 | 5/2002 | Doi |
| 6,389,462 | B1 | 5/2002 | Cohen |
| 6,397,259 | B1 | 5/2002 | Lincke et al. |
| 6,412,008 | B1 | 6/2002 | Fields et al. |
| 6,421,733 | B1 | 7/2002 | Tso |
| 6,449,640 | B1 | 9/2002 | Haverstock |
| 6,513,061 | B1 | 1/2003 | Ebata |
| 6,519,693 | B1 | 2/2003 | Debey |
| 6,601,098 | B1 | 7/2003 | Case et al. |
| 6,658,463 | B1 | 12/2003 | Dillon et al. |
| 6,661,799 | B1 | 12/2003 | Molitor |
| 6,665,715 | B1 | 12/2003 | Houri |

(56) References Cited

U.S. PATENT DOCUMENTS 6,670,212 B2 12/2003 McNie et al.
6,687,732 B1 2/2004 Bector
6,701,374 B2 3/2004 Gupta
6,785,705 B1 8/2004 Kocherlakota
6,792,461 B1 9/2004 Hericourt
6,795,848 B1 9/2004 Border et al.
6,820,133 B1 11/2004 Grove
6,829,638 B1 12/2004 McBrearty
6,842,463 B1 1/2005 Drwiega
6,868,453 B1 3/2005 Watanabe
6,895,011 B1 5/2005 Lassers
6,961,783 B1 11/2005 Cook
7,007,228 B1 2/2006 Carro
7,027,418 B2 4/2006 Gan et al.
7,047,315 B1 5/2006 Srivastava
7,145,933 B1 5/2006 Szajnowski
7,080,158 B1 7/2006 Squire
7,009,927 B2 8/2006 Cudd
7,120,666 B2 10/2006 McCanne et al.
7,124,157 B2 10/2006 Ikake
7,139,557 B2 11/2006 Tang et al.
7,139,579 B2 11/2006 Hatano
7,162,539 B2 1/2007 Garcia-Luna-Aceves et al.
7,203,741 B2 4/2007 Marco et al.
7,234,059 B1 6/2007 Beaver
7,246,272 B2 7/2007 Cabezas
7,326,866 B2 2/2008 Whitmore et al.
7,353,279 B2 4/2008 Durvasula et al.
7,381,366 B2 6/2008 Carter
7,401,115 B1 7/2008 Arsenault
7,440,994 B2 10/2008 Harrow et al.
7,464,123 B2 12/2008 Croker
7,543,018 B2 6/2009 Appelman
7,562,112 B2 7/2009 Harrow et al.
7,565,450 B2 7/2009 Garcia-Luna-Aceves et al.
7,605,714 B2 10/2009 Thompson et al.
7,617,729 B2 11/2009 Axelrod et al.
7,620,703 B1 11/2009 Shteyn
7,639,682 B2 12/2009 Suzuki et al.
7,702,784 B2 4/2010 Berstis
7,706,362 B1 4/2010 Senthilnathan
7,716,985 B2 5/2010 Zhang et al.
7,719,971 B1 5/2010 Issa
7,742,485 B2 6/2010 Zhang
7,751,628 B1 7/2010 Reisman
7,761,500 B1 7/2010 Wei et al.
7,734,777 B2 8/2010 Raja
7,774,155 B2 8/2010 Sato et al.
7,788,378 B2 8/2010 Rao
7,801,824 B1 9/2010 Bryar
7,805,517 B2 9/2010 Shim
7,818,430 B2 10/2010 Zuckerman
7,831,720 B1 11/2010 Noureddine
7,853,472 B2 12/2010 Al-Abdulqader
7,853,795 B2 12/2010 Dick et al.
7,860,988 B2 12/2010 Aoki
7,865,585 B2 1/2011 Samuels et al.
7,877,511 B1 1/2011 Berger
7,890,547 B2 2/2011 Hotti
7,890,624 B2 2/2011 Bivens
7,892,876 B2 2/2011 Mehregany
7,894,431 B2 2/2011 Goring
7,917,755 B1 3/2011 Giliyaru
7,929,429 B2 4/2011 Bornstein
7,929,535 B2 4/2011 Chen et al.
7,984,110 B1 7/2011 Raman
8,041,784 B1 10/2011 Amidon
8,135,912 B2 3/2012 Shribman et al.
8,144,611 B2 3/2012 Agarwal
8,156,275 B2 4/2012 de Cesare
8,301,787 B2 10/2012 Li
8,302,161 B2 10/2012 Burch et al.
8,306,022 B1 11/2012 Cranor
8,375,434 B2 2/2013 Cottrell
8,453,227 B2 5/2013 Aiello
8,458,786 B1 6/2013 Kailash
8,464,350 B2 6/2013 Kanevsky
8,479,251 B2 7/2013 Feinleib et al.
8,499,059 B2 7/2013 Stoyanov
8,504,723 B2 8/2013 Kohli
8,508,472 B1 8/2013 Wieder
8,514,812 B2 8/2013 Tang et al.
8,516,084 B1 8/2013 Grieve
8,527,631 B1 9/2013 Liang
8,533,628 B2 9/2013 Rohrabaugh
8,560,604 B2 10/2013 Shribman et al.
8,577,724 B1 11/2013 Gandhi
8,595,786 B2 11/2013 Choi
8,612,641 B1 12/2013 Bozarth et al.
8,627,422 B2 1/2014 Hawkes
8,639,630 B2 1/2014 Fomenko et al.
8,655,838 B2 2/2014 Wright
8,655,985 B2 2/2014 De
8,671,221 B2 3/2014 Shribman et al.
8,719,505 B2 6/2014 Shribman et al.
8,832,179 B2 9/2014 Owen et al.
8,935,798 B1 1/2015 Smith
9,201,808 B2 1/2015 Shribman et al.
8,948,832 B2 2/2015 Hong et al.
8,957,988 B2 2/2015 Wexler et al.
8,972,602 B2 3/2015 Mithyantha
8,990,357 B2 3/2015 Graham-Cumming
8,996,856 B2 3/2015 Amit
9,015,335 B1 4/2015 Gigliotti
9,049,247 B2 6/2015 Holloway
9,059,938 B1 6/2015 Strand
9,100,320 B2 8/2015 Hsy
9,122,554 B2 9/2015 Callaghan
9,154,557 B2 10/2015 Lev-Ran
9,177,157 B2 11/2015 Binder
9,237,210 B2 1/2016 Liu
9,241,044 B2 1/2016 Shribman et al.
9,244,682 B2 1/2016 Rowles et al.
9,253,164 B2 2/2016 Gouge
9,313,100 B1 4/2016 Jenkins
9,374,244 B1 6/2016 Reed
9,378,473 B2 6/2016 Wolfe
9,380,028 B2 6/2016 Rizzo
9,418,243 B2 8/2016 Bauer
9,380,523 B1 9/2016 Mijar
9,444,903 B2 9/2016 Nuaimi
9,584,529 B2 2/2017 Su
9,634,994 B2 4/2017 Prince
9,660,895 B1 5/2017 Bennett
9,705,959 B1 7/2017 Strand
9,742,866 B2 8/2017 Shribman
9,769,121 B2 9/2017 Joy et al.
9,838,497 B2 * 12/2017 Lawrence ............ H04L 67/563
9,979,674 B1 5/2018 Kumar
9,990,295 B2 6/2018 Shribman et al.
10,104,165 B1 10/2018 Killian
10,110,606 B2 10/2018 Mizhar
10,182,466 B2 1/2019 Nirantar
10,277,711 B2 4/2019 Shribman
10,361,911 B2 7/2019 Brandwine
10,404,791 B2 9/2019 Puri
10,410,244 B2 9/2019 Toval
10,484,337 B2 11/2019 Subbarayan
10,484,510 B2 11/2019 Shribman
10,560,509 B2 2/2020 Lo
10,594,660 B2 3/2020 Smith
10,601,948 B1 3/2020 Juravicius
10,601,984 B2 3/2020 Olligschlaeger
10,637,956 B1 4/2020 Juravicius
10,645,654 B1 5/2020 Backholm
10,650,166 B1 5/2020 Sundberg
10,743,051 B1 8/2020 Reed
10,749,893 B1 8/2020 Dahlberg
10,771,524 B1 9/2020 Long
10,798,209 B1 10/2020 Juravicius et al.
10,805,181 B2 10/2020 Boutros et al.
11,140,235 B1 10/2021 Vilcinskas et al.
11,258,872 B1 2/2022 Gogel
11,469,992 B2 10/2022 Gerstel

(56) References Cited

U.S. PATENT DOCUMENTS

2001/0011312 A1 8/2001 Chu
2001/0054020 A1 12/2001 Barth
2002/0007413 A1 1/2002 Garcia-Luna-Aceves et al.
2002/0026517 A1 2/2002 Watson
2002/0059371 A1 5/2002 Jamail
2002/0059429 A1 5/2002 Carpenter
2002/0069241 A1 6/2002 Narlikar et al.
2002/0073075 A1 6/2002 Dutta
2002/0073232 A1 6/2002 Hong
2002/0103823 A1 8/2002 Jackson
2002/0112036 A1 8/2002 Bohannon
2002/0112152 A1 8/2002 VanHeyningen
2002/0169818 A1 11/2002 Stewart
2002/0178217 A1 11/2002 Nguyen
2002/0194183 A1 12/2002 Yoakum
2002/0194292 A1 12/2002 King
2003/0009518 A1 1/2003 Harrow et al.
2003/0009583 A1 1/2003 Chan et al.
2003/0018705 A1 1/2003 Chen
2003/0018834 A1 1/2003 Eilers
2003/0061282 A1 3/2003 Ebata et al.
2003/0074403 A1 4/2003 Harrow et al.
2003/0095520 A1 5/2003 Aalbers
2003/0097408 A1 5/2003 Kageyama
2003/0120805 A1 6/2003 Couts
2003/0149720 A1 8/2003 Goldstein
2003/0163413 A1 8/2003 Wiczkowski
2003/0174648 A1 9/2003 Wang et al.
2003/0187925 A1 10/2003 Inala
2003/0200307 A1 10/2003 Raju et al.
2003/0204602 A1 10/2003 Hudson et al.
2003/0210694 A1 11/2003 Jayaraman et al.
2003/0217144 A1 11/2003 Fu et al.
2003/0229718 A1 12/2003 Tock
2003/0229785 A1 12/2003 Daseke
2004/0044731 A1 3/2004 Chen
2004/0052257 A1 3/2004 Abdo
2004/0054748 A1 3/2004 Ackaouy
2004/0054800 A1 3/2004 Shah
2004/0068579 A1 4/2004 Marmigere
2004/0088646 A1 5/2004 Yeager et al.
2004/0111529 A1 6/2004 Parmar
2004/0117455 A1 6/2004 Kaminsky
2004/0133692 A1 7/2004 Blanchet
2004/0136370 A1 7/2004 Moore et al.
2004/0143665 A1 7/2004 Mace
2004/0153473 A1 8/2004 Hutchinson
2004/0199629 A1 10/2004 Bomer
2004/0212490 A1 10/2004 Fredericks
2004/0215717 A1 10/2004 Seifert
2004/0221207 A1 11/2004 Yokota
2004/0230593 A1 11/2004 Rudin
2004/0236962 A1 11/2004 Wong
2004/0254907 A1 12/2004 Crow et al.
2004/0257761 A1 12/2004 Park
2004/0263479 A1 12/2004 Shkolnikov
2005/0015552 A1 1/2005 So et al.
2005/0018645 A1 1/2005 Mustonen et al.
2005/0022236 A1 1/2005 Ito et al.
2005/0027782 A1 2/2005 Jalan
2005/0050097 A1 3/2005 Yeh
2005/0060542 A1 3/2005 Risan
2005/0091540 A1 4/2005 Dick
2005/0096753 A1 5/2005 Arling
2005/0097217 A1 5/2005 Val et al.
2005/0097221 A1 5/2005 James
2005/0097441 A1 5/2005 Herbach
2005/0108244 A1 5/2005 Riise
2005/0108551 A1 5/2005 Toomey
2005/0125412 A1 6/2005 Glover
2005/0138426 A1 6/2005 Styslinger
2005/0165903 A1 7/2005 Doan
2005/0180319 A1 8/2005 Hutnik
2005/0198309 A1 9/2005 Li et al.
2005/0228964 A1 10/2005 Sechrest et al.
2005/0235044 A1 10/2005 Tazuma
2006/0015545 A1 1/2006 Ezra
2006/0026304 A1 2/2006 Price
2006/0036755 A1 2/2006 Abdullah
2006/0039352 A1 2/2006 Karstens
2006/0047844 A1 3/2006 Deng
2006/0059091 A1 3/2006 Wang
2006/0075114 A1 4/2006 Panasyuk
2006/0155995 A1 7/2006 Torvinen
2006/0164383 A1 7/2006 Machin et al.
2006/0184647 A1 8/2006 Dixit
2006/0206586 A1 9/2006 Ling
2006/0212542 A1 9/2006 Fang
2006/0212584 A1 9/2006 Yu et al.
2006/0236083 A1 10/2006 Fritsch
2006/0242318 A1 10/2006 Nettle
2006/0256772 A1 11/2006 Yarlagadda
2006/0259728 A1 11/2006 Chandrasekaran et al.
2006/0271438 A1 11/2006 Shotland
2006/0280191 A1 12/2006 Nishida
2006/0293052 A1 12/2006 Orler
2007/0011674 A1 1/2007 Joo
2007/0047452 A1 3/2007 Lohr
2007/0050522 A1* 3/2007 Grove ................ H04L 67/2876 709/246
2007/0052672 A1 3/2007 Ritter et al.
2007/0061440 A1 3/2007 Sundaram
2007/0073878 A1 3/2007 Issa
2007/0088821 A1 4/2007 Sankuratripati
2007/0100839 A1 5/2007 Kim
2007/0142036 A1 6/2007 Wikman
2007/0156855 A1 7/2007 Johnson
2007/0160072 A1 7/2007 Thalanany et al.
2007/0171921 A1 7/2007 Wookey
2007/0174246 A1 7/2007 Sigurdsson
2007/0177513 A1 8/2007 Kuokkanen
2007/0180111 A1 8/2007 Chmaytelli
2007/0226810 A1 9/2007 Hotti
2007/0239655 A1 10/2007 Agetsuma
2007/0283026 A1 12/2007 Lohmar
2008/0008089 A1 1/2008 Bornstein et al.
2008/0010365 A1* 1/2008 Schneider .............. H04L 63/10 709/223
2008/0034416 A1 2/2008 Kumar
2008/0037536 A1 2/2008 Padmanabhan
2008/0052156 A1 2/2008 Brenner
2008/0071925 A1 3/2008 Leighton
2008/0072178 A1 3/2008 Budzisch
2008/0091812 A1 4/2008 Lev-Ran
2008/0098101 A1 4/2008 Black
2008/0109446 A1 5/2008 Wang
2008/0120427 A1 5/2008 Ramanathan
2008/0125123 A1 5/2008 Dorenbosch
2008/0134258 A1 6/2008 Goose et al.
2008/0155016 A1 6/2008 Tsai
2008/0162700 A1 7/2008 Aborn
2008/0196098 A1 8/2008 Cottrell
2008/0201438 A1 8/2008 Mandre
2008/0209028 A1 8/2008 Kurup
2008/0214152 A1 9/2008 Ramer
2008/0222244 A1 9/2008 Huang
2008/0222267 A1 9/2008 Horn
2008/0222291 A1 9/2008 Weller et al.
2008/0225710 A1 9/2008 Raja
2008/0228537 A1 9/2008 Monfried
2008/0228938 A1 9/2008 Plamondon
2008/0235385 A1 9/2008 Li
2008/0235391 A1 9/2008 Painter et al.
2008/0235623 A1 9/2008 Li
2008/0235746 A1 9/2008 Peters
2008/0086730 A1 10/2008 Vertes
2008/0243735 A1 10/2008 Rish
2008/0256175 A1 10/2008 Lee
2008/0263180 A1 10/2008 Hurst
2008/0282112 A1 11/2008 Bailey
2008/0288973 A1 11/2008 Carson
2008/0298328 A1 12/2008 Sharma
2008/0320151 A1 12/2008 McCanne
2009/0010426 A1 1/2009 Redmond

(56) References Cited

U.S. PATENT DOCUMENTS

| | | | |
|---|---|---|---|
| 2009/0016337 | A1 | 1/2009 | Jorgensen |
| 2009/0037529 | A1 | 2/2009 | Armon-Kest |
| 2009/0037977 | A1 | 2/2009 | Gai |
| 2009/0055471 | A1 | 2/2009 | Kozat |
| 2009/0055749 | A1 | 2/2009 | Chatterjee |
| 2009/0070489 | A1 | 3/2009 | Lu |
| 2009/0077233 | A1 | 3/2009 | Kurebayashi |
| 2009/0100005 | A1 | 4/2009 | Guo |
| 2009/0106551 | A1 | 4/2009 | Boren |
| 2009/0136219 | A1 | 5/2009 | Kikugawa |
| 2009/0138538 | A1 | 5/2009 | Klein |
| 2009/0150534 | A1 | 6/2009 | Miller |
| 2009/0150930 | A1 | 6/2009 | Sherwin |
| 2009/0157850 | A1 | 6/2009 | Gagliardi |
| 2009/0161554 | A1 | 6/2009 | Agarwal |
| 2009/0177761 | A1 | 7/2009 | Meyer |
| 2009/0182843 | A1 | 7/2009 | Hluchyj |
| 2009/0187654 | A1 | 7/2009 | Raja |
| 2009/0193498 | A1 | 7/2009 | Agarwal |
| 2009/0199000 | A1 | 8/2009 | Hsu |
| 2009/0204700 | A1 | 8/2009 | Satya Sudhakar |
| 2009/0216887 | A1 | 8/2009 | Hertle |
| 2009/0217351 | A1 | 8/2009 | Burch |
| 2009/0222515 | A1 | 9/2009 | Thompson |
| 2009/0228603 | A1 | 9/2009 | Ritzau et al. |
| 2009/0232003 | A1 | 9/2009 | Vasseur |
| 2009/0234970 | A1 | 9/2009 | Sun |
| 2009/0248793 | A1 | 10/2009 | Jacobsson |
| 2009/0262724 | A1 | 10/2009 | Suzuki |
| 2009/0278506 | A1 | 11/2009 | Winger |
| 2009/0292816 | A1 | 11/2009 | Etchegoyen |
| 2009/0300208 | A1 | 12/2009 | Lepeska |
| 2009/0313318 | A1 | 12/2009 | Dye |
| 2009/0319502 | A1 | 12/2009 | Chalouhi et al. |
| 2009/0320119 | A1 | 12/2009 | Hicks |
| 2009/0327489 | A1 | 12/2009 | Swildens |
| 2010/0031183 | A1 | 2/2010 | Kang |
| 2010/0036954 | A1 | 2/2010 | Sakata |
| 2010/0042724 | A1 | 2/2010 | Jeon |
| 2010/0067703 | A1 | 3/2010 | Candelore |
| 2010/0082513 | A1 | 4/2010 | Liu |
| 2010/0094970 | A1 | 4/2010 | Zuckerman |
| 2010/0095208 | A1 | 4/2010 | White |
| 2010/0100952 | A1 | 4/2010 | Sample |
| 2010/0105443 | A1 | 4/2010 | Vaisanen |
| 2010/0110368 | A1 | 5/2010 | Chaum |
| 2010/0115613 | A1 | 5/2010 | Ramaswami |
| 2010/0125673 | A1 | 5/2010 | Richardson |
| 2010/0125675 | A1 | 5/2010 | Richardson |
| 2010/0145925 | A1 | 6/2010 | Flinta |
| 2010/0146569 | A1 | 6/2010 | Janardhan |
| 2010/0161752 | A1 | 6/2010 | Collet |
| 2010/0161756 | A1 | 6/2010 | Lewis |
| 2010/0161760 | A1 | 6/2010 | Maloo |
| 2010/0161799 | A1 | 6/2010 | Maloo |
| 2010/0162126 | A1 | 6/2010 | Donaldson |
| 2010/0180082 | A1 | 7/2010 | Sebastian |
| 2010/0235438 | A1 | 9/2010 | Narayanan et al. |
| 2010/0235473 | A1 | 9/2010 | Koren |
| 2010/0262650 | A1 | 10/2010 | Chauhan |
| 2010/0322237 | A1 | 12/2010 | Raja |
| 2011/0007665 | A1 | 1/2011 | Dinur |
| 2011/0022582 | A1 | 1/2011 | Unnikrishnan |
| 2011/0023125 | A1 | 1/2011 | Kim |
| 2011/0035503 | A1 | 2/2011 | Zaid |
| 2011/0066924 | A1 | 3/2011 | Dorso |
| 2011/0087733 | A1 | 4/2011 | Shribman |
| 2011/0106972 | A1 | 5/2011 | Grube |
| 2011/0117938 | A1 | 5/2011 | Pyo |
| 2011/0128911 | A1 | 6/2011 | Shaheen |
| 2011/0137973 | A1 | 6/2011 | Wei |
| 2011/0154477 | A1 | 6/2011 | Parla |
| 2011/0173345 | A1 | 7/2011 | Knox |
| 2011/0218866 | A1 | 9/2011 | Wilson |
| 2011/0264809 | A1 | 10/2011 | Koster |
| 2011/0282997 | A1 | 11/2011 | Prince |
| 2011/0320589 | A1 | 12/2011 | Hietala |
| 2012/0023212 | A1 | 1/2012 | Roth |
| 2012/0036220 | A1 | 2/2012 | Dare |
| 2012/0050144 | A1 | 3/2012 | Morlock |
| 2012/0050668 | A1 | 3/2012 | Howell et al. |
| 2012/0059934 | A1 | 3/2012 | Rafiq et al. |
| 2012/0096116 | A1 | 4/2012 | Mislove |
| 2012/0099566 | A1 | 4/2012 | Laine et al. |
| 2012/0124173 | A1 | 5/2012 | De et al. |
| 2012/0124239 | A1 | 5/2012 | Shribman et al. |
| 2012/0124384 | A1 | 5/2012 | Livni et al. |
| 2012/0136926 | A1 | 5/2012 | Dillon |
| 2012/0144047 | A1 | 6/2012 | Armstrong |
| 2012/0164980 | A1 | 6/2012 | Van Phan |
| 2012/0166582 | A1 | 6/2012 | Binder |
| 2012/0166611 | A1 | 6/2012 | Kim |
| 2012/0185947 | A1 | 7/2012 | Phillips |
| 2012/0198524 | A1 | 8/2012 | Celebisoy |
| 2012/0209945 | A1 | 8/2012 | Chandrasekhar |
| 2012/0239811 | A1 | 9/2012 | Kohli |
| 2012/0246273 | A1 | 9/2012 | Bornstein |
| 2012/0254370 | A1 | 10/2012 | Bacher |
| 2012/0254456 | A1 | 10/2012 | Visharam et al. |
| 2012/0254960 | A1 | 10/2012 | Lortz |
| 2012/0264520 | A1 | 10/2012 | Marsland |
| 2012/0290717 | A1 | 11/2012 | Luna |
| 2012/0297041 | A1 | 11/2012 | Momchilov |
| 2012/0310906 | A1 | 12/2012 | Miller et al. |
| 2012/0323674 | A1 | 12/2012 | Simmons |
| 2013/0007031 | A1 | 1/2013 | Makino |
| 2013/0007232 | A1 | 1/2013 | Wang |
| 2013/0007253 | A1 | 1/2013 | Li |
| 2013/0019258 | A1 | 1/2013 | Bhatia |
| 2013/0046817 | A1 | 2/2013 | Isbister |
| 2013/0047020 | A1 | 2/2013 | Hershko |
| 2013/0067086 | A1 | 3/2013 | Hershko |
| 2013/0072233 | A1 | 3/2013 | Sandholm |
| 2013/0080498 | A1 | 3/2013 | Desilva |
| 2013/0080575 | A1 | 3/2013 | Prince |
| 2013/0081129 | A1 | 3/2013 | Niemelä |
| 2013/0083800 | A1 | 4/2013 | Lezama Bounine |
| 2013/0091273 | A1 | 4/2013 | Ly |
| 2013/0117413 | A1 | 5/2013 | Kaneko |
| 2013/0145017 | A1 | 6/2013 | Luna |
| 2013/0151709 | A1 | 6/2013 | Luna |
| 2013/0157699 | A1 | 6/2013 | Talwar |
| 2013/0166768 | A1 | 6/2013 | Couache et al. |
| 2013/0167045 | A1 | 6/2013 | Xu |
| 2013/0169513 | A1 | 7/2013 | Heinrich et al. |
| 2013/0171964 | A1 | 7/2013 | Bhatia |
| 2013/0173756 | A1 | 7/2013 | Luna |
| 2013/0191456 | A1 | 7/2013 | Ting et al. |
| 2013/0201316 | A1 | 8/2013 | Binder et al. |
| 2013/0212462 | A1 | 8/2013 | Athas |
| 2013/0219281 | A1 | 8/2013 | Trevelyan |
| 2013/0219458 | A1 | 8/2013 | Ramanathan |
| 2013/0263280 | A1 | 10/2013 | Cote |
| 2013/0268357 | A1 | 10/2013 | Heath |
| 2013/0304796 | A1 | 11/2013 | Jackowski |
| 2013/0326607 | A1 | 12/2013 | Feng |
| 2013/0339477 | A1 | 12/2013 | Majeti |
| 2013/0340031 | A1 | 12/2013 | Amit |
| 2014/0013001 | A1 | 1/2014 | Cox |
| 2014/0040035 | A1 | 2/2014 | Cusack |
| 2014/0045547 | A1 | 2/2014 | Singamsetty et al. |
| 2014/0070613 | A1 | 3/2014 | Garb et al. |
| 2014/0078462 | A1 | 3/2014 | Abreu |
| 2014/0122580 | A1 | 5/2014 | Nuaimi |
| 2014/0122865 | A1 | 5/2014 | Ovsiannikov |
| 2014/0133392 | A1 | 5/2014 | Das et al. |
| 2014/0189802 | A1 | 7/2014 | Montgomery |
| 2014/0199044 | A1 | 7/2014 | Gupta |
| 2014/0201323 | A1 | 7/2014 | Fall |
| 2014/0215391 | A1 | 7/2014 | Little et al. |
| 2014/0222963 | A1 | 8/2014 | Gangadharan |
| 2014/0222974 | A1 | 8/2014 | Liu |
| 2014/0223537 | A1 | 8/2014 | Islam |
| 2014/0244778 | A1 | 8/2014 | Wyatt |

(56) References Cited

U.S. PATENT DOCUMENTS

2014/0258465 A1 9/2014 Li
2014/0259093 A1 9/2014 Narayanaswamy
2014/0283068 A1 9/2014 Call et al.
2014/0301334 A1 10/2014 Labranche
2014/0310709 A1 10/2014 Nirantar
2014/0337308 A1 11/2014 De Francisci Morales
2014/0344908 A1 11/2014 Rizzo
2014/0159877 A1 12/2014 Huang
2014/0359081 A1 12/2014 Van Deventer
2014/0372627 A1 12/2014 Axelrod
2014/0376403 A1 12/2014 Shao
2015/0006615 A1 1/2015 Wainner
2015/0016261 A1 1/2015 Backholm
2015/0026239 A1 1/2015 Hofmann
2015/0026341 A1 1/2015 Blacka
2015/0032803 A1 1/2015 Graham-Cumming
2015/0036485 A1 2/2015 Poulson
2015/0039674 A1 2/2015 Agarwal
2015/0067819 A1 3/2015 Shribman et al.
2015/0120863 A1 4/2015 Wu
2015/0135302 A1 5/2015 Cohen
2015/0149431 A1 5/2015 Trevelyan
2015/0163087 A1 6/2015 Conner et al.
2015/0172324 A1 6/2015 Calme
2015/0172406 A1 6/2015 Hansen
2015/0189401 A1 7/2015 Yi
2015/0208352 A1 7/2015 Backholm
2015/0215426 A1 7/2015 Torii et al.
2015/0237159 A1* 8/2015 Lawrence ............ H04L 67/568 709/213
2015/0244839 A1 8/2015 Horn
2015/0268905 A1 9/2015 Chakirov
2015/0277559 A1 10/2015 Vescovi et al.
2015/0295988 A1 10/2015 Goodwin
2015/0317218 A1 11/2015 Verde
2015/0341812 A1 11/2015 Dion
2015/0341901 A1 11/2015 Ryu et al.
2015/0347118 A1 12/2015 Yeung
2015/0349556 A1 12/2015 Mercando et al.
2015/0350362 A1 12/2015 Pollack
2015/0372972 A1 12/2015 Kennedy
2015/0373443 A1 12/2015 Carroll
2016/0035019 A1 2/2016 Rosner
2016/0077547 A1 3/2016 Aimone
2016/0098049 A1 4/2016 Fan
2016/0105530 A1 4/2016 Shribman et al.
2016/0140405 A1 5/2016 Graumann
2016/0170814 A1 6/2016 Li
2016/0173452 A1 6/2016 Seo
2016/0188657 A1 6/2016 Montana
2016/0205028 A1 7/2016 Luna
2016/0205557 A1 7/2016 Tuupola et al.
2016/0232538 A1* 8/2016 Papakostas ............ H04L 67/02
2016/0241664 A1 8/2016 Xia
2016/0162706 A1 9/2016 Famulari
2016/0261688 A1 9/2016 Anand
2016/0269369 A1 9/2016 Thomson
2016/0294956 A1 10/2016 Fix
2016/0323409 A1 11/2016 Kölhi
2016/0337426 A1 11/2016 Shribman et al.
2016/0337464 A1 11/2016 Eriksson
2016/0352628 A1* 12/2016 Reddy ................ H04L 12/4633
2016/0365989 A1 12/2016 Herrero
2016/0366233 A1 12/2016 Le
2016/0380778 A1 12/2016 Shen et al.
2017/0006075 A1 1/2017 Li
2017/0041416 A1 2/2017 Zhou
2017/0048192 A1 2/2017 Herrero
2017/0094710 A1 3/2017 Nirantar
2017/0118313 A1 4/2017 Aladdin et al.
2017/0155654 A1 6/2017 Burke
2017/0187472 A1 6/2017 Chini et al.
2017/0230434 A1 8/2017 Wang
2017/0250861 A1 8/2017 Gheorghe
2017/0272316 A1 9/2017 Johnson
2017/0339253 A1 11/2017 Pathak
2017/0359349 A1 12/2017 Knecht
2017/0374566 A1 12/2017 Backholm
2018/0019909 A1 1/2018 Tanabe et al.
2018/0020324 A1 1/2018 Beauford
2018/0027112 A1* 1/2018 Baldassari ........ H04M 1/72412 715/811
2018/0034766 A1 2/2018 Chiba
2018/0042067 A1 2/2018 Nirantar
2018/0047072 A1 2/2018 Chow
2018/0063228 A1 3/2018 Deen
2018/0077624 A1 3/2018 Jung
2018/0070129 A1 5/2018 Cholas et al.
2018/0131668 A1 5/2018 Prince
2018/0167336 A1 6/2018 Lawrence
2018/0213038 A1 7/2018 Chung
2018/0213060 A1 7/2018 Koonce
2018/0219830 A1 8/2018 O'Brien
2018/0225387 A1 8/2018 Pang
2018/0226760 A1 8/2018 Bolouri-Saransar et al.
2018/0227210 A1 8/2018 Cosgrove
2018/0262388 A1 9/2018 Johnson
2018/0302292 A1 10/2018 Khurana et al.
2018/0349354 A1 12/2018 Gonzalez
2018/0367433 A1 12/2018 Luna
2018/0367560 A1 12/2018 Mahaffey
2018/0375828 A1 12/2018 Rawat
2018/0375896 A1 12/2018 Wang
2018/0375952 A1 12/2018 Knecht
2019/0028548 A1 1/2019 Lauer
2019/0033845 A1 1/2019 Cella
2019/0036777 A1 1/2019 Frizzell
2019/0037047 A1 1/2019 Shribman
2019/0050164 A1 2/2019 Kotian
2019/0059083 A1 2/2019 Backholm
2019/0068740 A1 2/2019 Graham-Cumming
2019/0098518 A1 3/2019 Luna
2019/0102280 A1 4/2019 Caldato
2019/0110173 A1 4/2019 Collier
2019/0116236 A1 4/2019 He
2019/0124018 A1 4/2019 Zhang
2019/0137594 A1 5/2019 Annamalai et al.
2019/0138560 A1 5/2019 Holloway
2019/0155665 A1 5/2019 Bott
2019/0166520 A1 5/2019 Luna
2019/0171474 A1 6/2019 Malboubi
2019/0174449 A1 6/2019 Shan
2019/0180316 A1 6/2019 Toval
2019/0182034 A1 6/2019 McCarthy et al.
2019/0199611 A1 6/2019 Kotadia
2019/0238510 A1 8/2019 Li
2019/0260859 A1 8/2019 Patil
2019/0268308 A1 8/2019 Sinha
2019/0372878 A1 12/2019 Chakra
2019/0373083 A1 12/2019 Nucci
2019/0379766 A1 12/2019 Decenzo
2019/0385057 A1 12/2019 Litichever et al.
2019/0387430 A1 12/2019 Ingerman
2020/0007494 A1 1/2020 Prince
2020/0136911 A1 4/2020 Assali
2020/0159622 A1 5/2020 Chintagunta
2020/0162432 A1 5/2020 Ludin
2020/0169536 A1 5/2020 Santelia
2020/0184035 A1 6/2020 Santelia
2020/0186614 A1 6/2020 Luna
2020/0205058 A1 6/2020 Yoshikawa
2020/0259893 A1 8/2020 James
2020/0287867 A1 9/2020 Knecht
2020/0296036 A1 9/2020 Chu
2020/0358858 A1 11/2020 Shribman
2021/0058271 A1 2/2021 Sung
2021/0075860 A1 3/2021 Binder et al.
2021/0194986 A1 6/2021 Shribman et al.
2021/0234721 A1 7/2021 Shribman et al.
2022/0070216 A1 3/2022 Kohavi

(56) References Cited

U.S. PATENT DOCUMENTS

| | | | | |
|---|---|---|---|---|
| 2022/0164400 | A1 | 5/2022 | Holloway | |
| 2022/0173924 | A1 * | 6/2022 | Shribman | H04L 67/025 |

FOREIGN PATENT DOCUMENTS

| | | | | |
|---|---|---|---|---|
| CN | 102314348 | | 1/2012 | |
| CN | 105245607 | B | 1/2016 | |
| CN | 106534244 | A | 3/2017 | |
| CN | 106547793 | A | 3/2017 | |
| CN | 107832355 | A | 3/2018 | |
| CN | 107864143 | A | 3/2018 | |
| CN | 108551452 | | 9/2018 | |
| CN | 108924199 | A | 11/2018 | |
| CN | 110062025 | A | 7/2019 | |
| CN | 110071980 | A | 7/2019 | |
| CN | 110147271 | A | 8/2019 | |
| EP | 1672826 | | 6/2006 | |
| EP | 2597869 | A1 | 5/2013 | |
| EP | 2922275 | B1 | 3/2016 | |
| EP | 3272105 | B1 * | 3/2016 | G06Q 30/0207 |
| GB | 2418108 | A | 3/2006 | |
| JP | H11-355302 | | 12/1999 | |
| JP | 2007280388 | | 10/2007 | |
| KR | 1020090097034 | | 9/2009 | |
| WO | 97/42582 | A1 | 11/1997 | |
| WO | 2004094980 | A2 | 11/2004 | |
| WO | 2007/136665 | | 11/2007 | |
| WO | 2009/086134 | A1 | 7/2009 | |
| WO | 2010/014747 | A2 | 2/2010 | |
| WO | 2010090562 | A1 | 12/2010 | |
| WO | 2011/005390 | A2 | 1/2011 | |
| WO | 2011068784 | A1 | 9/2011 | |
| WO | 2015034752 | A1 | 3/2015 | |
| WO | 2015/157646 | | 10/2015 | |
| WO | 2016/123293 | A1 | 8/2016 | |
| WO | 2016181383 | | 11/2016 | |
| WO | 2016/198961 | A2 | 12/2016 | |
| WO | 2019/043687 | | 3/2019 | |

OTHER PUBLICATIONS

"Anonymizing Proxies: What They Are and Who They Work"—Enterprise Services Mar. 2013 (Year: 2012) (2 pages).
Selected pages from the website proxifier.com as of Feb 2008 (15 pages).
Proxychains source code (Oct. 20, 2004) (53 pages).
RFC 1918, Address Allocation for Private Intemets, Feb. 1996 (9 pages).
RFC 2131, Dynamic Host Configuration Protocol, Mar. 1997 (45 pages).
RFC 4388, Dynamic Host Configuration Protocol (DHCP) Leasequery, Feb. 2006 (27 pages).
Roger Dingledine, Nick Mathewon, and Paul Syverson, Tor: The Second-Generation Onion Router, In Proceedings of the 13th conference on USENIX Security Symposium, vol. 13, 2004 (17 pages).
Goldschlag D.M., Reed M.G., Syverson P.F., Hiding Routing Information, Lecture Notes in Computer Science, vol. 1174, Springer, Berlin, Heidelberg, 1996 (14 pages).
Schneier, Anonymity and Tor Network, Schneier on Security Sep. 20, 2007, https://www.schneier.com/blog/archives/2007/09...html, p. 1-22, accessed Apr. 26, 2020 (22 pages).
Reed M.G., Syverson P.F. Goldschlag D.M., Protocols Using Anonymous Connections: Mobile applications, Lecture Notes in Computer Science, vol. 1361, Springer, Berlin, Heidelberg, 1997 (11 pages).
Nick Mathewon, and Roger Dingledine, Location Diversity in Anonymity Networks, In Proceedings of the 2004 ACM workshop on Privacy in the electronic society. Association for Computing Machinery, New York, NY, USA 66-67 (11 pages).
Mathew Edman and Paul Syverson, As-Awareness in Tor Path Selection, In Proceedings of the 16th ACM conference on Computer and Communication Security (CCS 09). Association for Computing Machinery, New York, NY, USA 380-389 (10 pages).
Banerjee, Priyanka, Anonymous Routing in Wireless Networks: Onion Routing, Team Project Report 2007, p. 1-16 (16 pages).
McCoy D., Bauer K., Grunwald D., Kohno T., Sicker D., Shining Light in Dark Places: Understandings the Tor Network, Lecture Notes in Computer Science, vol. 5134, Springer, Berlin, Heidelberg, 2008 (14 pages).
Harry Newton, Newton's Telecom Dictionary, Mar. 2004, CNP Books, p. 182, 183, 433, 434, 435, 437, 665, 737 (10 pages).
Chakravarty et al., Identifying Proxy Nodes in a Tor Anonymization Circuit, 2008, IEEE International Conference on Signal Image Technology and Internet Based Systems, Bali, 2008, pp. 633-639 (7 pages).
Orfali et al., Client/Server Survival Guide, 3rd ed., John Wiley and Sons Inc. 1999, p. 15 (3 pages).
Reed M.G., Syverson P.F., Goldschlag D.M., Proxies for Anonymous Routing, In Proceedings 12th Annual Computer Security Applications Conference, 1996, pp. 95-104 (10 pages).
Arndt Rachel, "How to get around Country-Specific streaming rules" Jul. 31, 2013 (2 pages).
Anonymous, "Where is located a website? Website location finder : IPVoid", Mar. 20, 2019 (1 page).
RFC 3022, Traditional IP Network Address Translator (Traditional NAT), Jan. 2001 (16 pages).
RFC 2068, Hypertext Transfer Protocol—HTTP/1.1, Jan. 1997 (162 pages).
RFC 1919, Classical versus Transparent IP Proxies, Mar. 1996 (35 pages).
HAProxy Reference Manual, Version 1.2.18, Willy Tarreau, May 25, 2008 (40 pages).
HAProxy Architecture Guide, Version 1.2.18, Willy Tarreau, May 25, 2008 (23 pages).
IETF RFC 6455 entitled: "The WebSocket Protocol", Dec. 2011.
IETF RFC 2663 entitled: "IP Network Address Translator (NAT) Terminology and Considerations", Aug. 1999.
IETF RFC 3715 entitled: "IPsec-Network Address Translation (NAT) Compatibility Requirements", Mar. 2004.
IETF RFC 3947 entitled: "Negotiation of NAT-Traversal in the IKE", Jan. 2005.
IETF RFC 5128 entitled: "State of Peer-to-Peer (P2P) Communication across Network Address Translators (NATs)", Mar. 2008.
IETF RFC 5245 entitled: "Interactive Connectivity Establishment (ICE): A Protocol for Network Address Translator (NAT) Traversal for Offer/Answer Protocols", Apr. 2010.
IETF RFC 5389 entitled: "Session Traversal Utilities for Nat (STUN)", Oct. 2008.
IETF RFC 7350 entitled: "Datagram Transport Layer Security (DTLS) as Transport for Session Traversal Utilities for NAT (STUN)", Aug. 2014.
Bryan Ford (of Massachusetts Institute of Technology), Pyda Srisuresh (of Caymas Systems, Inc.) and Dan Kegel, "Peer-to-Peer Communication Across Network Address Translators", published 2008.
Huynh Cong Phuoc, Ray Hunt, and Andrew Mckenzie (all of University of Canterbury, Chistchurch, New Zealand), "NAT Traversal Techniques in Peer-to-Peer Networks", Jan. 2008.
Paper by Oracle Corporation, entitled: "Oracle Sharding: Linear Scalability, Fault Isolation and Geo-distribution for Web-scale OLTP Applications", Apr. 2017.
MongoDB Documentation Project paper entitled: "Sharding and MongoDB", Jan. 12, 2015 (Release 2.8.0-rc3).
IETF RFC 7157 "IPv6 Multihoming without Network Address Translation", Mar. 2014.
Dr. Richard Wall, "Carebot PIC32 MX7ck implementation of Free RTOS", Sep. 23, 2013.
Publication No. 1-587005-001-3 by Cisco Systems, Inc. (Jul. 1999), entitled: "Internetworking Technologies Handbook", : Chapter 18: "Multiservice Access Technologies" (pp. 18-1 to 18-10).
Publication No. 1-587005-001-3 by Cisco Systems, Inc. (Jul. 1999), entitled: "Internetworking Technologies Handbook", Chapter 19: "Voice / Data Integration Technologies" (pp. 19-1 to 19-30).
Berners-Lee et al., RFC 1945, Hypertext Transfer Protocol, HTTP/ 1.0 (May 1996) (60 pages).

(56) References Cited

OTHER PUBLICATIONS

Leech et al., RFC 1928, Socks Protocol, Version 5 (Internet Engineering Task Force, Network Working Group, Mar. 1996) (9 pages).
Wessels, "Squid: The Definitive Guide," ISBN-10: 9780596001629, ISBN-13: 978-0596001629, O'Reilly Media; 1st Ed. (Jan. 1, 2004) (468 pages).
Luotonen, "Web Proxy Servers," ISBN-10: 0136806120, ISBN-13: 978-0136806127, Prentice Hall; 1st Ed. (Dec. 30, 1997) (452 pages).
Outonen et al., "World-Wide Web proxies," Computer Networks and ISDN Systems 27, 147-154 (Elsevier Science B.V.) (1994) (8 pages).
Cooper et al., RFC 3040, Internet Web Replication and Caching Taxonomy (Jan. 2001) (32 pages).
ISO/IEC 23009-1:2012(E), MPEG-DASH standard, Jan. 5, 2012 (133 pages).
ProxyList.net, as captured by the Wayback Machine (web.archive.org), on Jul. 17, 2011 (1 page).
Printout of VIP72 Youtube web page at https://www.youtube.com/watch?v=L0Hct2kSnn4, retrieved Nov. 21, 2019 (1 page).
VIP72 Scene Images extracted from VIP72.com/nvpnnet, MPEG-4 video recording of "nVPN.net | Double your Safety and use Socks5 +nVpn", accessed from https://www.youtube.com/watch?v=L0Hct2kSnn4, published Sep. 11, 2011 (221 pages).
Certification dated Nov. 8, 2019 of Anjali Shresta of Google, Proof of Date for VIP72 Youtube web page and video (4 pages).
VIP72.com home page as of 2013 from Wayback Machine (3 pages).
"Keep Alive"—Imperva, 2019 https://www.imperva.com/learn/performance/keep-alive (2019) (3 pages).
Third party observation filed on Jun. 21, 2019 in PCT Application No. PCT/IL2018/050910 (7 pages).
IETF named: IPv6 Tunnel Broker, Apr. 1999—First uploaded document submitted with third party observation dated Jun. 21, 2019 (13 pages).
RFC 3053 (Jan. 2001) named: IPv6 Tunnel Broker—Secod uploaded document submitted with third party observation dated Jun. 21, 2019 (13 pages).
International Search Report of PCT/IL2018/050910 dated May 6, 2019.
Written Opinion of PCT/IL2018/050910 dated May 6, 2019.
International Preliminary Report on Patentability of PCT/IL2018/050910 dated Mar. 3, 2020.
Kei Suzuki, a study on Cooperative Peer Selection Method in P2P Video Delivery, vol. 109, No. 37, IEICE Technical Engineers Report, The Institute of Electronics, Information and Communication, May 14, 2009.
RFC 3143, Known HTTP Proxy/Caching Problems, Jun. 2001 (32 pages).
Dejan Lukan, Achieving Anonymity with Tor Part 2: Proxies and DNA Servers, INFOSEC Aug. 16, 2012 (17 pages).
Kim et al, "RAD: Recipient Anonymous Data Delivery Based on Public Routing Proxies" Computer Notworks, vol. 55, Issue 15 Elsevier, Science Direct, Oct. 27, 2011 (16 pages).
Dejuan Lukan, "Achieving Anonymity with Tor Part 2: Proxies and DNS Servers", InfoSec Resource, Aug. 16, 2012 (20 pages).
Rajkumar Buyya et al., "Content Delivery Networks" © 2008 Springer-Verlag Berlin Heidelberg (392 pages).
Request for Comments 1123, "Requirements for Internet Hosts—Application and Support", Oct. 1989 (98 pages).
Andrew S. Tanenbaum, "Computer Networks", 4th Edition, 2003 (908 pages).
Chou Chie Ming et al., "Triggering and Relay Node Selection for Self-User Relaying", IEEE Communications Letters, vol. 19, No. 11, Nov. 1, 2015 pp. 2029-2032 (4 pages).
Request for Comments 2396, "Uniform Resource Identifiers (URI): Generic Syntax", Aug. 1998 (40 pages).
Ashish Mohta, worldproxy202—Proxy that's pretty useful, available at https://web.archive.org/web/20080601050011/http://www.technospot.net/blogs/worldproxy202-proxy-that's-pretty-useful, Jun. 1, 2006 (6 pages).
Wikipedia article on "Routing", https://en.wikipedia.org/wiki/Routing Jul. 26, 2021 (8 pages).
Authors Alain Durand (IMAG) et al., "IPv6 Tunnel Broker <draft-ietf-ngtrans-broker-00.txt>", Internet Society (ISOC), Apr. 2, 1999 (14 pages).
Sophie Gastellier-Prevost et al., "Defeating pharming attacks at the client-side", Network and System Security (NSS), Sep. 6, 2011 (8 pages).
Bharat K et al. "Mirror, Mirror on the Web: a study of host pairs with replicated content", Computer Networks, Amsterdam, vol. 31, No. 11-16, May 17, 1999 (12 pages).
European Search Report of EP 20190259 dated Dec. 16, 2020.
European Search Report of EP 20195090 dated Dec. 8, 2020.
RFC 2186, Internet Cache Protocol (ICP), version 2, Sep. 1997 (9 pages).
Octoparse Blog: "Top 20 Web Crawling Tools to Scrape the Websites Quickly", Aug. 23, 2019 (15 pages).
Kozierok, The TCP/IP Guide—TCP Connection Preparation, Apr. 6, 2005 (3 pages).
Jovovic, Turning your HD TV into an Android SmartTV is easier than you think!, Feb. 26, 2013 (3 pages).
Allen, A Software Developer's Guide to HTTP Part III—Connections, Jan. 26, 2012 (10 pages).
Google Scholar: MorphMix citation in Alessandro Acquisti, et al., Digital Privacy: Theory, Technologies, and Practices (2007) (2 pages).
RFC 959, File Transfer Protocol (FTP), Oct. 1985 (69 pages).
RFC 821, Jonathan B. Postel, Simple Mail Transfer Protocol, Aug. 1982 (70 pages).
RFC 918, Post Office Protocol, Oct. 1984 (5 pages).
RFC 937, Post Office Protocol—Version 2, Feb. 1985 (24 pages).
Roger Dingledine et al., "The Free Haven Project: Distributed Anonymous Storage Service", Dec. 17, 2000 (23 pages).
Michael Freedman et al., "Tarzan: A Peer-to-Peer Anonymizing Network Layer", Nov. 18-22, 2002 (14 pages).
RFC 791, DARPA Internet Program Protocol Specification, Sep. 1981 (49 pages).
RFC 1034, "Domain Names—Concepts and Facilities", Nov. 1987 (55 pages).
RFC 1035, "Domain Names—Implementation and Specification", Nov. 1987 (54 pages).
RFC 1939, Post Office Protocol—Version 3, May 1996 (23 pages).
"Tunneling for Transparency: A Large-Scale Analysis of End-to-End Violations in the Internet", Taejoong Chung, David Choffnes, and Alan Mislove, all of Northeastern University, IMC 2016, Nov. 14-16, 2016, Santa Monica, CA, USA, [DOI: http://dx.doi.org/10.1145/2987443.2987455] (16 pages).
N. Gautam, "Performance Analysis and Optimization of Web Proxy Servers and Mirror Sites", European Journal Operational Research 142 (2002), 396-418 (23 pages).
Andrew Daviel et al., Geographic extensions for HTTP transactions, Dec. 7, 2007 (15 pages).
https faq, The HTTPS-Only Standard, Jul. 6, 2015 (3 pages).
RFC 2818, "HTTP Over TLS", May 2000 (7 pages).
RFC 1866, "Hypertext Markup Language—2.0", Nov. 1995 (77 pages).
Cisco Systems, Inc. Publication No. 1-587005-001-3 (Jun. 1999), "Internetworking Technologies Handbook", Chapter 7: "Ethernet Technologies", pp. 7-1 to 7-38.
Data-sheet "LAN91C111 10/100 Non-PCI Ethernet Single Chip MAC + PHY",Standard Microsystems Corporation (SMSC),Rev. 15, (Feb. 20, 2004).
Robert D. Doverspike, K.K. Ramakrishnan, and Chris Chase Chapter 2: "Structural Overview of ISP Networks" of the book entitled: "Guide to Reliable Internet Services and Applications", published 2010 (ISBN: 978-1-84882-827-8).
Cisco Systems, Publication No. 1-587005-001-3, Inc. (Jul. 1999) entitled: "Internetworking Technologies Handbook", Chapter 5: "Routing Basics" (pp. 5-1 to 5-10).

(56) References Cited

OTHER PUBLICATIONS

Redbook Documents No. GG24-4756-00, entitled: "Local area Network Concepts and Products: LAN Operation Systems and management" 1st Edition May 1996.
Redbook Document No. GG24-4338-00, entitled: "Introduction to Networking Technologies", 1st Edition Apr. 1994.
Redbook Document No. GG24-2580-01 "IP Network Design Guide", 2nd Edition Jun. 1999.
Redbook Document No. GG24-3376-07 "TCP/IP Tutorial and Technical Overview", ISBN 0738494682 8th Edition Dec. 2006.
Cisco Systems, Publication No. 1-587005-001-3, Inc. (Jul. 1999) entitled: "Internetworking Technologies Handbook"; Chapter 32: "IPv6" (pp. 32-1 to 32-6).
Cisco Systems, Publication No. 1-587005-001-3, Inc. (Jul. 1999) entitled: "Internetworking Technologies Handbook", Chapter 45: "OSI Routing" (pp. 45-1 to 45-8).
Cisco Systems, Publication No. 1-587005-001-3, Inc. (Jul. 1999) entitled: "Internetworking Technologies Handbook", Chapter 51: "Security" (pp. 51-1 to 51-12).
Cisco Systems, Publication No. 1-587005-001-3, Inc. (Jul. 1999) entitled: "Internetworking Technologies Handbook", Chapter 30: "Internet Protocols" (pp. 30-31 to 30-16).
"UNIX Tutorial" by tutorialspoint.com, downloaded on Jul. 2014.
Mark Russinovich, David A. Solomon, and Alex Ioescu, Microsoft publications entitled: "Windows Internals—Part 1", published by Microsoft Press in 2012.
Mark Russinovich, David A. Solomon, and Alex Ioescu, "Windows Internals—Part 2", published by Microsoft Press in 2012.
Jerry Honeycutt, "Introducing Windows 8—An Overview for IT Professionals", Microsoft press 2012.
William R. Stanek, Microsoft publication entitled: "Inside-Out Windows Server 2012", published 2013 by Microsoft Press.
Samsung Electronics Co., Ltd. presentation entitled: "Google™ Chrome OS User Guide" published 2011.
Renesas Technology Corp, Application Note No. RES05B00008-0100/Rec. 1.00 published Jan. 2010. entitled: "R8C Family—General RTOS Concepts".
The Association for Laboratory Automation JAJA Technology Review article published Feb. 2007 entitled: "An Overview of Real-Time Operating Systems".
Springer Science + Business Media B.V. in Chapter 2 entitled: "Basic Concepts of Real Time Operating Systems" of a book published 2009 [ISBN—978-1-4020-9435-4] by Springer Science + Business Media B.V. entitled: "Hardware-Dependent Software—Principles and Practice".
Nicolas Melot (downloaded Jul. 2015) entitled: "Study of an operating system: FreeRTOS—Operating systems for embedded devices".
"FreeRTOS™ Modules" published in the www, freertos.org website dated Nov. 26, 2006.
Rich Goyette of Carleton University as part of 'SYSC5701: Operating System Methods for Real-Time Applications', entitled: "An Analysis and Description of the Inner Workings of the FreeRTOS Kernel", FreeRTOS kernel is described in a paper published Apr. 1, 2007.
Apple Inc., iPhone 6 technical specification (retrieved Oct. 2015 from www.apple.com/iphone-6/specs/).
User Guide dated 2015 (019-00155/2015-06) by Apple Inc. entitled: "iPhone User Guide For iOS 8.4 Software".
User manual numbered English (EU), Mar. 2015 (Rev. 1.0) entitled: "SM-G925F SM-G925FQ SM-G925I User Manual".
"Galaxy S6 Edge—Technical Specification" (retrieved Oct. 2015 from www.samsung.com/us/explore/galaxy-s-6-features-and-specs).
Publication entitled: "Android Tutorial", downloaded from tutorialspoint.com on Jul. 2014.
Publication entitled: "IOS Tutorial", downloaded from tutorialspoint.com on Jul. 2014.
Dr. Richard Wall entitled Paper (dated Sep. 23, 2013) entitled: "Carebot PIC32 MX7ck implementation of Free RTOS".
Peter Snyder, Paper entitled: "tmpfs: A Virtual Memory File System", downloaded on Jul. 2014.
Mohamad (Hani) Atassy, submitted to Dr. Dennis R. Hafermann, Publication entitled: "Microsoft Windows Driver Model (WDM)", dated Jan. 28, 2002.
Melekam Tsegaye and Ricahrd Foss, both from Rhodes University, South-Africa, Publication entitled: "A Comparison of the Linux and Windows Device Driver Architecture", downloaded from the Internet on Jul. 2014.
Prof. M. Saeed, Tutorial entitled: "Welcome to Version 2.0 of the Win32 API Tutorial", published by Brook Miles, downloaded from the Internet on Jul. 2014.
Publication No. SC34-2597-03 entitled: "Device Drivers, Features, and Commands on Red Hat Exterprise Linux 6.3", downloaded from the Internet on Jul. 2014.
Peter Jay Salzman, Michael Burian, and Ori Pomerantz, Book entitled: "The Linux Kernel Module Programming Guide" ver. 2.6.4, dated May 18, 2007.
Melekam Tsegaye and Richard Foss, both from Rhodes University, South-Africa, Publication entitled: "A Comparison of the Linux and Windows Device Driver Architecture", downloaded from the Internet on Jul. 2014.
Alan Grosskurth and Michael W. Godfrey of the University of Waterloo in Canada, Publication entitled: "Architecture and evolution of the modern web browser", dated Jun. 20, 2006.
Microsoft 2009 publication entitled: "Step by Step Tutorials for Microsoft Internet Explorer 8 Accessibility Options".
Apple publication entitled: "Safari Web Content Guide", dated Mar. 2014.
Dac-Nhuong Le, Raghvendra Kumar, Gia Nhu Nguyen, and Jyotir Moy Chatterjee, Book entitled "Cloud Computing and Virtualization", published 2018 by John Wiley & Sons, Inc. [ISBN 978-1-119-48790-6].
Cisco Systems, eBook authored by Gustavo Alessandro Andrade Santana and published 2014, Inc. (Cisco Press) [ISBN-13: 978-1-58714-324-3] entitled: "Data Center Virtualization Fundamentals".
IBM RedBook entitled: "IBM PowerVM Virtualization—Introduction and Configuration" published by IBM Corporation Jun. 2013.
Paper by IBM Corporation published 2009 entitled: "Power Systems—Introduction to virtualization".
Cisco Systems, Inc. document entitled: "An Introduction to IP Security (IPSec) Encryption".
IETF RFC 1750 "Randomness Recommendations for Security" (Dec. 1994).
Data sheet 'Physical Random number generator RPG100. RPG100B' Rev. 08 publication No. HM-RAE106-0812.
W3c, Glossary of Terms for Device Independence, Jan. 2005 (12 pages).
RFC 1001: Protocol Standard for a NetBIOS Service on a TCP/UDP Transport: Concepts and Methods, Mar. 1987 (68 pages).
RFC 1630: Universal Resource Identifiers in WWW, Jun. 1994 (28 pages).
RFC 2960: Stream Control Transmission Protocol, Oct. 2000 (134 pages).
RFC 6520: Transport Layer Security (TLS) and Datagram Transport Layer Security (DTLS) Heartbeat Extension, Feb. 2012 (9 pages).
L.L. Peterson, B.S. Davie, Computer Networks: A Systems Approach, 4th ed., San Francisco, CA, 2007 (20 pages).
Mell et al., "Creating a Patch and Vulnerability Management Program", NIST Special Publication 800-40 Version 2.0, 2005 (76 pages).
Rowstron et al., "Pastry: Scalable, Decentralized Object Location, and Routing for Large-Scale Peer-to-Peer Systems", IFIP/ACM International Conference on Distributed Systems Platforms and Open Distributed Processing: Middleware 2001, pp. 329-350 (22 pages).
Ratnasamy, et al., "Topologically aware overlay construction and server selection", Proceedings Twenty-First Annual Joint Conference of the IEEE Computer and Communications Societies, vol. 3, pp. 1190-1199 (2002) (10 pages).

(56) References Cited

OTHER PUBLICATIONS

Padmanabhan et al., "An Investigation of Geographic Mapping Techniques for Internet Hosts", ACM SIGCOMM Computer Communication Review, vol. 3, No. 4, pp. 173-185 (2001) (13 pages).
Freedman et al., "OASIS: Anyeast for Any Service", Proceedings of the 3rd Conference on Networked Systems Design & Implementation, vol. 3, pp. 129-142 (2006) (14 pages).
Agarwal et al., "Matchmaking for Online Games and Other Latency-Sensitive P2P Systems", ACM SIGCOMM Computer Communication Review, vol. 39. No. 4, pp. 315-326 (2009) (12 pages).
H. Casanova, "Benefits and Drawbacks of Redundant Batch Requests", Journal of Grid Computing, vol. 5, pp. 235-250 (2007) (16 pages).
S. J. Murdoch, "New Tor distribution for testing: Tor Browser Bundle", Jan. 30, 2008 post to tor-talk mailing list (1 page).
Erich Gamma et al., Design Patterns: Elements of Reusable Object-Oriented Software (1st ed., 1994) (12 pages).
L.J Fogel et al., "Modeling the Human Operator with Finite-State Machines" NASA Contractor Report (Jul. 1968) (238 pages).
MacPherson Decl. Exh. A, IEEE 802.Nov. 2007—Telecommunications and Information Exchange Between Systems—Local and Metropolitan Area Networks—Specific Requirements—Part 11: Wireless LAN Medium Access Control (MAC) and Physical Layer (PHY) Specifications, Revision of ANSI/IEEE Std 802.11, 1999 Edition (R2003) (1236 pages).
W. R. Stevens "TCP/IP Illustrated, vol. I: The Protocols", Addison Wesley Longman, Inc. 1994 (67 pages).
Michael J. Freedman et al., "Democratizing content publication with Coral", In Proc. 1st Symposium, Mar. 2004 (14 pages).
Andy Oram, "Peer-to-Peer: Harnessing the Power of Disruptive Technology", Chapters Accountability and Free Haven, First Edition Mar. 2001 (265 pages).
RFC 2109, HTTP State Management Mechanism, Feb. 1997 (21 pages).
Bluetooth SIG standard Covered Core Package version: 4.2, entitled: "Master Table of Contents & Compliance Requirements—Specification vol. 0", published Dec. 2, 2014.
Carles Gomez et al. [Sensors 2012, 12, 11734-11753; doi:10.3390/s120211734] entitled: "Overview and Evaluation of Bluetooth Low Energy: An Emerging Low-Power Wireless Technology", published 2012 in Sensors [ISSN 1424-8220].
Datasheet # SWRT022 entitled: "SimpleLink™ Ultra-Low Power—Wireless Microcontroller Platform", Texas Instrument 2015.
Datasheet # SWRS158A entitled: "CC2650 SimpleLink™ Multistandard Wireless MCU", Texas Instrument, published Feb. 2015, Revised Oct. 2015.
Jun Wang, Wei Liu, Sanjiv Kumar, and Shih-Fu Chang, to the Proceedings of the IEEE (http://arxiv.org/abs/1509.05472v1) entitled: "Learning to Hash for Indexing Big Data—A Survey", Submitted on Sep. 17, 2015.
Josef Pieprzyk and Babak Sadeghiyan, by Springer-Verlag [ISBN 3-540-57500-6] entitled: "Design of Hashing Algorithms", published 1993.
IETF RFC 4634 entitled: "US Secure Hash Algorithms (SHA and HMAC-SHA)", dated Jul. 2006.
FIPS 180-2. IETF RFC 3874 entitled: "A 224-bit One-way Hash Function: SHA-224", dated Sep. 2004.
Yong Wang et al, entitled: "Towards Street-Level Client-Independent IP Geolocation", downloaded from the Internet on Jul. 2014.
Information Systems Audit and Control Association (ISACA) white-paper entitled: "Geolocation: Risk, Issues and Strategies", 2011.
Doxa Chatzopoulou and Marios Kokkodis, entitled: "IP Geolocation", Jan. 2007.
Jayaprabha Bendale and Prof. J. Ratanaraj Kumar, article (ISSN:0975-9646), entitled: "Review of Different IP Geolocation Methods and Concepts", published in (IJCSIT) International Journal of Computer Science and Information Technologies, vol. 5 (1), 2014, 436-440, downloaded from the Internet Aug. 2017.
IETF RFC 4026 entitled: "Provider Provisioned Virtual Private Network (VPN) Terminology", Mar. 2005.
'Marek's—totally not insane—idea of the day', entitled: "Dissecting SSL handshake", Jun. 2012.
Netronome Systems, Inc. white-paper, entitled: "Examining SSL-encrypted Communications", published 2010.
RFC 2544 entitled: "Benchmarking Methodology for Network Interconnect Devices", Mar. 1999.
ITU-T Y.1564 entitled: "Ethernet Service Activation Test Methodology", Feb. 2016.
Data-sheet LIS302DL STMicroelectronics NV, 'MEMS motion sensor 3-axis—±2g/±8g smart digital output "piccolo" accelerometer', Rev. 4, Oct. 2008.
Data-sheet 'Datasheet SQ-SEN-200 Omnidirectional Tilt and Vibration Sensor', Updated Aug. 3, 2009.
Karn, Phil and Craig Partridge, entitled: "Improving Round-Trip Time Estimates in Reliable Transport Protocols", in ACM SIGCOMM '87—Computer Communication Review.
IETF RFC 1323, "TCP Extensions for High Performance", May 1992.
IETF RFC 6323, "Sender RTT Estimate Option for the Datagram Congestion Control Protocol (DCCP)", Jul. 2011.
RFC 792, entitled "Internet Control Message Protocol: DARPA Internet Program Protocol Specification", Sep. 1981.
RFC 2463, entitled "Internet Control Message Protocol (ICMPv6) for the Internet Protocol Version 6 (IPv6) Specification", Dec. 1998.
RFC 1885 entitled "Internet Control Message Protocol (ICMPv6) for the Internet Protocol Version 6 (IPv6) Specification", Dec. 1995.
IETF RFC 6520, "Transport Layer Security (TLS) and Datagram Transport Layer Security (DTLS) Heartbeat Extension", Feb. 2012.
Telecom Regulatory Authority, entitled: "WiFi Technology",Jul. 2003.
IETF RFC 2131, entitled "Dynamic Host Configuration Protocol", Mar. 1997.
IETF RFC 3315, entitled: "Dynamic Host Configuration Protocol for IPV6 (DHCPv6)", Jul. 2003.
IETF RFC 3467 entitled: "Role of the Domain Name System (DNS)", Feb. 2003.
IETF RFC 6195 entitled: "Domain Name System (DNS) IANA Considerations", Mar. 2011.
IETF RFC 1591 entitled: "Domain Name System Structure and Delegation", Mar. 1994.
IETF RFC 2637 entitled: "Point-to-Point Tunneling Protocol (PPTP)", Jul. 1999.
IETF RFC 2661 entitled: "Layer Two Tunneling Protocol "L2TP"", Aug. 1999.
Cisco Systems, Inc. entitled: "IP Tunneling and VPNs", 2001.
Cisco Systems, Inc. handbook 'Internetworking Technologies Handbook' [No. 1-58705-001-3] chapter 18 entitled: "Virtual Private Networks", 2001.
IBM Corporation Redbook series, entitled: "A Comprehensive Guide to Virtual Private Networks" "vol. I: IBM Firewall, Server and Client Solutions" [SG24-5201-00, Jun. 1998].
IBM Corporation Redbook series, entitled: "A Comprehensive Guide to Virtual Private Networks" "vol. II: IBM Nways Router Solutions" [SG24-5234-01, Nov. 1999].
IBM Corporation Redbook series, entitled: "A Comprehensive Guide to Virtual Private Networks" "vol. III: Cross-Platform Key and Policy Management" [SG24-5309-00, Nov. 1999].
IETF RFC 2764 entitled: "A Framework for IP Based Virtual Private Networks", Feb. 2000.
IETF RFC 3931 entitled: "Layer Two Tunneling Protocol—Version 3 (L2TPv3)", Mar. 2005.
IETF RFC 2547 entitled: "BGP/MPLS VPNs", Mar. 1999.
IETF RFC 2409 entitled: "The Internet Key Exchange (IKE)", Nov. 1998.
IETF RFC 4306 entitled: "Internet Key Exchange (IKEv2) Protocol", Dec. 2005.
IETF RFC 2631 entitled: "Diffie-Hellman Key Agreement Method", Jun. 1999.
IETF RFC 1928, entitled: "SOCKS Protocol Version 5", Mar. 1996.
IETF RFC 1929, entitled: "Username/Password Authentication for SOCKS V5", Mar. 1996.
IETF RFC 1961, entitled: "GSS-API Authentication Method for SOCKS Version 5", Jun. 1996.

(56) References Cited

OTHER PUBLICATIONS

ETF RFC 3089, entitled: "A SOCKS-based IPv6/IPV4 Gateway Mechanism", Apr. 2001.
Reed et al, "Anonymous Connections and Onion Routing", Naval Research Laboratory, Mar. 1998 https://www.onion-router.net/Publications/JSAC-1998.pdf (Year: 1998).
European Search Report for EP 14182547.1, dated Jul. 30, 2015.
R. Fielding et al, RFC 2616: Hypertext Transfer Protocol—HTTP/1.1, Jun. 1999, retrieved from the Internet http://rcf-editor.org [retrieved Apr. 15, 2002].
"On the leakage of personally identifiable information via online social networks", Wills et al. AT&T, Apr. 2009 http://www2.research.att.com/-bala/papers/wosn09.pdf.
"Slice Embedding Solutions for Distributed Service Architectures"—Esposito et al., Boston University, Computer Science Dept., Oct. 2011 http://www.cs.bu.edu/techreports/pdf/2011-025-slice-embedding.pdf.
Rob Thubron, "Opera Builds Free and Unlimited VPN Service Directly Into Its Desktop Browser", Apr. 16, 2016 (6 pages).
Anthony Caruana, "3 Ways to Sneak Past Site Blocks", Mar. 12, 2018 (7 pages).
Jack Schofield, "How Can I Access Restriced UK Sites When I'm Overseas?", Oct. 3, 2014 (6 pages).
Huang, S. et al., "Middleboxes in the Internet: a HTTP perspective", 2017 Network Traffic Conference, IEEE, Jun. 21-23, 2017, pp. 1-9 (9 pages).
Goldbert, I. and Shostack A., "Freedom Network 1.0 Architecture and Protocols", Zero-Knowledge Systems Inc, Nov. 29, 1999 (23 pages).
Screenshot from Internet Archive demonstrating availability of Goldbert, I. and Shostack A., "Freedom Network 1.0 Architecture and Protocols" (1 page).
Fifield David et al., "Evading Censorship with Browser-Based Proxies", Privacy Enhancing Technologies 2012, vol. 7384, Berlin, Springer, 2012, pp. 239-258 (20 pages).
Skvorc, D. et al., "Performance Evaluation of Websocket Protocol for Implementation of Full-Duplex Web Streams", 37th International Convention MIPRO, IEEE, May 26-30, 2014, pp. 1003-1008 (6 pages).
Rao A. et al., "Using the Middle to Meddle with Mobile", CCIS, Dec. 2013 (14 pages).
Screenshot from Internet Archive demonstrating availability of Rao A. et al., "Using the Middle to Meddle with Mobile" (1 page).
Netronome Systems, Inc., "Examining SSL-encrypted Communications", White Paper, 2010 (8 pages).
Screenshot from Internet Archive demonstrating availability of Netronome Systems, Inc., "Examining SSL-encrypted Communications" (1 pages).
Peterson, Larry L. and Davie, Bruce S., "Computer Networks. A Systems Approach", 2nd Ed., San Francisco, 2000, p. 610 (18 pages).
Liu, C. et al., "Managing Internet Information Services", Sebastopol, O'Reilly & Associates, 1994, pp. 497-513 (19 pages).
Tanenbaum, Andrew S. and Wetherall, David J., "Computer Networks", 5th Ed., Boston, 2011 pp. 813-822 (12 pages).
Comer, D.E., "Internetworking with TCP/IP—vol. 1: Principles, Protocols and Architectures", 5th Ed., New Jersey, 2006, pp. 249-268 (22 pages).
Krishnamurthy, B. and Rexford, J., "Web Protocols and Practice HTTP/1.1, networking protocols, caching and traffic measurement", Indianapolis, 2001, pp. 184-203 and 249-254 (29 pages).
GeoSurf, "What is IP Rotation—Rotating Proxy Server", Nov. 12, 2017 (4 pages).
Bright Data, "The Ultimate Guide to Buying a Proxy Server", DataCenter Proxies, ProxyCompass Apr. 26, 2022 (23 pages).
RFC 2187, "Application of Internet Cache Protocol (ICP), version 2", Sep. 1997 (24 pages).
Duane Wessels, "ICP and the Squid Web Cache", Aug. 13, 1997 (25 pages).
RFC 1738, "Uniform Resource Locators (URL)", Dec. 1994 (25 pages).
European Search Report of EP 20195075 dated Nov. 13, 2020.
David Gourley et al, "HTTP-The-Definitive-Guide", O'Reilly Media, Inc. Sep. 27, 2002 (658 pages).
Floss Manuals, "Circumvention Tools", Free Software Foundation Inc., May 31, 2021 (240 pages).
David Fifield et al, "Blocking resistant communication through domain fronting", Proceeding on Privacy Enhanching Technologies 2015, May 15, 2015 (19 pages).
Wang Qiyan et al, "CensorSpoofer: Asymmetric Communication with IP Spoofing for ensorship-Resistant Web Browsing", Mar. 9, 2012 (16 pages).
Michael J. Freedman, Princeton University, "Experiences with CoralCDN: a five-year operational view", Proceeding NSDI'10 Proceedings of the 7th USENIX conference on Networked systems design and implementation San Jose, California—Apr. 28-30, 2010 (17 pages).
"The BitTorrent Protocol Specification", Website: https://web.archive.org/web/20120513011037/http:/www.bittorrent.org/beps/bep_0003.html describing BitTorrent dated Jan. 10, 2008 downloaded using web archive on Aug. 16, 2019 (6 pages).
"BitTorrent", Website: https://en.wikipedia.org/w/index.php?title=BitTorrent&oldid=530466721 describing BitTorrent dated Dec. 30, 2012 downloaded using Wikipedia on Aug. 16, 2019 (9 pages).
"VIP SOCKS/VPN Service", Website: http://vip72.com:80/?drgn=1 describing VIP72 proxy service dated Jan. 2010 downloaded using VIP Technologies webpage on Aug. 16, 2019 (3 pages).
"Welcome to Easy Hide IP", Website: https://web.archive.org/web/20130702093456/http://www.easy-hide-ip.com:80/ describing Easy Hide IP dated Jun. 26, 2007 downloaded using web archive on Aug. 16, 2019 (2 pages).
"You make it fun; we'll make it run", Website: https://web.archive.org/web/20130726050810/https://www.coralcdn.org describing CoralCDN dated Jan. 25, 2005 downloaded using web archive on Aug. 16, 2019 (2 pages).
"Net Transport", Website: http://www.xi-soft.com/default.htm describing Net Transport Overview dated 2005 downloaded using Net Transport webpage on Aug. 16, 2019 (2 pages).
Net Transport—Develop History, Website: http://www.xi-soft.com/download.htm describing Net Transport Download dated 2005 downloaded using Net Transport webpage on Aug. 16, 2019 (10 pages).
Net Transport FAQ, Website: http://www.xi-soft.com/faq.htm describing Net Transport FAQ dated 2005 downloaded using Net Transport webpage on Aug. 16, 2019 (4 pages).
Net Transport News, Website: http://www.xi-soft.com/news.htm describing Net Transport News dated 2005 downloaded using Net Transport webpage on Aug. 16, 2019 (5 pages).
International Search Report of PCT/US2010/034072 dated Jul. 1, 2010.
Screen captures from YouTube video clip entitle "nVpn.net | Double your Safety and use Socks5 + nVpn" 38 pages, last accessed Nov. 20, 2018 <https://www.youtube.com/watch?v=L0Hct2kSnn4>.
Screen captures from YouTube video clip entitle "Andromeda" 47 pages, publicly known and available as of at least 2011 <https://www.youtube.com/watch?v=yRRYpFLbKNU>.
Screen captures from YouTube video clip entitle "Change Your Country IP Address & Location with Easy Hide IP Software" 9 pages, publicly known and available as of at least 2011, <https://www.youtube.com/watch?v=ulwkf1sOfdA and https://www.youtube.com/watch?v=iFEMT-o9DTc>.
SpyEye, https://www.symantec.com/security-center/writeup/2010-020216-0135-9; http://securesql.info/riskyclouds/spyeye-user-manual; known as of at least 2010.
CoralCDN ("CoralCDN"), https://pdos.csail.mit.edu/6.824/papers/freedman-coral.pdf (14 Pages).
International Search Report issued in PCT Application No. PCT/US2010/051881 dated Dec. 9, 2010.
Supplementary European Search Report issued in EP Application No. 10822724 dated Apr. 24, 2013.
Notice of Preliminary Rejection in KR Application No. 10-2012-7011711 dated Jul. 15, 2016.

(56) References Cited

OTHER PUBLICATIONS

YouTube video clip entitled "nVpn.net | Double your Safety and use Socks5 + nVpn" <https://www.youtube.com/watch?v=L0Hct2kSnn4>.
YouTube video clip entitled "Andromeda" <https://www.youtube.com/watch?v=yRRYpFLbKNU>.
YouTube video clip entitled "Change Your Country IP Address & Location with Easy Hide IP Software" <https://www.youtube.com/watch?v=ulwkf1sOfdA and https://www.youtube.com/watch?v=iFEMT-o9DTC>.
Third-party submission under 37 CFR 1.290 filed on Jul. 23, 2019 and entered in U.S. Appl. No. 16/140,749.
Third-party submission under 37 CFR 1.290 filed on Jul. 23, 2019 and entered in U.S. Appl. No. 16/140,785.
Third-party submission under 37 CFR 1.290 filed on Jul. 23, 2019 and entered in U.S. Appl. No. 16/214,433.
Third-party submission under 37 CFR 1.290 filed on Jul. 23, 2019 and entered in U.S. Appl. No. 16/214,451.
Third-party submission under 37 CFR 1.290 filed on Jul. 23, 2019 and entered in U.S. Appl. No. 16/214,476.
Third-party submission under 37 CFR 1.290 filed on Jul. 23, 2019 and entered in U.S. Appl. No. 16/214,496.
Third-party submission under 37 CFR 1.290 filed on Jul. 23, 2019 and entered in U.S. Appl. No. 16/292,363.
Third-party submission under 37 CFR 1.290 filed on Jul. 22, 2019 and entered in U.S. Appl. No. 16/292,364.
Third-party submission under 37 CFR 1.290 filed on Jul. 23, 2019 and entered in U.S. Appl. No. 16/292,374.
Third-party submission under 37 CFR 1.290 filed on Jul. 23, 2019 and entered in U.S. Appl. No. 16/292,382.
Third-party submission under 37 CFR 1.290 filed on Jul. 25, 2019 and entered in U.S. Appl. No. 16/365,250.
Third-party submission under 37 CFR 1.290 filed on Jul. 25, 2019 and entered in U.S. Appl. No. 16/365,315.
"Slice Embedding Solutions for Distributed Service Architectures"—Esposito et al., Boston University, Feb. 12, 2011 http://www.cs.bu.edu/techreports/pdf/2011-025-slice-embedding.pdf (Year 2011) (16 pages).
Michael K. Reiter and Aviel D. Rubin, "Crowds: Anonymity for Web Transactions", ACM Transactions on Information and System Security, Nov. 1998 (27 pages).
Rennhard, Marc, "MorphMix—A Peer-to-Peer based System for Anonymous Internet Access", 2004 (307 pages).
Ari Luotonen, "Web Proxy Servers," ISBN-10: 0136806120, ISBN-13: 978-0136806127, Prentice Hall; 1st Ed. 1998 (452 pages).
RFC 760, DOD Standard Internet Protocol, Jan. 1980 (46 pages).
RFC 2547, BGP/MPLS VPNs, Mar. 1999 (25 pages).
RFC 1180, A TCP/IP Tutorial, Jan. 1991 (28 pages).
RFC 1122, Requirements for Internet Hosts—Communication Layers, Oct. 1989 (116 pages).
Andrei Popescu, Google, Inc, Geolocation API Specification, W3C Working Draft Dec. 22, 2008 (8 pages).
Andrei Popescu, Google, Inc, Geolocation API Specification, W3C Recommendation Oct. 24, 2013 (10 pages).
Yong Wang, et. al., Towards Street-Level Client-Independent IP Geolocation, 2011 (14 pages).
William R. Stanek, Introducing Microsoft Windows Vista 81, 2006 (9 pages).
IETF RFC 2460 "Internet Protocol, Version 6 (IPv6)", Dec. 1998 (39 pages).
IETF RFC 793 "Protocol Specification", Sep. 1981 (90 pages).
IETF RFC 1349 "Type of Service in the Internet Protocol Suite", Jul. 1992 (28 pages).
IEEE Std 802-2001, IEEE Standard for Local and Metropolitan Area Networks: Overview and Architecture, Feb. 7, 2002 (47 pages).
Scott Lowe, Use Resource Monitor to monitor network performance—TechRepublic, Jul. 29, 2011 (11 pages).
Greg Shultz, Windows Vista's Task Manager: The harder-to-detect changes—TechRepublic, Feb. 21, 2007 (16 pages).
Gavin Gear, Windows 8 Task Manager In-Depth, Jun. 6, 2013 (32 pages).
IETF RFC 2914, "Congestion Control Principles", Sep. 2000 (17 pages).
IETF RFC 4026, "Provider Provisioned Virtual Private Network (VPN) Terminology", Mar. 2005 (20 pages).

* cited by examiner

100

| | 102a | 102b | 102c | 102d | 102e | 102f | 102g | 102h |
|---|---|---|---|---|---|---|---|---|
| 101 | Date - Time | Tunnel IP Address | Geographic Location | ASN | Connection Type | Operating System | BW (Kb/s) | RTT (ms) |
| 101a | 3/5 – 19:35 | 80.12.105.150 | Paris, France | 3215 | VDSL | Chrome 2.0 | 1000 | 30 |
| 101b | 3/5 - 19:38 | 176.94.1.17 | Munich, Germany | 3209 | 3G | iOS 3.0 | 350 | 70 |
| 101c | 5/5 - 00:05 | 162.115.192.24 | Boston, MA, USA | 12079 | DOCSIS | Windows 10 | 2500 | 540 |
| 101d | 11/5 -00:07 | 83.220.232.67 | Moskow, Russia | 16345 | ADSL | Windows 7 | 1400 | 170 |
| 101e | 12/5 - 00:15 | 185.93.228.98 | Riad, Saudi-Arabia | 30148 | WiFi | Android 2.0 | 1200 | 120 |
| 101f | 12/5 - 05:38 | 59.144.192.23 | Mumbai, India | 9498 | 4G/LTE | iOS 4.0 | 2100 | 230 |
| 101g | 12/5 - 22:13 | 200.196.224.89 | San-Paulo, Brazil | 11419 | ADSL | Chrome 3.0 | 800 | 310 |

| | 102a | 102b | 102c | 102d | 102e | 102f | 102g | 102h | 102i |
|---|---|---|---|---|---|---|---|---|---|
| 101 | Date - Time | Tunnel IP Address | Geographic Location | ASN | Connection Type | Operating System | BW (Kb/s) | RTT (ms) | IDLE |
| 101a | 3/5 – 19:35 | 80.12.105.150 | Paris, France | 3215 | VDSL | Chrome 2.0 | 1000 | 30 | Y |
| 101b | 3/5 - 19:38 | 176.94.1.17 | Munich, Germany | 3209 | 3G | iOS 3.0 | 350 | 70 | N |
| 101c | 5/5 - 00:05 | 162.115.192.24 | Boston, MA, USA | 12079 | DOCSIS | Windows 10 | 2500 | 540 | N |
| 101d | 11/5 -00:07 | 83.220.232.67 | Moskow, Russia | 16345 | ADSL | Windows 7 | 1400 | 170 | Y |
| 101e | 12/5 - 00:15 | 185.93.228.98 | Riad, Saudi-Arabia | 30148 | WiFi | Android 2.0 | 1200 | 120 | Y |
| 101f | 12/5 - 05:38 | 59.144.192.23 | Mumbai, India | 9498 | 4G/LTE | iOS 4.0 | 2100 | 230 | N |
| 101g | 12/5 - 22:13 | 200.196.224.89 | San-Paulo, Brazil | 11419 | ADSL | Chrome 3.0 | 800 | 310 | Y |

FIG. 33

SYSTEM AND METHOD FOR IMPROVING CONTENT FETCHING BY SELECTING TUNNEL DEVICES

RELATED APPLICATION

The present application is a continuation application of U.S. patent application Ser. No. 16/938,985, which was filed on Jul. 26, 2020, which is a continuation application of U.S. patent application Ser. No. 16/481,470, which was filed on Jul. 28, 2019 (U.S. Pat. No. 10,880,266) and is a national phase application of a PCT Application No. PCT/IL2018/050910 that was filed on Aug. 16, 2018 and which claims the benefit of U.S. Provisional Application Ser. No. 62/550,834, which was filed on Aug. 28, 2017, from U.S. Provisional Application Ser. No. 62/563,157, which was filed on Sep. 26, 2017, from U.S. Provisional Application Ser. No. 62/624,208, which was filed on Jan. 31, 2018, and from U.S. Provisional Application Ser. No. 62/684,211, which was filed on Jun. 13, 2018, which are all hereby incorporated herein by reference in their entirety.

TECHNICAL FIELD

This disclosure relates generally to an apparatus and method for improving communication over the Internet by using intermediate nodes, and in particular, for fetching content from a web server using tunnel devices as intermediate nodes, which are selected based on criteria, such as an attribute type and related value,

BACKGROUND

Unless otherwise indicated herein, the materials described in this section are not prior art to the claims in this application and are not admitted to be prior art by inclusion in this section.

FIG. 1 shows a block diagram that illustrates a system 10 including a computer system 11 and an associated Internet 113 connection. Such configuration is typically used for computers (hosts) connected to the Internet 113 and executing a server or a client (or a combination) software. The system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), and/or any other handheld or fixed location computing devices, or a combination of any of these devices. Note that while FIG. 1 illustrates various components of a computer system, it is not intended to represent any particular architecture or manner of interconnecting the components; as such details are not germane. It will also be appreciated that network computers, handheld computers, cell phones and other data processing systems which have fewer components or perhaps more components may also be used. The computer system of FIG. 1 may, for example, be an Apple Macintosh computer or Power Book, or an IBM compatible PC. The computer system 11 includes a bus 13, an interconnect, or other communication mechanism for communicating information, and the processor 27, commonly in the form of an integrated circuit, coupled to the bus 13 for processing information and for executing the computer executable instructions. Computer system 11 also includes a main memory 25*a*, such as a Random Access Memory (RAM) or other dynamic storage device, coupled to bus 13 for storing information and instructions to be executed by the processor 27. Main memory 25*a* also may be used for storing temporary variables or other intermediate information during execution of instructions to be executed by processor 27. The computer system 11 further includes a Read Only Memory (ROM) 25*b* (or other non-volatile memory) or other static storage device coupled to the bus 13 for storing static information and instructions for the processor 27. A storage device 25*c*, such as a magnetic disk or optical disk, a hard disk drive (HDD) for reading from and writing to a hard disk, a magnetic disk drive for reading from and writing to a magnetic disk, and/or an optical disk drive (such as DVD) for reading from and writing to a removable optical disk, is coupled to bus 13 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically, the computer system 11 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is used herein to include, but not limited to, any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display 17 allows a user to view, enter, and/or edit information that is relevant to the operation of the system. An input device 18, including alphanumeric and other keys, is coupled to the bus 13 for communicating information and command selections to the processor 27. Another type of user input device is a cursor control 19, such as a mouse, a trackball, or cursor direction keys for communicating direction information and command selections to the processor 27 and for controlling cursor movement on the display 17. This input device typically has two degrees of freedom in two axes, a first axis (e.g., x) and a second axis (e.g., y), that allows the device to specify positions in a plane.

The computer system 11 may be used for implementing the methods and techniques described herein. According to one embodiment, those methods and techniques are performed by the computer system 11 in response to the processor 27 executing one or more sequences of one or more instructions contained in a main memory 25*a*. Such instructions may be read into the main memory 25*a* from another computer-readable medium, such as the storage device 25*c*. Execution of the sequences of instructions contained in the main memory 25*a* causes the processor 27 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") is used herein to include, but not limited to, any medium or any memory, that participates in providing instructions to a processor, (such as the processor 27) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise the bus 13. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 27 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 25*a*, from which the processor 27 retrieves and executes the instructions. The instructions received by the main memory 25*a* may optionally be stored on the storage device 25*c* either before or after execution by the processor 27.

The computer system 11 commonly includes a communication interface 29 coupled to the bus 13. The communication interface 29 provides a two-way data communication coupling to a network link 28 that is connected to a local network 14. For example, the communication interface 29 may be an Integrated Services Digital Network (ISDN) card or a modem to provide a data communication connection to a corresponding type of telephone line. As another non-limiting example, the communication interface 29 may be a local area network (LAN) card to provide a data communication connection to a compatible LAN. For example, Ethernet based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (6/99), "*Internetworking Technologies Handbook*", Chapter 7: "Ethernet Technologies", pages 7-1 to 7-38, which is incorporated in its entirety for all purposes as if fully set forth herein. In such a case, the communication interface 29 typically includes a LAN transceiver or a modem, such as Standard Microsystems Corporation (SMSC) LAN91C111 10/100 Ethernet transceiver, described in a Standard Microsystems Corporation (SMSC) data-sheet "LAN91C111 10/100 *Non-PCI Ethernet Single Chip MAC+PHY*" Data-Sheet, Rev. 15 (Feb. 20, 2004), which is incorporated in its entirety for all purposes as if fully set forth herein.

The Internet 113 is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

An Internet Service Provider (ISP) 12 is an organization that provides services for accessing, using, or participating in the Internet 113. Internet Service Providers may be organized in various forms, such as commercial, community-owned, non-profit, or otherwise privately owned. Internet services typically provided by ISPs include Internet access, Internet transit, domain name registration, web hosting, and colocation. Various ISP Structures are described in Chapter 2: "*Structural Overview of ISP Networks*" of the book entitled: "*Guide to Reliable Internet Services and Applications*", by Robert D. Doverspike, K. K. Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It provides email servers to send, receive, accept, and store email for end users or other organizations. Internet hosting services provide email, web-hosting, or online storage services. Other services include virtual server, cloud services, or physical server operation. A virtual ISP (VISP) is an operation that purchases services from another ISP, sometimes called a wholesale ISP in this context, which allow the VISP's customers to access the Internet using services and infrastructure owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHz, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (IXs), allowing routing of data between each network, without charging one another for the data transmitted—data that would otherwise have passed through a third upstream ISP, incurring charges from the upstream ISP. ISPs requiring no upstream and having only customers (end customers and/or peer ISPs), are referred to as Tier 1 ISPs.

A multitasking is a method where multiple tasks (also known as processes or programs) are performed during the same period of time—they are executed concurrently (in overlapping time periods, new tasks starting before others have ended) instead of sequentially (one completing before the next starts). The tasks share common processing resources, such as a CPU and main memory. Multitasking does not necessarily mean that multiple tasks are executing at exactly the same instant. In other words, multitasking does not imply parallelism, but it does mean that more than one task can be part-way through execution at the same time, and more than one task is advancing over a given period of time.

In the case of a computer with a single CPU, only one task is said to be running at any point in time, meaning that the CPU is actively executing instructions for that task. Multitasking solves the problem by scheduling which task may be the one running at any given time, and when another waiting task gets a turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than there are CPUs.

Operating systems may adopt one of many different scheduling strategies. In multiprogramming systems, the running task keeps running until it performs an operation that requires waiting for an external event (e.g. reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute apparently simultaneously. In real-time systems, some waiting tasks are guaranteed to be given the CPU when an external event occurs. Real time systems are designed to control mechanical devices such as industrial robots, which require timely processing.

The Internet is a global system of interconnected computer networks that use the standardized Internet Protocol Suite (TCP/IP), including the Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet protocol suite (IP) described in RFC 675 and RFC 793, and the entire suite is often referred to as TCP/IP. TCP provides reliable, ordered and error-checked delivery of a stream of octets between programs running on computers connected to a local area network, intranet or the public Internet. It resides at the transport layer. Web browsers typically use TCP when they connect to servers on the World Wide Web, and used to deliver email and transfer files from one location to another. HTTP, HTTPS, SMTP, POP3, IMAP, SSH, FTP, Telnet and a variety of other protocols that are typically encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles actual delivery of the data, TCP keeps track of the individual units of data transmission, called segments, which a message is divided into for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error free as it streams them to an application.

The TCP protocol operations may be divided into three phases. Connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, the Internet socket.

During the duration of a TCP connection, the local end-point undergoes a series of state changes.

Since TCP/IP is based on the client/server model of operation, the TCP connection setup involves the client and server preparing for the connection by performing an OPEN operation. A client process initiates a TCP connection by performing an active OPEN, sending a SYN message to a server. A server process using TCP prepares for an incoming connection request by performing a passive OPEN. Both devices create for each TCP session a data structure used to hold important data related to the connection, called a Transmission Control Block (TCB).

There are two different kinds of OPEN, named 'Active OPEN' and 'Passive OPEN'. In Active OPEN the client process using TCP takes the "active role" and initiates the connection by actually sending a TCP message to start the connection (a SYN message). In Passive OPEN the server process designed to use TCP is contacting TCP and saying: "I am here, and I am waiting for clients that may wish to talk to me to send me a message on the following port number". The OPEN is called passive because aside from indicating that the process is listening, the server process does nothing. A passive OPEN can in fact specify that the server is waiting for an active OPEN from a specific client, though not all TCP/IP APIs support this capability. More commonly, a server process is willing to accept connections from all corners. Such a passive OPEN is said to be unspecified.

In passive OPEN, the TCP uses a three-way handshake, and before a client attempts to connect with a server, the server must first bind to and listen at a port to open it up for connections. Once the Passive OPEN is established, a client may initiate an Active OPEN. To establish a connection, the three-way (or 3-step) handshake occurs:

1. SYN: The active open is performed by the client sending a SYN to the server. The client sets the segment's sequence number to a random value A.
2. SYN-ACK: In response, the server replies with a SYN-ACK. The acknowledgment number is set to one more than the received sequence number, i.e. A+1, and the sequence number that the server chooses for the packet is another random number, B.
3. ACK: Finally, the client sends an ACK back to the server. The sequence number is set to the received acknowledgement value, i.e. A+1, and the acknowledgement number is set to one more than the received sequence number i.e. B+1.

At this point, both the client and server have received an acknowledgment of the connection. The steps 1, 2 establish the connection parameter (sequence number) for one direction and it is acknowledged. The steps 2, 3 establish the connection parameter (sequence number) for the other direction and it is acknowledged, and then a full-duplex communication is established.

TCP keepalive. When two hosts are connected over a network via TCP/IP, TCP Keepalive Packets can be used to determine if the connection is still valid, and terminate it if needed. Most hosts that support TCP also support TCP Keepalive, where each host (or peer) periodically sends a TCP packet to its peer which solicits a response. The TCP keepalive scheme involves using timers when setting up a TCP connection, and when the keepalive timer reaches zero, a keepalive probe packet is sent with no data in it and the ACK flag turned on. This procedure is useful because if the other peers lose their connection (for example by rebooting) the broken connection is noticed, even no traffic on it is exchanged. If the keepalive probe is not replied to, the connection cannot be considered valid anymore. The TCP keepalive mechanism may be used to prevent inactivity from disconnecting the channel. For example, when being behind a NAT proxy or a firewall, a host may be disconnected without a reason. This behavior is caused by the connection tracking procedures implemented in proxies and firewalls, which keep track of all connections that pass through them. Due to the physical limits of these machines, they can only keep a finite number of connections in their memory. The most common and logical policy is to keep newest connections and to discard old and inactive connections first.

A keepalive signal is often sent at predefined intervals, and plays an important role on the Internet. After a signal is sent, if no reply is received the link is assumed to be down and future data will be routed via another path until the link is up again. A keepalive signal can also be used to indicate to Internet infrastructure that the connection should be preserved. Without a keepalive signal, intermediate NAT-enabled routers can drop the connection after timeout. Since the only purpose is to find links that don't work or to indicate connections that should be preserved, keepalive messages tend to be short and not take much bandwidth.

Transmission Control Protocol (TCP) keepalives are an optional feature, and if included must default to off. The keepalive packet contains null data, and in an Ethernet network, a keepalive frame length is 60 bytes, while the server response to this, also a null data frame, is 54 bytes. There are three parameters related to keepalive: Keepalive time is the duration between two keepalive transmissions in idle condition where TCP keepalive period is required to be configurable and by default is set to no less than 2 hours, Keepalive interval is the duration between two successive keepalive retransmissions, if acknowledgement to the previous keepalive transmission is not received, and Keepalive retry is the number of retransmissions to be carried out before declaring that remote end is not available.

The Internet Protocol (IP) is the principal communications protocol used for relaying datagrams (packets) across a network using the Internet Protocol Suite. Responsible for routing packets across network boundaries, it is the primary protocol that establishes the Internet. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3\times10^9$ addresses), while IPv6 uses 128-bit addresses (providing 340 undecillion or $3.4\times10^{38}$ addresses), as described in RFC 2460.

An overview of an IP-based packet 15 is shown in FIG. 2*a*. The packet may be generally segmented into the IP data 16*b* to be carried as payload, and the IP header 16*f*. The IP header 16*f* contains the IP address of the source as Source IP Address field 16*d* and the Destination IP Address field 16*c*. In most cases, the IP header 16*f* and the payload 16*b* are further encapsulated by adding a Frame Header 16*e* and Frame Footer 16*a* used by higher layer protocols.

The Internet Protocol is responsible for addressing hosts and routing datagrams (packets) from a source host to the destination host across one or more IP networks. For this purpose the Internet Protocol defines an addressing system that has two functions. Addresses identify hosts and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (7/99) entitled: "*Internetworking Technologies Handbook*", which are all incorporated in their entirety for all purposes as if fully set forth herein: Chapter 5*: "Routing Basics*" (pages 5-1 to 5-10), Chapter 30*: "Internet Protocols*" (pages 30-1 to 30-16), Chapter 32*: "IPv6*" (pages 32-1 to 32-6), Chapter 45*: "OSI Routing*" (pages 45-1 to 45-8) and Chapter 51*: "Security*" (pages 51-1 to 51-12), as well as in a IBM Corporation, International Technical Support Organization Redbook Documents No. GG24-4756-00, entitled: "*Local area Network Concepts and Products: LAN Operation Systems and management*", 1st Edition May 1996, Redbook Document No. GG24-4338-00, entitled: "*Introduction to Networking Technologies",* 1st Edition April 1994, Redbook Document No. GG24-2580-01 *"IP Network Design Guide",* 2nd Edition June 1999, and Redbook Document No. GG24-3376-07 *"TCP/IP Tutorial and Technical Overview*", ISBN 0738494682 8th Edition December 2006, which are incorporated in their entirety for all purposes as if fully set forth herein.

An Internet packet typically includes a value of Time-to-Live (TTL) for avoiding the case of packet looping endlessly. The initial TTL value is set in the header of the packet, and each router in the packet path subtracts one from the TTL field, and the packet is discarded upon the value exhaustion. Since the packets may be routed via different and disparately located routers and servers, the TTL of the packets reaching the ultimate destination computer are expected to vary.

The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

Web page. A web-page is typically a collection of information, consisting of one or more resources, intended to be rendered simultaneously, and identified by a single Uniform Resource Identifier. More specifically, a web page may consist of a resource with zero, one, or more embedded resources intended to be rendered as a single unit, and referred to by the URI of the one resource which is not embedded. A Uniform Resource Identifier (URI) is intended to be recognized by a user as representing the identity of a specific Web Page (resource). A resource may include a network data object or service that can be identified by a URI. Resources may be available in multiple representations (e.g. multiple languages, data formats, size, resolution) or vary in other ways. The URI specification defines a Uniform Resource Identifier (URI) or URL (Uniform Resource Locator) as a compact string of characters for identifying an abstract or physical resource.

HTTP. The Hypertext Transfer Protocol (HTTP) is an application protocol for distributed, collaborative, hypermedia information systems, commonly used for communication over the Internet. Hypertext is. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230-HTTP/1.1: Message Syntax and Routing, RFC 7231-HTTP/1.1: Semantics and Content, RFC 7232-HTTP/1.1: Conditional Requests, RFC 7233-HTTP/1.1: Range Requests, RFC 7234-HTTP/1.1: Caching, and RFC 7235-HTTP/1.1: Authentication. HTTP functions as a request-response protocol in the client-server computing model. A web browser, for example, may be the client and an application running on a computer hosting a website may be the server. The client submits an HTTP request message to the server. The server, which provide resources such as HTML files and other content, or performs other functions on behalf of the client, returns a response message to the client. The response contains completion status information about the request and may also contain requested content in its message body. A web browser is an example of a user agent (UA). Other types of user agent include the indexing software used by search providers (web crawlers), voice browsers, mobile apps and other software that accesses, consumes or displays web content.

HTTP is designed to permit intermediate network elements to improve or enable communications between clients and servers. High-traffic websites often benefit from web cache servers that deliver content on behalf of upstream servers to improve response time. Web browsers cache previously accessed web resources and reuse them when possible, to reduce network traffic. HTTP proxy servers at private network boundaries can facilitate communication for clients without a globally routable address, by relaying messages with external servers. HTTP is an application layer protocol designed within the framework of the Internet Protocol Suite. Its definition presumes an underlying and reliable transport layer protocol, and Transmission Control Protocol (TCP) is commonly used. However, HTTP can use unreliable protocols such as the User Datagram Protocol (UDP), for example, in the Simple Service Discovery Protocol (SSDP). HTTP resources are identified and located on the network by Uniform Resource Identifiers (URIs) or, more specifically, Uniform Resource Locators (URLs), using the http or https URI schemes. URIs and hyperlinks in Hypertext Markup Language (HTML) documents form webs of inter-linked hypertext documents. An HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line, such as "HTTP/1.1 200 OK", and a message of its own. The body of this message is typically the requested resource, although an error message or other information may also be returned. HTTP is a stateless protocol. A stateless protocol does not require the HTTP server to retain information or status HTTP persistent connection, also called HTTP keep-alive, or HTTP connection reuse, refers to using a single TCP connection to send and receive multiple HTTP requests/responses, as opposed to opening a new connection for every single request/response pair. Persistent connections provide a mechanism by which a client and a server can signal the close of a TCP connection. This signaling takes place using the Connection header field. The HTTP persistent connection is described in IETF RFC 2616, entitled: "*Hypertext Transfer Protocol—HTTP/*1.1". In HTTP 1.1, all connections are considered persistent unless declared otherwise. The HTTP persistent connections do not use separate keepalive messages, but they allow multiple requests to use a single connection. The advantages of using persistent connections involve lower CPU and memory usage (because fewer connections are open simultaneously), enabling HTTP pipelining of requests and responses, reduced network congestion (due to fewer TCP connections), and reduced latency in subsequent requests (due to minimal handshaking). Any connection herein may use, or be based on, an HTTP persistent connection.

HTTPS. HTTPS (also referred to as HTTP over Transport Layer Security (TLS), HTTP over SSL, and HTTP Secure) is a communications protocol for secure communication over a computer network which is widely used on the Internet. HTTPS consists of communication over Hypertext Transfer Protocol (HTTP) within a connection encrypted by Transport Layer Security, or its predecessor, Secure Sockets Layer. The main motivation for HTTPS is authentication of the visited website and protection of the privacy and integrity of the exchanged data. HTTPS typically provides authentication of the website and associated web server with which one is communicating, which protects against man-in-the-middle attacks. Additionally, it provides bidirectional encryption of communications between a client and server, which protects against eavesdropping and tampering with or forging the contents of the communication. In practice, this provides a reasonable guarantee that one is communicating with precisely the website that one intended to communicate with (as opposed to an impostor), as well as ensuring that the contents of communications between the user and site cannot be read or forged by any third party.

The HTTPS Uniform Resource Identifier (URI) scheme has identical syntax to the standard HTTP scheme, aside from its scheme token. However, HTTPS signals the browser to use an added encryption layer of SSL/TLS to protect the traffic. SSL/TLS is especially suited for HTTP, since it can provide some protection even if only one side of the communication is authenticated. This is the case with HTTP transactions over the Internet, where typically only the server is authenticated (by the client examining the server's certificate). HTTPS creates a secure channel over an insecure networks, hence ensuring reasonable protection from eavesdroppers and man-in-the-middle attacks, provided that adequate cipher suites are used and that the server certificate is verified and trusted. Because HTTPS piggy-backs HTTP entirely on top of TLS, the entirety of the underlying HTTP protocol can be encrypted. This includes the request URL (which particular web page was requested), query parameters, headers, and cookies (which often contain identity information about the user). However, because host (website) addresses and port numbers are necessarily part of the underlying TCP/IP protocols, HTTPS cannot protect their disclosure. In practice this means that even on a correctly configured web server, eavesdroppers can infer the IP address and port number of the web server (sometimes even the domain name e.g., www.example.org, but not the rest of the URL) that one is communicating with, as well as the amount (data transferred) and duration (length of session) of the communication, though not the content of the communication.

Deploying HTTPS also allows the use of HTTP/2 (or its predecessor, the now-deprecated protocol SPDY), that are new generations of HTTP, designed to reduce page load times and latency. HTTP Strict Transport Security (HSTS) is typically used with HTTPS to protect users from man-in-the-middle attacks, especially SSL stripping. While HTTPS URLs begin with "https://" and use port 443 by default, or alternatively 8443, the HTTP URLs begin with "http://" and use port 80 by default, and HTTP is not encrypted and is thus vulnerable to man-in-the-middle and eavesdropping attacks, which can let attackers gain access to website accounts and sensitive information, and modify webpages to inject malware or advertisements. HTTPS is designed to withstand such attacks and is considered secure against them (with the exception of older, deprecated versions of SSL).

ASN. Within the Internet, an Autonomous System (AS) is a collection of connected Internet Protocol (IP) routing prefixes under the control of one or more network operators on behalf of a single administrative entity or domain that presents a common, clearly defined routing policy to the Internet. Autonomous System (AS) Numbers (ASNs) are used by various routing protocols, and IANA allocates AS Numbers to Regional Internet Registries (RIRs). The RIRs further allocate or assign AS Numbers to network operators in line with RIR policies. Originally the definition required control by a single entity, typically an Internet Service Provider (ISP) or a very large organization with independent connections to multiple networks, that adhere to a single and clearly defined routing policy, as originally defined in RFC 1771. The newer definition in RFC 1930 came into use to support multiple organizations that run Border Gateway Protocol (BGP) using private AS numbers to an ISP that connects all those organizations to the Internet. Even though there may be multiple autonomous systems supported by the ISP, the Internet only sees the routing policy of the ISP. That ISP must have an officially registered Autonomous System Number (ASN). A unique ASN is allocated to each AS for use in BGP routing, and an ASN uniquely identifies each network on the Internet. ASN representation is described in IETF 5396 dated December 2008 and entitled: "Textual Representation of Autonomous System (AS) Numbers", and four octets ASKs are described in IETF RFC 6793 dated December 2012 entitled: "*BGP Support for Four-Octet Autonomous System* (*AS*) *Number Space*".

Autonomous systems can be grouped into four categories, depending on their connectivity and operating policy. A multihomed autonomous system is an AS that maintains connections to more than one other AS. This allows the AS to remain connected to the Internet in the event of a complete failure of one of their connections. However, unlike a transit AS, this type of AS would not allow traffic from one AS to pass through on its way to another AS. A stub autonomous system refers to an AS that is connected to only one other AS. This may be an apparent waste of an AS number if the network's routing policy is the same as its upstream AS's. However, the stub AS may, in fact, have peering with other autonomous systems that is not reflected in public route-view servers. Specific examples include private interconnections in the financial and transportation sectors. A transit autonomous system is an AS that provides connections through itself to other networks. That is, network A can use network B, the transit AS, to connect to network C. If one AS is an ISP for another, then the former is a transit AS. An Internet Exchange Point autonomous system (IX or IXP) is a physical infrastructure through which Internet service providers (ISPs) or content delivery networks (CDNs) exchange Internet traffic between their networks (autonomous systems).

An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

A server device (in server/client architecture) typically offers information resources, services, and applications to clients, and is using a server dedicated or oriented operating system. Current popular server operating systems are based on Microsoft Windows (by Microsoft Corporation, headquartered in Redmond, Washington, U.S.A.), Unix, and Linux-based solutions, such as the 'Windows Server 2012' server operating system is part of the Microsoft 'Windows Server' OS family, that was released by Microsoft on 2012, providing enterprise-class datacenter and hybrid cloud solutions that are simple to deploy, cost-effective, application-focused, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix operating systems are widely used in servers. Unix is a multitasking, multiuser computer operating system that exists in many variants, and is characterized by a modular design that is sometimes called the "Unix philosophy," meaning the OS provides a set of simple tools that each perform a limited, well-defined function, with a unified filesystem as the main means of communication, and a shell scripting and command language to combine the tools to perform complex workflows. Unix was designed to be portable, multi-tasking and multi-user in a time-sharing configuration, and Unix systems are characterized by various concepts: the use of plain text for storing data; a hierarchical file system; treating devices and certain types of Inter-Process Communication (IPC) as files; and the use of a large number of software tools, small programs that can be strung together through a command line interpreter using pipes, as opposed to using a single monolithic program that includes all of the same functionality. Under Unix, the operating system consists of many utilities along with the master control program, the kernel. The kernel provides services to start and stop programs, handles the file system and other common "low level" tasks that most programs share, and schedules access to avoid conflicts when programs try to access the same resource or device simultaneously. To mediate such access, the kernel has special rights, reflected in the division between user-space and kernel-space. Unix is described in a publication entitled: "UNIX Tutorial" by tutorialspoint.com, downloaded on July 2014, which is incorporated in its entirety for all purposes as if fully set forth herein.

A client device (in server/client architecture) typically receives information resources, services, and applications from servers, and is using a client dedicated or oriented operating system. Current popular server operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "Windows Internals—Part 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE*" published 2011, which is incorporated in its entirety for all purposes as if fully set forth herein.

RTOS. A Real-Time Operating System (RTOS) is an Operating System (OS) intended to serve real-time applications that process data as it comes in, typically without buffer delays. Processing time requirements (including any OS delay) are typically measured in tenths of seconds or shorter increments of time, and is a time bound system which has well defined fixed time constraints. Processing is commonly to be done within the defined constraints, or the system will fail. They either are event driven or time sharing, where event driven systems switch between tasks based on their priorities while time sharing systems switch the task based on clock interrupts. A key characteristic of an RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. An RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where task are switched on a regular clocked interrupt, and on events; called round robin. Time sharing designs switch tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an Application Note No. RES05B00008-0100/Rec. 1.00 published January 2010 by Renesas Technology Corp. entitled: "*R8C Family—General RTOS Concepts*", in JAJA Technologfy Review article published February 2007 [1535-5535/$32.00] by The Association for Laboratory Automation [doi:10.1016/j.jala.2006.10.016] entitled: "*An Overview of Real-Time Operating Systems*", and in Chapter 2 entitled: "*Basic Concepts of Real Time Operating Systems*" of a book published 2009 [ISBN—978-1-4020-9435-4] by Springer Science+Business Media B.V. entitled: "*Hardware-Dependent Software—Principles and Practice*", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is 1/1000 of a second to 1/100 of a second, via an interrupt from a hardware timer, but this interval is often changed to suit a particular application. FreeRTOS™ is described in a paper by Nicolas Melot (downloaded 7/2015) entitled: "*Study of an operating system: FreeRTOS—Operating systems for embedded devices*", in a paper (dated Sep. 23, 2013) by Dr. Richard Wall entitled: "*Carebot PIC32 MX7ck implementation of Free RTOS*", FreeRTOS™ modules are described in web pages entitled: "*FreeRTOS™ Modules*" published in the www.freertos.org web-site dated 26 Nov. 2006, and FreeRTOS kernel is described in a paper published 1 Apr. 2007 by Rich Goyette of Carleton University as part of 'SYSC5701: Operating System Methods for Real-Time Applications', entitled: "*An Analysis and Description of the Inner Workings of the FreeRTOS Kernel*", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weakness with respect to user misuse and hardware failure within the functional model and API were identified and resolved. Both SafeRTOS and FreeRTOS share the same scheduling algorithm, have similar APIs, and are otherwise very similar, but they were developed with differing objectives. SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

VxWorks. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. VxWorks supports Intel architecture, POWER architecture, and ARM architectures. The VxWorks may be used in multicore asymmetric multiprocessing (AMP), symmetric multiprocessing (SMP), and mixed modes and multi-OS (via Type 1 hypervisor) designs on 32- and 64-bit processors. VxWorks comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

μC/OS. Micro-Controller Operating Systems (MicroC/OS, stylized as μC/OS) is a real-time operating system (RTOS) that is a priority-based preemptive real-time kernel for microprocessors, written mostly in the programming language C, and is intended for use in embedded systems. MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touchscreens, web browsers that can access, and properly display, standard web pages rather than just mobile-optimized sites, GPS navigation, Wi-Fi, and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, California, U.S.A. and described in iPhone 6 technical specification (retrieved 10/2015 from www.apple.com/iphone-6/specs/), and in a User Guide dated 2015 (019-00155/2015-06) by Apple Inc. entitled: "*iPhone User Guide For iOS* 8.4 *Software*", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), 3/2015 (Rev. 1.0) entitled: "*SM-G925FQ SM-G9251 User Manual*" and having features and specification described in "*Galaxy S6 Edge—Technical Specification*" (retrieved 10/2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or other mobile device. Modern mobile operating systems combine the features of a personal computer operating system with other features, including a touchscreen, cellular, Bluetooth, Wi-Fi, GPS mobile navigation, camera, video camera, speech recognition, voice recorder, music player, near field communication and infrared blaster. Currently popular mobile OS are Android, Symbian, Apple iOS, BlackBerry, MeeGo, Windows Phone, and Bada. Mobile devices with mobile communications capabilities (e.g. smartphones) typically contain two mobile operating systems—the main user-facing software platform is supplemented by a second low-level proprietary real-time operating system which operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example adjusting the screen from portrait to landscape depending on how the device is oriented, or allowing the user to steer a vehicle in a racing game by rotating the device, simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS is described in the publication entitled: "*IOS Tutorial*", downloaded from tutorialspoint-.com on July 2014, which is incorporated in its entirety for all purposes as if fully set forth herein.

Operating systems: An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Process management: The operating system provides an interface between an application program and the computer hardware, so that an application program can interact with the hardware only by obeying rules and procedures programmed into the operating system. The operating system is also a set of services which simplify development and execution of application programs. Executing an application program involves the creation of a process by the operating system kernel which assigns memory space and other resources, establishes a priority for the process in multi-tasking systems, loads program binary code into memory, and initiates execution of the application program which then interacts with the user and with hardware devices. The OS must allocate resources to processes, enable processes to share and exchange information, protect the resources of each process from other processes, and enable synchronization among processes. The OS maintains a data structure for each process, which describes the state and resource ownership of that process and enables the OS to exert control over each process.

In many modern operating systems, there can be more than one instance of a program loaded in memory at the same time; for example, more than one user could be executing the same program, each user having separate copies of the program loaded into memory. With some programs, known as re-entrant type, it is possible to have one copy loaded into memory, while several users have shared access to it so that they each can execute the same program-code. The processor at any instant can only be executing one instruction from one program but several processes can be sustained over a period of time by assigning each process to the processor at intervals while the remainder becomes temporarily inactive. A number of processes being executed over a period of time instead of at the same time is called concurrent execution. A multiprogramming or multitasking OS is a system executing many processes concurrently. A multiprogramming requires that the processor be allocated to each process for a period of time, and de-allocated at an appropriate moment. If the processor is de-allocated during the execution of a process, it must be done in such a way that it can be restarted later as easily as possible.

There are two typical ways for an OS to regain control of the processor during a program's execution in order for the OS to perform de-allocation or allocation: The process issues a system call (sometimes called a software interrupt); for example, an I/O request occurs requesting to access a file on hard disk. Alternatively, a hardware interrupt occurs; for example, a key was pressed on the keyboard, or a timer runs out (used in pre-emptive multitasking). The stopping of one process and starting (or restarting) of another process is called a context switch or context change. In many modern operating systems, processes can consist of many sub-processes. This introduces the concept of a thread. A thread may be viewed as a sub-process; that is, a separate, independent sequence of execution within the code of one process. Threads are becoming increasingly important in the design of distributed and client-server systems and in software run on multi-processor systems.

Modes: Many contemporary processors incorporate a mode bit to define the execution capability of a program in the processor. This bit can be set to a kernel mode or a user mode. A kernel mode is also commonly referred to as supervisor mode, monitor mode or ring 0. In kernel mode, the processor can execute every instruction in its hardware repertoire, whereas in user mode, it can only execute a subset of the instructions. Instructions that can be executed only in kernel mode are called kernel, privileged or protected instructions to distinguish them from the user mode instructions. For example, I/O instructions are privileged. So, if an application program executes in user mode, it cannot perform its own I/O, and must request the OS to perform I/O on its behalf. The system may logically extend the mode bit to define areas of memory to be used when the processor is in kernel mode versus user mode. If the mode bit is set to kernel mode, the process executing in the processor can access either the kernel or user partition of the memory. However, if user mode is set, the process can reference only the user memory space, hence two classes of memory are defined, the user space and the system space (or kernel, supervisor or protected space). In general, the mode bit extends the operating system's protection rights, and is set by the user mode trap instruction, also called a supervisor call instruction. This instruction sets the mode bit, and branches to a fixed location in the system space. Since only the system code is loaded in the system space, only the system code can be invoked via a trap. When the OS has completed the supervisor call, it resets the mode bit to user mode prior to the return.

Computer operating systems provide different levels of access to resources, and these hierarchical protection domains are often referred to as 'protection rings', and are used to protect data and functionality from faults (by improving fault tolerance) and malicious behaviour (by providing computer security). A protection ring is one of two or more hierarchical levels or layers of privilege within the architecture of a computer system. These levels may be hardware-enforced by some CPU architectures that provide different CPU modes at the hardware or microcode level. Rings are arranged in a hierarchy from most privileged (most trusted, usually numbered zero) to least privileged (least trusted, usually with the highest ring number). On most operating systems, kernel mode or 'Ring 0' is the level with the most privileges and interacts most directly with the physical hardware such as the CPU and memory. Special gates between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, spyware running as a user program in Ring 3 should be prevented from turning on a web camera without informing the user, since hardware access should be a Ring 1 function reserved for device drivers. Programs such as web browsers running in higher numbered rings must request access to the network, a resource restricted to a lower numbered ring.

Kernel: With the aid of the firmware and device drivers, the kernel provides the most basic level of control over all of the computer's hardware devices. It manages memory access for programs in the RAM, it determines which programs get access to which hardware resources, it sets up or resets the CPU's operating states for optimal operation at all times, and it organizes the data for long-term non-volatile storage with file systems on such media as disks, tapes, flash memory, etc. The part of the system executing in kernel supervisor state is called the kernel, or nucleus, of the operating system. The kernel operates as trusted software, meaning that when it was designed and implemented, it was intended to implement protection mechanisms that could not be covertly changed through the actions of untrusted software executing in user space. Extensions to the OS execute in user mode, so the OS does not rely on the correctness of those parts of the system software for correct operation of the OS. Hence, a fundamental design decision for any function to be incorporated into the OS is whether it needs to be implemented in the kernel. If it is implemented in the kernel, it will execute in kernel (supervisor) space, and have access to other parts of the kernel. It will also be trusted software by the other parts of the kernel. If the function is implemented to execute in user mode, it will have no access to kernel data structures.

There are two techniques by which a program executing in user mode can request the kernel's services, namely 'System call' and 'Message passing'. Operating systems are typically with one or the other of these two facilities, but commonly not both. Assuming that a user process wishes to invoke a particular target system function, in the system call approach, the user process uses the trap instruction, so the system call should appear to be an ordinary procedure call to the application program; the OS provides a library of user functions with names corresponding to each actual system call. Each of these stub functions contains a trap to the OS function, and when the application program calls the stub, it executes the trap instruction, which switches the CPU to kernel mode, and then branches (indirectly through an OS table), to the entry point of the function which is to be invoked. When the function completes, it switches the processor to user mode and then returns control to the user process; thus simulating a normal procedure return. In the message passing approach, the user process constructs a message, that describes the desired service, and then it uses a trusted send function to pass the message to a trusted OS process. The send function serves the same purpose as the trap; that is, it carefully checks the message, switches the processor to kernel mode, and then delivers the message to a process that implements the target functions. Meanwhile, the user process waits for the result of the service request with a message receive operation. When the OS process completes the operation, it sends a message back to the user process.

Interrupts handling: Interrupts are central to operating systems, as they provide an efficient way for the operating system to interact with and react to its environment. Interrupts are typically handled by the operating system's kernel, and provide a computer with a way of automatically saving local register contexts, and running specific code in response to events. When an interrupt is received, the computer's hardware automatically suspends whatever program is currently running, saves its status, and runs computer code previously associated with the interrupt. When a hardware device triggers an interrupt, the operating system's kernel decides how to deal with this event, generally by running some processing code. The amount of code being run depends on the priority of the interrupt, and the processing of hardware interrupts is executed by a device driver, which may be either part of the operating system's kernel, part of another program, or both. Device drivers may then relay information to a running program by various means. A program may also trigger an interrupt to the operating system. For example, if a program wishes to access a hardware (such as a peripheral), it may interrupt the operating system's kernel, which causes control to be passed back to the kernel. The kernel will then process the request. If a program wishes additional resources (or wishes to shed resources) such as memory, it will trigger an interrupt to get the kernel's attention. Each interrupt has its own interrupt handler. The number of hardware interrupts is limited by the number of interrupt request (IRQ) lines to the processor, but there may be hundreds of different software interrupts. Interrupts are a commonly used technique for computer multitasking, especially in real-time computing systems, which are commonly referred to as interrupt-driven systems.

Memory management: A multiprogramming operating system kernel is responsible for managing all system memory which is currently in use by programs, ensuring that a program does not interfere with memory already in use by another program. Since programs time share, each program must have independent access to memory. Memory protection enables the kernel to limit a process' access to the computer's memory. Various methods of memory protection exist, including memory segmentation and paging. In both segmentation and paging, certain protected mode registers specify to the CPU what memory address it should allow a running program to access. Attempts to access other addresses will trigger an interrupt which will cause the CPU to re-enter supervisor mode, placing the kernel in charge. This is called a segmentation violation (or Seg-V), and the kernel will generally resort to terminating the offending program, and will report the error.

Memory management further provides ways to dynamically allocate portions of memory to programs at their request, and free it for reuse when no longer needed. This is critical for any advanced computer system where more than a single process might be underway at any time. Several methods have been devised that increase the effectiveness of memory management. Virtual memory systems separate the memory addresses used by a process from actual physical addresses, allowing separation of processes and increasing the effectively available amount of RAM using paging or swapping to secondary storage. The quality of the virtual memory manager can have an extensive effect on overall system performance.

File system: Commonly a file system (or filesystem) is used to control how data is stored and retrieved. By separating the data into individual pieces, and giving each piece a name, the information is easily separated and identified, where each piece of data is called a "file". The structure and logic rules used to manage the groups of information and their names is called a "file system". There are many different kinds of file systems. Each one has a different structure and logic, properties of speed, flexibility, security, size and more. Some file systems have been designed to be used for specific applications. For example, the ISO 9660 file system is designed specifically for optical discs. File systems can be used on many different kinds of storage devices. Some file systems are used on local data storage devices; others provide file access via a network protocol (for example, NFS, SMB, or 9P clients). Some file systems are "virtual", in that the "files" supplied are computed on request (e.g. procfs) or are merely a mapping into a different file system used as a backing store. The file system manages access to both the content of files and the metadata about those files. It is responsible for arranging storage space; reliability, efficiency, and tuning with regard to the physical storage medium are important design considerations.

A disk file system takes advantages of the ability of disk storage media to randomly address data in a short amount of time. Additional considerations include the speed of accessing data following that initially requested and the anticipation that the following data may also be requested. This permits multiple users (or processes) access to various data on the disk without regard to the sequential location of the data. Examples include FAT (FAT12, FAT16, FAT32), exFAT, NTFS, HFS and HFS+, HPFS, UFS, ext2, ext3, ext4, XFS, btrfs, ISO 9660, Files-11, Veritas File System, VMFS, ZFS, ReiserFS and UDF. Some disk file systems are journaling file systems or versioning file systems.

TMPFS. TMPFS (or tmpfs) is a common name for a temporary file storage facility on many Unix-like operating systems. While intended to appear as a mounted file system, it is stored in volatile memory instead of a non-volatile storage device. A similar construction is a RAM disk, which appears as a virtual disk drive and hosts a disk file system. The tmpfs is typically a file system based on SunOS virtual memory resources, which does not use traditional non-volatile media to store file data; instead, tmpfs files exist solely in virtual memory maintained by the UNIX kernel. Because tmpfs file systems do not use dedicated physical memory for file data, but instead use VM system resources and facilities, they can take advantage of kernel resource management policies. Tmpfs is designed primarily as a performance enhancement to allow short-lived files to be written and accessed without generating disk or network I/O. Tmpfs maximizes file manipulation speed while preserving UNIX file semantics. It does not require dedicated disk space for files and has no negative performance impact. The tmpfs is described in a Sun Microsystem Inc. paper entitled: "*tmpfs: A Virtual Memory File System*" by Peter Snyder, downloaded on 7/2014, which is incorporated in its entirety for all purposes as if fully set forth herein.

Device drivers: A device driver is a specific type of computer software developed to allow interaction with hardware devices. Typically, this constitutes an interface for communicating with the device, through the specific computer bus or communications subsystem that the hardware is connected to, providing commands to and/or receiving data from the device, and on the other end, the requisite interfaces to the operating system and software applications. It is a specialized hardware-dependent computer program which is also operating system specific that enables another program, typically an operating system or applications software package or computer program running under the operating system kernel, to interact transparently with a hardware device, and usually provides the requisite interrupt handling necessary for any necessary asynchronous time-dependent hardware interfacing needs.

Networking: Most operating systems support a variety of networking protocols, hardware, and applications for using them, allowing computers running dissimilar operating systems to participate in a common network, for sharing resources such as computing, files, printers, and scanners, using either wired or wireless connections. Networking can essentially allow a computer's operating system to access the resources of a remote computer, to support the same functions as it could if those resources were connected directly to the local computer. This includes everything from simple communication, to using networked file systems, or sharing another computer's graphics or sound hardware. Some network services allow the resources of a computer to be accessed transparently, such as SSH, which allows networked users direct access to a computer's command line interface. A client/server networking allows a program on a computer, called a client, to connect via a network to another computer, called a server. Servers offer (or host) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

Input/Output (I/O) handling: An input/output (or I/O) is the communication between an information processing system (such as a computer) and the outside world, possibly a human or other information processing system. The inputs are typically the signals or data received by the system, and the outputs are the signals or data sent from it. I/O devices may be used by a person (or other system) to communicate with a computer. For instance, a keyboard or a mouse may be an input device for a computer, while monitors and printers are considered output devices for a computer. Devices for communication between computers, such as modems and network cards, typically serve for both input and output.

User interface: Every computer that is to be operated by a human being requires a user interface, usually referred to as a 'shell', and is essential if human interaction is to be supported. The user interface views the directory structure and requests services from the operating system that will acquire data from input hardware devices, such as a keyboard, mouse or credit card reader, and requests operating system services to display prompts, status messages and such on output hardware devices, such as a video monitor or printer. The two most common forms of a user interface have historically been the command-line interface, where computer commands are typed out line-by-line, and the Graphical User Interface (GUI), where a visual environment (most commonly a WIMP) is present. Typically the GUI is integrated into the kernel, allowing the GUI to be more responsive by reducing the number of context switches required for the GUI to perform its output functions.

WDM. The Windows Driver Model (WDM), also known as the Win32 Driver Model, is a standard model defining a framework for device drivers specified by Microsoft, providing unified driver models. The WDM model is based on WDM drivers that are layered in a complex hierarchy and communicate with each other via I/O Request Packets (IRPs). The WDM was introduced with Windows 98 and Windows 2000 to replace VxD which was used on older versions of Windows such as Windows 95 and Windows 3.1, as well as the Windows NT Driver Model, and WDM drivers are usable on all of Microsoft's operating systems of Windows 95 and later. The WDM is described in the publication entitled: "*Microsoft Windows Driver Model* (*WDM*)", by Mohamad (Hani) Atassy, submitted to Dr. Dennis R. Hafermann dated Jan. 28, 2002, and in publication entitled: "*A Comparison of the Linux and Windows Device Driver Architecture*", by Melekam Tsegaye and Richard Foss, both from Rhodes University, South-Africa, downloaded from the Internet on 7/2014, both are incorporated in their entirety for all purposes as if fully set forth herein.

A general schematic view of the WDM architecture 930 is shown on FIG. 3. In the example shown, three applications designated as application #1 931*a*, application #2 931*b*, and application #3 931*c*, are accessing three peripheral hardware devices, designated as peripheral #1 939*a*, peripheral #2 939*b*, and peripheral #3 939*c*. The model involves three layers. The lower layer is the hardware layer 930*c*, which includes the hardware devices and peripherals, accessed by a processor (such as a processor 27) via a hardware bus 930*d*, which may correspond to an internal bus 13 shown in FIG. 1. The highest layer is a 'user space' layer 930*a*, corresponding to the user mode and to the higher 'ring' layers such as Ring 3, and is relating to the space is the memory area where application software and some drivers execute. The kernel of the operating system provides the services as part of a 'kernel space' layer 930*b*, serving as an intermediate layer between the user space layer 930*a* and the hardware layer 930*c*. The kernel space 930*b* operates in a highly privileged hierarchical protection domain, and is strictly reserved for running privileged kernel, kernel extensions, and most device drivers, and is typically corresponding to the kernel mode and to the 'ring-0' layer (in x86 processors). The kernel mode may be supported by the processor hardware, or may be supported by a code segment level.

The user mode applications (such as application #1 931*a*, application #2 931*b*, and application #3 931*c*) access the kernel space 930*b* by the invoking of system calls respectively denoted as connections 932*a*, 932*b* and 932*c*. Typically, such system calls are processed via intermediating entity known as Windows API, such as a Win32 API 933, which access the kernel space 930*b* via a standard messaging 934. The Win32 API 933 is an example of a Windows API (informally WinAPI), which is Microsoft's core set of Application Programming Interfaces (APIs) available in the Microsoft Windows operating systems. Almost all Windows programs interact with the Windows API; on the Windows NT line of operating systems, a small number (such as programs started early in the Windows startup process) uses the Native API. Supporting for developers is in the form of the Windows Software Development Kit (SDK), providing documentation and tools necessary to build software based upon the Windows API and associated Windows interfaces. The Win32 API 933 is the 32-bit API for modern versions of Windows, and consists of functions implemented, as with Win16, in system DLLs. The core DLLs of the Win32 include the kerne132.dll, user32.dll, and gdi32.dll. The Win32 API is described in the tutorial entitled: "*Welcome to Version* 2.0 *of the Win*32 *API Tutorial*" by Prof. M. Saeed, published by Brook Miles, downloaded from the Internet on 7/2014, which is incorporated in its entirety for all purposes as if fully set forth herein.

System calls provide an essential interface between a process and the operating system. A system call is how a program requests a service from an operating system's kernel. This may include hardware related services (e.g., accessing the hard disk), creating and executing new processes, and communicating with integral kernel services (such as scheduling). A system call is typically processed in the kernel mode, which is accomplished by changing the processor execution mode to a more privileged one. The hardware sees the world in terms of the execution mode according to the processor status register, and processes are an abstraction provided by the operating system. A system call does not require a context switch to another process, it is processed in the context of whichever process invoked it. The system calls are often executed via traps or interrupts; that automatically puts the CPU into some required privilege level, and then passes control to the kernel, which determines whether the calling program should be granted the requested service. If the service is granted, the kernel executes a specific set of instructions over which the calling program has no direct control, returns the privilege level to that of the calling program, and then returns control to the calling program. Implementing system calls requires a control transfer, which involves some sort of architecture-specific feature.

System calls can be roughly grouped into five major categories: Process control, such as load, execute, create/terminate process, get/set process attributes, wait for time, wait event, and signal event; file management, such as request/release device, create/delete file, open/close file, read/write/reposition file, and get/set file attributes; device management, such as read/write/reposition device, get/set device attributes, and logically attach/detach devices; information maintenance, such as get/set time or date, get/set system data, and get/set process, file, or device attributes; and communication such as create, delete communication connection, transfer status information, and attach or detach remote devices.

The system calls are commonly handled by an I/O manager 935*b*, which allows devices to communicate with user-mode subsystems. It translates user-mode read and write commands into read or write IRPs which it passes to device drivers. It accepts file system I/O requests and translates them into device specific calls, and can incorporate low-level device drivers that directly manipulate hardware to either read input or write output. It also includes a cache manager to improve disk performance by caching read requests and write to the disk in the background. The I/O manager 935*b* may interface a power manager 935*c*, which deals with power events (power-off, stand-by, hibernate, etc.) and notifies affected drivers with special IRPs (Power IRPs).

A PnP manager 935*a* handles 'Plug and Play' and supports device detection and installation at boot time. It also has the responsibility to stop and start devices on demand, which can happen when a bus (such as USB or FireWire) gains a new device and needs to have a device driver loaded to support it. The PnP manager 935*a* may be partly implemented in user mode, in the Plug and Play Service, which handles the often complex tasks of installing the appropriate drivers, notifying services and applications of the arrival of new devices, and displaying GUI to the user.

I/O Request Packets (IRPs) are kernel mode structures that are used to communicate with each other and with the operating system. They are data structures that describe I/O requests, to a driver, all of these parameters (such as buffer address, buffer size, I/O function type, etc.) are passed via a single pointer to this persistent data structure. The IRP with all of its parameters can be put on a queue if the I/O request cannot be performed immediately. I/O completion is reported back to the I/O manager by passing its address to a routine for that purpose, IoCompleteRequest. The IRP may be repurposed as a special kernel APC object if such is required to report completion of the I/O to the requesting thread. IRPs are typically created by the I/O Manager in response to I/O requests from user mode. However, IRPs are sometimes created by the plug-and-play manager, power manager, and other system components, and can also be created by drivers and then passed to other drivers.

The WDM uses kernel-mode device drivers to enable it to interact with hardware devices, where each of the drivers has well defined system routines and internal routines that it exports to the rest of the operating system. DriverEntry is the first routine called after a driver is loaded, and is responsible for initializing the driver. All devices are seen by user mode code as a file object in the I/O manager, though to the I/O manager itself the devices are seen as device objects, which it defines as either file, device or driver objects. The drivers may be aggregated as a driver stack 936, including kernel mode drivers in three levels: highest level drivers 936*a*, intermediate drivers 936*b*, and low level drivers 936*c*. The highest level drivers 936*a*, such as file system drivers for FAT and NTFS, rely on the intermediate drivers 936*b*, which consist of function drivers or main driver for a device, that are optionally sandwiched between lower and higher level filter drivers. The highest level drivers typically know how files are represented on disk, but not the details of how to actually fetch the data, the intermediate level drivers process the requests from the highest level driver by breaking down a large request into a series of small chunks. The function driver commonly possesses the details relating to how the hardware of the peripheral works, typically relies on a bus driver, or a driver that services a bus controller, adapter, or bridge, which can have an optional bus filter driver that sits between itself and the function driver. For example, a PCI bus driver detects the PCI-slot plugged card or hardware, and determines the I/O-mapped or the memory-mapped connection with the host. Intermediate drivers 936*b* rely on the low level drivers 936*c* to function. The lowest level drivers 936*c* are either legacy device drivers that control a device directly, or can be a PnP hardware bus. These lower level drivers 936*c* directly control hardware and do not rely on any other drivers. The I/O manager 935*b* communicate with the high-level driver 936*a* using IRP 937*a*, the high-level driver 936*a* communicate with the intermediate level driver 936*b* using IRP 937*b*, the intermediate level driver 936*b* communicate with the low-level driver 936*c* using IRP 937*c*, and the low-level driver 936*c* communicate with a HAL 938 using IRP 937*d*.

WDM drivers can be classified into the following types and sub-types: Device function drivers, bus drivers, and filter drivers. A function driver is the main driver for a device. A function driver is typically written by the device vendor and is required (unless the device is being used in raw mode). A function driver can service one or more devices. Miniport drivers are a type of function drivers for interfaces such as USB, audio, SCSI and network adapters. They are hardware specific, but the control access to the hardware is through a specific bus class driver. Class drivers are a type of function drivers and can be thought of as built-in framework drivers that miniport and other class drivers can be built on top of. The class drivers provide interfaces between different levels of the WDM architecture. Common functionality between different classes of drivers can be written into the class driver and used by other class and miniport drivers. The lower edge of the class driver will have its interface exposed to the miniport driver, while the upper edge of top level class drivers is operating system specific. Class drivers can be dynamically loaded and unloaded at will. They can do class specific functions that are not hardware or bus-specific (with the exception of bus-type class drivers) and in fact sometimes only do class specific functions such as enumeration.

A bus driver services a bus controller, adapter, or bridge. Microsoft provides bus drivers for most common buses, such as Advanced configuration and Power Interface (ACPI), Peripheral Component Interconnect (PCI), PnPISA, SCSI, Universal Serial Bus (USB), and FireWire. A bus driver can service more than one bus if there is more than one bus of the same type on the machine. The ACPI bus driver interacts with the ACPI BIOS to enumerate the devices in the system and control their power use, the PCI bus driver (such as pci.sys) enumerates and configures devices connected via the PCI bus, the FireWire and the USB bus driver respectively enumerates and controls devices connected via the IEEE 1394 high speed bus and the USB. The stream class driver provides a basic processing supporting high bandwidth, time critical, and video and audio data related hardware, and uses minidrivers for interfacing the actual hardware, and hard-disk, floppies, CDs, and DVDs are interfaces using SCSI and CDROM/DVD class driver. The Human Input Device (HID) provides an abstract view of input devices, and the Still Image Architecture (SIA) class driver is used to obtain content from a scanner and a still camera, using minidrivers. For example, accessing a hard disk (such as HDD 25*c*) involves a file system driver as high-level driver, a volume manager driver as intermediate level driver, and a disk driver as a low-level driver.

Filter drivers are optional drivers that add value to or modify the behavior of a device and may be non-device drivers. A filter driver can also service one or more devices. Upper level filter drivers sit above the primary driver for the device (the function driver), while lower level filter drivers sit below the function driver and above the bus driver. A driver service is a type of kernel-level filter driver implemented as a Windows service that enables applications to work with devices.

The Hardware Abstraction Layer 938, or HAL, is a layer between the physical hardware layer 930*c* of the computer and the rest of the operating system. It was designed to hide differences in hardware and therefore provide a consistent platform on which the kernel is run. The HAL 938 includes hardware-specific code that controls I/O interfaces, interrupt controllers and multiple processors. Typically the particular hardware abstraction does not involve abstracting the instruction set, which generally falls under the wider concept of portability. Abstracting the instruction set, when necessary (such as for handling the several revisions to the x86 instruction set, or emulating a missing math coprocessor), is performed by the kernel, or via platform virtualization.

Linux is a Unix-like and mostly POSIX-compliant computer operating system assembled under the model of free and open source software development and distribution. The defining component of Linux is the Linux kernel, an operating system kernel first released on 5 Oct. 1991 by Linus Torvalds. Linux was originally developed as a free operating system for Intel x86-based personal computers, but has since been ported to more computer hardware platforms than any other operating system. Linux also runs on embedded systems such as mobile phones, tablet computers, network routers, facility automation controls, televisions, and video game consoles. Android, which is a widely used operating system for mobile devices, is built on top of the Linux kernel. Typically, Linux is packaged in a format known as a Linux distribution for desktop and server use.

Linux distributions include the Linux kernel, supporting utilities and libraries and usually a large amount of application software to fulfill the distribution's intended use. A Linux-based system is a modular Unix-like operating system. Such a system uses a monolithic kernel, the Linux kernel, which handles process control, networking, and peripheral and file system access. Device drivers are either integrated directly with the kernel or added as modules loaded while the system is running. Some components of an installed Linux system are a bootloader, for example GNU GRUB or LILO, which is executed by the computer when it is first turned on, and loads the Linux kernel into memory; an init program, which is the first process launched by the Linux kernel, and is at the root of the process tree, and starts processes such as system services and login prompts (whether graphical or in terminal mode); Software libraries which contain code which can be used by running processes; and user interface programs such as command shells or windowing environments. A version of Linux is described, for example, in IBM Corporation (headquartered in Armonk, New-York, U.S.A.) publication No. SC34-2597-03 entitled: "*Device Drivers, Features, and Commands on Red Hat Exterprise Linux* 6.3", downloaded from the Internet on 7/2014, which is incorporated in its entirety for all purposes as if fully set forth herein.

The general schematic Linux driver architecture 950 is shown in FIG. 3*a*, and the Linux kernel is further described in Wiley Publishing, Inc. publication entitled: "*Professional Linux Kernel Architecture*", by Wofgang Mauerer published 2008, and Linux programming is described in the book entitled: "*The Linux Kernel Module Programming Guide*" ver. 2.6.4 by Peter Jay Salzman, Michael Burian, and Ori Pomerantz, dated May 18, 2007, and in the publication entitled: "*A Comparison of the Linux and Windows Device Driver Architecture*", by Melekam Tsegaye and Richard Foss, both from Rhodes University, South-Africa, downloaded from the Internet on 7/2014, which are all incorporated in their entirety for all purposes as if fully set forth herein.

Similar to the WDM 930 shown in FIG. 3, the Linux kernel involves a 'System Call Interface' 953, receiving system calls 952*a*, 952*b*, and 952*c* from the respective applications such as an application #1 931*a*, an application #2 931*b*, and an application #3 931*c*, and serves as the denomination for the entirety of all implemented and available system calls in a kernel. The Linux kernel is based on a layered modules stack 954, which may include three levels of modules, such as module #1 954*a*, module #2 954*b*, and module #3 954*c*, where the module #1 954*a* communicate over connection 955*a* with the system call interface 953, the module #2 954*b* communicates with the module #1 954*a* over connection 955*b*, the module #3 954*c* communicates over the connection 955*c* with the module #2 954*b* and over a connection 955*d* with the HAL 938.

Similar to the WDM 930 shown in FIG. 3, the Linux kernel shown as the arrangement 950 in FIG. 3*a*, is using the concept of layered architecture of a modules stack 954, which may comprise module #1 954*a*, module #2 954*b*, and module #3 954*c*, communicating using messaging mechanism, such as a connection 955*a* between the system call interface 953 and the module #1 954*a*, a connection 955*b* between the module #1 954*a* and the module #2 954*b*, a connection 955*c* between the module #2 954*b* and the module #3 954*c*, and a connection 955*d* between the module #3 954*c* and the HAL 938.

The modules in the modules stack 954, typically referred to as Loadable Kernel Modules (or LKM), are object files that contain code to extend the running Linux kernel, or so-called base kernel. LKMs are typically used to add support for new hardware and/or filesystems, or for adding system calls. When the functionality provided by a LKM is no longer required, it can be unloaded in order to free memory and other resources. Loadable kernel modules in Linux are located in /lib/modules and have had the extension '.ko' ("kernel object") since version 2.6 (previous versions used the .o extension), and are loaded (and unloaded) by the modprobe command. The lsmod command lists the loaded kernel modules. In emergency cases, when the system fails to boot (due to e.g. broken modules), specific modules can be enabled or disabled by modifying the kernel boot parameters list (for example, if using GRUB, by pressing 'e' in the GRUB start menu, then editing the kernel parameter line). Linux allows disabling module loading via sysctl option /proc/sys/kernel/modules_disabled. An initramfs system may load specific modules needed for a machine at boot and then disable module loading.

A web browser (commonly referred to as a browser) is a software application for retrieving, presenting, and traversing information resources on the World Wide Web. An information resource is identified by a Uniform Resource Identifier (URI/URL) and may be part of a web page, a web-page, an image, a video, or any other piece of content. Hyperlinks present in resources enable users easily to navigate their browsers to related resources. Although browsers are primarily intended to use the World Wide Web, they can also be used to access information provided by web servers in private networks or files in file systems. The primary purpose of a web browser is to bring information resources to the user ("retrieval" or "fetching"), allowing them to view the information ("display", "rendering"), and then access other information ("navigation", "following links"). Currently the major web browsers are known as Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier or URI, determines how the URL will be interpreted. The most commonly used kind of URI starts with http: and identifies a resource to be retrieved over the Hypertext Transfer Protocol (HTTP). Many browsers also support a variety of other prefixes, such as https: for HTTPS, ftp: for the File Transfer Protocol, and file: for local files. Prefixes that the web browser cannot directly handle are often handed off to another application entirely. For example, mailto: URIs are usually passed to the user's default e-mail application, and news: URIs are passed to the user's default newsgroup reader. In the case of http, https, file, and others, once the resource has been retrieved the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets. Upon encountering a file of an unsupported type or a file that is set up to be downloaded rather than displayed, the browser prompts the user to save the file to disk. Information resources may contain hyperlinks to other information resources. Each link contains the URI of a resource to go to. When a link is clicked, the browser navigates to the resource indicated by the link's target URI, and the process of bringing content to the user begins again. The architecture of a web browser is described in the publication entitled: "*Architecture and evolution of the modern web browser*" by Alan Grosskurth and Michael W. Godfrey of the University of Waterloo in Canada, dated Jun. 20, 2006, which is incorporated in its entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Washington, U.S.A., which is a series of graphical web browsers developed by Microsoft and included as part of the Microsoft Windows line of operating systems. The Internet Explorer 8 is described, for example, in Microsoft 2009 publication entitled: "*Step by Step Tutorials for Microsoft Internet Explorer* 8 *Accessibility Options*", which is incorporated in its entirety for all purposes as if fully set forth herein. Another popular web browser is the Google Chrome which is a freeware web browser developed by Google, headquartered in Googleplex, Mountain View, California, U.S.A. Google Chrome aims to be secure, fast, simple, and stable, providing strong application performance and JavaScript processing speed.

A mobile browser, also called a microbrowser, mini-browser, or Wireless Internet Browser (WIB), is a web browser designed for use on a mobile device such as a mobile phone or PDA. Mobile browsers are optimized so as to display Web content most effectively for small screens on portable devices. Mobile browser software must be small and efficient to accommodate the low memory capacity and low-bandwidth of wireless handheld devices. Some mobile browsers can handle more recent technologies like CSS 2.1, JavaScript, and Ajax. Websites designed for access from these browsers are referred to as wireless portals or collectively as the Mobile Web. They may automatically create "mobile" versions of each page, for example this one The mobile browser typically connects via cellular network, via Wireless LAN, or via other wireless networks, and are using standard HTTP over TCP/IP, and displays web pages written in HTML, XHTML Mobile Profile (WAP 2.0), or WML (which evolved from HDML). WML and HDML are stripped-down formats suitable for transmission across limited bandwidth, and wireless data connection called WAP. WAP 2.0 specifies XHTML Mobile Profile plus WAP CSS, subsets of the W3C's standard XHTML and CSS with minor mobile extensions. Some mobile browsers are full-featured Web browsers capable of HTML, CSS, ECMAScript, as well as mobile technologies such as WML, i-mode HTML, or cHTML. To accommodate small screens, some mobile browsers use Post-WIMP interfaces. An example of a mobile browser is Safari, which is a mobile web browser developed by Apple Inc. (headquartered in Apple Campus, Cupertino, California, U.S.A), included with the OS X and iOS operating systems, and described in Apple publication entitled: "*Safari Web Content Guide*", dated March 2014, which is incorporated in its entirety for all purposes as if fully set forth herein.

Virtualization. The term virtualization typically refers to the technology that allows for the creation of software-based virtual machines that can run multiple operating systems from a single physical machine. In one example, virtual machines can be used to consolidate the workloads of several under-utilized servers to fewer machines, perhaps a single machine (server consolidation), providing benefits (perceived or real, but often cited by vendors) such as savings on hardware, environmental costs, management, and administration of the server infrastructure. Virtualization scheme allows for the creation of substitutes for real resources, that is, substitutes that have the same functions and external interfaces as their counterparts, but that differ in attributes, such as size, performance, and cost. These substitutes are called virtual resources, and their users are typically unaware of the substitution.

Virtualization is commonly applied to physical hardware resources by combining multiple physical resources into shared pools from which users receive virtual resources. With virtualization, you can make one physical resource look like multiple virtual resources. Virtual resources can have functions or features that are not available in their underlying physical resources. Virtualization can provide the benefits of consolidation to reduce hardware cost, such as to efficiently access and manage resources to reduce operations and systems management costs while maintaining needed capacity, and to have a single server function as multiple virtual servers. In addition, virtualization can provide optimization of workloads, such as to respond dynamically to the application needs of its users, and to increase the use of existing resources by enabling dynamic sharing of resource pools. Further, virtualization may be used for IT flexibility and responsiveness, such as by having a single, consolidated view of, and easy access to, all available resources in the network, regardless of location, and reducing the management of your environment by providing emulation for compatibility and improved interoperability.

Virtual machine (VM). Virtual machine is a representation of a real machine using software that provides an operating environment which can run or host a guest operating system. In one example, a virtual machine may include a self-contained software emulation of a machine, which does not physically exist, but shares resources of an underlying physical machine. Like a physical computer, a virtual machine runs an operating system and applications. Multiple virtual machines can operate concurrently on a single host system. There are different kinds of virtual machines, each with different functions: System virtual machines (also termed full virtualization VMs) provide a substitute for a real machine. They provide functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host CPUs. Process virtual machines are designed to execute computer programs in a platform-independent environment. Some virtual machines, such as QEMU, are designed to also emulate different architectures and allow execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

Guest Operating System. A guest operating system is an operating system running in a virtual machine environment that would otherwise run directly on a separate physical system. Operating-system-level virtualization, also known as containerization, refers to an operating system feature in which the kernel allows the existence of multiple isolated user-space instances. Such instances, called containers, partitions, Virtualization Engines (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container. In addition to isolation mechanisms, the kernel often provides resource-management features to limit the impact of one container's activities on other containers. With operating-system-virtualization, or containerization, it is possible to run programs within containers, to which only parts of these resources are allocated. A program expecting to see the whole computer, once run inside a container, can only see the allocated resources and believes them to be all that is available. Several containers can be created on each operating system, to each of which a subset of the computer's resources is allocated. Each container may contain any number of computer programs. These programs may run concurrently or separately, even interact with each other.

Hypervisor. Hypervisor commonly refers to a thin layer of software that generally provides virtual partitioning capabilities which runs directly on hardware, but underneath higher-level virtualization services. The hypervisor typically manages virtual machines, allowing them to interact directly with the underlying hardware. System virtualization creates many virtual systems within a single physical system. Virtual systems are independent operating environments that use virtual resources. System virtualization can be approached through hardware partitioning or hypervisor technology. Hardware partitioning subdivides a physical server into fractions, each of which can run an operating system. These fractions are typically created with coarse units of allocation, such as whole processors or physical boards. This type of virtualization allows for hardware consolidation, but does not have the full benefits of resource sharing and emulation offered by hypervisors. Hypervisors use a thin layer of code in software or firmware to achieve fine-grained, dynamic resource sharing. Because hypervisors provide the greatest level of flexibility in how virtual resources are defined and managed, they are the primary technology for system virtualization.

Virtual Machine Monitor. A Virtual Machine Monitor (VMM) is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (usually called containers) must share a single kernel, though the guest operating systems can differ in user space, such as different Linux distributions with the same kernel. Typically, a VMM refers to a software that runs in a layer between a hypervisor or host operating system and one or more virtual machines that provides the virtual machines abstraction to the guest operating systems. With full virtualization, the VMM exports a virtual machine abstraction identical to the physical machine, so the standard operating system can run just as they would on physical hardware.

Hardware virtualization or platform virtualization refers to the creation of a virtual machine that acts like a real computer with an operating system. Software executed on these virtual machines is separated from the underlying hardware resources. In hardware virtualization, the host machine is the actual machine on which the virtualization takes place, and the guest machine is the virtual machine. The words host and guest are used to distinguish the software that runs on the physical machine from the software that runs on the virtual machine. The software or firmware that creates a virtual machine on the host hardware is called a hypervisor or Virtual Machine Manager. Different types of hardware virtualization include full-virtualization, where almost complete simulation of the actual hardware to allow software, which typically consists of a guest operating system, to run unmodified, and Para-virtualization, where a hardware environment is not simulated; however, the guest programs are executed in their own isolated domains, as if they are running on a separate system. Guest programs need to be specifically modified to run in this environment.

Hardware-assisted virtualization is a way of improving overall efficiency of virtualization. It involves CPUs that provide support for virtualization in hardware, and other hardware components that help improve the performance of a guest environment. Hardware virtualization can be viewed as part of an overall trend in enterprise IT that includes autonomic computing, a scenario in which the IT environment will be able to manage itself based on perceived activity, and utility computing, in which computer processing power is seen as a utility that clients can pay for only as needed. The usual goal of virtualization is to centralize administrative tasks while improving scalability and overall hardware-resource utilization. With virtualization, several operating systems can be run in parallel on a single central processing unit (CPU). This parallelism tends to reduce overhead costs and differs from multitasking, which involves running several programs on the same OS. Using virtualization, an enterprise can better manage updates and rapid changes to the operating system and applications without disrupting the user.

Server Virtualization. Server virtualization is a virtualization technique that involves partitioning a physical server into a number of small, virtual servers with the help of virtualization software. In server virtualization, each virtual server runs multiple operating system instances at the same time. A Virtual Private Server (VPS) is a virtual machine sold as a service by an Internet hosting service, that runs its own copy of an Operating System (OS), and customers may have superuser-level access to that operating system instance, so they can install almost any software that runs on that OS. For many purposes they are functionally equivalent to a dedicated physical server, and being software-defined, are able to be much more easily created and configured. They are typically priced much lower than an equivalent physical server. However, as they share the underlying physical hardware with other VPS's, performance may be lower, depending on the workload of any other executing virtual machines. Dedicated Servers may also be more efficient with CPU dependent processes such as hashing algorithms.

Application Virtualization. Application virtualization is software technology that encapsulates computer programs from the underlying operating system on which it is executed. A fully virtualized application is not installed in the traditional sense, although it is still executed as if it were. The application behaves at runtime like it is directly interfacing with the original operating system and all the resources managed by it, but can be isolated or sandboxed to varying degrees. Application virtualization is layered on top of other virtualization technologies, allowing computing resources to be distributed dynamically in real-time. In this context, the term "virtualization" commonly refers to the artifact being encapsulated (application), which is quite different from its meaning in hardware virtualization, where it refers to the artifact being abstracted (physical hardware).

Network Virtualization. Network Virtualization refers to the process of combining hardware and software network resources to create a single pool of resources that make up a virtual network that can be accessed without regard to the physical component. Network virtualization typically involves combining hardware and software network resources and network functionality into a single, software-based administrative entity, a virtual network. Network virtualization involves platform virtualization, often combined with resource virtualization. Network virtualization is categorized as either external virtualization, combining many networks or parts of networks into a virtual unit, or internal virtualization, providing network-like functionality to software containers on a single network server.

Storage Virtualization. Storage virtualization refers to the process of consolidating the physical storage from multiple network storage devices so that it appears to be a single storage unit. Within the context of a storage system, there are two primary types of virtualization that can occur: Block virtualization used in this context refers to the abstraction (separation) of logical storage (partition) from physical storage so that it may be accessed without regard to physical storage or heterogeneous structure. This separation allows the administrators of the storage system greater flexibility in how they manage storage for end users. File virtualization addresses the NAS challenges by eliminating the dependencies between the data accessed at the file level and the location where the files are physically stored. This provides opportunities to optimize storage use and server consolidation and to perform non-disruptive file migrations.

Desktop Virtualization. Desktop virtualization refers to the process of virtualizing desktop computers using virtualization software, such that the desktop computer and the associated operating system and applications are separated from the physical client device that is used to access it. Desktop virtualization is software technology that separates the desktop environment and associated application software from the physical client device that is used to access it.

Desktop virtualization can be used in conjunction with application virtualization and user profile management systems, now termed "user virtualization," to provide a comprehensive desktop environment management system. In this mode, all the components of the desktop are virtualized, which allows for a highly flexible and much more secure desktop delivery model. In addition, this approach supports a more complete desktop disaster recovery strategy as all components are essentially saved in the data center and backed up through traditional redundant maintenance systems. If a user's device or hardware is lost, the restore is straightforward and simple, because the components will be present at login from another device. In addition, because no data is saved to the user's device, if that device is lost, there is much less chance that any critical data can be retrieved and compromised. Virtual Desktop Infrastructure (VDI)—The practice of hosting a desktop environment within a virtual machine that runs on a centralized or remote server.

An example of a virtualization architecture 900 is shown in FIG. 3*b*, where three virtual machines are exemplified. A Virtual Machine (VM) #1 910*a* provides virtualization for the application 901*a* that uses the guest OS 902*a*, which in turn interfaces with the virtual hardware 903*a* that emulates the actual hardware. Similarly, a Virtual Machine (VM) #2 910*b* provides virtualization for the application 901*b* that uses the guest OS 902*b*, which in turn interfaces with the virtual hardware 903*b* that emulates the associated actual hardware, and a Virtual Machine (VM) #3 910*c* provides virtualization for the application 901*c* that uses the guest OS 902*c*, which in turn interfaces with the virtual hardware 903*c* that emulates the associated actual hardware. The abstraction layer is provided by VMM 904, allowing of hardware-independence of operating system and applications, provisioning on any single physical system, and managing the applications and the OSs as a single encapsulated unit.

A hosted architecture 900*a* for virtualization is shown in FIG. 3*c*, where a wide range of actual host hardware 906 may be used by implementing a host operating system 905 layer between the actual hardware 906 and the VMM 904. Such configuration relies on the host OS 905 for device support and physical resource management. In contrast, a bare-metal architecture 900*b* is shown in FIG. 3*d*, where a hypervisor layer (in addition to, or as part of, the VMM 904) is used as the first layer, allowing the VMM 904 to have direct access to the hardware resources, hence providing more efficient, and greater scalability, robustness, and performance.

Cloud computing and virtualization is described in a book entitled "*Cloud Computing and Virtualization*" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Extending this further, virtualization creates "location freedom" enabling virtual machines to become portable across an ever-increasing geographical distance. As cloud architectures and multi-tenancy capabilities continue to develop and mature, there is an economy of scale that can be realized by aggregating resources across applications, business units, and separate corporations to a common shared, yet segmented, infrastructure. Elasticity, mobility, automation, and density of virtual machines demand new network architectures focusing on high performance, addressing portability, and the innate understanding of the virtual machine as the new building block of the data center. Consistent network-supported and virtualization-driven policy and controls are necessary for visibility to virtual machines' state and location as they are created and moved across a virtualized infrastructure.

Virtualization technologies in data center environments are described in a eBook authored by Gustavo Alessandro Andrade Santana and published 2014 by Cisco Systems, Inc. (Cisco Press) [ISBN-13: 978-1-58714-324-3] entitled: "*Data Center Virtualization Fundamentals*", which is incorporated in its entirety for all purposes as if fully set forth herein. PowerVM technology for virtualization is described in IBM RedBook entitled: "*IBM PowerVM Virtualization—Introduction and Configuration*" published by IBM Corporation June 2013, and virtualization basics is described in a paper by IBM Corporation published 2009 entitled: "*Power Systems—Introduction to virtualization*", which are both incorporated in their entirety for all purposes as if fully set forth herein.

Encryption based mechanisms are commonly end-to-end processes involving only the sender and the receiver, where the sender encrypts the plain text message by transforming it using an algorithm, making it unreadable to anyone, except the receiver which possesses special knowledge. The data is then sent to the receiver over a network such as the Internet, and when received the special knowledge enables the receiver to reverse the process (decrypt) to make the information readable as in the original message. The encryption process commonly involves computing resources such as processing power, storage space and requires time for executing the encryption/decryption algorithm, which may delay the delivery of the message.

Transport Layer Security (TLS) and its predecessor Secure Sockets Layer (SSL) are non-limiting examples of end-to-end cryptographic protocols, providing secured communication above the OSI Transport Layer, using keyed message authentication code and symmetric cryptography. In client/server applications, the TLS client and server negotiate a stateful connection by using a handshake procedure, during which various parameters are agreed upon, allowing a communication in a way designed to prevent eavesdropping and tampering. The TLS 1.2 is defined in RFC 5246, and several versions of the protocol are in widespread use in applications such as web browsing, electronic mail, Internet faxing, instant messaging and Voice-over-IP (VoIP). In application design, TLS is usually implemented on top of any of the Transport Layer protocols, encapsulating the application-specific protocols such as HTTP, FTP, SMTP, NNTP, and XMPP. Historically, it has been used primarily with reliable transport protocols such as the Transmission Control Protocol (TCP). However, it has also been implemented with datagram-oriented transport protocols, such as the User Datagram Protocol (UDP) and the Datagram Congestion Control Protocol (DCCP), a usage which has been standardized independently using the term Datagram Transport Layer Security (DTLS). A prominent use of TLS is for securing World Wide Web traffic carried by HTTP to form HTTPS. Notable applications are electronic commerce and asset management. Increasingly, the Simple Mail Transfer Protocol (SMTP) is also protected by TLS (RFC 3207). These applications use public key certificates to verify the identity of endpoints. Another Layer 4 (Transport Layer) and upper layers encryption-based communication protocols include SSH (Secure Shell) and SSL (Secure Socket Layer).

To provide the server name, RFC 4366 Transport Layer Security (TLS) Extensions allow clients to include a Server Name Indication extension (SNI) in the extended ClientHello message. This extension hints the server immediately which name the client wishes to connect to, so the server can select the appropriate certificate to send to the clients.

Layer 3 (Network Layer) and lower layer encryption based protocols include IPsec, L2TP (Layer 2 Tunneling Protocol) over IPsec, and Ethernet over IPsec. The IPsec is a protocol suite for securing IP communication by encrypting and authenticating each IP packet of a communication session. The IPsec standard is currently based on RFC 4301 and RFC 4309, and was originally described in RFCs 1825-1829, which are now obsolete, and uses the Security Parameter Index (SPI, as per RFC 2401) as an identification tag added to the header while using IPsec for tunneling the IP traffic. An IPsec overview is provided in Cisco Systems, Inc. document entitled: "*An Introduction to IP Security (IPSec) Encryption*", which is incorporated in its entirety for all purposes as if fully set forth herein.

Two common approaches to cryptography are found in U.S. Pat. No. 3,962,539 to Ehrsam et al., entitled "Product Block Cipher System for Data Security", and in U.S. Pat. No. 4,405,829 to Rivest et al., entitled "Cryptographic Communications System and Method", which are both incorporated in their entirety for all purposes as if fully set forth herein. The Ehrsam patent discloses what is commonly known as the Data Encryption Standard (DES), while the Rivest patent discloses what is commonly known as the RSA algorithm (which stands for Rivest, Shamir and Adleman who first publicly described it), which is widely used in electronic commerce protocols. The RSA involves using a public key and a private key. DES is based upon secret-key cryptography, also referred to as symmetric cryptography, and relies upon a 56-bit key for encryption. In this form of cryptography, the sender and receiver of cipher text both possess identical secret keys, which are, in an ideal world, completely unique and unknown to the world outside of the sender and receiver. By encoding plain text into cipher text using the secret key, the sender may send the cipher text to the receiver using any available public or otherwise insecure communication system. The receiver, having received the cipher text, decrypts it using the secret key to arrive at the plain text.

SNI. Server Name Indication (SNI) is an extension to the TLS computer networking protocol by which a client indicates which hostname it is attempting to connect to at the start of the handshaking process. This allows a server to present multiple certificates on the same IP address and TCP port number and hence allows multiple secure (HTTPS) websites (or any other Service over TLS) to be served by the same IP address without requiring all those sites to use the same certificate. It is the conceptual equivalent to HTTP/1.1 name-based virtual hosting, but for HTTPS. The desired hostname is not encrypted, so an eavesdropper can see which site is being requested.

SNI addresses this issue by having the client sends the name of the virtual domain as part of the TLS negotiation. This enables the server to select the correct virtual domain early and present the browser with the certificate containing the correct name. Therefore, with clients and servers that implement SNI, a server with a single IP address can serve a group of domain names for which it is impractical to get a common certificate. SNI was added to the IETF's Internet RFCs in June 2003 through RFC 3546, Transport Layer Security (TLS) Extensions. The latest version of the standard is RFC 6066. For an application program to implement SNI, the TLS library it uses must implement it and the application must pass the hostname to the TLS library. Further, the TLS library may either be included in the application program or be a component of the underlying operating system.

Proxy. A proxy server is a server (a computer system or an application) that acts as an intermediary for requests from clients seeking resources from other servers. A client connects to the proxy server, requesting some service, such as a file, connection, web page, or other resource, available from a different server and the proxy server evaluates the request as a way to simplify and control its complexity. Proxies may be used to add structure and encapsulation to distributed systems. Today, most proxies are web proxies, facilitating access to content on the World Wide Web and providing anonymity. A proxy server may reside on the user's local computer, or at various points between the user's computer and destination servers on the Internet. A proxy server that passes requests and responses unmodified is usually called a gateway or sometimes a tunneling proxy. A forward proxy is an Internet-facing proxy used to retrieve from a wide range of sources (in most cases anywhere on the Internet). Forward proxies are proxies in which the client server names the target server to connect to, and are able to retrieve from a wide range of sources (in most cases anywhere on the Internet). An open proxy is a forwarding proxy server that is accessible by any Internet user, while browsing the Web or using other Internet services. There are varying degrees of anonymity, however, as well as a number of methods of 'tricking' the client into revealing itself regardless of the proxy being used. A reverse proxy is usually an Internet-facing proxy used as a front-end to control and protect access to a server on a private network. A reverse proxy commonly also performs tasks such as load-balancing, authentication, decryption or caching.

Random. Randomness is commonly implemented by using random numbers, defined as a sequence of numbers or symbols that lack any pattern and thus appear random, are often generated by a random number generator. Randomness for security is also described in IETF RFC 1750 *"Randomness Recommendations for Security"* (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

The term 'random' herein is intended to cover not only pure random, non-deterministically and non-predicted generated signals, but also pseudo-random, deterministic signals such as the output of a shift-register arrangement provided with a feedback circuit as used to generate pseudo-random binary signals or as scramblers, and chaotic signals, and where a randomness factor may be used.

A digital random signal generator (known as random number generator) wherein numbers in binary form replaces the analog voltage value output may be used for any randomness. One approach to random number generation is based on using linear feedback shift registers. An example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein.

A digital random signal generator may be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein. The digital random signal generator can be hardware based, generating random numbers from a natural physical process or phenomenon, such as the thermal noise of semiconductor which has no periodicity. Typically, such hardware random number generators are based on microscopic phenomena such as thermal noise, shot noise, nuclear decaying radiation, photoelectric effect or other quantum phenomena, and typically contain a transducer to convert some aspect of the physical phenomenon to an electrical signal, an amplifier and other electronic to bring the output into a signal that can be converted into a digital representation by an analog to digital converter. In the case where digitized serial random number signals are generated, the output is converted to parallel, such as 8 bits data, with 256 values of random numbers (values from 0 to 255). Alternatively, a digital random signal generator may be software (or firmware) based, such as pseudo-random number generators. Such generators include a processor for executing software that includes an algorithm for generating numbers, which approximates the properties of random numbers. The random signal generator (either analog or digital) may output a signal having uniform distribution, in which there is a substantially or purely equal probability of a signal falling between two defined limits, having no appearance outside these limits. However, Gaussian and other distribution may be equally used.

Tunneling. Computer networks may use a tunneling protocol where one network protocol (the delivery protocol) encapsulates a different payload protocol. Tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using tunneling a payload may be carried over an incompatible delivery-network, or provide a secure path through an untrusted network. Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. An HTTP stream with its covert channel is termed an HTTP tunnel. HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. A VPN client typically uses special TCP/IP-based protocols, called tunneling protocols, to make a virtual call to a virtual port on a VPN server. In a typical VPN deployment, a client initiates a virtual point-to-point connection to a remote access server over the Internet, then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection. Commonly two types of VPN connections are used, referred to as Remote Access VPN and Site-to-Site VPN. Popular VPN connections use PPTP, L2TP/IPsec, or SSTP protocols. The RFC 4026 provides 'Provider Provisioned Virtual Private Network (VPN) Terminology', and RFC 2547 provides a VPN method based on MPLS (Multiprotocol Label Switching) and BGP (Border Gateway Protocol).

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link. A site-to-site VPN connection connects two portions of a private network. The VPN server provides a routed connection to the network to which the VPN server is attached. The calling router (the VPN client) authenticates itself to the answering router (the VPN server), and, for mutual authentication, the answering router authenticates itself to the calling router. In the site-to site VPN connection, the packets sent from either router across the VPN connection typically do not originate at the routers.

There is a growing widespread use of the Internet for carrying multimedia, such as a video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoIP or other telephony services and video-conferencing are delay sensitive. In some cases, the delays induced by the encryption process, as well as the hardware/software costs associated with the encryption, render encryption as non-practical. Therefore, it is not easy to secure enough capacity of the Internet accessible by users to endure real-time communication applications such as Internet games, chatting, VoIP, and MoIP (Multimedia-over-IP), so there may be a data loss, delay or severe jitter in the course of communication due to the property of an Internet protocol, thereby causing inappropriate real-time video communication. The following chapters of the publication number 1-587005-001-3 by Cisco Systems, Inc. (July 1999), entitled: "*Internetworking Technologies Handbook*", relate to multimedia carried over the Internet, and are all incorporated in their entirety for all purposes as if fully set forth herein: Chapter 18: "*Multiservice Access Technologies*" (pages 18-1 to 18-10), and Chapter 19: "*Voice/Data Integration Technologies*" (pages 19-1 to 19-30).

VoIP systems in widespread use today fall into three groups: systems using the ITU-T H.323 protocol, systems using the SIP protocol, and systems that use proprietary protocols. H.323 is a standard for teleconferencing that was developed by the International Telecommunications Union (ITU). It supports full multimedia, audio, video and data transmission between groups of two or more participants, and it is designed to support large networks. H.323 is network-independent: it can be used over networks using transport protocols other than TCP/IP. H.323 is still a very important protocol, but it has fallen out of use for consumer VoIP products due to the fact that it is difficult to make it work through firewalls that are designed to protect computers running many different applications. It is a system best suited to large organizations that possess the technical skills to overcome these problems.

Session Initiation Protocol (SIP) is an Internet Engineering Task Force (IETF) standard signaling protocol for teleconferencing, telephony, presence and event notification and instant messaging. It provides a mechanism for setting up and managing connections, but not for transporting the audio or video data. It is probably now the most widely used protocol for managing Internet telephony. Similar to the IETF protocols, SIP is defined in a number of RFCs, principally RFC 3261. A SIP-based VoIP implementation may send the encoded voice data over the network in a number of ways. Most implementations use a Real-time Transport Protocol (RTP), which is defined in RFC 3550. Both SIP and RTP are implemented on UDP, which, as a connectionless protocol, can cause difficulties with certain types of routers and firewalls. Usable SIP phones therefore also need to use Simple Traversal of UDP over NAT (STUN), a protocol defined in RFC 3489 that allows a client behind a NAT router to find out its external IP address and the type of NAT device.

FIG. 2 shows arrangement 20 of devices communicating over the Internet. Various devices such as a client #1 24*a*, a client #2 24*b*, a client #3 24*c*, a client #4 24*d*, and a client #5 24*e*, may communicate over the Internet 113 for obtaining data from a data server #1 22*a* and a data server #2 22*b*. It is noted that the terms 'Data Server' and 'Web server' are used herein interchangeably. In one example, the servers are HTTP servers, sometimes known as web servers. A method describing a more efficient communication over the Internet is described in U.S. Pat. No. 8,560,604 to Shribman et al. entitled: "System and Method for Providing Faster and More Efficient Data Communication" (hereinafter the "'604 Patent"), which is incorporated in its entirety for all purposes as if fully set forth herein. The method described in the '604 Patent uses an acceleration server 23 for managing the traffic in the network, as shown in FIG. 2. A splitting of a message or a content into slices, and transferring each of the slices over a distinct data path is described in U.S. Patent Application No. 2012/0166582 to Binder entitled: "System and Method for Routing-Based Internet Security", which is incorporated in its entirety for all purposes as if fully set forth herein.

The amount of data transferred in a given period in commonly referred to as 'bandwidth' (BW) or 'bit-rate', which is the number of bits that are conveyed or processed per unit of time. The bit rate is quantified using the bits per second unit (symbol bit/s or b/s), often in conjunction with an SI prefix such as kilo- (1 Kbit/s=1000 bit/s), mega- (1 Mbit/s=1000 Kbit/s), giga- (1 Gbit/s=1000 Mbit/s) or tera- (1 Tbit/s=1000 Gbit/s). The non-standard abbreviation bps is often used to replace the standard symbol bit/s, so that, for example, "1 Mbps" (or 1 Mb/s) is used to mean one million bits per second. One byte per second (1 B/s) corresponds to 8 bit/s.

Latency is typically defined as a time interval between the stimulation and the response, or, from a more general point of view, as a time delay between the cause and the effect of some physical change in the system being observed. Network-related latency, such as in a packet-switched network, is measured either one-way (the time from the source sending a packet to the destination receiving it), or Round-Trip delay Time (RTT), referring to the one-way latency from source to destination plus the one-way latency from the destination back to the source, plus any delays at the destination, such as processing or other delays. Round-trip latency can be measured from a single point. Latency limits total bandwidth in reliable two-way communication systems as described by the bandwidth-delay product, which refers to the product of a data link's capacity (in bits per second) and its end-to-end delay (in seconds). The result, an amount of data measured in bits (or bytes), is equivalent to the maximum amount of data on the network circuit at any given time, i.e., data that has been transmitted but not yet acknowledged. Sometimes it is calculated as the data link's capacity multiplied by its round trip time. A network with a large bandwidth-delay product is commonly known as a Long Fat Network (LFN). As defined in IETF RFC 1072, a network is considered an LFN if its bandwidth-delay product is significantly larger than 105 bits (12500 bytes).

The Round-trip Delay Time (RTD) or Round-Trip Time (RTT) is the length of time it takes for a signal to be sent and to be received and processed at the destination node, plus the length of time it takes for an acknowledgment of that signal to be received. This time delay therefore includes the propagation times between the two points of a signal. The signal is generally a data packet, and the RTT is also known as the ping time, and an internet user can determine the RTT by using the ping command. Network links with both a high bandwidth and a high RTT can have a very large amount of data (the bandwidth-delay product) "in flight" at any given time. Such "long fat pipes" require a special protocol design. One example is the TCP window scale option. The RTT was originally estimated in TCP by: $RTT=(\alpha\cdot Old\_RTT)+((1-\alpha)\cdot New\_Round\_Trip\_Sample)$, where a is a constant weighting factor ($0\leq\alpha<1$). Choosing a value a close to 1 makes the weighted average immune to changes that last a short time (e.g., a single segment that encounters long delay). Choosing a value for α close to 0 makes the weighted average response to changes in delay very quickly. Once a new RTT is calculated, it is entered into the above equation to obtain an average RTT for that connection, and the procedure continues for every new calculation. The RTT may be measured as described in IETF 1323, and may be estimated by using a method described in IETF RFC 6323, which are both incorporated in their entirety for all purposes as if fully set forth herein.

An estimation of RTT for messages using TCP may use Karn's Algorithm, described by Karn, Phil and Craig Partridge in ACM SIGCOMM '87—Computer Communication Review publication, entitled: "*Improving Round-Trip Time Estimates in Reliable Transport Protocols*", which is incorporated in its entirety for all purposes as if fully set forth herein. The round trip time is estimated as the difference between the time that a segment was sent and the time that its acknowledgment was returned to the sender, but when packets are re-transmitted there is an ambiguity: the acknowledgment may be a response to the first transmission of the segment or to a subsequent re-transmission. Karn's Algorithm ignores re-transmitted segments when updating the round trip time estimate. Round trip time estimation is based only on unambiguous acknowledgments, which are acknowledgments for segments that were sent only once.

Many software platforms provide a service called 'ping' that can be used to measure round-trip latency. Ping performs no packet processing; it merely sends a response back when it receives a packet (i.e., performs a no-op), thus it is a first rough way of measuring latency. Ping operates by sending Internet Control Message Protocol (ICMP) echo requesting packets to the target host, and waiting for an ICMP response. During this process it measures the time from transmission to reception (round-trip time) and records any packet loss. The results of the test are printed in a form of a statistical summary of the response packets received, including the minimum, maximum, and the mean round-trip times, and sometimes the standard deviation of the mean.

The Transmission Control Protocol/Internet Protocol (TCP/IP) suite normally used on the Internet has included an Internet Message Control Protocol (ICMP) that is commonly used in echo testing or ping and trace route applications. In general, the Internet standard 'ping' or 'ICMP echo' has a request/response format, wherein one device sends an ICMP echo request and another device responds to a received ICMP echo request with a transmitted ICMP echo response. Normally, IP devices are expected to implement the ICMP as part of the support for IP, to be able to use ICMP for testing. Internet RFC 792, entitled "*Internet Control Message Protocol: DARPA Internet Program Protocol Specification*", which is incorporated in its entirety for all purposes as if fully set forth herein, at least partially describes the behavior of ICMP. The ICMP echo message has a type field, a code field, a checksum field, an identifier field, a sequence number field, and a data field. According to RFC 79: "The data received in the echo message must be returned in the echo reply message". Thus, an RFC compliant ping responders or an ICMP echo reply message responders are supposed to copy the received data field in an echo request message directly into the data field of the transmitted echo response message.

A newer version of ICMP known as ICMP version 6 or ICMPv6 as described at least partially in RFCs 1885 and 2463, which are both entitled "*Internet Control Message Protocol* (*ICMPv*6) *for the Internet Protocol Version* 6 (*IPv*6) *Specification*", which are both incorporated in their entirety for all purposes as if fully set forth herein. According to RFC 2463, "Every [IPv6] node MUST implement an ICMPv6 Echo responder function that receives Echo Requests and sends corresponding Echo Replies. An IPv6 node SHOULD also implement an application-layer interface for sending Echo Requests and receiving Echo Replies, for diagnostic purposes.". Thus, responding to ICMP echo requests normally is a necessary function in supporting IPv4 and/or IPv6 standards. The ICMPv6 RFCs 1885 and 2464 goes on to specify that the data field of an ICMP echo response contains the "data from the invoking Echo Request message." Therefore, both ICMP and ICMP v6 associated with IPv4 and IPv6, respectively, specify that the data field in an ICMP echo reply message is to essentially contain a copy of the data received in the corresponding ICMP echo request message.

Moreover, the ICMP echo protocol is basically a two-way echo in which one initiating device and/or process starts the communication by transmitting an echo request message, which may be then received by an echo responder process. The echo responder process, generally located on another device, receives the echo request message and responds with an echo reply back to the initiating process. Once the initiating device and/or process receives the response or times out waiting on the response, the two-way echo exchange of messages is complete. Although the echo request and echo response normally are performed between processes on two different devices, one skilled in the art will be aware that a device can ping its own IP address implying that the echo request and echo responder reply processes are on the same device. In addition, the loopback address of network 127.0.0.0 in IPv4 can be used to allow a device to the loopback outbound echo request messages back into the device own incoming echo request responder processes. IPv6 has a loopback functionality as well.

This copying of data exactly in the ICMP echo response is somewhat wasteful because the responder generally does not convey that much (if any) information back to the ICMP echo request initiating device. Arguably the initiating device could compute bit error rate (BER) statistics on the transmitted versus the received data field in ICMP echo packets. However, such physical layer issues as BER statistics normally are not as relevant for network layer IP datagrams that already include various error control code mechanisms. Arguably the device running the responding process can communicate information to the device running the initiating process by having the device running the original responding process initiate its own echo request and wait for an echo response from the original initiating device. Such a solution results in four packets, with a first echo request from a local device responded to by a first echo response from a remote device, and with a second echo request from the remote device responded to by a second echo response from the local device.

An identifier and/or sequence number in ping packets generally has allowed the ping to be used by a device to determine the round-trip delay from the time an ICMP echo request packet is sent to the time corresponding to when an associated received ICMP echo request is received back at an initiating device. Furthermore, ping packets generally convey little or no information about the type of the device that initiated the ping. Moreover, although IPv4 has Type of Service (ToS) fields in the IP datagram, these fields have become more important as the services used over the Internet and networks using Internet technology have grown from basic computer data communication to also include real-time applications such as voice and/or video. Various Type of Service (ToS) in IPv4 and IPv6 have been used in implementing various (Quality of Service) QoS characteristics that are defined for different classes of service and/or Service Level Agreements (SLAs).

SDK. As used herein, the term Software Development Kit (SDK) refers to a specific software package, software framework, hardware platform, or a set of development tools and the like at the time of establishment of the operating system software. Typically, an SDK includes a programming package that enables a programmer to develop applications for a specific platform, and may include one or more APIs, programming tools, and documentation. It may be as simple as the implementation of one or more application programming interfaces (APIs) in the form of some libraries to interface to a particular programming language or to include sophisticated hardware that can communicate with a particular embedded system. Common tools include debugging facilities and other utilities, often presented in an integrated development environment (IDE). SDKs also frequently include sample code and supporting technical notes or other supporting documentation to help clarify points made by the primary reference material. SDKs may have attached licenses that make them unsuitable for building software intended to be developed under an incompatible license. For example, a proprietary SDK will probably be incompatible with free software development, while a GPL-licensed SDK could be incompatible with proprietary software development. LGPL SDKs are typically safe for proprietary development.

A software engineer typically receives the SDK from the target system developer. Often the SDK can be downloaded directly via the Internet or via SDKs marketplaces. Many SDKs are provided for free to encourage developers to use the system or language. Sometimes this is used as a marketing tool. Freely offered SDKs may still be able to monetize, based on user data taken from the apps, which may serve the interests of big players in the ecosystem, for example the operating system. A SDK for an operating system add-on (for instance, QuickTime for classic Mac OS) may include the add-on software itself to be used for development purposes, albeit not necessarily for redistribution together with the developed product.

Timestamp. A timestamp is a sequence of characters or encoded information identifying when a certain event occurred, usually giving date and time of day, sometimes accurate to a small fraction of a second, and also refers to digital date and time information attached to the digital data. For example, computer files contain timestamps that tell when the file was last modified, and digital cameras add timestamps to the pictures they take, recording the date and time the picture was taken. A timestamp is typically the time at which an event is recorded by a computer, not the time of the event itself. In many cases, the difference may be inconsequential: the time at which an event is recorded by a timestamp (e.g., entered into a log file) should be close to the time of the event. Timestamps are typically used for logging events or in a Sequence of Events (SOE), in which case each event in the log or SOE is marked with a timestamp. In a file system such as a database, timestamp commonly mean the stored date/time of creation or modification of a file or a record. The ISO 8601 standard standardizes the representation of dates and times which are often used to construct timestamp values, and IETF RFC 3339 defines a date and time format for use in Internet protocols using the ISO 8601 standard representation.

Caching. A system and method for increasing cache size by performing the steps of: categorizing storage blocks within a storage device as within a first category of storage blocks if the storage blocks that are available to the system for storing data when needed; categorizing storage blocks within the storage device as within a second category of storage blocks if the storage blocks contain application data therein; and categorizing storage blocks within the storage device as within a third category of storage blocks if the storage blocks are storing cached data and are available for storing application data if no first category of storage blocks are available to the system, is described in U.S. Pat. No. 8,135,912 to Shribman et al. entitled: "System and Method of Increasing Cache Size", which is incorporated in its entirety for all purposes as if fully set forth herein. A system for resolving Domain Name System (DNS) queries that contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to, is described in U.S. Pat. No. 8,671,221 to the same inventors as this application, entitled: "Method and System for Increasing Speed of Domain Name System Resolution within a Computing Device", which is incorporated in its entirety for all purposes as if fully set forth herein.

Systems and methods of storing previously transmitted data and using it to reduce bandwidth usage and accelerate future communications, and using algorithms to identify long compression history matches. A network device that may improve compression efficiency and speed is described in U.S. Pat. No. 7,865,585 to Samuels et al., entitled: "Systems and Methods for Providing Dynamic Ad Hok Proxy-Cache Hierarchies", which is incorporated in its entirety for all purposes as if fully set forth herein. Further, a method and system for accelerating the receipt of data in a client-to-client network described in U.S. Pat. No. 7,203,741 to Marco et al., entitled: "Method and System for Accelerating Receipt of Data in a Client-to-Client Network", which is incorporated in its entirety for all purposes as if fully set forth herein.

Heartbeat. A heartbeat is a periodic signal generated by hardware or software to indicate normal operation or to synchronize other parts of a system. Usually a heartbeat is sent between machines at a regular interval of an order of seconds. If a heartbeat is not received for a time—usually a few heartbeat intervals—the machine that should have sent the heartbeat is assumed to have failed. As used herein, a heartbeat is a periodic message, such as a 'ping', generated by devices connected to the Internet to indicate being 'online' (connected to the Internet) and normal operation, and if a heartbeat is not received for a time, the device is assumed to be 'offline' (not connected to the Internet). A heartbeat protocol is generally used to negotiate and monitor the availability of a resource, such as a floating IP address. Typically, when a heartbeat starts on a machine, it will perform an election process with other machines on the network to determine which machine, if any, owns the resource. The IETF RFC 6520 describes Heartbeat operation for the Transport Layer Security (TLS), and is incorporated in its entirety for all purposes as if fully set forth herein.

Users in the Internet may desire anonymity in order not to be identified as a publisher (sender), or reader (receiver), of information. Common reasons include censorship at the local, organizational, or national level, personal privacy preferences such as preventing tracking or data mining activities, the material or its distribution is considered illegal or incriminating by possible eavesdroppers, the material may be legal but socially deplored, embarrassing, or problematic in the individual's social world, and fear of retribution (against whistleblowers, unofficial leaks, and activists who do not believe in restrictions on information nor knowledge). Full anonymity on the Internet, however, is not guaranteed since IP addresses can be tracked, allowing to identify the computer from which a certain post was made, albeit not the actual user. Anonymizing services, such as I2P—'The Anonymous Network' or Tor, address the issue of IP tracking, as their distributed technology approach may grant a higher degree of security than centralized anonymizing services where a central point exists that could disclose one's identity. An anonymous web browsing refers to browsing the World Wide Web while hiding the user's IP address and any other personally identifiable information from the websites that one is visiting. There are many ways of accomplishing anonymous web browsing. Anonymous web browsing is generally useful to internet users who want to ensure that their sessions cannot be monitored. For instance, it is used to circumvent traffic monitoring by organizations that want to find out or control which web sites employees visit. Further, since some web-sites response differently when approached from mobile devices, anonymity may allow for accessing such a web-site from a non-mobile device, posing as a mobile device.

WiFi. A device herein (such as the computer system 11) may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, a device may consist of, be part of, or include, a handheld PDA device, an on-board device, an off-board device, a hybrid device, a vehicular device, a non-vehicular device, a mobile device, or a portable device. A network herein (such as the LAN 14), may consist of, be part of, or include, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), or a Wireless PAN (WPAN). Alternatively or in addition, a network herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device which incorporates a wireless communication device, or a mobile/portable Global Positioning System (GPS) device. The communication interface 29 may consist of, be part of, or include, a transceiver or modem for communication with the network, such as LAN 14. In the case of wired networks, the communication interface 29 connects to the network via a port 28 that may include a connector, and in the case of wireless network, the communication interface 29 connects to the network via the port 28 that may include an antenna.

The LAN 14 may be a Wireless LAN (WLAN) such as according to, or base on, IEEE 802.11-2012, and the WLAN port may be a WLAN antenna and the WLAN transceiver may be a WLAN modem. The WLAN may be according to, or base on, IEEE 802.11a, IEEE 802.11b, IEEE 802.11g, IEEE 802.11n, or IEEE 802.11ac. Commonly referred to as Wireless Local Area Network (WLAN), such communication makes use of the Industrial, Scientific and Medical (ISM) frequency spectrum. In the US, three of the bands within the ISM spectrum are the A-B and, 902-928 MHz; the B-Band, 2.4-2.484 GHz (a.k.a. 2.4 GHz); and the C-Band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). The IEEE 802.11b standard describes a communication using the 2.4 GHz frequency band and supporting a communication rate of 11 Mb/s, IEEE 802.11a uses the 5 GHz frequency band to carry 54 MB/s, and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

Image/video. Any content herein may consist of, be part of, or include, an image or a video content. A video content may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. A intraframe or interframe compression may be used, and the compression may a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

DHCP. The Dynamic Host Configuration Protocol (DHCP) is a standardized networking protocol used on Internet Protocol (IP) networks for dynamically distributing network configuration parameters, such as IP addresses for interfaces and services. With DHCP, network elements request IP addresses and networking parameters automatically from a DHCP server, reducing the need for a network administrator or a user to configure these settings manually.

DHCP is typically used by network elements for requesting Internet Protocol parameters, such as an IP address from a network server, and is based on the client-server model. When a network element connects to a network, its DHCP client software in the operating system sends a broadcast query requesting necessary information. Any DHCP server on the network may service the request. The DHCP server manages a pool of IP addresses and information about client configuration parameters such as default gateway, domain name, the name servers, and time servers. On receiving a request, the server may respond with specific information for each client, as previously configured by an administrator, or with a specific address and any other information valid for the entire network, and the time period for which the allocation (lease) is valid. A host typically queries for this information immediately after booting, and periodically thereafter before the expiration of the information. When an assignment is refreshed by the client computer, it initially requests the same parameter values, and may be assigned a new address from the server, based on the assignment policies set by administrators.

Depending on implementation, the DHCP server may have three methods of allocating IP-addresses: (a) Dynamic allocation, where a network administrator reserves a range of IP addresses for DHCP, and each client computer on the LAN is configured to request an IP address from the DHCP server during network initialization. The request-and-grant process uses a lease concept with a controllable time period, allowing the DHCP server to reclaim (and then reallocate) IP addresses that are not renewed. (b) Automatic allocation, where the DHCP server permanently assigns an IP address to a requesting client from the range defined by the administrator. This is similar to dynamic allocation, but the DHCP server keeps a table of past IP address assignments, so that it can preferentially assign to a client the same IP address that the client previously had. (c) Static allocation, where the DHCP server allocates an IP address based on a preconfigured mapping to each client's MAC address.

DHCP used for Internet Protocol version 4 (IPv4) is described in IETF RFC 2131, entitled "*Dynamic Host Configuration Protocol*", and DHCP for IPv6 is described IETF RFC 3315, entitled: "*Dynamic Host Configuration Protocol for IPv6* (*DHCPv6*)", both incorporated in their entirety for all purposes as if fully set forth herein. While both versions serve the same purpose, the details of the protocol for IPv4 and IPv6 are sufficiently different that they may be considered separate protocols. For IPv6 operation, devices may alternatively use stateless address auto-configuration. IPv4 hosts may also use link-local addressing to achieve operation restricted to the local network link.

The DHCP protocol employs a connectionless service model, using the User Datagram Protocol (UDP). It is implemented with two UDP port numbers for its operations, which are the same as for the BOOTP protocol. The UDP port number 67 is the destination port of a server, and the UDP port number 68 is used by the client. DHCP operations fall into four phases: Server discovery, IP lease offer, IP request, and IP lease acknowledgment. These stages are often abbreviated as DORA for discovery, offer, request, and acknowledgment. The DHCP protocol operation begins with clients broadcasting a request. If the client and server are on different subnets, a DHCP Helper or DHCP Relay Agent may be used. Clients requesting renewal of an existing lease may communicate directly via an UDP unicast, since the client already has an established IP address at that point.

Gateway. The term 'gateway' is used herein to include, but not limited to, a network element (or node) that is equipped for interfacing between networks that uses different protocols. A gateway typically contains components such as protocol translators, impedance matching devices, rate converters, fault isolators, or signal translators, as necessary to provide networking interoperability. A gateway may be a router or a proxy server that routes between networks, and may operate at any network layer. In a network for an enterprise, a computer server acting as a gateway node is often also acting as a proxy server and a firewall server. A gateway is often associated with both a router, which knows where to direct a given packet of data that arrives at the gateway, and a switch, which furnishes the actual path in and out of the gateway for a given packet.

A subnet mask is a mask used to determine what subnet belongs to an IP address. An IP address has two components, the network address and the host address. For example, consider the IP address 150.215.017.009. Assuming this is part of a Class B network, the first two numbers (150.215) represent the Class B network address, and the second two numbers (017.009) identify a particular host on this network. A subnetting enables the network administrator to further divide the host part of the address into two or more subnets. In this case, a part of the host address is reserved to identify the particular subnet. On an IP network, clients should automatically send IP packets with a destination outside a given subnet mask to a network gateway. A subnet mask defines the IP range of a private network. For example, if a private network has a base IP address of 192.168.0.0 and has a subnet mask of 255.255.255.0, then any data going to an IP address outside of 192.168.0.X will be sent to that network gateway. While forwarding an IP packet to another network, the gateway might or might not perform Network Address Translation (NAT).

Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "*Role of the Domain Name System* (*DNS*)", in the IETF RFC 6195 entitled: "*Domain Name System* (*DNS*) *IANA Considerations*", and in the IETF RFC 1591 entitled: "*Domain Name System Structure and Delegation*", which are incorporated in their entirety for all purposes as if fully set forth herein.

VPN. Computer networks may use a tunneling protocol where one network protocol (the delivery protocol) encapsulates a different payload protocol. Tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using tunneling a payload may be carried over an incompatible delivery-network, or provide a secure path through an untrusted network.

Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. The HTTP stream with its covert channel is termed an HTTP tunnel. HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. A VPN client typically uses special TCP/IP-based protocols, called tunneling protocols, to make a virtual call to a virtual port on a VPN server. In a typical VPN deployment, a client initiates a virtual point-to-point connection to a remote access server over the Internet, and then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection.

Commonly there are two types of VPN connections, referred to as Remote Access VPN and Site-to-Site VPN. Popular VPN connections use PPTP, L2TP/IPsec, or SSTP protocols. PPTP is described in IETF RFC 2637 entitled: "*Point-to-Point Tunneling Protocol* (*PPTP*)", L2TP is described in IETF RFC 2661 entitled: "*Layer Two Tunneling Protocol "L2TP"*", which are both incorporated in their entirety for all purposes as if fully set forth herein. VPN and VPN uses are described in Cisco Systems, Inc. 2001 publication entitled: "IP Tunneling and VPNs", and in Cisco Systems, Inc. 2001 handbook 'Internetworking Technologies Handbook' [No. 1-58705-001-3] chapter 18 entitled: "Virtual Private Networks", and in IBM Corporation Redbook series publications entitled: "*A Comprehensive Guide to Virtual Private Networks*" including "*Vol. I: IBM Firewall, Server and Client Solutions*" [SG24-5201-00, June 1998], "*Vol II: IBM Nways Router Solutions*" [SG24-5234-01, November 1999], and "*Vol III: Cross-Platform Key and Policy Management*" [SG24-5309-00, November 1999], which are all incorporated in their entirety for all purposes as if fully set forth herein.

VPN and its uses are further described in the IETF RFC 4026 entitled: "*Provider Provisioned Virtual Private Network* (*VPN*) *Terminology*" that describes provider provisioned Virtual Private Network (VPN), in the IETF RFC 2764 entitled: "*A Framework for IP Based Virtual Private Networks*" that describes a framework for Virtual Private Networks (VPNs) running across IP backbones, in the IETF RFC 3931 entitled: "*Layer Two Tunneling Protocol—Version* 3 (*L2TPv*3)", and in the IETF RFC 2547 entitled: "*BGP/MPLS VPNs*" that provides a VPN method based on MPLS (Multiprotocol Label Switching) and BGP (Border Gateway Protocol), which are all incorporated in their entirety for all purposes as if fully set forth herein.

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices, or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link. A site-to-site VPN connection connects two portions of a private network. The VPN server provides a routed connection to the network to which the VPN server is attached. The calling router (the VPN client) authenticates itself to the answering router (the VPN server), and for mutual authentication, the answering router authenticates itself to the calling router. In the site-to site VPN connection, the packets sent from either router across the VPN connection typically do not originate at the routers.

Negotiating encryption keys may involve performing Internet Key Exchange (IKE or IKEv2) as part of establishing a session under the Security Protocol for the Internet (IPSec), as described in IETF RFC 2409 entitled: "*The Internet Key Exchange* (*IKE*)", and in RFC 4306 entitled: "*Internet Key Exchange* (*IKEv*2) *Protocol*", which are both incorporated in their entirety for all purposes as if fully set forth herein. Alternatively or in addition, negotiating encryption keys may involve performing RSA Key Exchange or Diffie-Helman Key Exchange described in IETF RFC 2631 entitled: "*Diffie-Hellman Key Agreement Method*", which is incorporated in its entirety for all purposes as if fully set forth herein, as part of establishing a session under the Secure Socket Layer (SSL) or Transport Layer Security (TLS) protocol.

Tunnel. As used herein, the term 'tunnel' includes an intermediary program which is acting as a blind relay between two connections. Once active, a tunnel is not considered a party to the HTTP communication, though the tunnel may have been initiated by an HTTP request. The tunnel ceases to exist when both ends of the relayed connections are closed.

Proxy. As used herein, the term 'proxy' includes an intermediary program which acts as both a server and a client for the purpose of making requests on behalf of other clients. Requests are serviced internally or by passing them on, with possible translation, to other servers. A proxy MUST implement both the client and server requirements of this specification. A "transparent proxy" is a proxy that does not modify the request or response beyond what is required for proxy authentication and identification. A "non-transparent proxy" is a proxy that modifies the request or response in order to provide some added service to the user agent, such as group annotation services, media type transformation, protocol reduction, or anonymity filtering. Except where either transparent or non-transparent behavior is explicitly stated, an HTTP proxy requirements apply to both types of proxies, and is described in IETF RFC 2616, entitled: "*Hypertext Transfer Protocol—HTTP*/1.1".

HTTP Proxy. A proxy server is a server (a computer system or an application) that acts as an intermediary for requests from clients seeking resources from other servers. A client connects to the proxy server, requesting some service, such as a file, connection, web page, or other resource available from a different server and the proxy server evaluates the request as a way to simplify and control its complexity. Proxies were invented to add structure and encapsulation to distributed systems. Today, most proxies are web proxies, facilitating access to content on the World Wide Web, providing anonymity and may be used to bypass IP address blocking.

A proxy server may reside on the user's local computer, or at various points between the user's computer and destination servers on the Internet, and a proxy server that passes requests and responses unmodified is usually called a gateway or sometimes a tunneling proxy. A forward proxy is an Internet-facing proxy used to retrieve from a wide range of sources (in most cases anywhere on the Internet), and a reverse proxy is usually an internal-facing proxy used as a front-end to control and protect access to a server on a private network. A reverse proxy commonly also performs tasks such as load-balancing, authentication, decryption or caching. An open proxy is a forwarding proxy server that is accessible by any Internet user. An anonymous open proxy allows users to conceal their IP address while browsing the Web or using other Internet services. There are varying degrees of anonymity however, as well as a number of methods of 'tricking' the client into revealing itself regardless of the proxy being used.

A reverse proxy (or surrogate) is a proxy server that appears to clients to be an ordinary server. Requests are forwarded to one or more proxy servers which handle the request. The response from the proxy server is returned as if it came directly from the original server, leaving the client no knowledge of the origin servers. Reverse proxies are installed in the neighborhood of one or more web servers. All traffic coming from the Internet and with a destination of one of the neighborhood's web servers goes through the proxy server. The use of "reverse" originates in its counterpart "forward proxy" since the reverse proxy sits closer to the web server and serves only a restricted set of websites.

A 'transparent proxy' is a proxy that does not modify the request or response beyond what is required for proxy authentication and identification. Transparent proxy, also known as an intercepting proxy, inline proxy, or forced proxy, is a proxy that intercepts normal communication at the network layer without requiring any special client configuration. Clients need not be aware of the existence of the proxy. A transparent proxy is normally located between the client and the Internet, with the proxy performing some of the functions of a gateway or router. A 'non-transparent proxy' is a proxy that modifies the request or response in order to provide some added service to the user agent, such as group annotation services, media type transformation, protocol reduction, or anonymity filtering. TCP Intercept is a traffic filtering security feature that protects TCP servers from TCP SYN flood attacks, which are a type of denial-of-service attack. TCP Intercept is available for IP traffic only. Intercepting proxies are commonly used in businesses to enforce acceptable use policy, and to ease administrative overheads, since no client browser configuration is required. This second reason however is mitigated by features such as Active Directory group policy, or DHCP and automatic proxy detection. Intercepting proxies are also commonly used by ISPs in some countries to save upstream bandwidth and improve customer response times by caching.

HTTP tunneling. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. The HTTP stream with its covert channel is termed an HTTP tunnel, and an HTTP tunnel software consists of client-server HTTP tunneling applications that integrate with existing application software, permitting them to be used in conditions of restricted network connectivity including firewalled networks, networks behind proxy servers, and network address translation.

An HTTP tunnel is used most often as a means for communication from network locations with restricted connectivity—most often behind NATs, firewalls, or proxy servers, and most often with applications that lack native support for communication in such conditions of restricted connectivity. Restricted connectivity in the form of blocked TCP/IP ports, blocking traffic initiated from outside the network, or blocking of all network protocols except a few is a commonly used method to lock down a network to secure it against internal and external threats.

HTTP CONNECT tunneling. A variation of HTTP tunneling when behind an HTTP proxy server is to use the "CONNECT" HTTP method. In this mechanism, the client asks an HTTP proxy server to forward the TCP connection to the desired destination. The server then proceeds to make the connection on behalf of the client. Once the connection has been established by the server, the proxy server continues to proxy the TCP stream to and from the client. Note that only the initial connection request is HTTP—after that, the server simply proxies the established TCP connection. This mechanism is how a client behind an HTTP proxy can access websites using SSL or TLS (i.e. HTTPS). Not all HTTP proxy servers support this feature, and even those that do may limit the behavior (for example only allowing connections to the default HTTPS port 443, or blocking traffic which doesn't appear to be SSL).

HTTP tunneling without using CONNECT. In some networks, the use of CONNECT method is restricted to some trusted sites. In such cases, an HTTP tunnel can still be implemented using only the usual HTTP methods as POST, GET, PUT and DELETE. This is similar to the approach used in Bidirectional-streams Over Synchronous HTTP (BOSH). In this proof-of-concept program, the server runs outside the protected network and acts as a special HTTP server. The client program is run on a computer inside the protected network. Whenever any network traffic is passed from the client, the client repackages the traffic data as an HTTP request and relays the data to the outside server, which extracts and executes the original network request for the client. The response to the request, sent to the server, is then repackaged as an HTTP response and relayed back to the client. Since all traffic is encapsulated inside normal GET and POST requests and responses, this approach works through most proxies and firewalls.

SOCKS. Socket Secure (SOCKS) is an Internet protocol that performs at Layer 5 of the OSI model (the session layer, an intermediate layer between the presentation layer and the transport layer) that exchanges network packets between a client and server through a proxy server. SOCKS5 additionally provides authentication so only authorized users may access a server. Practically, a SOCKS server proxies TCP connections to an arbitrary IP address, and provides a means for UDP packets to be forwarded. SOCKS server accepts incoming client connection on TCP port 1080. SOCKS is a de facto standard for circuit-level gateways, and is also used as a circumvention tool, allowing traffic to bypass Internet filtering to access content otherwise blocked, e.g., by governments, workplaces, schools, and country-specific web services. Client software must have native SOCKS support in order to connect through SOCKS.

Further, the SOCKS protocol provides a framework for client-server applications in both the TCP and UDP domains to conveniently and securely use the services of a network firewall. The protocol is conceptually a "shim-layer" between the application layer and the transport layer, and as such does not provide network-layer gateway services, such as forwarding of ICMP messages. SOCKS protocol typically relays TCP sessions at a firewall host to allow application users transparent access across the firewall. Because the protocol is independent of application protocols, it can be (and has been) used for many different services, such as telnet, ftp, finger, whois, gopher, WWW, etc. Access control can be applied at the beginning of each TCP session; thereafter the server simply relays the data between the client and the application server, incurring minimum processing overhead. Since SOCKS never has to know anything about the application protocol, it should also be easy for it to accommodate applications which use encryption to protect their traffic from nosey snoopers.

SOCKS operates at a lower level than HTTP proxying: SOCKS uses a handshake protocol to inform the proxy software about the connection that the client is trying to make, and then acts as transparently as possible, whereas a regular proxy may interpret and rewrite headers (say, to employ another underlying protocol, such as FTP; however, an HTTP proxy simply forwards an HTTP request to the desired HTTP server). Though HTTP proxying has a different usage model in mind, the CONNECT method allows for forwarding TCP connections; however, SOCKS proxies can also forward UDP traffic and work in reverse, while HTTP proxies cannot. HTTP proxies are traditionally more aware of the HTTP protocol, performing higher-level filtering (though that usually only applies to GET and POST methods, not the CONNECT method). SOCKS4a extends the SOCKS4 protocol to allow a client to specify a destination domain name rather than an IP address; this is useful when the client itself cannot resolve the destination host's domain name to an IP address.

The SOCKS5 protocol is defined in RFC 1928 dated March 1996 and entitled: "*SOCKS Protocol Version* 5", which is incorporated in its entirety for all purposes as if fully set forth herein. It is an extension of the SOCKS4 protocol; it offers more choices for authentication and adds support for IPv6 and UDP, the latter of which can be used for DNS lookups. The protocol specification for SOCKS Version 5 RFC 1929 dated March 1996 and entitled: "*Username/Password Authentication for SOCKS V*5", which is incorporated in its entirety for all purposes as if fully set forth herein, specifies a generalized framework for the use of arbitrary authentication protocols in the initial socks connection setup, and describes one of those protocols, as it fits into the SOCKS Version 5. RFC 1961 dated June 1996 entitled: "*GSS-API Authentication Method for SOCKS Version* 5", which is incorporated in its entirety for all purposes as if fully set forth herein, provides the specification for the SOCKS V5 GSS-API authentication protocol, and defines a GSS-API-based encapsulation for provision of integrity, authentication and optional confidentiality. RFC 3089 dated April 2001 entitled: "*A SOCKS-based IPv6/IPv*4 *Gateway Mechanism*", which is incorporated in its entirety for all purposes as if fully set forth herein, describes a SOCKS-based IPv6/IPv4 gateway mechanism that enables smooth heterogeneous communications between the IPv6 nodes and IPv4 nodes.

WebSocket. WebSocket is a computer communications protocol, providing full-duplex communication channels over a single TCP connection. The WebSocket Protocol enables two-way communication between a client running untrusted code in a controlled environment to a remote host that has opted-in to communications from that code. The security model used for this is the origin-based security model commonly used by web browsers. The protocol consists of an opening handshake followed by basic message framing, layered over TCP. The goal of this technology is to provide a mechanism for browser-based applications that need two-way communication with servers that does not rely on opening multiple HTTP connections (e.g., using XMLHttpRequest or <iframe>s and long polling). The WebSocket protocol is defined in RFC 6455 dated December 2011 and entitled: "*The WebSocket Protocol*", which is incorporated in its entirety for all purposes as if fully set forth herein.

While both WebSocket and HTTP protocols are located at layer 7 in the OSI model and, as such, depend on TCP at layer 4, and while WebSocket is designed to work over HTTP ports 80 and 443 as well as to support HTTP proxies and intermediaries, the protocols are different. Unlike HTTP, WebSocket provides full-duplex communication, and in addition, WebSocket enables streams of messages on top of TCP. TCP alone deals with streams of bytes with no inherent concept of a message. To achieve compatibility, the WebSocket handshake uses the HTTP Upgrade header to change from the HTTP protocol to the WebSocket protocol. The WebSocket protocol enables interaction between a web client (e.g. a browser) and a web server with lower overheads, facilitating real-time data transfer from and to the server. This is made possible by providing a standardized way for the server to send content to the client without being first requested by the client, and allowing for messages to be passed back and forth while keeping the connection open. In this way, a two-way (bi-directional) ongoing conversation can take place between the client and the server. The communications are done over TCP port number 80 (or 443 in the case of TLS-encrypted connections), which is of benefit for those environments which block non-web Internet connections using a firewall.

The WebSocket protocol specification defines ws (WebSocket) and wss (WebSocket Secure) as two new Uniform Resource Identifier (URI) schemes that are used for unencrypted and encrypted connections, respectively. Apart from the scheme name and fragment (# is not supported), the rest of the URI components are defined to use URI generic syntax. Using browser developer tools, developers can inspect the WebSocket handshake as well as the WebSocket frames. WebSocket protocol client implementations try to detect if the user agent is configured to use a proxy when connecting to destination host and port and, if it is, uses HTTP CONNECT method to set up a persistent tunnel.

While the WebSocket protocol itself is unaware of proxy servers and firewalls, it features an HTTP-compatible handshake thus allowing HTTP servers to share their default HTTP and HTTPS ports (80 and 443) with a WebSocket gateway or server. The WebSocket protocol defines a ws:// and wss:// prefix to indicate a WebSocket and a WebSocket Secure connection, respectively. Both schemes use an HTTP upgrade mechanism to upgrade to the WebSocket protocol. Some proxy servers are transparent and work fine with WebSocket; others will prevent WebSocket from working correctly, causing the connection to fail. In some cases, additional proxy server configuration may be required, and certain proxy servers may need to be upgraded to support WebSocket. If unencrypted WebSocket traffic flows through an explicit or a transparent proxy server without WebSockets support, the connection will likely fail.

Further, if an encrypted WebSocket connection is used, then the use of Transport Layer Security (TLS) in the WebSocket Secure connection ensures that an HTTP CONNECT command is issued when the browser is configured to use an explicit proxy server. This sets up a tunnel, which provides low-level end-to-end TCP communication through the HTTP proxy, between the WebSocket Secure client and the WebSocket server. In the case of transparent proxy servers, the browser is unaware of the proxy server, so no HTTP CONNECT is sent. However, since the wire traffic is encrypted, intermediate transparent proxy servers may simply allow the encrypted traffic through, so there is a much better chance that the WebSocket connection will succeed if WebSocket Secure is used.

Firewall. As used herein, the term 'firewall' is a device that inspects network traffic passing through it, and may perform actions, such as denying or permitting passage of the traffic based on a set of rules. Firewalls may be implemented as stand-alone network devices or, in some cases, integrated in a single network device, such as a router or switch that performs other functions. For instance, a network switch may perform firewall related functions as well as switching functions. A firewall may be implemented using a hardware and/or software-based, and may include all necessary subsystems that may control incoming and outgoing network traffic based on an applied rule set. A firewall may be used to establish a barrier between a trusted, secure internal network and another network, such as the Internet, that may not be secure and trusted. Firewalls exist both as software to run on general purpose hardware and as a hardware appliance. Many hardware-based firewall environments also offer other functionalities to the internal network that the firewall environments protect.

NAT Traversal. Network Address Translator (NAT) traversal is a networking technique of establishing and maintaining Internet protocol connections across gateways that implement network address translation (NAT). NAT traversal techniques are required for many network applications, such as peer-to-peer file sharing and Voice over IP. NAT devices are commonly used to alleviate IPv4 address exhaustion by allowing the use of private IP addresses on private networks behind routers with a single public IP address facing the public Internet. The internal network devices communicate with hosts on the external network by changing the source address of outgoing requests to that of the NAT device and relaying replies back to the originating device. NAT traversal techniques usually bypass enterprise security policies. Enterprise security experts prefer techniques that explicitly cooperate with NAT and firewalls, allowing NAT traversal while still enabling marshalling at the NAT to enforce enterprise security policies. IETF standards based on this security model are Realm-Specific IP (RSIP) and middlebox communications (MIDCOM).

Various NAT traversal techniques are available, such as WebSocket (ws) or WebSocket Secure (wss), Socket Secure (SOCKS) that uses proxy servers to relay traffic between networks or systems, Traversal Using Relays around NAT (TURN) that is a relay protocol designed specifically for NAT traversal, NAT hole punching is a general technique that exploits how NATs handle some protocols (for example, UDP, TCP, or ICMP) to allow previously blocked packets through the NAT, Session Traversal Utilities for NAT (STUN) is a standardized set of methods and a network protocol for NAT hole punching. It was designed for UDP but was also extended to TCP, Interactive Connectivity Establishment (ICE) is a complete protocol for using STUN and/or TURN to do NAT traversal while picking the best network route available, UPnP Internet Gateway Device Protocol (IGDP) is supported by many small NAT gateways in home or small office settings. It allows a device on a network to ask the router to open a port, NAT-PMP is a protocol introduced by Apple as an alternative to IGDP, PCP is a successor of NAT-PMP, and Application-Level Gateway (ALG) is a component of a firewall or NAT that allows for configuring NAT traversal filters.

IPsec virtual private network clients use NAT traversal in order to have Encapsulating Security Payload packets traverse NAT. IPsec uses several protocols in its operation which must be enabled to traverse firewalls and network address translators: Internet Key Exchange (IKE)—User Datagram Protocol (UDP) port 500, Encapsulating Security Payload (ESP)—IP protocol number 50, Authentication Header (AH)—IP protocol number 51, and IPsec NAT traversal—UDP port 4500, when NAT traversal is in use. Many routers provide explicit features, often called 'IPsec Passthrough'. NAT traversal and IPsec may be used to enable opportunistic encryption of traffic between systems. NAT traversal allows systems behind NATs to request and establish secure connections on demand.

NAT Traversal techniques, method, utilities and uses are described in the IETF RFC 2663 (dated August 1999) entitled: "*IP Network Address Translator* (*NAT*) *Terminology and Considerations*", in the IETF RFC 3715 (dated March 2004) entitled: "*IPsec-Network Address Translation* (*NAT*) *Compatibility Requirements*", in the IETF RFC 3947 (dated January 2005) entitled: "*Negotiation of NAT-Traversal in the IKE*", in the IETF RFC 5128 (dated March 2008) entitled: "*State of Peer-to-Peer* (*P2P*) *Communication across Network Address Translators* (*NATs*)", in the IETF RFC 5245 (dated April 2010) entitled: "*Interactive Connectivity Establishment* (*ICE*): *A Protocol for Network Address Translator* (*NAT*) *Traversal for Offer/Answer Protocols*", in the IETF RFC 5389 (dated October 2008) entitled: "*Session Traversal Utilities for NAT* (*STUN*)", and in the IETF RFC 7350 (dated August 2014) entitled: "*Datagram Transport Layer Security* (*DTLS*) *as Transport for Session Traversal Utilities for NAT* (*STUN*)", which are all incorporated in their entirety for all purposes as if fully set forth herein. One of the simplest but most robust and practical NAT traversal techniques, commonly known as "hole punching", is described in a paper by Bryan Ford (of Massachusetts Institute of Technology), Pyda Srisuresh (of Caymas Systems, Inc.) and Dan Kegel published 2008 and entitled: "*Peer-to-Peer Communication Across Network Address Translators*", which is incorporated in its entirety for all purposes as if fully set forth herein. The paper documents and analyzes Hole punching for UDP communication, and how it can be reliably used to set up peer-to-peer TCP streams as well. NAT traversal techniques in P2P networks are described in a paper dated January 2008 by Huynh Cong Phuoc, Ray Hunt, and Andrew McKenzie (all of University of Canterbury, Chistchurch, New Zealand) entitled: "*NAT Traversal Techniques in Peer-to-Peer Networks*", which is incorporated in its entirety for all purposes as if fully set forth herein. Initially Network Address Translation (NAT) detection is categorized and both UDP and TCP traversal techniques are discussed. Methodologies such as Relaying, Connection Reversal, and Hole Punching are then analyzed. Finally the development of a testbed is described which can be used to evaluate NAT traversal techniques and to determine appropriate configurations in order to achieve P2P networking.

Sharding. Database systems with large data sets and high throughput applications can challenge the capacity of a single server. High query rates can exhaust the CPU capacity of the server, and larger data sets exceed the storage capacity of a single machine. Further, working set sizes larger than the system's RAM stress the I/O capacity of disk drives. To address these issues of scales, database systems have two basic approaches: vertical scaling and sharding. Vertical scaling adds more CPU and storage resources to increase capacity. Scaling by adding capacity has limitations: high performance systems with large numbers of CPUs and large amount of RAM are disproportionately more expensive than smaller systems. Additionally, cloud-based providers may only allow users to provision smaller instances. As a result there is a practical maximum capability for vertical scaling. Sharding, or horizontal scaling, by contrast, divides the data set and distributes the data over multiple servers, or shards. Each shard is an independent database, and collectively, the shards make up a single logical database.

A database shard is a horizontal partition of data in a database or search engine, where each individual partition is referred to as a shard or database shard. Each shard is held on a separate database server instance, to spread load. Some data within a database remains present in all shards, but some appears only in a single shard. Each shard (or server) acts as the single source for this subset of data. Horizontal partitioning is a database design principle whereby rows of a database table are held separately, rather than being split into columns (which is what normalization and vertical partitioning do, to differing extents). Each partition forms part of a shard, which may in turn be located on a separate database server or physical location.

Since the tables are divided and distributed into multiple servers, the total number of rows in each table in each database is reduced. This reduces index size, which generally improves search performance. A database shard can be placed on separate hardware, and multiple shards can be placed on multiple machines. This enables a distribution of the database over a large number of machines, greatly improving performance. In addition, if the database shard is based on some real-world segmentation of the data (e.g., European customers v. American customers) then it may be possible to infer the appropriate shard membership easily and automatically, and query only the relevant shard.

Horizontal partitioning splits one or more tables by row, usually within a single instance of a schema and a database server. It may offer an advantage by reducing index size (and thus search effort) provided that there is some obvious, robust, implicit way to identify in which partition a particular row will be found, without first needing to search the index. Splitting shards across multiple isolated instances requires more than simple horizontal partitioning. The hoped-for gains in efficiency would be lost, if querying the database required both instances to be queried, just to retrieve a simple dimension table. Beyond partitioning, sharding thus splits large partitionable tables across the servers, while smaller tables are replicated as complete units.

Database sharding is described in a white paper published April 2017 by Oracle Corporation (having a World Headquarters at 500 Oracle Parkway, Redwood Shores, CA 94065, USA) entitled: "*Oracle Sharding: Linear Scalability, Fault Isolation and Geo-distribution for Web-scale OLTP Applications*", and in an MongoDB Documentation Project paper dated Jan. 12, 2015 (Release 2.8.0-rc3) entitled: "*Sharding and MongoDB*", which are both incorporated in their entirety for all purposes as if fully set forth herein.

Multihoming. Multihoming refers to the practice of connecting a host or a computer network to more than one network, in order to increase reliability or performance, or to reduce cost. While a typical host or end-user network is connected to just one network, in many circumstances it can be useful to connect a host or network to multiple networks, in order to increase reliability (if a single link fails, packets can still be routed through the remaining networks), to improve performance (depending on the destination, it may be more efficient to route through one network or the other) and to decrease cost (depending on the destination, it may be cheaper to route through one network or the other).

There are several different ways to perform multihoming. In host multihoming, a single host may be connected to multiple networks. For example, a mobile phone might be simultaneously connected to a WiFi network and a 3G network, and a desktop computer might be connected to both a home network and a VPN. A multihomed host usually is assigned multiple addresses, one per connected network. In classical multihoming a network is connected to multiple providers, and uses its own range of addresses (typically from a Provider Independent (PI) range). The network's edge routers communicate with the providers using a dynamic routing protocol, typically BGP, which announces the network's address range to all providers. If one of the links fail, the dynamic routing protocol recognizes the failure within seconds or minutes, and reconfigures its routing tables to use the remaining links, transparently to the hosts. Classical multihoming is costly, since it requires the use of address space that is accepted by all providers, a public Autonomous System (AS) number, and a dynamic routing protocol. Since multihomed address space cannot be aggregated, it causes growth of the global routing table. In multihoming with multiple addresses approach, the network is connected to multiple providers, and assigned multiple address ranges, one for each provider. Hosts are assigned multiple addresses, one for each provider. Multihoming with multiple addresses is cheaper than classical multihoming, and can be used without any cooperation from the providers (e.g., in a home network) but requires additional technology in order to perform routing: for incoming traffic, hosts must be associated with multiple A or AAAA DNS records so that they are reachable through all providers; and for outgoing traffic, a technique such as source-specific routing must be used to route packets through the correct provider, and reasonable source address selection policies must be implemented by hosts. Classical multihoming is the dominant technique for IPv4, and requires that a network have its own public IP address range and a public Autonomous System (AS) number. It is also possible to implement multihoming for IPv4 using multiple NAT gateways.

Both classical multihoming and multihoming with multiple addresses may be used in IPv6. When using classical multihoming, the Provider Independent Address Space (PI) that is available in IPv6 may be used. This technique has the advantage of working like IPv4, supporting traffic balancing across multiple providers, and maintaining existing TCP and UDP sessions through cut-overs. Multihoming with multiple addresses may be implemented for IPv6, where for outgoing traffic, the host uses either protocol agnostic (Multipath TCP, SCTP, etc.) or IPv6 specific (e.g. SHIM6). The functional requirements and possible solutions for multihoming without the use of NAT in IPv6 for hosts and small IPv6 networks are described in the IETF RFC 7157 (dated March 2014) entitled: "*IPv6 Multihoming without Network Address Translation*", which is incorporated in its entirety for all purposes as if fully set forth herein.

DNS. Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "*Role of the Domain Name System* (*DNS*)", in the IETF RFC 6195 entitled: "*Domain Name System* (*DNS*) *IANA Considerations*", and in the IETF RFC 1591 entitled: "*Domain Name System Structure and Delegation*", which are incorporated in their entirety for all purposes as if fully set forth herein.

A system for resolving Domain Name System (DNS) queries that contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to, is described in U.S. Pat. No. 8,671,221 to the same inventors as this application, entitled: "Method and System for Increasing Speed of Domain Name System Resolution within a Computing Device", which is incorporated in its entirety for all purposes as if fully set forth herein.

Systems and methods of storing previously transmitted data and using it to reduce bandwidth usage and accelerate future communications, and using algorithms to identify long compression history matches. A network device that may improve compression efficiency and speed is described in U.S. Pat. No. 7,865,585 to Samuels et al., entitled: "Systems and Methods for Providing Dynamic Ad Hok Proxy-Cache Hierarchies", which is incorporated in its entirety for all purposes as if fully set forth herein. Further, a method and system for accelerating the receipt of data in a client-to-client network described in U.S. Pat. No. 7,203,741 to Marco et al., entitled: "Method and System for Accelerating Receipt of Data in a Client-to-Client Network", which is incorporated in its entirety for all purposes as if fully set forth herein.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4 GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

BAN. A wireless network may be a Body Area Network (BAN) according to, compatible with, or based on, IEEE 802.15.6 standard, and communicating devices may comprise a BAN interface that may include a BAN port and a BAN transceiver. The BAN may be a Wireless BAN (WBAN), and the BAN port may be an antenna and the BAN transceiver may be a WBAN modem.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "*Master Table of Contents & Compliance Requirements—Specification Volume* 0", and in an article published 2012 in Sensors [ISSN 1424-8220] by Caries Gomez et al. [Sensors 2012, 12, 11734-11753; doi:10.3390/s120211734] entitled: "*Overview and Evaluation of Bluetooth Low Energy: An Emerging Low-Power Wireless Technology*", which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

NFC. Any wireless communication herein may be partly or in full in accordance with, compatible with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in ISO/IEC 18000-3 air interface, and at data rates ranging from 106 Kbits to 424 Kbit/s. NFC commonly involves an initiator and a target; the initiator actively generates an RF field that may power a passive target. NFC peer-to-peer communication is possible, provided both devices are powered.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields, where a device deactivates its RF field while it is waiting for data. NFC typically uses Amplitude-Shift Keying (ASK), and employs two different schemes to transfer data. At the data transfer rate of 106 Kbit/s, a modified Miller coding with 100% modulation is used, while in all other cases, Manchester coding is used with a modulation ratio of 10%.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

Appliance. Home appliances are electrical and mechanical devices using technology for household use, such as food handling, cleaning, clothes handling, or environmental control. Appliances are commonly used in household, institutional, commercial or industrial setting, for accomplishing routine housekeeping tasks, and are typically electrically powered. The appliance may be a major appliance, also known as "White Goods", which is commonly large, difficult to move, and generally to some extent fixed in place (usually on the floor or mounted on a wall or ceiling), and is electrically powered from the AC power (mains) grid. Non-limiting examples of major appliances are washing machines, clothes dryers, dehumidifiers, conventional ovens, stoves, refrigerators, freezers, air-conditioners, trash compactors, furnaces, dishwasher, water heaters, microwave ovens and induction cookers. The appliance may be a small appliance, also known as "Brown Goods", which is commonly a small home appliance that is portable or semi-portable, and is typically a tabletop or a coutertop type. Examples of small appliances are television sets, CD and DVD players, HiFi and home cinema systems, telephone sets and answering machines, and beverage making devices such as coffee-makers and iced-tea makers.

Some appliances main function is food storage, commonly refrigeration related appliances such as refrigerators and freezers. Other appliances main function is food preparation, such as conventional ovens (stoves) or microwave ovens, electric mixers, food processors, and electric food blenders, as well as beverage makers such as coffee-makers and iced-tea makers. Few food related appliances, commonly found in a home kitchen, are illustrated in FIG. 4, showing a dishwasher 41, a food processor 42, a refrigerator 43, an oven 44, a mixer 45, and a microwave oven 46. Some appliances main function relates to cleaning, such as clothes cleaning. Clothes cleaning appliances examples are washing/laundry machines and clothes dryers. A vacuum cleaner is an appliance used to suck up dust and dirt, usually from floors and other surfaces. Few cleaning-related appliances are illustrated in FIG. 4*a*, showing a vacuum cleaner 47, a cloth dryer 48 and a washing machine 49, as well as a still digital camera 51 and a digital video camera 52. Some appliances main function relates to temperature control, such as heating and cooling. Air conditioners and heaters, as well as HVAC (Heating, Ventilation and Air Conditioning) systems, are commonly used for climate control, usually for thermal comfort for occupants of buildings or other enclosures. Similarly, water heaters are used for heating water.

The system may be used for lighting control, moisture control, freeze control, pet feeding, propane gauge, interior and exterior cameras, security, smoke alarms, or health monitoring. In one non-limiting example, a field unit may be integrated with a smoke detector assembly, which is typically housed in a disk-shaped plastic enclosure, which may be about 150 millimeters (6 inch) in diameter and 25 millimeters (1 inch) thick, and is commonly mounted on a ceiling or on a wall.

Wearables. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wristbands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left cheek, right eye, left eye, right ear, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attach to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attach to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewellery, muff, necktie, pocket protector, pocketwatch, sash, scarf, sunglasses, suspenders, umbrella, wallet, or wristwatch.

A wearable device may be releasably or permanently attach to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, a wearable device may be releasably or permanently attach to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, debutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attach to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, wearable devices may also be incorporated into pockets, steering wheels, keyboards, pens, and bicycle handles.

In one example, the wearable device may be shaped as, or integrated with, a device that includes an annular member defining an aperture therethrough that is sized for receipt therein of a human body part. The body part may be part of a human hand such as upper arm, elbow, forearm, wrist (such as a wrist-band), or a finger (such as a ring). Alternatively or in addition, the body part may be part of a human head or neck, such as a forehead, ear, skull, or face. Alternatively or in addition, the body part may be part of a human thorax or abdomen, such as waist or hip. Alternatively or in addition, the body part may be part of a human leg or foot, such as thigh, calf, ankle, instep, knee, or toe.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape. Further, the head may comprise an upper face that contains and is configured to show one or more jewels and/or ornamental designs.

A mobile communication device configured to be worn on an index finger of a user's hand is described in U.S. Patent Application Publication No. 2015/0373443 to Carroll entitled: "Finger-wearable mobile communication device", which is incorporated in its entirety for all purposes as if fully set forth herein. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

A user controls an external electronic device with a finger-ring-mounted touchscreen is described in U.S. Patent Application Publication No. 2015/0277559 to Vescovi et al. entitled: "Devices and Methods for a Ring Computing Device", which is incorporated in its entirety for all purposes as if fully set forth herein. The device includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device including a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

A wearable device and method for processing mages to prolong battery life are described in U.S. Pat. No. 8,957,988 to Wexler et al. entitled: "Apparatus for processing images to prolong battery life", which is incorporated in its entirety for all purposes as if fully set forth herein. In one implementation, a wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

A wearable device may be used for notifying a person, such as by using tactile, visual, or audible stimulus, as described for example in U.S. Patent Application No. 2015/0341901 to RYU et al. entitled: "Method and apparatus for providing notification", which is incorporated in its entirety for all purposes as if fully set forth herein, describing an electronic device that includes: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

A communication device, system and method are described for example in U.S. Patent Application No. 2007/0052672 to Ritter et al. entitled: "Communication device, system and method", which is incorporated in its entirety for all purposes as if fully set forth herein. It is discloses comprising a Virtual Retinal Display (VRD) in form of glasses (1), at least one haptic sensor (12) mounted on the frame of said glasses or connected by a short range communication interface (13) to said glasses (1), wherein it is possible to navigate by means of a cursor through an image displayed by the Virtual Retinal Display (VRD) with the at least one haptic sensor (12). A central control unit controls (11) the Virtual Retinal Display (VRD) and the at least one haptic sensor (12). When the Virtual Retinal Display (VRD) is connected to an external device (2, 9) by a short range communication interface (13), the user can navigate through the content of the external device (2, 9) by easy use of the haptic sensor (12).

Wearable communication devices, e.g. implemented in a watch, using short range communication to a cell phone, and facilitating natural and intuitive user interface with low-power implementation are described for example in U.S. Patent Application No. 2014/0045547 to Singamsetty et al. entitled: "Wearable Communication Device and User Interface", which is incorporated in its entirety for all purposes as if fully set forth herein. The devices allow a user to easily access all features of the phone, all while a phone is nearby but not visible. Notification is performed with vibration, an LED light and OLED text display of incoming calls, texts, and calendar events. It allows communicating hands-free. This allows using the communication device as "remote control" for home devices, etc. via voice and buttons. The device comprises interfaces motion sensors such as accelerometers, magnetometer and gyroscope, infrared proximity sensors, vibrator motor, and/or voice recognition. Low power consumption is achieved by dynamical configuration of sensor parameters to support only the necessary sensor functions at any given state of the device.

A wearable electronic device that is configured to control and command a variety of wireless devices within its proximity is described in U.S. Pat. No. 7,605,714 to Thompson et al. entitled: "System and method for command and control of wireless devices using a wearable device", which is incorporated in its entirety for all purposes as if fully set forth herein. The wearable device dynamically generates a user interface corresponding to the services of a particular wireless device. Through the user interface, the wireless device surface content to a user and allows a user select interactions with the wireless devices using the wearable device.

An apparatus and method for the remote control and/or interaction-with electronic-devices such as computers; home-entertainment-systems; media-centers; televisions; DVD-players; VCR-players; music systems; appliances; security systems; toys/games; and/or displays are described in U.S. Pat. No. 8,508,472 to Wieder entitled: "Wearable remote control with a single control button", which is incorporated in its entirety for all purposes as if fully set forth herein. A user may orient a pointer (e.g., laser pointer) to place a pointer-spot on/near object(s) on an active-display(s); and/or a fixed-display(s); and/or on real-world object(s) within a display region or pointer-spot detection-region. Detectors, imager(s) and/or camera(s) may be connected/attached to the display region and/or a structure that is connected/attached to display region. When the user initiates a "select", the detectors/cameras may detect the location of the pointer-spot within the display region. Corresponding to the user's selection(s); control action(s) may be performed on the device(s) being controlled/interacted-with and additional selection-menus may be optionally presented on an active-display.

A hand-worn controller consisting of a housing having a central opening sized to permit the controller to be worn as ring on the index finger of a human hand is described in U.S. Patent Application Publication No. 2006/0164383 to Machin et al. entitled: "Remote controller ring for user interaction", which is incorporated in its entirety for all purposes as if fully set forth herein. A joystick lever projects outwardly from said housing and is positioned to be manipulated by the user's thumb. The joystick operates on or more control devices, such as switches or potentiometers, that produce control signals. A wireless communications device, such as a Bluetooth module, mounted in said housing transmits command signals to a remote utilization device, which are indicative of the motion or position of said joystick lever.

A wearable augmented reality computing apparatus with a display screen, a reflective device, a computing device and a head mounted harness to contain these components is described in U.S. Patent Application Publication No. 2012/0050144 to Morlock entitled: "Wearable augmented reality computing apparatus", which is incorporated in its entirety for all purposes as if fully set forth herein. The display device and reflective device are configured such that a user can see the reflection from the display device superimposed on the view of reality. An embodiment uses a switchable mirror as the reflective device. One usage of the apparatus is for vehicle or pedestrian navigation. The portable display and general purpose computing device can be combined in a device such as a smartphone. Additional components consist of orientation sensors and non-handheld input devices.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Texas, U.S.A.) and described in a Texas Instrument 2015 publication #SWRT022 entitled: "*SimpleLink™ Ultra-Low Power—Wireless Microcontroller Platform*", and in a Texas Instrument 2015 datasheet #SWRS158A (published February 2015, Revised October 2015) entitled: "*CC2650 SimpleLink™ Multistandard Wireless MCU*", which are both incorporated in their entirety for all purposes as if fully set forth herein.

An example of a personal multimedia electronic device, and more particularly to a head-worn device such as an eyeglass frame, is described in U.S. Patent Application No. 2010/0110368 to Chaum entitled: "System and apparatus for eyeglass appliance platform", which is incorporated in its entirety for all purposes as if fully set forth herein. The device is having a plurality of interactive electrical/optical components. In one embodiment, a personal multimedia electronic device includes an eyeglass frame having a side arm and an optic frame; an output device for delivering an output to the wearer; an input device for obtaining an input; and a processor comprising a set of programming instructions for controlling the input device and the output device. The output device is supported by the eyeglass frame and is selected from the group consisting of a speaker, a bone conduction transmitter, an image projector, and a tactile actuator. The input device is supported by the eyeglass frame and is selected from the group consisting of an audio sensor, a tactile sensor, a bone conduction sensor, an image sensor, a body sensor, an environmental sensor, a global positioning system receiver, and an eye tracker. In one embodiment, the processor applies a user interface logic that determines a state of the eyeglass device and determines the output in response to the input and the state.

An example of an eyewear for a user is described in U.S. Patent Application No. 2012/0050668 Howell et al. entitled: "Eyewear with touch-sensitive input surface", which is incorporated in its entirety for all purposes as if fully set forth herein. The eyewear includes an eyewear frame, electrical circuitry at least partially in the eyewear frame, and a touch sensitive input surface on the eyewear frame configured to provide an input to the electrical circuitry to perform a function via touching the touch sensitive input surface. In another embodiment, the eyewear includes a switch with at least two operational states. The operational states of the switch can be configured to be changed by sliding a finger across the touch sensitive input surface of the frame.

An example of a wearable computing device is described in U.S. Patent Application No. 2013/0169513 to Heinrich et al. entitled: "Wearable computing device", which is incorporated in its entirety for all purposes as if fully set forth herein. The device includes a bone conduction transducer, an extension arm, a light pass hole, and a flexible touch pad input circuit. When a user wears the device, the transducer contacts the user's head. A display is attached to a free end of an extension arm. The extension arm is pivotable such that a distance between the display and the user's eye is adjustable to provide the display at an optimum position. The light pass hole may include a light emitting diode and a flash. The touch pad input circuit may be adhered to at least one side arm such that parting lines are not provided between edges of the circuit and the side arm.

Hash function. A hash function is any function that can be used to map data of arbitrary size to data of fixed size, and the values returned by a hash function are called hash values, hash codes, digests, or simply hashes. One use is a data structure called a hash table, widely used in computer software for rapid data lookup, where hash functions accelerate table or database lookup by detecting duplicated records in a large file. A cryptographic hash function allows one to easily verify that some input data maps to a given hash value, but if the input data is unknown, it is deliberately difficult to reconstruct it (or equivalent alternatives) by knowing the stored hash value. Hash functions may include checksums, check digits, fingerprints, lossy compression, randomization functions, error-correcting codes, and ciphers. Hash functions are described in an article by Jun Wang, Wei Liu, Sanjiv Kumar, and Shih-Fu Chang, Submitted on 17 Sep. 2015 to the PROCEEDINGS OF THE IEEE (http://arxiv.org/abs/1509.05472v1) entitled: "*Learning to Hash for Indexing Big Data—A Survey*", and in a book by Josef Pieprzyk and Babak Sadeghiyan, published 1993 by Springer-Verlag [ISBN 3-540-57500-6] entitled: "*Design of Hashing Algorithms*", which are both incorporated in their entirety for all purposes as if fully set forth herein. The concept of a hash table is a generalized idea of an array where key does not have to be an integer. We can have a name as a key, or for that matter any object as the key. Hash functions are used in hash tables, to quickly locate a data record (e.g., a dictionary definition) given its search key (the headword). Specifically, the hash function is used to map the search key to a list; the index gives the place in the hash table where the corresponding record should be stored. Hash tables, also, are used to implement associative arrays and dynamic sets. Typically, the domain of a hash function (the set of possible keys) is larger than its range (the number of different table indices), and so it will map several different keys to the same index which could result in collisions. So then, each slot of a hash table is associated with (implicitly or explicitly) a set of records, rather than a single record. For this reason, each slot of a hash table is often called a bucket, and hash values are also called bucket listing or a bucket index.

Good hash functions are usually required to satisfy certain properties listed below. The exact requirements are dependent on the application. For example, a hash function well suited to indexing data will probably be a poor choice for a cryptographic hash function. A hash procedure must be deterministic—meaning that for a given input value it must always generate the same hash value. In other words, it must be a function of the data to be hashed, in the mathematical sense of the term. This requirement excludes hash functions that depend on external variable parameters, such as pseudo-random number generators or the time of day. It also excludes functions that depend on the memory address of the object being hashed in cases that the address may change during execution, although sometimes rehashing of the item is possible. The determinism is in the context of the reuse of the function. Further, a good hash function should map the expected inputs as evenly as possible over its output range. That is, every hash value in the output range should be generated with roughly the same probability. The reason for this last requirement is that the cost of hashing-based methods goes up sharply as the number of collisions—pairs of inputs that are mapped to the same hash value—increases. If some hash values are more likely to occur than others, a larger fraction of the lookup operations will have to search through a larger set of colliding table entries. Note that this criterion only requires the value to be uniformly distributed, not random in any sense. A good randomizing function is (barring computational efficiency concerns) generally a good choice as a hash function, but the converse need not be true. Hash tables often contain only a small subset of the valid inputs. For instance, a club membership list may contain only a hundred or so member names, out of the very large set of all possible names. In these cases, the uniformity criterion should hold for almost all typical subsets of entries that may be found in the table, not just for the global set of all possible entries. When testing a hash function, the uniformity of the distribution of hash values can be evaluated by the chi-squared test.

It is often desirable that the output of a hash function have fixed size. If, for example, the output is constrained to 32-bit integer values, the hash values can be used to index into an array. Such hashing is commonly used to accelerate data searches. On the other hand, cryptographic hash functions produce much larger hash values, in order to ensure the computational complexity of brute-force inversion. For example, SHA-1, one of the most widely used cryptographic hash functions, produces a 160-bit value. Producing fixed-length output from variable length input can be accomplished by breaking the input data into chunks of specific size. Hash functions used for data searches use some arithmetic expression which iteratively processes chunks of the input (such as the characters in a string) to produce the hash value. In cryptographic hash functions, these chunks are processed by a one-way compression function, with the last chunk being padded if necessary. In this case, their size, which is called block size, is much bigger than the size of the hash value. For example, in SHA-1, the hash value is 160 bits and the block size 512 bits.

Further, in many applications, the range of hash values may be different for each run of the program, or may change along the same run (for instance, when a hash table needs to be expanded). In those situations, one needs a hash function which takes two parameters—the input data z, and the number n of allowed hash values. A common solution is to compute a fixed hash function with a very large range (say, 0 to 232−1), divide the result by n, and use the division's remainder. If n is itself a power of 2, this can be done by bit masking and bit shifting. When this approach is used, the hash function must be chosen so that the result has fairly uniform distribution between 0 and n−1, for any value of n that may occur in the application. Depending on the function, the remainder may be uniform only for certain values of n, e.g., odd or prime numbers.

IETF RFC 4634 (dated July 2006) entitled: "*US Secure Hash Algorithms* (*SHA and HMAC-SHA*)", which is incorporated in its entirety for all purposes as if fully set forth herein, describes a suite of Secure Hash Algorithms (SHAs), including four beyond SHA-1, as part of a Federal Information Processing Standard (FIPS), specifically SHA-224 (RFC 3874), SHA-256, SHA-384, and SHA-512. The purpose of this document is to make source code performing these hash functions conveniently available to the Internet community. The sample code supports input strings of arbitrary bit length. SHA-1's sample code from RFC 3174 has also been updated to handle input strings of arbitrary bit length. Most of the text herein was adapted by the authors from FIPS 180-2. IETF RFC 3874 (dated September 2004) entitled: "A 224-*bit One-way Hash Function: SHA*-224", which is incorporated in its entirety for all purposes as if fully set forth herein, describes a 224-bit one-way hash function, called SHA-224. The SHA-224 is based on SHA-256, but it uses a different initial value and the result is truncated to 224 bits.

A method for fetching a content from a web server to a client device is disclosed, using tunnel devices serving as intermediate devices is described in U.S. Pat. No. 9,241,044 to Shribman et al. entitled: "System and method for improving internet communication by using intermediate nodes", which is incorporated in its entirety for all purposes as if fully set forth herein (hereinafter—"the '044 Patent"). The client device accesses an acceleration server to receive a list of available tunnel devices. The requested content is partitioned into slices, and the client device sends a request for the slices to the available tunnel devices. The tunnel devices in turn fetch the slices from the data server, and send the slices to the client device, where the content is reconstructed from the received slices. A client device may also serve as a tunnel device, serving as an intermediate device to other client devices. Similarly, a tunnel device may also serve as a client device for fetching content from a data server. The selection of tunnel devices to be used by a client device may be in the acceleration server, in the client device, or in both. The partition into slices may be overlapping or non-overlapping, and the same slice (or the whole content) may be fetched via multiple tunnel devices.

In one example, the '044 patent describes an accessing to a data server is improved by using an intermediate device referred to as a 'tunnel' device that is executing a 'tunnel' flowchart. FIG. 5 shows a system 50 including two client devices, a client device #1 31*a* and a client device #2 31*b*, that may access the web servers (data servers) 22*a* and 22*b* using one or more of a tunnel device #1 33*a*, a tunnel device #2 33*b*, and a tunnel device #3 33*c*, under the management and control of an acceleration server 32. These network elements communicate with each other using the Internet 113.

A schematic messaging flow diagram 60 according to the '044 patent describing the client device #1 31*a* related 'content fetch' flowchart and the tunnel device #1 33*a* related flowchart is shown in FIG. 6. A 'Content Request' message 61*a* is first sent from the client device #1 31*a* to the selected tunnel device #1 33*a*, which responds by forwarding the request to the data server #1 22*a* using a 'Content Request' message 61*b*. In turn the data server #1 22*a* replies and sends the content in a 'Send Content' message 61*c* to the requesting tunnel device #1 33*a*, which in turn forward the fetched content to the asking client device #1 31*a* using a 'Send Content' message 61*d*.

While accessing the data server #1 22*a* was exampled above using the tunnel device #1 33*a* as an intermediary device, the system and the client #1 31*a* may use multiple tunnel devices in order to fetch the content from the same data server #1 22*a*. Two, three, four, or any other number of tunnel devices, serving as intermediary devices having the same or similar role as the tunnel device #1 33*a*, may be equally used. In one example, three tunnel devices may be used, such as adding the tunnel device #2 33*b* and the tunnel device #3 33*c*, shown in system 50 in FIG. 5.

In one example, three distinct data paths may be involved in the content fetching. In addition to the messaging data path 60, a messaging flow 60*a* shown in FIG. 6*a* describes the usage of the tunnel device #2 33*b* as an intermediary device, relating to the client device #1 31*a* 'content fetch' related flowchart and the tunnel device #2 33*b* related flowchart. A 'Content Request' message 62*a* is first sent from the client device #1 31*a* to the selected tunnel device #2 33*b*, which responds by forwarding the request to the data server #1 22*a* using a 'Content Request' message 62*b*. In turn the data server #1 22*a* replies and sends the content in a 'Send Content' message 62*c* to the requesting tunnel device #2 33*b*, which in turn forward the fetched content to the asking client device #1 31*a* using a 'Send Content' message 62*d*. Similarly, a messaging flow 60*b* shown in FIG. 6*b* describes the usage of the tunnel device #3 33*c* as an intermediary device, relating to the client device #1 31*a* associated with 'content fetch' in the respective flowchart and with the tunnel device #3 33*c* in the flowchart. The 'Content Request' message 65*a* is first sent from the client device #1 31*a* to the selected tunnel device #3 33*c*, which responds by forwarding the request to the data server #1 22*a* using the 'Content Request' message 65*b*. In turn the data server #1 22*a* replies and sends the content in the 'Send Content' message 65*c* to the requesting tunnel device #3 33*c*, which in turn forward the fetched content to the asking client device #1 31*a* using the 'Send Content' message 65*d*.

A system and a method for media streaming from multiple sources are disclosed in U.S. Patent Application Publication No. 2016/0337426 to Shribman et al. entitled: "System and Method for Streaming Content from Multiple Servers", which is incorporated in its entirety for all purposes as if fully set forth herein. A content requesting client device accesses a server to receive a list of available sources that may include multiple Content Delivery Networks (CDNs) and independent servers. Based on a pre-set criteria, such as the source delivery performance and cost, the client device partitions the content into parts, allocates a source to each part, and simultaneously receives media streams of the content parts from the allocated sources. The server may be a Video-on-Demand (VOD) server, and the content may be a single file of a video data, such as a movie. The delivery performance of the used sources is measured during the streaming for updating the partition or the allocation. The updated measured performance may be stored locally at the client device, or at a server for use by other clients. The client actions may be implemented as a client-side script.

An aggregation or combination of Content or Application Delivery Networks is described in U.S. Pat. No. 9,378,473 to Wolfe entitled: "Content and application delivery network aggregation", which is incorporated in its entirety for all purposes as if fully set forth herein. The aggregation or combination is used to improve quality of service, including the delivery of content and media on a city, state, country and international basis. The aggregation is formed by combining multiple CDNs or ADNs so that a larger server and network footprint is created. The benefits of each CDN or ADN are aggregated to produce a better CDN/ADN service to the customer and end users.

Systems and techniques for transparently intercepting and optimizing resource requests are described in U.S. Patent Application Publication No. 2015/0163087 to Conner et al. entitled: "Transparently intercepting and optimizing resource requests", which is incorporated in its entirety for all purposes as if fully set forth herein. Some embodiments can send a request to a server. In response to the request, the embodiments can receive a first script and at least a second script from the server, wherein the first script includes instructions for intercepting invocations to a set of functions, and wherein the second script includes at least one invocation to at least one function in the set of functions. The first script can then be executed, thereby causing subsequent invocations to each function in the set of functions to be intercepted by a corresponding resource optimization handler. Next, the second script can be executed. When the executing second script invokes a function in the set of functions, the invocation of the function can be intercepted, and a resource optimization handler corresponding to the function can be invoked instead of invoking the function.

Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white-paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating web-site http://ipinfodb.com, and by Max Mind, Inc., based in Waltham, Massachusetts, U.S.A, operating the web-site https://www.maxmind.com/en/home. Determining the geographic location of Internet hosts is described in an article published January 2007 by Doxa Chatzopoulou and Marios Kokkodis, both of Computer Science and Engineering Department, UC Riverside, entitled: "*IP Geolocation*", which is incorporated in its entirety for all purposes as if fully set forth herein. Various techniques of IP geolocation are described in an article (ISSN:0975-9646, downloaded from the Internet August 2017) by Jayaprabha Bendale and Prof. J. Ratanaraj Kumar, both of G. S. Moze College of Engineering, Balewadi, Pune-45, University Of Pune, Pune, India, published in (IJCSIT) International Journal of Computer Science and Information Technologies, Vol. 5 (1), 2014, 436-440 and entitled: "*Review of Different IP Geolocation Methods and Concepts*", which is incorporated in its entirety for all purposes as if fully set forth herein.

Further, the W3C Geolocation API is an effort by the World Wide Web Consortium (W3C) to standardize an interface to retrieve the geographical location information for a client-side device. It defines a set of objects, ECMA Script standard compliant, that executing in the client application give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al., entitled: "Geolocation-based Addressing Method for IPv6 Addresses", and in U.S. Pat. No. 6,236,652 to Preston et al., entitled: "Geo-spacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

Methods and systems for geolocation routing and simulation of network conditions are disclosed in U.S. Pat. No. 9,660,895 Bennett entitled: "Geolocation routing and simulation of network conditions", which is incorporated in its entirety for all purposes as if fully set forth herein. A network traffic profile is determined for a client device. A network access server selects an endpoint server based on the location of the selected endpoint server. The network access server routes traffic from the client device to an external server through the selected endpoint server. The network traffic from the client device to the external server appears to originate from a network address of the selected endpoint server. Network conditions for the network traffic are simulated based on the network traffic profile.

Techniques for anonymous Internet access are presented in U.S. Pat. No. 8,302,161 to Burch et al. entitled: "Techniques for anonymous internet access", which is incorporated in its entirety for all purposes as if fully set forth herein. Internet requests are intercepted within a firewalled environment before being routed over the Internet to destination sites. Each Internet requests is evaluated in view of policy and one or more anonymizers are selected in response to that evaluation. The Internet requests are then routed through the appropriate anonymizers for processing to the destination sites. A relationship between an Internet Protocol (IP) address associated with the firewalled environment and IP addresses of the destination sites is masked and hidden via the anonymizers from Internet observers. Moreover, a secure communication between the firewalled environment and the anonymizers is maintained.

A method and apparatus for selectively using an anonymous proxy are disclosed in U.S. Pat. No. 8,301,787 to Li entitled: "Selective use of anonymous proxies", which is incorporated in its entirety for all purposes as if fully set forth herein. A user request for content is received. A determination is made as to whether the user request satisfies context criteria. When the user request satisfies the context criteria, the user request is forwarded to an anonymous proxy. When the user request does not satisfy the context criteria, the request is sent directly to a content provider.

For use with a network having server sites capable of being browsed by users based on identifiers received into the server sites and personal to the users, alternative proxy systems for providing substitute identifiers to the server sites that allow the users to browse the server sites anonymously via the proxy system, are presented in U.S. Pat. No. 5,961,593 to Gabber et al. entitled: "System and method for providing anonymous personalized browsing by a proxy system in a network", which is incorporated in its entirety for all purposes as if fully set forth herein. A central proxy system includes computer-executable routines that process site-specific substitute identifiers constructed from data specific to the users, that transmits the substitute identifiers to the server sites, that retransmits browsing commands received from the users to the server sites, and that removes portions of the browsing commands that would identify the users to the server sites. The foregoing functionality is performed consistently by the central proxy system during subsequent visits to a given server site as the same site specific substitute identifiers are reused. Consistent use of the site specific substitute identifiers enables the server site to recognize a returning user and, possibly, provide personalized service.

A device that receives, from a client device, a request for a resource, where the request provides an identifier of the client device, is presented in U.S. Pat. No. 8,504,723 to Kohli entitled: "Routing proxy for resource requests and resources", which is incorporated in its entirety for all purposes as if fully set forth herein. The device selects a target device for the resource, connects with the selected target device, and provides a proxy of the request to the selected target device, where the proxy of the request hides the identifier of the client device. The device receives the resource from the selected target device, where the resource provides an identifier of the target device. The device provides a proxy of the resource to the client device, where the proxy of the resource hides the identifier of the target device.

Various information object repository selection procedures for determining which of a number of information object repositories should service a request for the information object are described in U.S. Pat. No. 7,565,450 to Garcia-Luna-Aceves et al. entitled: "System and method for using a mapping between client addresses and addresses of caches to support content delivery", which is incorporated in its entirety for all purposes as if fully set forth herein. The selection procedures include a direct cache selection process, a redirect cache selection process, a remote DNS cache selection process, or a local DNS cache selection process. Different combinations of these procedures may also be used. For example different combination may be used depending on the type of content being requested. The direct cache selection process may be used for information objects that will be immediately loaded without user action, while any of the redirect cache selection process, the remote DNS cache selection process and/or the local DNS cache selection process may be used for information objects that will be loaded only after some user action.

An address of an information object repository that should service a client request for an information object and is returned in response to a request therefor is described in U.S. Pat. No. 7,162,539 to Garcia-Luna-Aceves et al. entitled: "System and method for discovering information objects and information object repositories in computer networks", which is incorporated in its entirety for all purposes as if fully set forth herein. The address of the information object repository which is returned is selected according to specified performance metrics regardless of whether or not the information object repository maintains a local copy of the information object that is the client request. In some cases, the address of the information object repository is further selected according to an address of a client making the client request. Further, the address of the information object repository is selected from a number of addresses of information object repositories. The specified performance metrics may include one or more of an average delay from the information object repository to the client, average processing delays at the information object repository, reliability of a path from the information object repository to the client, available bandwidth in said path, and loads on the information object repository. In some cases, the information object repository may be instructed to obtain a copy of the information object after the address of the information object repository is returned in response to the request therefore.

A method and system for accelerating downloading and displaying of content in web pages in a peer-to-peer network is described in U.S. Patent Application Publication No. 2006/0212584 to Yu et al. entitled: "Method and system for accelerating downloading of web page content by a peer-to-peer network", which is incorporated in its entirety for all purposes as if fully set forth herein. A peer-to-peer network client captures a download request from a web browser, and submits a query that includes an identifier of the file to an indexing server. The peer-to-peer network client receives a peer list including connectivity information of a peer node that has stored at least a portion of the file content. The peer-to-peer network client then connects with the peer node, and downloads the portion from the peer node. The peer-to-peer client conveys the downloaded portion to the web browser.

Facilitating browser access to cached content available from a peer to peer network is described in U.S. Patent Application Publication No. 2013/0191456 to Ting et al. entitled: "Peer to peer browser content caching", which is incorporated in its entirety for all purposes as if fully set forth herein. The facilitating comprises receiving a request for content from a content server, receiving from the content server content metadata indicating that the requested content is available from at least one alternative user computing device via a peer to peer network, instantiating on the user computing device a browser helper application which facilitates access to the peer to peer network, and receiving from the content server a lookup table comprising a list of alternative user computing devices from which the requested content is available. The lookup table can be parsed to select an alternative user computing device from which the content, or portions thereof, is requested. The received content can then be stored for later use or presented to the user via the browser.

A method and apparatus for peer-to-peer services are described in U.S. Pat. No. 7,440,994 to Harrow et al. entitled: "Method and apparatus for peer-to-peer services to shift network traffic to allow for an efficient transfer of information between devices via prioritized list", which is incorporated in its entirety for all purposes as if fully set forth herein.

A method and apparatus for peer-to-peer services are described in U.S. Pat. No. 7,562,112 to Harrow et al. entitled: "Method and apparatus for peer-to-peer services for efficient transfer of information between networks", which is incorporated in its entirety for all purposes as if fully set forth herein. In one embodiment, a request for data is received from a first local device. A determination of a second local device having the data is made. The first local device is directed to the second local device to directly obtain the data from the second local device. A direct transfer of the data from the second local device to the first local device is performed.

In consideration of the foregoing, it would be an advancement in the art to provide an improved functionality method and system that is simple, secure, anonymous, cost-effective, load balanced, redundant, reliable, provide lower CPU and/or memory usage, enable pipelining of requests and responses, reduce network congestion, easy to use, reduce latency, faster, has a minimum part count, minimum hardware, and/or uses existing and available components, protocols, programs and applications, for providing better quality of service, overload avoidance, better or optimal resources allocation, better communication and additional functionalities, and provides a better user experience.

SUMMARY

A method may be used for fetching a content identified by a content identifier to a client device from a web server by using tunnel devices. The method may be used with a first and second servers and a group of tunnel devices that are each connected to the Internet and are each addressable in the Internet using a respective IP address, and the first server may store a list of the IP addresses associated with the tunnel devices in the group. The method may comprise sending, by the client device to the second server, a request message that comprises the content identifier; receiving, by the second server from the client device, the request message; sending, by the second server to the first server, a first message; receiving, by the first server from the second server, the first message; selecting, by the first server, an IP address associated with a tunnel device from the list of tunnel devices, in response to the received first message; sending, by the first server to the selected tunnel device, a second message using an IP address of the selected first tunnel device; receiving, by the selected tunnel device from the first server, the second message; sending, by the selected tunnel device to the web server, a content request that comprises the content identifier; receiving, by the selected tunnel device from the web server, the content, in response to the content request; sending, by the selected tunnel device to the second server, the content; receiving, by the second server from the selected tunnel device, the content; sending, by the second server to the client device, the content; and receiving, by the client device from the second server, the content in response to the request message.

Any list herein, such as the list of the IP addresses may comprise, or may consist of, multiple distinct lists, and each of the multiple distinct lists may comprise one or more of the IP addresses that may be associated with the tunnel devices in the group. Any list of IP addresses herein may comprise, or may consist of, at least 2, 3, 4, 5, 8, 10, 20, 30, 50, 80, 100, 120, 150, 200, 300, 500, 1,000, 2,000, 3,000, 5,000, 10,000, 20,000, 30,000, 50,000, or 100,000 distinct lists. Alternatively or in addition, any list of IP addresses herein may comprise, or may consist of, less than 3, 4, 5, 8, 10, 20, 30, 50, 80, 100, 120, 150, 200, 300, 500, 1,000, 2,000, 3,000, 5,000, 10,000, 20,000, 30,000, 50,000, 100,000 or 200,000 distinct lists. Any list of IP addresses herein, such as at least one list of any multiple distinct lists herein may include at least 1, 2, 3, 4, 5, 8, 10, 12, 15, 20, 20, 30, 50, 80, 100, 120, 150, 200, 500, 1,000, 2,000, 5,000, or 10,000 IP addresses, or may include less than 2, 3, 4, 5, 8, 10, 12, 15, 20, 20, 30, 50, 80, 100, 120, 150, 200, 500, 1,000, 2,000, 5,000, 10,000 or 20,000 IP addresses. Each of the multiple distinct lists herein may include at least 1, 2, 5, 8, 10, 12, 15, 20, 20, 30, 50, 80, 100, 120, 150, 200, 500, 1,000, 2,000, 5,000, or 10,000 IP addresses, or may include less than 2, 3, 4, 5, 8, 10, 12, 15, 20, 20, 30, 50, 80, 100, 120, 150, 200, 500, 1,000, 2,000, 5,000, 10,000 or 20,000 IP addresses.

Any two list herein, such as at least first and second lists of the multiple distinct lists, may be mutually exclusive, whereby each of the IP addresses included in the first list may not be part of the second list. Further, part of, or all of, any lists of the multiple distinct lists may be mutually exclusive, whereby each of the IP addresses included in one of the lists may not be part of any other list of the multiple distinct lists. Any two list herein, such as at least first and second lists of the multiple distinct lists, may be mutually non-exclusive, whereby at least one of the IP addresses that may be included in the first list may be part of the second list. Further, all of the lists of the multiple distinct lists may be mutually non-exclusive, whereby at least one of the IP addresses included in a list may be part of another list of the multiple distinct lists.

Any list herein, such as any list of the multiple distinct lists, may include a single IP address, further, at least two lists of the multiple distinct lists may include a single IP address. At least two lists of the multiple distinct lists may include the same number of IP addresses. Further, at least 3, 5, 8, 10, 15, 20, 30, 50, 100, 200, 300, 500, 1,000, 5,000, or 10,000 lists of the multiple distinct lists may include the same number of IP addresses. Alternatively or in addition, at least 1%, 2%, 3%, 5%, 10%, 15%, 20%, 25%, 30%, 35%, 40%, 45%, 50%, 55%, 60%, 70%, 80%, or 90% of the lists of the multiple distinct lists may include the same number of IP addresses, or all of the lists of the multiple distinct lists may include the same number of IP addresses. Any IP addresses herein or any associated tunnel devices herein of any list, such as of at least one list of the multiple distinct lists, may be associated with a same value or a value range of an attribute type. Further, any IP addresses or any associated tunnel devices of each of the multiple distinct lists may be associated with the same value or the value range of the attribute type. Further, any value herein may comprise a numeric value or an identifier of a feature, an attribute, a characteristic, or a property of the attribute type, and any value range herein may comprise a numeric value range or identifiers of a feature, an attribute, a characteristic, or a property of the attribute type.

Any attribute type herein may comprise a geographical location, and any value herein may comprise a name or an identifier of a continent, a country, a region, a city, a street, a ZIP code, or a timezone. Alternatively or in addition, any attribute type herein may comprise an Internet Service Provider (ISP) or Autonomous System Number (ASN), and any value herein may respectively comprise a name or an identifier of the ISP or the ASN number. Alternatively or in addition, any attribute type herein may correspond to a hardware or software of tunnel devices. Alternatively or in addition, any attribute type herein may correspond to a communication property, type, or feature of a communication link of any device, such as any tunnel devices. Alternatively or in addition, any attribute type herein may correspond to an operating system of any device, such as the tunnel devices. Alternatively or in addition, any attribute type herein may correspond to a RTT of the tunnel devices. Alternatively or in addition, any attribute type herein may correspond to a content type, and any value of the content type may comprise a video data, audio data, and no multimedia web-page. Any method herein may be used with multiple web servers, and any attribute type may correspond to a web server from the multiple web servers, and the values comprise an identifier of the web server, and any identifier herein may comprise an IP address of the web server, a domain name, a website name, or a URL.

Any selecting herein of any IP address from any list may comprise selecting a list from the multiple distinct lists; and selecting an IP address from the selected list. Any selecting of any IP address from any selected list may be based on load balancing, and may be based on, or may be using, random, quazi-random, or deterministic selection. Alternatively or in addition, any selecting of any list from any multiple distinct lists or any selecting of any IP address from any selected list, may be based on, or may use, random selecting, that may use one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers.

Further, any selecting of any list from any multiple distinct lists or any selecting of any IP address from any selected list may be based on, or may use, Last-In-First-Out (LIFO) or First-In-First-Out (FIFO) scheme. Alternatively or in addition, any selecting herein of any IP address from any selected list may be based on, or may be using, sequential or cyclic selection. Any message herein, such as the first message, may comprise a criterion, and any selecting herein of any list from any multiple distinct lists may be based on, may be using, or may be in response to, the criterion. Any selecting herein of any list from any multiple distinct lists may be based on load balancing. Alternatively or in addition, any selecting herein of any list from any multiple distinct lists may be based on, or may be using, random selection, sequential, or cyclic selection. Any message herein, such as the first message, may comprise a criterion, and any selecting herein of the list from any multiple distinct lists may be based on, may be using, or may be in response to, the criterion.

Any device herein, such as the client device, may be associated with any list of any multiple distinct lists, and any selecting herein of any list from any multiple distinct lists may comprise selecting the list that may be associated with the client device. Any method herein may be used with multiple client devices, and each list of any multiple distinct lists may be associated with a client device of the multiple client devices. Further, any client device herein may be selected from the multiple client devices, and any selecting herein of any list from any multiple distinct lists may comprise selecting the list that may be associated with the selected client device. Further, any client device of the multiple client devices may be associated with a list of the multiple distinct lists.

Any IP addresses herein, or any associated tunnel devices, of at least two lists of, or all of, the multiple distinct lists, may be respectively associated with a distinct value or a distinct value range of an attribute type. Further, any message herein, such as the first message, may comprise a value or a value range of the attribute type, and any selecting herein of any list from any multiple distinct lists may be based on, may be in response to, or may use, the value or the value range in the first message, and any selecting herein of any list from any multiple distinct lists may comprise selecting the list that may be associated with the value or the value range in the first message. Alternatively or in addition, any message herein, such as the first message, may comprise an identifier of the client device, and any selecting herein of any list from any multiple distinct lists may be based on, may be in response to, or may use, the identifier of the client device, which may comprise, may use, or may be based on, the IP address of the client device.

Any web server herein, any content herein, or any content identifier herein may be associated with a list of the multiple distinct lists, and any selecting herein of any list from any multiple distinct lists may comprise selecting the list that may be associated with the web server, the content, or the content identifier. Any method herein may be used with multiple web servers, or multiple contents each associated with a respective content identifier, and any list of any multiple distinct lists may be associated with a respective one of the multiple web servers or the multiple contents. Further, any web server herein or any content herein may be respectively selected from the multiple web servers or the multiple contents, and any selecting herein of any list from any multiple distinct lists may comprise selecting the list that may be associated with the respectively selected web server or content. Alternatively or in addition, each of the multiple web servers or multiple contents may be associated with a list of the multiple distinct lists.

Any method herein may further comprise defining, forming, maintaining, or storing of at least one list of the multiple distinct lists, or of all lists of the multiple distinct lists. Any defining, forming, maintaining, or storing herein may be by any device or apparatus herein, such as by the first server, the second server, or the client device. Further, any method herein may further comprise updating of any list, such as updating at least one list of the multiple distinct lists. Any method herein may further comprise updating of at least 2, 3, 5, 8, 10, 15, 20, 30, 50, 100, 200, 300, 500, 1,000, 5,000, or 10,000 lists of the multiple distinct lists, or updating of at least 1%, 2%, 3%, 5%, 10%, 15%, 20%, 25%, 30%, 35%, 40%, 45%, 50%, 55%, 60%, 70%, 80%, or 90% of the lists of the multiple distinct lists.

Alternatively or in addition, any method herein may further comprise forming, maintaining, or storing all lists of any multiple distinct lists. Alternatively or in addition, any updating of any list may comprise adding an IP address to, or removing an IP address from, the list. Any updating herein may be at least 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months after any forming, defining, forming, or storing. Further, Any updating herein may be less than 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months after any forming, defining, forming, or storing. Alternatively or in addition, at least two lists or all lists of the of the multiple distinct lists may not be updated or changed for at least 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months after the last forming, defining, forming, or storing. Any updating herein may comprise periodically updating, that may be every at least 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months, or may be every less than 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months.

Any selecting herein of any list from any multiple distinct lists or any selecting herein of any IP address from any selected list may be based on, or may be in response to, a time of an action or an event. Any action herein may comprise an action by any device or apparatus herein, such as any client device, any first server, any second server, any web server, or any selected tunnel device. Any event herein may be an event affecting, or sensed by, any device or apparatus herein, such as any client device, any first server, any second server, any web server, or any selected tunnel device. Any time herein may comprise the time at the respective location of the client device, the first server, the second server, the web server, or the selected tunnel device. Any action herein may comprise any receiving of, or any transmitting of, any message over the Internet, such as sending or receiving by any device or apparatus herein, such as any client device, any first server, any second server, any web server, or any selected tunnel device. Alternatively or in addition, any action herein may comprise any selecting of any list from any multiple distinct lists, or any selecting of any IP address from any selected list.

At least any one list from any multiple distinct lists may be associated with a timing information, and any the selecting herein of any list from any multiple distinct lists may be based on, or may be according to, the time versus the associated timing information of the at least one list. At least 3, 5, 8, 10, 15, 20, 30, 50, 100, 200, 300, 500, 1,000, 5,000, or 10,000 lists of any multiple distinct lists may be associated with a distinct timing information, or at least 1%, 2%, 3%, 5%, 10%, 15%, 20%, 25%, 30%, 35%, 40%, 45%, 50%, 55%, 60%, 70%, 80%, or 90% of any lists of any multiple distinct lists may be associated with a distinct timing information. Any selecting herein of any list from any multiple distinct lists may be based on, or may be according to, the time versus the associated timing information of the lists. Any timing information herein may comprise a month, a week, a day of the week, an hour of a day, or a minute in an hour, and any multiple distinct lists herein may comprise at least 7 distinct lists, each associated with a different day of the week. Alternatively or in addition, any multiple distinct lists herein may comprise at least 24 distinct lists, each associated with at least one different hour of the day. Further, any time herein may comprise a month, a week, a day of the week, an hour of a day, or a minute in an hour.

Any method herein may be used with a first device that may be connected to the Internet and may be addressable in the Internet using a first IP address. Any method herein may further comprise sending, by the first device to the first server, a third message; and receiving, by the first server from the first device, the third message. Further, any method herein may further comprise adding the IP address of the first device to a single list, two or more lists, of any multiple distinct lists. Any method herein may be used with a first device that may be connected to the Internet and addressable in the Internet using a first IP address, and may further comprise forming or adding an additional list to the multiple distinct lists. Further, any method herein may further comprise forming or adding an additional list to the multiple distinct lists that includes the first IP address. Alternatively or in addition, any method herein may further comprise sending, by the first device to the first server, a third message; and receiving, by the first server from the first device, the third message. Any forming or adding herein of the additional list may be in repose to the receiving of the third message.

Any selecting herein of any IP address from any list may comprise selecting a list from the multiple distinct lists; selecting an IP address from the selected list; checking the availability of the device associated with the selected IP address to serve as a tunnel device; and responsive to the selected device unavailability to serve as a tunnel device, selecting and using another IP address from the selected list. Alternatively or in addition, any selecting herein of any IP address from any list may comprise selecting a list from the multiple distinct lists; checking the availability of all the devices associated with the IP addresses in the selected list to serve as a tunnel device; and responsive to a device availability to serve as a tunnel device, selecting and using the IP address of the available device. Alternatively or in addition, any selecting herein of any IP address from any list may comprise selecting a list from the multiple distinct lists; checking the availability of all the devices associated with the IP addresses in the selected list to serve as a tunnel device; and responsive to no a availability of any device from the selected list to serve as a tunnel device, adding and using an additional IP address of an available device. At least 2 lists of any multiple distinct lists herein may each be identified by a respective distinct identifier. Alternatively or in addition, each list of any multiple distinct lists may be identified by a respective distinct identifier. Any identifier herein may comprise a characters set, an alphanumeric string, a number, or an IP address.

Any list of the IP addresses herein may comprise, or may consist of, multiple distinct collections, and each collection may comprise one or more lists of any multiple distinct lists. For example, two or more collections may comprise more than 1, 2, 5, 10, 12, 15, 20, 20, 30, 50, 80, 100, 120, 150, 200, 500, 1,000, 2,000, 5,000, or 10,000 lists, or two or more collections may comprise less than 5, 10, 12, 15, 20, 20, 30, 50, 80, 100, 120, 150, 200, 500, 1,000, 2,000, 5,000, 10,000 or 20,000 lists. Further, each one of the collections may comprise more than 1, 2, 5, 10, 12, 15, 20, 20, 30, 50, 80, 100, 120, 150, 200, 500, 1,000, 2,000, 5,000, or 10,000 lists, or less than 5, 10, 12, 15, 20, 20, 30, 50, 80, 100, 120, 150, 200, 500, 1,000, 2,000, 5,000, 10,000 or 20,000 lists.

Any method herein may be used with a mapping function, and each list herein of any multiple distinct lists herein may be associated with, or may be identified by, a distinct value that may be the result of the mapping function on the IP addresses or on distinct values associated with the corresponding tunnel devices. Any distinct values herein may be numerical values that may correspond with a feature, an attribute, a characteristic, or a property of an attribute type, or any combination thereof. Alternatively or in addition, any distinct values herein may be numerical values that may be random values or that may be sequentially allocated. Any mapping function herein may consist of, may comprise, or may be based on, a hash function, and any distinct values herein may be hash values. Any hash function herein may consist of, may comprise, or may be based on, checksum, check digit, fingerprint, lossy compression, randomization, error-correcting code, or cipher. Further, any hash function herein may consist of, may comprise, or may be based on, Secure Hash Algorithm (SHA) or modulo N function or operation, and any hash function herein may be according to, based on, or compatible with, IEEE Standard 754-1985. The number N may be the number of lists in the multiple distinct lists, and may be equal or higher than 1, 2, 5, 10, 12, 15, 20, 20, 30, 50, 80, 100, 120, 150, 200, 500, 1,000, 2,000, 5,000, or 10,000, or may be equal or less than 5, 10, 12, 15, 20, 20, 30, 50, 80, 100, 120, 150, 200, 500, 1,000, 2,000, 5,000, 10,000 or 20,000.

Any method herein may be used with a first device that may be connected to the Internet and may be addressable in the Internet using a first IP address. The method may further comprise sending, by the first device to the first server, a third message; receiving, by the first server from the first device, the third message; and storing, in the first server, the first IP address in the list, and adding the first device to the group of tunnel devices, so that the first device can be selected as a tunnel device as part of the selecting by the first server. The third message may comprise at least one value relating to at least one attribute type associated with the first device. Any method herein may further comprise storing, in the first server, the at least one value, as associated with the first device or with the first IP address, establishing a connection between the first server and the first device, and the first server may initiate communication with the first device using the established connection. Any connection or any established connection herein may be a TCP connection using 'Active OPEN', 'Passive OPEN', or TCP keepalive mechanism, or may use, or may be based on, a Virtual Private Network (VPN).

Any method herein may further comprise, for each of the tunnel devices in the group, sending, by the tunnel device to the first server, a third message; receiving, by the first server from the tunnel device, the third message; and storing, in the first server, the IP address of the tunnel device in the list, and adding the tunnel device to the group of tunnel devices, so that the tunnel device may be selected as a tunnel device as part of the selecting by the first server. The third message may comprise at least one value relating to at least one attribute type associated with the tunnel device. Any method herein may further comprise, storing, in the first server, the at least one value, as associated with the tunnel device or with the tunnel device IP address. Any method herein may further comprise, establishing a connection between the first server and the tunnel device, and the first server may initiate communication with the tunnel device using the established connection, and the established connection may be a TCP connection using 'Active OPEN', 'Passive OPEN', or TCP keepalive mechanism, or may use, or may be based on, a Virtual Private Network (VPN).

Each of the messages herein, such as the first and second messages, may comprise the content identifier, and the sending by the selected tunnel device to the web server of the content request that comprises the content identifier may be in response to the received second message. The sending, by the selected tunnel device to the second server of the content may comprises sending, by the selected tunnel device to the first server, the content; receiving, by the first server from the selected tunnel device, the content; sending, by the first server to the second server, the content; and receiving, by the second server from the first server, the content.

Any message herein, such as the second message, may comprise the IP address of the second server. In response to the receiving of the second message, any method herein may comprise initiating a communication, by the selected tunnel device with the second server. The initiating of the communication by the selected tunnel device may use, or may be based on, Network Address Translator (NAT) traversal scheme, which may be according to, may be based on, or may use, Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350. Alternatively or in addition, any NAT traversal scheme herein may be according to, may be based on, or may use, Traversal Using Relays around NAT (TURN), Socket Secure (SOCKS), WebSocket (ws) or WebSocket Secure (wss), NAT 'hole punching', Session Traversal Utilities for NAT (STUN), Interactive Connectivity Establishment, (ICE), UPnP Internet Gateway Device Protocol (IGDP), or Application-Level Gateway (ALG).

In response to the communication initiated by the selected tunnel device, any method herein may further comprise, sending, by the second server to the selected tunnel device, the content identifier, and the sending, by the selected tunnel device to the web server of the content request, may be in response to receiving the content identifier from the second server. Alternatively or in addition, the sending, by the selected tunnel device to the second server of the content may comprise sending, by the selected tunnel device to the second server, the content using the initiated communication.

Any communication over the Internet between the selected tunnel device and the second server, may be based on, may use, or may be compatible with, Transmission Control Protocol over Internet Protocol (TCP/IP) protocol or connection. Any communication over the Internet between the selected tunnel device and the second server, may be based on, may use, or may be compatible with, HTTP or HTTPS protocol or connection, and the second server may serve as an HTTP or HTTPS server respectively and the selected tunnel device may serve as an HTTP or HTTPS client respectively.

Any communication over the Internet between the selected tunnel device and the second server, may be based on, may use, or may be compatible with, Socket Secure (SOCKS) protocol or connection, and the second server may serve as an SOCKS server and the selected tunnel device may serve as an SOCKS client. Any SOCKS protocol or connection herein may be according to, may be based on, or may be compatible with, SOCKS4, SOCKS4a, or SOCKS5. Alternatively or in addition, any SOCKS protocol or connection herein may be according to, may be based on, or may be compatible with, IETF RFC 1928, IETF RFC 1929, IETF RFC 1961, or IETF RFC 3089. Alternatively or in addition, any communication between any two entities herein, such as over the Internet between the selected tunnel device and the second server, may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455. Any communication over the Internet between the selected tunnel device and the second server, may be based on, may use, or may be compatible with, HTTP Proxy protocol or connection, and the second server may serve as an HTTP Proxy server and the selected tunnel device may serve as an HTTP Proxy client. Any method herein may further comprise establishing a connection between the second server and the selected tunnel device, and the second server may initiate communication with the selected tunnel device using the established connection.

Any method herein may further comprise sending, by the second server to the client device, the IP address of the selected tunnel device; receiving, by the client device from the second server, the IP address of the selected tunnel device; and storing, by the client device, the received IP address of the selected tunnel device. Any method herein may be used with a first IP address stored in the client device, and the request message may comprise the first IP address. The first message may comprise the first IP address, and the selecting, by the first server of the tunnel device from the list of tunnel devices may be based on, or may be in response to, the received first IP address. Any selecting herein by the first server of the tunnel device may comprise selecting a tunnel device having the first IP address.

Any first tunnel device in the group may be operating in multiple states that may include an idle state and non-idle states. Any method herein may further comprise by the first tunnel device responsive to being in one of the non-idle states, determining, if an idling condition is met; responsive to the determination that the idling condition is met, shifting to the idle state; responsive to being in the idle state, determining if an idling condition is met; and responsive to the determination that the idling condition is not met, shifting to one of the non-idle states. The first tunnel device may be selected by the first server in response to the first tunnel device being in the idle state. Any method herein may further comprise receiving, by the first server from the first tunnel device, a message responsive to the first tunnel device state; and the first tunnel device may be selected by the first server in response to the first tunnel device state being the idle state.

Any method herein may further comprise sending, by the first tunnel device to the first server, a first status message in response to shifting to the idle state; and sending, by the first tunnel device to the first server, a second status message in response to shifting to a non-idle state. The first tunnel device may be selected by the first server in response to the first or second status message. Any method herein may further comprise receiving, by the first server from the first tunnel device, the first status message; and adding, the IP address of the first tunnel device to the list of IP addresses in response to received first status message. Any method herein may further comprise receiving, by the first server from the first tunnel device, the second status message; and removing, the IP address of the first tunnel device from the list of IP addresses in response to received second status message. Any method herein may be used with an additional idling condition, and any determining herein may comprise determining if the idling condition and the additional idling condition are met.

Any method herein may further comprise operating, by the first tunnel device, an operating system or a program process or thread, and any idling condition herein may be determined to be met based on, or according to, activating or executing the process or thread by the operating system or the program. The process or thread may comprise a low-priority or background task, an idle process, or a screen-saver. Further, the process or thread may comprise using the entire screen for displaying. Any method herein may further comprise monitoring or metering, by the first tunnel device, a resource utilization, and any idling condition herein may be determined to be met based on, or according to, the monitored or metered resource utilization being under a threshold, and the resource utilization may comprise the utilization of a processor in the first tunnel device. Any tunnel device herein, such as the first tunnel device, may comprise an input device for obtaining an input from a human user or operator, and any the method herein may further comprise sensing the input, by the any tunnel device (or the first tunnel device) using the input device, and any idling condition herein may be determined to be met based on, or according to, not receiving an input from the input device for a pre-set time interval. Any input device herein may comprise a pointing device, a keyboard, a touchscreen, or a microphone.

Any tunnel device herein, such as the first tunnel device, may comprise a motion sensor for sensing motion, acceleration, vibration, or location change of the first tunnel device, and any method herein may further comprise sensing, by any tunnel device (or the first tunnel device) using the motion sensor, the respective first tunnel device motion, acceleration, vibration, or location change, and any idling condition herein may be determined to be met based on, or according to, respectively sensing the motion, the vibration, the acceleration, or the location change being under a threshold. Any the motion sensor herein may comprise an accelerometer, gyroscope, vibration sensor, or a Global Positioning System (GPS) receiver.

Any tunnel device herein, such as the first tunnel device, may comprise a network interface or a network transceiver for communication over a network (such as the Internet), and any method herein may further comprise metering, by any tunnel device (or the first tunnel device), an amount of data transmitted to, or received from, the network during a time interval, and any idling condition herein may be determined to be met based on, or according to, the metered amount of data being under a threshold level. Any tunnel device herein, such as the first tunnel device, may comprise a battery, and any method herein may further comprise metering or sensing, by any tunnel device (or the first tunnel device), a battery charging level, and any idling condition herein may be determined to be met based on, or according to, the metered or sensed charge level being over a threshold level. The metering or sensing may use a Battery Management System (BMS), and the threshold level may be above 40%, 50%, 60%, 70%, 80%, or 90% of the battery defined full charge capacity.

Any first tunnel device in the group herein may be associated with multiple states that may include an idle state and non-idle states. Any method herein may further comprise sending, by the first tunnel device, a status message to the first server; receiving, by the first server, the status message; responsive to the status message, determining, if an idling condition is met by the first tunnel device; responsive to the determination that the idling condition is met, associating, by the first server, the first tunnel device with the idle state; and responsive to the determination that the idling condition is not met, associating, by the first server, the first tunnel device a non-idle state. Any sending herein by the first tunnel device of the status message may comprise periodical sending, that may be every at least 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or may be less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months. Any method herein may further comprise sending, by the first server, a status request message to the first tunnel device, and any sending herein by the first tunnel device of the status message may be in response to receiving, by the first tunnel device of the status request message. Any sending herein by the first server of the status request message may comprise periodical sending, that may be every at least 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or may be less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months.

Any first tunnel device may be selected by the first server in response to the first tunnel device being associated with the idle state. Any method herein may further comprise adding, by the first server, the IP address of the first tunnel device to the list of IP addresses in response to the first tunnel device being associated with the idle state. Alternatively or in addition, any method herein may further comprise removing, by the first server, the IP address of the first tunnel device from the list of IP addresses in response to the first tunnel device not being associated with the idle state. Alternatively or in addition, any method herein may be used with an additional idling condition, and any determining herein may comprise determining if the idling condition and the additional idling condition are met.

Any method herein may further comprise operating, by the first tunnel device, an operating system or a program process or thread, and any idling condition herein may be determined to be met based on, or according to, activating or executing the process or thread by the operating system or the program, and any status message herein may comprise information relating to the activating or executing the process or thread by the operating system or the program, and any sending herein by the first tunnel device of the status message may be in response to activating or executing the process or thread by the operating system or the program. Any process or thread herein may comprise a low-priority or background task, an idle process, or a screensaver, or using the entire screen for displaying.

Any method herein may further comprise monitoring or metering, by the first tunnel device, a resource utilization, and any idling condition herein may be determined to be met based on, or according to, the monitored or metered resource utilization being under a threshold, any status message herein may comprise information relating to the monitored or metered resource utilization being under a threshold, or any sending herein by the first tunnel device of the status message may be in response to the monitored or metered resource utilization being under a threshold. Any resource utilization herein may comprise the utilization of a processor in the first tunnel device.

Any first tunnel device herein may comprise an input device such as a pointing device, a keyboard, a touchscreen, or a microphone, for obtaining an input from a human user or operator. Any method herein may further comprise sensing, by the first tunnel device using the input device, the input, and any condition herein may be determined to be met based on, or according to, not receiving an input from the input device for a pre-set time interval, any status message herein may comprise information relating to not receiving an input from the input device for a pre-set time interval, and any sending herein by the first tunnel device of the status message may be in response to not receiving an input from the input device for a pre-set time interval.

Any first tunnel device herein may comprise a motion sensor (such as an accelerometer, gyroscope, vibration sensor, or a Global Positioning System (GPS) receiver) for sensing motion, acceleration, vibration, or location change of the first tunnel device. Any method herein may further comprise sensing, by the first tunnel device using the motion sensor, the respective first tunnel device motion, acceleration, vibration, or location change, and any idling condition herein may be determined to be met based on, or according to, respectively sensing the motion, the vibration, the acceleration, or the location change being under a threshold, any status message herein may comprise information relating to respectively sensing the motion, the vibration, the acceleration, or the location change being under a threshold, and any sending herein by the first tunnel device of the status message may be in response to respectively sensing the motion, the vibration, the acceleration, or the location change being under a threshold.

Any first tunnel device herein may comprise a network interface or a network transceiver for communication over a network. Any method herein may further comprise metering, by the first tunnel device, an amount of data transmitted to, or received from, the network during a time interval, and wherein the idling condition is determined to be met based on, or according to, the metered amount of data being under a threshold level, Any status message herein may comprise information relating to the metered amount of data being under a threshold level, and any sending herein by the first tunnel device of the status message is in response to the metered amount of data being under a threshold level.

Any first tunnel device herein may comprise a battery. Any method herein may further comprise metering or sensing, such as by using a Battery Management System (BMS), by the first tunnel device, a battery charging level, and any idling condition herein may be determined to be met based on, or according to, the metered or sensed charge level being over a threshold level, any status message herein may comprise information relating to the metered or sensed charge level being over a threshold level, and any sending herein by the first tunnel device of the status message may be in response to the metered or sensed charge level being over a threshold level. Any threshold level herein may be above 40%, 50%, 60%, 70%, 80%, or 90% of the battery defined full charge capacity.

Any method herein may be used with a first attribute type, any or each of the tunnel devices in the group may be associated with a first value relating to the first attribute type, and any method herein may further comprise, storing, by the first server, the first value for associated each of the tunnel devices in the group. Any first value herein may comprise a numeric value or an identifier of a feature, a characteristic, or a property of the first attribute type. Any selecting herein, of a tunnel device by the first server, may be based on the first value associated with the selected tunnel device, and any method herein may further comprise sending, by each of the tunnel devices in the group to the first server, the respective first value to the first server, and receiving, by the first server, the sent first value.

Any message herein, such as the request message and the first message, may comprise one or more values, and any selecting herein, of the tunnel device by the first server, may be based on comparing the one or more values to the first value associated with the selected tunnel device. Alternatively or in addition, any message herein, such as the request message and the first message, may comprise a requested value, and the selecting, of the tunnel device by the first server, may be based on the requested value being equal to the first value associated with the selected tunnel device. Alternatively or in addition, any message herein, such as the request message and the first message, may comprise multiple values, and any selecting herein, of the tunnel device by the first server, may be based on the first value of the associated with the selected tunnel device being equal to one of the multiple values. Any value herein, such as of the first attribute type, may be numerical value, and the request message and the first message may comprise a minimum value, and any selecting, of the tunnel device by the first server, may be based on the first value of the associated with the selected tunnel device being higher than the minimum value. Alternatively or in addition, values of the first attribute type may be numerical values, and the request message and the first message may comprise a maximum value, and any selecting herein, of the tunnel device by the first server, may be based on the first value of the associated with the selected tunnel device being lower than the maximum value. Alternatively or in addition, the request message and the first message may further comprise a minimum value, and any selecting herein, of the tunnel device by the first server, may be based on the first value of the associated with the selected tunnel device being higher than the minimum value.

Any method herein may be used with a second attribute type, and each of the tunnel devices in the group may be associated with a second value relating to the second attribute type, and any method herein may further comprise, storing, by the first server, the second value for associated each of the tunnel devices in the group. Any selecting herein, of the tunnel device by the first server, may be based on the first and second values associated with the selected tunnel device. Any method herein may further comprise sending, by each of the tunnel devices in the group to the first server, the respective first and second values to the first server, and receiving, by the first server, the sent first and second values.

Any message herein, such as the request message and the first message, may comprise a first set of one or more values and a second set of one or more values, and any selecting herein, of the tunnel device by the first server, may be based on respectively comparing the first and second sets to the first and second values associated with the selected tunnel device. Any selected tunnel device herein may be selected by the first server so that the first value may be included in the first set and the second value may be included in the second set. Alternatively or in addition, any selected tunnel device herein may be selected by the first server so that the first value is included in the first set or the second value is included in the second set. Alternatively or in addition, any selected tunnel device herein may be selected by the first server so that the first value is included in the first set and the second value is not included in the second set.

Any first attribute type herein may comprise a geographical location, and each of the first values may comprise a name or an identifier of a continent, a country, a region, a city, a street, a ZIP code, or a timezone. Any first value herein of each of the tunnel devices in the group or each of the IP addresses may be based on IP geolocation that may be based on W3C Geolocation API. Any method herein may be used with a database associating IP addresses to geographical locations, the database may be stored in the first server, and any method herein may further comprise receiving and storing, by the first server, the database, and any method herein may further comprise estimating or associating the first value to each of the tunnel devices in the group by the database. Alternatively or in addition, any first attribute type herein may comprise identification of an Internet Service Provider (ISP) or an Autonomous System Number (ASN), and each of the first values comprises respectively a name or an identifier of the ISP or the ASN number.

Any first attribute type herein may correspond to a hardware or software of tunnel devices. Any first attribute type herein may comprise the hardware of tunnel devices, such as stationary or portable values, respectively based on the tunnel device being stationary or portable. Any first attribute type herein may comprise a program or a software application the (such as an operating system) installed, used, or operated, in tunnel devices, such as the type, make, model, or version of the software.

Any first attribute type herein may corresponds to a communication property, feature of a communication link of tunnel devices, and the communication link may correspond to the respective connection to the Internet of tunnel devices. Alternatively or in addition, the communication link may correspond to a communication link of a tunnel device with the web server, the first server, the second server, or the client device. The first attribute may correspond to a bandwidth (BW) or Round-Trip delay Time (RTT) of the communication link, and any first value herein may be the respective estimation or measurement of the BW or RTT. Any method herein may further comprise estimating or measuring, by the first server or by a tunnel device, the BW or RTT of the communication link. Alternatively or in addition, any first attribute type herein may correspond to the technology or scheme used by the tunnel devices for connecting to the Internet, and any first values herein may comprise wired or wireless values, respectively based on the tunnel device being connected to the Internet using wired or wireless connection.

Any method herein may be used with a plurality of servers that includes the first server, each of the plurality of servers may be connectable to the Internet, may be addressable in the Internet using a respective IP address, and may store a respective list of IP addresses of the tunnel devices that may be part of the group. Any method herein may further comprise selecting, by the second server, the first server from the plurality of servers; and the selecting of the tunnel device by the first server may comprise selecting a tunnel device from the respective list of IP addresses of the respective selected first server. The first server may be randomly selected by the second server from the plurality of servers, such as by using one or more random numbers generated by a random number generator.

Any selection herein may be a random selection by using one or more random numbers generated by a random number generator. The random number generator may be using thermal noise, shot noise, nuclear decaying radiation, photoelectric effect, or quantum phenomena. Alternatively or in addition, the random number generator may be software based, and the random number generator may be based on executing an algorithm for generating pseudo-random numbers.

Any server herein, and each of the plurality of servers, may be associated with a one of more attribute values relating to an attribute type, and any server herein, such as the first server, may be selected by the second server from the plurality of servers based on, or according to, the respective one of more attribute values. Any attribute type herein may be a geographical location, and one of more attribute values herein may comprise a name or an identifier of a continent, a country, a region, a city, a street, a ZIP code, or a timezone. Any one of the one of more attribute values may be based on actual geographical location or on IP geolocation, which may be based on W3C Geolocation API, and any request message herein may comprise the one of more attribute values.

Any method herein may be used with a plurality of servers that may include the first server, each of the plurality of servers may be connectable to the Internet, may be addressable in the Internet using a respective IP address, and may store a respective list of IP addresses of the tunnel devices that may be part of the group. Any method herein may further comprise for each of the tunnel devices in the group, selecting, by the respective tunnel device, the first server from the plurality of servers; sending, by the tunnel device to the selected first server, a third message; receiving, by the selected first server from the respective tunnel device, the third message; and storing, in the selected first server, the IP address of the respective tunnel device in the list, and adding, by the selected first server, the respective tunnel device to the group of tunnel devices, so that the respective tunnel device can be selected as a tunnel device as part of the selecting by the selected first server.

The first server may be randomly selected by the respective tunnel device from the plurality of servers. Each of the plurality of servers may be associated with a one of more attribute values relating to an attribute type, and the first server may be selected by the respective tunnel device from the plurality of servers based on, or according to, the respective one of more attribute values. Any attribute type herein may be a geographical location, and one of more attribute values may comprise a name or an identifier of a continent, a country, a region, a city, a street, a ZIP code, or a timezone. Any one of the one of more attribute values may be based on actual geographical location or on IP geolocation, which may be based on W3C Geolocation API, and any request message herein may comprise the one of more attribute values.

Any method herein may be used with a Domain Name System (DNS) server, and any content identifier herein may comprise a domain name. Any method herein may further comprise performing, by the client device using the DNS server, a DNS resolution for obtaining a numerical IP address, and the request message, the first message, and the second message may comprise the obtained numerical IP address. Alternatively or in addition, any method herein may further comprise performing, by the second server using the DNS server, a DNS resolution for obtaining a numerical IP address, and any request message herein may comprise the domain name, and the first message and the second message may comprise the obtained numerical IP address. Alternatively or in addition, any method herein may further comprise performing, by the selected tunnel device using the DNS server, a DNS resolution for obtaining a numerical IP address, and each of the request message, the first message, and the second message may comprise the domain name.

Any content herein may comprise a web-page or a website. Any content identifier herein may be, or may comprise, a Uniform Resource Identifier (URI) or a Uniform Resource Locator (URL). Any or each of each of the IP addresses herein may be in IPv4 or IPv6 form. Any web server herein may use HyperText Transfer Protocol (HTTP) or HTTP Secure (HTTPS) for responding to respective HTTP or HTTPS requests via the Internet, and any content request herein may be, or may comprise, an HTTP or an HTTPS request. Any communication over the Internet herein, such as between the client device and the second server, between the second server and the first server, between the first server and the selected tunnel device, or between the selected tunnel device and the web server, may be based on, may use, or may be compatible with, Transmission Control Protocol over Internet Protocol (TCP/IP) protocol or connection. Alternatively or in addition, the communication over the Internet between the client device and the second server, between the second server and the first server, between the first server and the selected tunnel device, and between the selected tunnel device and the web server, may be based on, may use, or may be compatible with, Transmission Control Protocol over Internet Protocol (TCP/IP) protocol or connection.

Any method herein may further be used for redundancy or resiliency, and may further comprise selecting, by any device, such as the first server, an additional IP address associated with any device, such as an additional tunnel device from the list of tunnel devices, in response to the received first message; sending, by any device, such as the additional tunnel device, to any device, such as the web server, a content request that may comprise the content identifier; receiving, by any device, such as the additional tunnel device, from any device, such as the web server, the content, in response to the content request; and receiving, by any device such as the client device, from any device, such as the second server, the content received by the additional tunnel device in response to the request message. Any selecting herein of the additional IP address may be performed after the sending of the content request by the selected tunnel device, or alternatively before the sending of the content request by the selected tunnel device.

Any method herein may further comprise sending, by any device, such as the first server, to any device, such as the additional tunnel device, an additional message using an IP address of the additional tunnel device; receiving, by any device, such as the additional tunnel device from any device, such as the first server, the additional message; sending, by any device, such as the additional tunnel device, to any device, such as the second server, the content; receiving, by any device, such as the second server, from any device, such as the additional tunnel device, the content; and sending, by any device, such as the second server to any device, such as the client device, the content.

Any selecting herein, such as by the first server, of an IP address associated with a tunnel device may comprise selecting, by any device, such as the first server, any multiple IP addresses respectively associated with multiple tunnel devices from the list of tunnel devices, in response to the received first message. At least two of, or all of, the multiple IP addresses may be selected in parallel. Alternatively or in addition, at least two of, or all of, the multiple IP addresses may be sequentially selected. Any method herein may further comprise, for each tunnel device from the multiple tunnel devices, receiving, by any device, such as the client device, the content from the tunnel device, in response to the request message. The content from at least two of, or all of, any multiple tunnel devices, may be sequentially received or in parallel. Any method herein may further comprise selecting and using, by any device, such as the client device, a content received from one of any multiple tunnel devices, such as the content first received from one of the multiple tunnel devices. Any method herein may further comprise discarding, by any device, such as the client device, the content received from non-selected ones of any multiple tunnel devices, or comparing, by any device, such as the client device, the content received from two or more of any multiple tunnel devices.

Any method herein may further comprise, for each tunnel device from any multiple tunnel devices, sending, by any device, such as the tunnel device to any device, such as the web server, a content request that may comprise the content identifier; and receiving, by any device, such as the tunnel device from any device, such as the web server, the content, in response to the content request. Any sending of the content request, or any receiving of the content from the web server, by at least two of, or all of, the multiple tunnel devices, may be performed sequentially or in parallel. Any protocols used by at least two of, or all of, any multiple tunnel devices, for the receiving of the content from the web server, may be identical, or may be different from each other.

Any method herein may further comprise, for each tunnel device from any multiple tunnel devices, sending, by any device, such as the first server, to any device, such as the tunnel device, any second message using an IP address of the tunnel device; and receiving, by any device, such as the tunnel device, from any device, such as the first server, the second message. Any sending of the second message by any device, such as by the first server to, or the receiving of the content from any device such as the first server by, at least two of, or all of, the multiple tunnel devices, may be performed sequentially or in parallel. Any protocols used by at least two of, or all of, any multiple tunnel devices, for the receiving of the content from any device such as the first server, may be identical or may be different from each other.

Any method herein may further comprise, for each tunnel device from any multiple tunnel devices sending, by any device, such as the tunnel device to the any device, such as the second server, the content; receiving, by any device, such as the second server from any device, such as the tunnel device, the content; sending, by any device such as the second server, to any device, such as the client device, the content; and receiving, by any device such as the client device, from any device, such as the second server, the content in response to the request message. Any sending of the content to the second server, or any receiving of the content from the second server, by at least two of, or all of, the multiple tunnel devices, may be performed sequentially or in parallel. Any protocols used by at least two of, or all of, the multiple tunnel devices, for the sending of the content to the second server, may be identical, or may be different from each other.

The number of any selected multiple IP addresses herein may be equal to, or more than, 2, 3, 4, 5, 6, 7, 8, 9, 10, 12, 15, 20, 30, 35, 40, 45, 50, 60, 70, or 100 IP addresses. Further, the number of any selected multiple IP addresses herein may be less than, 3, 4, 5, 6, 7, 8, 9, 10, 12, 15, 20, 30, 35, 40, 45, 50, 60, 70, 100, or 150 IP addresses. Any list of the IP addresses herein may comprise, or may consist of, multiple distinct lists, and each of the multiple distinct lists may comprise one or more of the IP addresses associated with the tunnel devices in the group, and any multiple IP addresses herein may be part of the same list of the multiple distinct lists.

Any method herein may further comprise sending, by any device, such as the client device, to any device, such as the second server, an additional request message that may comprise the content identifier; and receiving, by any device, such as the client device, the content in response to the additional request message. Any method herein may further comprise receiving, by any device, such as the second server, from any device, such as the client device, the additional request message; sending, by any device, such as the second server, to any device, such as the first server, an additional first message; receiving, by any device, such as the first server, from any device, such as the second server, the additional first message; selecting, by any device, such as the first server, an additional IP address associated with an additional tunnel device from the list of tunnel devices, in response to the received additional first message; sending, by any device, such as the selected additional tunnel device, to any device, such as the web server, a content request that comprises the content identifier; and receiving, by any device, such as the selected additional tunnel device, from any device, such as the web server, the content, in response to the content request. Further, any method herein may further comprise sending, by any device, such as the first server to the selected additional tunnel device, an additional second message using the additional IP address of the selected first tunnel device; receiving, by any device, such as the selected additional tunnel device, from any device, such as the first server, the additional second message; sending, by any device, such as the selected additional tunnel device, to any device, such as the second server, the content; receiving, by any device, such as the second server, from any device, such as the selected additional tunnel device, the content; and sending, by any device, such as the second server, to any device, such as the client device, the content.

Any sending of any additional request message may be at least in part in parallel to, or after, any sending of any other request message. Any receiving, by any device, such as the client device, the content in response to the additional request message may be in parallel, or after, the receiving, by any device, such as the client device, the content in response to any other request message. Any method herein may further comprise selecting and using, by any device, such as the client device, one of the content received in response to any additional request message and the content received in response to any other request message, such as selecting and using, the first received content. Any method herein may further comprise discarding, by any device, such as the client device, the content received from non-selected one of the content received in response to multiple request messages.

Any method herein may further comprise sending, by any device, such as the client device, to any device such as the second server, multiple request messages, and each of the multiple request messages may comprise the content identifier; and receiving, by any device, such as the client device, the content in response each of to the multiple request messages. The number of sent multiple request messages herein may be equal to, or may be more than, 2, 3, 4, 5, 6, 7, 8, 9, 10, 12, 15, 20, 30, 35, 40, 45, 50, 60, 70, or 100 messages. Alternatively or in addition, the number of sent multiple request messages herein may be less than 3, 4, 5, 6, 7, 8, 9, 10, 12, 15, 20, 30, 35, 40, 45, 50, 60, 70, 100, or 150 messages. The content received in response to at least two of, or all of, any multiple request messages, may be received sequentially or in parallel. Any protocols used for the sending of at least two of, or all of, the multiple request messages, or for the receiving of the responses therefor, may be identical, or may be different from each other. Any method herein may further comprise selecting and using, by any device, such as the client device, a content received in response for one of the sent multiple request messages, such as the first received content. Any method herein may further comprise discarding, by any device, such as the client device, the content received in response to the non-selected ones of the sent multiple request messages. Any method herein may further comprise comparing, by any device, such as the client device, the content received from in response to two or more sent multiple request messages.

Any method herein may further comprise receiving, by any device, such as the second server, from any device, such as the client device, each of the of the multiple request messages; sending, by any device, such as the second server, to any device, such as the first server, messages in response to the received multiple request messages; and receiving, by any device, such as the first server, from any device, such as the second server, the messages. Any method herein may further comprise selecting, by any device, such as the first server, for each one of the multiple request messages an IP address associated with a tunnel device from any list of tunnel devices. Any list of the IP addresses herein may comprise, or may consist of, multiple distinct lists, and each of the multiple distinct lists may comprise one or more of the IP addresses associated with the tunnel devices in the group, and any selected multiple IP addresses herein may be part of the same list of the multiple distinct lists.

Any method herein may further comprise selecting, by any device, such as the first server, an IP address associated with a tunnel device from the list of tunnel devices, in response to each of the received first message; sending, by any device, such as the first server, to any device, such as the selected tunnel device, multiple messages each using an IP address of the selected tunnel devices; receiving, by any device, such as each of the selected tunnel devices from any device, such as the first server, the messages; sending, by any device, such as by each of the selected tunnel device, to any device, such as the web server, a content request that may comprise the content identifier; receiving, by any device, such as by each of the selected tunnel device, from any device, such as the web server, the content, in response to the content request; sending, by any device, such as by each of the selected tunnel device, to any device, such as the second server, the content; receiving, by any device such as the second server, from any device, such as each of the selected tunnel device, the content; and sending, by any device, such as the second server, to any device, such as the client device, each of the received content. The protocols used for at least two of, or all of, any sending actions herein, or of the receiving actions herein, may be identical, or may be different from each other. At least two of, or all of, any sending actions herein, or any receiving actions herein, may be performed in parallel or sequentially.

Any method herein may further comprise sending, by any device, such as the first server, to any device, such as the second server, a part of, or whole of, the list of the IP addresses. Any method herein may further be preceded by sending a request message by any device, such as the second server, to any device such as the first server, and receiving the request message by any device, such as the first server, from any device, such as the second server, and the sending of the part of, or the whole of, the list, may be in response to the received request message. The list of the IP addresses may comprise, or may consist of, multiple distinct lists, and each of the multiple distinct lists may comprise one or more of the IP addresses associated with the tunnel devices in the group, and the request message may comprise an identifier of at least one list of the multiple distinct lists, and the part of, or the whole of, the list may comprise the identified at least one list.

Any method herein may further comprise additional sending, by any device, such as the first server, to any device, such as the second server, the part of, or the whole of, an updated list, at least after 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months. Alternatively or in addition, any sending herein may comprise periodical sending, and the sending may be every at least 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or any sending herein may be every less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months.

Any list herein of the IP addresses may comprise, or may consist of, multiple distinct lists, and each of any multiple distinct lists herein may comprise one or more of the IP addresses associated with the tunnel devices in the group, and any sending herein, such as by the first server to the second server, may comprise sending of at least one list from the multiple distinct lists, and each of the at least one list may be associated with a same value or a value range of an attribute type.

Any method herein may further comprise sending, such as by the client device to the second server, an additional request message that may comprise an additional content identifier that identifies additional content; receiving, such as by the second server from the client device, the additional request message; and selecting, such as by the first server, an IP address associated with a tunnel device from the received part of, or whole of, the list of tunnel devices, in response to the received additional request message. Any method herein may further comprise receiving, such as by the client device from the second server, the additional content in response to the additional request message. Any method herein may further comprise sending, such as by the second server to the selected tunnel device, an additional message using an IP address of the selected first tunnel device; receiving, such as by the selected tunnel device from the first server, the additional message; sending, such as by the selected tunnel device to the web server, a content request that comprises the additional content identifier; receiving, such as by the selected tunnel device from the web server, the additional content, in response to the additional content request; sending, such as by the selected tunnel device to the second server, the additional content; receiving, such as by the second server from the selected tunnel device, the additional content; and sending, such as by the second server to the client device, the additional content.

Any communication over the Internet herein, such as between the client device and the second server, between the second server and the first server, between the first server and the selected tunnel device, or between the selected tunnel device and the web server, may be based on, may use, or may be compatible with, HTTP or HTTPS protocol or connection, and one of the node may serve as an HTTP or HTTPS server respectively and the other node may serve as an HTTP or HTTPS client respectively. Alternatively or in addition, the communication over the Internet between the client device and the second server, between the second server and the first server, between the first server and the selected tunnel device, and between the selected tunnel device and the web server, may be based on, may use, or may be compatible with, HTTP or HTTPS protocol or connection, and one of the node may serve as an HTTP or HTTPS server respectively and the other node may serve as an HTTP or HTTPS client respectively. Any communication over the Internet between the client device and the second server may be based on, may use, or may be compatible with, HTTPS protocol or connection, and any request message herein may be according to, may be based on, or may use, HTTPS frame or packet form. Any method herein may further comprise extracting, such as by the first or second server, the content identifier using SSL sniffing. Any request message herein may comprise an attribute value corresponding to an attribute type, and any method herein may further comprise extracting, by the first or second server, the attribute value using SSL sniffing.

Any communication over the Internet herein, such as between the client device and the second server, between the second server and the first server, or between the first server and the selected tunnel device, may be based on, uses, or may be compatible with, Socket Secure (SOCKS) protocol or connection, and one of the node may serve as an SOCKS server respectively and the other node may serve as an SOCKS client respectively. Any communication over the Internet herein between the client device and the second server, may be based on, may use, or may be compatible with, Socket Secure (SOCKS) protocol or connection. The second server may serve as an SOCKS server and the client device may serve as an SOCKS client, or the second server may serve as an SOCKS client and the client device may serve as an SOCKS server. Any SOCKS protocol or connection herein may be according to, may be based on, or may be compatible with, SOCKS4, SOCKS4a, or SOCKS5. Alternatively or in addition, any SOCKS protocol or connection herein may be according to, may be based on, or may be compatible with, IETF RFC 1928, IETF RFC 1929, IETF RFC 1961, or IETF RFC 3089.

Alternatively or in addition, any communication between any two entities herein, such as over the Internet between the client device and the second server, between the second server and the first server, or between the first server and the selected tunnel device, may be based on, uses, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Any communication over the Internet herein, such as between the client device and the second server, between the second server and the first server, or between the first server and the selected tunnel device, may be based on, uses, or may be compatible with, HTTP Proxy protocol or connection, and one of the node may serve as an HTTP Proxy server respectively and the other node may serve as an HTTP Proxy client respectively. Any communication over the Internet herein between the client device and the second server, may be based on, may use, or may be compatible with, HTTP Proxy protocol or connection. The second server may serve as an HTTP Proxy server and the client device may serve as an HTTP Proxy client, or the second server may serve as an HTTP Proxy client and the client device may serve as an HTTP Proxy server.

Any tunnel device, or any or each of the tunnel devices in the group may be associated with a single IP address. One or more of the tunnel devices in the group may be associated with multiple IP addresses, such as with more than 1,000, 2,000, 5,000, 10,000, 20,000, 50,000 or 100,000 distinct IP addresses. A primary or sole functionality of any or each of the one or more of the tunnel devices may be to serve as a selected tunnel device.

Any method herein may further comprise storing, operating, or using, by at least one of the tunnel devices in the group, or the selected tunnel device, a server operating system. The server operating system may consist or, may comprise, or may be based on, Microsoft Windows Server®, Linux, or UNIX. Alternatively or in addition, the server operating system may consist or, may comprise, or may be based on, one out of Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Any method herein may further comprise storing, operating, or using, by at least one of the tunnel devices in the group, or the selected tunnel device, a client operating system. The client operating system may consist or, may comprise, or may be based on, one out of Microsoft Windows 7, Microsoft Windows XP, Microsoft Windows 8, Microsoft Windows 8.1, Linux, and Google Chrome OS. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

Any method herein may further comprise storing, operating, or using, by any client device, by at least one of the tunnel devices in the group, or the selected tunnel device, a web browser. The web browser may consist of, may comprise, or may be based on, Microsoft Internet Explorer, Google Chrome, Opera™, or Mozilla Firefox®. Alternatively or in addition, the web browser may be a mobile web browser, which may consist of, may comprise of, or may be based on, Safari, Opera Mini™, or Android web browser.

At least one of the tunnel devices in the group, or the selected tunnel device, may be integrated in part or entirely in an appliance. A primary functionality of the appliance may be associated with food storage, handling, or preparation, such as heating food, and the appliance may be a microwave oven, an electric mixer, a stove, an oven, or an induction cooker. Alternatively or in addition, the appliance may be a refrigerator, a freezer, a food processor, a dishwasher, a food blender, a beverage maker, a coffeemaker, or an iced-tea maker. Alternatively or in addition, a primary function of the appliance may be associated with environmental control, and the appliance may consist of, or may be part of, an HVAC system. Alternatively or in addition, a primary function of the appliance may be associated with temperature control, and the appliance may be an air conditioner or a heater. Alternatively or in addition, a primary function of the appliance may be associated with cleaning such as clothes cleaning, and the appliance may be a washing machine, a clothes dryer, or a vacuum cleaner. Alternatively or in addition, a primary function of the appliance may be associated with water control or water heating. Alternatively or in addition, the appliance may be an answering machine, a telephone set, a home cinema method, a HiFi method, a CD or DVD player, an electric furnace, a trash compactor, a smoke detector, a light fixture, or a dehumidifier. Alternatively or in addition, the appliance may be a battery-operated portable electronic device, such as a notebook, a laptop computer, a media player, a cellular phone, a Personal Digital Assistant (PDA), an image processing device, a digital camera, a video recorder, or a handheld computing device.

Any integration herein may involve sharing a component, housing in same enclosure, sharing same processor, mounting onto same surface, or sharing a same connector, which may be a power connector for connecting to a power source. Alternatively or in addition, the integration may involve sharing the same connector for being powered from same power source, or the integration may involve sharing same power supply.

Any device herein, such as at least one of the tunnel devices in the group, or the selected tunnel device, may be housed in a single enclosure that may be a hand-held enclosure or a portable enclosure. Any device herein, such as at least one of the tunnel devices in the group, or the selected tunnel device, may be integrated with at least one of a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone, which may comprise, or may be based on, an Apple iPhone 6 or a Samsung Galaxy S6.

Any method herein may further comprise storing, operating, or using an operating system, by at least one of the tunnel devices in the group, or the selected tunnel device. The operating system may be a mobile operating system that may comprise Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any method herein may further comprise, or may be preceded by, connecting to the Internet, by any device such as by at least one of the tunnel devices in the group or by the selected tunnel device, via a wireless network.

A non-transitory computer readable medium may contain computer instructions that, when executed by a computer processor, cause the processor to perform at least part of, or all of, the steps of any method herein. At least part of, or all of, the steps of any method herein may be included in a Software development kit (SDK) that may be provided as a non-transitory computer readable medium containing computer instructions, and any method herein may further comprise installing the SDK in any device herein. Any steps by any tunnel device herein may be included in a Software development kit (SDK) that may be provided as a non-transitory computer readable medium containing computer instructions, and any method herein may further comprise installing the SDK on any or each of the tunnel devices in the group. Any client device herein, any server herein, such as the first server or the second server, or the selected tunnel device, may comprise a non-transitory computer readable medium containing computer instructions that, when executed by a computer processor, cause the processor to perform at least part of the steps of any method herein. Any list herein may comprise at least 10,000, 20,000, 50,000, 100,000, 200,000, 500,000, 1,000,000, 2,000,000, 5,000,000, or 10,000,000 IP addresses or tunnel devices.

The first and second servers may be owned, may be operated, or may be controlled by an entity. Further, at least one of the tunnel devices in the group may be owned, may be operated, or may be controlled by the entity. A tunnel device may be randomly selected by the first server.

Each identifier of any content herein or of any device herein may be an IP address (in IPv4 or IPv6 form) or a URL. Each of the servers may be a web server using HyperText Transfer Protocol (HTTP) that responds to HTTP requests via the Internet, and the first and second requests may be HTTP requests. Each communication with a server may be based on, or using, HTTP persistent connection.

Any communication with a network element, such as with the first device, the second device, the first server, or the second server, may be based on, or be according to, TCP/IP protocol or connection, and may be preceded by the step of establishing a connection. Further, communication between any two network elements, such as between the first device and the second device, may be over the established connection. Any communication between any two network elements may use TCP, and the connection may be established by performing 'Active OPEN' or 'Passive OPEN', may use a VPN, or may use a tunneling protocol. Any content herein, such as the first content, may include, consist of, or comprise, a part or whole of files, text, numbers, audio, voice, multimedia, video, images, music, web-site page, or computer program.

Each of the network elements herein, such as any of the servers, may store, operate, or use, a server operating system, that may be based on, comprise, or use, Microsoft Windows Server®, Linux, or UNIX, such as Microsoft Windows Server® 2003 R2, 2008, 2008 R2, 2012, or 2012 R2 variant, Linux™ or GNU/Linux based Debian GNU/

Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Each of the network elements herein, such as the client device or any of the tunnel devices, may store, operate, or use, a client operating system, that may consist or, comprise of, or may be based on, Microsoft Windows 7, Microsoft Windows XP, Microsoft Windows 8, Microsoft Windows 8.1, Linux, or Google Chrome OS. The client operating system may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (µC/OS).

Any apparatus or device herein, such as any one or more of the client devices or of the tunnel devices, may consist of, may comprise, may be integrated with, or may be part of, a wearable device that may be wearable on a person. Any wearable device herein may be wearable on an organ of the person head, such as an eye, ear, face, cheek, nose, mouth, lip, forehead, or chin. Alternatively or in addition, any wearable device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any wearable device herein may be shaped for permanently or releasably being attachable to, or be part of, a clothing piece of a person, and any attaching herein may use taping, gluing, pinning, enclosing, encapsulating, a pin, or a latch and hook clip. Any clothing piece herein may be a top, bottom, or full-body underwear, or a headwear, a footwear, an accessory, an outwear, a suit, a dress, a skirt, or a top. Alternatively or in addition, any wearable device herein may further comprises an annular member defining an aperture therethrough that may be sized for receipt therein of a part of a human body. Any the human body part herein may be part of a human hand that consists of, or comprises, an upper arm, elbow, forearm, wrist, or a finger. Further, any human body part herein may be part of a human head or neck that may consist of, or may comprise, a forehead, ear, skull, or face. Alternatively or in addition, any human body part herein may be part of a human thorax or abdomen that may consists of, or may comprise, a waist or hip. Further, any human body part herein may be part of a human leg or foot that may consist of, or may comprise, a thigh, calf, ankle, instep, knee, or toe.

Any system or method herein may implement redundancy, where the system or method may include one or more additional identical, similar, or different element, such as using two or more identical or similar slices or any other content parts, using two or more identical or similar network elements performing identical or similar functionalities, using two or more identical or similar hardware pieces performing identical or similar functionalities, or using two or more data-paths transporting identical or similar information. The redundancy may be based on Dual Modular Redundancy (DMR), Triple Modular Redundancy (TMR), Quadruple Modular Redundancy (QMR), 1:N Redundancy, 'Cold Standby', or 'Hot Standby'.

The steps described herein may be sequential, and performed in the described order. For example, in a case where a step may be performed in response to another step, or upon completion of another step, the steps may be executed one after the other. However, in case where two or more steps may not be explicitly described as being sequentially executed, these steps may be executed in any order, or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any method herein may be used for fetching a content identified by a content identifier to a client device from a web server, and may be further used with a first and second servers and a tunnel device that may be each connected to the Internet and may each be addressable in the Internet using a respective IP address. The method by the second server may comprise receiving, from the client device, a request message that comprises the content identifier; sending, to the first server, a first message; receiving, from the tunnel device or from the first server, the content; and sending, to the client device, the content, in response to the request message. Any receiving of the content may comprise receiving, from the tunnel device, the content. The method may further comprise responding to a communication initiated by the tunnel device, and the initiated communication by the tunnel device may use, or may be based on, Network Address Translator (NAT) traversal scheme. Any NAT traversal scheme herein may be according to, may be based on, or may use, Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350. Any NAT traversal scheme herein may be according to, may be based on, or may use, Traversal Using Relays around NAT (TURN), Socket Secure (SOCKS), Socket Secure (SOCKS) or WebSocket (ws), which may be WebSocket Secure (wss), NAT 'hole punching', Session Traversal Utilities for NAT (STUN), Interactive Connectivity Establishment, (ICE), UPnP Internet Gateway Device Protocol (IGDP), or Application-Level Gateway (ALG). The method may further comprise in response to the communication initiated by the tunnel device, sending, to the tunnel device, the content identifier.

The communication over the Internet with the tunnel device, with the first server, or with the client device, may be based on, may use, or may be compatible with, Transmission Control Protocol over Internet Protocol (TCP/IP) protocol or connection. Further, the communication over the Internet with the tunnel device, with the first server, or with the client device, may be based on, may use, or may be compatible with, HTTP or HTTPS protocol or connection, and the second server may serve as an HTTP or HTTPS server respectively and the tunnel device may serve as an HTTP or HTTPS client respectively.

Furthermore, the communication over the Internet with the tunnel device, with the first server, or with the client device, may be based on, may use, or may be compatible with, Socket Secure (SOCKS) protocol or connection, and the second server may serve as an SOCKS server and respectively the tunnel device, the first server, or the client device may serve as an SOCKS client. Any SOCKS protocol or connection herein may be according to, may be based on, or may be compatible with, SOCKS4, SOCKS4a, or SOCKS5. Alternatively or in addition, any SOCKS protocol or connection may be according to, may be based on, or may be compatible with, IETF RFC 1928, IETF RFC 1929, IETF RFC 1961, or IETF RFC 3089. Alternatively or in addition, any communication over the Internet with the tunnel device, with the first server, or with the client device, may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Further, the communication over the Internet with the tunnel device, with the first server, or with the client device, may be based on, may use, or may be compatible with, HTTP Proxy protocol or connection, and the second server may serve as an HTTP Proxy server and respectively the tunnel device, the first server, or the client device may serve as an HTTP Proxy client. The method may further comprise establishing a connection with the tunnel device, and the second server may initiate communication with the tunnel device using the established connection. The established connection may be a TCP connection using 'Active OPEN', 'Passive OPEN', or TCP keepalive mechanism, or the established connection may use, or may be based on, Virtual Private Network (VPN).

The method may further comprise sending, to the client device, the IP address of the tunnel device, may be used with a first IP address stored in the client device, and the request message may comprises the first IP address. Further, the first message may comprise the first IP address. The method may further be used with a plurality of servers that includes the first server. Each of the plurality of servers may be connectable to the Internet, and may be addressable in the Internet using a respective IP address. The method may further comprise selecting the first server from the plurality of servers, such as where the first server may be randomly selected from the plurality of servers. The first server may be randomly selected using one or more random numbers generated by a random number generator, and the random number generator may be hardware or software based. The random number generator may use thermal noise, shot noise, nuclear decaying radiation, photoelectric effect, or quantum phenomena, or may be based on executing an algorithm for generating pseudo-random numbers.

Each of any plurality of servers herein may be associated with a one of more attribute values relating to an attribute type, and the first server may be selected from the plurality of servers based on, or according to, the respective one of more attribute values. Any message herein, such as the request message, may comprise the one of more attribute values. The attribute type may be a geographical location, and one of more attribute values may comprise a name or an identifier of a continent, a country, a region, a city, a street, a ZIP code, or a timezone. Further, one of more attribute values may be based on actual geographical location or on IP geolocation, which may be based on W3C Geolocation API.

Any method herein may be used with a Domain Name System (DNS) server, and any content identifier herein may comprise a domain name. Any method herein may further comprise performing, using the DNS server, a DNS resolution for obtaining a numerical IP address, and any message herein, such as the request message, may comprise the domain name, and any message herein, such as the request message, such as the first message, may comprise the obtained numerical IP address.

The communication over the Internet with the client device may be based on, may use, or may be compatible with, HTTPS protocol or connection, and any message herein, such as the request message, may be according to, may be based on, or may use, HTTPS frame or packet form. Any method herein may further comprising extracting, by the first or second server, the content identifier using SSL sniffing. Any message herein, such as the request message, may comprise an attribute value corresponding to an attribute type, and the method may further comprise extracting, the attribute value using SSL sniffing.

A non-transitory computer readable medium containing computer instructions that, when executed by a computer processor, cause the processor to perform any part of, or all of, any of the methods herein. A server may comprise a non-transitory computer readable medium containing computer instructions that, when executed by a computer processor, cause the processor to perform part of, or all of, any method herein.

Any of the servers herein, such as the second server, may be storing, operating, or using, a server operating system, which may consist or, may comprise of, or may be based on, Microsoft Windows Server®, Linux, or UNIX. Alternatively or in addition, any server operating system herein may consists of, may comprise of, or may be based on, Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™ Linspire™, Mandriva, Red Hat® Linux, SuSE, and Ubuntu®, UNIX® variant Solaris™, AIX®, Mac™ OS X, FreeBSD®, OpenBSD, or NetBSD®. Any of the servers herein, such as the first and second servers may be owned, operated, or controlled by an entity. Further, any tunnel device herein, may be owned, operated, or controlled by the entity.

A method for fetching a content identified by a content identifier by using tunnel devices may be uses with a first and second servers and a group of tunnel devices that may each be connected to the Internet and may each be addressable in the Internet using a respective IP address. The first server may store a list of the IP addresses associated with the tunnel devices in the group. The method by the first server may comprise receiving, from the second server, a first message that includes the content identifier; selecting, an IP address associated with a tunnel device from the list of tunnel devices, in response to the received first message; and sending, to the selected tunnel device, a second message using an IP address of the selected tunnel device. The second message may comprise the content identifier. The method may further comprise receiving, from the selected tunnel device, the content; and sending, to the second server, the content. The second message may comprise the IP address of the second server.

The method may be used with a first device that may be connected to the Internet and addressable in the Internet using a first IP address. The method may further comprise receiving, from the first device, a third message; and storing, the first IP address in the list, and adding the first device to the group of tunnel devices, so that the first device can be selected as a tunnel device as part of the selecting. The third message may comprise at least one value relating to at least one attribute type associated with the first device, and the method may further comprise storing, the at least one value, as associated with the first device or with the first IP address. The method may further comprise establishing a connection with the first device, and the initiated communication with the first device may use the established connection. The established connection may be a TCP connection using 'Active OPEN', 'Passive OPEN', or TCP keepalive mechanism, or may use, or may be based on, Virtual Private Network (VPN).

Alternatively or in addition, the method may further comprise, for each of the tunnel devices in the group, receiving, from each of the tunnel devices, a respective third message; storing, the IP address of the tunnel device in the list, and adding the tunnel device to the group of tunnel devices, so that the tunnel device can be selected as a tunnel device as part of the selecting by the first server. The third message may comprise at least one value relating to at least one attribute type associated with the tunnel device, and the method may further comprise storing, the at least one value, as associated with the tunnel device or with the tunnel device IP address. Further, the method may further comprise establishing a connection with the tunnel device, and the communication may be initiated with the tunnel device using the established connection. The established connection may be a TCP connection using 'Active OPEN', 'Passive OPEN', or TCP keepalive mechanism, or the established connection may use, or may be based on, Virtual Private Network (VPN).

The first message may comprises a first IP address, and the selecting, by the first server of the tunnel device from the list of tunnel devices may be based on, or may be in response to, the received first IP address. Alternatively or in addition, the selecting of the tunnel device may comprise selecting a tunnel device having the first IP address.

The method may be used with a first tunnel device in the group that may be operating in multiple states that may include an idle state and non-idle states. The method may further comprise selecting the first tunnel device in response to the first tunnel device being in the idle state. The method may further comprise receiving, from the first tunnel device, a message responsive to the first tunnel device state; and the first tunnel device may be selected in response to the first tunnel device state being the idle state. Alternatively or in addition, the method may further comprise receiving, from the first tunnel device, a first status message; and adding, the IP address of the first tunnel device to the list of IP addresses in response to received first status message. Further, the method may further comprise receiving, from the first tunnel device, the second status message; and removing, the IP address of the first tunnel device from the list of IP addresses in response to received second status message.

The method may be used with a first attribute type, and each of the tunnel devices in the group may be associated with a first value relating to the first attribute type. The method may further comprise storing, the first value for associated each of the tunnel devices in the group. The first value may comprise a numeric value or an identifier of a feature, a characteristic, or a property of the first attribute type.

Any selecting of any tunnel device herein may be based on the first value associated with the selected tunnel device, and any method herein may further comprise receiving, from each of the tunnel devices in the group, the respective first value. The first message may comprise one or more values, and the selecting of the tunnel device, may be based on comparing the one or more values to the first value associated with the selected tunnel device. Alternatively or in addition, the first message may comprise a requested value, and the selecting of the tunnel device, may be based on the requested value being equal to the first value associated with the selected tunnel device. Alternatively or in addition, the first message may comprise multiple values, and the selecting of the tunnel device may be based on the first value associated with the selected tunnel device being equal to one of the multiple values. Any values herein of the first attribute type may be numerical values, and the first message may comprise a minimum value, and the selecting, of the tunnel device, may be based on the first value of the associated with the selected tunnel device being higher than the minimum value. Alternatively or in addition, the values of the first attribute type may be numerical values, and the first message may comprise a maximum value, and the selecting of the tunnel device, may be based on the first value associated with the selected tunnel device being lower than the maximum value. Alternatively or in addition, the first message may comprise a maximum and a minimum values, and the selecting of the tunnel device, may be based on the first value associated with the selected tunnel device being lower than the maximum value and higher than the minimum value.

Any method herein may further be used with a second attribute type, and each of the tunnel devices in the group may be associated with a second value relating to the second attribute type, and the method may further comprise, storing the second value for associated each of the tunnel devices in the group. The selecting of the tunnel device may be based on the first and second values associated with the selected tunnel device, and the method may further comprise receiving, from each of the tunnel devices in the group, the respective first and second values. Alternatively or in addition, the first message may comprise a first set of one or more values and a second set of one or more values, and the selecting of the tunnel device, may be based on respectively comparing the first and second sets to the first and second values associated with the selected tunnel device. Alternatively or in addition, the selected tunnel device may be selected so that the first value may be included in the first set and the second value may be included in the second set. Alternatively or in addition, the selected tunnel device may be selected so that the first value may be included in the first set or the second value may be included in the second set. Further, the selected tunnel device may be selected so that the first value may be included in the first set and the second value may not be included in the second set.

Any attribute type herein, such as the first attribute type, may comprise a geographical location, and each of the first values may comprise a name or an identifier of a continent, a country, a region, a city, a street, a ZIP code, or a timezone. Further, the first value of each of the tunnel devices in the group or each of the IP addresses may be based on IP geolocation, which may be based on W3C Geolocation API. Any method herein may be used with a database associating IP addresses to geographical locations, and the database may be stored in the first or second server. The method may further comprise receiving and storing, by the first or second server, the database, and estimating or associating the first value to each of the tunnel devices in the group by using the database. Any attribute herein, such as the first attribute type, may comprise Internet Service Provider (ISP) or Autonomous System Number (ASN) identification, and each of the first values may comprise respectively a name or an identifier of the ISP or the ASN number.

Alternatively or in addition, the first attribute type may correspond to a hardware of software of tunnel devices. The first attribute type may comprise the hardware of tunnel devices, such as stationary or portable values, respectively based on the tunnel device being stationary or portable. Alternatively or in addition, the first attribute type may comprises a software application (such as an operating system) installed, used, or operated, in tunnel devices, and the first values may comprise the type, make, model, or version of the software.

Alternatively or in addition, the first attribute type may correspond to a communication property, feature of a communication link of tunnel devices, such as corresponding to the respective connection to the Internet of tunnel devices or to the communication link of a tunnel device with the first server or the second server. The first attribute type may correspond to a bandwidth (BW) or Round-Trip delay Time (RTT) of the communication link, and the first value may be the respective estimation or measurement of the BW or RTT. Any method herein may further comprise estimating or measuring, by the first server or by a tunnel device, the BW or RTT of the communication link. Alternatively or in addition, the first attribute type may correspond to the technology or scheme used by the tunnel devices for connecting to the first server, and the first values may comprise wired or wireless values, respectively based on the tunnel device being connected to the Internet using wired or wireless connection.

The method may be used with a Domain Name System (DNS) server, and the content identifier comprises a domain name. Any method herein may further comprise performing, using the DNS server, a DNS resolution for obtaining a numerical IP address, and any message herein, such as the second message, may comprise the obtained numerical IP address.

Any communication herein, such as over the Internet with the second server or with the selected tunnel device, may be based on, may use, or may be compatible with, Transmission Control Protocol over Internet Protocol (TCP/IP) protocol or connection. Alternatively or in addition, any communication over the Internet herein, such as with the second server or with the selected tunnel device, may be based on, may use, or may be compatible with, HTTP or HTTPS protocol or connection, and one of the node may serve as an HTTP or HTTPS server respectively and the other node may serve as an HTTP or HTTPS client respectively. Further, the communication over the Internet with the second server or with the selected tunnel device may be based on, may use, or may be compatible with, HTTP or HTTPS protocol or connection, and the first server may serve as an HTTP or HTTPS server and respectively the second server or the selected tunnel device may serve as an HTTP or HTTPS client. Any communication over the Internet herein, such as with the second server or with the selected tunnel device, may be based on, may use, or may be compatible with, HTTPS protocol or connection, and any message herein, such as the first or second message, may be according to, may be based on, or may use, HTTPS frame or packet form. Any method may further comprise extracting, the content identifier using SSL sniffing. Any message herein, such as the first or second message, may comprise an attribute value corresponding to an attribute type, and any method herein may further comprise extracting the attribute value using SSL sniffing.

The communication over the Internet with the second server or with the selected tunnel device, may be based on, may use, or may be compatible with, Socket Secure (SOCKS) protocol or connection, and the first server may serve as an SOCKS server respectively and the second server or the selected tunnel device may serve as an SOCKS client respectively. Any SOCKS protocol or connection herein may be according to, may be based on, or may be compatible with, SOCKS4, SOCKS4a, or SOCKS5. Alternatively or in addition, the SOCKS protocol or connection may be according to, may be based on, or may be compatible with, IETF RFC 1928, IETF RFC 1929, IETF RFC 1961, or IETF RFC 3089. Alternatively or in addition, any communication over the Internet with the second server or with the selected tunnel device, may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Further, any communication herein over the Internet with the second server or with the selected tunnel device, may be based on, may use, or may be compatible with, HTTP Proxy protocol or connection, and the first server may serve as an HTTP Proxy server respectively and the second server or the selected tunnel device may serve as an HTTP Proxy client respectively.

Each of the tunnel devices in the group may be associated with a single IP address. Alternatively or in addition, one or more of the tunnel devices in the group may be associated with multiple IP addresses, such as with more than 1,000, 2,000, 5,000, 10,000, 20,000, 50,000 or 100,000 distinct IP addresses. A primary or sole functionality of each of the one or more of the tunnel devices may be to serve as a selected tunnel device.

In any device (client or server) selection herein, such as when selecting a tunnel device, the device may be randomly selected. The device (such as a tunnel device) may be randomly selected using one or more random numbers generated by a random number generator, and the random number generator may be hardware based, and may be using thermal noise, shot noise, nuclear decaying radiation, photoelectric effect, or quantum phenomena. Alternatively or in addition, the random number generator may be software based, and may be based on executing an algorithm for generating pseudo-random numbers.

A method for fetching a content identified by a content identifier to a client device from a web server by using tunnel devices may use a group of tunnel devices that may each be connected to the Internet and may each be addressable in the Internet using a respective IP address. A second server may be connected to the Internet and may be addressable in the Internet using a respective IP address. The method may comprise sending, to the second server, a request message that comprises the content identifier; and receiving, from the second server, the content in response to the request message. The method may be used with a first attribute type and with a first value relating to the first attribute type, each of the tunnel devices in the group may be associated with a first value relating to the first attribute type, and the request message may comprise one or more values associated with the first attribute type. The first value may comprise a numeric value or an identifier of a feature, a characteristic, or a property of the first attribute type, and the request message may comprise the one or more values, for selecting, of a tunnel device from the group, based on comparing the one or more values to the first value associated with the selected tunnel device.

The method may be used with a second attribute type, and each of the tunnel devices in the group may be associated with a second value relating to the second attribute type. The request message may comprise a first set of one or more values and a second set of one or more values for selecting of the tunnel device based on respectively comparing the first and second sets to the first and second values associated with the selected tunnel device. The first attribute type may comprise a geographical location, and each of the first values may comprise a name or an identifier of a continent, a country, a region, a city, a street, a ZIP code, or a timezone. Alternatively or in addition, the first value of each of the tunnel devices in the group or each of the IP addresses may be based on IP geolocation, which may be based on, or may use, W3C Geolocation API. The method may be used with a database associating IP addresses to geographical locations, and the database may be stored in the first server. The method may further comprise receiving and storing, by the first server, the database, and estimating or associating the first value to each of the tunnel devices in the group by the database. Alternatively or in addition, the first attribute type may comprise Internet Service Provider (ISP) or Autonomous System Number (ASN), and each of the first values may comprise respectively a name or an identifier of the ISP or the ASN number. Further, the first attribute type may correspond to a hardware of tunnel devices, and the first values may comprise stationary or portable values, respectively based on the tunnel device being stationary or portable. Alternatively or in addition, the first attribute type may comprises a software application (such as an operating system) installed, used, or operated, in tunnel devices, and the first values may comprise the type, make, model, or version of the software.

Alternatively or in addition, the first attribute type may correspond to a communication property, feature of a communication link of tunnel devices, such as to the respective connection to the Internet of tunnel devices, or to a communication link of a tunnel device with the web server, the first server, the second server, or the client device. The first attribute type may correspond to a bandwidth (BW) or Round-Trip delay Time (RTT) of the communication link, and the first value may be the respective estimation or measurement of the BW or RTT. The method may further comprise estimating or measuring, by the first server or by a tunnel device, the BW or RTT of the communication link. Further, the first attribute type may correspond to the technology or scheme used by the tunnel devices for connecting to the Internet, and the first values may comprise wired or wireless values, respectively based on the tunnel device being connected to the Internet using wired or wireless connection.

The method may use a Domain Name System (DNS) server, and the content identifier may comprise a domain name, and the method may further comprise performing, using the DNS server, a DNS resolution for obtaining a numerical IP address, and the request message may comprise the obtained numerical IP address.

The web server may use HyperText Transfer Protocol (HTTP) or HTTP Secure (HTTPS) for responding to respective HTTP or HTTPS requests via the Internet, and the content request may respectively be an HTTP or an HTTPS request. Further, the communication over the Internet between the client device and the second server, may be based on, may use, or may be compatible with, Transmission Control Protocol over Internet Protocol (TCP/IP) protocol or connection. Alternatively or in addition, the communication over the Internet between the client device and the second server, may be based on, may use, or may be compatible with, HTTP or HTTPS protocol or connection, and one of the node may serve as an HTTP or HTTPS server respectively and the other node may serve as an HTTP or HTTPS client respectively, such as where the second server serves as an HTTP or HTTPS server respectively and the client device serves as an HTTP or HTTPS client respectively.

Alternatively or in addition, the communication over the Internet between the client device and the second server may be based on, may use, or may be compatible with, Socket Secure (SOCKS) protocol or connection, and the second server may serve as an SOCKS server and the client device may serve as an SOCKS client. The SOCKS protocol or connection may be according to, may be based on, or may be compatible with, SOCKS4, SOCKS4a, or SOCKS5, or may be according to, may be based on, or may be compatible with, IETF RFC 1928, IETF RFC 1929, IETF RFC 1961, or IETF RFC 3089. Alternatively or in addition, any communication over the Internet between the client device and the second server may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Further, the communication over the Internet between the client device and the second server, may be based on, may use, or may be compatible with, HTTP Proxy protocol or connection, and the second server may serve as an HTTP Proxy server and the client device may serve as an HTTP Proxy client.

At least part of steps of any method herein may be included in a Software development kit (SDK) that may be provided as a non-transitory computer readable medium containing computer instructions, and any method herein may further comprise installing the SDK. A method for fetching a content identified by a content identifier from a web server by using a tunnel device may use first and second servers and a tunnel device that may each be connected to the Internet and may be each addressable in the Internet using a respective IP address. The method by the tunnel device may comprise receiving, from the first or second server, a first message that comprises the content identifier; sending, to the web server, a content request that comprises the content identifier; receiving, from the web server, the content, in response to the content request; and sending, to the first or second server, the content. The first message may be received from the first server, and the content may be sent to the second server in response to the first message. Any sending, to the first or second server of the content may comprise exclusively sending, to the first server, the content; or sending, to the second server, the content. The first message may comprise the IP address of the second server.

Any tunnel device herein may be addressable in the Internet using a first IP address, and the method may further comprise sending, to the first server, a second message that may comprise at least one value relating to at least one attribute type associated with the tunnel device. The method may further comprise establishing a connection with the first server, and responding, to a communication initiating by the first server using the established connection. The established connection may be a TCP connection using 'Active OPEN', 'Passive OPEN', or TCP keepalive mechanism or may use, or may be based on, Virtual Private Network (VPN).

The method may further comprise in response to the receiving of the first message, initiating a communication, with the second server. The initiating of the communication may use, or may be based on, a Network Address Translator (NAT) traversal scheme, which may be according to, may be based on, or may use, Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350. Further, the NAT traversal scheme may be according to, may be based on, or may use, Traversal Using Relays around NAT (TURN), Socket Secure (SOCKS), NAT 'hole punching', Session Traversal Utilities for NAT (STUN), Interactive Connectivity Establishment, (ICE), UPnP Internet Gateway Device Protocol (IGDP), or Application-Level Gateway (ALG).

The communication over the Internet with the first or second server, may be based on, may use, or may be compatible with, Transmission Control Protocol over Internet Protocol (TCP/IP) protocol or connection. Further, the communication over the Internet with the first or second server, may be based on, may use, or may be compatible with, HTTP or HTTPS protocol or connection, and the first or second server may serve as an HTTP or HTTPS server and the tunnel device may serve as an HTTP or HTTPS client. Alternatively or in addition, the communication over the Internet with the first or second server, may be based on, may use, or may be compatible with, Socket Secure (SOCKS) protocol or connection, and the first or second server may serve as an SOCKS server and the tunnel device may serve as an SOCKS client. The SOCKS protocol or connection may be according to, may be based on, or may be compatible with, SOCKS4, SOCKS4a, SOCKS5, IETF RFC 1928, IETF RFC 1929, IETF RFC 1961, or IETF RFC 3089. Alternatively or in addition, any communication over the Internet with the first or second server, may be based on, may use, or may be compatible with, Socket Secure (SOCKS) or WebSocket (ws), which may be WebSocket Secure (wss), protocol or connection, and the second server may serve as an WebSocket server and the selected tunnel device may serve as an WebSocket client. Any WebSocket protocol or connection herein may be according to, may be based on, or may be compatible with, IETF RFC 6455. Alternatively or in addition, the communication over the Internet with the first or second server, may be based on, may use, or may be compatible with, HTTP Proxy protocol or connection, and the first or second server may serve as an HTTP Proxy server and the tunnel device may serve as an HTTP Proxy client.

Any device herein, such as any tunnel device, may further be operating in multiple states that includes at least an idle state and non-idle states. The method may further comprise responsive to being in one of the non-idle states, determining, if an idling condition may be met; responsive to the determination that the idling condition may be met, shifting to the idle state; responsive to being in the idle state, determining if an idling condition is met; and responsive to the determination that the idling condition may not be met, shifting to one of the non-idle states. The method may further comprise sending, to the first server, a message responsive to the tunnel device state. Further, the method may further comprise sending, to the first server, a first status message in response to shifting to the idle state; and sending, to the first server, a second status message in response to shifting to a non-idle state.

The method may further comprise operating, an operating system or a program process or thread, and the idling condition may be determined to be met based on, or according to, activating or executing the process or thread by the operating system or the program. The process or thread may comprise any low-priority or background task, an idle process, or a screensaver. Alternatively or in addition, the process or thread may comprise using the entire screen for displaying. The method may further comprise monitoring or metering, a resource utilization, and the idling condition may be determined to be met based on, or according to, the monitored or metered resource utilization being under a threshold. The resource utilization may comprise the utilization of a processor in the tunnel device.

Alternatively or in addition, the tunnel device may comprise an input device for obtaining an input from a human user or operator, the method further comprise sensing, using the input device, the input, and the idling condition may be determined to be met based on, or according to, not receiving an input from the input device for a pre-set time interval. Any input device herein may comprise a pointing device, a keyboard, a touchscreen, or a microphone. Alternatively or in addition, the tunnel device may comprise a motion sensor for sensing motion, acceleration, vibration, or location change of the tunnel device, the method may further comprise sensing, using the motion sensor, the tunnel device motion, acceleration, vibration, or location change, and the idling condition may be determined to be met based on, or according to, respectively sensing the motion, the vibration, the acceleration, or the location change being under a threshold. Any motion sensor herein may comprise an accelerometer, gyroscope, vibration sensor, or a Global Positioning System (GPS) receiver.

Alternatively or in addition, the tunnel device may comprise a network interface or a network transceiver for communication over a network, the method may further comprise metering, an amount of data transmitted to, or received from, the network during a time interval, and the idling condition may be determined to be met based on, or according to, the metered amount of data being under a threshold level. Further, the tunnel device may comprise a battery, the method may further comprise metering or sensing, a battery charging level, and the idling condition may be determined to be met based on, or according to, the metered or sensed charge level being over a threshold level. The metering or sensing may use a Battery Management System (BMS), and the threshold level may be above 40%, 50%, 60%, 70%, 80%, or 90% of the battery defined full charge capacity.

Any tunnel device herein may be associated with a first value relating to a first attribute type, and the first value may comprise a numeric value or an identifier of a feature, a characteristic, or a property of the first attribute type. The method may further comprise sending, to the first server, the first value to the first server. The method may use a second attribute type, the tunnel device may be associated with a second value relating to the second attribute type, and the method may further comprise sending, to the first server, the second value. The first attribute type may comprise a geographical location, and each of the first values may comprise a name or an identifier of a continent, a country, a region, a city, a street, a ZIP code, or a timezone. The first value may be based on IP geolocation that may be based on W3C Geolocation API. The method may use any database associating IP addresses to geographical locations. Furthermore, any first attribute type herein may comprise Internet Service Provider (ISP) or Autonomous System Number (ASN), and the first value may comprise a name or an identifier of the ISP or the ASN number.

Any method herein may be used with a plurality of servers that includes the first server, and each of the plurality of servers may be connectable to the Internet and may be addressable in the Internet using a respective IP address. Any method herein may further comprise selecting, such as randomly selecting, the first server from the plurality of servers. The first server may be randomly selected using one or more random numbers generated by a random number generator, which may be hardware based, such as using thermal noise, shot noise, nuclear decaying radiation, photoelectric effect, or quantum phenomena. Alternatively or in addition, the random number generator may be software based, such as based on executing an algorithm for generating pseudo-random numbers. Alternatively or in addition, the method may be used with a plurality of servers that may include the first server, and each of the plurality of servers may be connectable to the Internet, and may be addressable in the Internet using a respective IP address. The method may further comprise selecting, the first server from the plurality of servers; and sending, to the selected first server, a second message. Any method herein may further comprise selecting, such as randomly selecting, the first server from the plurality of servers. The first server may be randomly selected using one or more random numbers generated by a random number generator, which may be hardware based, such as using thermal noise, shot noise, nuclear decaying radiation, photoelectric effect, or quantum phenomena. Alternatively or in addition, the random number generator may be software based, such as based on executing an algorithm for generating pseudo-random numbers.

Each of the plurality of servers may be associated with a one of more attribute values relating to an attribute type, and the first server may be selected from the plurality of servers based on, or according to, the respective one of more attribute values. The attribute type may be a geographical location, and one of more attribute values may comprise a name or an identifier of a continent, a country, a region, a city, a street, a ZIP code, or a timezone. Further, each of the one of more attribute values may be based on actual geographical location or on IP geolocation, such as W3C Geolocation API. The first message may further comprise the one of more attribute values.

The method may be used with a Domain Name System (DNS) server, and the content identifier may comprise a domain name. The method may further comprise performing, using the DNS server, a DNS resolution for obtaining a numerical IP address, and the first message or the content request may comprise the obtained numerical IP address. Any tunnel device herein may be associated with a single IP address or with multiple IP addresses. Any tunnel device herein may be associated with more than 1,000, 2,000, 5,000, 10,000, 20,000, 50,000 or 100,000 distinct IP addresses. Further, a primary or sole functionality of any tunnel device may be to serve as a tunnel device executing any method herein. The method may further comprising storing, operating, or using, a client operating system, which may consist of, may comprise, or may be based on, one out of Microsoft Windows 7, Microsoft Windows XP, Microsoft Windows 8, Microsoft Windows 8.1, Linux, and Google Chrome OS. Alternatively or in addition, the method may further comprise storing, operating, or using, a web browser, which may consist of, comprise, or may be based on, Microsoft Internet Explorer, Google Chrome, Opera™, or Mozilla Firefox®. Further, the web browser may be a mobile web browser, such as Safari, Opera Mini™, or Android web browser. Any Operating System (OS) herein, such as any server or client operating system, may consists of, include, or be based on a real-time operating system (RTOS), such as FreeRTOS, SafeRTOS, QNX, VxWorks, or Micro-Controller Operating Systems (μC/OS).

Any tunnel device herein may be integrated in part or entirely in an appliance, and a primary functionality of the appliance may be associated with food storage, handling, or preparation. The primary function of the appliance may be heating food, and the appliance may be a microwave oven, an electric mixer, a stove, an oven, or an induction cooker. Alternatively or in addition, the appliance may be a refrigerator, a freezer, a food processor, a dishwasher, a food blender, a beverage maker, a coffeemaker, or an iced-tea maker. Further, the primary function of said appliance may be associated with environmental control, and the appliance may consist of, or may be part of, an HVAC system. Alternatively or in addition, the primary function of the appliance may be associated with temperature control, and the appliance may be an air conditioner or a heater. Further, the primary function of the appliance may be associated with cleaning, the primary function may be associated with clothes cleaning, and the appliance may be a washing machine or a clothes dryer, or the appliance may be a vacuum cleaner. Alternatively or in addition, the primary function of the appliance may be associated with water control or water heating. Further, the appliance may be an answering machine, a telephone set, a home cinema method, a HiFi method, a CD or DVD player, an electric furnace, a trash compactor, a smoke detector, a light fixture, or a dehumidifier. Alternatively or in addition, the appliance may be a battery-operated portable electronic device, such as a notebook, a laptop computer, a media player, a cellular phone, a Personal Digital Assistant (PDA), an image processing device, a digital camera, a video recorder, or a handheld computing device.

Any integration herein, such as with any appliance, may involve sharing a component, such as housing in same enclosure, sharing same processor, or mounting onto same surface. Further, any integration herein may involve sharing a same connector, such as a power connector for connecting to a power source, and the integration may involve sharing the same connector for being powered from same power source, or the integration may involve sharing same power supply.

Any device herein, such as any tunnel device herein, may be housed in a single enclosure that may be a hand-held enclosure or a portable enclosure, and may further be integrated with at least one of a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Any smartphone herein may comprise, or may be based on, an Apple iPhone 6 or a Samsung Galaxy S6. Any method herein, such as any method by any tunnel device, may further comprise storing, operating, or using an operating system, which may be a mobile operating system such as Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any device herein, such as any tunnel device herein, may perform as part of any method herein, connecting to the Internet, via a wireless network. The wireless network may comprise, or may consist of, a Wireless Wide Area Network (WWAN), which may be a wireless broadband network, such as a WiMAX network that may be according to, compatible with, or based on, IEEE 802.16-2009. Further, any wireless network herein may comprise, or may consist of, a cellular telephone network, such as a Third Generation (3G) network that uses a protocol selected from the group consisting of UMTS W-CDMA, UMTS HSPA, UMTS TDD, CDMA2000 1×RTT, CDMA2000 EV-DO, and GSM EDGE-Evolution, or the cellular telephone network may use a protocol selected from the group consisting of a Fourth Generation (4G) network that uses HSPA+, Mobile WiMAX, LTE, LTE-Advanced, MBWA, or may be based on IEEE 802.20-2008. Alternatively or in addition, the wireless network may comprise, or may consist of, a Wireless Personal Area Network (WPAN), which may be according to, may be compatible with, or may be based on, Bluetooth™, Bluetooth Low Energy (BLE), or IEEE 802.15.1-2005 standards, or the WPAN may be a wireless control network that may be according to, or based on, Zigbee™, IEEE 802.15.4-2003, or Z-Wave™ standards. Alternatively or in addition, any wireless network herein may comprise, or may consist of, a Wireless Local Area Network (WLAN), which may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac.

Any method herein may be used with a virtualization, where at least one of the steps may be executed as part of a virtualized application as part of a Virtual Machine (VM). Alternatively or in addition, the client device or any part thereof, the web server or any part thereof, at least one of the multiple tunnel devices or any part thereof, the first server or any part thereof, or the second server or any part thereof, may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices that may be selected from a group consisting of the client device, the web server, at least one of the multiple tunnel devices, the first server, and the second server, may be implemented as virtual hardware, and the at least two devices may be virtualized by the same host computer that implements the VM.

Any method herein may be used with a virtualization, and any communication between any two entities selected from a group consisting of the client device, the web server, at least one of the multiple tunnel devices, the first server, and the second server, may be executed as a virtualized network as part of a Virtual Machine (VM). Further, any method herein may be used with a host computer that may implement the VM, and any method herein may further comprise executing, by the host computer, a hypervisor or a Virtual Machine Monitor (VMM), and the virtualized network may use or may interface virtual hardware. Any such network or communication virtualization may include, may be based on, or may use, full virtualization, para-virtualization, or hardware assisted virtualization.

Any method herein may further comprise storing, operating, or using, an operating system, such as part of the client device, the web server, at least one of the multiple tunnel devices, the first server, the second server, or any combination thereof. The operating system may be executed as a guest operating system as part of a Virtual Machine (VM). Any method herein may be uses with a host computer that implement the VM, and the method may further comprise executing, by the host computer, a hypervisor or a Virtual Machine Monitor (VMM), and the guest operating system may use or may interface virtual hardware. Such virtualization may include, may be based on, or may use, full virtualization, para-virtualization, or hardware assisted virtualization.

In the above summary, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity. Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. It should also be noted that at least some of the operations for the methods described herein may be implemented using software instructions stored on a computer useable storage medium for execution by a computer. As an example, an embodiment of a computer program product includes a computer useable storage medium to store a computer readable program. Any computer-useable or computer-readable storage medium herein can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 10 illustrates schematically a table of data relating to available tunnel devices and their attributes stored in the TB server;

FIG. 33 illustrates schematically a table of data relating to available tunnel devices associated with an idle state and their attributes stored in the TB server;

DETAILED DESCRIPTION

Figure 1:
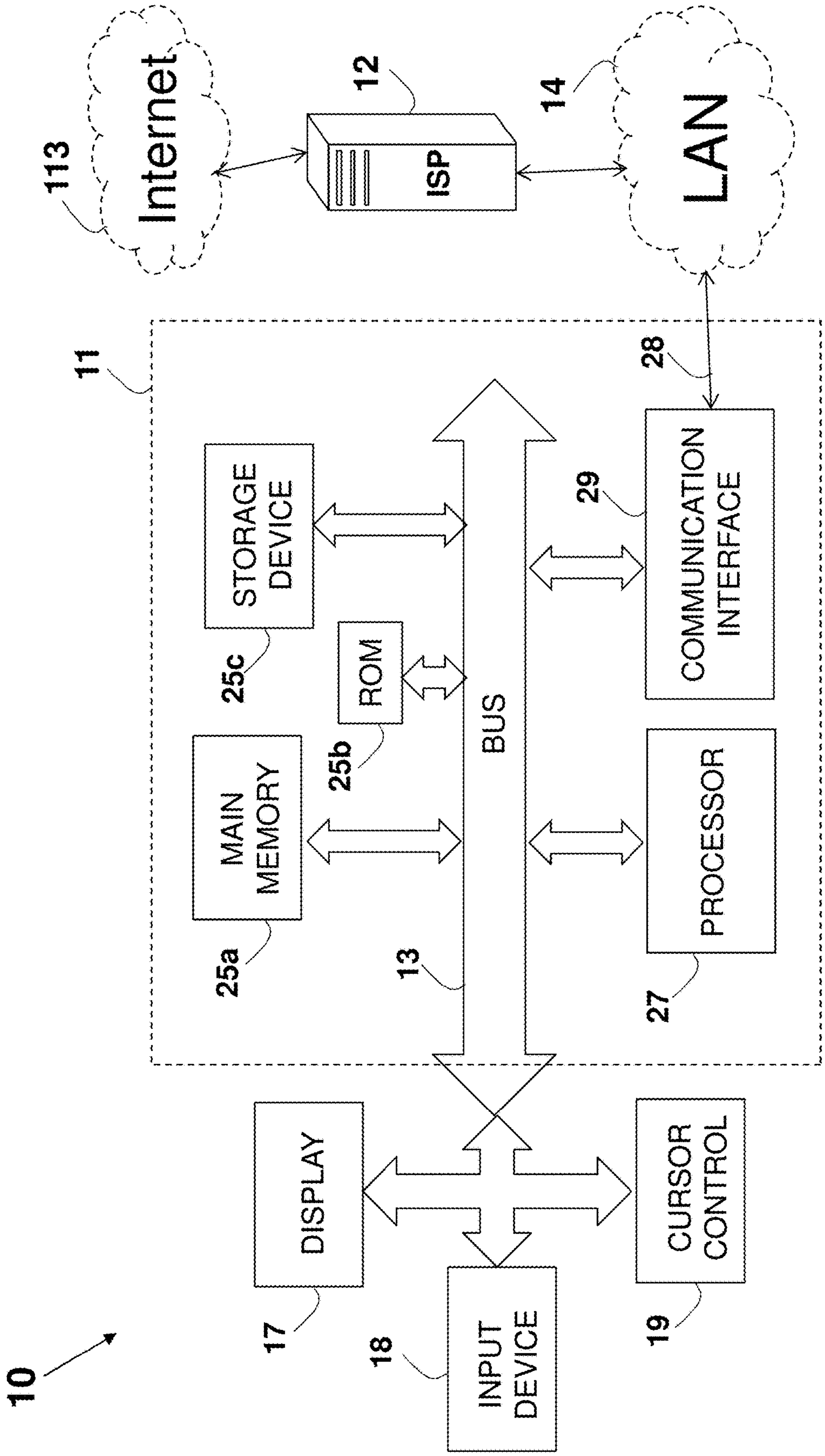
FIG. 1 illustrates schematically a block diagram of a computer connected to the Internet.
Figure 2:
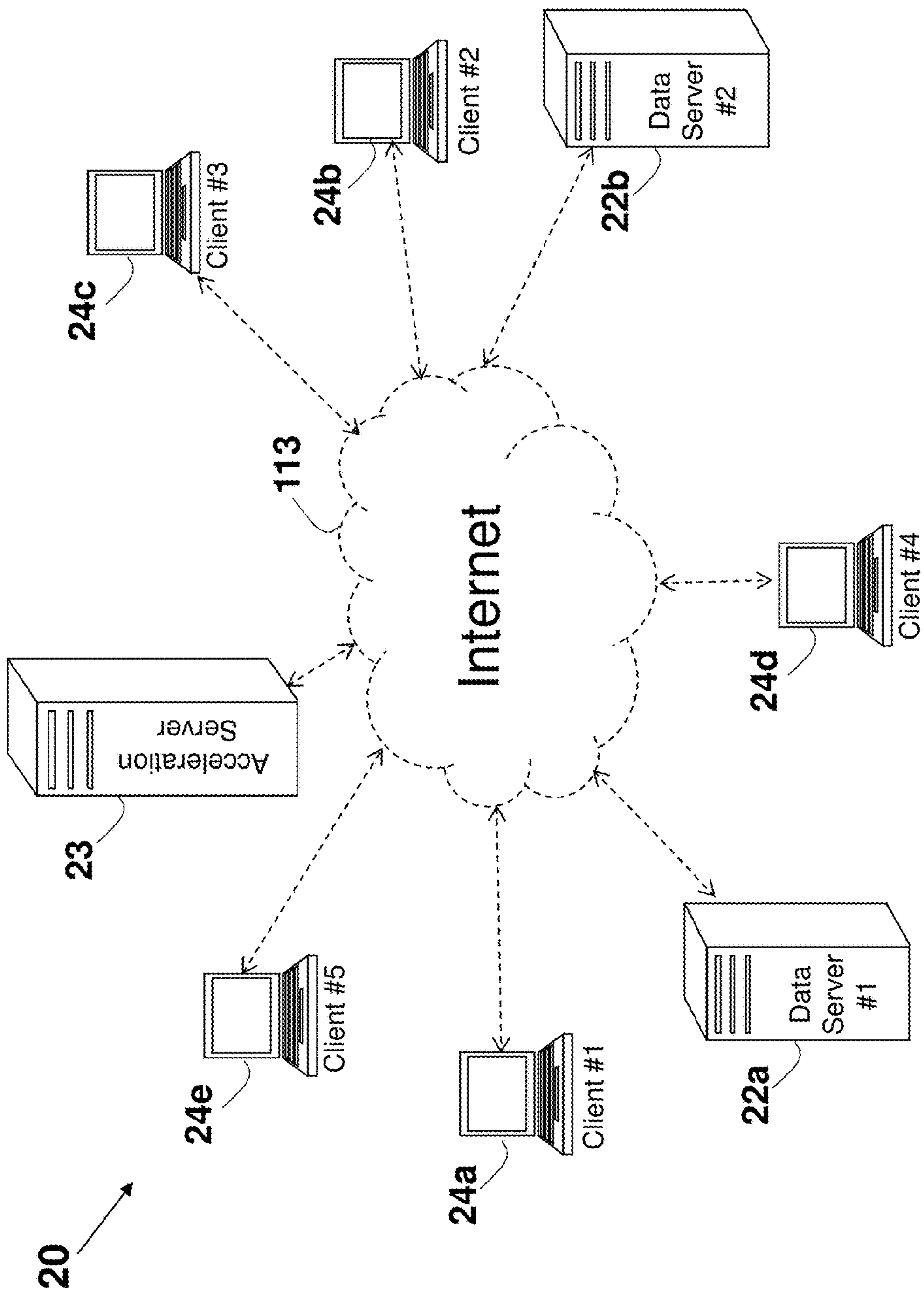
FIG. 2 depicts schematically the Internet and computers connected to the Internet.
Figure 2A:
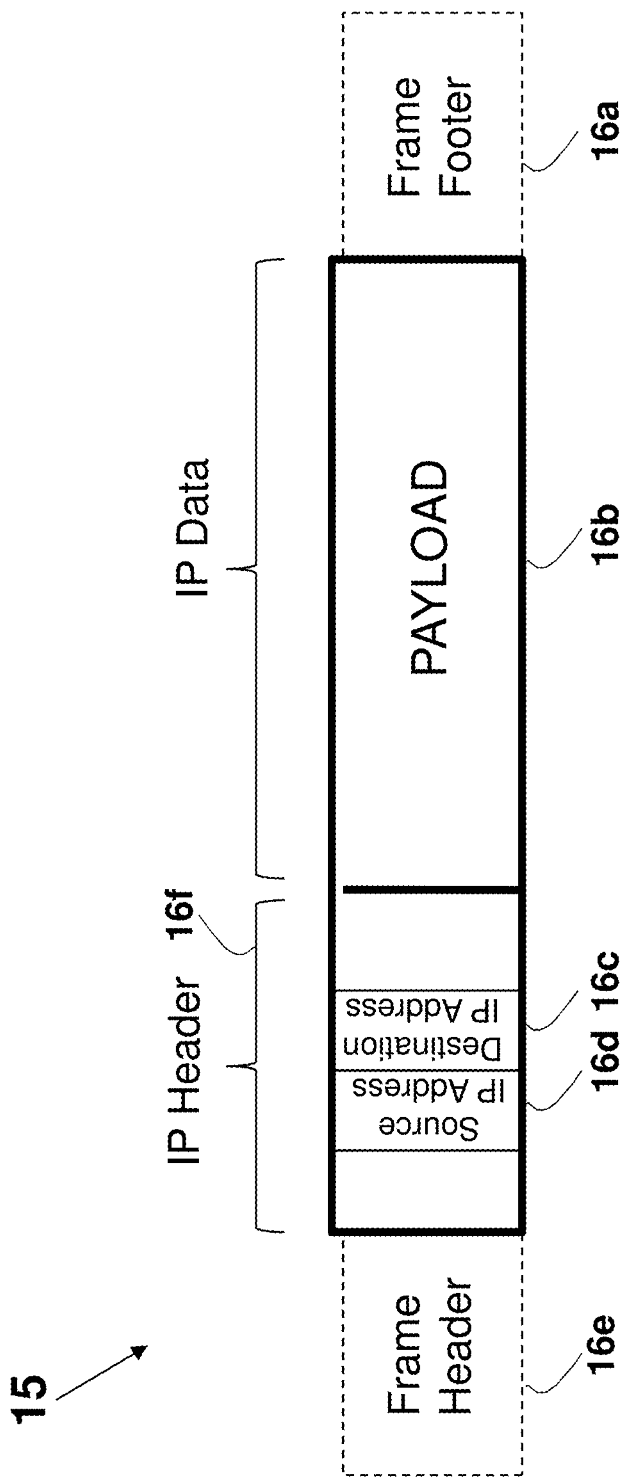
FIG. 2*a* illustrates schematically a structure of an IP-based packet.
Figure 3:
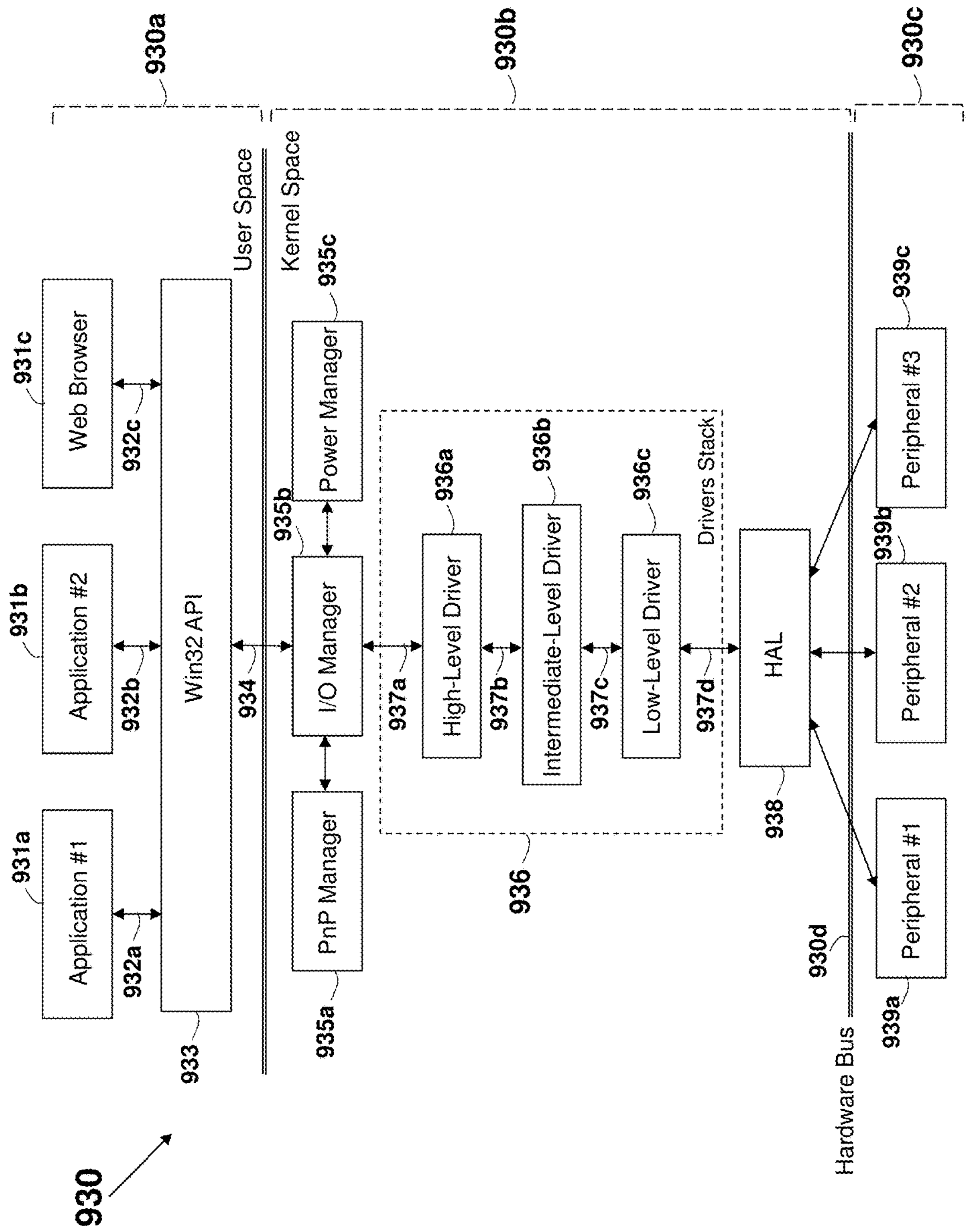
FIG. 3 illustrates schematically a simplified flowchart in a WDM architecture.
Figure 3A:
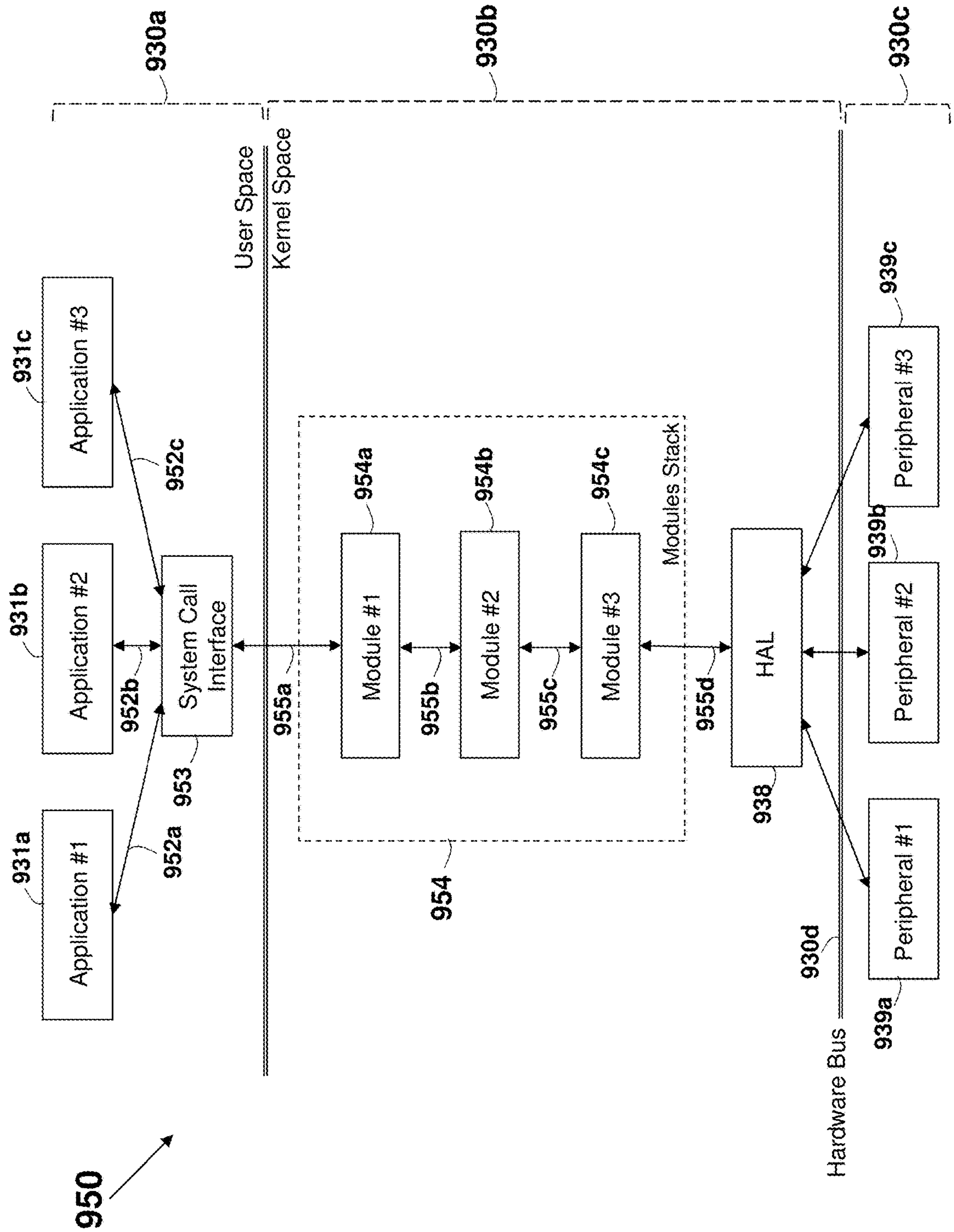
FIG. 3*a* illustrates schematically a simplified flowchart in a Linux architecture.
Figure 3B:
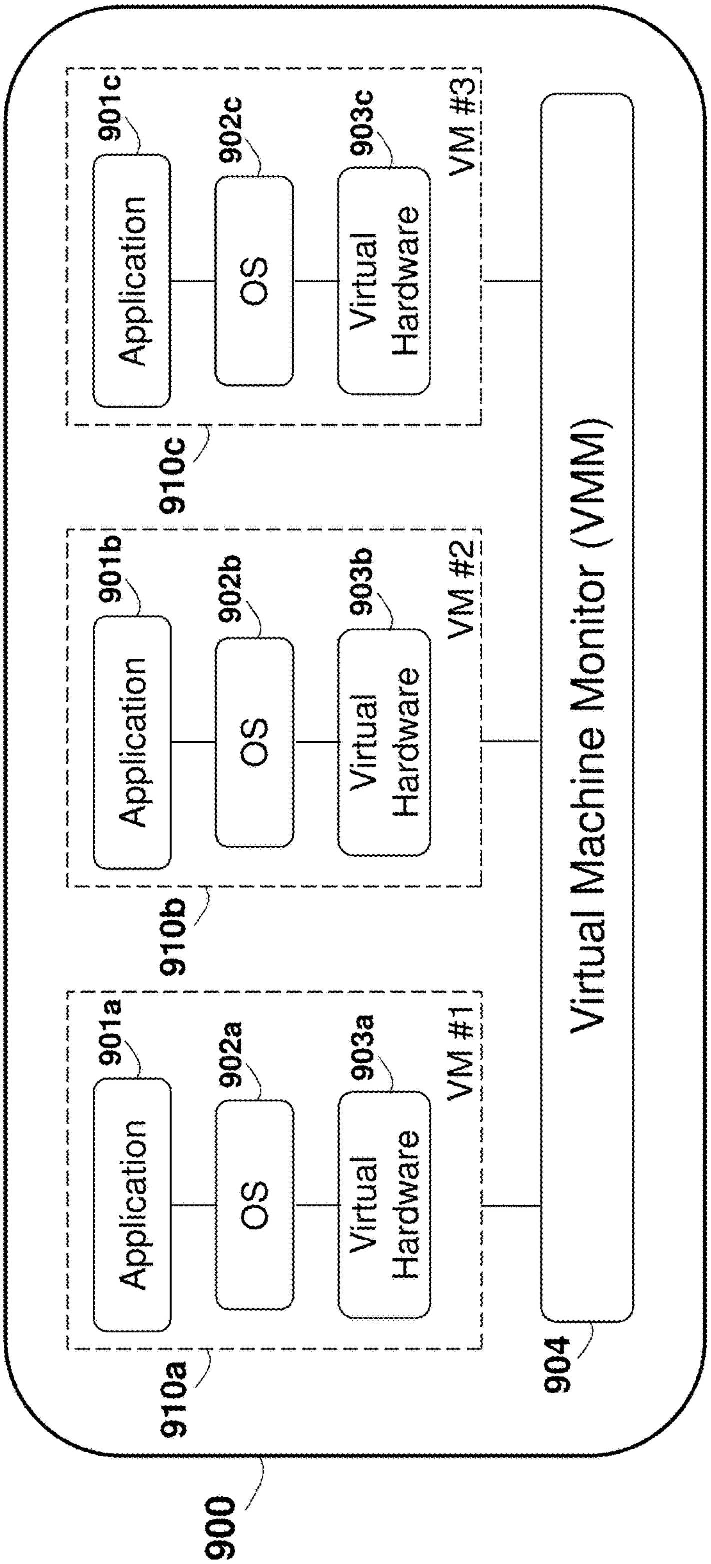
FIG. 3*b* illustrates schematically a prior-art arrangement of virtualization.
Figure 3C:
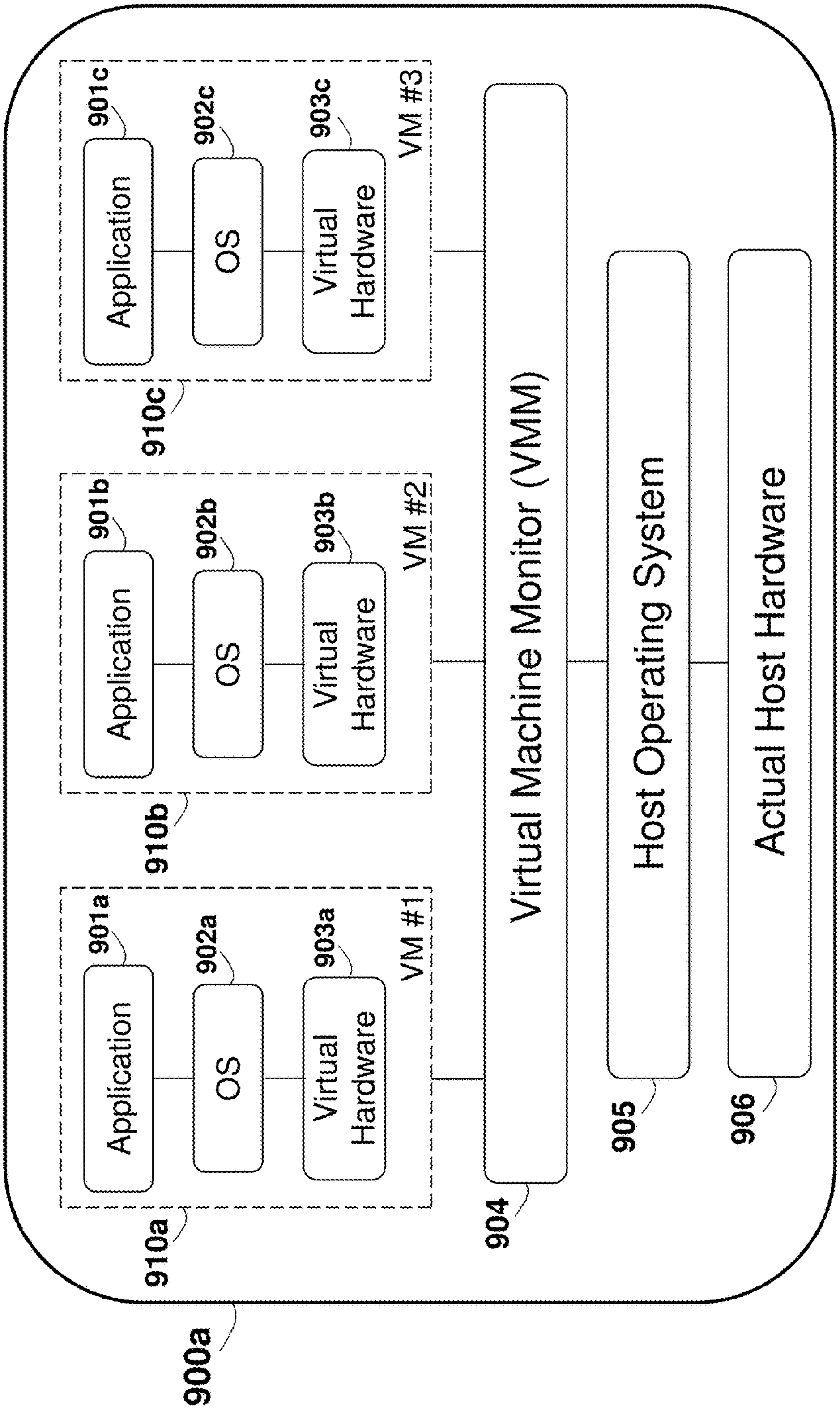
FIG. 3*c* illustrates schematically a prior-art arrangement of hosted architecture of virtualization.
Figure 3D:
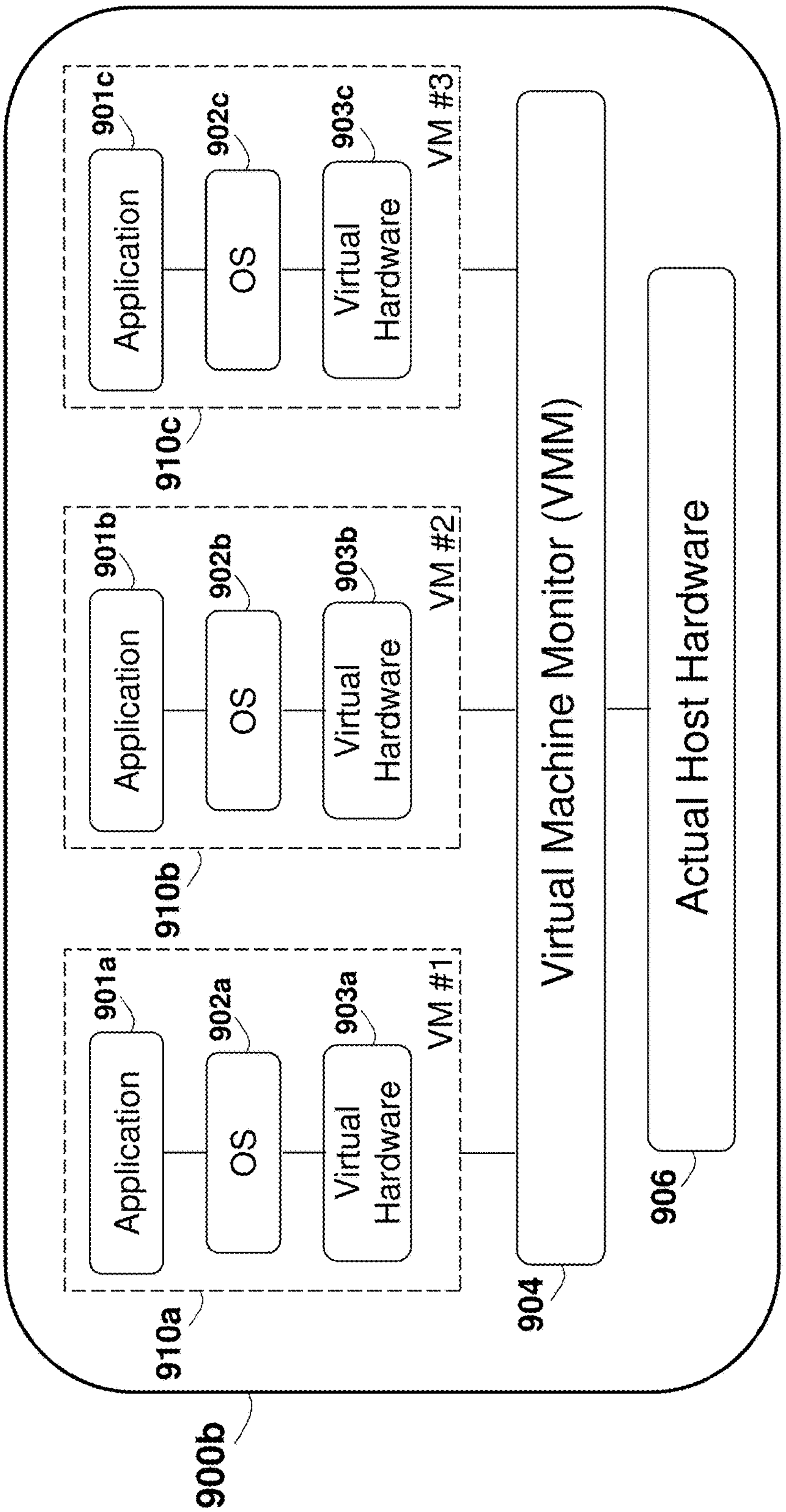
FIG. 3*d* illustrates schematically a prior-art arrangement of bare-metal (hypervisor) architecture of virtualization.
Figure 4:
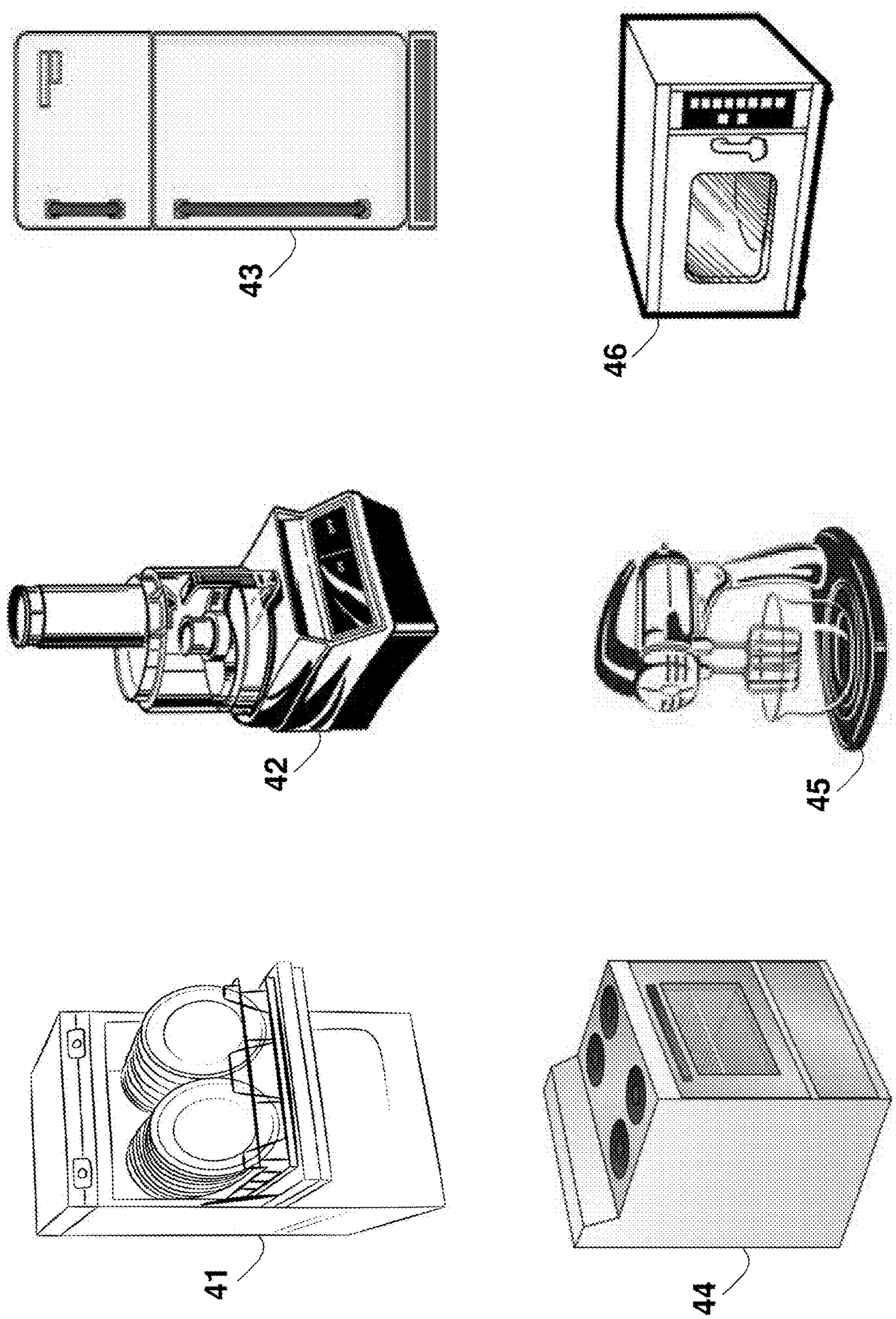
FIG. 4 depicts schematically a few food-related home appliances.
Figure 4A:
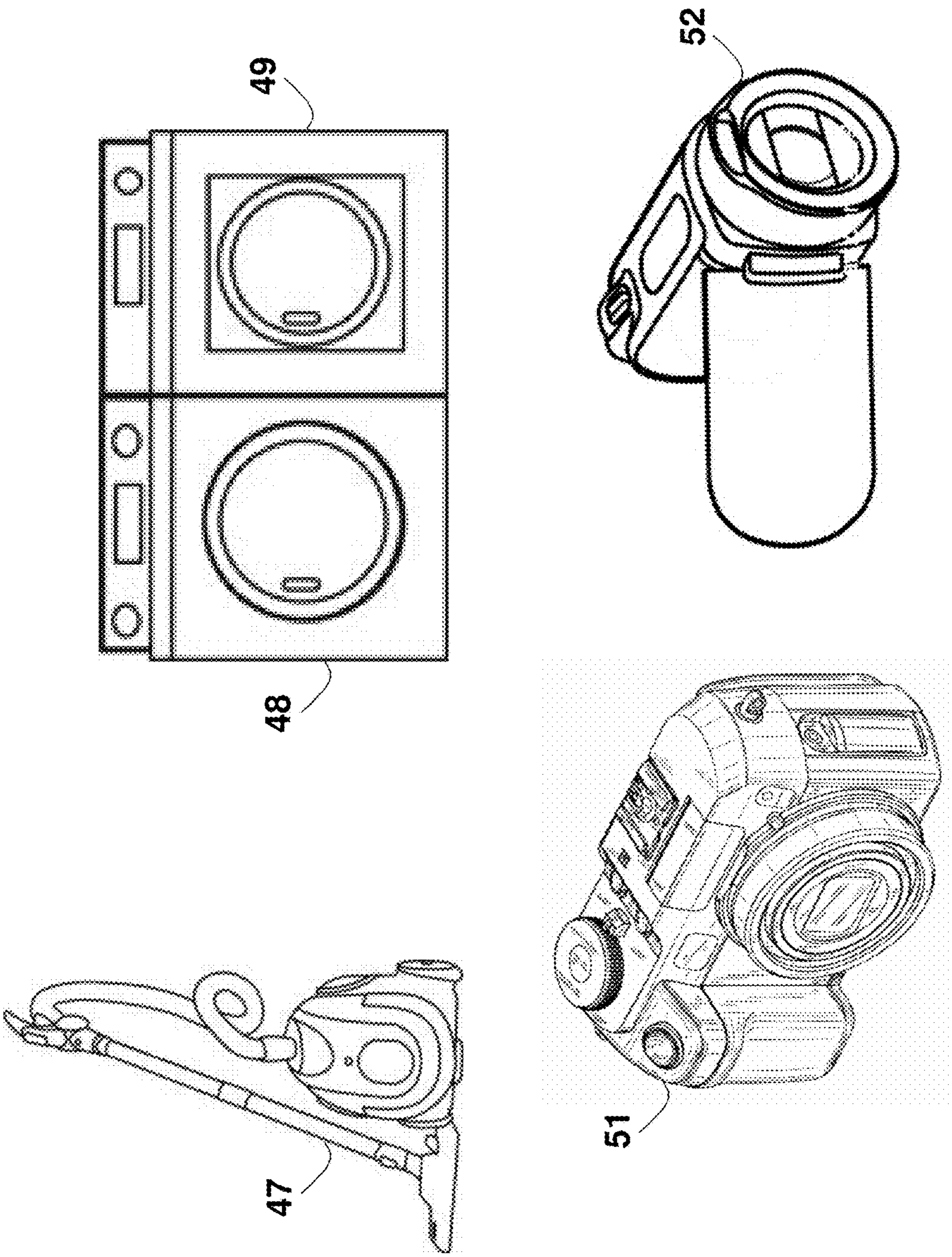
FIG. 4*a* depicts schematically a few cleaning-related home appliances and digital cameras.
Figure 5:
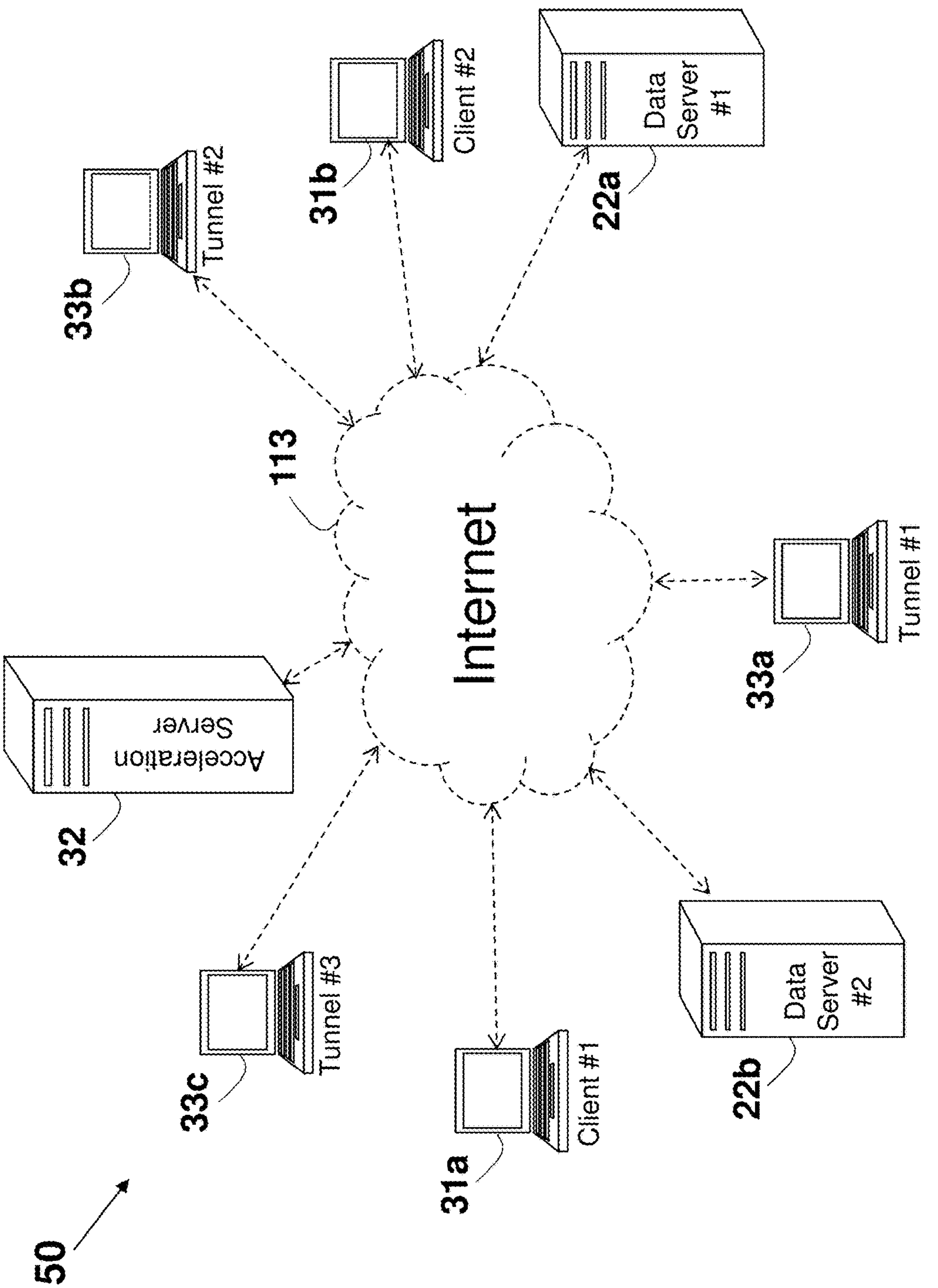
FIG. 5 depicts schematically client devices, tunnel devices, and servers connected to the Internet.
Figure 6:
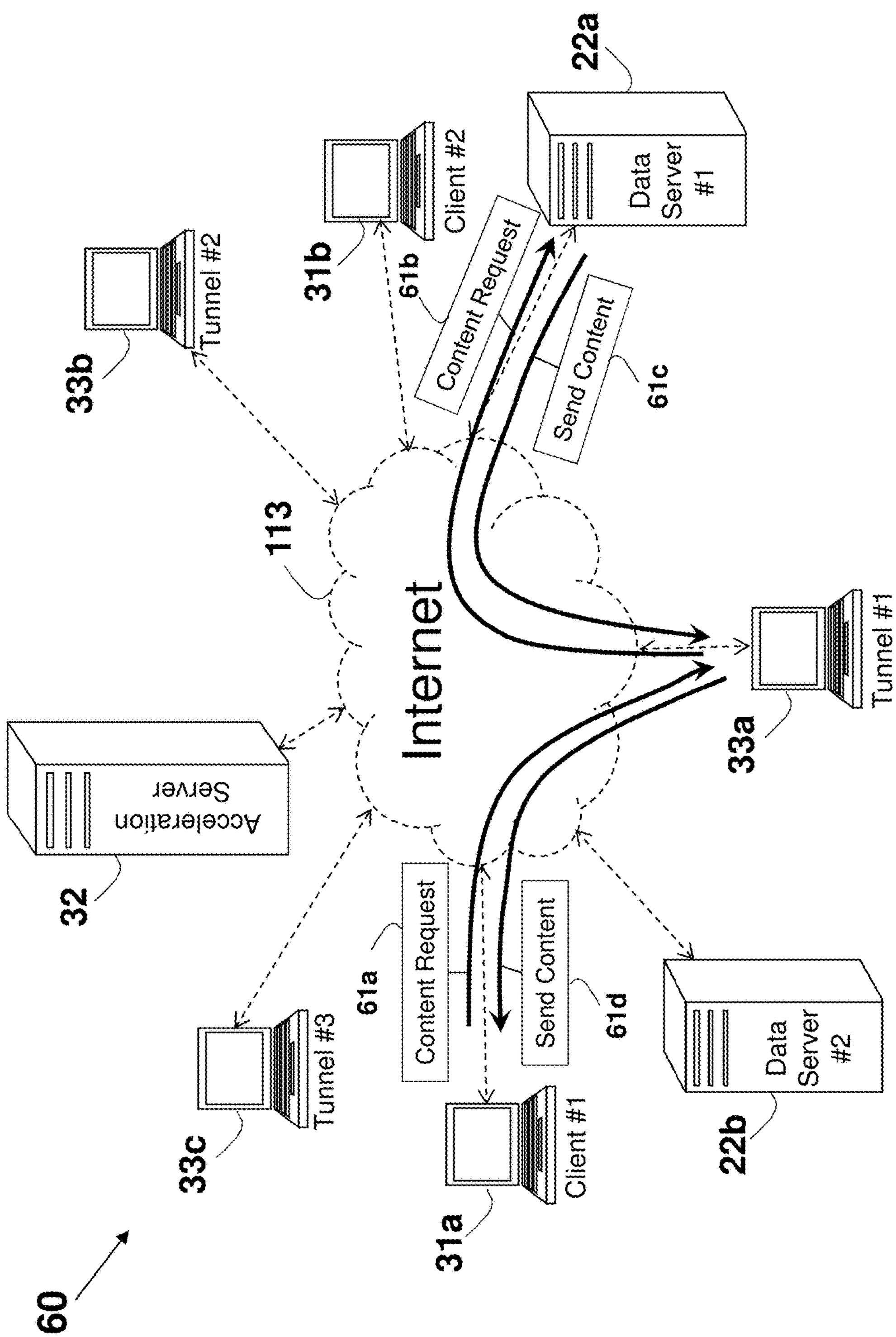
FIGS. 6, 6*a*, and 6*b* depict schematically messages exchanged over the Internet between a client device and a data server, using different tunnel devices, according to '044 patent.
Figure 6A:
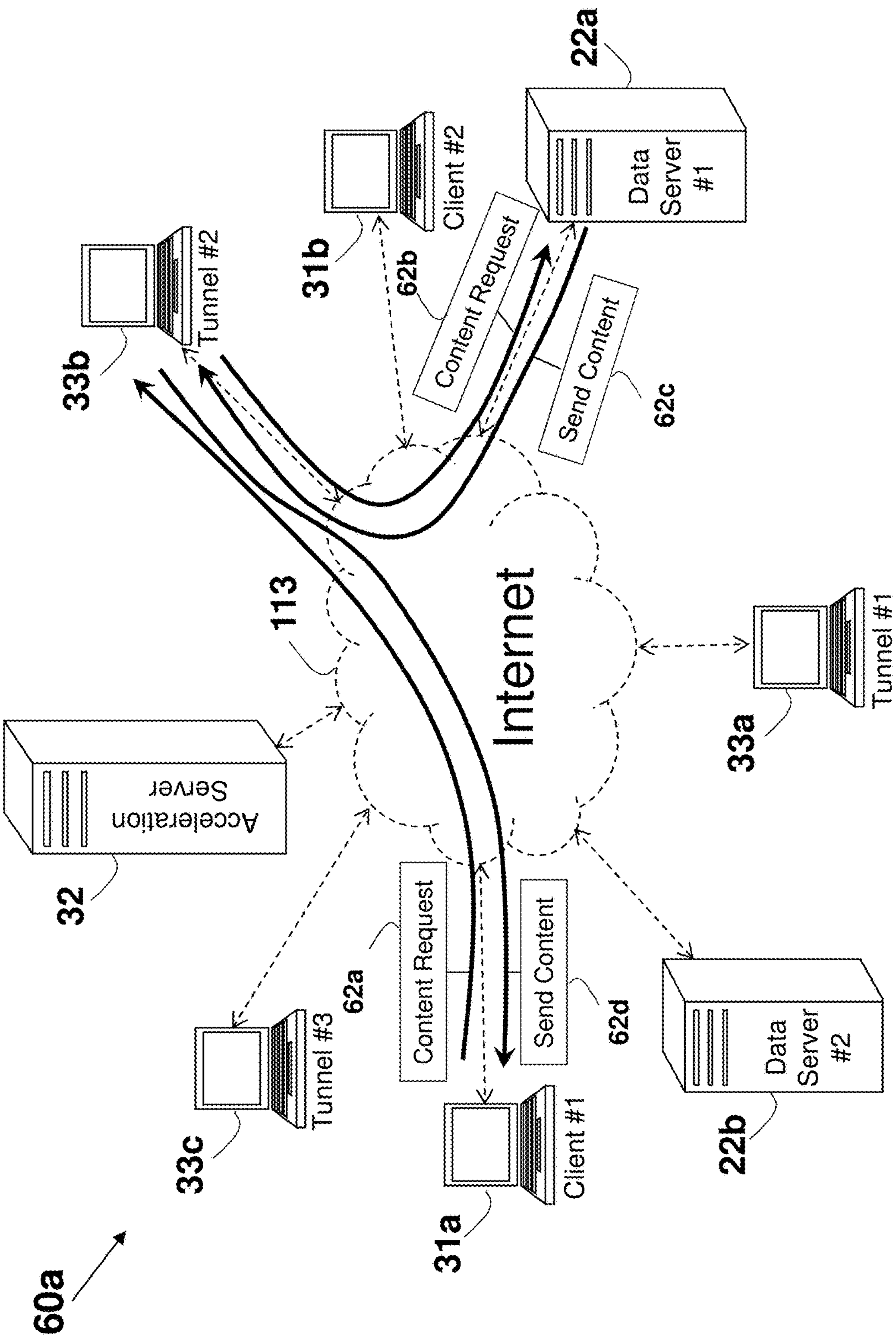
Figure 6B:
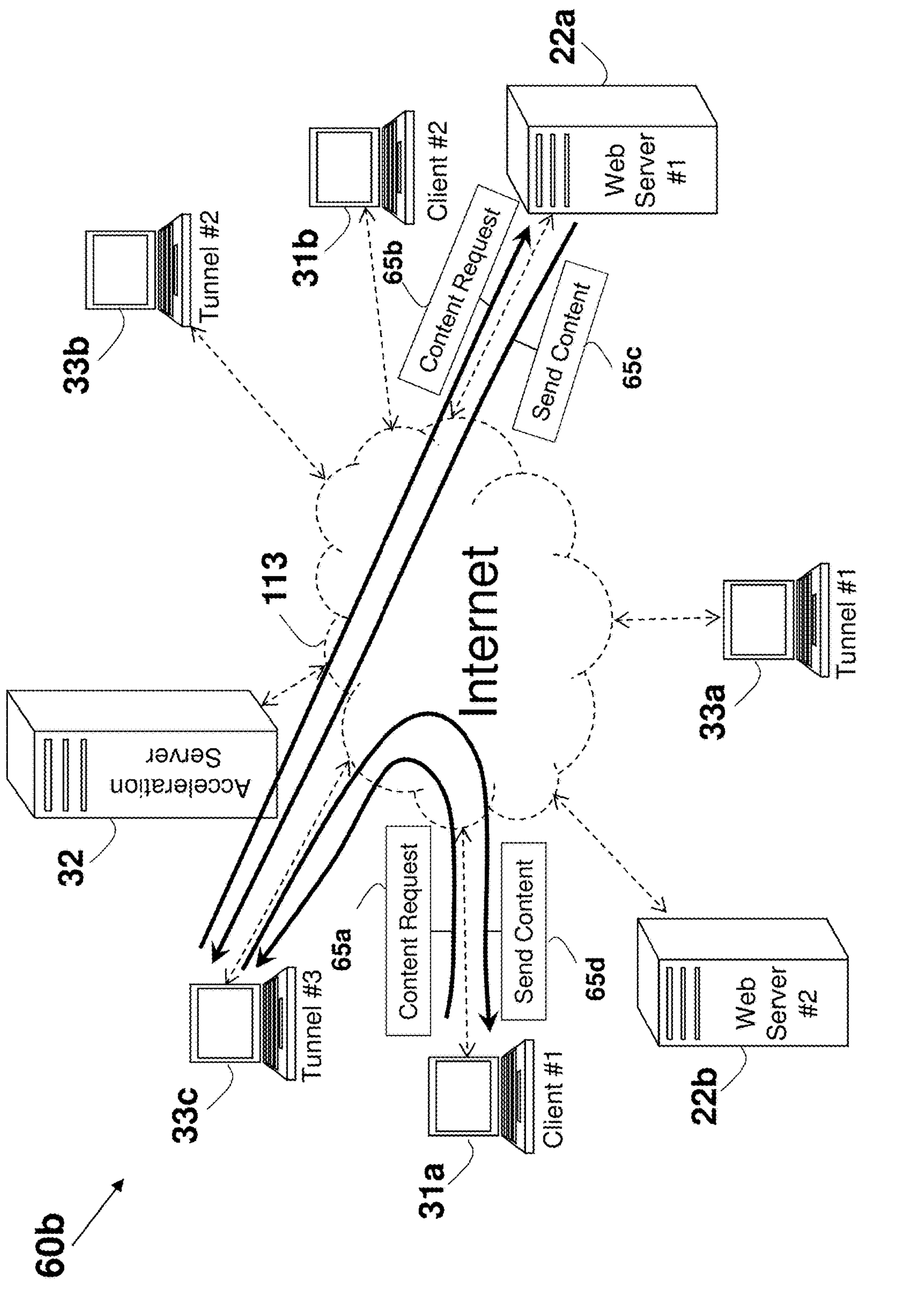

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5*a*, 5*b* and 5*c*) refer to functions or actual devices that are either identical, substantially similar, similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms “a,” “an,” and “the” herein include plural referents unless the context clearly dictates otherwise. Thus, for example, reference to “a component surface” includes reference to one or more of such surfaces. By the term “substantially” it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Each of devices herein may consist of, include, be part of, or be based on, a part of, or the whole of, the computer 11 or the system 10 shown in FIG. 1. Each of the servers herein may consist of, may include, or may be based on, a part or a whole of the functionalities or structure (such as software) of any server described in the ’604 Patent, such as the web server, the proxy server, or the acceleration server. Each of the clients or devices herein may consist of, may include, or may be based on, a part or a whole of the functionalities or structure (such as software) of any client or device described in the ’604 Patent, such as the peer, client, or agent devices.

Each of the servers herein may consist of, may include, or may be based on, a part or a whole of the functionalities or structure (such as software) of any server described in the ’044 Patent, such as the web server, the proxy server, or the acceleration server. Each of the clients or devices herein may consist of, may include, or may be based on, a part or a whole of the functionalities or structure (such as software) of any client or device described in the ’044 Patent, such as the peer, client, or agent devices. Each of the tunnel devices herein may consist of, may include, or may be based on, a part or a whole of the functionalities or structure (such as software) of any tunnel device described in the ’044 Patent, such as the peer, client, or agent devices.

Any of the steps or the flow charts described herein may be included as a Software Development Kit (SDK) that is provided as a non-transitory computer readable medium containing computer instructions. The SDK may be installed in a respective device, either client or a server, to be executed by a processor in that device.

Figure 7:
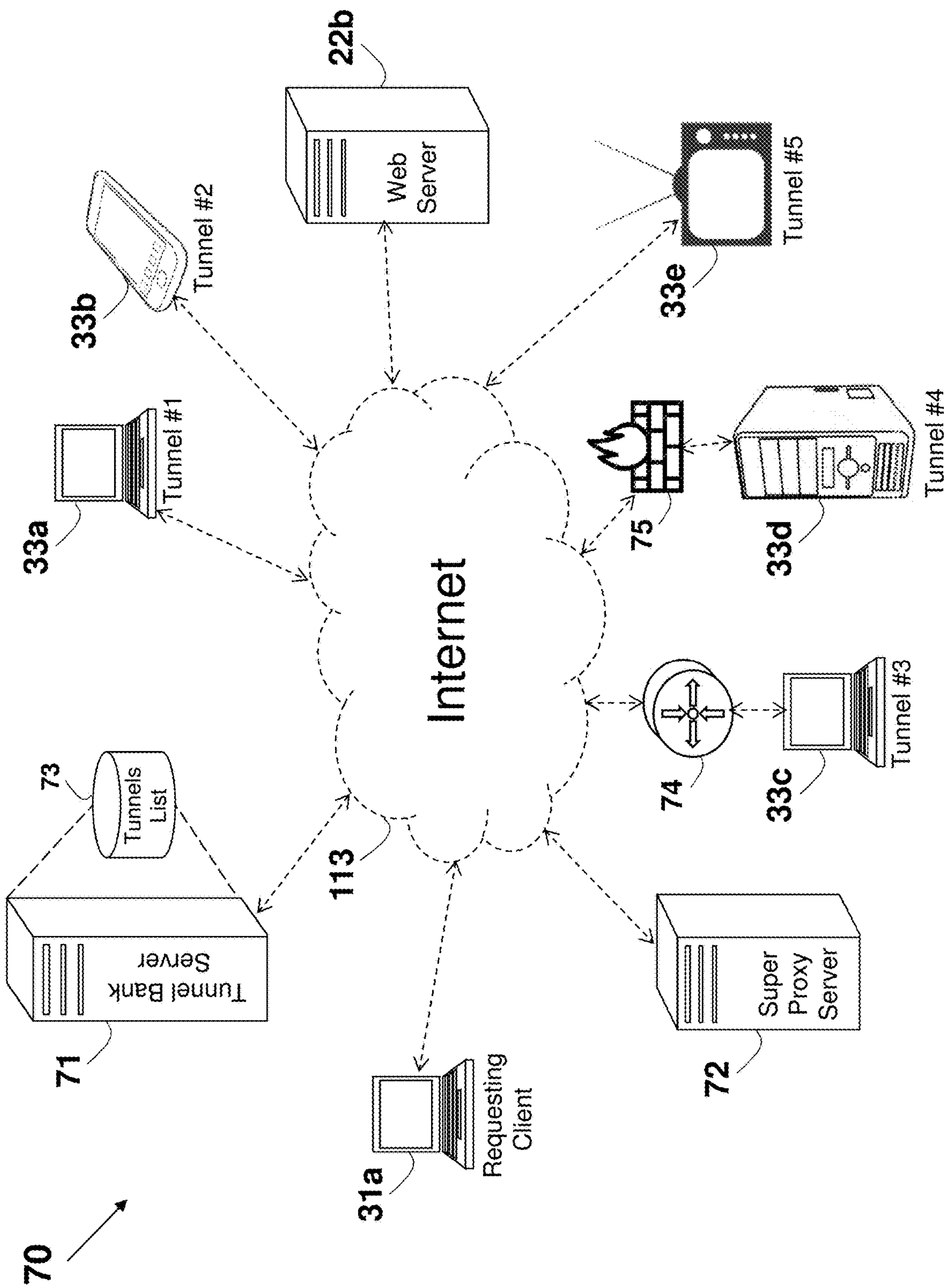
FIGS. 7 and 7*a* depict schematically a client device, tunnel devices, and servers connected to the Internet.

An example of an arrangement 70 for retrieving content by the requesting client device 31*a* from the web server 22*b* is shown in FIG. 7. Multiple Internet-connected devices may serve as tunnel devices, such as a tunnel #1 laptop device 33*a*, a tunnel #2 smartphone device 33*b*, a tunnel #3 laptop device 33*c*, a tunnel #4 desktop device 33*d*, and a tunnel #5 'Smart TV' device 33*e*. The content fetching may be handled, managed, and aided by using a Super-Proxy (SP) server 72 and a Tunnel Bank (TB) server 71.

The TB server 71 is used for storing a list of the available tunnel devices, such as their IP addresses together with attribute values that corresponds to one or more attribute types. The available tunnels list is stored in a memory 73 that is part of, integrated with, connected to, or in communication with, the TB server 71. The SP server 72 receives the content request from the requesting client 31*a*, and manages the content fetching using the TB server 71. The TB server 71 and the SP server 72 may be separated devices located at different geographic locations, as shown in the arrangement 70, may be located in a single location, or may be integrated into a single device or server that combines the functionalities of both servers.

Any device that is available for communicating over the Internet 113 may serve as a tunnel device. A tunnel device may consist of, include, be part of, or be based on, a part of, or the whole of, the computer 11 or the system 10 shown in FIG. 1. Any tunnel device may be any computer system, either stationary (such as the desktop 33*d*) or portable (such as the laptop 33*c*). Further, any tunnel device may be a smartphone (such as the smartphone 33*b*), or may be an appliance, such as the television set 33*e*. Further, any tunnel device herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine Furthermore, a tunnel device may be integrated with an appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffeemaker, or an iced-tea maker. Further, the appliance primary function may be associated with environmental control such as temperature control, and the appliance may consist of, or may be part of, an HVAC system, an air conditioner or a heater. Furthermore, the appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

While 5 tunnel devices are shown in the example of the arrangement 70, any number of tunnels may be equally used. Preferably, the number of tunnel devices that are used may be above 5,000, 10,000, 20,000, 50,000, 100,000, 200,000, 500,000, 1,000,000, 2,000,000, 5,000,000, or 10,000,000.

A tunnel device may connects to the Internet 113 directly, such as the tunnel #1 33*a* and tunnel #2 33*b* shown to directly connect to the Internet 113 as part of the arrangement 70 shown in FIG. 7. Direct connection herein refers to the ability of any Internet connected device or server, such as the TB server 71 and the SP server 72, to communicate, or too initiate a communication session, with the Internet-connected device. Alternatively, a tunnel device may be connected to the Internet via a filtering device, such as a router, gateway, or a firewall. For example, the tunnel #3 33*c* is shown connected to the Internet 113 via a router device (or functionality) 74, and the tunnel #4 33*d* is shown connected to the Internet 113 via the a firewall device (or functionality) 75. Such filtering devices are typically used for data security, and may filter communication to, or from, the Internet relating to a connected device. In one example, only pre-approved IP addresses may initiate a communication session over the Internet with a device connected via such filtering mechanism. For example, the TB server 71 or the SP server 72 may not initiate a communication the tunnel #3 33*c* or with the tunnel #4 33*d*, since such communication may be blocked by the respective router device 74 or firewall device 75.

Figure 7A:
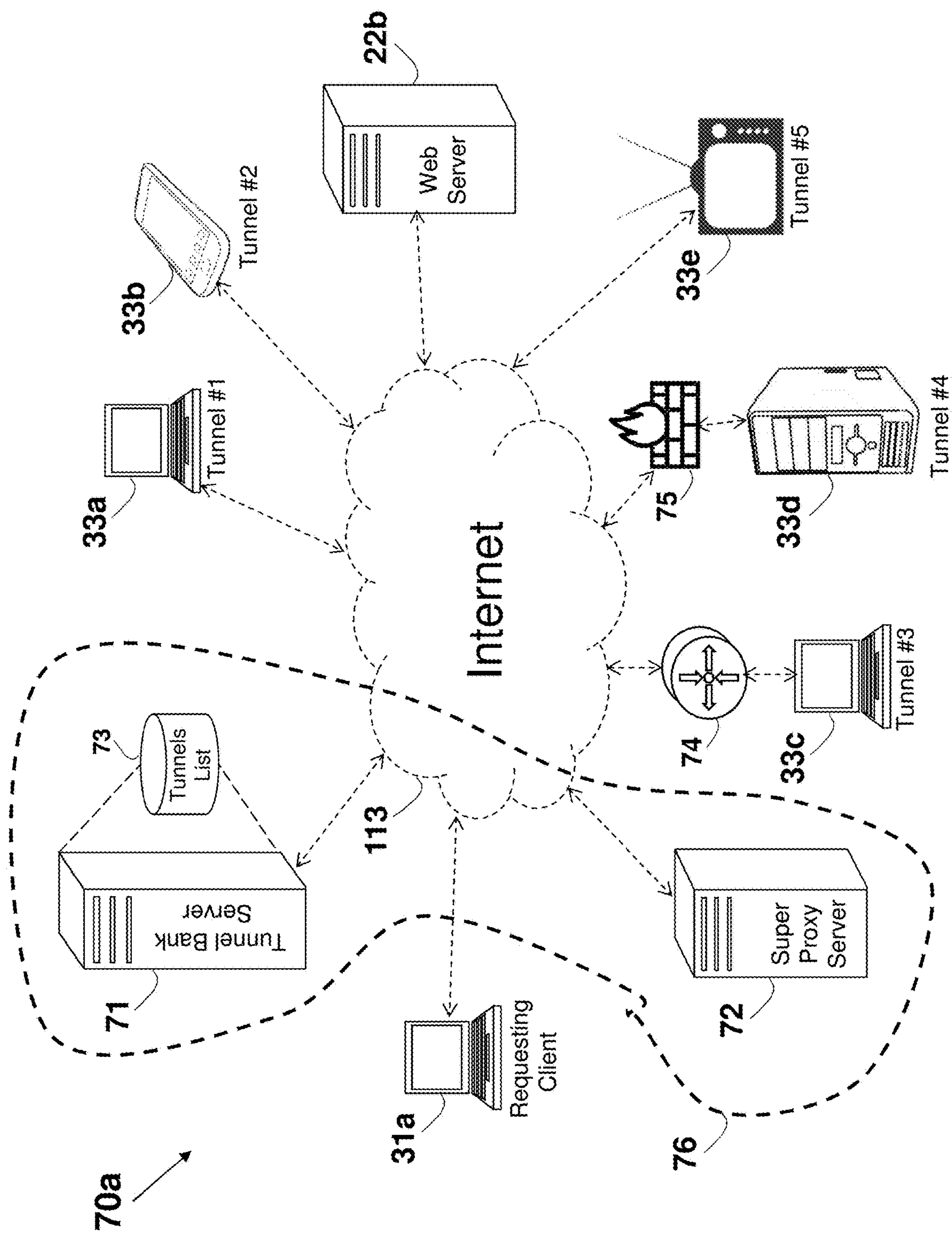

In one example, the two servers cooperatively used for assisting in the content fetching, namely the SP server 72 and the TB server 71, are owned, operated, managed, or controlled by a same entity 76, as shown in an arrangement 70*a* shown in FIG. 7*a*. In such a case, the entity 76 may provide the service of fetching content from the web server 22*b* via the various tunnels as a service, which may be a paid service.

Any content herein may consist of, or may comprise, data such as files, text, numbers, audio, voice, multimedia, video, images, music, computer programs or any other sequence of instructions, as well as any other form of information represented as a string of bits, bytes, or characters. In one example, the content may include, be a part of, or a whole of, a URL or a website page.

Each tunnel device may be associated with one or more attribute values corresponding to one or more attribute types. A table 100 shown in FIG. 10 describes an example of various attributes types and values or various (available for use) tunnel devices. A top row 101 names the attribute type of other tunnel related information, and each of the other rows may correspond to a single tunnel device. For example, a first content row 101*a* may correspond to the tunnel #1 33*a*, a second row 101*b* may correspond to the tunnel #2 33*b*, a third row 101*c* may correspond to the tunnel #3 33*c*, a fourth row 101*d* may correspond to the tunnel #4 33*d*, a fifth row 101*e* may correspond to the tunnel #5 33*e*, a sixth row 101*f* may correspond to a sixth tunnel, and a seventh row 101*g* may correspond to a seventh tunnel.

An attribute type may relate to a timing of an operation or activity by a tunnel device. A first column 102*a*, named 'Date-Time', may correspond to timing of an event relating to the respective tunnel operation, such as a last time when the tunnel device connected to the Internet, or when the tunnel device connected to a specific entity, such as to the TB server 71 or the SP server 72. In the examples shown in the table 100, a relating timing information relating the first tunnel corresponding to the first row 101*a* is shown as a date 3/5 and a time 19:35, a relating timing information relating the second tunnel corresponding to the second row 101*b* is shown as a date 3/5 and a time 19:38, a relating timing information relating the third tunnel corresponding to the third row 101*c* is shown as a date 5/5 and a time 00:05, a relating timing information relating the fourth tunnel corresponding to the fourth row 101*d* is shown as a date 11/5 and a time 00:07, a relating timing information relating the fifth tunnel corresponding to the fifth row 101*e* is shown as a date 12/5 and a time 00:15, a relating timing information relating the sixth tunnel corresponding to the sixth row 101*f* is shown as a date 12/5 and a time 05:38, and a relating timing information relating the seventh tunnel corresponding to the seventh row 101*g* is shown as a date 12/5 and a time 22:13.

Alternatively or in addition, the attribute type may be associated with the communication link involving the connecting of a tunnel device to the Internet 113. For example, the type of connection of the device may be used as an attribute type, such as being a wired or a wireless connection. Further, the related attribute type may include the protocol or technology used for connecting the respective tunnel to the Internet 113, as exampled in a column 'Connection Type' 102*e* in the table 100. In the examples shown in the table 100, a relating communication protocol information relating the first tunnel corresponding to the first row 101*a* is shown as a value of Very High Speed Subscriber Line (VDSL) technology, a relating communication protocol information relating the second tunnel corresponding to the second row 101*b* is shown as a value of Third Generation (3G), a relating communication protocol information relating the third tunnel corresponding to the third row 101*c* is shown as a value of Data Over Cable Service Interface Specification (DOCSIS), a relating communication protocol information relating the fourth tunnel corresponding to the fourth row 101*d* is shown as a value of Asymmetric Digital Subscriber Line (ADSL), a relating communication protocol information relating the fifth tunnel corresponding to the fifth row 101*e* is shown as a value of WiFi, a relating communication protocol information relating the sixth tunnel corresponding to the sixth row 101*f* is shown as a value of 4G.LTE, and a relating communication protocol information relating the seventh tunnel corresponding to the seventh row 101*g* is shown as a value of ADSL.

Alternatively or in addition, the attribute type may be associated with the communication link involving the communication of a tunnel device with another entity over the Internet 113, such as communication with the TB server 71, the SP server 72, or the web server 22*b*. For example, the bandwidth (BW) or the RTT of such communication of the device may be used as an attribute type, as exampled in columns 'BW' 102*g* and 'RTT' 102*h* in the table 100. In the examples shown in the table 100, a relating communication metrics information relating the first tunnel corresponding to the first row 101*a* is shown as a BW value of 1000 (Kb/s) and a RTT value of 30 (ms), a relating communication metrics information relating the second tunnel corresponding to the second row 101*b* is shown as a BW value of 350 (Kb/s) and a RTT value of 70 (ms), a relating communication metrics information relating the third tunnel corresponding to the third row 101*c* is shown as a BW value of 2500 (Kb/s) and a RTT value of 540 (ms), a relating communication metrics information relating the fourth tunnel corresponding to the fourth row 101*d* is shown as a BW value of 1400 (Kb/s) and a RTT value of 170 (ms), a relating communication metrics information relating the fifth tunnel corresponding to the fifth row 101*e* is shown as a BW value of 1200 (Kb/s) and a RTT value of 120 (ms), a relating communication metrics information relating the sixth tunnel corresponding to the sixth row 101*f* is shown as a BW value of 2100 (Kb/s) and a RTT value of 230 (ms), and a relating communication metrics information relating the seventh tunnel corresponding to the seventh row 101*g* is shown as a BW value of 800 (Kb/s) and a RTT value of 310 (ms).

Alternatively or in addition, the attribute type may be associated with the tunnel connection scheme to the Internet, such as identification of the ISP or the associated ASN relating to the ISP, to the tunnel device, or to the Internet connection scheme. In the examples shown in the table 100, a column named 'ASN' 102*d* may be used, a value of the ASN corresponding to the first row 101*a* is shown as 3215 (corresponding to Orange France), a value of the ASN corresponding to the second row 101*b* is shown as 3209 (corresponding to Vodafone Germany), a value of the ASN corresponding to the third row 101*c* is shown as 12079 (corresponding to Verizon Wireless USA), a value of the ASN corresponding to the fourth row 101*d* is shown as 16345 (corresponding to Beeline Russia), a value of the ASN corresponding to the fifth row 101*e* is shown as 30148 (corresponding to Zain Saudi-Arabia), a value of the ASN corresponding to the sixth row 101*f* is shown as 9498 (corresponding to Bharti Airtel India), and a value of the ASN corresponding to the seventh row 101*g* is shown as 11419 (corresponding to Telefonica Brazil).

Alternatively or in addition, the attribute type may be associated with the tunnel device itself, such as its location. The location may be based on an actual physical geographical location or an IP geolocation. In the examples shown in the table 100, a column named 'Geographical Location' 102*c* may be used. A value of the location corresponding to the first row 101*a* is shown as 'Paris, France', a value of the location corresponding to the second row 101*b* is shown as 'Munich, Germany', a value of the location corresponding to the third row 101*c* is shown as 'Boston, MA, USA', a value of the location corresponding to the fourth row 101*d* is shown as 'Moskow, Russia', a value of the location corresponding to the fifth row 101*e* is shown as 'Riad, Saudi-Arabia', a value of the location corresponding to the sixth row 101*f* is shown as 'Mumbai, India', and a value of the location corresponding to the seventh row 101*g* is shown as 'San-Paulo, Brazil'.

Alternatively or in addition, the attribute type may be associated with the tunnel device itself, such as its structure, functionalities, or features. The attribute type may relate to hardware, software, or any combination thereof. For example, the type of the tunnel device may be used, such as being stationary or portable. Further, the processing power or the processor type may be used. For example, the type, make, and version of the any software may be used, such as the operating system, as exampled in an 'Operating System' column **102*f* in the table 100. In the examples shown in the table 100, a relating operating system relating to the first tunnel corresponding to the first row 101*a* is shown as 'Chrome 2.0', a relating operating system relating to the second tunnel corresponding to the second row 101*b* is shown as 'iOS 3.0', a relating operating system relating to the third tunnel corresponding to the third row 101*c* is shown as 'Windows 10', a relating operating system relating the fourth tunnel corresponding to the fourth row 101*d* is shown as 'Windows 7', a relating operating system relating the fifth tunnel corresponding to the fifth row 101*e* is shown as 'Android 2.0', a relating operating system relating the sixth tunnel corresponding to the sixth row 101*f* is shown as 'iOS 4.0', and a relating operating system relating the seventh tunnel corresponding to the seventh row 101*g*** is shown as 'Chrome 3.0'.

The tunnels devices may primarily be identified by their corresponding IP address, as exampled in a 'Tunnel IP Address' column **102*b* in the table 100. In the examples shown in the table 100, an IP address of the first tunnel corresponding to the first row 101*a* is shown as 80.12.105.150, an IP address of the second tunnel corresponding to the second row 101*b* is shown as 176.94.1.17, an IP address of the third tunnel corresponding to the third row 101*c* is shown as 162.115.192.24, an IP address of relating the fourth tunnel corresponding to the fourth row 101*d* is shown as 83.220.232.67, an IP address of the fifth tunnel corresponding to the fifth row 101*e* is shown as 185.93.228.98, an IP address of the sixth tunnel corresponding to the sixth row 101*f* is shown as 59.144.192.23, and an IP address of the seventh tunnel corresponding to the seventh row 101*g*** is shown as 200.196.224.89.

Figure 8:
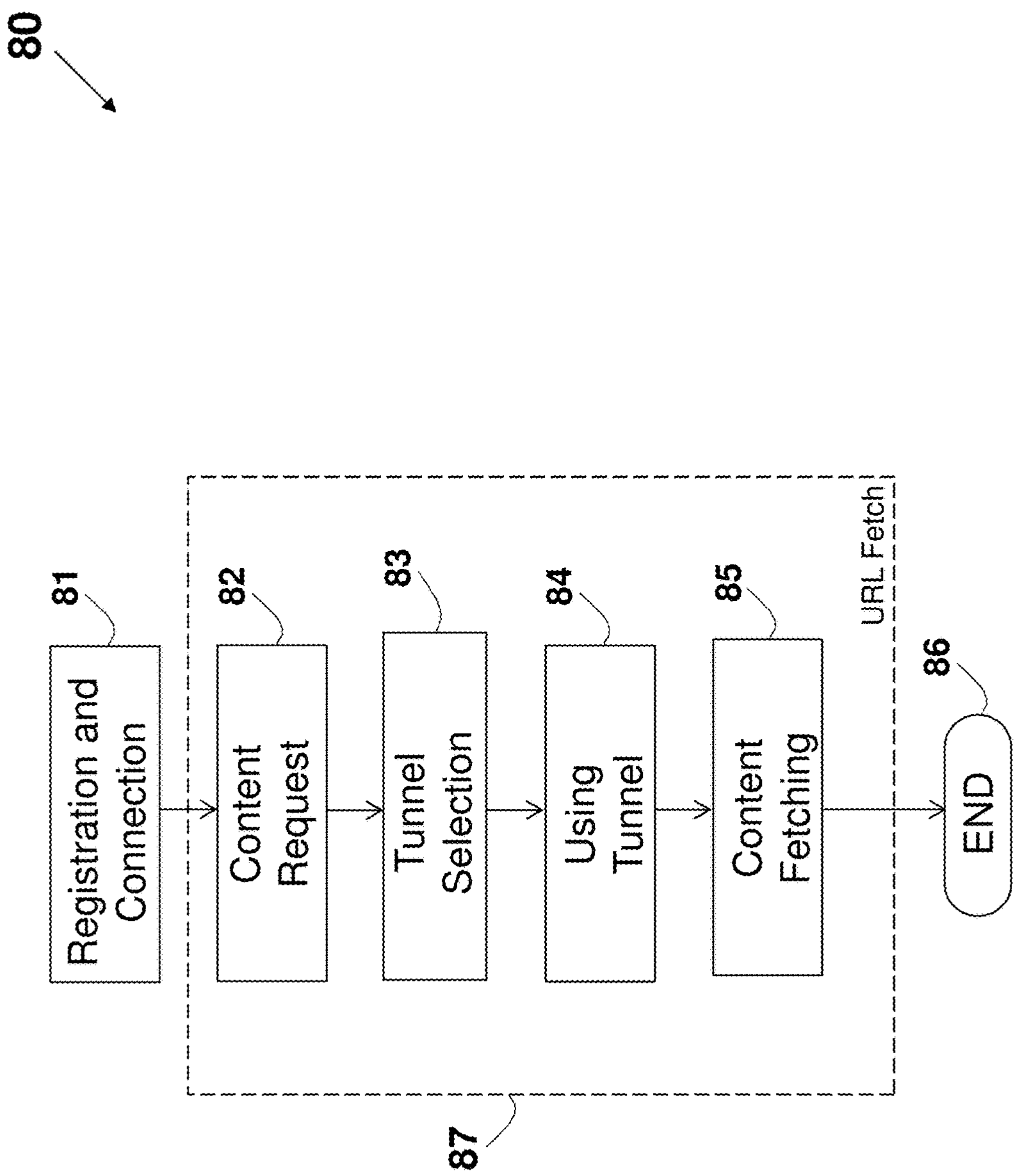
FIG. 8 illustrates schematically a simplified flowchart of a method for selecting and using a tunnel device for fetching content.

The general flow of the system operation for fetching content (such as URL) to the requesting client **31*a* from the web server 22*b* using tunnels based on the arrangement 70 shown in FIG. 7, is described in a flow chart 80 in FIG. 8. A "Registration and Connection" step 81 is continuously executed, in which devices that are available to serve as tunnels are initiating communication with the TB server 71. During this initial communication session, the tunnel device registers with the TB server 71, and provides one or more attributes values associated with various attributes types. Alternatively or in addition, the attributes values are estimated, calculated, or otherwise obtained based on the communication link with the tunnel device. As part of the registration process, a record that includes the IP address of the registering tunnel device is added to the tunnels list 73 stored with the TB server 71. In one example, the records are stored as the table 100 shown in FIG. 10, where a row represents a record of a single tunnel device. In addition to registration by adding a record to the tunnels list 73, the tunnel device opens a lasting connection via the Internet with the TB server 71. Such connection preferably allows the TB server 71 to initiate communication with the registering tunnel device even after the registration phase is over and as long as the connection is sustained, such as by using TCP keepalive mechanism. The open connection, preferably a TCP connection, allows the TB server 71 to initiate communication with the connected tunnel device even through any intermediary blocking or filtering apparatus, such as the router 74 or the firewall device 75. The connection may be terminated upon the tunnel device closing the connection, such as when powering off or disconnecting from the Internet. Upon disconnecting from a tunnel device, the respective record in the tunnels list 73 in the TB server 71** is erased, notifying that this tunnel device is no more available to be used as a tunnel device.

The connection process may involve establishing a connection (directly or via a server) between the registering tunnel device and the TB server 71. The handshaking between the two devices involves forming the connection by exchanging communication-related information. The formed connection may be used later for efficiently exchange data between the devices. In one example, the communication between the devices uses TCP, and the pre-connection is used for establishing a connection by forming 'passive open', involving exchanging SYN, SYN-ACK, and ACK messages. In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently store the key in order to allow a tunnel to establish automatically, without intervention from a user.

In one example, the number of tunnel devices that have been registered with the TB server 71 (or the number of IP addresses) and are available to be used as tunnel device is above 10,000, 20,000, 50,000, 100,000, 200,000, 500,000, 1,000,000, 2,000,000, 5,000,000, or 10,000,000.

The content fetching scheme starts in a "Content Request" step 82, where the requesting client sends a request message to the SP server 72. The request message preferably includes the requested content, such as a URL (and/or identification of the web server **22*b*). The client device 31*a* may also include (as part of, or appended to, the request message) criteria for selecting tunnel devices to be used for fetching the requested content from the web server 22*b*, as part of a "Tunnel Selection" step 83. For example, the request message may include identification of an attribute type, and associated values for tunnels selection. The client device 31*a* may use a single value, so that only tunnel devices associated with this single value will be used. Alternatively or in addition, the client device 31*a* may use multiple values, so that only tunnel devices associated with one of these values will be used. Alternatively or in addition, the client device 31*a* may use a range of values, so that only tunnel devices associated with one of the values in the range will be used. For example, the client device 31*a*** may define a minimum value (selecting only tunnel devices associated with values at or above the minimum value), may define a maximum value (selecting only tunnel devices associated with values at or below the maximum value), or may define both minimum and maximum values (selecting only tunnel devices associated with values at or above the minimum value and at or below the maximum value).

For example, in a case where the attribute value is a location, the request message may define a location of Munich, Germany. Assuming that the available tunnel devices are detailed in the table 100 in FIG. 10, only the tunnel device (such as the tunnel #2 **33*b*) associated with the second row 101*b* may be selected. Alternatively or in addition, the request message may define a location of Europe. In such a case, the tunnel device (such as the tunnel #2 33*b*) associated with the second row 101*b*, or the tunnel device (such as the tunnel #1 33*a*) associated with the first row 101*a*, may be selected, since both location values are in Europe. While the location values are exampled in table 100** as cities, any location may be used as IP geolocation or physical geographical location, such as country, state or province, city, street address, or ZIP code). In one example, a tunnel device location may be obtained using its built-in Global Positioning System (GPS), and may include the latitude, longitude, and timezone of the device location.

Similarly, in a case where the attribute value is an RTT, the request message may define a RTT over 300 ms (300 ms minimum), so that either the tunnel device (such as the tunnel #3 33$c$) associated with the third row 101$c$ (having 540 ms), or the tunnel device associated with the seventh row 101$g$ (having 310 ms), may be selected. Similarly, in a case where the attribute value is an RTT, the request message may define a RTT below 80 ms (maximum), so that either the tunnel device (such as the tunnel #1 33$a$) that is associated with the first row 101$a$ (having 30 ms), or the tunnel device (such as the tunnel #2 33$b$) that is associated with the second row 101$b$ (having 70 ms), may be selected. Similarly, in a case where the attribute value is an BW, the request message may define a BW below 2200 Kb/s and above 2000 Kb/s, the tunnel device associated with the sixth row 101$f$ (having 2100 Kb/s), may be selected.

In the "Tunnel Selection" step 83, the TB server 71 selects a tunnel device for use from the tunnel list stored in the storage 73, according to the criteria received from the requesting client as part of the "Content Request" step 82. It is noted that some requests may not include any criteria, and in such a case any available tunnel device may be selected by the TB server 71.

Once a tunnel device is selected by the TB server 71, the request for content is routed, by the TB server 71, the SP server 72, or any cooperation thereof, to the selected tunnel device. In turn, the tunnel device forwards the request for content, using tunneling or proxy scheme, to the web server 22$b$, as part of a "Using Tunnel" step 84. It is noted that such tunneling provides anonymity and untraceability, where the web server 22$b$ is only aware of the request from the selected tunnel device, and is ignorant to the identity of the origin of the request, namely the requesting client 31$a$, which is not exposed to the web server 22$b$. For example, in case where the requesting client 31$a$ is in a location A, and the selected tunnel device that is used is in a location B, the web server 22$b$ may only be aware (such as by using IP geolocation) to the request arrival from the location B.

The requested content is then sent to the selected tunnel device, which in turn submits the fetched content to the requesting client 31$a$ as part of a "Content Fetching" step 85, thus completing the cycle of request-response from the point-of-view of the client device 31$a$, and ending in an "END" step 86. Hence, the 'Content Fetch' cycle, that may be a 'URL Fetch' flow-chart 87 in the case where the content is a single URL, may be defined, starting from the requesting client device 31$a$ issuing a content request to the SP server 72, until the fetched content is received by the requesting client device 31$a$ as part of the "Content Fetching" step 85. The fetched content may be stored in the client device in any volatile or non-volatile memory, or may be stored in a local cache as described in U.S. Pat. No. 8,135,912 to the Shribman et al. entitled: "System and Method of Increasing Cache Size", which is incorporated in its entirety for all purposes as if fully set forth herein. The content is stored with its related metadata or any other identifiers, so it can be easily detected and fetched when later required.

Figure 9A:
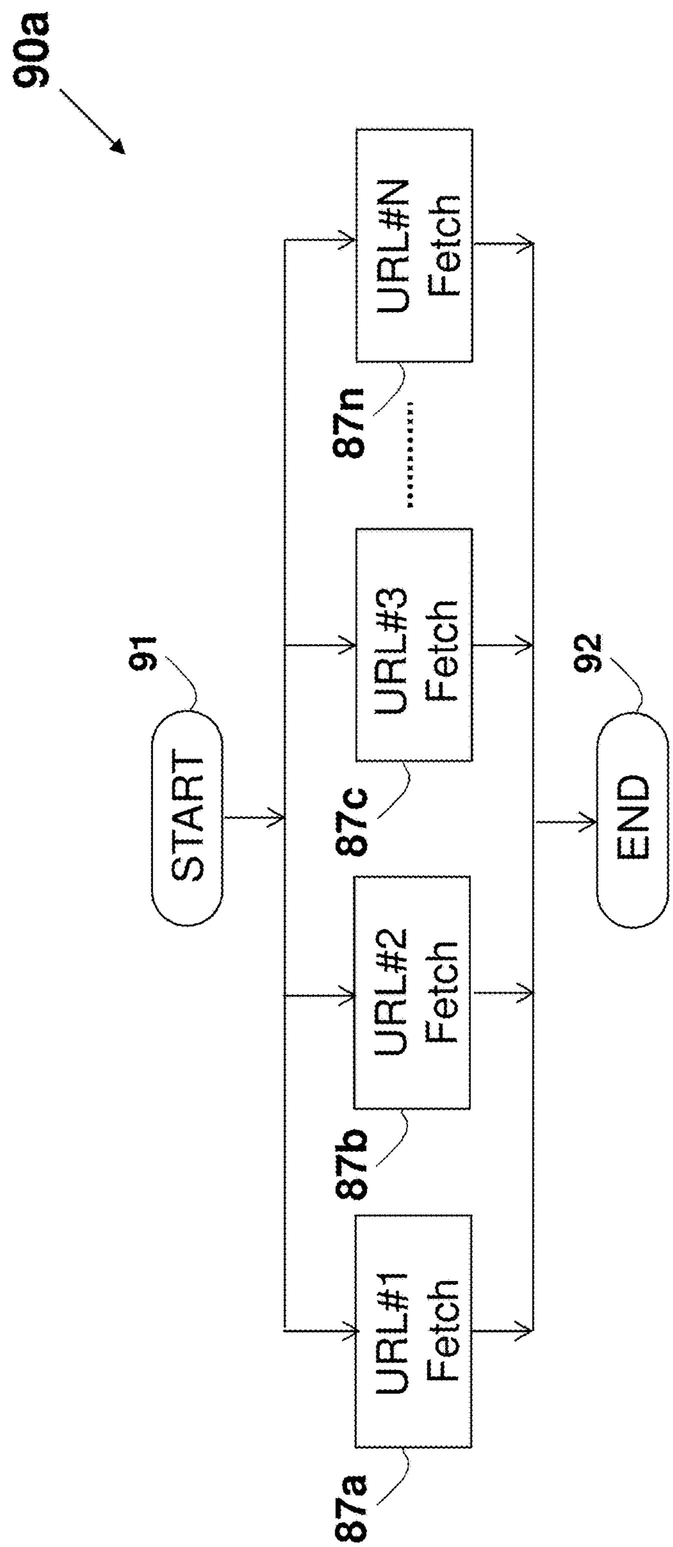
FIG. 9*a* illustrates schematically a simplified flowchart of a method for selecting and using multiple tunnel devices for fetching multiple content in parallel.
Figure 9B:
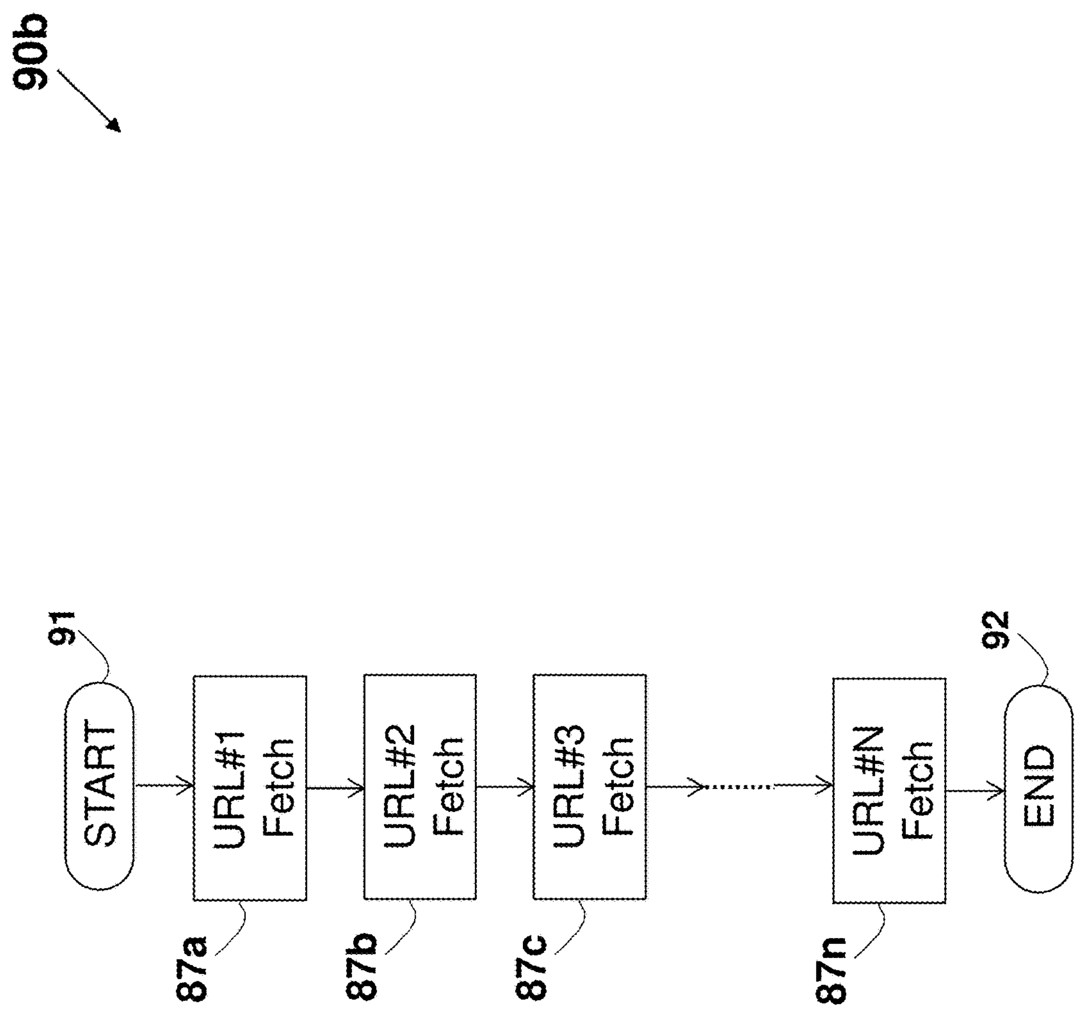
FIG. 9*b* illustrates schematically a simplified flowchart of a method for selecting and using a multiple tunnel devices for fetching multiple content in series.

While retrieving a single URL (or other content) is exampled in the flow chart 80, any number of URLs may be equally retrieved by the requesting client 31$a$. Each URL fetching may be according to, or based on, the flow chart 87 shown as part of the flow chart 80 in FIG. 8. For example, the requesting client 31$a$ may request multiple web pages of the same web site. Assuming fetching of N web pages (or any other N URLs), the first URL may be fetched by executing "URL #1 Fetch" flow chart 87$a$, the second URL may be fetched by executing a "URL #2 Fetch" flow chart 87$b$, the third URL may be fetched by executing a "URL #3 Fetch" flow chart 87$c$, and so on, until the N-th URL may be fetched by executing a "URL #N Fetch" flow chart 87$n$, where each of the URL fetching scheme may be according to, or based on, the flow chart 87 shown as part of the flow chart 80 in FIG. 8. The various fetching schemes may be executed in parallel, starting in a "START" step 91 and ending in an "END" step 92, as shown in the flow chart 90$a$ in FIG. 9$a$. Alternatively or in addition, the various fetching schemes may be executed in series, starting in the "START" step 91 and ending in the "END" step 92, as shown in the flow chart 90$b$ in FIG. 9$b$.

In one example, the same tunnel device is selected in two, or in all, of fetching activities named "URL #1 Fetch" flow chart 87$a$ to the "URL #N Fetch" flow chart 87$n$. Alternatively or in addition, a different tunnel device is selected for each of fetching activities named "URL #1 Fetch" flow chart 87$a$ to the "URL #N Fetch" flow chart 87$n$, which is preferred from anonymity point of view.

Figure 11:
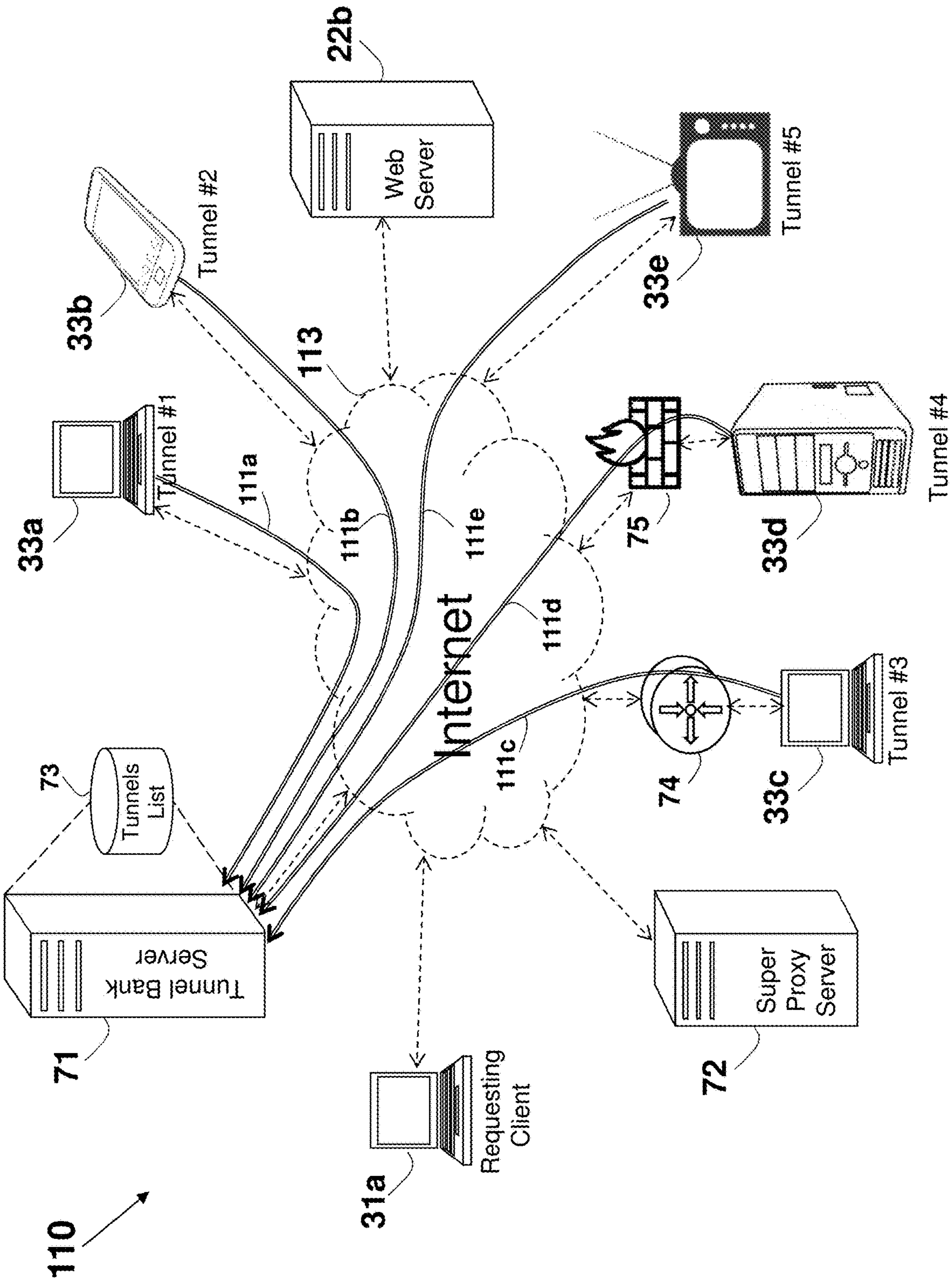
FIG. 11 depicts schematically messages exchanged over the Internet between tunnel devices and the TB server as part of the registration phase.

A schematic messaging flow diagram 110 describing the registration phase as part of the "Registration and Connection" phase 81 is shown in FIG. 11. Each of the tunnel devices initiates a communication session with the TB server 71, notifying its availability to serve as a tunnel device. As part of the communication, each of the tunnel devices may transmit one or attribute values pertaining to one or more attribute types. As part of the registration phase 81, the TB server 71 adds a record (row) for each available tunnel device to the tunnels list or table in memory 73, such as adding a row for each new available tunnel device to table 100 shown in FIG. 10. In the example of the arrangement 70, the tunnel #1 33$a$ connects via a data path 111$a$, the tunnel #2 33$b$ connects via a data path 111$b$, the tunnel #3 33$c$ connects via a data path 111$c$, the tunnel #4 33$d$ connects via a data path 111$d$, and the tunnel #5 33$e$ connects via a data path 111$e$.

As part of the "Registration and Connection" phase 81, a sustained connection is established between the registered tunnel devices and the TB server 71, such as by using TCP keepalive mechanism. Shown pictorially in an arrangement 110$a$ shown in FIG. 11$a$ relating to the example of the arrangement 70, the tunnel #1 33$a$ connection is shown as a dashed line 112$a$, the tunnel #2 33$b$ connection is shown as a dashed line 112$b$, the tunnel #3 33$c$ connection is shown as a dashed line 112$c$, the tunnel #4 33$d$ connection is shown as a dashed line 112$d$, and the tunnel #5 33$e$ connection is shown as a dashed line 112$e$. Such sustained connection (such as by using TCP keepalive mechanism) allows the TB server 71 to initiate connection with any of the registered and available tunnel devices, even in the case when a filtering apparatus, such as a router (for example the router 74) or a gateway (for example the gateway 75), is connected between a tunnel device and the Internet 113.

The connection process involves establishing a connection (directly or via a server), where the handshaking between the TB server 71 and each of tunnel devices involves forming the connection by exchanging communication-related information. The formed connection may be used later for efficiently exchange data between the devices. In one example, the communication between the devices uses TCP, and the pre-connection is used for establishing a connection by forming 'passive open', involving exchanging SYN, SYN-ACK, and ACK messages. In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently store the key in order to allow a tunnel to establish automatically, without intervention from a user.

Figure 12:
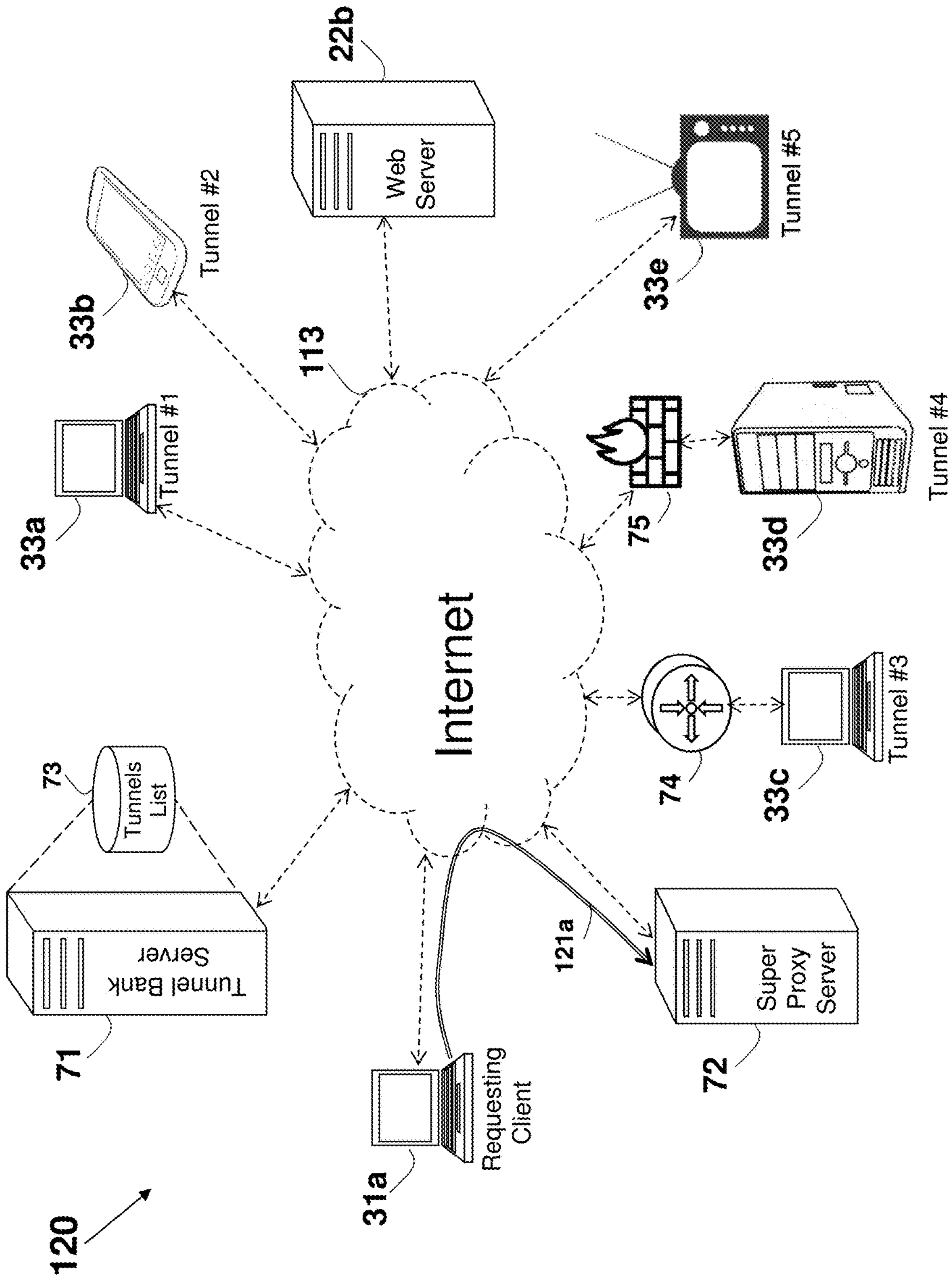
FIG. 12 depicts schematically a message exchanged over the Internet between a client device and the SP server.

The process of fetching content, corresponding to the "Content Request" step 82 that is part of the 'URL Fetch' flow chart 87, starts with the requesting client 31*a* send a request for content to the SP server 72, as shown in a message path 121*a* shown as part of a messaging chart 120 shown in FIG. 12. In one example, such request only comprises an identification (such as a URL) of the requested content. Preferably, the request includes a guidance regarding selection of a tunnel device that will be used for fetching the requested content. In one example, the request includes, either as integral part of the request, as an appended message, or as a separate message, the attribute type and an attribute value, to be used for selecting the tunnel device to be used. In another example, multiple values, or a range of values are defined for the attribute type that serves as a criterion. Further, multiple attributes types may be used, each associated with a value or with multiple values.

The content request message, as well as the attributes types and values information, may be sent over the message path 121*a* using a proprietary protocol, agreed upon between the two communicating nodes. Preferably, the SOCKS, WebSocket (ws), which may be WebSocket Secure (wss), or HTTP Proxy protocol may be used, where the client device 31*a* executes a client side protocol, and the SP server 72 executes a server side protocol.

Figure 12A:
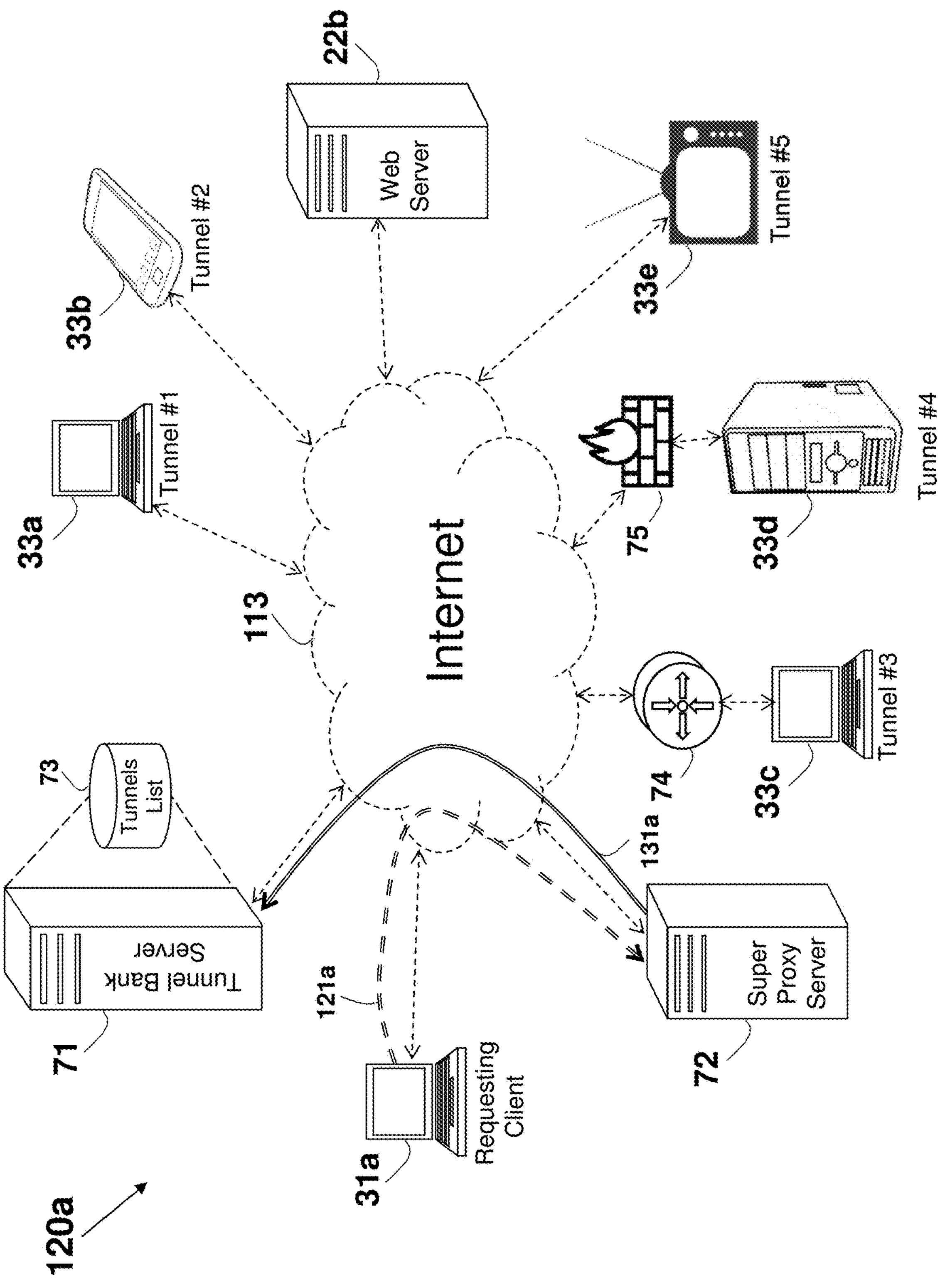
FIG. 12*a* depicts schematically a message exchanged over the Internet between the SP server and the TB server.

In response to receiving the content request over the message path 121*a*, the SP server 72 forward the content request, along with the tunnel selection criteria, to the TB server 71, shown as a message path 131*a* in the messaging chart 120*a* shown in FIG. 12*a*. The message sent over the message path 131*a* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the SP server 72 executes a client side protocol, and the TB server 71 executers a server side protocol. Alternatively or in addition, the SP server 72 may execute the server side protocol, and the TB server 71 may executer the client side protocol.

As part of the "Tunnel Selection" phase 83, according to a pre-set of criteria, according to the attributes type and values that were received from the client device 31*a* as part of the message path 121*a*, or according to any combination thereof, the TB server 71 uses the tunnels list stored in the memory 73, which may include the table 100, for selecting a tunnel device to be used. In one example, the attribute type is location and the value is Moskow, Russia, hence the tunnel #4 33*d*, which record is included in the fourth row 101*d* of the table 100, is suitable to be selected, and is selected by the TB server 71 to serve the specific content request from the client device 31*a*.

In one example, the tunnel device to be used may be randomly selected, allowing, for example, for load balancing. In one example, by randomly selecting different tunnel devices for multiple content pieces of content (such as multiple web pages of the same web site) from the same content source, the web server 22*b* senses a distributed requesting schemes, and further cannot attribute the requests to the client device 31*a*, further providing anonymity and untraceability. Randomness is commonly implemented by using random numbers, defined as a sequence of numbers or symbols that lack any pattern and thus appear random, are often generated by a random number generator. Randomness is described, for example, in IETF RFC 1750 "Randomness Recommendations for Security" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

In a case where no criteria for selecting is directed by the requesting client 31*a*, the TB server 71 may randomly select a tunnel device from the group or list of all currently available tunnel devices. Similarly, in a case where there are multiple tunnel devices that are available and all of them satisfy the criteria set (such as all of them are associated with a defined value, or are within the range of defined values, relating to a specific attribute type), the TB server 71 may randomly select a tunnel device from the group or list of all currently available tunnel devices that also satisfy the defined criteria.

Figure 12B:
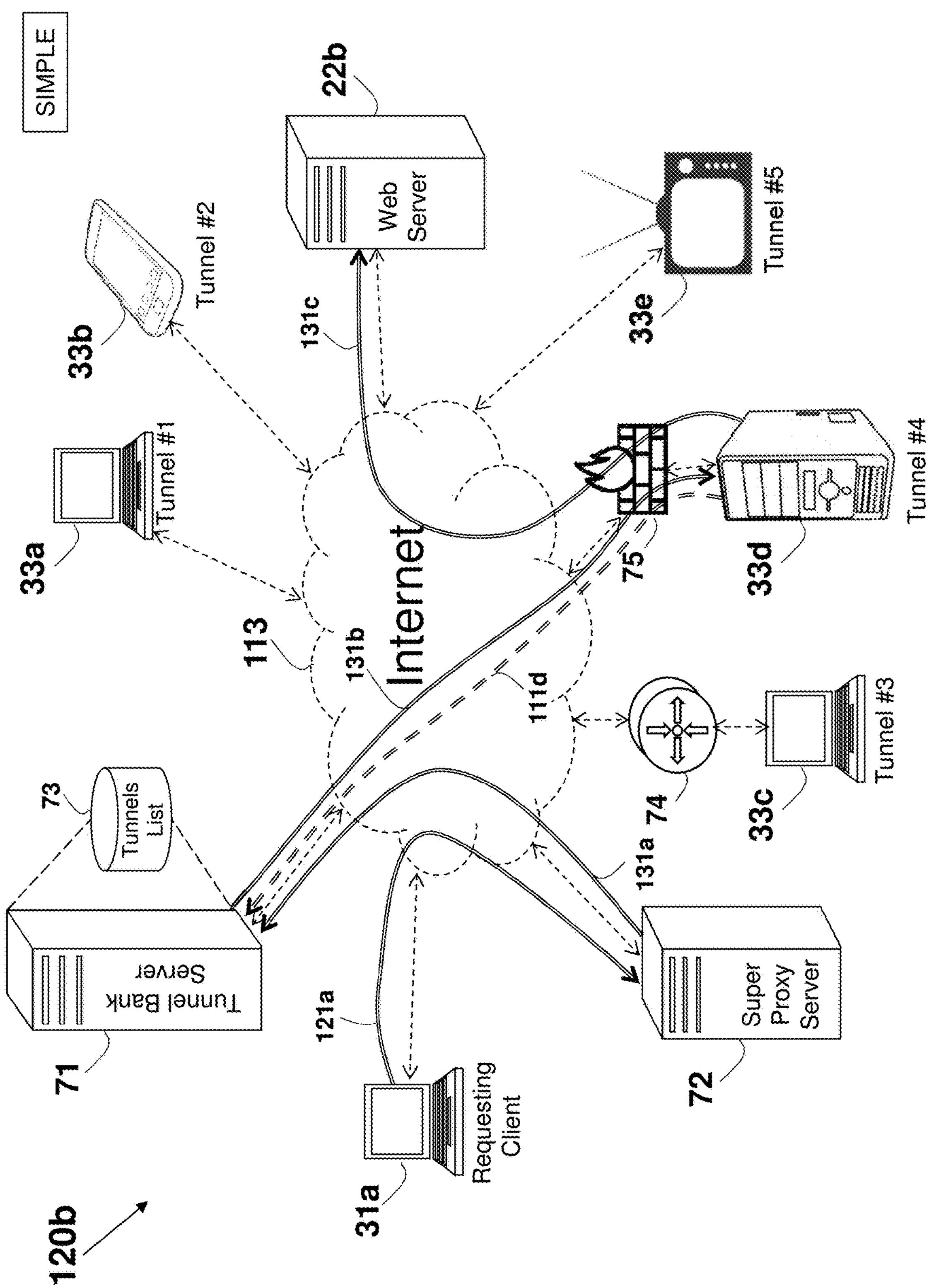
FIG. 12*b* depicts schematically messages exchanged over the Internet between the TB server and the web server using a tunnel device.

Upon completing the selection of the tunnel #4 33*d*, the TB server 71 forwards the requested content identification to the selected tunnel #4 33*d*, shown as a message path 131*b* in the messaging chart 120*b* shown in FIG. 12*b*. Such communication uses the established connection 111*d* (such as the TCP connection) that was established during the "Registration and Connection" phase 81, allowing for communication via the firewall 75. The message sent over the message path 131*b* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the TB server 71 executes a server side protocol, and the tunnel #4 33*d* executes a client side protocol. Alternatively or in addition, the TB server 71 may executes a client side protocol, and the tunnel #4 33*d* may execute a server side protocol.

In response to the request message 131*b*, the selected tunnel #4 33*d* sends a request for the identified content to the appropriate server that stores the required content, exampled to be the web server 22*b*, shown as a message path 131*c* in a messaging chart 120*b* in FIG. 12*b*. Thus, the "Using Tunnel" phase 84 is completed where the request arrives at the content source, namely the web server 22*b*. The message sent over the message path 131*c* may use a proprietary protocol, agreed upon between the two communicating nodes. Preferably, the HTTP or HTTPS protocol may be used, where the web server 22*b* executes a server side protocol, and the tunnel #4 33*d* executes a client side protocol. Further, any tunneling protocol or mechanism may be used where the selected tunnel, which is the tunnel #4 33*d* in the example herein, serves as a tunnel between the TB server 71 and the web server 22*b*.

The requested content is then fetched from the web server 22*b* to the requesting client 31*a*, as part of the "Content Fetching" phase 85, along the 'opposite' route of the request flow. As shown in a messaging chart 130 shown in FIG. 13, the content is first sent from the web server 22*b* to the selected tunnel #4 33*d* along a message path 131*d*, which in turn sends it to the TB server 71 along a message path 131*e*, which in turn sends it to the SP server 72 along a message path 131*f*, arriving at the requesting client 31*a* along a message path 131*g*, completing the request/response cycle from the client device 31*a* point of view. The same protocol or protocols used for forwarding the request from the client device 31*a* to the web server 22*b* may be equally used for any portion of the 'return' path of the requested content from the web server 22*b* to the client device 31*a*. Alternatively or in addition, the return path may use different protocol or protocols than the ones used in the requesting path.

Figure 11A:
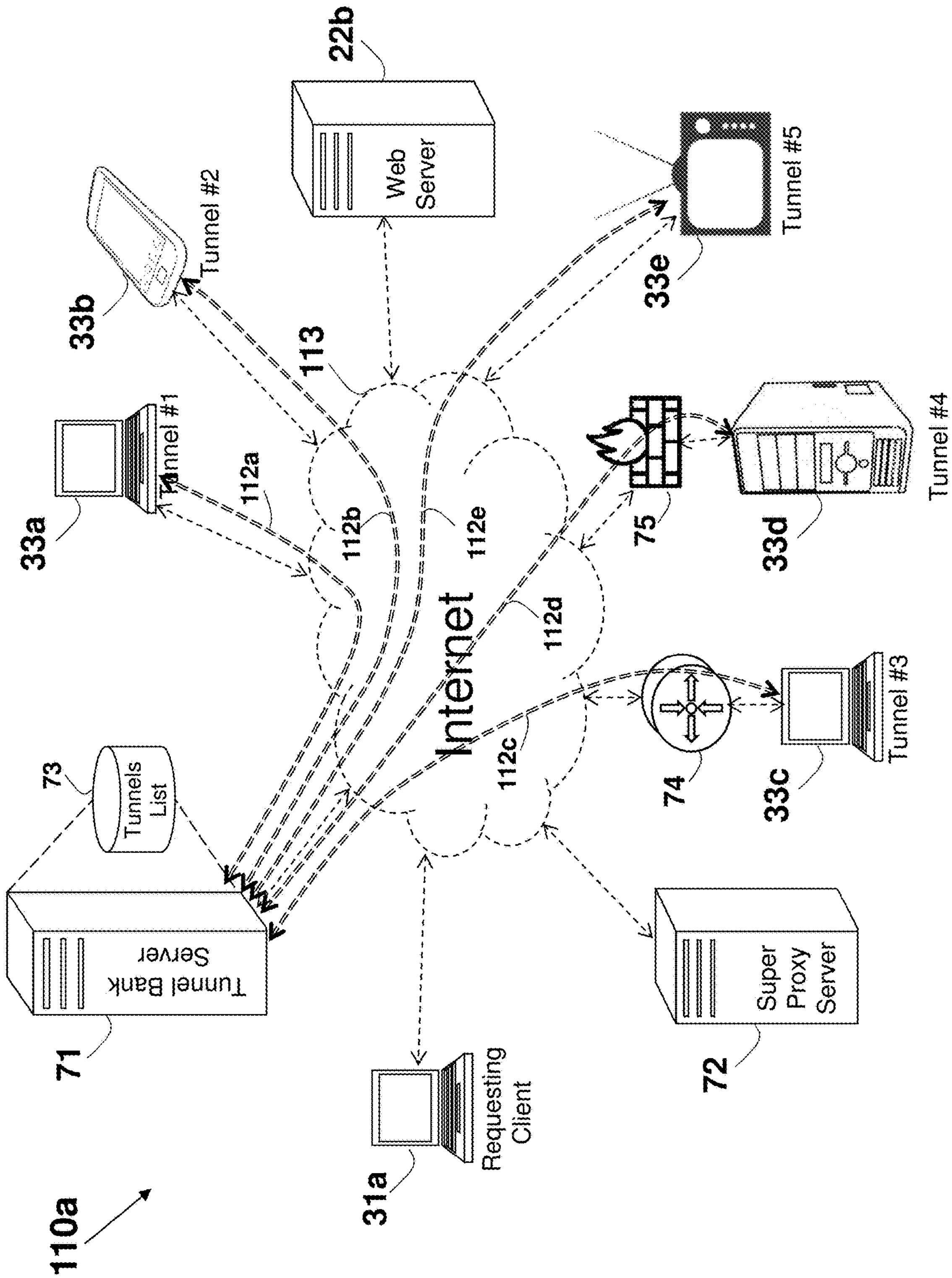
FIG. 11*a* depicts schematically connections over the Internet between tunnel devices and the TB server after the registration phase.
Figure 14:
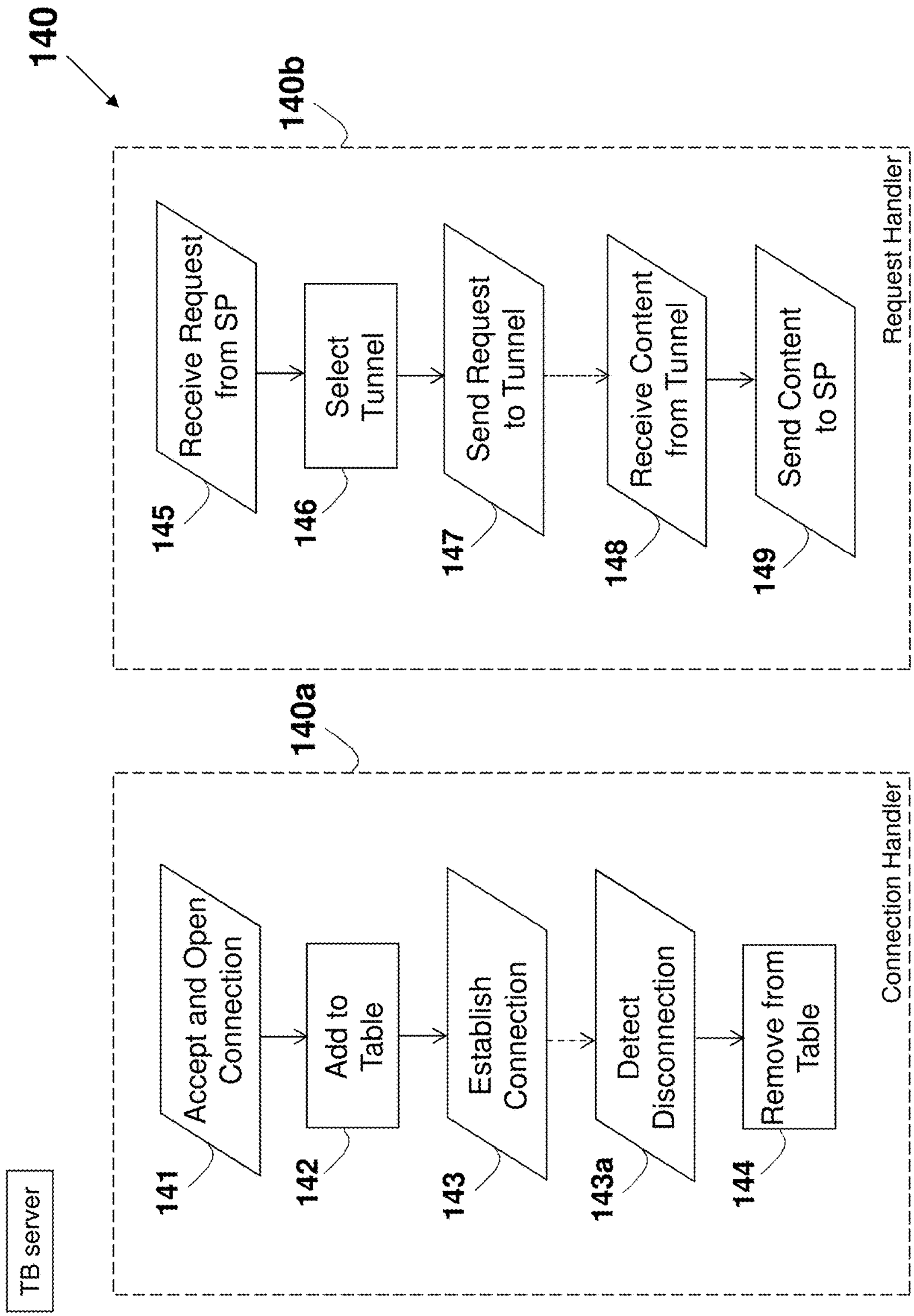
FIG. 14 illustrates schematically a simplified flowchart relating to a TB server.

The TB server 71 generally executes a flowchart 140 shown in FIG. 14. The TB server 71 generally executes in parallel at least a "Connection Handler" flow chart 140*a* and a "Request Handler" flow chart 140*b*. The "Connection Handler" flow chart 140*a* involves identifying a device that is available to server as a tunnel device. For each such device, a record of the device and its associated various attributes values is formed, stored and maintained, together with establishing a continuous connection with the tunnel device, corresponding to the "Registration and Connection" phase 81 and the messaging charts 110 and 110*a* respectively shown in FIGS. 11 and 11*a*. The TB server 71 continuously listen and wait for tunnel devices to initiate a communication. Upon receiving a communication request from a potential tunnel device, such as from the tunnel #2 33*b* shown as message path 111*b* in the chart 110, the TB server 71 accepts the communication from the tunnel device, as part of an "Accept and Open Connection" step 141. In addition to the tunnel device IP address, information regarding the connection timing, the tunnel device type, connection functionalities, operating system, processing power, and other values relating to various attribute types are obtained (such as from the tunnel device itself, from the connection, or otherwise), and stored as a record in the tunnels list 73, which may be in a form of a row in the table 100, as part of an "Add to Table" step 142. The tunnel device is then available for being selected for use in a fetching content operation, and the selection may be based on the respective information in the record in the table 100. In order to allow for the TB server 71 to initiate communication with this available tunnel device, a continuous connection is established as part of an "Establish Connection" step 143. For example, a TCP connection 112*b* (using TCP keepalive mechanism) may be used as shown in the chart 110*a*. Upon sensing that there is no response from this tunnel device as part of a "Detect Disconnection" step 143*a*, such as not receiving a keepalive message reply after a set interval, the TB server 71 assumes that this tunnel device is no longer available to be used as a tunnel device for content fetching operation, and the respective record is deleted from the table 100 as part of a "Remove from table" step 144. The "Connection Handler" flow chart 140*a* is repeated for every tunnel device, so that a large number of such instances are performed simultaneously and independently.

The "Request Handler" flow chart 140*b* involves selecting a tunnel device from the available ones based on a request from the SP server 72, and using the selected tunnel device for fetching the requested content. The "Request Handler" flow chart 140*b* is repeated for each content (such as URL) request from the client device 31*a* conveyed to it from the SP server 72, so that a large number of such instances of this operation are performed simultaneously and independently. First, a content request is received from the SP server 72 as part of a "Receive Request from SF" step 145, corresponding to the message path 131*a* shown in the messaging chart 120*b*. In general, the request includes a replica of the content request received from the requesting client 31*a*. Based on pre-set criteria and criteria that is part of the received request, the TB server 71 selects a tunnel device from the available ones, as part of a "Select Tunnel" step 146, which correspond to the "Tunnel Selection" phase 83. As part of a "Send Request to Tunnel" step 147, which corresponds to the message path 131*b* shown in the messaging chart 120*b* and performed as part of the "Using Tunnel" phase 84, the identification of the requested content of forwarded to the selected tunnel device, exampled as the tunnel #4 33*d* in the example herein. After the content if fetched by the selected tunnel device #4 33*d* from the web server 22*b*, it is forwarded and received by the TB server 71 as part of a "Receive Content from Tunnel" step 148, which corresponds to the message path 131*e* shown in the messaging chart 130 and performed as part of the "Content Fetching" phase 85. The handling of the content requested is completed by sending the fetched content as a response to the SP server 72 request as part of a "Send Content to SP" step 149, which corresponds to the message path 131*f* shown in the messaging chart 130 and performed as part of the "Content Fetching" phase 85.

Figure 15:
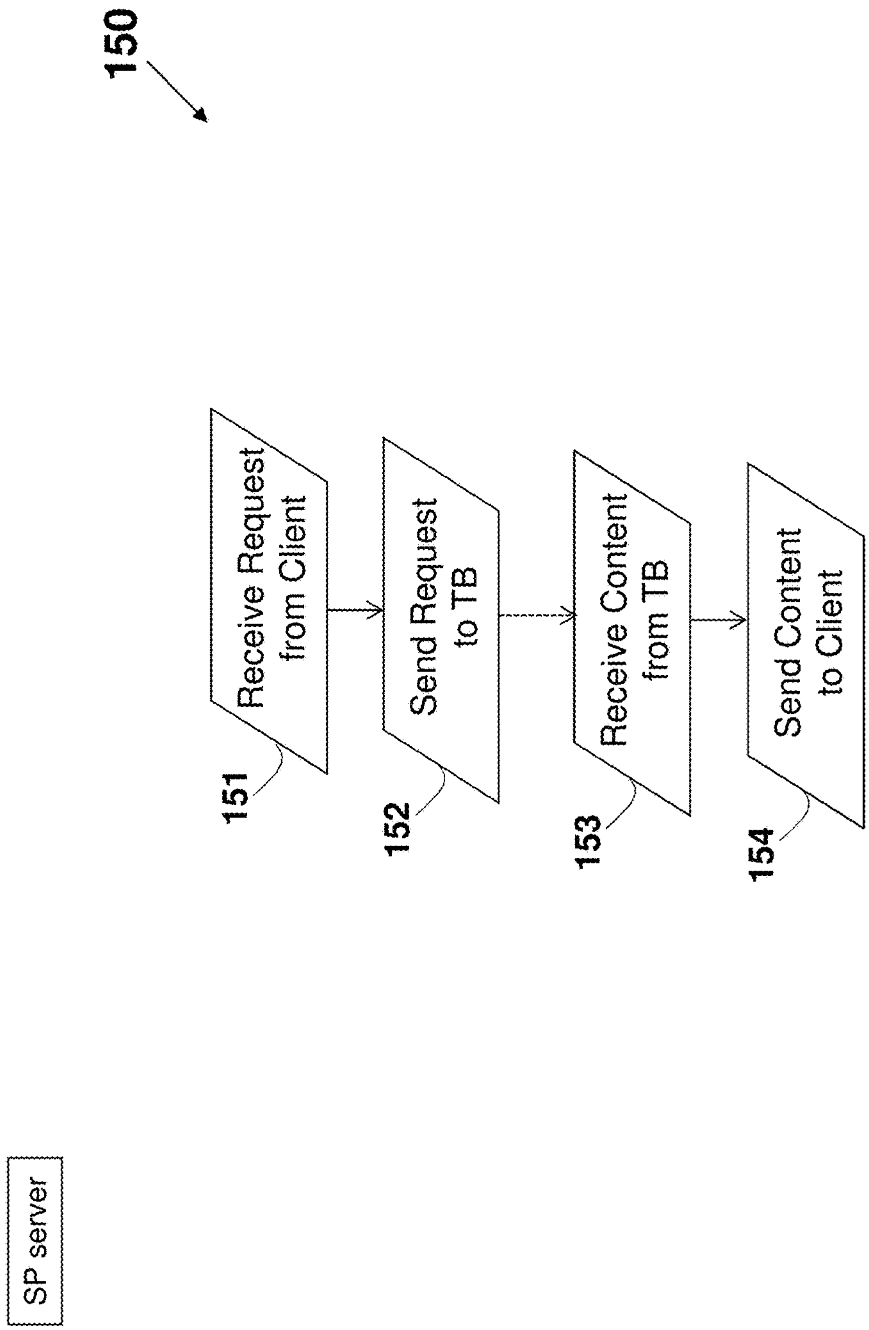
FIG. 15 illustrates schematically a simplified flowchart relating to a SP server.

The SP server 72 generally executes a flowchart 150 shown in FIG. 15 for each piece of information or content (such as a single URL) requested by the client device 31*a*. The operation starts when a content request is received from the client device 31*a* as part of a "Receive Request from Client" step 151, which corresponds to the message path 121*a* shown in the messaging chart 120 and performed as part of the "Content Request" phase 82. The request is forwarded by the SP server 72 to the TB server 71 as part of a "Send Request to TB" step 152, which corresponds to the message path 131*a* shown in the messaging chart 120*a*, and received by the TB server 71 as part of the "Receive Request from SP" step 145. Upon the content arriving to the TB server 71, it is forwarded by the TB server 71 to the requesting SP server 72 as part of the "Send Content to SP" step 149, and received as part of a "Receive Content from TB" step 153, which corresponds to the message path 131*f* shown in the messaging chart 130 and performed as part of the "Content Fetching" phase 85. The received content is then sent to the requesting client 31*a* as part of a "Send Content to Client" step 154, which corresponds to the message path 131*g* shown in the messaging chart 130 and performed as part of the "Content Fetching" phase 85.

SSL Sniffing. SSL (Secure Sockets Layer) certificates are used to secure online communication and transactions with encryption. The SSL encryption technology creates encrypted connections between a user/web browser and website/web-server. SSL certificate makes sure that all communication that gets transmitted through a browser/website/server is encrypted and decrypted in such a manner that only the sender and the recipient would be able to see it in the decrypted form. SSL sniffing refers to the intercepting and reading of SSL encrypted traffic using an MI™ (Man in the Middle) proxy.

SSL sniffing works in different ways. In some SSL implementations, the MI™ proxy is used to redirect the end user in a communication to a non-HTTPS website and then sniff the non-encrypted traffic in that site. At the same time, requests would be relayed to and from the HTTPS site via a proxy. The man in the middle can alternatively grab the HTTPS traffic and present a valid HTTPS certificate to the end user. The certificate would need to be trusted on the end user machine. This the end user machine would need to be compromised or a trusted certificate has to be obtained. The man in the middle would then relay traffic to the actual HTTPS site and at the same time look at the unencrypted traffic, sitting in the middle of it all. There is another option too—grabbing the encrypted traffic and recording it, in the hope that in future, technology would help decrypt the data. An implementation example of SSL Sniffing, which extracts hostname from SSL by parsing TLC/SNI record (sni.js), is described in a web-page by 'Marek's—totally not insane—idea of the day' (dated Jun. 16, 2012) entitled: "*Dissecting SSL handshake*", which is incorporated in its entirety for all purposes as if fully set forth herein. SSL Sniffing is further described in Netronome Systems, Inc. white-paper published 2010 (2-10) entitled: "*Examining SSL-encrypted Communications*", which is incorporated in its entirety for all purposes as if fully set forth herein.

A system, method and computer program product for guaranteeing a data transaction over a network using SSL sniffing are disclosed in U.S. Pat. No. 7,853,795 to Dick et al. entitled: "System, method and computer program product for guaranteeing electronic transactions", which is incorporated in its entirety for all purposes as if fully set forth herein. When a data transaction between at least a server and a client is detected on a network, data transmitted via the network between the server and client during the data transaction is captured. At least one identifier is associated with the captured data. A timestamp is also generated for the captured data. The timestamp includes information therein identifying at least a portion of the identifier(s). The captured data, the identifier(s) and the timestamp are stored in one or more data stores. The identifier(s) associated with the stored captured data is also mapped to an entry in an index to permit retrieval of the stored data from the data store via the index.

In one example, the message received by the SP server 72 from the client device 31*a* as part of the "Receive Request from Client" step 151 is according to HTTPS protocol, where part or all of the message is encrypted using TLS or SSL. In such a case, the SP server 72 (or the TB server 71), may use SSL Sniffing for extracting the content identifier (such as the requested URL), for extracting any attribute values included in the message, for extracting any other information that is included in the message and is required for system operation. The SP server 72 may use SSL Sniffing that includes parsing the SSL handshake, such as parsing the ClientHello and ServerHello parts of the CONNECT request in the TLS handshaking. In an example where the client device 31*a* sends an HTTPS request that includes 'CONNECT amazon.com', the SP server 72 replies with a message consisting of: 'HTTP/1.1 200 OK', and continues to apply pkg/util/tls.js Handshake:extract_sni to all following messages from the client device 31*a*. If a message contains SNI and it is amazon.com, or the message does not contain SNI—the SP server 72 sends the ClientHello to Amazon web server (which may be the web server 22*b*), and start listening for the ServerHello while applying the Handshake: extract_cert_names to all received messages therefrom, until the certificate part is being received and parsed. If the received server certificate is for amazon.com and not a different/blocked host, the SP server 72 sends a response back to the client device 31*a* and begins tunneling data without parsing.

Figure 16:
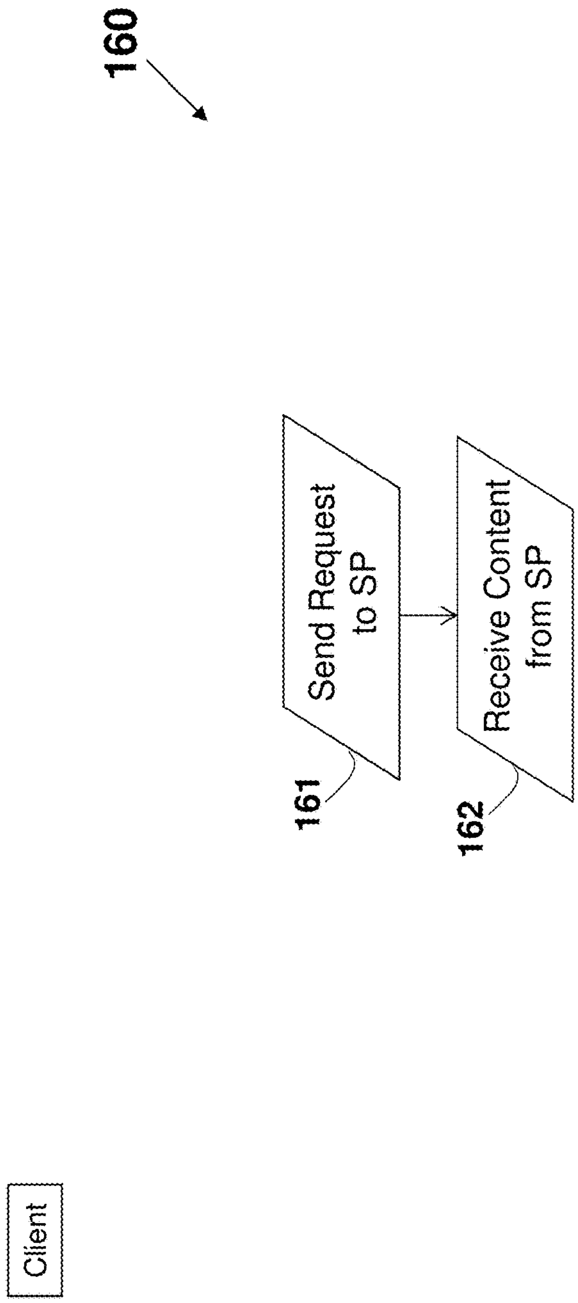
FIGS. 16 and 16*a* illustrate schematically simplified flowcharts relating to a client device.

For each piece of information or content (such as a single URL) requested a client device, such as the exampled client device 31*a*, generally executes a flowchart 160 shown in FIG. 16. It is noted that multiple content fetching operations may be performed in parallel or in series, as described regarding the flow charts 90*a* and 90*b* above. Any content fetching operation start sending a content request to the SP server 72 as part of a "Send Request to SF" step 161, and the request is received by the SP server 72 as part of the "Receive Request from Client" step 151. This action corresponds to the message path 121*a* shown in the messaging chart 120 and performed as part of the "Content Request" phase 82. Upon availability of the requested content at the SP server 72, the content is sent to the client device 31*a* as part of the "Send Content to Client" step 154, and is received by the client device 31*a* as part of a "Receive Content from SF" step 162, which corresponds to the message path 131*g* shown in the messaging chart 130 and performed as part of the "Content Fetching" phase 85. In one example, the client device 31*a* need only to know the IP address of the SP server 72, and need only to identify the requested content and the criteria (if any) for selecting a tunnel for fetching this content. The request message sent to the SP server 72 may include identification of the requested content, such as a URL.

In one example, the client device 31*a* does not impose any limitations or does not provide any criteria or limitations for selecting a tunnel device for a specific requested content. In such a case, the tunnel selection by the TB server 71 as part of the "Select Tunnel" step 146 is not limited by the client, and any internal selection rules or mechanisms may be used. Alternatively or in addition, the client device 31*a* defines specific limitations or criteria for selecting a tunnel device for a specific requested content. Such criteria may involve defining attributes types, and a value of values relating to each attribute values. In such a case, the tunnel selection by the TB server 71 as part of the "Select Tunnel" step 146 is limited by the client, and the client set limitations will apply in addition to any internal selection rules or mechanisms may be used. Alternatively or in addition, the client device 31*a* may define a specific tunnel device, for example identified by a specific IP address, to be used for a specific requested content. For example, the web server 22*b* may differently respond to a content requesting device, based on past interactions with that device. In such a case, the client device 31*a* may execute a flow chart 160*a* shown in FIG. 16*a*. In such a case, an identification of the tunnel device that was selected as used for fetching the specific content is also sent from SP server 72 to the client device 31*a*, in addition to sending the fetched content from the SP server 72 as part of the "Send Content to Client" step 154, receiving it by the client device 31*a* as part of a "Receive Content from SF" step 162. The tunnel identification is stored by the client device 31*a* as part of a "Save Tunnel IP" step 162*a*. In a next content fetching cycle initiated by the client device 31*a*, such as when the content is to be fetched from the same web server 22*b*, the content request as part of the "Send Request to SP" step 161 is appended to further include the specific tunnel device IP address to be used, retrieved after being stored in prior operation as part of the "Save Tunnel IP" step 162*a*, as part of a "Send Tunnel IP to SF" step 161*a*. The request for a specific tunnel device is then forwarded by the SP server 72 to the TB server 71 as part of the message path 131*a*, and then the TB server 71 selects the requested tunnel device for fetching the content, as part of the "Select Tunnel" step 146.

Figure 17:
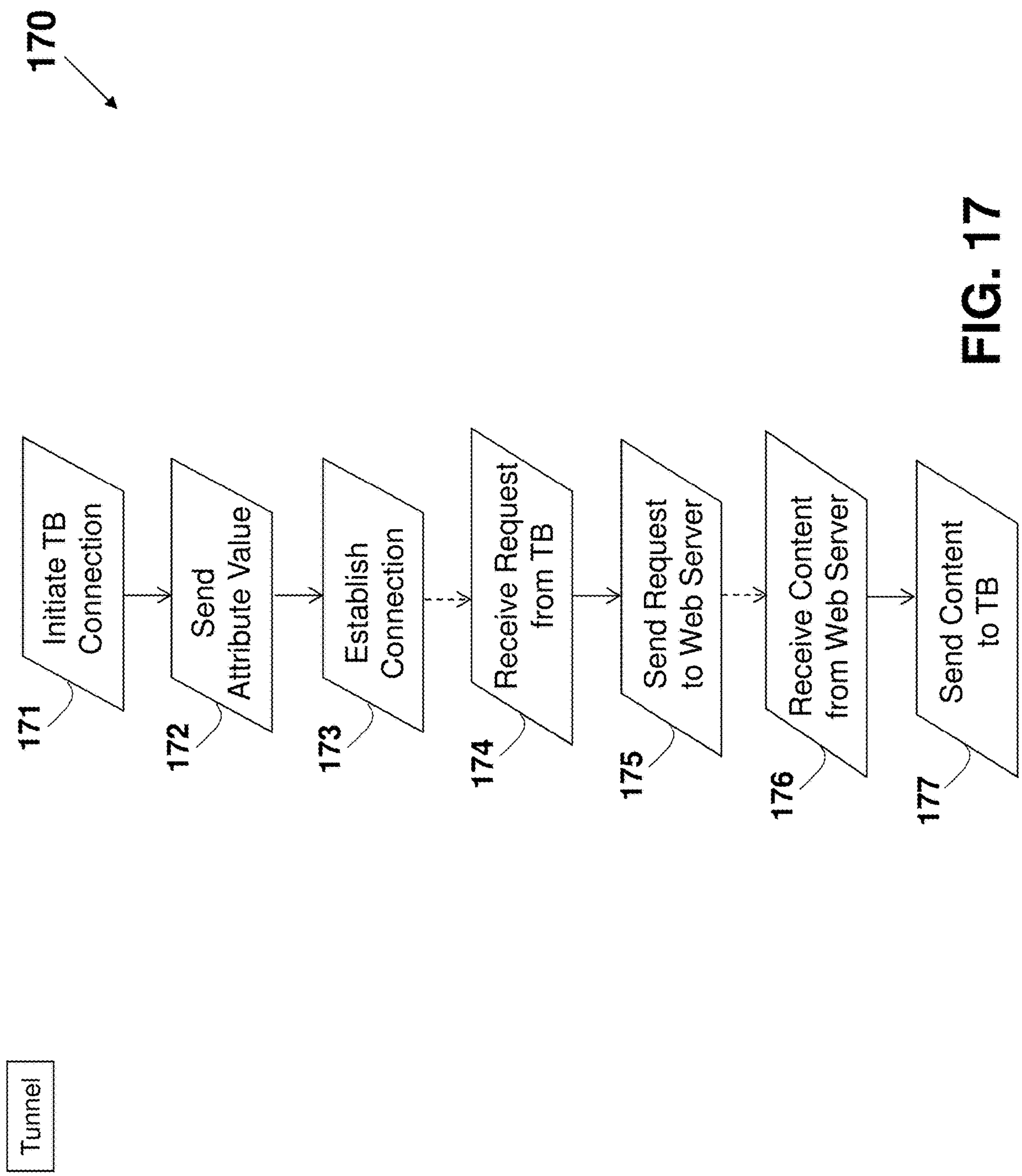
FIG. 17 illustrates schematically a simplified flowchart relating to a tunnel device.

Each of the tunnel devices, such as the tunnel #1 33*a*, the tunnel #2 33*b*, the tunnel #3 33*c*, the tunnel #4 33*d*, and the tunnel #5 33*e*, generally executes a flowchart 170 shown in FIG. 17. Upon connecting to the Internet, upon deciding to serve as a tunnel server, or upon having the ability to serve as a tunnel device, the tunnel device initiates connection to the TB server 71, as part of an "Initiate TB Connection" step 171, respectively corresponding to the message paths 111*a*, 111*b*, 111*c*, 111*d*, and 111*e*. The connection initiation as part of the "Initiate TB Connection" step 171 is responded by the TB server 71 as part of the "Accept and Open Connection" step 141 in the flow chart 140*a*, and is performed as part of the "Registration and Connection" phase 81. In an arrangement where a tunnel selection is based on attribute values, the tunnel device send the corresponding values, such as the operating system type and version (corresponding to the column 102*f* in the table 100), and any other value relating to any other attribute type, as part of a "Send Attribute Value" step 172, so the value (associated with the tunnel device IP address, for example) may be added to the tunnel registry as part of the tunnels list memory 73, such as adding a row to the table 100 by the TB server 71 as part of the "Add to Table" step 142. After initializing the communication, the tunnel device and the TB server 71 sustain a connection, such as a TCP connection using the TCP keepalive mechanism, as part of an "Establish Connection" step 173 and the "Establish Connection" step 143, respectively illustrated in the messaging chart 110*a* as message dashed lines 112*a*, 112*b*, 112*c*, 112*d*, and 112*e*. The establishing of the sustained connection between the tunnel device and the TB server 71 completes the "Registration and Connection" phase 81 in the flow chart 80.

In a case where a tunnel device is selected by the TB server 71 as part of the "Select Tunnel" step 146, the TB server 71 send to the selected tunnel device as part of the "Send Request to Tunnel" step 147 the content request, which is received as part of a "Receive Request from TB" step 174, corresponding to the message path 131*b* shown in the example of selecting the tunnel #4 33*d* in the messaging chart 120*b*. In response, the selected tunnel device forward the request to the relevant web server, such as the web server 22*b*, as part of a "Send Request to Web Server" step 175, corresponding to the message path 131*c* shown in the example of selecting the tunnel #4 33*d* in the messaging chart 120*b*, thus completing the "Using Tunnel" phase 84 in the flow chart 80 shown in FIG. 8.

As part of the "Content fetching" phase 85, the content retrieved from the web server 22*b* (as a response to the request) is received by the selected tunnel device as part of a "Receive Content from Web Server" step 176 (corresponding to message path 131*d* in the messaging chart 130), and is then forwarded (or 'tunneled') to the TB server 71 as part of a "Send Content to TB" step 177, to be received by the TB server 71 as part of the "Receive Content from Tunnel" step 148, corresponding to message path 131*e* in the messaging chart 130.

The operation from "Receive Request from TB" step 174 to the "Send Content to TB" step 177 may be repeated each time the tunnel is selected. The connection established in the "Establish Connection" step 173 is sustained after each such content tunneling operation, allowing for additional tunneling operation to be performed using the same tunnel. The same tunnel may be selected for the same web server 22*b*, such as for different URLs of the same web page stored in the web server 22*b*. Alternatively or in addition, the same tunnel may be used for different web servers, such as for retrieving different web pages or web sites associated with different web servers.

In one example, one or more of the tunnel devices are used primarily for purposes other than serving as tunnel devices. In such a case, the tunnel functionality or operation, such as executing the flow chart 170 shown in FIG. 17, is executed in the background or when the device is idling from other activities, preferably with the knowledge of the tunnel device owner and user, and preferably with minimum interference or interaction with other processes, operations, or activities of the tunnel device.

In one example, a tunnel device may be a dedicated device, primarily installed, used, or operated for serving as a tunnel device, such as primarily (or solely) for executing the tunnel-related flow chart 170 shown in FIG. 17. In one example, the tunnel #1 33*a* is such a dedicated tunnel device, shown used as a tunnel in a messaging chart 180 shown in FIG. 18. In one example, the dedicated tunnel device #1 33*a* may be owned, operated, or used by an entity 76*a* which also owns, operates, or uses the TB server 71 and the SP server 72, as pictorially illustrated in the arrangement 180*a* shown in FIG. 18*a*. While a single dedicated device in exampled in the arrangement 180, multiple such devices may equally be used, and these dedicated tunnel devices may also be owned, operated, or used by the same entity 76*a*. The using of dedicated tunnel devices allows to provide more available tunnel anytime, and reduces the need of relying of availability third party devices. Further, such dedicated devices may be optimized for their primary tunneling functionality.

While the system operation was exampled above where each tunnel device is associated with a single IP address, multiple IP addresses may be equally associated with any tunnel device. In one example, the dedicated tunnel device 33*a* shown in the arrangement 180 may be addressed using multiple IP addresses, such as by using multihoming. The dedicated tunnel device 33*a* (or any tunnel device) may execute the tunnel process 170 for each of the IP addresses, either in parallel or sequentially (or a combination thereof), thus allowing the savings resulting by using a single hardware device with a single Internet connection executing multiple tunnel functionalities. Alternatively, multiple Internet connection may be used, where one or more IP addresses are associated with each Internet connection. Dedicated tunnels may be implemented as client devices, or preferably as server, such as located as part of data centers. Preferably, the dedicated tunnels, either as client devices or as servers in data centers, are installed in many location around the world, allowing for better load balancing due to the widespread distribution, as well as providing large variety of potential locations or IP geolocations that may be selected as location attribute values by client devices. A dedicated tunnel device may be associated with more than 1,000, 2,000, 5,000, 10,000, 20,000, 50,000 or 100,000 distinct IP addresses.

Further, tunnel devices may be owned, used, or operated by consumers. In such a case, their availability is only controlled by the user. For example, by turning off the device, such as at night, or by being located at no Internet connection locations, the tunnel devices become not available to be used for tunneling functionality. In contrast, dedicated tunnel devices may be available to be selected and used at any time, all year round (usually spoken "twenty-four seven"), and as such may allow the service provider 76*a* to provide stable and consistent tunneling service to client devices. In addition, dedicated tunnel devices that are owned, operated, or controlled by the service provider 76*a*, obviate the need for distributing the tunnel functionality, such as a software code that implements the tunnel flow chart 170, to various devices.

In general, the tasks performed by the TB server 71, as part of the operation of the flow chart 140 shown in FIG. 14, may be partitioned into two main objectives: Selecting a tunnel device, such as the "Select Tunnel" step 146, and being in the 'tunneling' path of fetching the content, such as the "Receive Content from Tunnel" step 148 and the "Send Content to SP" step 149. In one exemplary arrangement, the TB server 71 is focused only on the tunnel selecting operation and is not taking part in the "Content Fetching" phase 85.

Figure 19:
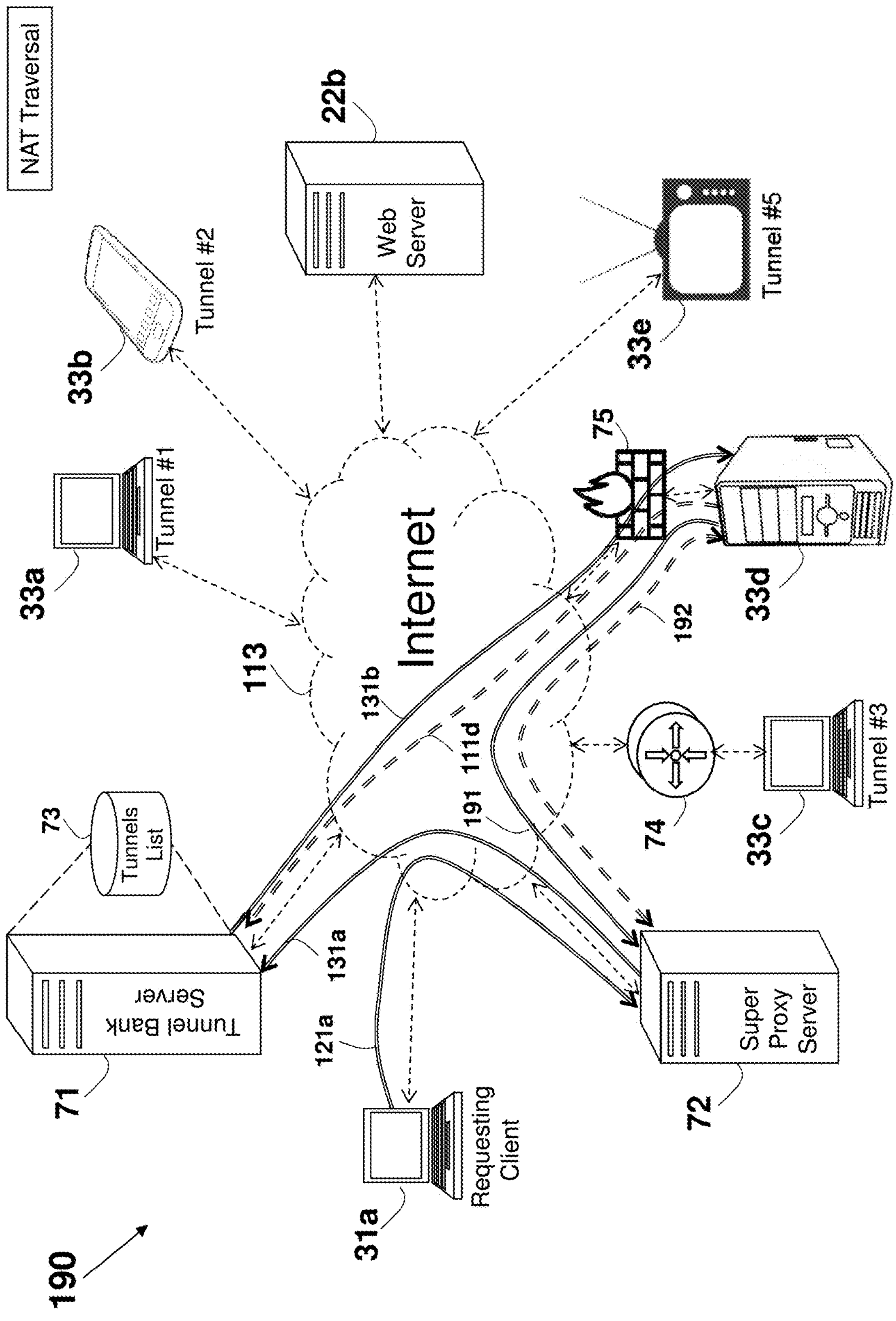
FIGS. 19, 19*a*, and 19*b* depicts schematically messages exchanged over the Internet in an alternative scheme for fetching content from the web server to the client device via a selected tunnel device, the TB server, and the SP server.

A messaging chart arrangement 190 that supports the obviating of the TB server from being part of the content fetching path is shown in FIG. 19. In response to the tunnel #4 33*d* exampled as being selected and communicated by the TB server 71 over the message path 131*b* described above, the selected tunnel #4 33*d* initiates a communication with the SP server 72 over a message path 191. Any technique or technology may be used for directing the selected tunnel #4 33*d* to connect to the SP server 72, preferably a NAT traversal-based technique. Preferably, after the initial communication between the selected tunnel #4 33*d* and the SP server 72 is made, the connection (shown as a dashed line 192) is sustained, such as by using TCP keepalive and part of a TCP Connect scheme, similar to, or different from, the connection 111*d* that is established between the tunnel #4 33*d* and the TB server 71. Once the connection 192 is established and sustained, the SP server 72 may initiate communication with the selected tunnel #4 33*d*. In one example, the SP server 72 sends the identification of the requested content (such as a URL) to the selected tunnel #4 33*d*, shown as a message path 193 in a messaging chart 190*a* in FIG. 19*a* Similar to the example shown in FIG. 13 above and the related description, the selected tunnel #4 33*d* performs the tunneling functionality by forwarding the content request to the web server 22*b* over the message path 131*c*, and receiving the requested content over the message path 131*d*. However, the requested content is then forwarded to the requesting device, namely the SP server 72, over a message path 194 illustrated as part of a messaging chart 190*b* in FIG. 19*b*, rather than being forwarded to the TB server 71 over the message path 131*e* as described above. In turn, the received content from the selected tunnel #4 33*d* is forwarded by the SP server 72 to the requesting client 31*a* over the message path 131*g* as described above.

The mechanism of the "Content Fetching" phase 85 that is described in the messaging chart 190*b* involves the selected tunnel #4 33*d* receiving the content from the web server 22*b* over the message path 131*d*, forwarding the content from the selected tunnel #4 33*d* over the message path 194 to the SP server 72, which in turn send the fetched content as a response to the requesting client 31*a* over the message path 131*g*. Such content path is preferred since the 'tunneling' via the TB server 71 using the message paths 131*e* and 131*f* is obviated, providing one less hop of carrying information from the web server 22*b* to the client device 31*a*, thus providing less latency, higher reliability, and less costs associated with the additional traffic, hardware and processing power required for handling the unnecessary tunneling via the TB server 71. Further, such scheme allows to optimize the structure and functionalities of the TB server 71 for tunnel selection activities.

Figure 19A:
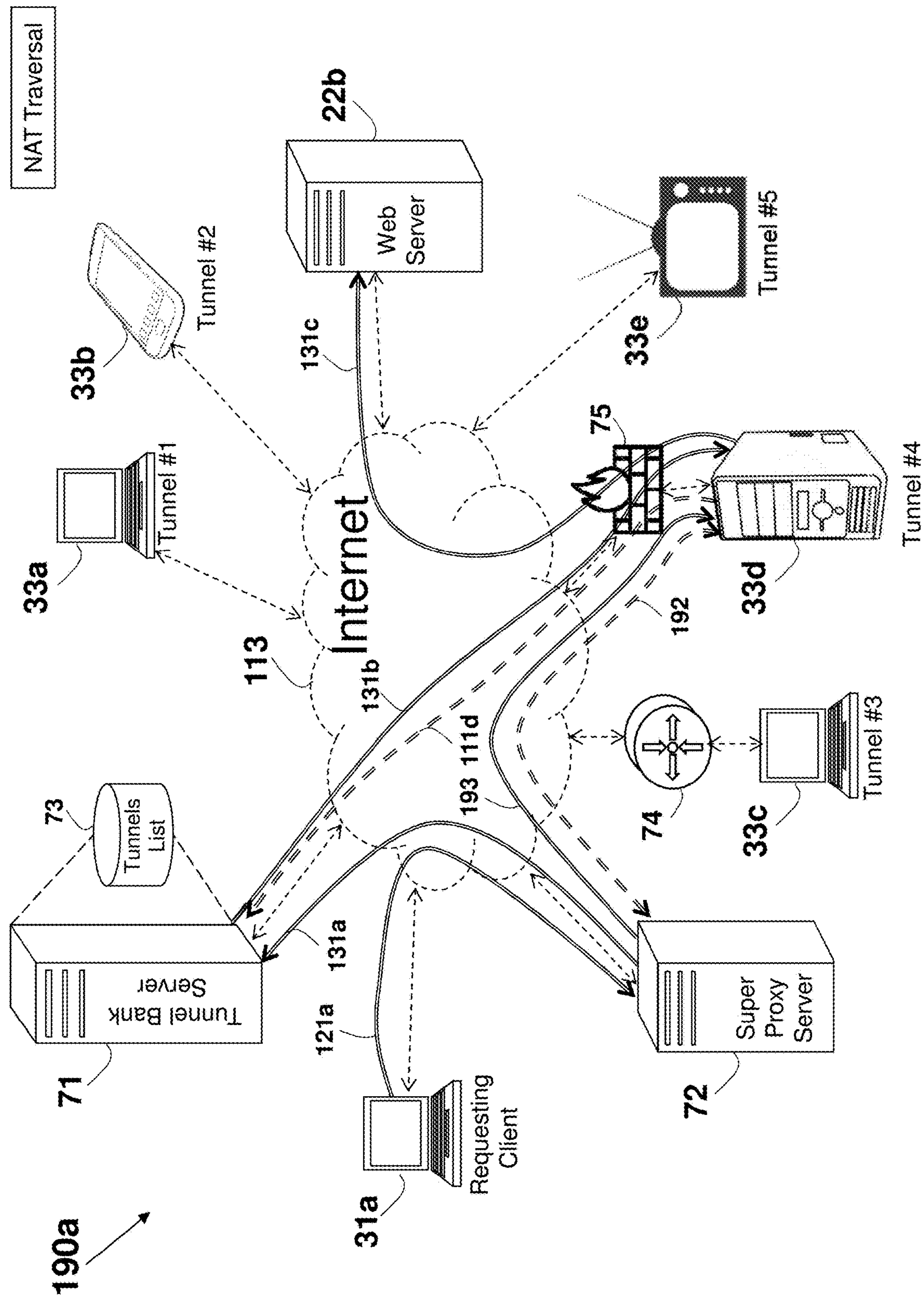
Figure 19B:
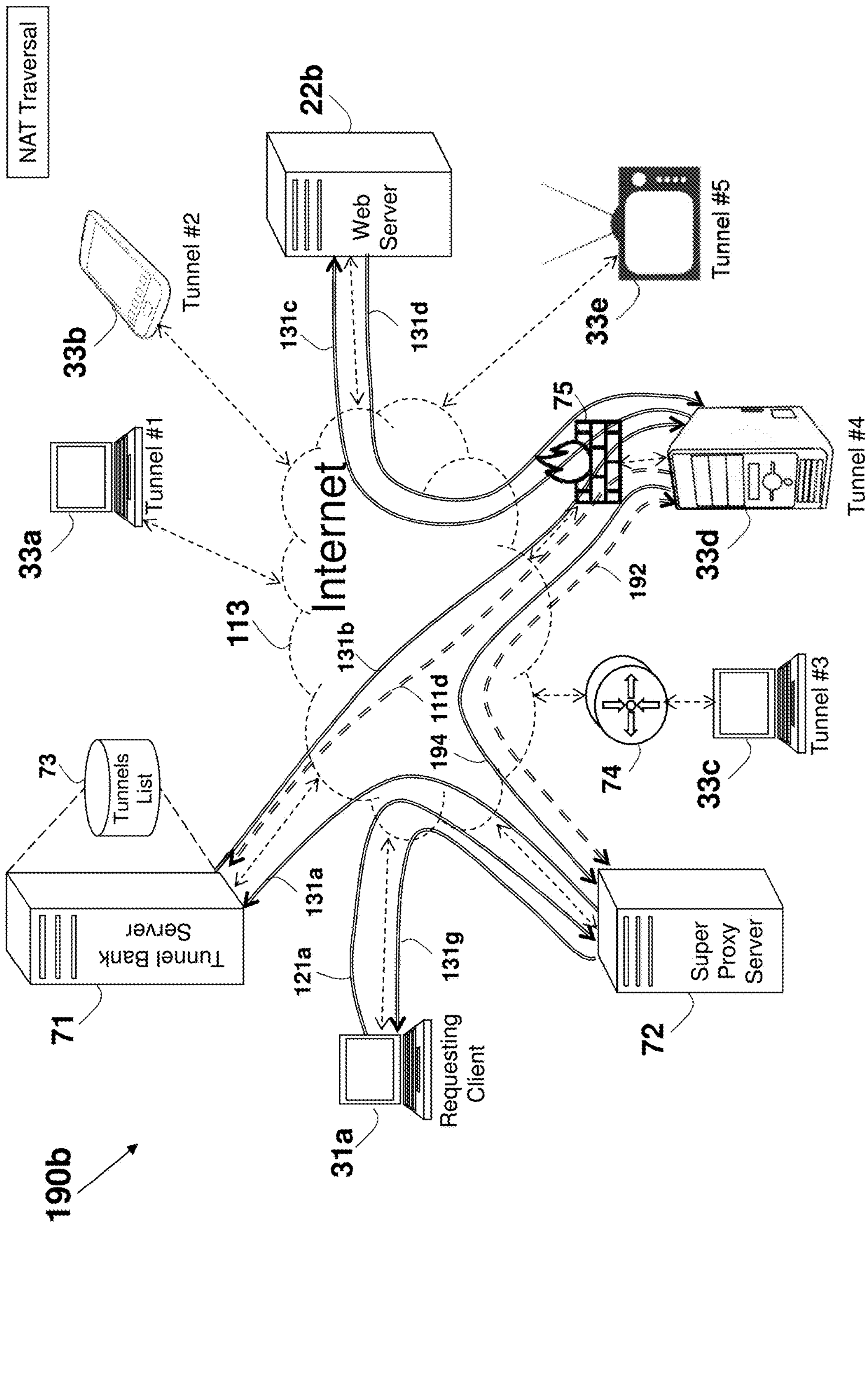
Figure 20:
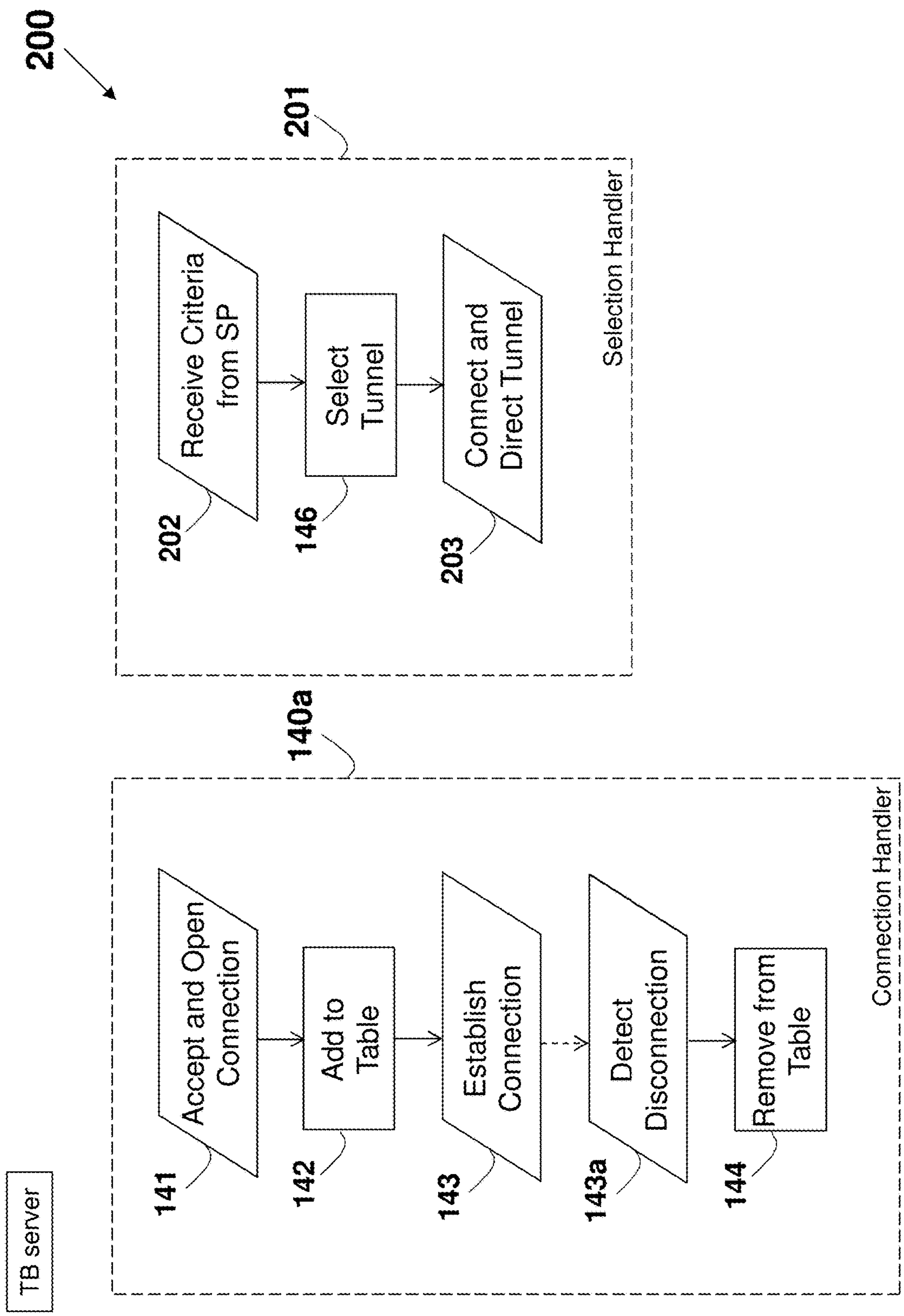
FIG. 20 illustrates schematically another simplified flowchart relating to a TB server.

In the alternative arrangement described in FIGS. 19-19*b*, the TB server 71 generally executes a flowchart 200 shown in FIG. 20, which is based on the flowchart 140 shown in FIG. 14. The TB server 71 generally executes in parallel at least the unchanged "Connection Handler" flow chart 140*a* and a "Selection Handler" flow chart 201, which may replace the "Request Handler" flow chart 140*b*, which is direct to selecting a tunnel device according to a criteria.

As part of processing a content request from the client device 31*a*, the TB server 71 receives from the SP server 72, over the message path 131*a* shown in the messaging chart 190, criteria (or a criterion) for selecting a tunnel device to be used for delivering the requested content, as part of a "Receive Criteria from SF" step 202. While as part of the "Receive Request from SP" step 145 that is part of the flow chart 140*b* the TB server 71 was also notified of the identification of the requested content, such identification is not required in this alternative scheme, since the TB server 71 is no longer part of the actual content request and fetching data paths. In one example, the same message, including also the content identification is sent from the SP server 72 to the TB server 71 over the message path 131*a*, so that the "Receive Criteria from SP" step 202 may be rendered to be the same as the "Receive Request from SF" step 145 described above. After a tunnel device is selected as part of the "Select Tunnel" step 146, the TB server 71 sends a message to the selected tunnel #4 33*d* over the message path 131*b*, directing it to initiate communication (such as by using NAT traversal) with the SP server 72, as part of the "Connect and Direct Tunnel" step 203. In the scheme shown in FIG. 19, the tunnel selection phase 83 is completed, and the involvement of the TB server 71 in the fetching process ends after directing the selected tunnel #4 33*d* in the "Connect and Direct Tunnel" step 203.

Figure 21:
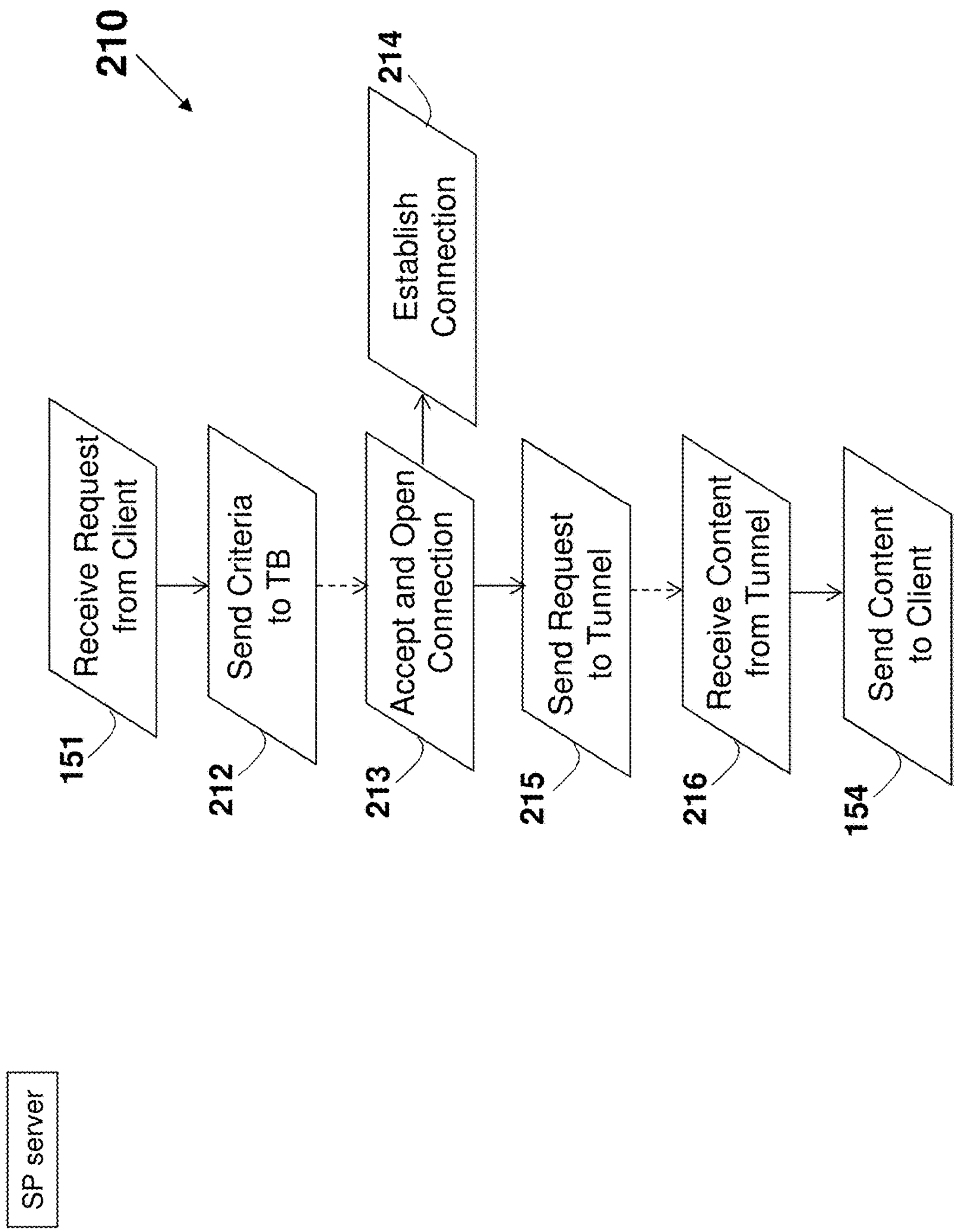
FIG. 21 illustrates schematically another simplified flowchart relating to a SP server.

In the alternative arrangement described in FIGS. 19-19*b*, the SP server 72 generally executes a flowchart 210 shown in FIG. 21, which is based on the flowchart 150 shown in FIG. 15. The SP server 72 generally executes the flowchart 210 shown in FIG. 21 for each piece of information or content (such as a single URL) requested by the client device 31*a*. The operation starts when a content request is received from the client device 31*a* as part of the "Receive Request from Client" step 151, which corresponds to the message path 121*a* shown in the messaging chart 120 and performed as part of the "Content Request" phase 82. A request from the client device 31*a* may include both identification of the requested content and criteria for selecting a tunnel device, such as the attribute type to use and the associated attribute value or values. As part of a "Send Criteria to TB" step 212, the criteria set by the client device 31*a* for selection of a tunnel device, as part of the request, is sent to the TB server 71, without the content identification part, over the message path 131*a*, to be received by the TB server 71 as part of the "Receive Criteria from SP" step 202. Alternatively, the message sent includes the whole content request information, similar to, or identical to, the "Send Request to TB" step 152 in the flow chart 150, which corresponds to the message path 131*a* shown in the messaging chart 120*a*, and received by the TB server 71 as part of the "Receive Request from SF" step 145. As part of an "Accept and Open Connection" step 213, the SP server 72 receives a communication initiated by the selected tunnel #4 33*d*, shown as a message path 191, and the connection between the SP server 72 and the selected tunnel #4 33*d* is sustained as part of an "Establish Connection" step 214. The sustained connection is illustrated as a message path 192, and may be based on TCP connection that uses the TCP keepalive mechanism, similar to the connection 111*d* between the selected tunnel #4 33*d* and the TB server 71. The sustained connection allows the SP server 72 to initiate communication with the tunnel #4 33*d*, even in the presence of a filtering device such as a router or the firewall 75.

Using the established connection 192, the SP server 72 forwards the content identification to the selected tunnel #4 33*d* as part of a "Send Request to Tunnel" step 215, illustrated as message path 193 in a messaging chart 190*a* shown in FIG. 19*a*, and in response the selected tunnel #4 33*d* provides 'tunneling' by forwarding the request to the web server 22*b* over the message path 131*c*, as part of the "Using Tunnel" phase 84. The content fetched by the selected tunnel #4 33*d* is in turn sent to the SP server 72, and received over the message path 194 illustrated in a messaging chart 190*b* shown in FIG. 19*b*, as part of a "Receive Content from Tunnel" step 216. Similar to the flow chart 150 above, the SP server 72 then forward the fetched content as a response to the client device 31*a* request over the message path 131*g* as part of the "Send Content to Client" step 154, completing the "Content Fetching" phase 85.

Figure 22:
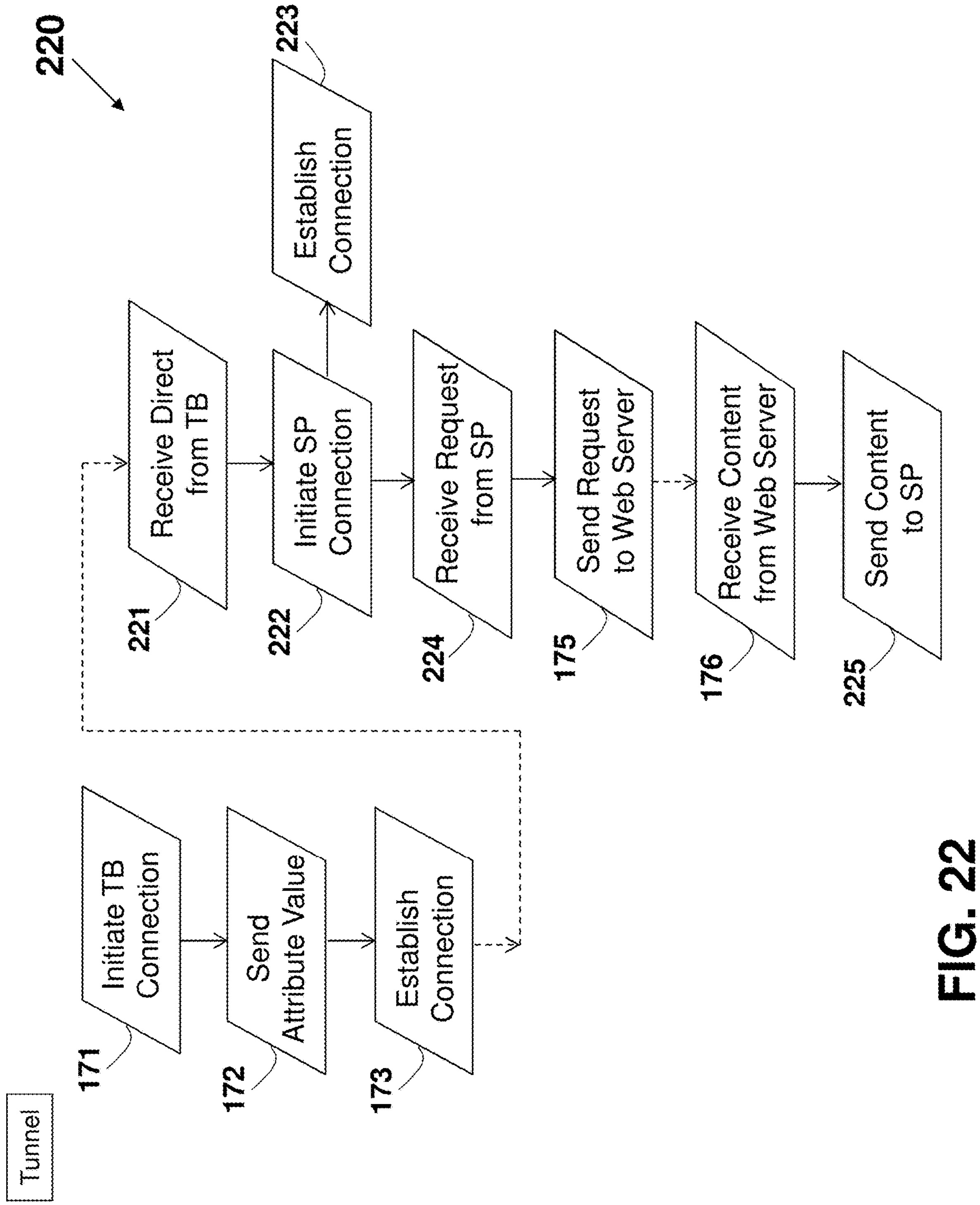
FIG. 22 illustrates schematically another simplified flowchart relating to a tunnel device.

In the alternative arrangement described in FIGS. 19-19*b*, the selected tunnel device, such as the exampled tunnel device #4 33*d*, generally executes a flowchart 220 shown in FIG. 22, which is based on the flowchart 170 shown in FIG. 17. The selected tunnel device generally executes the flowchart 220 shown in FIG. 22 each time it is selected as a tunnel device by the TB server 71. Using the established connection 111*d*, the tunnel #4 33*d* receives an instruction from the TB server 71 (that is sent as part of the "Connect and Direct Tunnel" step 203 of the flow chart 201) to connect to the SP server 72, as part of a "Receive Direct from TB" step 221 over the message path 131*b*. In response, as part of a "Initiate SP Connection" step 222, the tunnel device #4 33*d* connects to the SP server 72, and then a sustained connection, shown as the message path 192, is formed as part of a "Establish Connection" step 223, corresponding to the "Establish Connection" step 214 in the flow chart 210. A content request sent by the SP server 72 as part of the "Send Request to Tunnel" step 215 (in the flow chart 210) is received by the selected tunnel #4 33*d* as part of a "Receive Request from SF" step 224, illustrated as the message path 193 in the messaging chart 190*a* shown in FIG. 19*a*. Similar to the flow chart 170 above, the selected tunnel device forward the request to the relevant web server, such as the web server 22*b*, as part of the "Send Request to Web Server" step 175, corresponding to the message path 131*c* shown in the example of selecting the tunnel #4 33*d* in the messaging chart 190*a*, thus completing the "Using Tunnel" phase 84 in the flow chart 80 shown in FIG. 8.

As part of the "Content fetching" phase 85, the content retrieved from the web server 22*b* (as a response to the request) is received by the selected tunnel device as part of the "Receive Content from Web Server" step 176 (corresponding to the message path 131*d* in the messaging chart 130), and is then forwarded (or 'tunneled') to the SP server 71 as part of a "Send Content to SP" step 225, and received by the SP server 72 as part of the "Receive Content from Tunnel" step 216, corresponding to message path 194 in the messaging chart 190*b*.

Any of the steps or the flow charts to be executed by a tunnel device, may be included as a Software development kit (SDK) that is provided as a non-transitory computer readable medium containing computer instructions. The SDK may be installed in a respective tunnel device, to be executed by a processor in that device, appended to another software program or application installed on the tunnel device.

An attribute type is used herein to include any characteristic, feature, aspect, property, or any other piece of information where one tunnel device is different from another tunnel device. The attribute type may be associated with the tunnel device itself, such as its hardware, software, or any combination thereof, the tunnel device environment, such as its location, or a connectivity related feature or capability, such as relating to Internet connectivity. Each available tunnel device may be associated with a value (or multiple value, such as a range) for each attribute type. The attribute values may be stored in the tunnels list memory 73 that is part of, or connected to, the TB server 71, that may be, for example, in the form of the table 100 shown in FIG. 10.

The table 100 examples in the "Geographic Location" column 102*c* an attribute type relating to the location of tunnel devices, which may be actual geographical location or may be based on IP Geolocation. In the example of the "Geographic Location" column 102*c*, the attributes values are in the form of cities, such as the city of Munich, Germany in the second row 101*b* that corresponds to a tunnel device having an IP address of 176.94.1.17, and the city of Mumbai, India in the sixth row 101*f* that corresponds to a tunnel device having an IP address of 59.144.192.23. While city is exampled as values, any other physical geographical location or region may be used, such as country, state or province, city, street address, ZIP code, or any combination thereof. Similarly, an attribute type may correspond to the Internet connection of a tunnel device, as the table 100 examples in the "ASN" column 102*d* relating to the ASN (or ISP name or any other identification). In the example of the "ASN" column 102*d*, the attributes values are in the form of digits that represent the ASN (or ISP), such as the ASN 3215 in the first row 101*a* that corresponds to a tunnel device having an IP address of 80.12.105.150, and the ASN 11419 in the seventh row 101*g* that corresponds to a tunnel device having an IP address of 200.196.224.89. Any other identification of ASN, ISP, or any other Internet connection relating mechanism or identity may be equally used.

Another attribute type that may correspond to the technology used for interconnecting a tunnel device to the Internet, as the table 100 examples in the "Connection Type" column 102*e* relating to the technology or connection scheme. Similarly, the attribute type may correspond to a tunnel device hardware or software, type, version, or any combination thereof, such as the table 100 examples in the "Operating System" column 102*f*. Alternatively or in addition, an attribute type may correspond to estimated or measured communication related features, such as the bandwidth as exampled in the "BW" column 102*g* or the "RTT" column 102*h*. The BW or RTT may relate to the tunnel estimated or measured communication properties (such as parameters measured in previous transactions) with the web server 22*b* (such as over the message paths 131*c* or 131*d*), with the TB server 71 (such as over the message paths 131*b* and 131*e*), or with the SP server 72 (such as over the message paths 191 and 194).

In one example, a single attribute type is used for distinguishing between the various available tunnel devices. In this case, the client device 31*a*, as part of the "Send Request to SF" step 161, sends to the SP server 72 over the message path 121*a* a value (or multiple values, such as a range) requested for the selected tunnel that is to be used in fetching the requested content. The value (or multiple values, such as a range) is received by the SP server 72 as part of the "Receive Request from Client" step 151, and forwarded to the TB server 71 over the message path 131*a* as part of "Send request to TB" step 152. The value (or multiple values, such as a range) is received by the TB server 71 as part of the "Receive Request from SF" 145, and is used as a criteria for selecting a tunnel device for this content fetching transaction as part of the "Select Tunnel" step 146. In one example, a single value is requested, and the TB server 71 thus selects a tunnel device having a value that is identical to the requested value from the client device 31*a*.

For example, assuming an attribute type of operating system and a value of "Window 7", since there is only a single tunnel, being the tunnel represented in the fourth row

101*d* having an IP address of 83.220.232.67, this tunnel is selected. In a case where multiple available tunnel devices in the table 100 are associated with the requested value, one of these available tunnel is selected, such as using random selection. In another example, few values are requested. For example, assuming an attribute type of 'connection type' and values of "ADSL or VDSL", there are three tunnel devices that may be selected, namely the first row 101*a* (a tunnel device having an IP address of 80.12.105.150), the fourth row 101*d* (a tunnel device having an IP address of 83.220.232.67), and the seventh row 101*g* (a tunnel device having an IP address of 200.196.224.89). Any one of these tunnel devices may be selected, such as using random selection. Similarly, the client device 31*a* may define a range of values, typically where numeral values are involved, such as in the attribute type relating to column "BW" 102*g* or the "RTT" column 102*h*. For example, the client device 31*a* may define a "RTT" attribute type having a range between 200 ms (minimum value) and 400 ms (maximum value), directing the selection of the tunnel device represented in the six row 101*f* (a tunnel device having an IP address of 59.144.192.23) or the tunnel device represented in the seventh row 101*g* (a tunnel device having an IP address of 200.196.224.89), in the example of the table 100. Similarly, the client device 31*a* may define only a minimum value, or only a maximum value. For example, a maximum RTT value of 100 ms results in the first row 101*a* and second row 101*b*.

Alternatively or in addition, the selection of the tunnel device to be used (as part of the "Select Tunnel" step 146), or the priorities assigned to them, may be based on the available communication attributes or their history. For example, based on the costs associated with the usage of a network, the higher cost network may have lower priority and less used than lower cost or free network. In another example, a high quality network, such as having a higher available bandwidth or throughput, lower communication errors or packet loss, lower hops to destination, or lower transfer delay time, is having higher priority that a lower quality network. The system may use Bit Error Rate (BER), Received Signal Strength Indicator (RSSI), Packet Loss Ratio (PLR), Cyclic Redundancy Check (CRC) and other indicators or measures associated with the communication channel associated with a network interface, and may be based on, use, or include the methodology and schemes described in RFC 2544 entitled: "*Benchmarking Methodology for Network Interconnect Devices*", and ITU-T Y.1564 entitled: "*Ethernet Service Activation Test Methodology*", which are both incorporated in their entirety for all purposes as if fully set forth herein. The network quality grade may be affected by the history of using such a network, for example during a pre-set period before the process of selection of a network interface. In one example, the network interface where the last proper packet was received from may be selected as the interface to be used for the next packet to be transmitted. The system may further use, or be based on, the schemes and technologies described in U.S. Pat. No. 7,027,418 to Gan et al. entitled: "Approach for Selecting Communications Channels Based on Performance", which is incorporated in its entirety for all purposes as if fully set forth herein.

Hence, for any value or range of value defined, a tunnel device to be used may be selected from a set of available tunnel devices, which is a subset of all available tunnel devices that match the requested value or range of values. In one example, the client device 31*a* may use two attributes types, and a value (or a group of values) associated with each attribute type. In such a case, two subsets are formed, one for each attribute, which each subset includes of all available tunnel devices that match the respective requested value (or range of values) for each attribute types. The client device 31*a* may further define a subset that is resulted by an operation on the two subsets. For example, the client device 31*a* may define to select a tunnel from a set that is a union of the two subsets (an 'or' operation), where the union (denoted by U) of a collection of sets is the set of all elements in the collection, an intersection of the two sets (an 'and' operation), where the intersection $A \cap B$ of two sets A and B is the set that contains all elements of A that also belong to B (or equivalently, all elements of B that also belong to A), but no other elements, a set difference or complement operation (where the complement of a set A refers to elements not in A), or asymmetric difference operation the symmetric difference, also known as the disjunctive union, which is the set of elements which are in either of the sets and not in their intersection. For example, in a case of defining a value of BW equal or above 1500 Kb/s 'and' an RTT below 300 ms, the resulted intersection subset includes only the tunnel device represented in the sixth row 101*f*, while in a case of a value of BW equal or above 1500 Kb/s 'or' an RTT below 300 ms, the resulted union subset includes all rows except the seventh row 101*g*. Similarly, three or more attributes values may be defined relating to three of more attribute types.

In one example, the entity 76 or 76*a* forms a system that may be used to provide a service to client devices. The service allows the client device (such as the client device 31*a*) to quickly and anonymously fetch content from a web server, such as the web server 22*b*. The service level may be measured, or the service may be billed for, if applicable, for example, using the following parameters (individually or combined):

Content amount. In this example, the amount of data relating to the content fetched from a data server (such as the web server 22*b*) is measured and logged, by the SP server 72 or the TB server 71. Alternatively or in addition, the client device 31*a* may log or send the amount of content fetched. Number of tunnels: The number of tunnel devices that were available to a client device, or the number of tunnel devices that were actually used, may be used as an indication to the service level. Location: The service level may be measured or billed based on the country of the data server, from which the content is fetched, is located. Similarly, the service level may be measured or billed based the country the client device, to which the content is fetched, is located.

Figure 13:
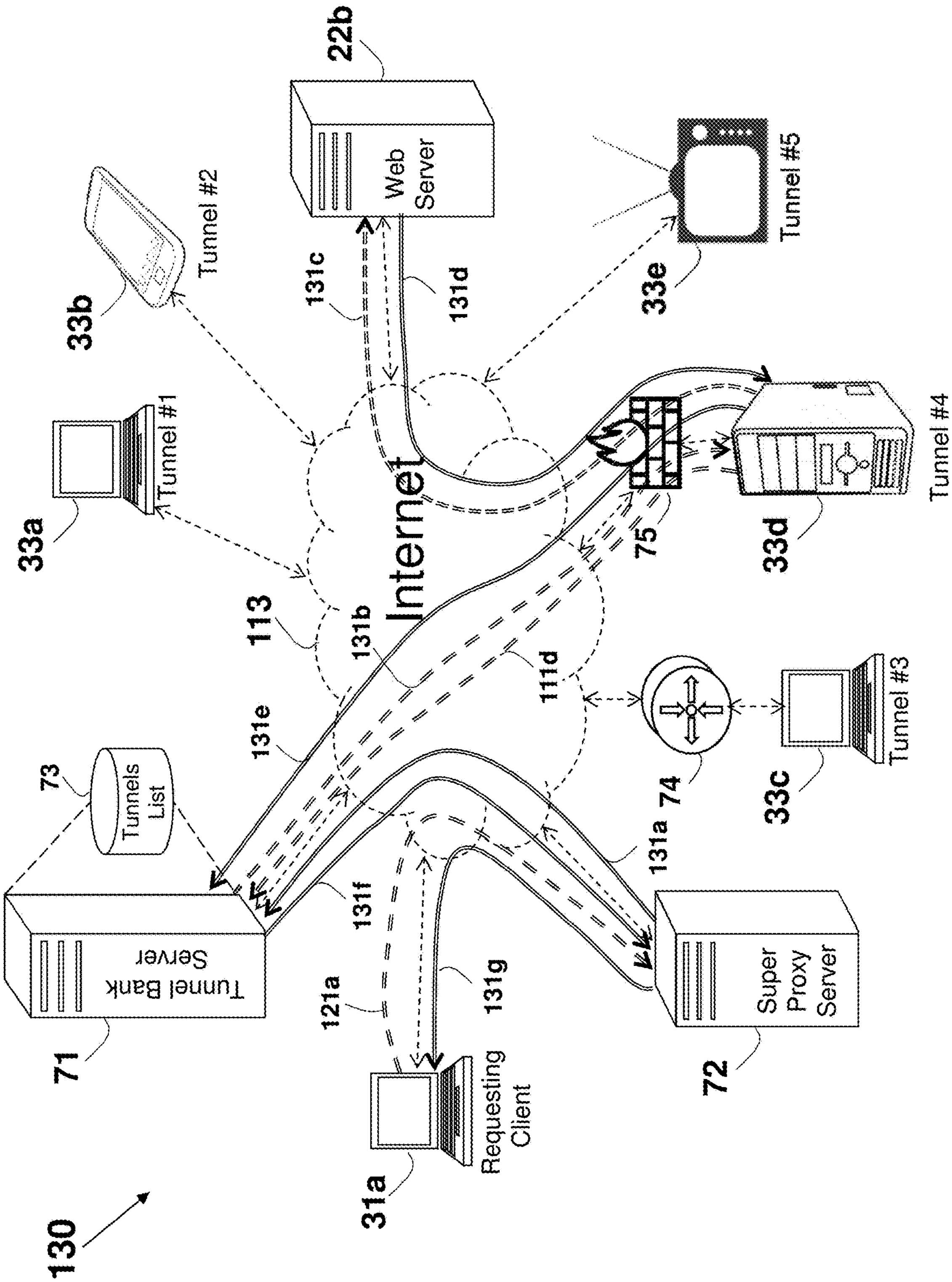
FIG. 13 depicts schematically messages exchanged over the Internet for fetching content from the web server to the client device via the tunnel device, the TB server, and the SP server.
Figure 23:
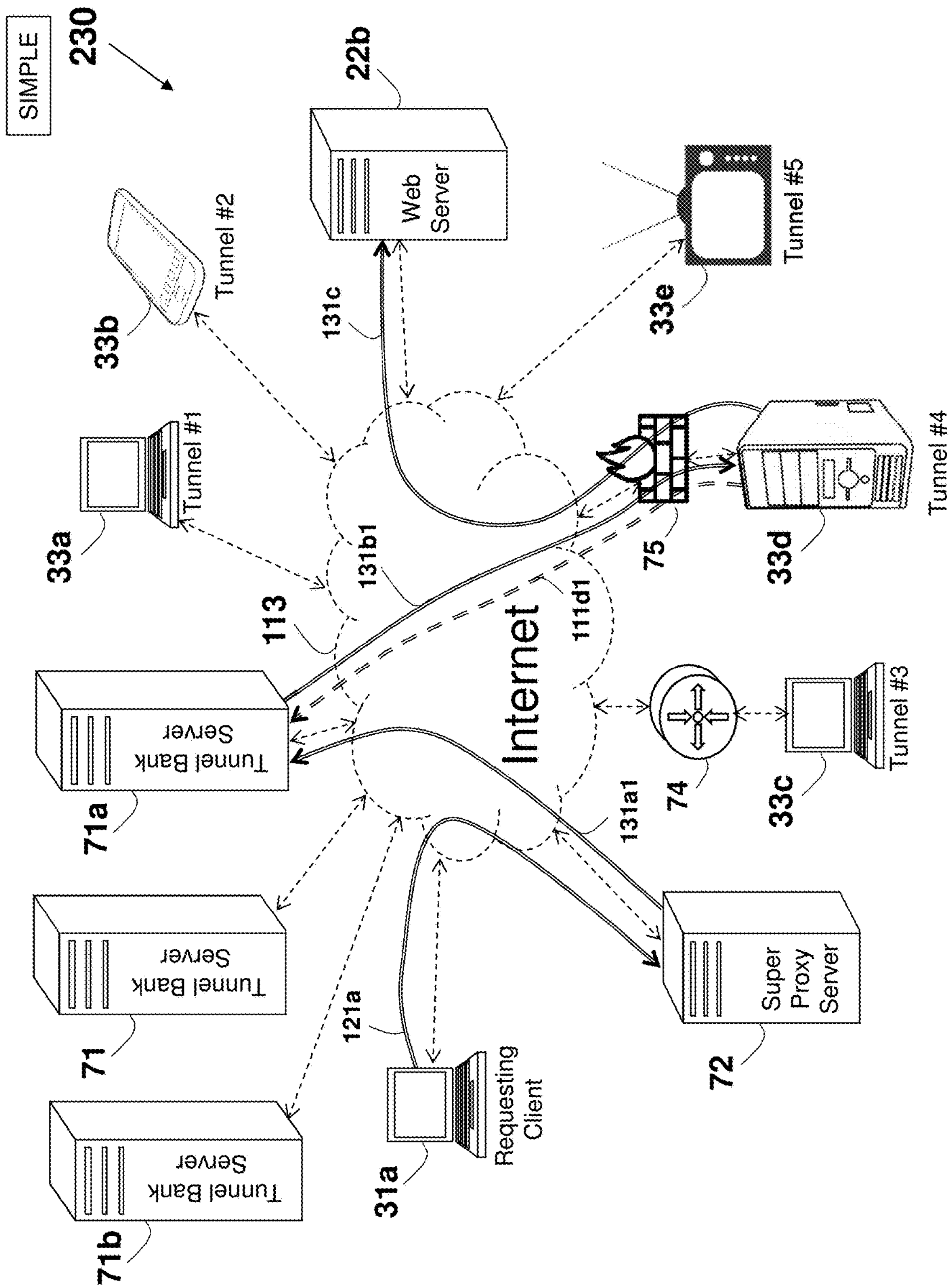
FIGS. 23 and 23*a* depict schematically messages exchanged over the Internet for fetching content from the web server to the client device using multiple TB servers.

In the messaging chart 190*b* shown in FIG. 19*b*, and in the messaging chart 130 shown in FIG. 13, a single TB server 71 is used. However, multiple TB servers may equally be used, such as for load balancing or for performance optimization. In one example, the tunnel list 73, such as in the form of a table 100, is split among multiple databases stored in, or connected to, multiple servers using database sharding. Such an arrangement is shown in a messaging chart 230 shown in FIG. 23, which is based on the corresponding messaging chart 130. In addition to the TB server 71, a TB server 71*a* and a TB server 71*b* are connected to the Internet and may be used. While three TB servers are exampled in FIG. 23, two, four, five, or any other number of TB servers may equally be used. The messaging chart 230 examples the SP server 72 selecting the TB server 71*a*, rather than using the TB server 71 as shown in the messaging chart 130. Similar to the former described operation, the SP server 72 forward a request to the TB server 71*a* over a message path 131*a*1, and the TB server 71*a* may in turn select the tunnel device #4 33*d*, and send a message to it over a message path

Figure 23A:
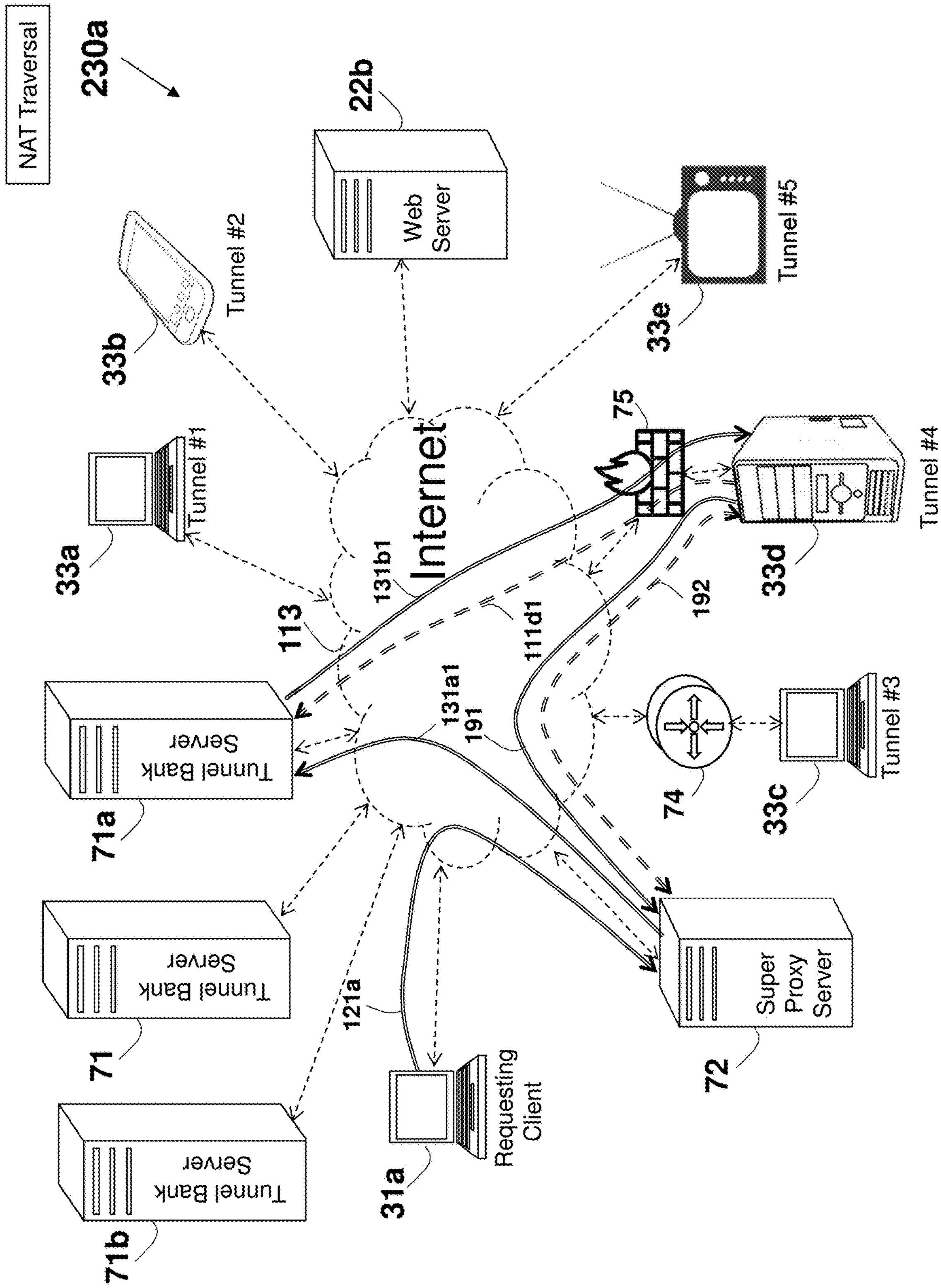

131*b*1, followed by establishing of the connection 111*d*1. Similarly, an arrangement employing multiple TB servers is shown in a messaging chart 230*a* shown in FIG. 23*a*, which is based on the corresponding messaging chart 190*b*, where the TB server 71*a* is used instead of the TB server 71.

Each of the TB servers may execute the flow chart 140 shown in FIG. 14 or the flow chart 200 shown in FIG. 20, and may store a table including tunnel devices, in the form, of the table 100. Preferably, load balancing is achieved where the total available tunnel devices (or IP addresses) are split, such as evenly, between the available TB servers. For example, one third of the available tunnel devices may be associated with the TB server 71, another third with the TB server 71*a*, and the rest third with the TB server 71*b*. Preferably, the allocation of tunnel devices (or IP addresses) between the available TB servers may be based on an attribute type, such as the attribute types described associated with the different tunnel devices. In one example, a geographical location may be used. The various TB servers may be located geographically distributed around the world, and tunnel devices are allocated based on their perspective geographical location, either actual location or IP location. For example, tunnel devices may be allocated to respective TB servers based on their continent, country, region or state, or city. For example, one TB server, such as the TB server 71, may be located in Europe, handling all tunnel devices having an actual geographical location, or IP geolocation, within Europe, such as in Germany or France, a second TB server, such as the TB server 71*a*, may be located in North America, handling all tunnel devices having an actual geographical location, or IP geolocation, within North America, such as in U.S.A. or Canada, and a third TB server, such as the TB server 71*b*, may be located in Asia, handling all tunnel devices having an actual geographical location, or IP geolocation, within Asia such as in China or Russia. In such a case, the SP server 72 may select the appropriate TB server to use based on the attribute value received from the requesting client 31*a* over the message path 121*a*, as part of the "Receive Request from Client" step 151.

Figure 24:
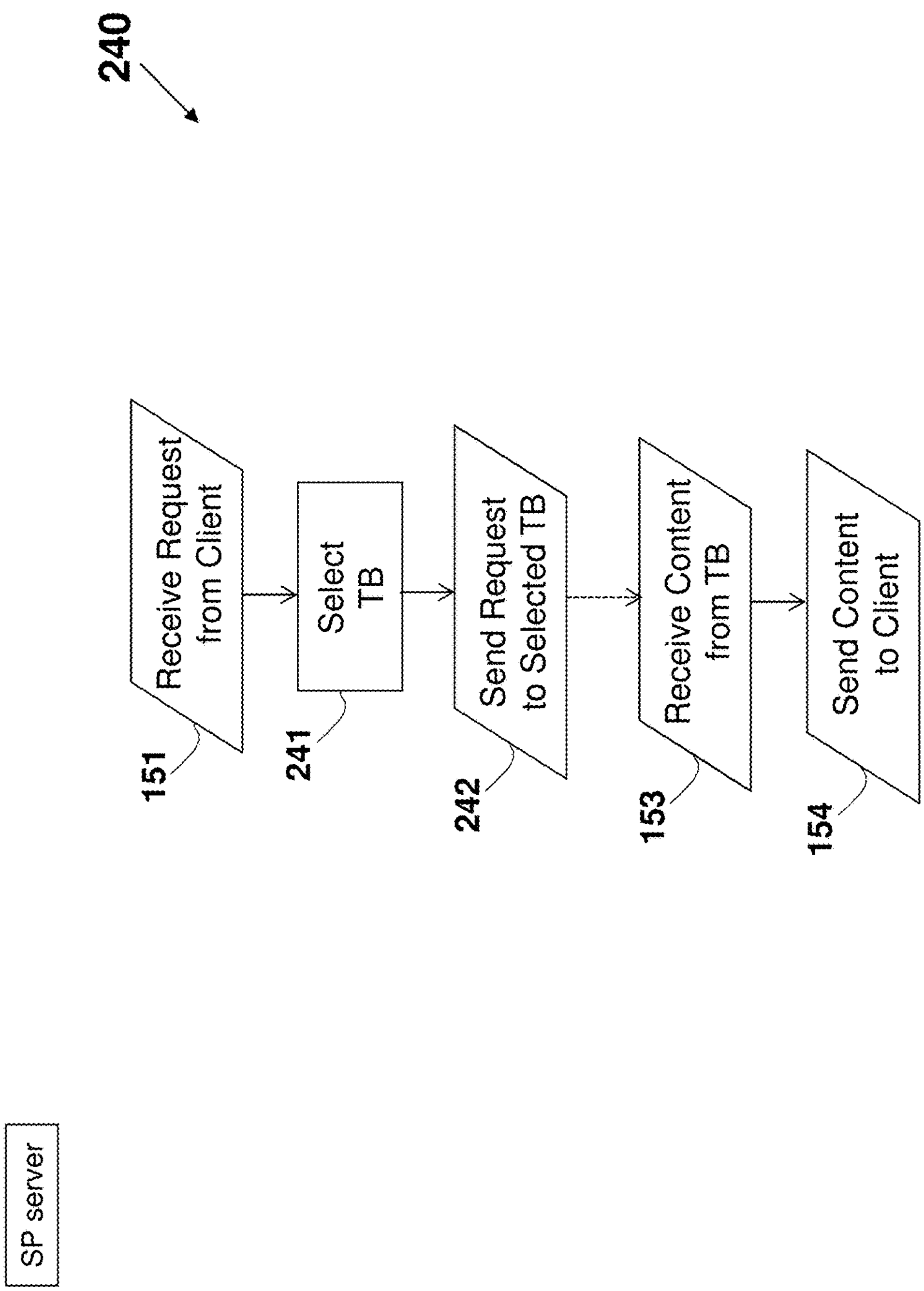
FIGS. 24 and 24*a* illustrate schematically simplified flowcharts relating to a SP server using multiple TB servers.
Figure 24A:
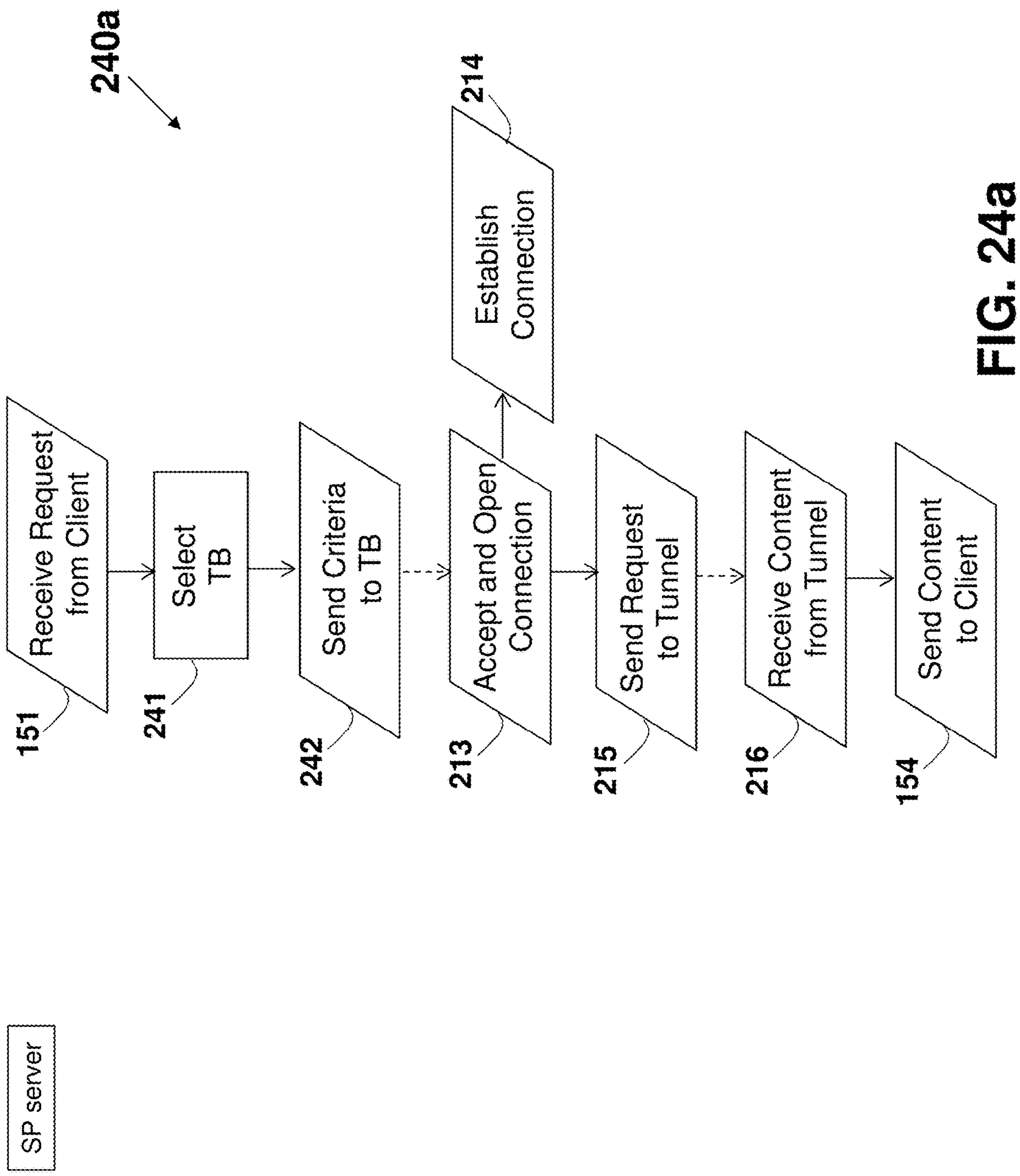

An SP server 72 operation in the case of multiple TB servers arrangement is described in a flow chart 240 shown in FIG. 24, which is based on the corresponding flow chart 150 shown in FIG. 15. As part of a "Select TB" step 241, a specific TB server, such as the TB server 71*a* in the example of the messaging chart 230, is selected, and the operation continues with working with this selected TB server, such as in a "Send Request to Selected TB" step 242. Similarly, an SP server 72 operation in the case of multiple TB servers arrangement is described in a flow chart 240*a* shown in FIG. 24*a*, which is based on the corresponding flow chart 210 shown in FIG. 21. As part of the "Select TB" step 241, a specific TB server, such as the TB server 71*a* in the example of the messaging chart 230, is selected, and the operation continues with working with this selected TB server, such as in the "Send Request to Selected TB" step 242. The TB server may be randomly selected, as part of the "Select TB" step 241, or may be based on an attribute value received from the client device 31*a*, such as geographical location.

Figure 24B:
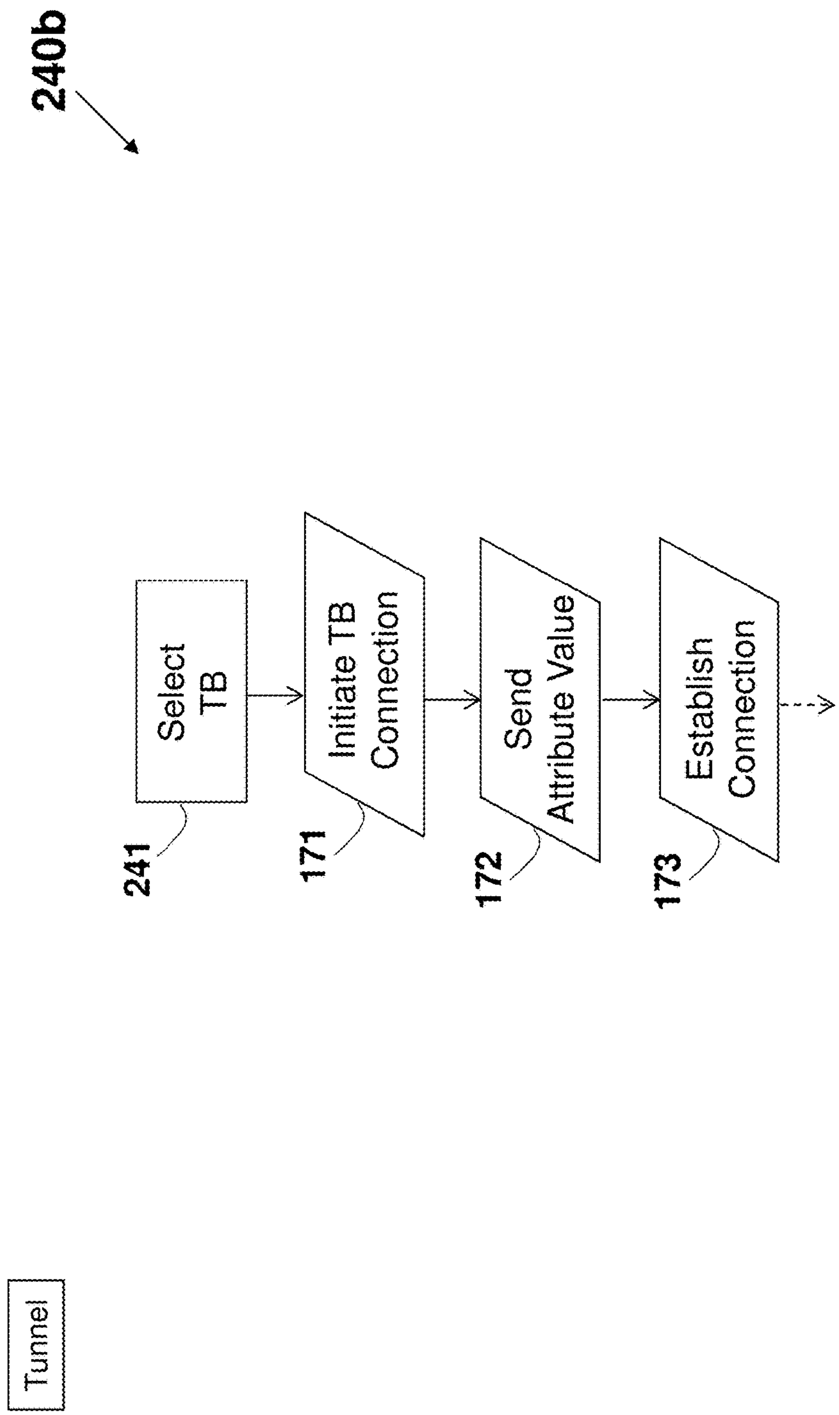
FIGS. 24*b* and 24*c* illustrate schematically simplified flowcharts relating to a tunnel device using multiple TB servers.
Figure 24C:
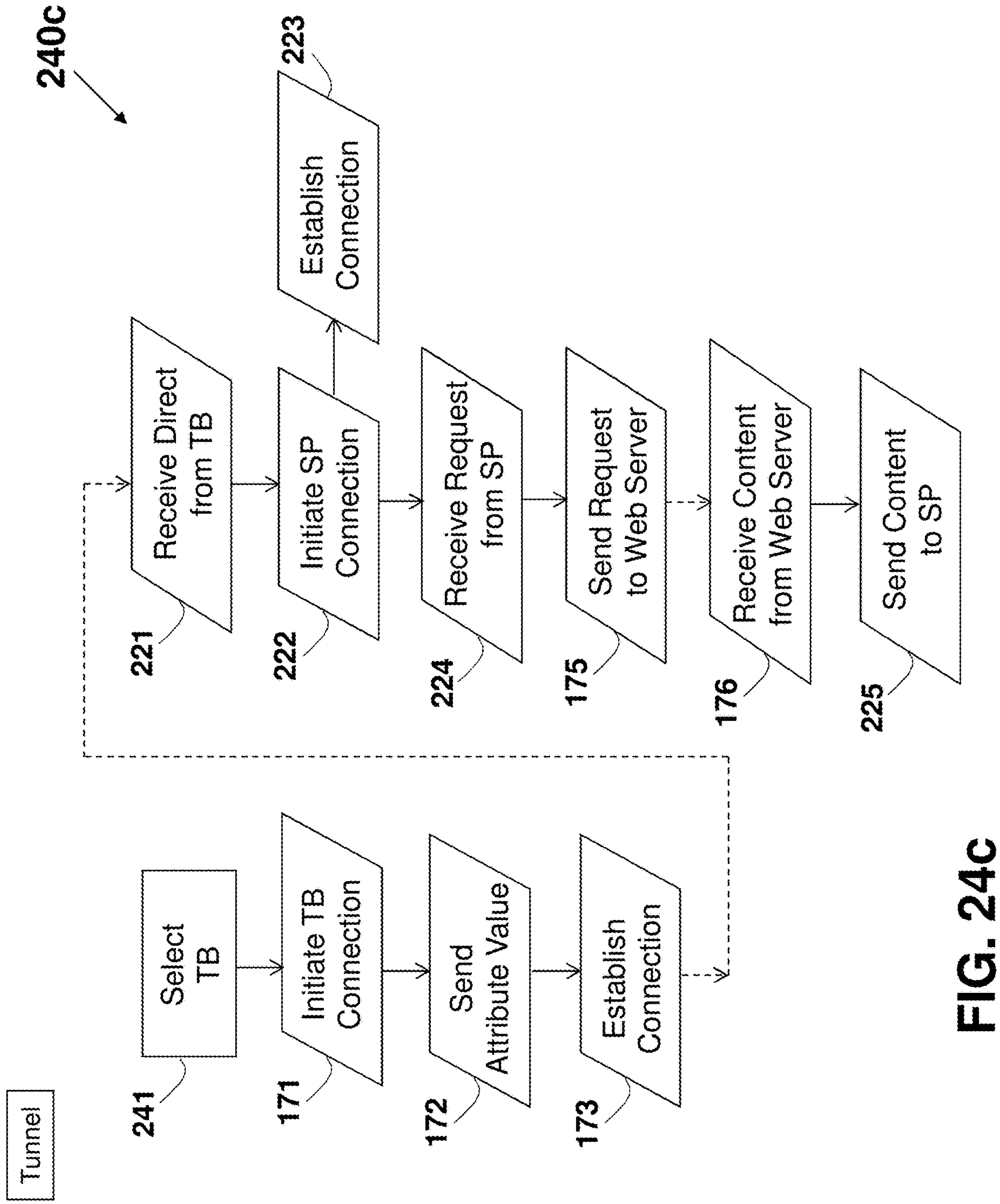

A tunnel device operation, such as the elected tunnel device #4 33*d*, in the case of multiple TB servers arrangement is described in a flow chart 240*b* shown in FIG. 24*b*, which is based on the corresponding flow chart 170 shown in FIG. 17. As part of a "Select TB" step 241, a specific TB server, such as the TB server 71*a* in the example of the messaging chart 230, is selected, and the operation continues with working with this selected TB server, such as in an "Initiate TB Connection" step 171. Similarly, a tunnel device operation in the case of multiple TB servers arrangement is described in a flow chart 240*c* shown in FIG. 24*c*, which is based on the corresponding flow chart 220 shown in FIG. 22. As part of the "Select TB" step 241, a specific TB server, such as the TB server 71*a* in the example of the messaging chart 230, is selected, and the operation continues with working with this selected TB server, such as in the "Initiate TB Connection" step 171. The TB server may be randomly selected, as part of the "Select TB" step 241, or may be based on an attribute value received from the client device 31*a*, such as geographical location.

Figure 25:
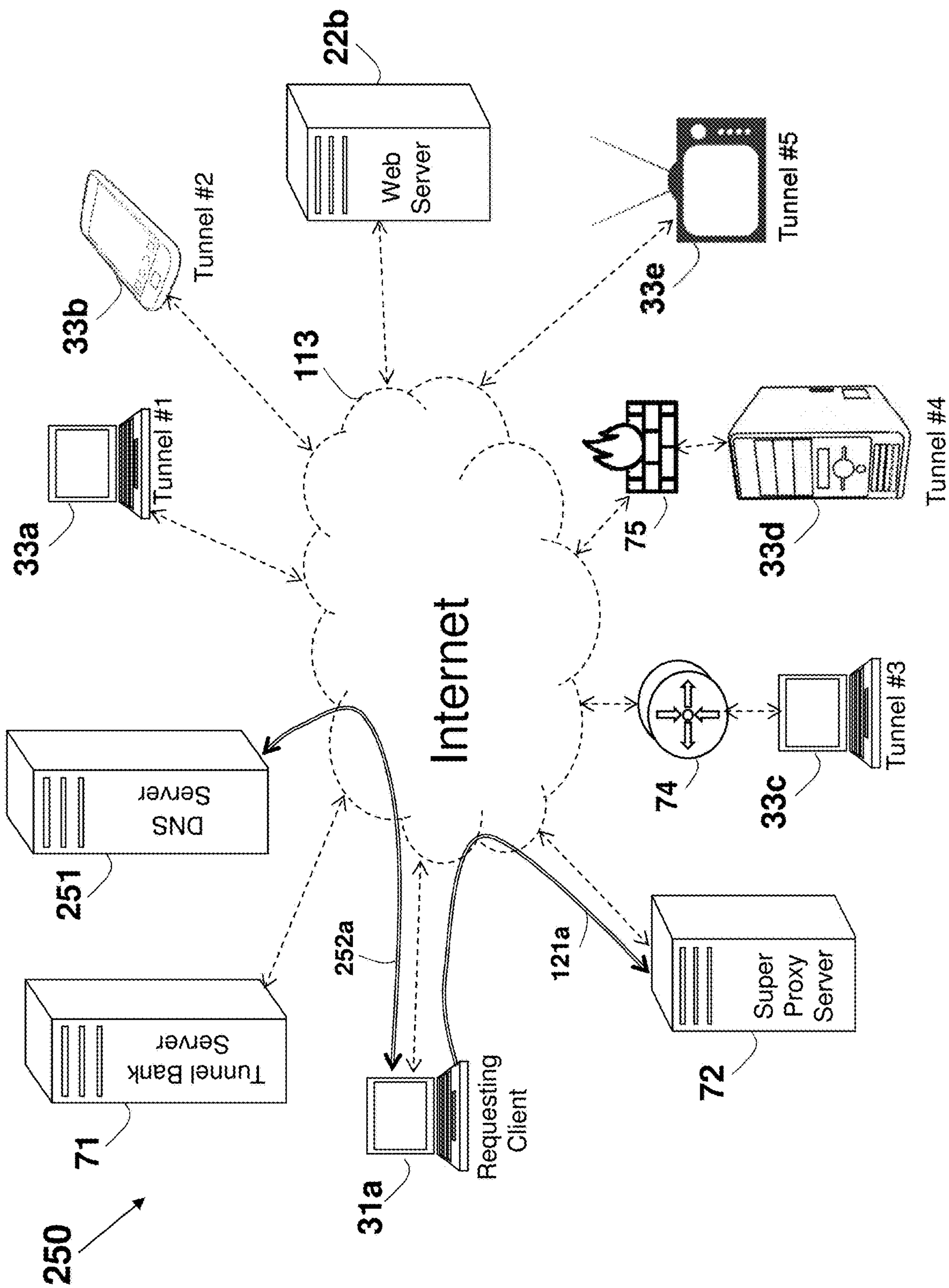
FIGS. 25 and 25*a* depict schematically messages exchanged over the Internet including a DNS resolution by the client device.
Figure 25A:
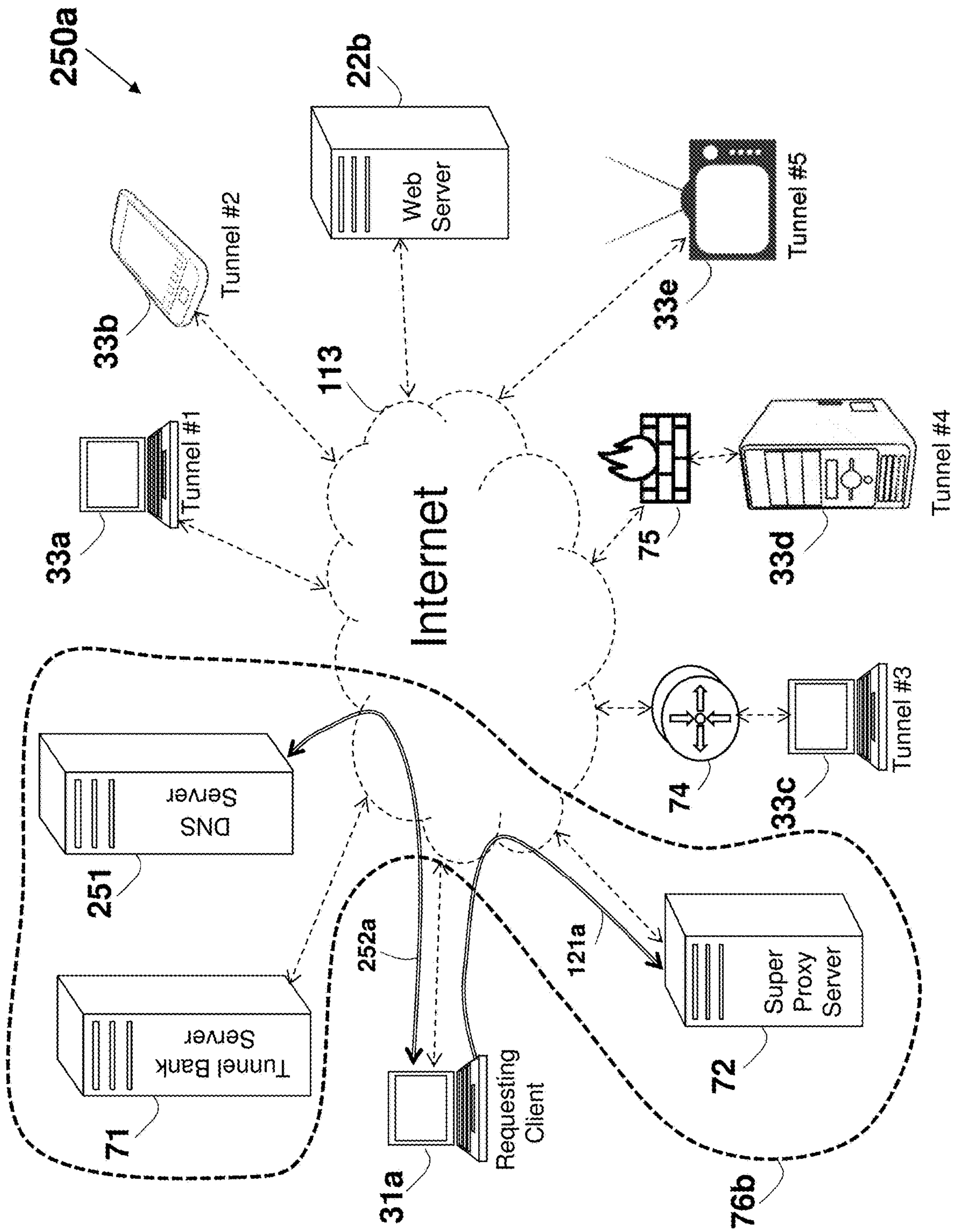
Figure 26:
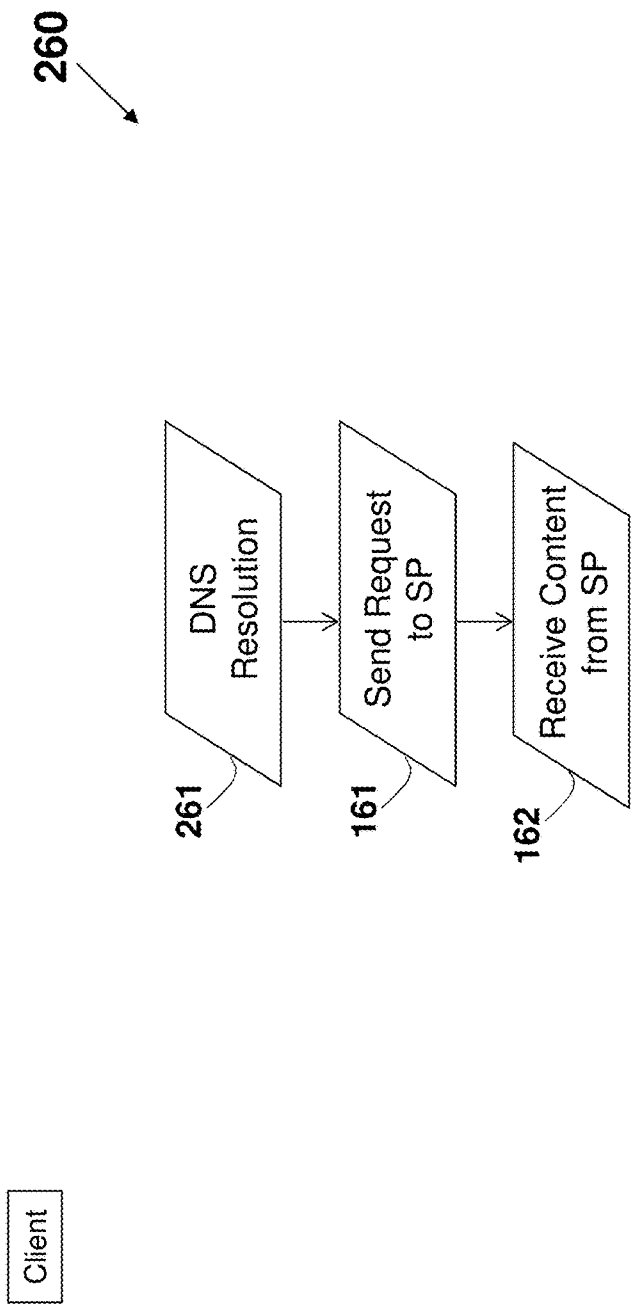
FIG. 26 illustrates schematically a simplified flowchart relating to a client device that includes a DNS resolution.

In one example, a DNS resolution is required for fetching the content from the web server 22*b*. In one example, the DNS resolution is performed by the requesting client 31*a*, as illustrated in a messaging chart 250 shown in FIG. 25. Before requesting the content from the SP server 72, the client device 31*a* uses a DNS server 251 for a DNS resolution, shown as a message path 252*a*. Then, the request sent to the SP server 72 over the message path 121*a* includes the resolution result, so there is no need for any DNS activity afterwards. Any DNS server may be used as the DNS server 251 by the client device 31*a*. In one example, a specific DNS server 251 is used, which is operated, controlled, or managed by an entity 76*b* as illustrated in a messaging chart 250*a* shown in FIG. 25*a*, which also operates, controls, or manage the TB server 71 and the SP server 72. This entity 76*b* may be the same entity as the entity 76*a* (or 76) described above. The client device 31*a* operation, including a "DNS Resolution" step 261 is described in a flow chart 260 shown in FIG. 26, which is based on the corresponding flow chart 160 shown in FIG. 16.

Figure 27:
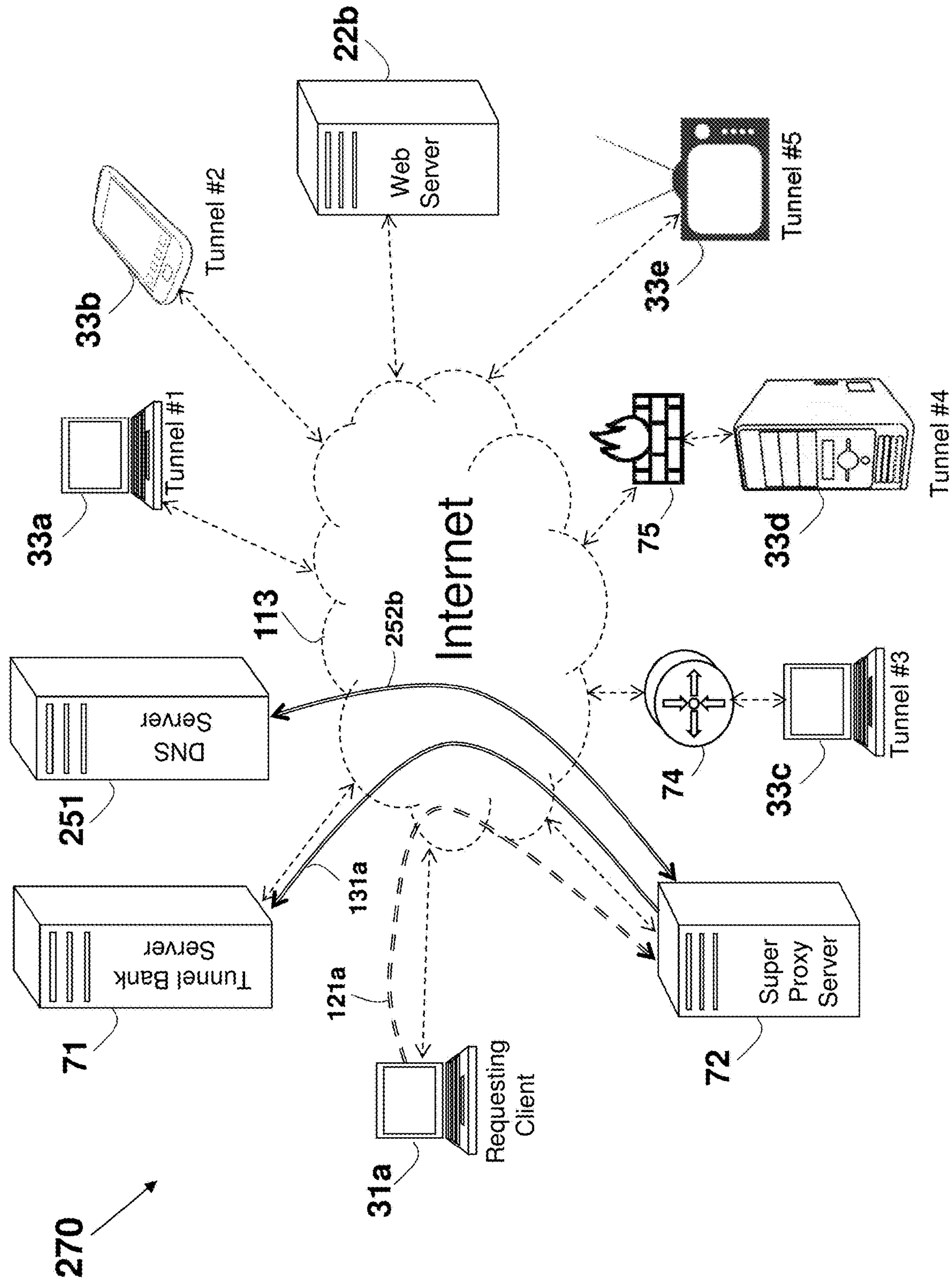
FIG. 27 depicts schematically messages exchanged over the Internet including a DNS resolution by the SP server.
Figure 28:
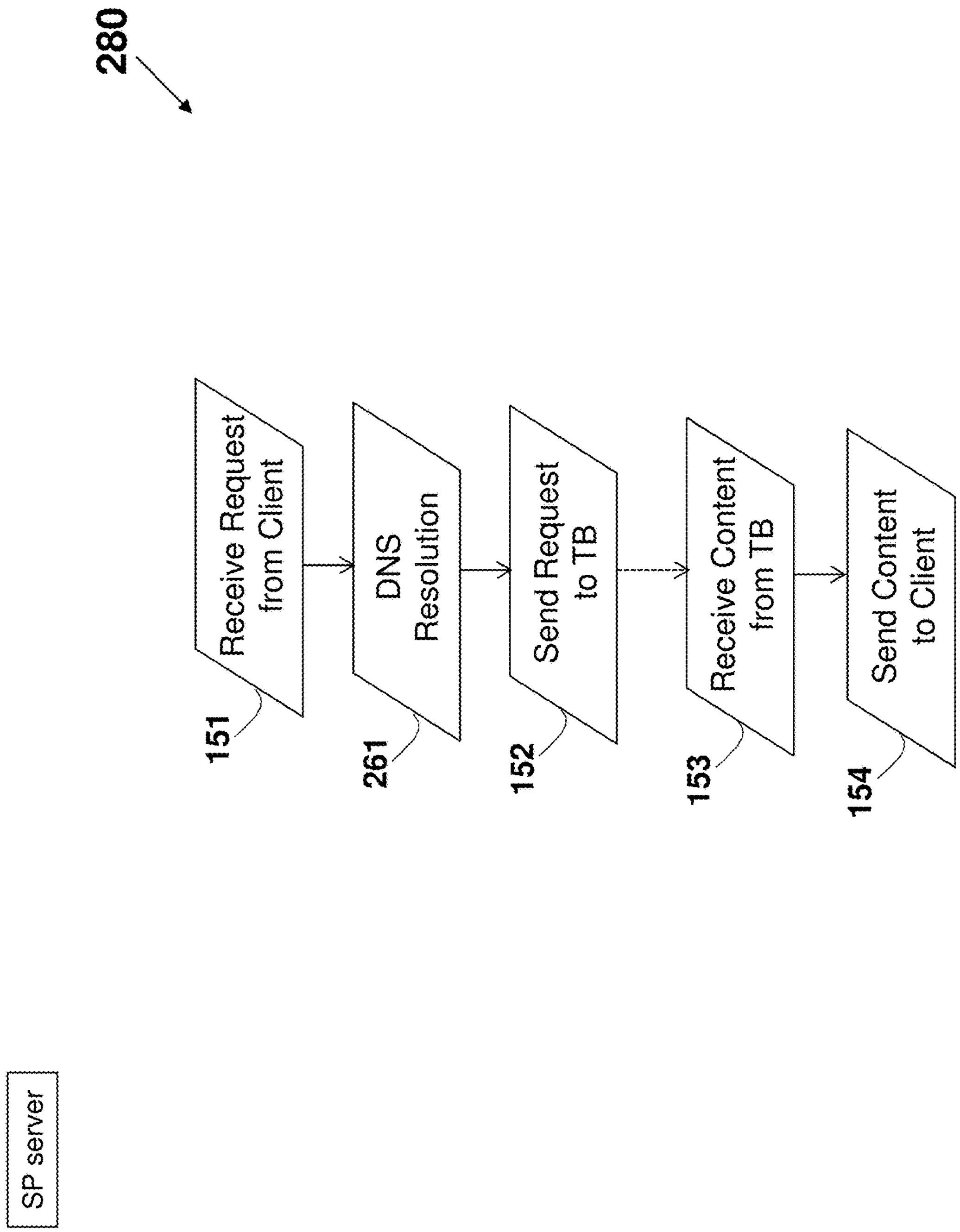
FIGS. 28 and 28*a* illustrate schematically simplified flowcharts relating to the SP server that includes a DNS resolution.
Figure 28A:
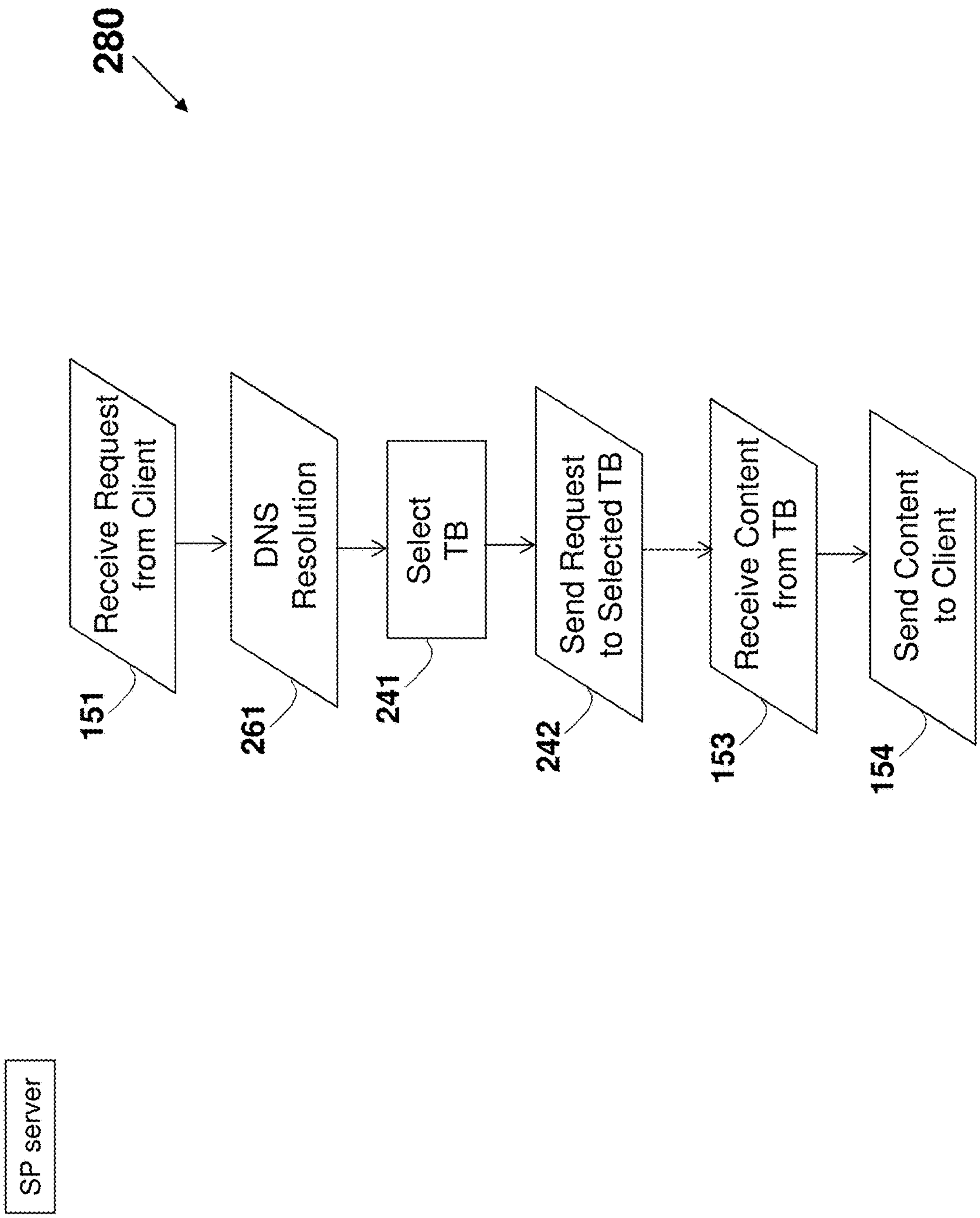

Alternatively or in addition, the DNS resolution may be performed by the SP server 72, as illustrated in a messaging chart 270 shown in FIG. 27. Before requesting for a tunnel device allocation or the content from the TB server 71, the SP server 72 use a DNS server 251 for a DNS resolution, shown as a message path 252*b*. Then, the request that is sent to the selected tunnel device includes the resolution result, so there is no need for any DNS activity afterwards. The SP server 72 operation, including a "DNS Resolution" step 261 is described in a flow chart 280 shown in FIG. 28, which is based on the corresponding flow chart 150 shown in FIG. 15. Alternatively or in addition, the SP server 72 operation, including a "DNS Resolution" step 261 may be as described in a flow chart 280*a* shown in FIG. 28*a*, which is based on the corresponding flow chart 240 shown in FIG. 24.

Figure 29:
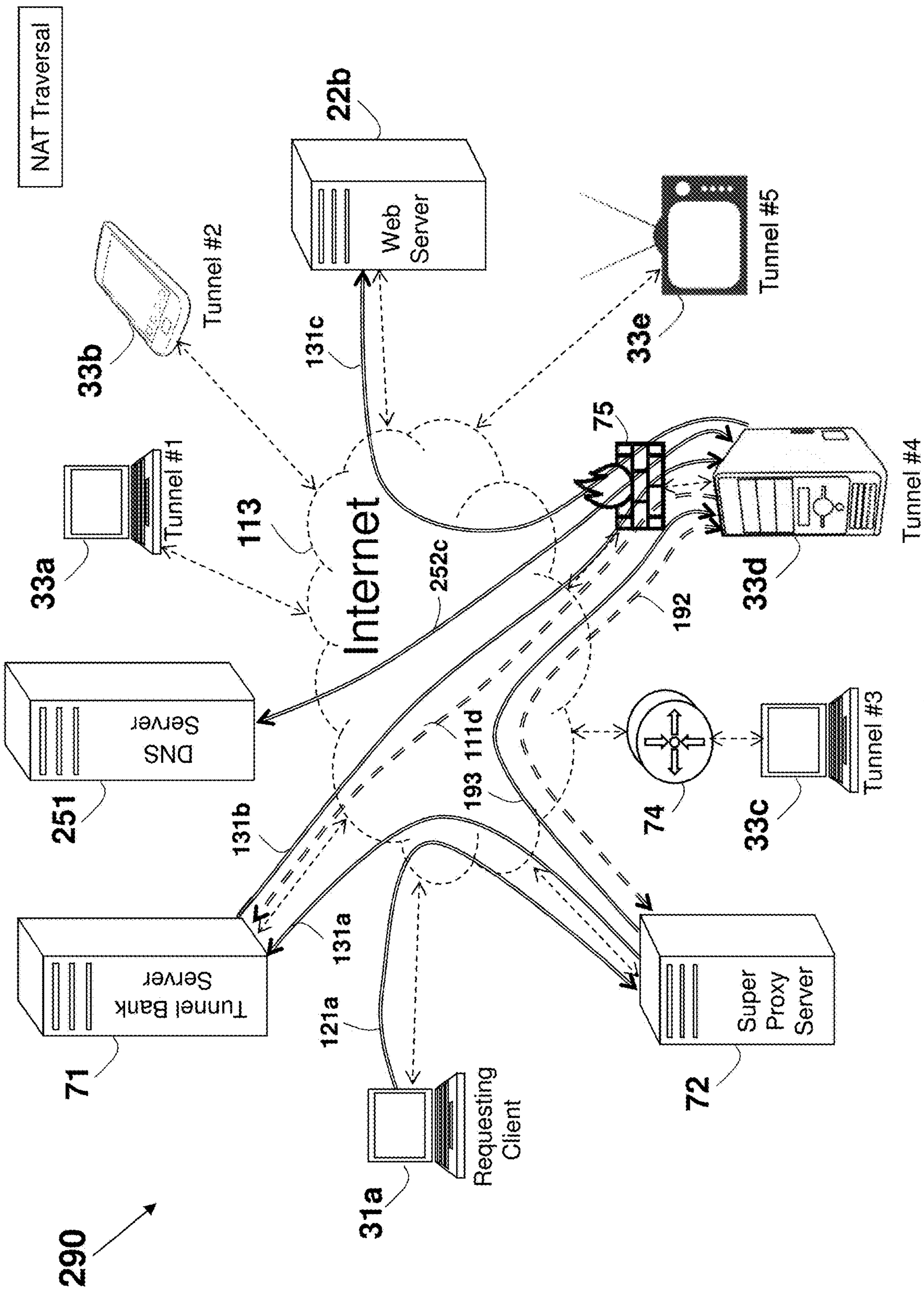
FIG. 29 depicts schematically messages exchanged over the Internet including a DNS resolution by the selected tunnel device.
Figure 30:
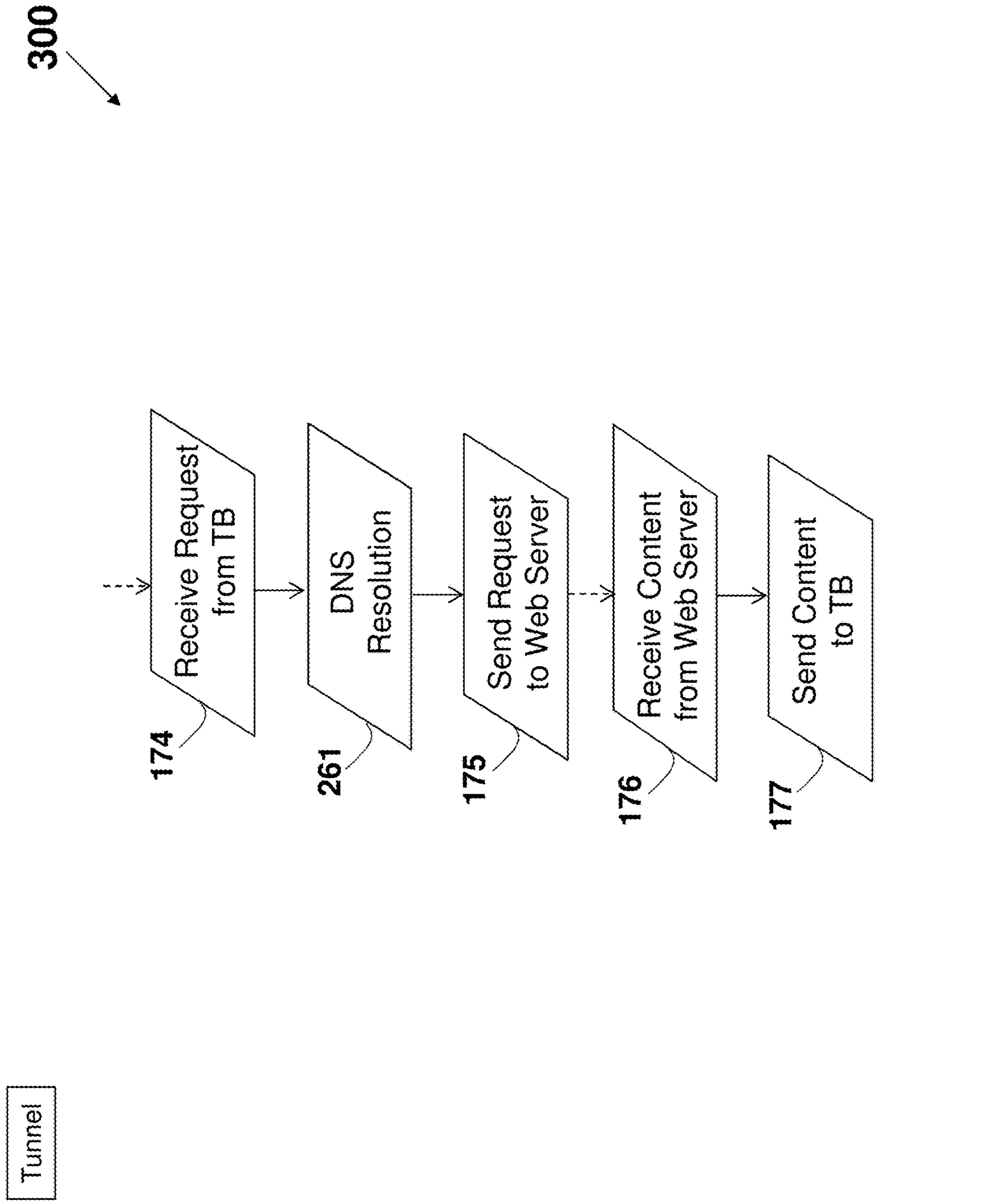
FIGS. 30 and 30*a* illustrate schematically simplified flowcharts relating to the selected tunnel device that includes a DNS resolution.
Figure 30A:
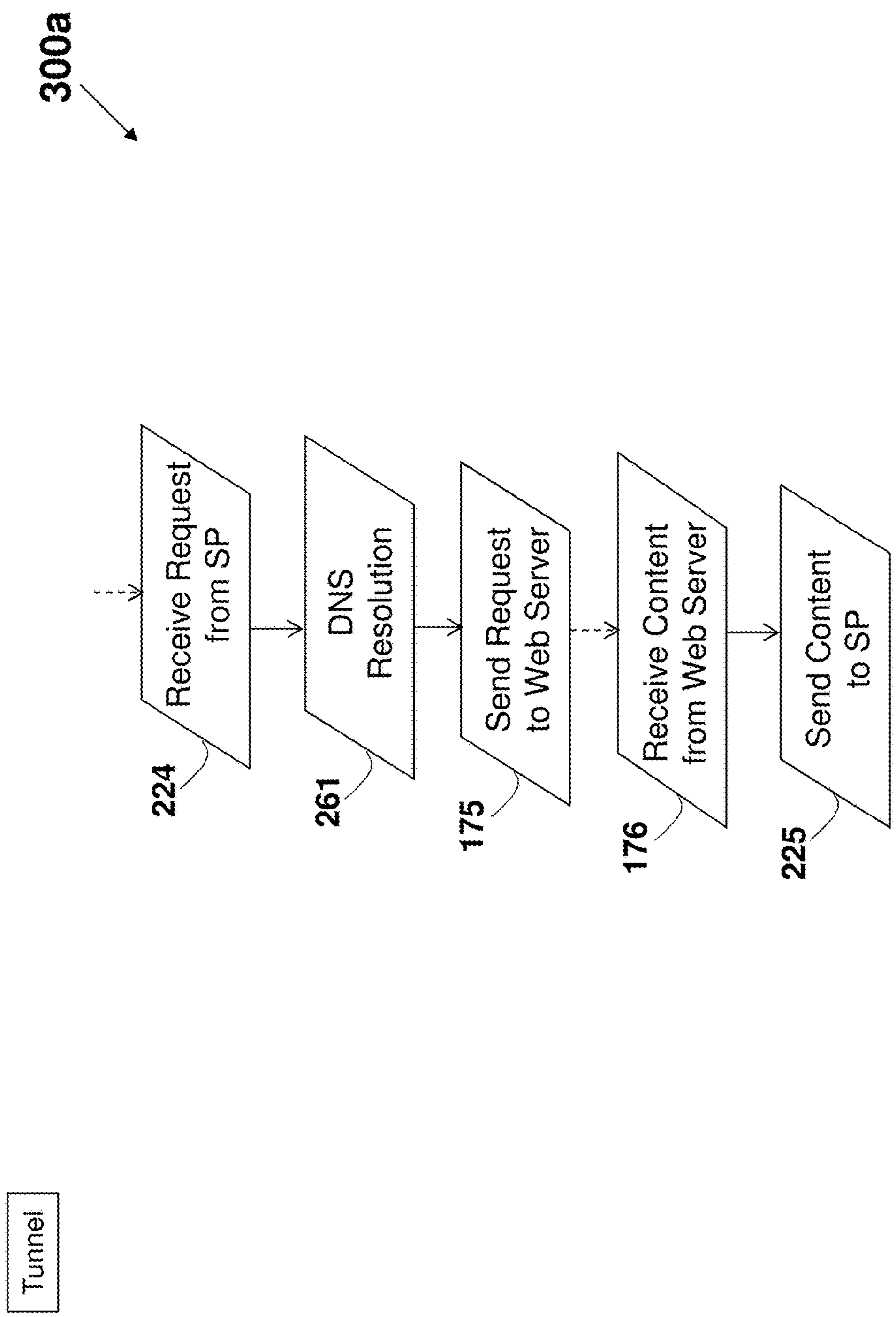

Alternatively or in addition, the DNS resolution may be performed by the selected tunnel device, such as the tunnel device #4 33*d*, as illustrated in a messaging chart 290 shown in FIG. 29. Before requesting the content from the web server 22*b*, the tunnel device #4 33*d* use a DNS server 251 for a DNS resolution, shown as a message path 252*c*. Then, the request that is sent to the web server 22*b* includes the resolution result. The tunnel device #4 33*d* operation, including a "DNS Resolution" step 261 is described in a flow chart 300 shown in FIG. 30, which is based on the corresponding flow chart 170 shown in FIG. 17. Alternatively or in addition, the tunnel device #4 33*d* operation, including a "DNS Resolution" step 261 may be as described in a flow chart 300*a* shown in FIG. 30*a*, which is based on the corresponding flow chart 220 shown in FIG. 22.

Figure 18:
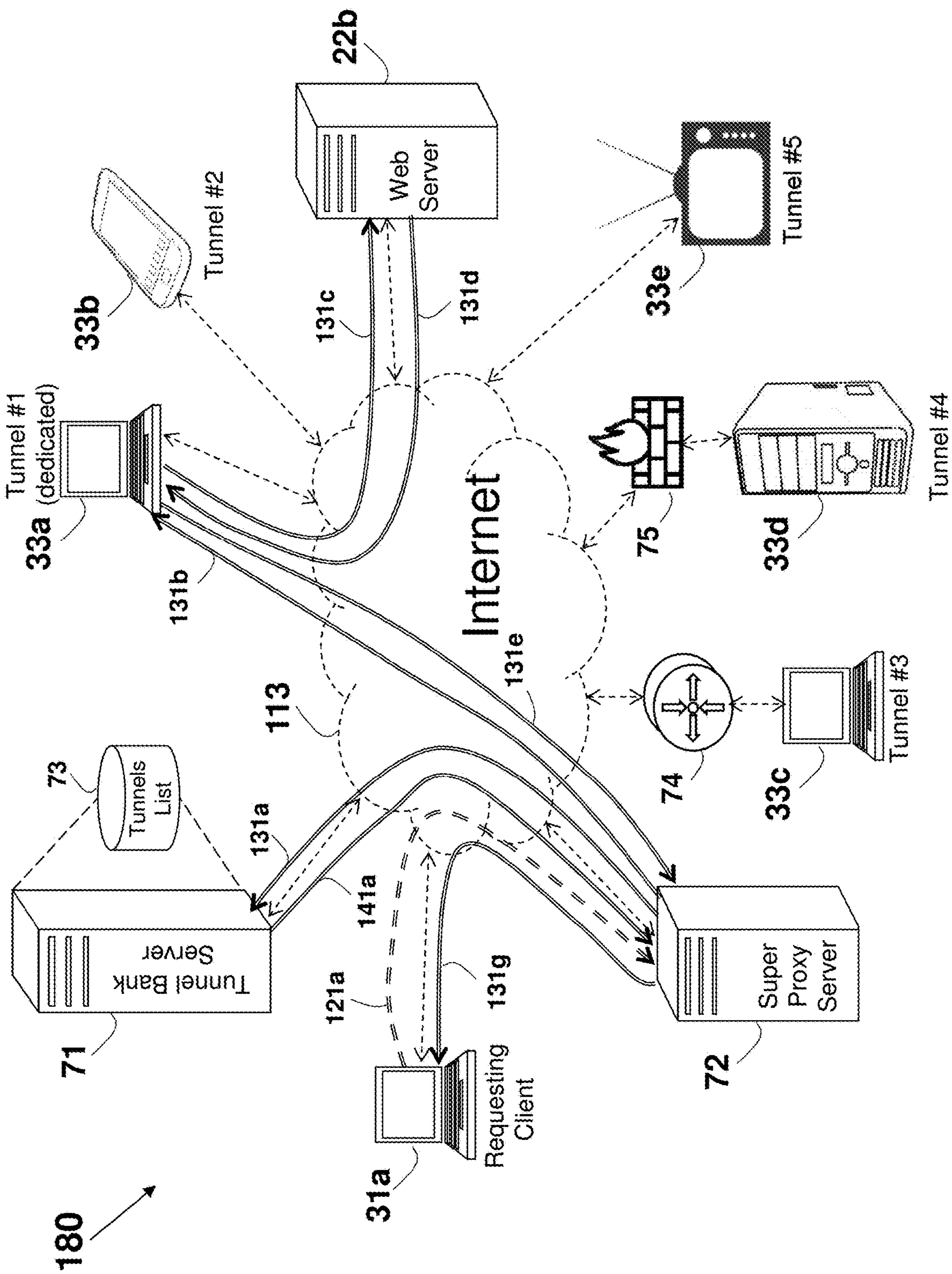
FIGS. 18 and 18*a* depicts schematically messages exchanged over the Internet for fetching content from the web server to the client device via a dedicated tunnel device, the TB server, and the SP server.
Figure 18A:
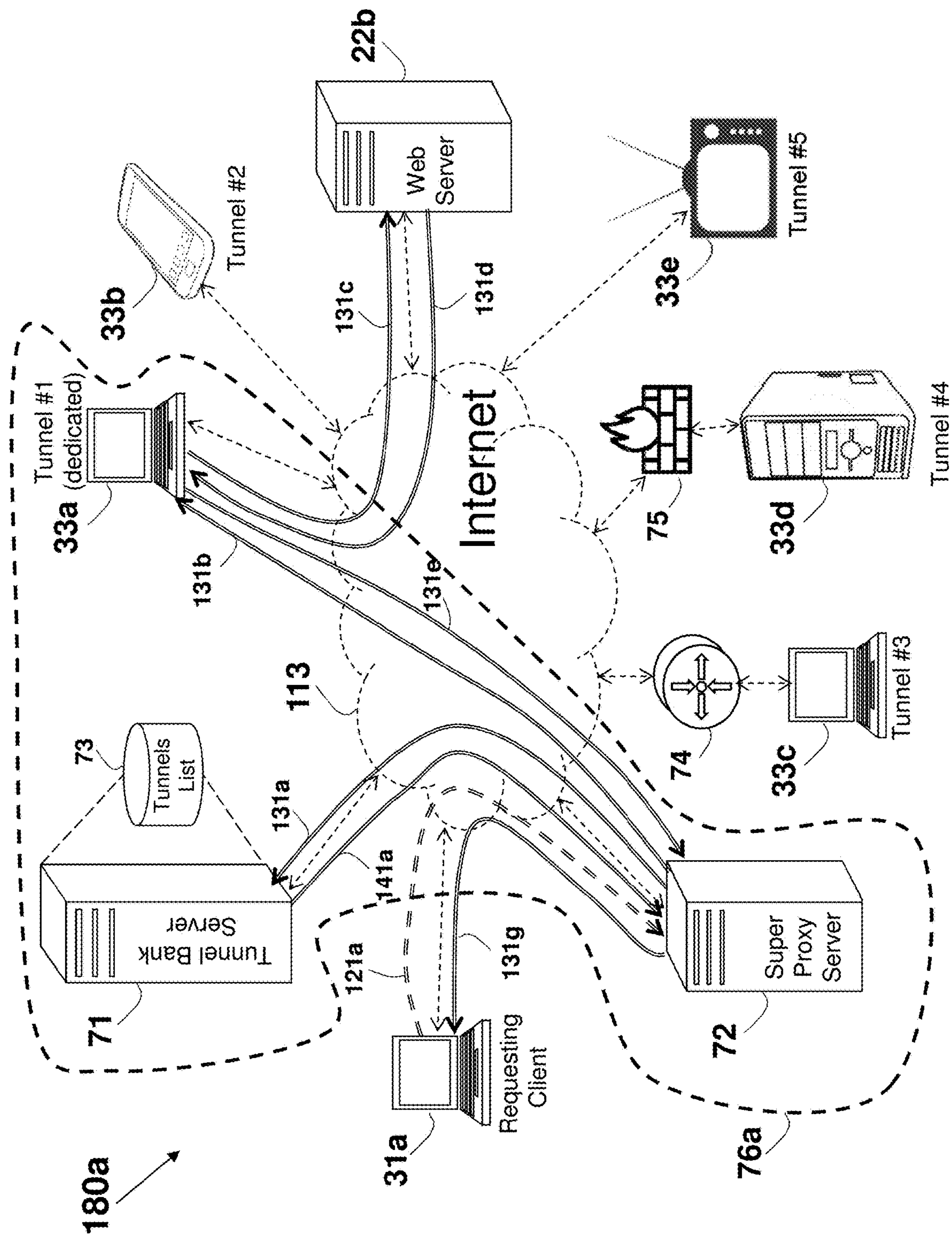

In the example of the messaging chart 180 shown in FIG. 18 above, the tunnel #1 33*a* was described as a dedicated device, which is primarily installed and used to serve as a tunnel device, or as concurrent multiple tunnel devices, each associated with a different IP address. However, one or more of the tunnel devices may be non-dedicated ones, where their primary functionality or use is other than serving as a tunnel device. For example, the device may be intended to be owned, controlled, or used by a human operator, for various functionalities. In one example, the main functionality may be to serve as a smartphone, such as for making telephone call over a cellular network, as exampled in the tunnel #2 33*b*. In such a case, the tunnel functionality is associated with lower priority compared to other tasks or functionalities performed by the device. Furthermore, it is preferred that the tunnel functionality does not affect in any way, the primary functions of the device, and will not interfere or degrade any other task of functionality provided by the device. Preferably, the tunnel related functionality will be operated only when the device is idling, such as not providing any current service or performing any task of interaction with the human user, preferably so the effect of performing any tunnel functionality is hardly or not noticed in any way by the human operator.

As used herein, the term "idle state" is used to refer to a state in which a device and/or one or more resources of the device are not being used to perform operations considered to be of a sufficiently high priority, or device resources are not being used at a level of intensity, that the operations should not be interrupted or competed with by, or such resources should not be diverted to any extent to, one or more relatively lower priority operations. In one example, 'idle state' refers to a state where the human user is not interacting with the device, and hence is not aware of any interfering with any process or task performed. The term "idle condition" is used in connection with some embodiments to refer to a condition that indicates whether and/or an extent to which the device has entered and/or exited such an idle state. Preferably, a tunnel device performs its tunnel related tasks only when in the idle state, so that the human user or operator is not affected by, or aware of, the tunnel related activity.

Figure 31:
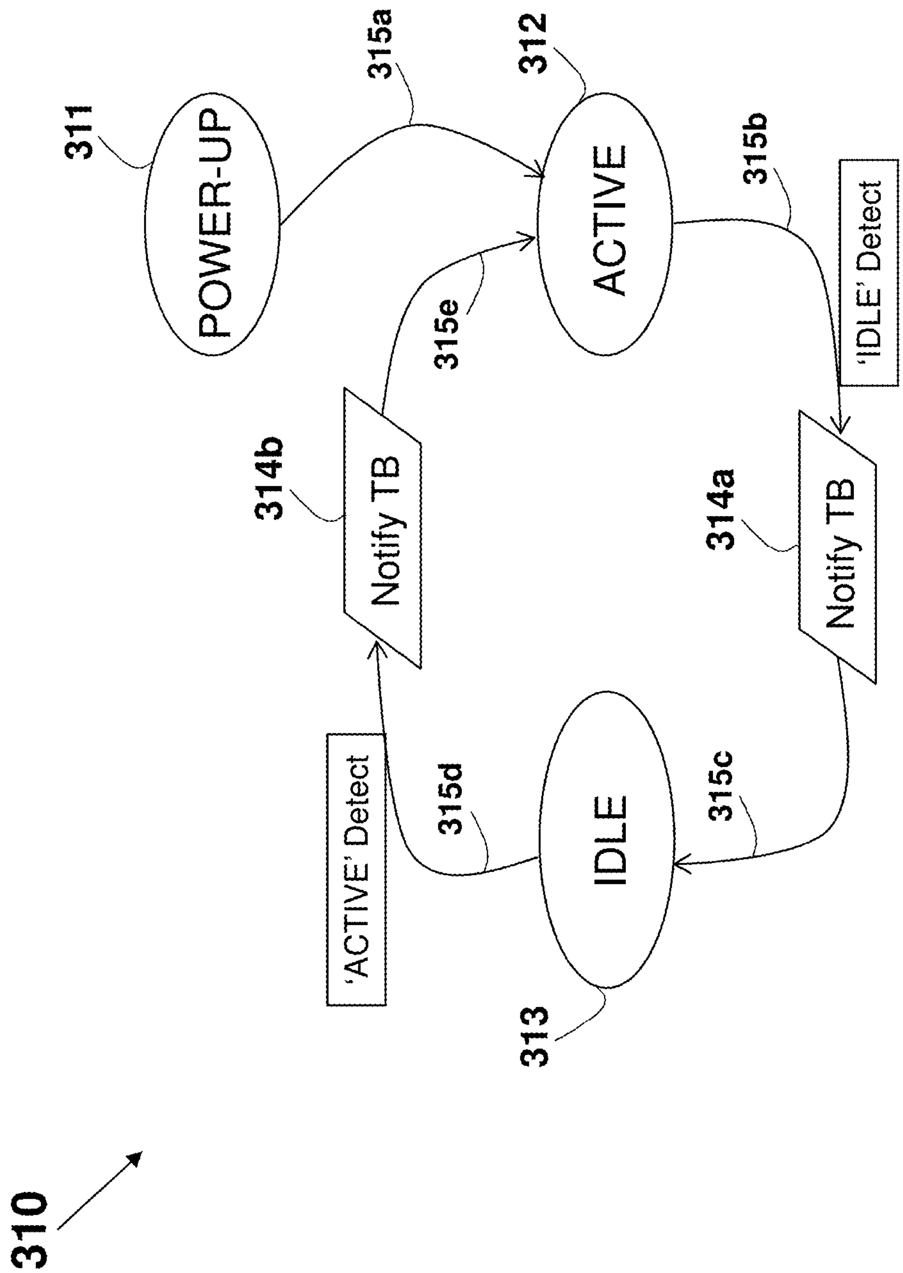
FIG. 31 depicts schematically a state diagram of a tunnel device as determined by the tunnel device itself.

An example of a state diagram 310 of a tunnel device, such as the tunnel #2 33*b*, the tunnel #3 33*c*, the tunnel #4 33*d*, or the tunnel #5 33*e*, is shown in FIG. 31. Upon powering the device, a POWER-UP state 311 is established, during which the computerized system is initialized, such as by booting the operating system and connecting to the Internet. Upon completing the POWER-UP 311 sequence, when normal, operative, runtime environment is attained, and the device may provide its primary functions or functionalities, the device shifts (shown as a line 315*a*) to an 'ACTIVE' state 312, and stays in this state as long as the primarily functions or tasks are used. During the 'ACTIVE' state 312, an idle condition is continuously monitored, and when such idle condition is detected (shown as an 'IDLE' Detect line 315*b*), the device sends a message to the TB server 71 regarding entering an 'IDLE' state 313 in the "Notify TB" step 314*a*, such as by using the established connection 111*d*, which is followed (shown as a line 315*c*) by entering the 'IDLE' state 313. Preferably, the tunnel device is selected by the TB server 71 (as part of the "Select Tunnel" step 146) during the 'IDLE' state 313, allowing for minimum intervention or interfering with the primary tasks and functionalities of the tunnel device.

In one example, the tunnel device connects to the TB server 71 as part of the "Initiate TB Connection" step 171, sends the attribute value as part of the "Send Attribute Value" step 172, and establishes the TCP connection as part of the "Establish Connection" step 173 immediately after completing the POWER UP state 311, as part of the shift to the ACTIVE state 312 shown as the shift line 315*a*. However, in such a case, the tunnel device may not be selected by the TB server 71 as part of the "Select Tunnel" step 146 as long as the tunnel device has not notified the TB server 71 in the "Notify TB" step 314*a* that is in the IDLE state 313. In such a case, the status of the available tunnel devices is stored in the TB server 71, in a form of table 330 shown in FIG. 33, which is based on the table 100 shown in FIG. 10. An 'IDLE' column 102*i* id added, denoting by 'Y" if the respective tunnel device is in the 'IDLE' state 313, and 'N' if the respective tunnel device is not in the 'IDLE' state 313, such as in the 'ACTIVE' state 312. Upon receiving a message of shifting to IDLE state 313 by the "Notify TB" step 314*a*, the TB server 71 changes the respective value in the IDLE column 102*i* to 'Y'. Preferably, the TB server 71 selects a tunnel that is in the 'IDLE' state 313, as noted by the respective value 'Y' in the IDLE column 102*i*, such as from the tunnel devices associated with the first row 101*a*, the fourth row 101*d*, the fifth row 101*e*, and the seventh row 101*g* in the example of the modified table 330.

During the 'IDLE' state 313, an idle condition is continuously monitored, and when such idle condition is not met (shown as an 'ACTIVE' Detect line 315*d*), the device sends a message to the TB server 71 regarding entering an 'ACTIVE' state 312 in the "Notify TB" step 314*b*, such as by using the established connection 111*d*, which is followed (shown as a line 315*e*) by re-entering the 'ACTIVE' state 312. Upon receiving a message of shifting to ACTIVE state 312 by the "Notify TB" step 314*b*, the TB server 71 changes the respective value in the IDLE column 102*i* to 'N'. Preferably, the TB server 71 does not selects a tunnel that is in the 'IDLE' state 313, as noted by the respective value 'N' in the IDLE column 102*i*, such as from the tunnel devices associated with the second row 101*b*, the third row 101*c*, and the sixth row 101*f* in the example of the modified table 330.

Figure 32:
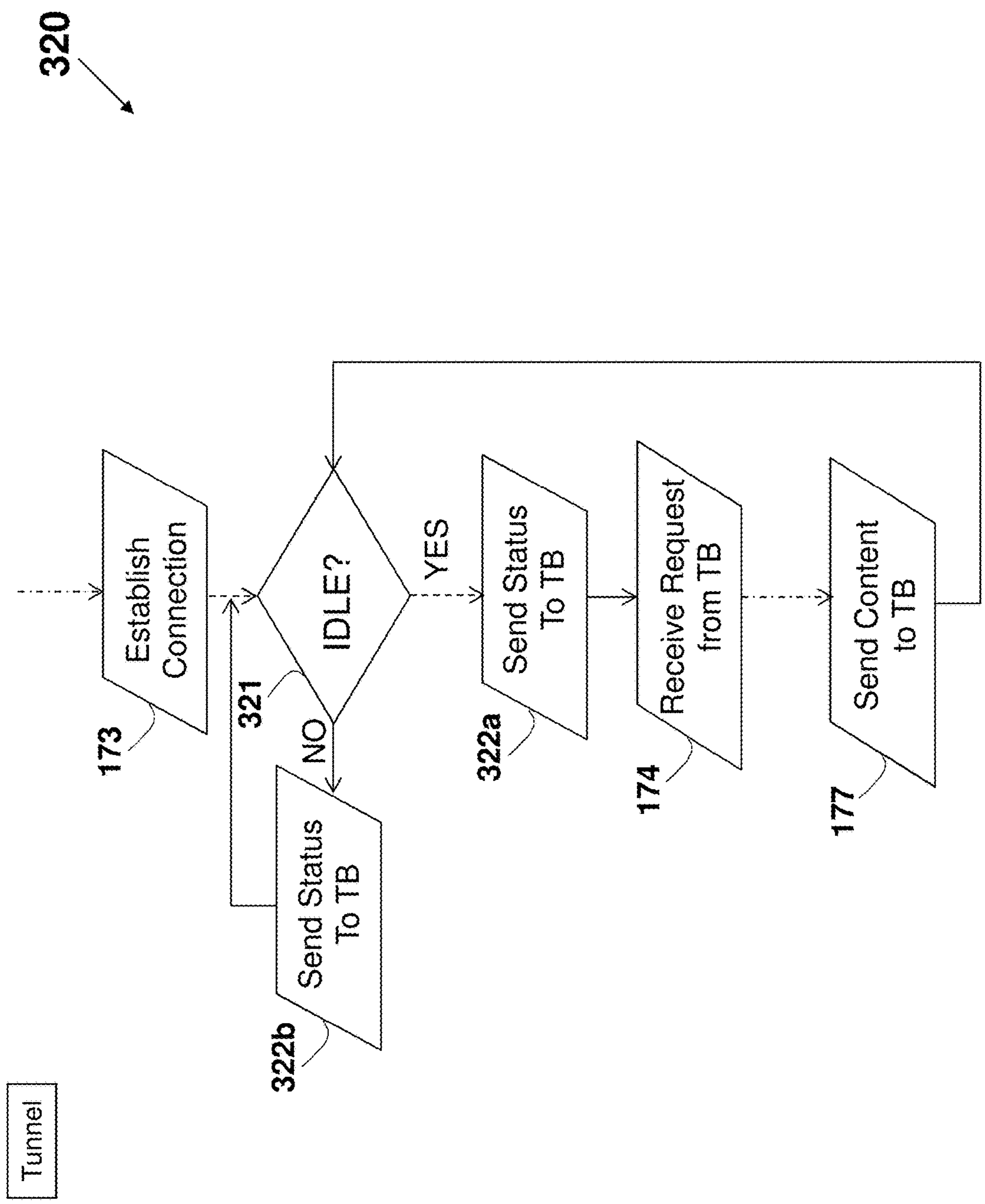
FIGS. 32 and 32*a* illustrate schematically simplified flowcharts relating to a tunnel device associated with an idle state.
Figure 32A:
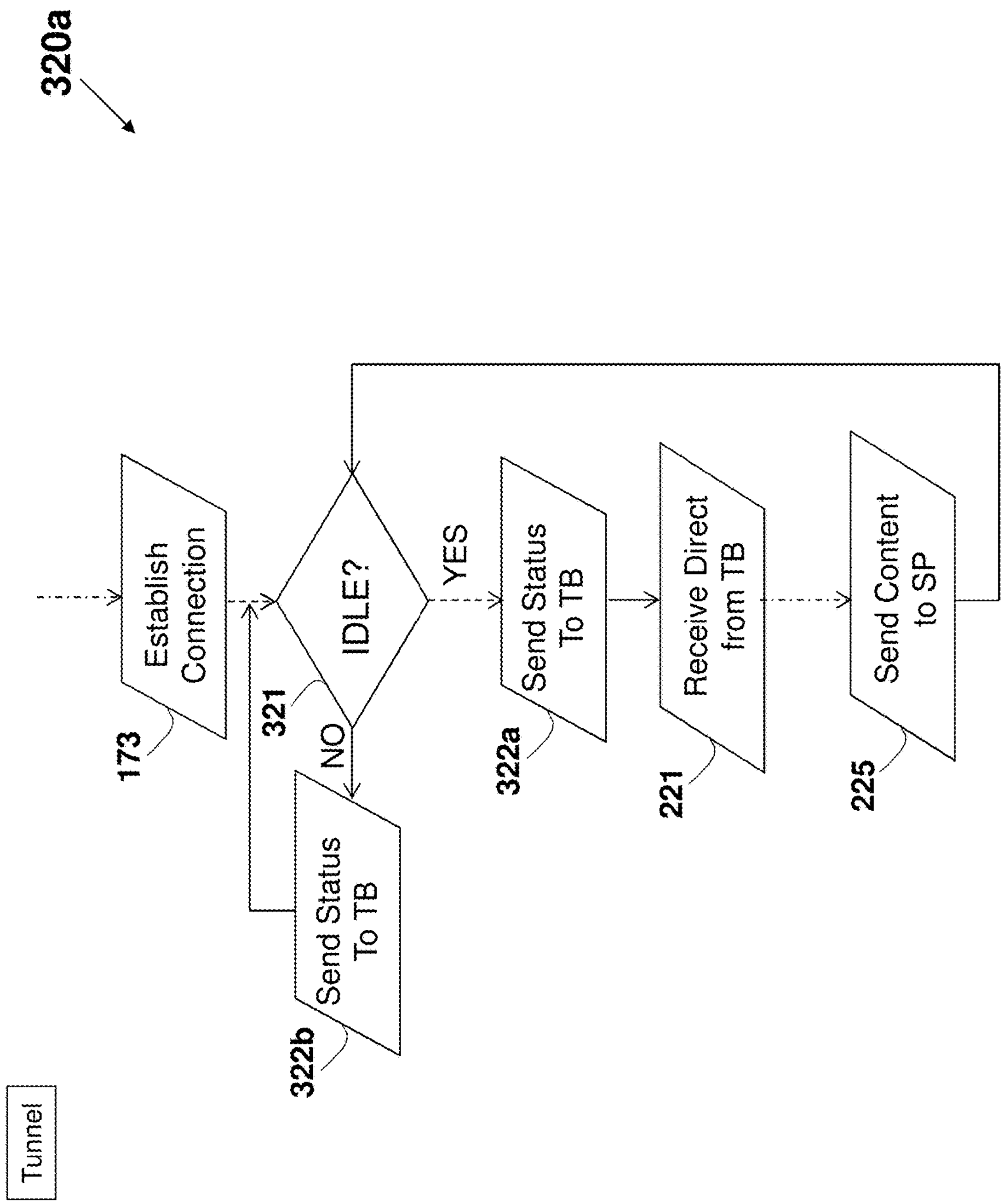

A flow chart 320 of a tunnel device that may be used only when idling is shown in FIG. 32, corresponding to the flow chart 170 shown in FIG. 17. After establishing a connection as part of the "Establish Connection" step 173, the tunnel device checks, as part of the "IDLE?" step 321 if it is in the IDLE state 313. In a case where the tunnel device is not in the IDLE state 313, such as if it is in the ACTIVE state 312, a message notifying the unavailability of the tunnel device to serve as a tunnel is sent to the TB server 71 as part of a "Send Status to TB" step 322*b*, which may corresponds to the "Notify TB" step 314*b*. In a case where the tunnel device is in, or entering, the IDLE state 313, a message notifying the availability of the tunnel device to serve as a tunnel is sent to the TB server 71 as part of a "Send Status to TB" step 322*a*, which may corresponds to the "Notify TB" step 314*a*. Upon receiving such a notification, the TB server 71 may select the tunnel device as part of the "Select Tunnel" step 146, and the selected tunnel is contacted as part of the "Receive Request from TB" step 174. Similarly, a flow chart 320*a* of a tunnel device that may be used only when idling is shown in FIG. 32*a*, corresponding to the flow chart 220 shown in FIG. 22.

Alternatively or in addition, the tunnel device connects to the TB server 71, as part the "Initiate TB Connection" step 171, when entering the IDLE state 313. For example, the "Notify TB" step 314*a* may correspond to the "Initiate TB Connection" step 171, so the TB server 71 may be aware of the tunnel device availability only when such a device is in the IDLE state 313. In such a case, upon the sensing of the 'ACTIVE' detect 315*d*, as part of the "Notify TB" step 314*b*, the established connection 111*d* with the selected tunnel device is disconnected, such as by stopping the TCP keepalive mechanism, so that the TB server 71 is notified that the selected tunnel device is no long available to serve as a tunnel device.

Idle detection techniques are disclosed in U.S. Pat. No. 9,244,682 to Rowles et al. entitled: "Idle detection", which is incorporated in its entirety for all purposes as if fully set forth herein. A set of idle conditions that includes one or more conditions not comprising or triggered by an absence of user input is monitored. The device is determined to be idle based at least in part on results of the monitoring. The device may be determined not to be idle even in the absence of recent user input. Any of the idle detection techniques that are disclosed in the U.S. Pat. No. 9,244,682 to Rowles et al. may equally be used herein. Further, in some embodiments, a user or administrator configurable set of idle detection conditions applicable to the particular device and/or desired by the user or administrator are used.

In one example, the idle condition will be based on, or use, services or tasks provided by the operating system or other software applications that are concurrently executed in the tunnel device with the tunnel related flow chart or functionalities. For example, most operating systems will display an idle task, which is a special task loaded by the OS scheduler only when there is nothing for the computer to do. The idle task can be hard-coded into the scheduler, or it can be implemented as a separate task with the lowest possible priority. An advantage of the latter approach is that programs monitoring the system status can see the idle task along with all other tasks; an example is Windows NT's System Idle Process.

A screensaver (or screen saver) is a computer program that blanks the screen or fills it with moving images or patterns when the computer is not in use, and is typically a computer program that displays aesthetic patterns or images when the computer is not being used, originally intended to prevent screenburn. While the original purpose of screensavers was to prevent phosphor burn-in on CRT and plasma computer monitors (hence the name), though modern monitors are not susceptible to this issue, screensavers are still used for other purposes. Screensavers are often set up to offer a basic layer of security, by requiring a password to re-access the device. Some screensavers use the otherwise unused computer resources to do useful work, such as processing for distributed computing projects. The screensaver typically terminates after receiving a message from the operating system that a key has been pressed or the mouse has been moved. In one example, upon executing an idle process or thread (by the operating system or any other software application), or when a screensaver application is operated, the idle condition is considered to be met, and respectively upon terminating an idle process or the screensaver operation, the idle condition is considered not to be met.

In one example, the idle condition is met when any application other than a screen saver is running in "full screen" mode (e.g., movies or video games often run in this mode), relating to a display which covers the full screen without the operating system's typical window-framing interface, or a window occupying all the available display surface of a screen. Conversely, a screen may not be powered or may be blanked, suggesting that is not visualized by a human user. In one example, upon displaying a full screen by a software application the idle condition is considered not to be met, since it is assumed that the human user is watching that screen. However, upon a blanked display or a closed (such as non-powered) displaying, the idle condition is considered to be met, since it is assumed that the human user is not watching in front of the screen.

An input device, such as the input device 18 as part of the computer system 10 shown in FIG. 1, is a piece of computer hardware equipment used to provide data and control signals to an information processing system such as a computer or information appliance. Such input device may be an integrated or a peripheral input device (e.g., hard/soft keyboard, mouse, resistive or capacitive touch display, etc.). Examples of input devices include keyboards, mouse, scanners, digital cameras and joysticks. Input devices can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input devices used to specify a position in space, can further be classified according to whether the input is direct or indirect. With direct input, the input space coincides with the display space, i.e. pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned.

In one example, the idle detection is based on receiving any input (or change of an input) from an input device. For example, a pre-defined time interval may be used, measured by a dedicated timer or counter or used as a service of the operating system. In case of no input sensed from one or more input devices during the pre-defined time interval, the idle condition is considered to be met. Further, the idle condition is considered not to be met upon receiving any input from one or more of the input devices. Examples include, without limitation, detecting receipt of a user input, e.g., via mouse movement, touch screen interaction, button clicks, or keyboard keystrokes. Such idle-detection methods can detect if a human-interaction device such as a mouse, keyboard, or touch-screen has not been used for a certain amount of time.

When portable or handheld devices are involved, the idle condition may be considered to be met when no motion or acceleration (or a motion or an acceleration below a set threshold) is sensed for a pre-defined time interval, using an accelerometer, a motion sensor, or a GPS. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., quartz, tourmaline). Piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEMS, a.k.a. Micro-mechanical Electrical Systems) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, '*MEMS motion sensor* 3-*axis*—±2 *g*/±8 *g smart digital output "piccolo" accelerometer*', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, NH, USA, described in the data-sheet '*DATASHEET SQ-SEN*-200 *Omnidirectional Tilt and Vibration Sensor*' Updated 2009 Aug. 3, which is incorporated in its entirety for all purposes as if fully set forth herein. Other types of motion sensors may be equally used, such as devices based on piezoelectric, piezoresistive and capacitive components to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

The Global Positioning System (GPS) is a space-based radio navigation system owned by the United States government and operated by the United States Air Force. It is a global navigation satellite system that provides geolocation and time information to a GPS receiver anywhere on or near the Earth where there is an unobstructed line of sight to four or more GPS satellites. The GPS system does not require the user to transmit any data, and it operates independently of any telephonic or internet reception, though these technologies can enhance the usefulness of the GPS positioning information. The GPS system provides critical positioning capabilities to military, civil, and commercial users around the world. The United States government created the system, maintains it, and makes it freely accessible to anyone with a GPS receiver. In addition to GPS, other systems are in use or under development, mainly because of a potential denial of access by the US government. The Russian Global Navigation Satellite System (GLONASS) was developed contemporaneously with GPS, but suffered from incomplete coverage of the globe until the mid-2000s. GLONASS can be added to GPS devices, making more satellites available and enabling positions to be fixed more quickly and accurately, to within two meters. There are also the European Union Galileo positioning system, China's BeiDou Navigation Satellite System and India's NAVIC.

The GPS concept is based on time and the known position of specialized satellites, which carry very stable atomic clocks that are synchronized with one another and to ground clocks, and any drift from true time maintained on the ground is corrected daily. The satellite locations are known with great precision. GPS receivers have clocks as well; however, they are usually not synchronized with true time, and are less stable. GPS satellites continuously transmit their current time and position, and a GPS receiver monitors multiple satellites and solves equations to determine the precise position of the receiver and its deviation from true time. At a minimum, four satellites must be in view of the receiver for it to compute four unknown quantities (three position coordinates and clock deviation from satellite time).

Each GPS satellite continually broadcasts a signal (carrier wave with modulation) that includes: (a) A pseudorandom code (sequence of ones and zeros) that is known to the receiver. By time-aligning a receiver-generated version and the receiver-measured version of the code, the Time-of-Arrival (TOA) of a defined point in the code sequence, called an epoch, can be found in the receiver clock time scale. (b) A message that includes the Time-of-Transmission (TOT) of the code epoch (in GPS system time scale) and the satellite position at that time. Conceptually, the receiver measures the TOAs (according to its own clock) of four satellite signals. From the TOAs and the TOTs, the receiver forms four Time-Of-Flight (TOF) values, which are (given the speed of light) approximately equivalent to receiver-satellite range differences. The receiver then computes its three-dimensional position and clock deviation from the four TOFs. In practice, the receiver position (in three dimensional Cartesian coordinates with origin at the Earth's center) and the offset of the receiver clock relative to the GPS time are computed simultaneously, using the navigation equations to process the TOFs. The receiver's Earth-centered solution location is usually converted to latitude, longitude and height relative to an ellipsoidal Earth model. The height may then be further converted to height relative to the geoid (e.g., EGM96) (essentially, mean sea level). These coordinates may be displayed, e.g., on a moving map display, and/or recorded and/or used by some other system (e.g., a vehicle guidance system).

In one example, the idle condition may be considered to be met when the communication traffic through a network interface, such as over a PAN, LAN, WLAN, WAN or WWAN, is below a threshold.

Portable or handheld devices, such as tablets, laptops, and smartphones, typically use a rechargeable smart battery. A smart battery or a smart battery pack is a rechargeable battery pack with a built-in Battery Management System (BMS), usually designed for use in a portable computer such as a laptop. Besides the usual plus and minus terminals, it also has two or more terminals to connect to the BMS; typically minus is also used as BMS "ground". BMS interface examples are SMBus, PMBus, EIA-232, EIA-485, MIN BM and Local Interconnect Network. The smarter battery can internally measure voltage and current, and deduce charge level and SoH (State of Health) parameters, indicating the state of the cells. Externally the smart battery can communicate with a smart battery charger and a "smart energy user" via the bus interface. The smart battery can demand that the charging stops, ask for charging, or demand that the smart energy user stop using power from this battery. There are standard specifications for smart batteries: Smart Battery System and many ad-hoc specifications.

A Battery Management System (BMS) is any electronic system that manages a rechargeable battery (cell or battery pack), such as by protecting the battery from operating outside its Safe Operating Area, monitoring its state, calculating secondary data, reporting that data, controlling its environment, authenticating it and/or balancing it. A battery pack built together with a battery management system with an external communication data bus is a smart battery pack. A smart battery pack must be charged by a smart battery charger. A BMS may monitor the state of the battery as represented by various items, such as: Voltage: total voltage, voltages of individual cells, minimum and maximum cell voltage or voltage of periodic taps; Temperature: average temperature, coolant intake temperature, coolant output temperature, or temperatures of individual cells; State of Charge (SOC) or Depth of Discharge (DOD), to indicate the charge level of the battery; State of Health (SOH), a variously-defined measurement of the overall condition of the battery; Coolant flow: for air or fluid cooled batteries; and Current: current in or out of the battery.

In one example, the idle condition may be considered to be met when, based on the BMS output, the battery capacity is above a minimum threshold. For example, the idle condition may be considered to be met when the current capacity of the battery is above 40%, 50%, 60%, 70%, 80%, or 90%. In the case where the capacity is estimated or measured to be below the set threshold, the idle condition may be considered not to be met. Such threshold provides for not draining the battery by using the tunnel functionalities, rendering the device useless or powerless when the human user may want to use it after being used for tunneling.

In the example of the state diagram 310 shown in FIG. 31, being in an 'IDLE' state 313 or in 'ACTIVE' state 312 is determined by the tunnel device itself, such as based on detecting or sensing physical phenomenon or events, and notifying the TB server 71, such as over the established connection, of the tunnel device determined state. For example, a tunnel device such as tunnel device #5 33*e*, may check the battery capacity and may use an associated threshold, and then the tunnel device itself may decide that the battery capacity is below the set threshold (e.g. 35%), and in response shift from the 'IDLE' state 313 to the 'ACTIVE' 312 state, and may notify the change over the established connection 112*e* described as part of the messaging chart 110*a* shown in FIG. 11*a*. As a result, the TB server 71 may update the tunnel device #5 33*e* status, such as by updating the associated idling status as part of the related idling column 102*i* in the status table 330 shown in FIG. 33.

Alternatively or in addition, while the tunnel device may still detect, sense, or measure various parameters or phenomena regarding its operation or the environment, the decision regarding the tunnel device state is performed by the TB server 71. In such a scheme, the sensing or detecting information or value is sent to the TB server 71, such as over the established connection. For example, the connection 112*e* may be used by the tunnel device #5 33*e*. Upon receiving the value or status information from the tunnel device, the tunnel device state is determined by the TB server 71 itself. For example, the value of the battery capacity may be sent by the tunnel device to the TB server 71, which apply the comparison to a pre-set threshold for determining the state of the tunnel device. Such mechanism allows a centralized control of the criteria used for deciding on the tunnel devices status. For example, in case where a criterion for idling is changed, it is required to be updated only at a single location, at the TB server 71, and not at each of the tunnel devices. Further, the threshold, criterion, or rules for idling may be changed in time according to various system requirement. For example, assuming that battery capacity of at least 50% is used as an idling criterion. In case of having a large quantity of available tunnel devices, the threshold may be relaxed to 55% or 60%. In contrast, in case of low quantity of available tunnel devices (such as in a specific location), the threshold may be reduced to 40%, rendering many tunnel devices having battery capacity between 40% and 50% available as tunnel devices. A tunnel device may notify the TB server 71 of the measured or sensed value regarding a criterion for idling periodically, upon sensing an event, as a response to a request from the TB server 71, or any combination thereof.

Figure 31A:
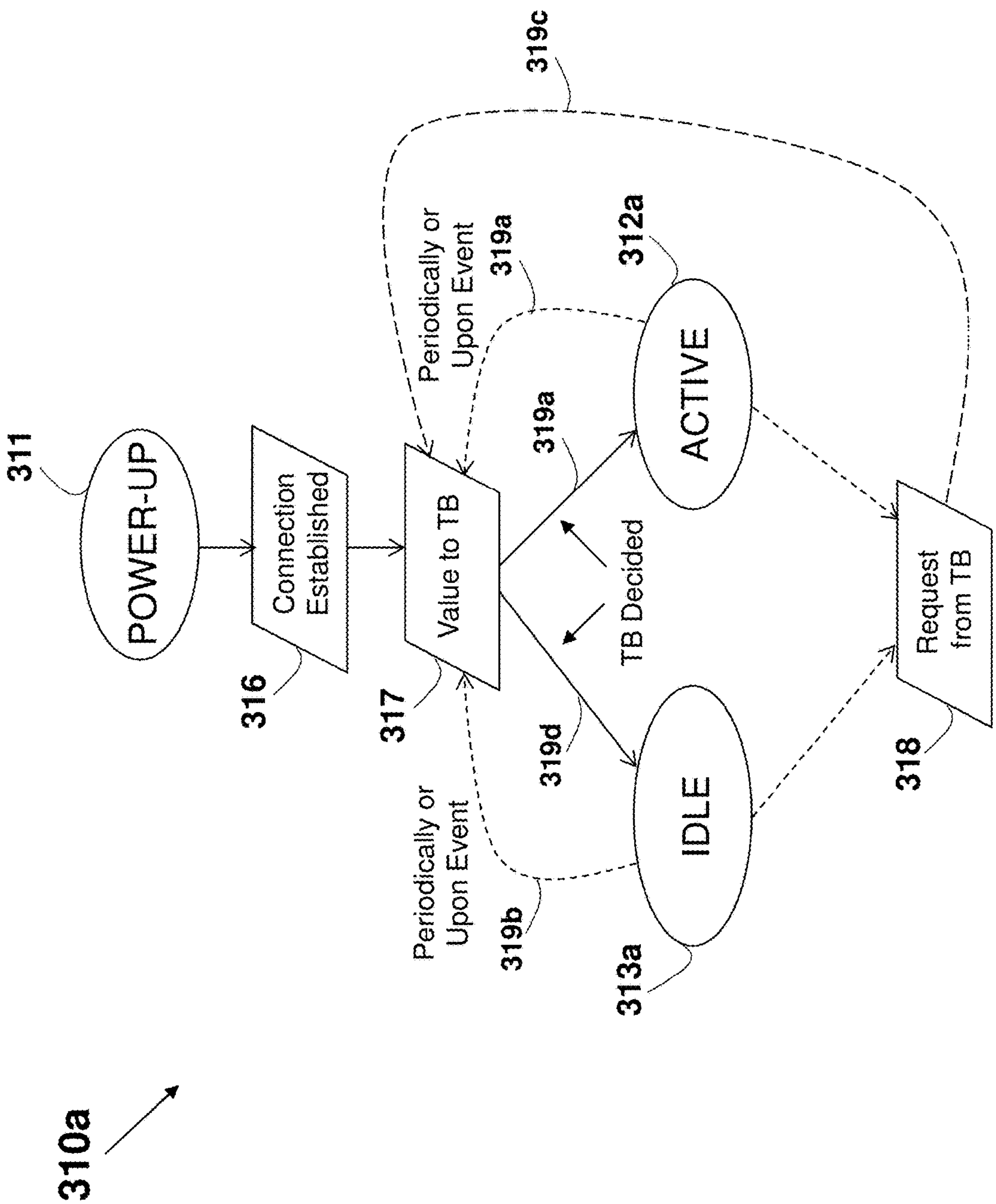
FIG. 31*a* depicts schematically a state diagram of a tunnel device as determined by the tunnel bank server.

A state diagram 310*a* shown in FIG. 31*a* illustrates the idling determination by the TB server 71. A tunnel device may be in an 'IDLE' state 313*a* (corresponding to the 'IDLE' state 313), and generally available to server as a tunnel and to fetch a content from a web server, such as web server 22*b*, or may be non-available for tunnel functionality in an 'ACTIVE' state 312*a* (corresponding to the 'ACTIVE' state 312). However, the determining regarding the tunnel devices is by the TB server 71, rather than by the tunnel device itself as exampled above.

After completing the TOWER-UP' phase 311 by the tunnel device, a connection is established as part of a "Connection Established" state 316, which corresponds to "Registration and Connection" step 81 shown in FIG. 8, and further described as part of the "Connection Handler" flow chart 140*a* and the tunnel flow chart 170. As part of a "Value to TB" step 317, the tunnel device sends a value to the TB server 71, to be used by the TB server 71 for determining the tunnel device status or state, such as 'IDLE' state 313*a* or 'ACTIVE' state 312*a*. The value may correspond to a measured physical phenomenon, such as battery capacity or available bandwidth. Alternatively or in addition, the value may notify a state or an event, such as a screen saver status, being in "full screen" mode or not. The tunnel device may send multiple values (continuous values or discrete values), that may correspond to multiple phenomena, events, parameters, and criteria.

In one example, the value (or values) is periodically sent from the tunnel device to the TB server 71, allowing for periodical refreshing of the tunnel device status. In such a scheme, when the tunnel device is in the 'IDLE' state 313*a* (as determined by the TB server 71), the value is measured or otherwise determined by the tunnel device, and after a time period from the former sending, an updated value is sent to the TB server 71 as shown in a dashed line 319*b* in the state diagram 310*a*. Similarly, when the tunnel device is in the 'ACTIVE' state 312*a* (as determined by the TB server 71), the value is measured or otherwise determined by the tunnel device, and after a time period from the former sending, an updated value is sent to the TB server 71 as shown in a dashed line 319*a* in the state diagram 310*a*. The time period may be at least 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or may be less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months.

Alternatively or in addition, as shown in the dashed lines 319*a* and 319*b*, a value is sent to the TB server 71 as part of the "Value to TB" step 317 upon sensing an event. Any event or occurrence, such as relating to the tunnel device operation or interaction with a user may be used to trigger the value sending. For example, any event that was described to trigger an 'ACTIVE Detect' 315*d* or 'IDLE' Detect 315*b* as part of the state diagram 310 may trigger a sending of an updated value.

As an alternative, or in addition to, the periodic update and event triggered update, a tunnel device may send a value as part of the "Value to TB" step 317 in response to a request from the TB server 71 as part of a "Request from TB" step 318, for example over the connection established as part of the "Connection Established" state 316. After such request is received by the tunnel device, a value is sent as part of the "Value to TB" step 317 as shown in a dashed line 319*c*. After the sent value is received by the TB server 71, the TB server 71 determines the tunnel device status. A criteria, such as a threshold may be used, and the TB server 71 may decide that the value received from the tunnel device justifies considering it as in the 'IDLE' state 313*a* as described by the line 319*d*, or justifies considering it as in the 'ACTIVE' state 312*a* as described by the line 319*a*.

Figure 32B:
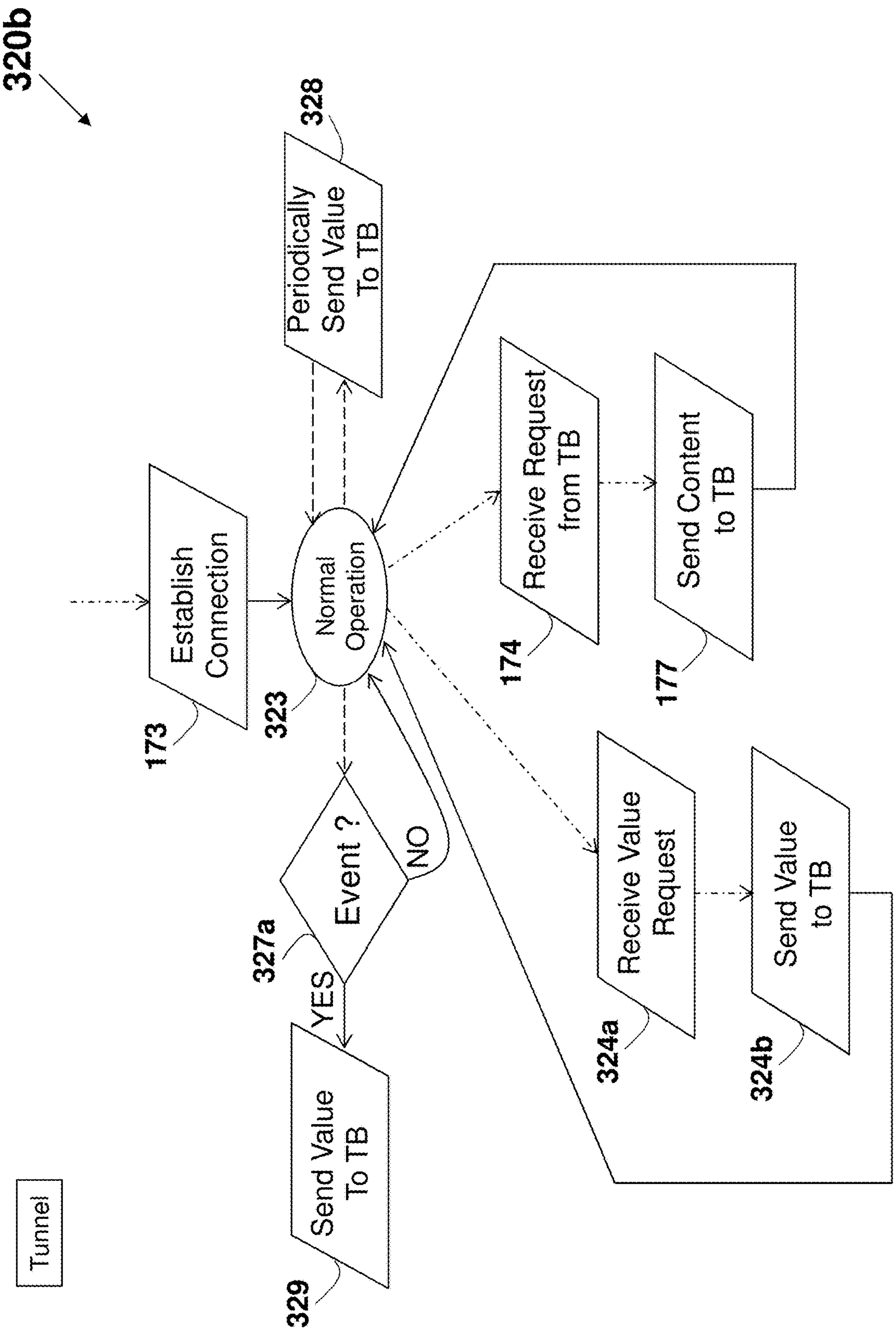
FIG. 32*b* illustrates schematically a simplified flowchart relating to a tunnel device associated with an idle state determined by the TB server.

A flow chart 320*b* of a tunnel device operation where the idling status is determined by the TB server 71 is shown in FIG. 32*b*, corresponding to the flow chart 170 shown in FIG. 17 and to the flow chart 320 shown in FIG. 32. After establishing a connection as part of the "Establish Connection" step 173, the tunnel device enters a "Normal Operation" state 323, where activities that are not related to fetching content for a client device may be performed. In case of using periodic updating of the TB server 71 with the status of the tunnel device, corresponding to the periodic sending value to the TB server 71 as part of the "Value to TB" step 317 shown in the state diagram 310*a*, the tunnel device periodically update the TB server 71 by sending a value as part of a "Periodically Send value To TB" step 328. In a case where an event based triggering is used (as an alternative or in addition to the periodical updating), the tunnel device continuously or periodically checks for an event or occurrence as part of an "Event ?" step 327*a*, and resumes normal operation state 323 if no event has been identified. Upon identifying an event as part of the "Event ?" step 327*a*, a value is sent to the TB server 71 as part of a "Send Value To TB" step 329, which corresponds to the "Value to TB" step 317. In a case where TB server 71 initiated update is used (as an alternative to, or in addition to, the periodical or event-based updating), when a request is received by the tunnel device as part of a "Receive Value Request" step 324*a*, which corresponds to the "Request from TB" step 318, the tunnel device responds by sending a value as part of the "send Value to TB" step 324*b*, and afterwards resumes the normal operation 323. Upon receiving a request for content as part of the "Receive Request from TB" step 174, the tunnel device responds by sending the required content as part of the "Send Content to TB" step 177, similar to the activity as part of the flow chart 170 shown in FIG. 17.

Figure 32C:
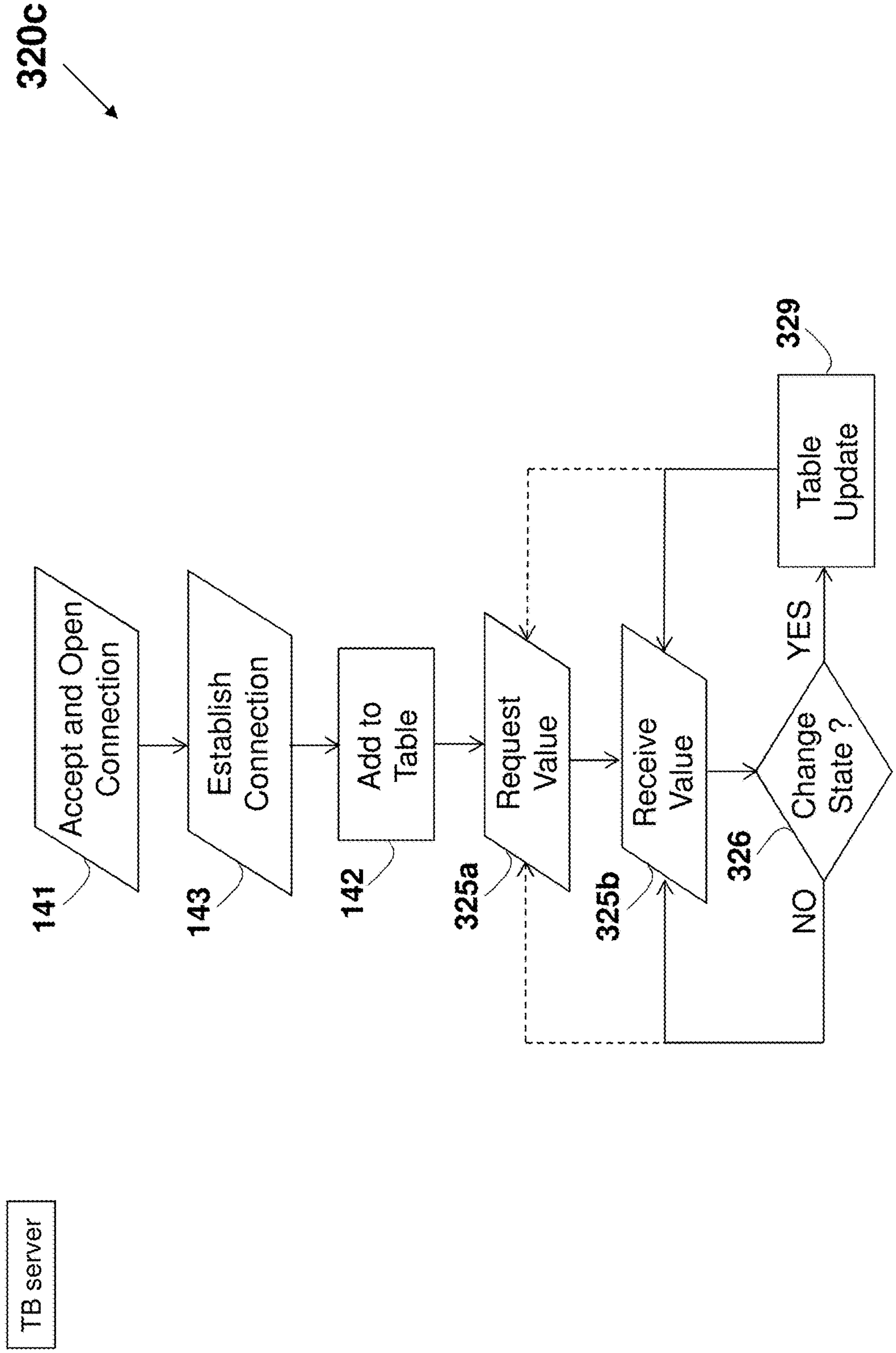
FIG. 32*c* illustrates schematically a simplified flowchart relating to a TB server that determines a tunnel device status.

A flow chart 320*c* described the operation of the TB server 71 where the idling status is determined by the TB server 71 is shown in FIG. 32*c*, corresponding to the flow chart 140*a* shown in FIG. 14. A value is received from a tunnel device as part of a "Receive value" step 325*b*, as a response to the tunnel device sending the value periodically as part of the "Periodically Send Value To TB" step 328, or as a response to event-based sending as part of the "Send Value To TB" step 329 as part of the flow chart 320*b* shown in FIG. 32*b*. The TB server 71 applies a rule or a criterion, such as a threshold for the value received, or based on the value itself in case of a discrete value as part of a "Change State ?" step 326. If the result provides that the status of the tunnel device is to be sustained, such as by staying in the 'IDLE' state 313*a* or in the 'ACTIVE' state 312*a*, no change is implied and the TB server 71 waits for another update from the tunnel device as part of the "Receive value" step 325*b*. However, in case where the TB server 71 decides, according to the rules or criteria as part of the "Change State ?" step 326 that the tunnel device status needs to be updated, such as from the 'IDLE' state 313*a* to the 'ACTIVE' state 312*b* or vice versa, such status change is executed as part of an "Table Update" step 329, and only afterwards the TB server 71 waits for another update from the tunnel device as part of the "Receive Value" step 325*b*. In one example, the "Table Update" step 329 involves changing status associated with the tunnel device as part of the column 'IDLE' 102*i* in the table 330 shown in FIG. 33, such as when changing the state to IDLE is marked as 'Y'. In a case where the value is received from the tunnel device in response to a request initiated by the TB server 71, such request id sent to the tunnel device as part of a "Request Value" step 325*a*.

As part of the "Tunnel Selection" step 83 shown as part of the flow chart 80, or as part of the "Select Tunnel" step 146 shown as part of the flow chart 140*b*, a tunnel device is selected for fetching the requesting client device #1 31*a* with the requested content from the web server 22*b*. In one example, the tunnel device is selected from all available tunnels, such as from all the tunnels that are marked as idling 'Y' in the IDLE column 102*i* in the table 330 (that meets the criteria, if used), that is stored in the database 73 that is part of the Tunnel Bank Server 71. In such a case, the all pool of available tunnel devices shares the task of serving as tunnels, and the requested content from the web server 22*b* is being accessed by a diversified tunnel devices. In another example, a single tunnel device (uniquely identified as a single IP address) is used by the requesting client device #1 31*a*, so that the web server 22*b* is always accessed by the same selected tunnel device, allowing the client device #1 31*a* to anonymously simulate a consistent accessing device to the web server 22*b*, for example for experiencing and testing the web server 22*b* performance, responsiveness, or operation over time when accessed by the same device. For the sake of load balancing, a different tunnel device may be selected for use with the client device #1 31*a* when accessing different web servers. For example, the tunnel device #1 33*a* may always be used when fetching content from the web server 22*b*, and the tunnel device #4 33*d* may always be used when fetching content from another web server, such as from the data server #1 22*a*.

Alternatively or in addition, a client device, such as the client device #1 31*a*, may be associated with a defined group of IP addresses, each identifying a different tunnel device. Such a scheme allows for better manageability and control of resources. In such a case, a tunnel device is selected from the defined group as part of the "Tunnel Selection" step 83 shown as part of the flow chart 80, or as part of the "Select Tunnel" step 146 shown as part of the flow chart 140*b*. An example of an IP group 341 is shown as part of a view 340 shown in FIG. 34. The IP group (designated as GIP) includes 16 IP addresses, ranging from IP #1 341*a* to IP #16 341*p*, and includes IP #2 341*b*, IP #3 341*c*, IP #4 341*d*, IP #5 341*e*, IP #6 341*f*, IP #7 341*g*, IP #8 341*h*, IP #9 341*i*, IP #10 341*j*, IP #11 341*k*, IP #12 341*l*, IP #13 341*m*, IP #14 341*n*, IP #15 341*o*, and IP #16 341*p*. Each of the IP addresses in the group 341 may be associated with the attributes shown in the table 330 in FIG. 33. For example, IP #5 341*e* may be the IP associated with the third row 101*c* of the table 330, and the IP #14 341*n* may be the IP associated with the seventh row 101*g* of the table 330. When a content request is received from the client device #1 31*a*, an IP address (designating a tunnel device) is selected only from the IP addresses of the table 341. Preferably, when a criterion (or multiple criteria) are associated with the client device #1 31*a*, the IP addresses in the associated IP addresses group 341 are all satisfying that criterion (or criteria), thus obviating the need to scan and select from all the available tunnel devices in the TB server 71.

While the IP group 341 is examples as having 16 IP addresses, any number of addresses may be used. Further, a different number of IP addresses may be used in different IP groups, associated with different client devices. For example, the IP group that is used for the client device #1 31*a* may include 16 IP addresses as shown in the IP group 341, while the IP group that is used for another client device, such as client device #2 31*b* may include 5 or 50 IP addresses. An IP group may include a number that is equal or higher than 1, 2, 5, 10, 12, 15, 20, 20, 30, 50, 80, 100, 120, 150, 200, 500, 1,000, 2,000, 5,000, or 10,000 IP addresses. Alternatively or in addition, an IP group may include less than 5, 10, 12, 15, 20, 20, 30, 50, 80, 100, 120, 150, 200, 500, 1,000, 2,000, 5,000, 10,000 or 20,000 IP addresses. Further, a group may be formed and defined only for a limited time for a client device. For example, an IP group may be defined and used by a client device for at least 1 minute, 2, minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months. Alternatively or in addition, an IP group may be defined and used by a client device for less than 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, 6 months, or 1 year.

As part of the "Tunnel Selection" step 83 shown as part of the flow chart 80, or as part of the "Select Tunnel" step 146 shown as part of the flow chart 140*b*, a single IP address (associated with a specific tunnel device) is selected from the IP group 341. In one example, the selected IP address is checked among the tunnel devices that are idling, such as those that are marked as idling 'Y' in the IDLE column 102*i* in the table 330. Alternatively or in addition, the single IP address is randomly selected from the available and idling tunnel devices. Alternatively or in addition, a load balancing scheme may be used, where the tunnel devices are sequentially selected, or where the available tunnel device that was last used earlier than all others is selected to be used.

While the tunnel device to be used is exampled to be selected from the single group 341 that is associated with a single client device #1 31*a*, further partitions of the IP group may be used, providing for further manageability and control. In the example shown in the view 340, the IP group 341 is further partitioned into 3 sub-groups, designated as GIP #1 342*a*, GIP #2 342*b*, and GIP #3 342*c*. The sub-group GIP #1 342*a* includes 6 IP addresses, namely from IP #1 341*a* to IP #6 341*f*, the sub-group GIP #2 342*b* includes 5 IP addresses, namely from IP #7 341*g* to IP #11 341*k*, and the sub-group GIP #3 342*c* includes 5 IP addresses, namely from IP #12 341*l* to IP #16 341*p*. The sub-groups may have equal or different number of elements. The number of subgroups (such as GIP #1 342*a*, GIP #2 342*b*, or GIP #3 342*c*) for a single group (such as IP group 341) may be equal or more than 1, 2, 3, 4, 5, 8, 10, 12, 15, 20, 20, 30, 50, 80, 100, 120, 150, 200, 500, or 1,000 sub-groups. Alternatively or in addition, the number of subgroups (such as GIP #1 342*a*, GIP #2 342*b*, or GIP #3 342*c*) for a single group (such as IP group 341) may be less than 2, 3, 4, 5, 8, 10, 12, 15, 20, 20, 30, 50, 80, 100, 120, 150, 200, 500, 1,000, or 2,000 sub-groups. Each sub-group (such as GIP #1 342*a*, GIP #2 342*b*, or GIP #3 342*c*) may include equal or more than 1, 2, 3, 4, 5, 8, 10, 12, 15, 20, 20, 30, 50, 80, 100, 120, 150, 200, 500, 1,000, 2,000, 5,000, or 10,000 IP addresses. Alternatively or in addition, each sub-group may include less than 2, 3, 4, 5, 8, 10, 12, 15, 20, 20, 30, 50, 80, 100, 120, 150, 200, 500, 1,000, 2,000, 5,000, 10,000 or 20,000 IP addresses.

In the example shown in the view 340, the IP group 341 is partitioned into mutually exclusive sub-groups, where each of the IP addresses in the IP group 341 is included in only one of the sub-groups. For example, each of the IP addresses in the range from IP #1 341*a* to IP #6 341*f* is exclusively part of the sub group GIP #1 342*a*, each of the IP addresses in the range from IP #7 341*g* to IP #11 341*k* is exclusively part of the sub group GIP #2 342*b*, and each of the IP addresses in the range from IP #12 341*l* to IP #16 341*p* is exclusively part of the sub group GIP #3 342*c*. Alternatively or in addition, an IP address may be shared by two or more sub-groups, as exampled in a view 340*a* shown in FIG. 34*a*. In the example shown in the view 340*a*, the IP group 341 is partitioned into 3 sub-groups, designated as GIP #4 342*d*, GIP #5 342*e*, and GIP #6 342*f*. The sub-group GIP #4 342*d* includes 8 IP addresses, namely from IP #1 341*a* to IP #8 341*h*, the sub-group GIP #5 342*e* includes 5 IP addresses, namely from IP #7 341*g* to IP #11 341*k*, and the sub-group GIP #6 342*f* includes 7 IP addresses, namely from IP #10 341*j* to IP #16 341*p*. Some IP addresses are included in only a single sub-group, such as the IP #3 341*c* that is exclusively part of the sub-group GIP #4 342*d* and the IP #9 341*i* that is exclusively part of the sub-group GIP #5 342*e*. In addition, one or more IP addresses may be shared by more than one sub-group. For example, the IP #7 341*g* is part of both the sub-groups GIP #4 342*d* and the GIP #5 342*e*, and the IP #10 341*j* is part of both the sub-groups GIP #6 342*f* and the GIP #5 342*e*. Such overlapping partition may provide better utilization of the tunnel devices, while providing the benefits of using sub-groups.

In one example, the partitioning of the IP addresses that are part of an IP group (such as the IP group 341) into sub-groups may be random, where the IP addresses are randomly assigned to the various sub-groups. Alternatively or in addition, the partition may be based on the any criteria. For example, any of the criteria described with regard to selecting a tunnel, such as the criteria described in the table 100 shown in FIG. 10 may be used, and in such a scheme, the each sub-group may include all the IP addresses relating to tunnel devices that share a specific feature, attribute, or characteristic. In one example, each such-group may be associated with a geographical location (relating to the column 102*c* in the table 100) and as such includes all the tunnel devices in the same city, country, or continent. For example, a sub-group GIP #1 342*a* may be assigned a city (such as Boston, MA, USA relating to the tunnel device in the row 101*c*) or a country (such as France relating to the tunnel device in the row 101*a*), and includes all the IP addresses associated with that city or country. Alternatively or in addition, each such-group may be associated with an ASN (relating to the column 102*d* in the table 100) and as such includes all the tunnel devices having the same ASN. Similarly, each such-group may be associated with a connection type (relating to the column 102*e* in the table 100), may be associated with an operating system (relating to the column 102*f* in the table 100), may be associated with a bandwidth (BW) (relating to the column 102*g* in the table 100), or may be associated with a RTT (relating to the column 102*h* in the table 100).

Figure 35:
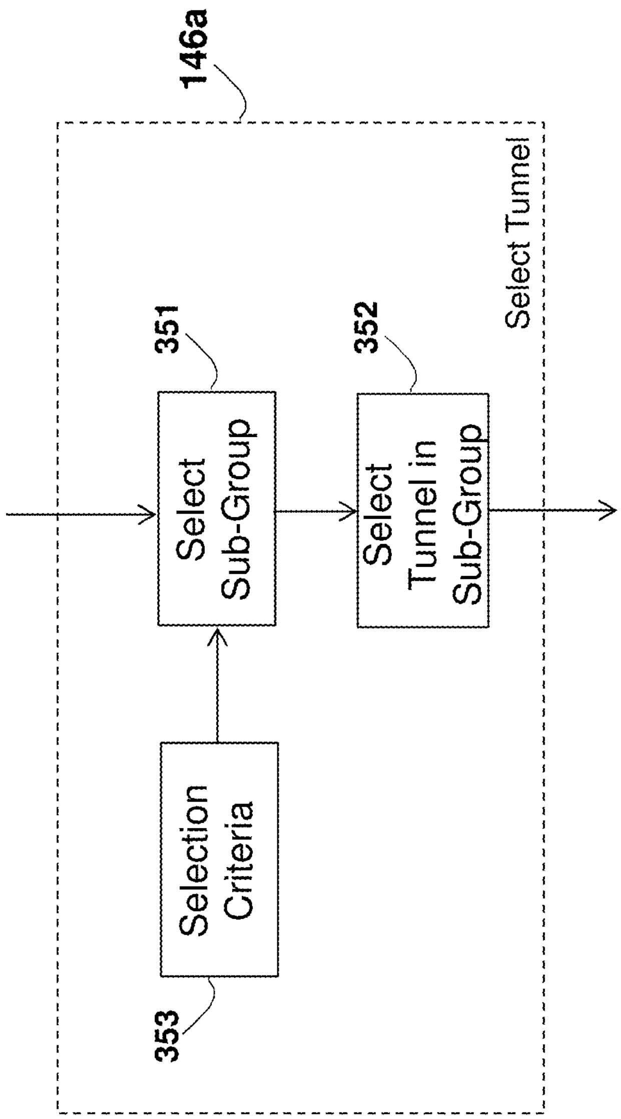
FIG. 35 illustrates schematically a simplified flowchart relating to sub-group based tunnel selecting.

When sub-groups are used, the selection of a tunnel device (as part of the "Tunnel Selection" step 83 shown as part of the flow chart 80, or as part of the "Select Tunnel" step 146 shown as part of the flow chart 140*b*) to be used for a specific request of the client device (such as the client device #1 31*a*) involves two steps: selecting the sub-group, and then selecting a tunnel device (typically identified by its IP address) within the selected sub-group, shown as part of a "Select Tunnel" step 146*a* in FIG. 35, which corresponds to the "Tunnel Selection" step 83 shown as part of the flow chart 80, or to the "Select Tunnel" step 146 shown as part of the flow chart 140*b*. In a "Select Sub-Group" step 351 the sub-group is first selected, and a specific single tunnel device is selected from the selected sub-group as part of a "Select Tunnel in Sub-Group" step 352. The sub-group selection may be random, or may use one or more criterions as shown by a "Selection Criteria" step 353. For example, when the IP group 341 is used, in the "Select Sub-Group" step 351 the sub-group GIP #2 342*b* may be selected, followed by selecting the IP #10 341*j* as part of the "Select Tunnel in Sub-Group" step 352. The selection of a tunnel device from a sub-group as part of the "Select Tunnel in Sub-Group" step 352 may use any selection scheme described herein, such as random selection, or alternatively a sequential selection, preferably based on any load balancing scheme.

In one example, as a request of the client device 31*a* or as part of the TB server 71 without any specific request, a new tunnel device may be selected. For example, a tunnel device that has never been selected or used with the client device 31*a* may be used. Similarly, a tunnel device that has never been selected and used with the web server 22*b* associated with the request from the client device 31*a*. Similarly, a tunnel device that has never been selected regarding the attributes or criteria described herein may be newly introduced and used as a response to a request. Alternatively or in addition, a tunnel device may be selected from available tunnel devices that have not been used with the client device 31*a*, with the web server 22*b*, with any other attribute or criterial, or any combination thereof, for more than a defined time period. The time period may be at least 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or may be less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months. Such a mechanism allows for refreshing the tunnels used with a specific client device, a specific web server, any other attribute or criteria, or any combination thereof.

Various criterions may be used for selecting a sub-group associated with the "Selection Criteria" step 353. In the case where each sub-group is associated with a specific feature, attribute, or characteristic of the tunnel devices, and include IP addresses that comply with a specific criterion or the specific feature, attribute, or characteristic, then the request from the client device #1 31*a* may include the identification of the specific feature, attribute, or characteristic, and the sub-group is selected to comply with the identification included in the request. For example, in a case where the sub-group are associated with different countries (or different ASNs), the sub-group that is relevant to the request criterion of a specific country (or an ASN) is selected. In an example where partitioning of the IP group 341 is country base, the GIP #1 342*a* may include IP addresses relating to tunnel devices assumed to be geographically located in France, the GIP #2 342*b* may include IP addresses relating to tunnel devices assumed to be geographically located USA, and the GIP #3 342*c* may include IP addresses relating to tunnel devices assumed to be geographically located China. If the client device request includes the criterion of tunnel devices in France, then the sub-group GIP #1 342a, while when the client device request includes the criterion of tunnel devices in China, then the sub-group GIP #3 342*c* is selected.

Similarly, a sequential selecting mechanism may be used, where the sub-group are selected sequentially and in cycle. For example, assuming only three sub-groups as described in the view 340, first the sub-group GIP #1 342*a* is selected, followed by selecting the sub-group GIP #2 342*b*, then followed by selecting the sub-group GIP #3 342*c*, and then cyclic repeating the sequence by selecting the sub-group GIP #1 342*a*, and so forth. Such mechanism provides a load balancing and a substantial probability for the same sub-group (or the same tunnel device) to be selected.

In one example, a sub-group may be selected as part of the "Select Sub-Group" step 351 based on timing information, such as based on the time the client device #1 31*a* makes the request for content, for example as part of the "Content Request" step 82 or the "Send Request to SF" step 161. Similarly, the timing associated with any action or any other step of any flow chart here may equally be used. The time periods involved may be a month, a week, a day of the week, an hour of a day, or a minute in an hour. In the example of a day of a week, the partitioning may involve 7 sub-groups, each associated with a day of the week. If the request is received on Monday, then the sub-group associated with Monday will be selected. Similarly, when hours of the day are used, each sub-group may be associated with one or more hours. In one example, there may be 24 sub-groups, each associated with a specific hour of the day. In such a case, when a request is received at 13:25, the sub-group that is associated with the hour of 13:00-14:00 is selected. Similarly, fewer sub-groups may be defines, each associated with few hours. In the example shown in the view 340 in FIG. 34, the sub-group GIP #1 342*a* may be assigned to a 'day time', ranging from 07:00 to 18:00 (and selected when a request is received in this time period), the sub-group GIP #2 342*b* may be assigned to a 'evening time', ranging from 18:00 to 22:00 (and selected when a request is received in this time period), and the sub-group GIP #3 342*c* may be assigned to a 'night time', ranging from 22:00 to 07:00 (and selected when a request is received in this time period).

Alternatively or in addition, the criterion used as the "Selection Criteria" 353 for selecting a sub-group relates to the content that is requested by the client device #1 31*a*, for example as part of the "Content Request" step 82 or the "Send Request to SP" step 161. In one example, each sub-group is associated with a specific content type, such as including a video data, an audio data, or a web-page without any multimedia. In the example shown in the view 340 in FIG. 34, the sub-group GIP #1 342*a* may be assigned to a video data content, the sub-group GIP #2 342*b* may be assigned to an audio data content, and the sub-group GIP #3 342*c* may be assigned to non-multimedia content, such as simple web-pages that only contains images and text. In the case where the requested content is believed to include video data, the relevant sub-group GIP #1 342*a* is selected as part of the "Select Sub-Group" step 351, in the case where the requested content is believed to include audio data, the relevant sub-group GIP #2 342*b* is selected as part of the "Select Sub-Group" step 351, while in all other cases the sub-group GIP #3 342*c* is selected as part of the "Select Sub-Group" step 351.

Alternatively or in addition, the criterion used as the "Selection Criteria" 353 for selecting a sub-group relates to the server from which the content is requested by the client device #1 31*a*, for example as part of the "Content Request" step 82 or the "Send Request to SP" step 161. Such server may be identified by an IP address, domain name, web-site name, or an URL. Such an example is described in a view 340*b* shown in FIG. 34*b*. The GIP #1 342*a* is selected when the content requested is associated with the web-site having a domain name www.xxx.com 342*g*, and is selected upon accessing content from this domain, the GIP #2 342*b* is selected when the content requested is associated with the web-site having a domain name www.yyy.com 342*h*, and is selected upon accessing content from this domain, and the GIP #3 342*c* is selected when the content requested is associated with the web-site having a domain name www.zzz.com 342*i*, and is selected upon accessing content from this domain. Similarly, other identifications of the server that stores that content may be used. For example, the GIP #1 342*a* is selected when the content is requested from the data server #1 22*a* identified by a first IP address, the GIP #2 342*b* is selected when the content is requested from the data server #2 22*b*, and the GIP #3 342*c* is selected when the content requested from a third data server using its IP address. Similarly, other identifications of the server that stores that content may be used.

Figure 34:
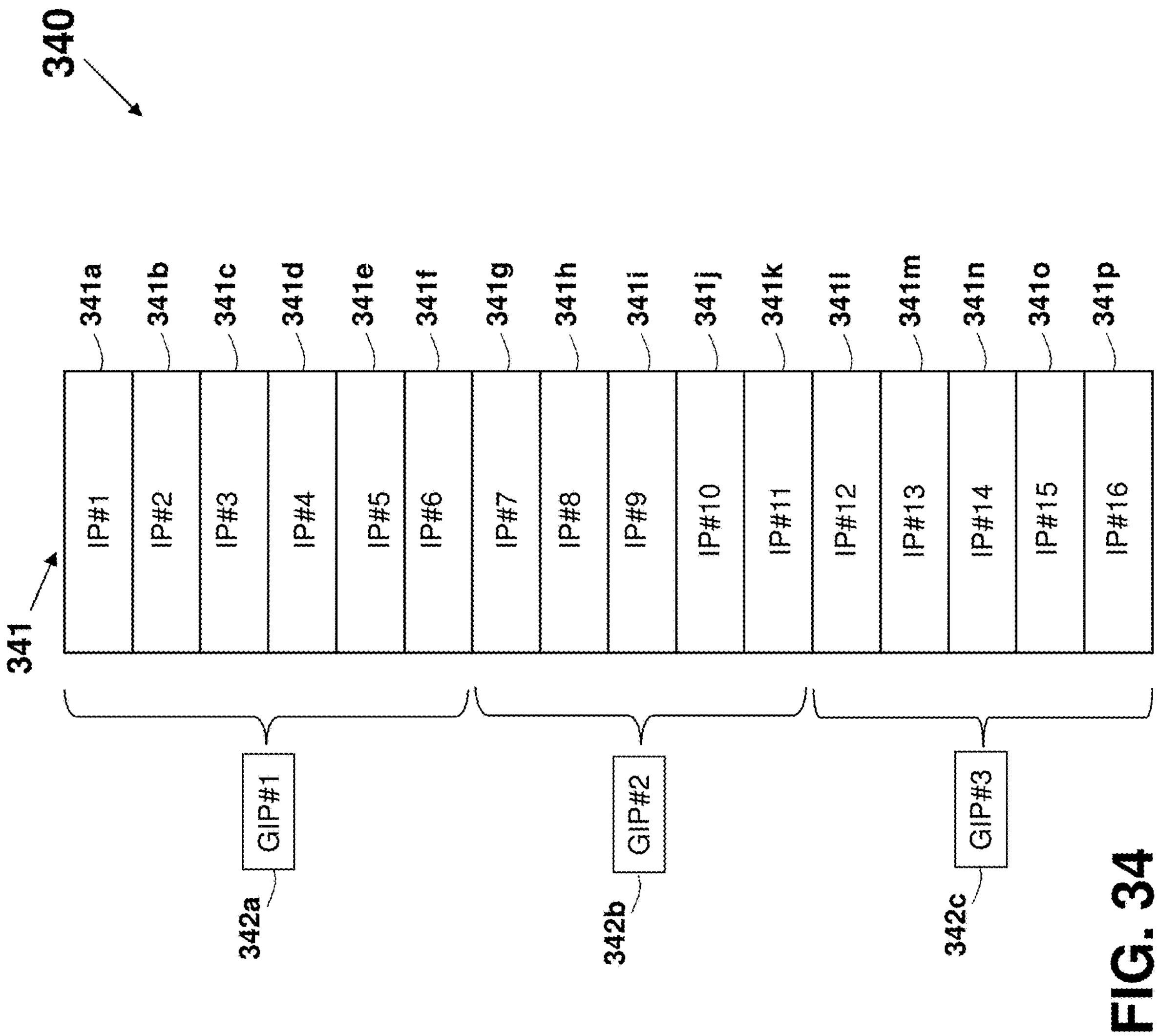
FIG. 34 depicts schematically a group and non-overlapping sub-groups of IP addresses.
Figure 34A:
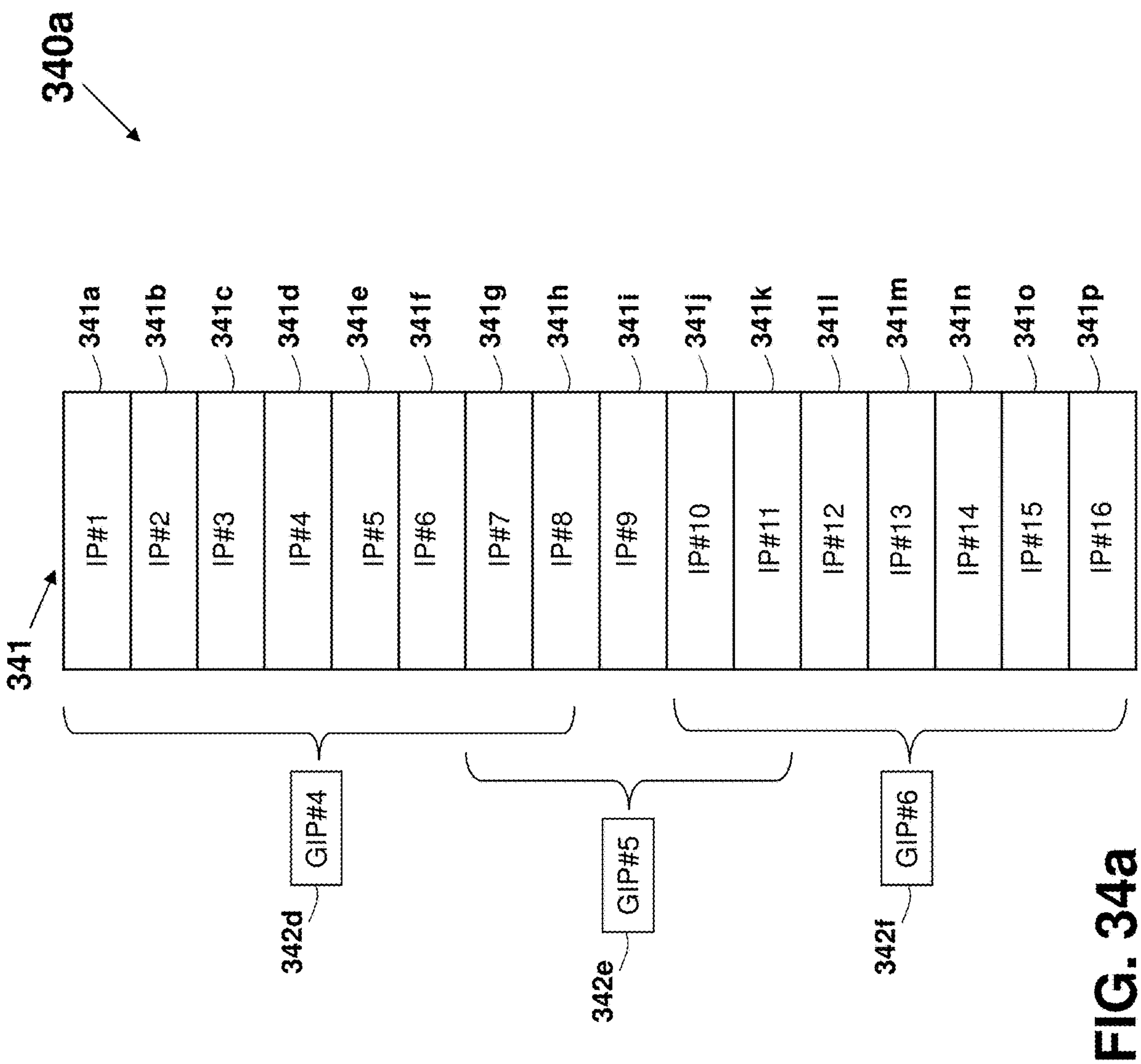
FIG. 34*a* depicts schematically a group and overlapping sub-groups of IP addresses.
Figure 34B:
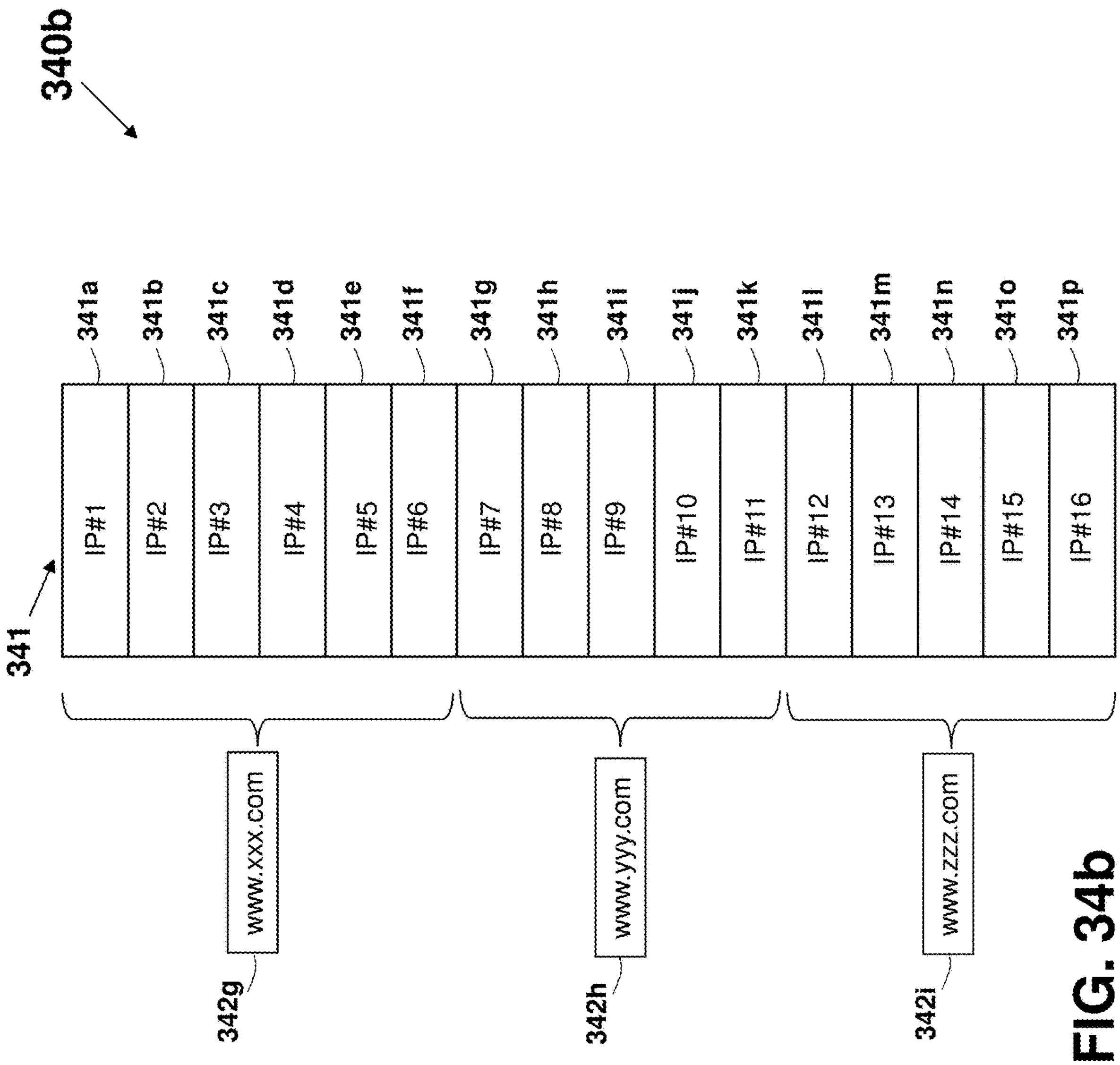
FIG. 34*b* depicts schematically a group and domain-based non-overlapping sub-groups of IP addresses.
Figure 34C:
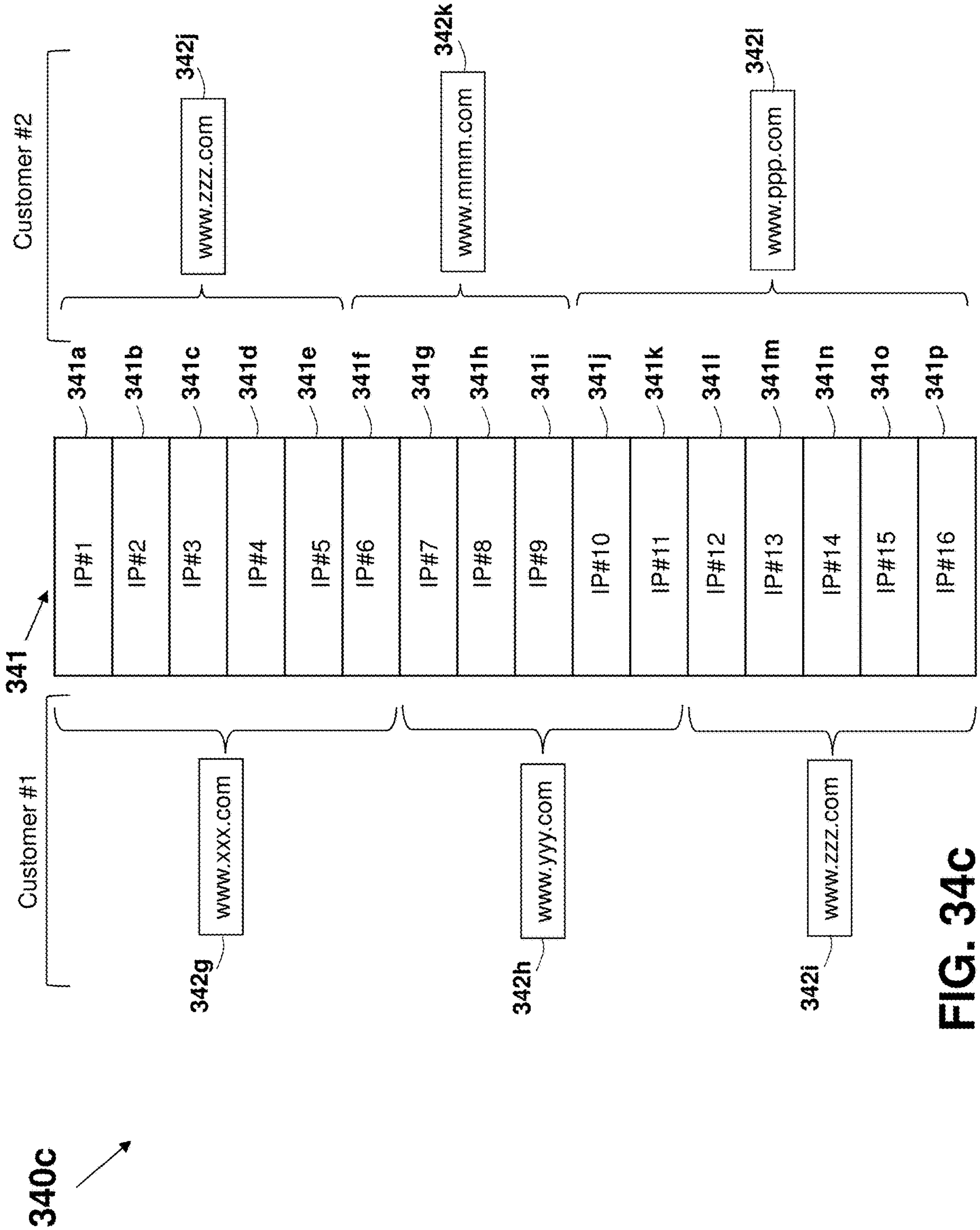
FIG. 34*c* depicts schematically a group and domain-based non-overlapping sub-groups of IP addresses used by two client devices.

While the IP group 341 is exampled in the view 340 shown in FIG. 34 as exclusively used by a single client device (such as the client device #1 31*a*), an IP group (such as the IP group 341) may equally be shared by two or more client devices, offering better utilization of the available tunnel devices. In such a case, the partitioning to sub-groups may be identical for two or more client devices, or may be different. An example of different partitioning is described in a view 340*c* shown in FIG. 34*c*, illustrating two client devices sharing the IP group 341. The first client device, designated as 'Customer #1' and may correspond to the client device #1 31*a* described above, use the partitioning into 3 sub-groups, the GIP #1 342*a* that is associated with the web-site having a domain name www.xxx.com 342*g*, the GIP #2 342*b* that is associated with the web-site having a domain name www.yyy.com 342*h*, and the GIP #3 342*c* that is associated with the web-site having a domain name www.zzz.com 342*i*. However, a second client device (such as client device #2 31*b*) use a different partitioning into 3 sub-groups, where one GIP (including the IP #1 341*a* to the IP #5 341*e*) is associated with the web-site having a domain name www.zzz.com 342*j*, another GIP (including the IP #6 341*f* to the IP #9 341*i*) is associated with the web-site having a domain name www.mmm.com 342*k*, and another GIP (including the IP #10 341*j* to the IP #16 341*p*) is associated with the web-site having a domain name www.ppp.com 342*l*. Preferably, there is no overlapping of IP addresses associated with the same domain name between the two client devices. While the view 340*c* describes the example of sub-groups that are based on domain names, any other partition may equally be applied.

Figure 35A:
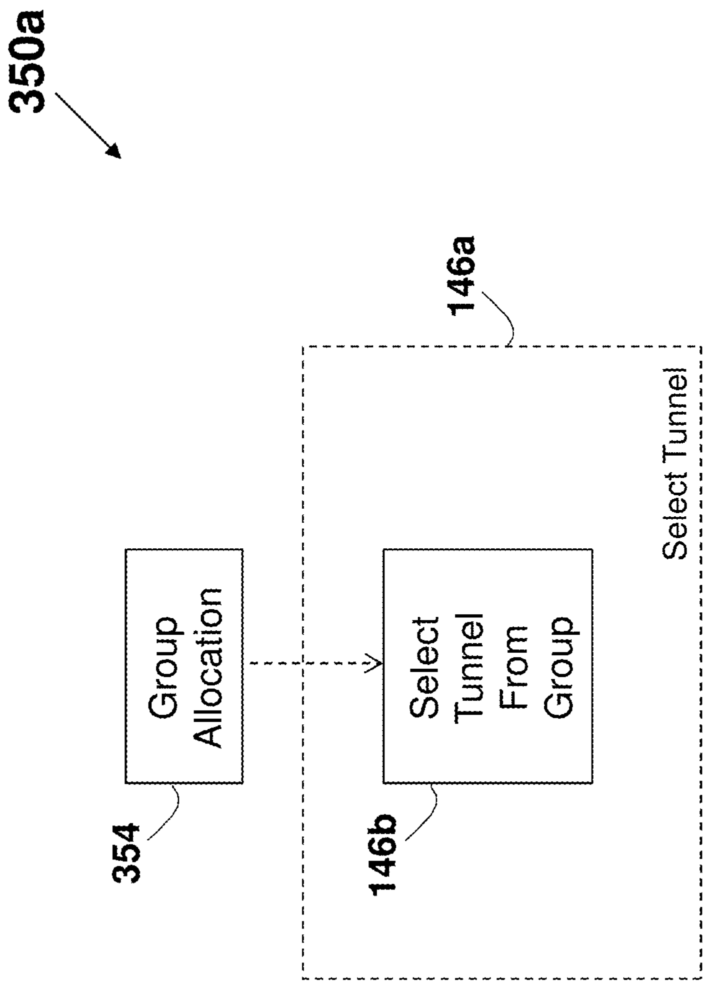
FIG. 35*a* illustrates schematically a simplified flowcharts relating to group based tunnel selecting.

In one example, an IP group, such as the IP group 341 shown as part of the view 340 in FIG. 34, is defined once, and is static and unchanged during the system operation. In such a case, the number of, and the identity of, the IP addresses that are included in the group, are fixed and unchanged over time. Alternatively or in addition, an IP group may be dynamically changed over time, by adding of, or by deleting of, IP addresses from the group. Similarly, the partitioning into sub-groups of an IP group may be defined once, and is static and unchanged during the system operation. In such a case, the number of, and the identity of, the IP addresses that are included in teach of the sub-groups, are fixed and unchanged over time. Alternatively or in addition, the sub-groups may be dynamically changed over time, by adding of, or by deleting of, IP addresses from the sub-group. An allocation of IP addresses to an IP group may be performed as part of a "Group Allocation" step 354 illustrated in a flow chart 350*a* shown in FIG. 35*a*. When a request for content is received from a client device that is associated with an IP group, the tunnel to be used is selected from the IP group as part of a "Select Tunnel From Group" step 146*a*, which corresponds to the "Tunnel Selection" step 83 shown as part of the flow chart 80, or to the "Select Tunnel" step 146 shown as part of the flow chart 140*b*.

Figure 36:
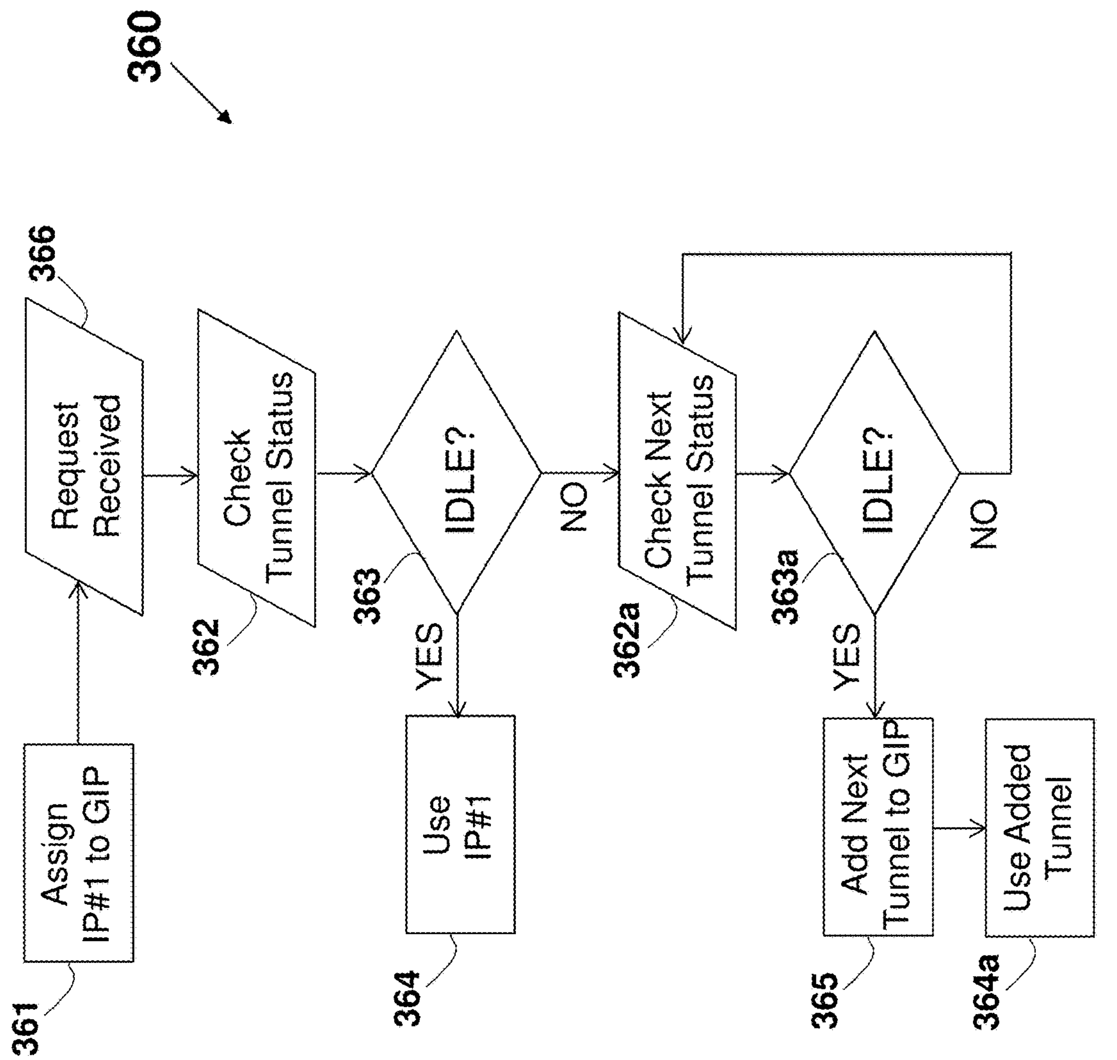
FIGS. 36 and 36*a* illustrate schematically simplified flowcharts relating to forming an IP group.
Figure 36A:
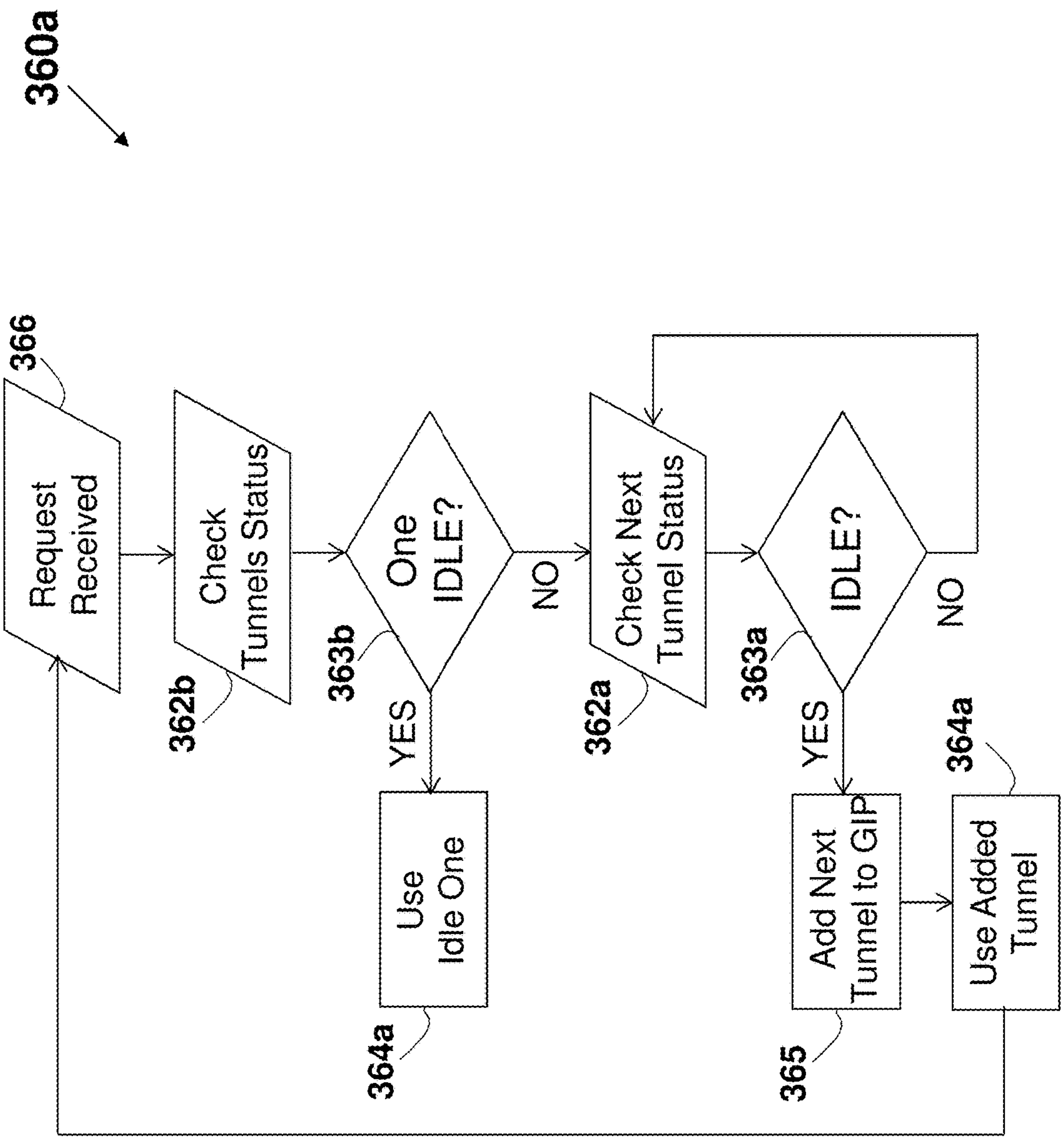

An example of dynamically forming an IP group, such as the IP group 341 is illustrated in a flow chart 360 shown in FIG. 36. For a start, a single IP address, such as the IP #1 341*a*, is assigned to the IP group as part of a "Assign IP #1 to GIP" step 361. Upon receiving a request for content from the client device, as part of a "Request Received" step 366 (such as the client device #1 31*a*), which is associated with the IP group, for example as part of the "Content Request" step 82 or the "Send Request to SF" step 161. The idling status of this single tunnel device (identified by the IP #1 341*a*) is checked as part of a "Check Tunnel Status" step 362, which may correspond to the idling status described relating to the "IDLE?" step 321 in the flow chart 320. In the case as part of a "IDLE?" step 363 the tunnel device is idling and is available to serve as a tunnel device, this single tunnel device (identified by the IP #1 341*a*) is selected as part of a "Use IP #1" step 364.

However, in the case where this single tunnel device is not available (such as not idling), another tunnel device is suggested, such as the one associated with the IP #2 341*b*. In case a criterion is defined for the content request, the suggested tunnel device is selected so that it satisfies the criteria. As part of a "Check Next Tunnel Status" step 362*a*, the idling status of this suggested tunnel device (identified for example by the IP #2 341*b*) is checked. If it is decided as part of an "IDLE?" step 363*a* that the suggested tunnel device is available for operation as a tunnel device (such as being in an idling state), the suggested tunnel device is added to the IP group 341 as part of an "Add Next Tunnel to GIP" step 365, followed by using the tunnel for retrieving the required content as part of an "Use Added Tunnel" step 364*a*. At this point, the IP group 341 includes two tunnel devices, namely the original IP #1 341*a* and the newly added IP #2 341*b*. However, in the case where it is determined in the "IDLE?" step 363*a* that the suggested tunnel device is not available as a tunnel device, another tunnel device is suggested, and is available, the another tunnel device is used and added to the IP group 341.

In steady state, each time a request is received as part of the "Request Received" step 366, the process is repeated, and the availability of a tunnel device that is already part of the IP group is checked as part of a "Check Tunnels Status" step 362*b*, which may correspond to the idling status described relating to the "IDLE?" step 321 in the flow chart 320. In the case as part of a "One IDLE?" step 363*b* one of the tunnel devices already in the group is idling and is available to serve as a tunnel device, this tunnel device is selected as part of a "Use Idle One" step 364*a*. However, if no tunnel device in the group is found to be available, another tunnel device is suggested, and its availability is checked as part of the "Check Next Tunnel Status" step 362*a*. If it is decided as part of an "IDLE?" step 363*a* that the newly suggested tunnel device is available for operation as a tunnel device (such as being in an idling state), the suggested tunnel device is added to the IP group 341 as part of an "Add Next Tunnel to GIP" step 365, followed by using the tunnel for retrieving the required content as part of an "Use Added Tunnel" step 364*a*. However, in the case where it is determined in the "IDLE?" step 363*a* that the suggested tunnel device is not available as a tunnel device, other tunnel device is suggested, and if available, the other tunnel device is used and added to the IP group 341 and will be used for the content retrieving. Over time, after multiple iterations, the IP group 341 will include a suitable number of IP addresses of tunnel devices where at least one is generally expected to be available when required.

The number of tunnel devices that may be handled by the system may be very high, and may reach hundreds of thousands. In order to better manage and control such large number of entities, it may be preferable to aggregate few tunnel devices into a group or collection, and to handle the group as a single unit, offering better manageability. In one example, a number of IP addresses, that identify corresponding tunnel devices in the system, are collectively identified by a single label. The label may be any characters set, any alphanumeric string, any number, or any other identification. Any two labels may identify the identical same number of IP addresses, similar number of IP addresses, or different number of IP addresses. In one example, a label may identify a collection of at least 1, 2, 3, 5, 10, 12, 15, 20, 50, 80, 100, 120, 150, 200, 300, 500, or 1,000 IP addresses. Alternatively or in addition, a label may identify a collection of less than 2, 3, 5, 10, 12, 15, 20, 50, 80, 100, 120, 150, 200, 300, 500, 1,000, or 2,000 IP addresses. Further, the format of the label may be similar or identical to an IP address, referred herein as Virtual IP (VIP). Preferably, each label identifies multiple IP addresses that are associated with the same attribute, feature, or characteristic, such as the same geographical location (relating to the column 102*c* in the table 100), the same ASN (relating to the column 102*d* in the table 100), the same connection type (relating to the column 102*e* in the table 100), the same operating system (relating to the column 102*f* in the table 100), the same bandwidth (BW) (relating to the column 102*g* in the table 100), or the same RTT (relating to the column 102*h* in the table 100).

Figure 37:
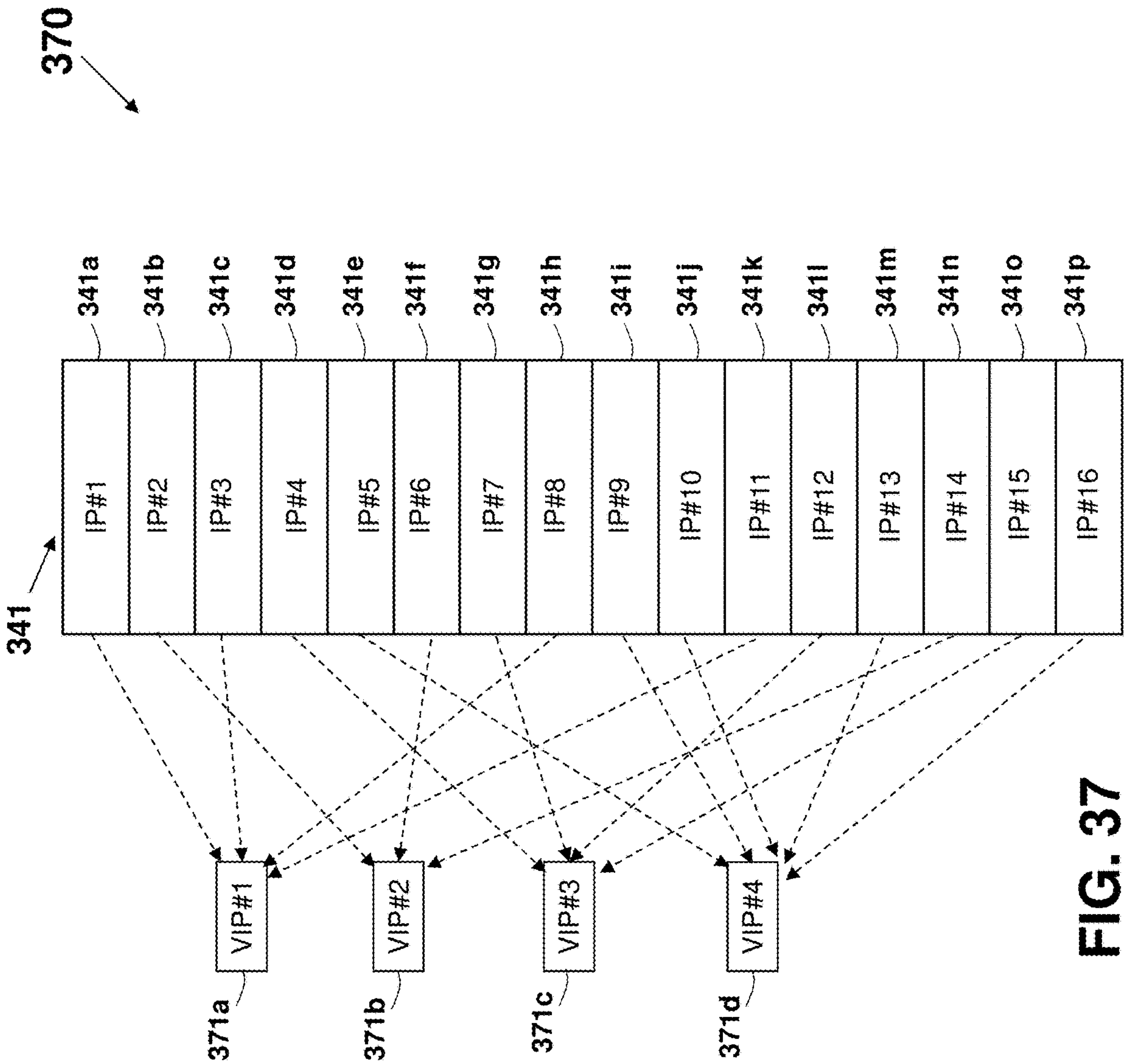
FIG. 37 depicts schematically an IP addresses group and non-overlapping sub-groups of VIP labels.
Figure 37A:
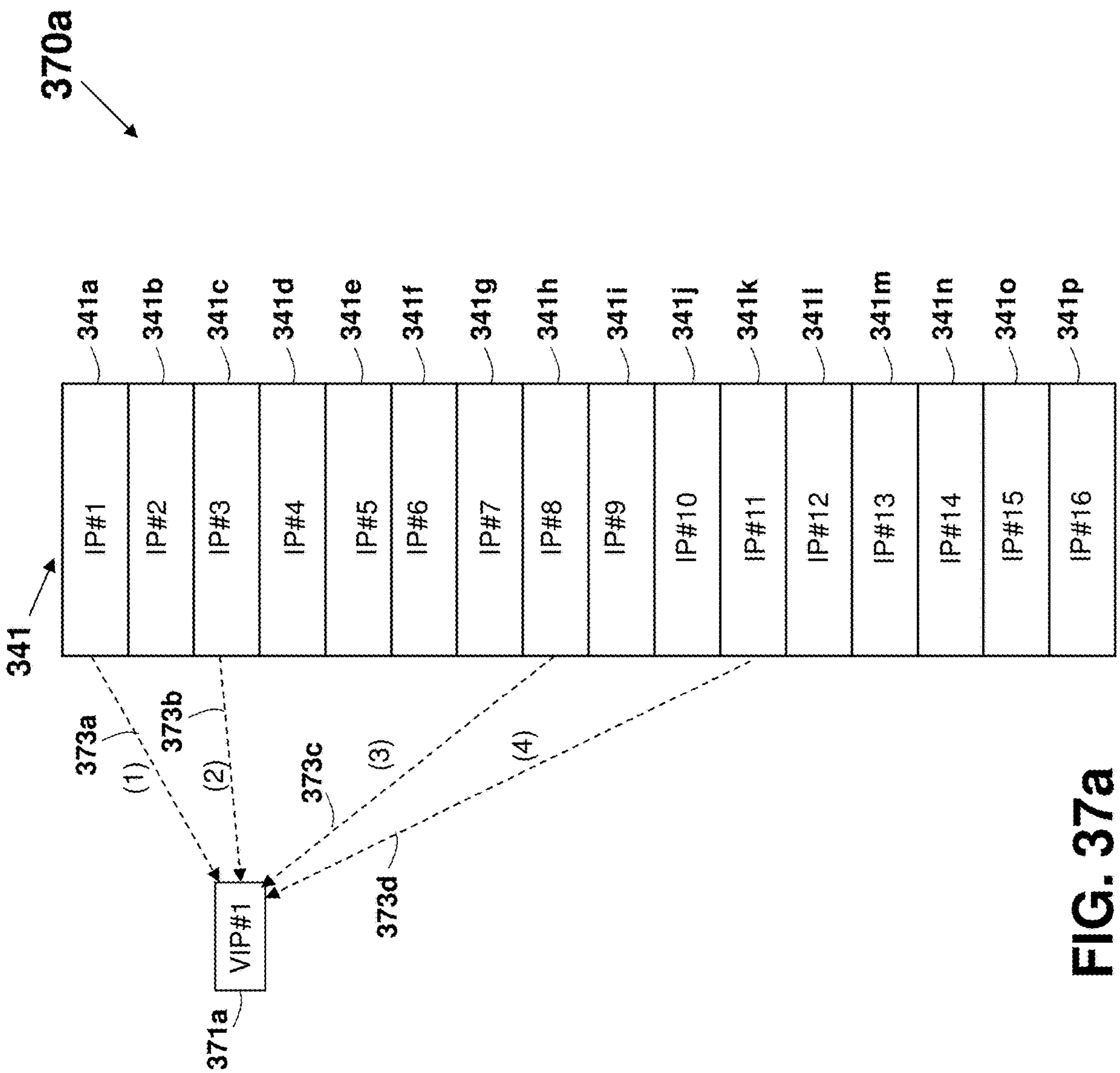
FIG. 37*a* depicts schematically assigning a VIP label to multiple IP addresses.

An example of such a labelling scheme is illustrated in a view 370 shown in FIG. 37, exampling the IP addresses collection 341 of 16 IP addresses. A first label VIP #1 371*a* identifies IP #1 341*a*, IP #3 341*c*, IP #8 341*h*, and IP #11 341*k*, a second label VIP #12 371*b* identifies IP #2 341*b*, IP #6 341*f*, and IP #14 341*n*, a third label VIP #3 371*c* identifies IP #4 341*d*, IP #7 341*g*, IP #12 341*l*, and IP #15 341*o*, and a fourth label VIP #4 371*d* identifies IP #5 341*e*, IP #9 341*i*, IP #10 341*j*, IP #13 341*m*, and IP #16 341*p*. The labeling may makes use of mapping table that associate a label with its members. In some cases, such a table may be too big to handle, and may consume substantial computing resources. Alternatively or in addition, a function may be defined, which map each of the IP addresses to a single label, such as a single VIP. Such a function operation is illustrated in a view 370*a* shown in FIG. 37*a*. A defined function map the IP #1 341*a* via a function operation 373*a* to the VIP #1 371*a*, the IP #3 341*c* is mapped via the same function operation 373*b* to the VIP #1 371*a*, the IP #8 341*h* is mapped via the same function operation 373*c* to the VIP #1 371*a*, and similarly the IP #11 341*k* is mapped via the same function operation 373*d* to the VIP #1 371*a*.

Figure 37B:
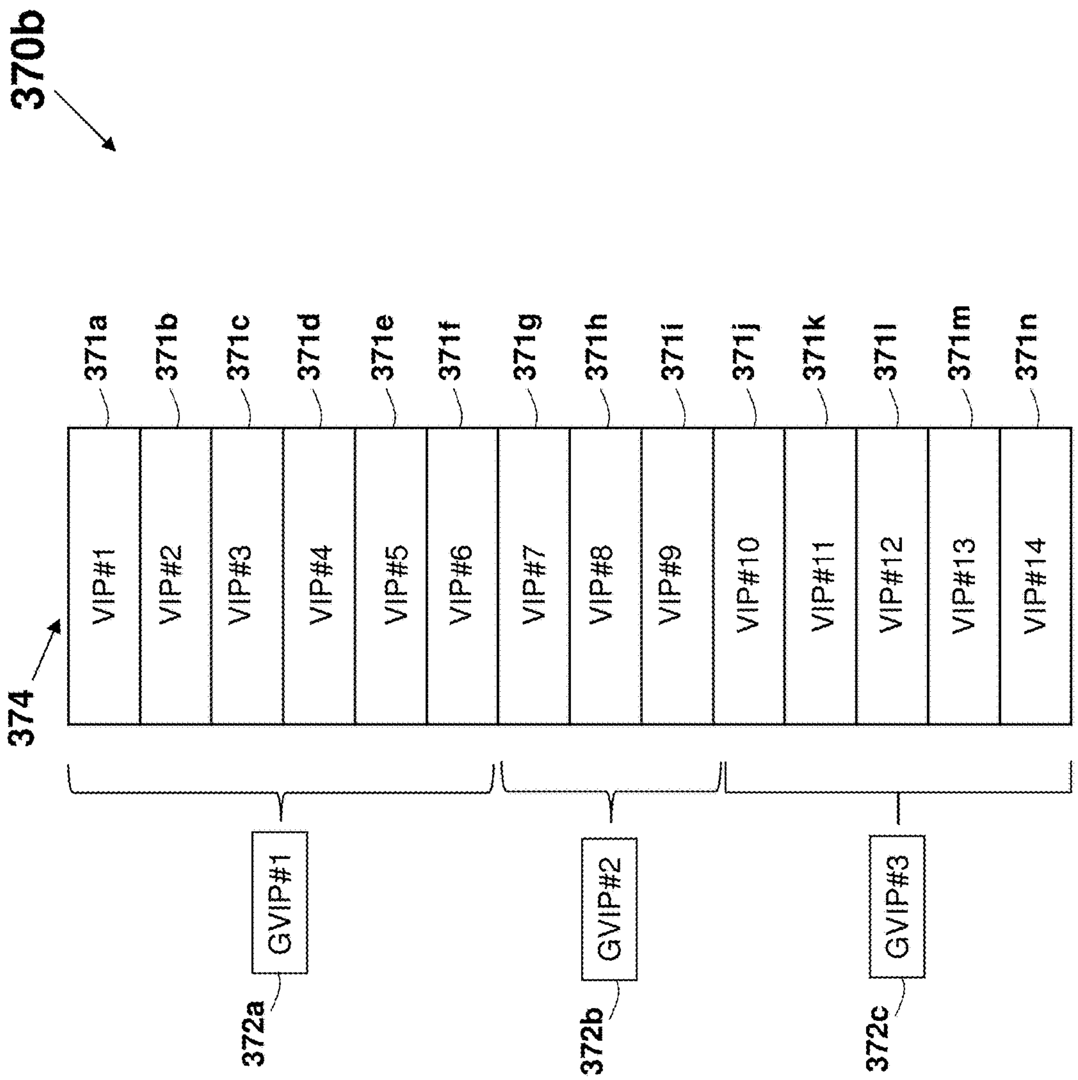
FIG. 37*b* depicts schematically a group and non-overlapping sub-groups of VIP labels.

While the IP group 341 and the sub-groups (such as GIP #1 342*a* or GIP #2 342*b*) were described in the views 340-340*c* (in FIGS. 34-34*c*) as containing IP addresses, such as IP #1 341*a* and IP #2 341*b*, which represent available tunnel devices, a group (or a sub-group) may include labels as a substitute for, or in addition to, specific IP addresses. An example of such a VIP group 374 is illustrated in a view 370*b* shown in FIG. 37*b*. The VIP group is exampled to include 14 VIP labels, ranging from a VIP #1 371*a* to VIP #14 371*n*, and includes the labels VIP #2 371*b*, VIP #3 371*c*, VIP #4 371*d*, VIP #5 371*e*, VIP #6 371*f*, VIP #7 371*g*, VIP #8 371*h*, VIP #9 371*i*, VIP #10 371*j*, VIP #11 371*k*, VIP #12 371*l*, VIP #13 371*m*, and VIP #14 371*n*. All of, or part of, the VIP labels in the VIP group 371 may be associated with one or more of the attributes shown in the table 330 in FIG. 33. Similarly, sub-groups may be defined to include a collection of VIP labels, such as a GVIP #1 372*a* that is shown to include the VIP #1 371*a*, VIP #2 371*b*, VIP #3 371*c*, VIP #4 371*d*, VIP #5 371*e*, and the label VIP #6 371*f*. Similarly, a second sub-group GVIP #2 372*b* may be defined and may include the labels VIP #7 371*g*, VIP #8 371*h*, and the VIP #9 371*i*, and a third sub-group GVIP #3 372*c* may be defined and may include the labels VIP #10 371*j*, VIP #11 371*k*, VIP #12 371*l*, VIP #13 371*m*, and the VIP #14 371*n*. A VIP group (such as the VIP group 374), or a sub-group such as the GVIP #1 372*a*, may include a number that is equal or higher than 1, 2, 5, 10, 12, 15, 20, 20, 30, 50, 80, 100, 120, 150, 200, 500, 1,000, 2,000, 5,000, or 10,000 VIP labels. Alternatively or in addition, a VIP group (such as VIP group 374), or a sub-group such as GVIP #1 372*a*, may include less than 5, 10, 12, 15, 20, 20, 30, 50, 80, 100, 120, 150, 200, 500, 1,000, 2,000, 5,000, 10,000 or 20,000 VIP labels.

In one example, the mapping function (such as the function operating as 373*a*, 373*b*, 373*c* and 373*d*) may be a hash function, where the labels are the resulting hash values. The hash function may include checksum, check digit, fingerprint, lossy compression, randomization function, error-correcting code, or cipher. In one example, the hash function (such as the function operating as 373*a*, 373*b*, 373*c* and 373*d*) may be based on, or comprises, a Secure Hash Algorithms (SHA). In another example, the mapping function is using, includes, or is based on, a modulo function or operation, which assigns a remainder after division of one number by a number N (sometimes called modulus), for example according to IEEE standard 754-1985. In such a configuration, N is the number of required labels for the group, a number is assigned to each tunnel device, and the associated label is the assigned number modulo N. N may be a number that is equal or higher than 1, 2, 5, 10, 12, 15, 20, 20, 30, 50, 80, 100, 120, 150, 200, 500, 1,000, 2,000, 5,000, or 10,000 labels. Alternatively or in addition, N may be less than 5, 10, 12, 15, 20, 20, 30, 50, 80, 100, 120, 150, 200, 500, 1,000, 2,000, 5,000, 10,000 or 20,000 labels. The number assigned to each of the tunnel device may correspond, may be based on, or may include, any identifier of the specific tunnel device, such as the associated tunnel device IP address, a random number, or a sequential number according to the order of registering in the system or the order upon which the tunnel device was first listed as part of the database 73 of the TB server 71, or based on the order of establishing connection with the TB server 71, such as part of the "Establish Connection" step 173. Alternatively or in addition, the assigned number may be based on any other attribute of the tunnel devices as shown in the table 100, such as according to a feature, attribute, or a characteristic, using their associated numerical value (e.g., IP address value), or according to their alphanumeric identifier (e.g., host name or location name in ASCII value).

Any selecting of an element (or multiple elements) from a collection or a group of elements herein, such as the selecting of a tunnel device (for example, by selecting its associated IP address) as part of the "Tunnel Selection" step 83 shown as part of the flow chart 80 or the "Select Tunnel" step 146 shown as part of the flow chart 140b, as well as part of a "Select Tunnel From Group" step 146a, may be based on random, quazi-random, or deterministic selection. Similarly, the selection of a sub-group or a label (such as VIP label) may be based on random, quazi-random, or deterministic selection.

Using random selection allows for load balancing, preferably by equally distributing the workload across the elements, which may optimize resource use, maximize throughput, minimize response time, and avoid overload of any single resource. The randomness may be based on using a random signal generator. The random signal generator may be based on a digital random signal generator having a digital output. Alternatively, the random signal generator may be based on analog random signal generator having an analog output. Analog random signal generator may use a digital random signal generator whose output is converted to analog using analog to digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

Alternatively or in addition, the selection may be deterministic based. In one example, the elements to select from are listed in an orderly fashion, such as according to a feature, attribute, or a characteristic, using their associated numerical value (e.g., IP address value), according to their alphanumeric identifier (e.g., host name or location name in ASCII value), according to the order that joined the collection or group, or according to the order they were formerly selected from the group or collection. In such a case, the elements are sequentially selected according to the list order. In one example, a LIFO (last in first out) like scheme may be used, where the lastly selected entity is re-selected, and upon its unavailability, the one entity that was selected before the last is selected. Alternatively or in addition, a FIFO (first in first out) like scheme is used, where the oldest formerly selected entity selected.

In order to better control or manage the large number of potential tunnel devices, tunnel groups may be defined. A tunnel group may include more than 10, 20, 50, 100, 200, 500, 1000, 2000, 5000, or 10,000 different tunnel devices (or different IP addresses) that may be used for tunneling as described herein. Alternatively or in addition, a group may include less than 20, 50, 100, 200, 500, 1000, 2000, 5000, 10,000 or 20,000 different tunnel devices or different IP addresses. A tunnel group may be identified by a tunnel group identifier, so that the tunnel list memory 73 associate a tunnel group identifier to all the members in that group. In one example, the data base storing the tunnel device identifiers, such as the table 330, further includes a column associating each potential tunnel device to its tunnel group, such as by the tunnel group identifier. In one example, the tunnel groups are non-overlapping, where a tunnel device may be included only in a single tunnel group. Alternatively or in addition, a tunnel device may be included in multiple groups. Preferably, the tunnel devices in a tunnel group share the same value (or values or a value range). For example, a tunnel group may include only potential tunnel devices that are associated with the same ASN, as defined in the Column ASN 102d in the table 330. In another example, a tunnel group may include only potential tunnel devices that are associated with the same geographical location, such as being in the same country or city, as defined in the Geographical Location column 102c in the table 330.

As described herein, as part of the "Send Request to SP" step 161, the client device 31a may influence the selected tunnel by defining an attribute type and an attribute value (or values or a value range). Further, as part of the "Send Tunnel IP to SF" step 161a, the client device 31a may select a specific tunnel device that will be used for the specific content fetching. In a case where tunnel groups are defined, the client device 31a may, as part of the "Send Request to SF" step 161, select a tunnel group by using its tunnel group identifier. In such a case, the SP server 72 forwards the received tunnel group identifier to the TB server 71, which in turn selects as part of the "Select Tunnel" step 146 (such as by random selection or by any orderly selection) a tunnel device from the defined group. For example, the TB server 71 may identify the available tunnel devices from the group, such as by identifying those devices (or IP addresses) having a respective 'Y' value in the "IDLE" column 102i, and select from these available to be used tunnel devices (such as by random selection or by any orderly selection). In such a way, the client device 31a may repeatedly select from the same tunnel group, allowing for better control and management of the selected tunnel devices. Such mechanism may further be used to emulate to the web server 22b a consistency of content fetched from a group of tunnel devices that share an attribute vale (such as an ASN or a geographical location). An example of using tunnel groups is attached in vipdb.js, customer.js, and vipdb_make.js files. Further, IP allocation of data center IPs is described in the attached code ip_alloc.js, IP allocation for customer of data center IPs is described in the attached code vip_alloc.js, and IP/vIP allocation for customers is described in the attached code using ip_alloc.js and vip_alloc.js.

In one example, the database that include the IP list 341, the sub-group lists (such as VIP #1 371a and the VIP #2 371b), the labels list 374, the label groups (such as the GVIP #1 372a and the GVIP #2 372b), or any combination thereof, that is associated with a one of, multiple of, or each one of all of, the client devices (such as the client device #1 31a), is stored in the TB server 71, for example as part of the database 73. In such a case, the selecting a tunnel device from the group, the selecting a sub-group, or the selecting a tunnel device from the sub-group, is also performed by the TB server 71, as part of the "Select Tunnel" step 146 as part of the flow chart 140b that is performed by the TB server 71, and may include part of, or all of, the "Select Tunnel" step 146a shown in the FIG. 35, or the flow chart 350a shown in FIG. 35a.

Alternatively or in addition, the selecting a tunnel device from the group, the selecting a sub-group, or the selecting a tunnel device from the sub-group, as well as the storing of the database that include the IP list 341, the sub-group lists (such as VIP #1 371a and the VIP #2 371b), the labels list 374, or the label groups (such as the GVIP #1 372a and the GVIP #2 372b), or any combination thereof, that is associated with a one of, multiple of, or each one of all of, the client devices (such as the client device #1 31a), is performed by the SP server 72.

The examples above illustrated a TB server 71 that is involved in the tunnel registration and connection, such as part of the "Registration and Connection" step 81, as well as in the tunnel selection, such as part of the "Tunnel Selection" step 83. For example, the flow chart 140 shown in FIG. 14 describes the Connection handler flow chart 140*a*, dealing with the registration and tracking, such as by updating a tunnels table, and the selecting of a tunnel for serving a client request as part of the Request Handler flow chart 140*b*. Alternatively or in addition, the selecting of a tunnel to serve a content request from the client device 31*a* may be handled, in whole or in part, by the SP server 72. In such a scheme, the full list, or part thereof, of the available tunnels that may be used, is made available to the SP server by the TB server 71. The tunnel selecting, such as part of the "Select Tunnel" step 146 shown in FIG. 14, as part of the "Select Tunnel" step 146 shown as part of the Selection Handler 201 in FIG. 20, or as part of the "Select Tunnel" flow chart 146*a* shown in FIG. 35, is performed by the SP server 72, as a substitute for, or in addition to, the TB server 71.

Figure 38:
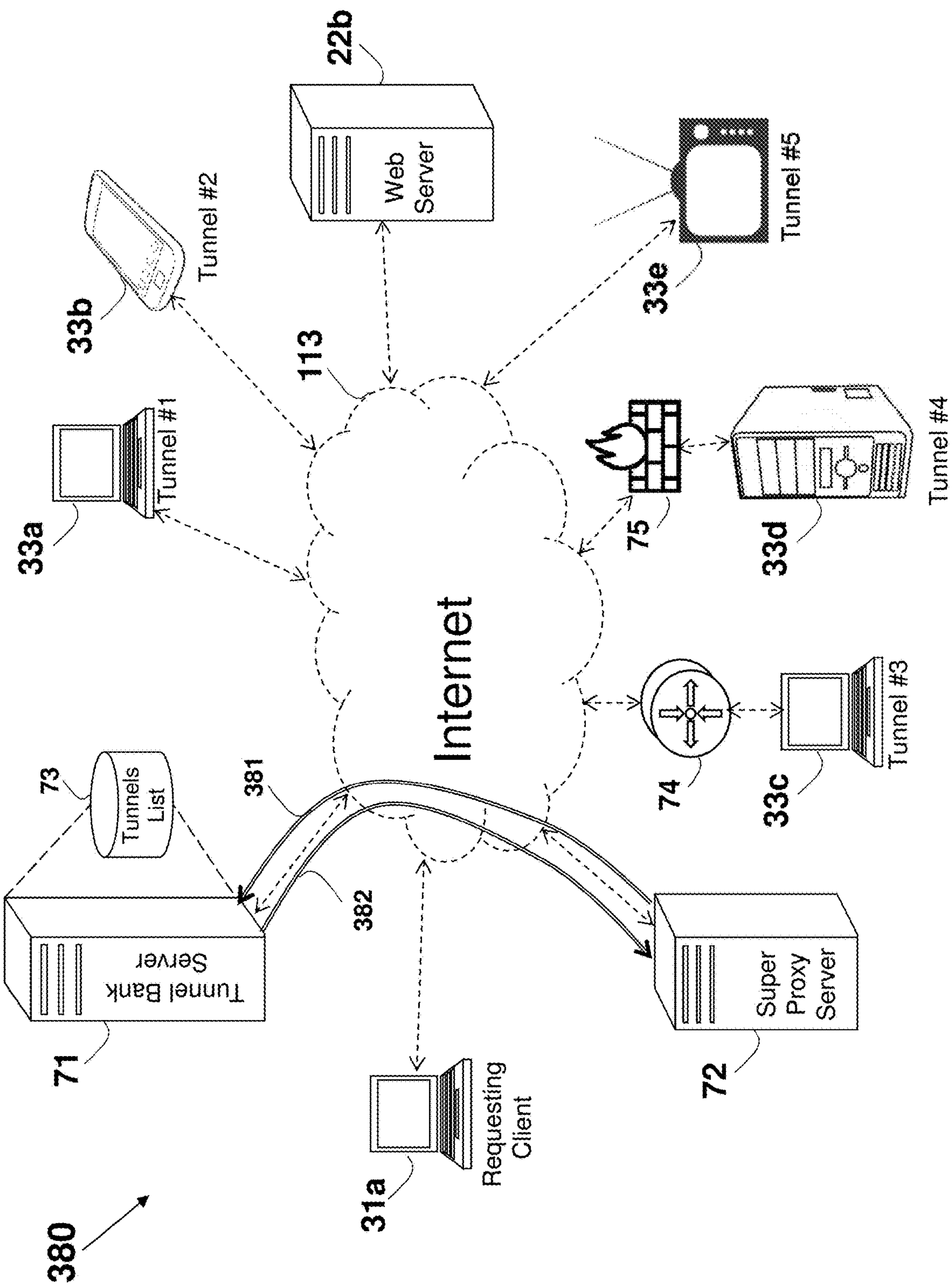
FIG. 38 depicts schematically messages relating to tunnel lists exchanged over the Internet between the TB server and the SP server.

In one example, the full list, or a part thereof, of the available tunnels, is periodically sent to update the SP server 72, shown as a data path 382 in a messaging chart 380 shown in FIG. 38. Such updating may take place at least any 1 second, 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 3 months, or less than 2 seconds, 5 seconds, 10 seconds, 20 seconds, 30 seconds, 1 minute, 2 minutes, 5 minutes, 10 minutes, 20 minutes, 30 minutes, 1 hour, 2 hours, 5 hours, 10 hours, 1 day, 2 days, 4 days, 1 week, 2 weeks, 3 weeks, 1 months, 2 months, or 6 months. Alternatively or in addition, the list update may be provided by a request from the SP server 72, shown as a data path 382 in the messaging chart 380. For example, such request may be initiated by the SP server 72 upon receiving one or more requests (such as above pre-set threshold) from the client devices, or upon using many tunnel devices (such as above pre-set threshold).

In case where the tunnels list stored by the TB server 71 is composed of groups, as described above, the TB server 71 may only send to the SP server 72 selected groups of the list. For example, only frequently used groups may be updated or sent to the SP server 72. Further, the SP server 72 may request, such as by using the request data path 381, one or more groups according to a specific criteria or attributes, similar or identical to the criteria or attributes as described above regarding the selection by the client device 31*a*.

Figure 39:
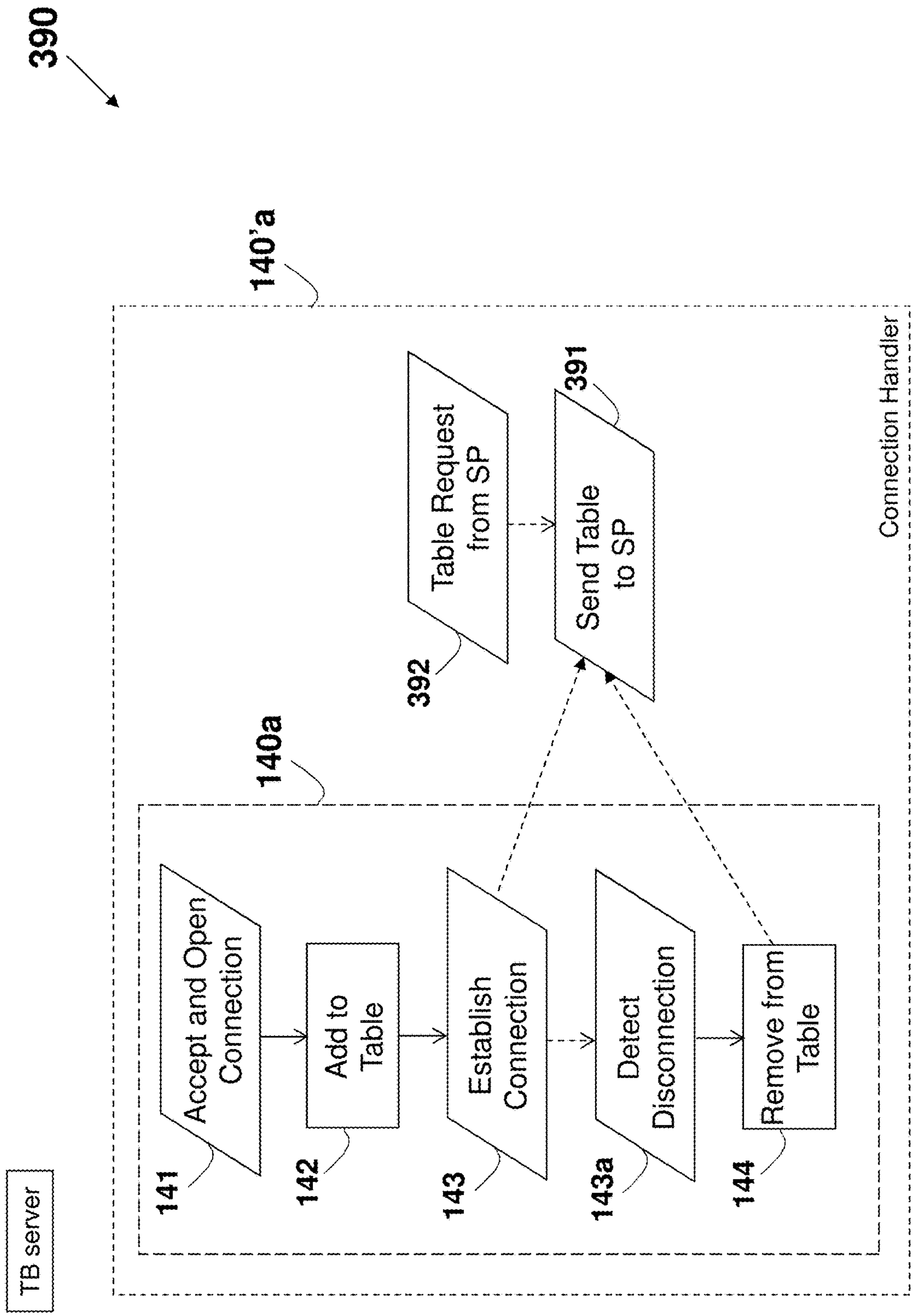
FIG. 39 illustrates schematically simplified flowchart relating to a TB server that is involved in sending tunnels lists to the SP server.

A flow chart 140'*a* shown in FIG. 39, which corresponds to the flow chart 140*a* shown in FIG. 14, describes the operation of the TB server 71 in a scenario where the tunnel selection is performed by the SP server 72. A part of, or whole of, the tunnels table is sent to the SP server 72 as part of a "Send Table to SP" step 391, which may correspond to the data path 382. Such updating may be performed periodically, or as a response to a request from the SP server 72 as part of a "Table Request from SP" step 392 (which may correspond to the request path 381). Further, the available tunnels updating of the SP server 72 as part of the "Send Table to SP" step 391 may be initiated by the TB server 71 itself, such as based on number of changes in the table, for example after exceeding a pre-set threshold number of changes in tunnel devices status, such as number of tunnel devices added to the table, number of tunnel devices removed from the table, or any combination thereof.

Figure 39A:
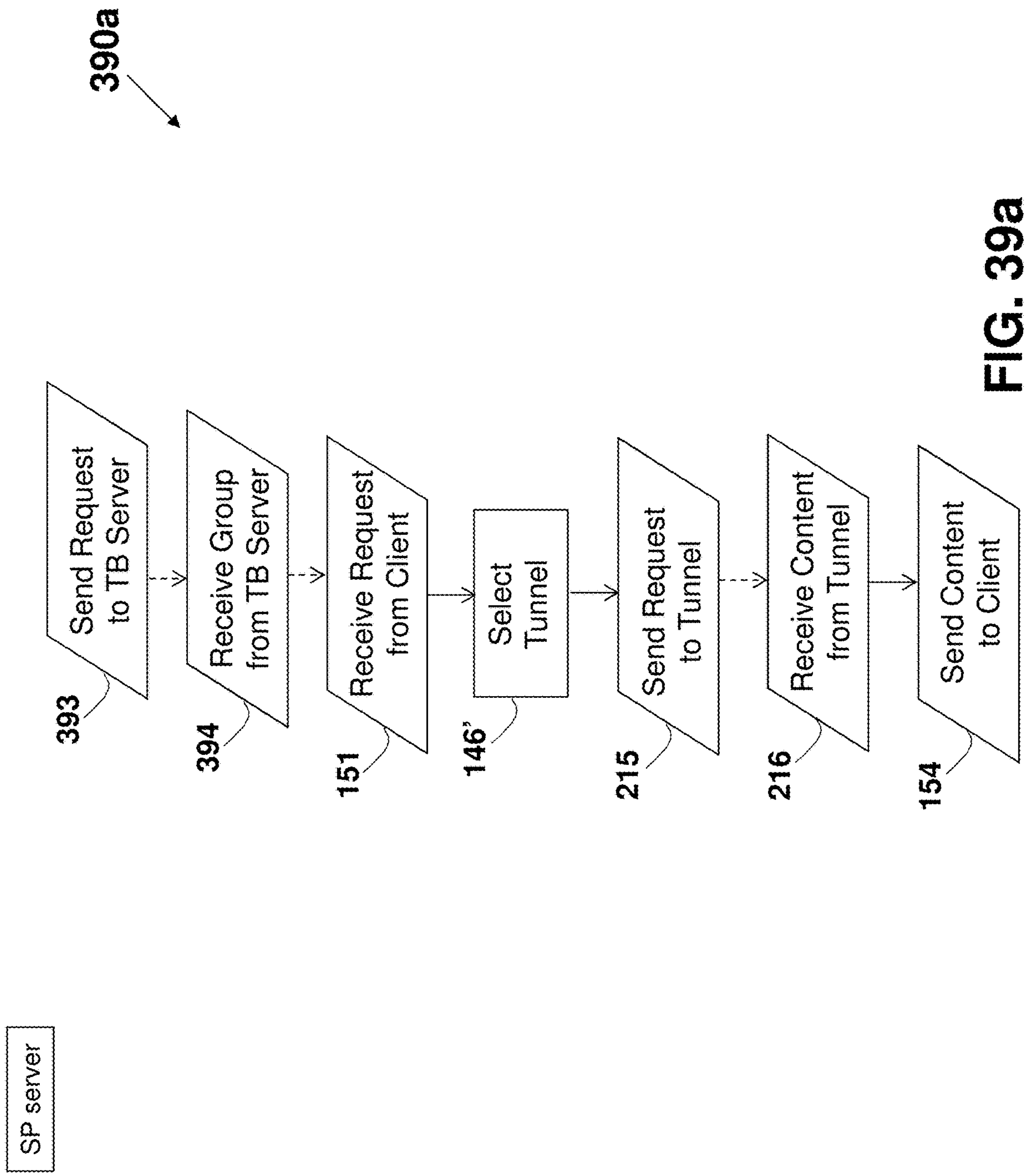
FIGS. 39*a* and 39*b* illustrate schematically simplified flowcharts relating to a SP server that is involved in selecting tunnels.
Figure 39B:
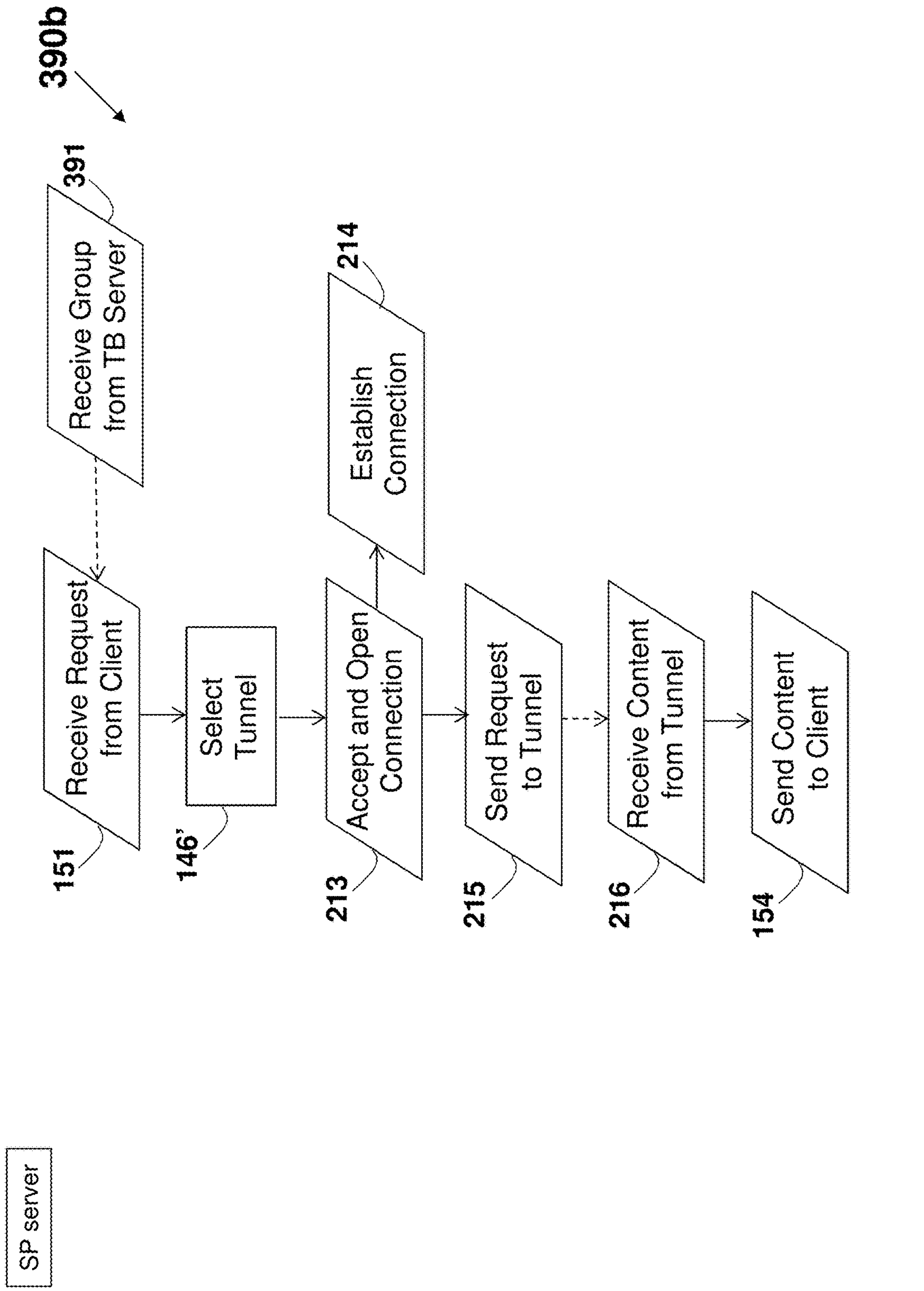

A flow chart 390*a* shown in FIG. 39*a*, which corresponds to the flow chart 210 shown in FIG. 21, describes the operation of the SP server 72 in a scenario where the tunnel selection is performed by the SP server 72. The full list of available tunnel devices, or a part thereof, is received as part of a "Receive Group from TB Server" step 394, which may correspond to the data path 382 shown in the messaging chart 380. After receiving a request from the client device 31*a* (that may include criteria or attribute for the tunnel selecting) as part of the "Receive Request from Client" step 151, the SP server 72 select a tunnel for fetching the requested content as part of the "Select Tunnel" step 146'. The receipt of the list of available tunnels may be initiated by the SP server 72 as part of a "Send Request to TB Server" step 393, which may correspond to the data path 381 shown in the messaging chart 380. While the TB server 71 is exampled above to perform the opening of connection with the selected tunnel, such connection opening and establishing may be performed (as an alternative for, or in addition to the TB server 71) by the SP server 72 itself, as shown in the flow chart 390*b* shown in FIG. 39*b*.

The exemplary arrangement 130 shown in FIG. 13 above, as well as other examples herein, involves selecting of a single tunnel device, such as the tunnel device #4 33*d*, for fetching the required content from the web server 22*b* to the requesting client 31*a*. Alternatively or in addition, multiple tunnel devices may be selected for fetching the same content from the same web server 22*b*. The selecting of redundant multiple tunnel devices may be used for increasing the fetching resiliency and reliability, since in case where one of the selected tunnel devices is unable to fetch the required content, still the requested content may be fetched by another selected tunnel device. For example, a selected tunnel device may become unavailable by transferring, such as by detecting non-idling activity 315*d*, to the ACTIVE state 312 active from the IDLE state 313, as described in the state diagram 310 shown in FIG. 31. Alternatively or in addition, the selected tunnel device may be switched off by a user, or become faulty. Similarly, the connection links or the message transfers involved in the fetching of the content, such as the each of message path 131*b* to the selected tunnel device #4 33*d*, the content request 131*c* to the web server 22*b*, the web server reply 131*d*, or the content transfer 131*e* to the TB server 71, may become faulty or otherwise unavailable, rendering the selected tunnel device #4 33*d* unavailable for such content fetching. Further, the web server 22*b* may block the tunnel device #4 33*d* from accessing any content in general, or the requested content in particular, thus again rendering the selected tunnel device #4 33*d* unavailable for the required content fetching. Further, using selecting multiple tunnel devices and using them in parallel may accelerate the fetching operation by using the first content that is fetched, and discarding the others that may be received later. Such mechanism allows for using the quickest tunnel, and thus improved the total responsiveness for the content request. When using multiple tunnel devices, the "Tunnel Selection" step 83 shown as part of the flow chart 87 in FIG. 8 includes selecting multiple tunnel devices for the same "Content Request" step 82, and each of the selected tunnel devices is used as part of "Using Tunnel" step 84 shown as part of the flow chart 87 in FIG. 8.

The number of tunnel devices that may be selected for a specific single content request may me equal to, or more than, 2, 3, 4, 5, 6, 7, 8, 9, 10, 12, 15, 20, 30, 35, 40, 45, 50, 60, 70, or 100. Alternatively or in addition, the number of tunnel devices that may be selected for a specific single content request may be less than 3, 4, 5, 6, 7, 8, 9, 10, 12, 15, 20, 30, 35, 40, 45, 50, 60, 70, 100, or 150. Preferably, the selected tunnels may be selected based on the same criterions, be part of the same group, or associated with the same label. Further, the selection or the using of the multiple tunnel devices may be partly or fully in parallel. Alternatively or in addition, the selection or the using of the multiple tunnel devices may be sequential. Further, the selection or the using of the multiple tunnel devices may be a combination of parallel and sequential steps. For example, the selection mechanism may be sequential, where a first tunnel device is selected, and only afterwards a second one is selected, followed by a third one to be selected. Alternatively, the multiple tunnels are selected together. Further, the process of selecting a second tunnel may be initiated only after the first tunnel was selected and the content request was sent thereto, to be followed by selecting a third tunnel only after the second tunnel was selected and the content request was sent thereto. Each of the selected tunnel devices may execute part of, or whole of, the tunnel device related functionalities, steps, or methods, such as the flow chart 170 shown in FIG. 17, the flow chart 220 shown in FIG. 22, the flow chart 240*b* shown in FIG. 24*b*, the flow chart 240*c* shown in FIG. 24*c*, the flow chart 300 shown in FIG. 30, the flow charts 300-320*a* shown in FIGS. 30-32*a*, or any combination thereof. The execution of such related functionalities, steps, or methods, may be executed in parallel, or sequentially, with the other selected tunnels.

Figure 40:
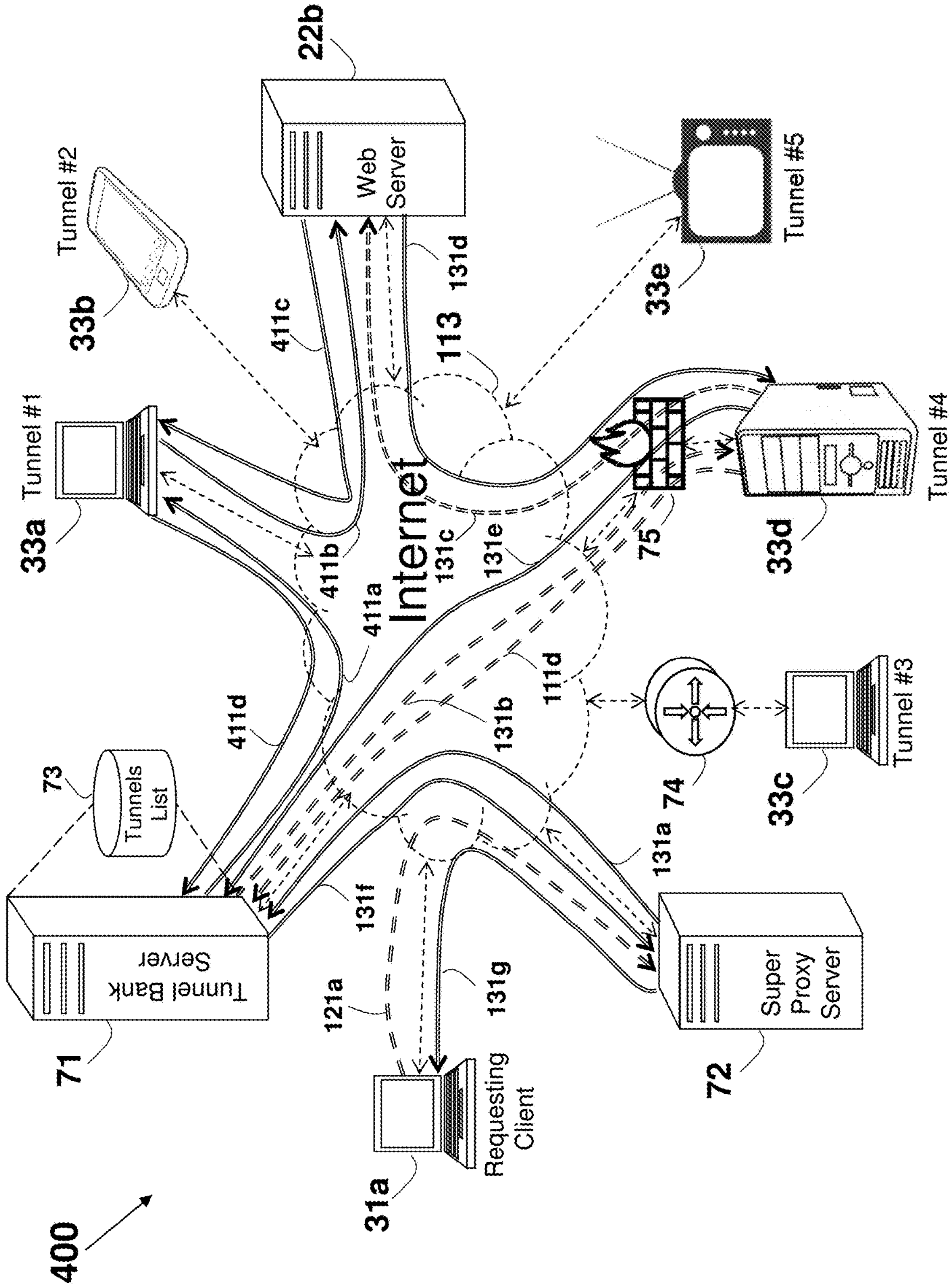
FIG. 40 depicts schematically messages exchanged over the Internet for fetching content from the web server to the client device via two tunnel devices, the TB server, and the SP server.

An example of using two tunnel devices for fetching the same content from the same web server 22*b* is shown in a messaging chart 400 shown in FIG. 40, which corresponds to the messaging chart 130 shown in FIG. 13. In addition to fetching the content by using the selected tunnel device #4 33*d*, the TB server 71 further selects the tunnel device #1 33*a*, as an example, as another tunnel device to be used. In parallel to, or after, the tunnel device #4 33*d* is selected and accessed for the content. Upon completing the selection of the tunnel #1 33*a*, the TB server 71 forwards the requested content identification to the selected tunnel #1 33*a*, shown as a message path 411*a* in the messaging chart 400 shown in FIG. 40. Such communication uses the established connection (such as the TCP connection) that was established during the "Registration and Connection" phase 81. The message sent over the message path 411*a* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the TB server 71 executes a server side protocol, and the tunnel #1 31*a* executes a client side protocol. Alternatively or in addition, the TB server 71 may executes a client side protocol, and the tunnel #1 31*a* may execute a server side protocol.

In response to the request message 411*a*, the selected tunnel #1 33*a* sends a request for the identified content to the appropriate server that stores the required content, exampled to be the web server 22*b*, shown as a message path 411*b* in the messaging chart 400*b* in FIG. 40. Thus, the "Using Tunnel" phase 84 is completed where the request arrives at the content source, namely the web server 22*b*. The message sent over the message path 411*b* may use a proprietary protocol, agreed upon between the two communicating nodes. Preferably, the HTTP or HTTPS protocol may be used, where the web server 22*b* executes a server side protocol, and the tunnel #1 33*a* may execute a client side protocol. Further, any tunneling protocol or mechanism may be used where the selected tunnel, which is the tunnel #1 33*a* in the example herein, serves as a tunnel between the TB server 71 and the web server 22*b*.

The requested content is then fetched from the web server 22*b* to the requesting client 31*a*, as part of the "Content Fetching" phase 85, along the 'opposite' route of the request flow. As shown in a messaging chart 400 shown in FIG. 40, the content is first sent from the web server 22*b* to the selected tunnel #1 33*a* along a message path 411*c*, which in turn sends it to the TB server 71 along a message path 411*d*, which in turn sends it to the SP server 72 along a message path 131*f*, arriving at the requesting client 31*a* along a message path 131*g*, completing the second request/response cycle from the client device 31*a* point of view. The protocol or protocols, as well as the messages format, or any other attribute or functionality involved with the using of the tunnel device #1 33*a* may be identical, similar, or different, from the corresponding protocols or message formats used as part of employing the tunnel device #4 33*d*. For example, the content request path 411*a* relating to employing the tunnel device #1 33*a* may be identical, similar, or different, from the corresponding request path 131*b* relating to the employing the tunnel device #4 33*d*. In one example, the content request path 411*a* may use Socket Secure (SOCKS) based protocol, while the corresponding request path 131*b* may use, or may be based on, HTTP Proxy protocol. In case of selecting and using more than two tunnel devices as exampled in the messaging chart 400, each the process of fetching content from each such selected device may be identical, similar, or different from any other.

Figure 41:
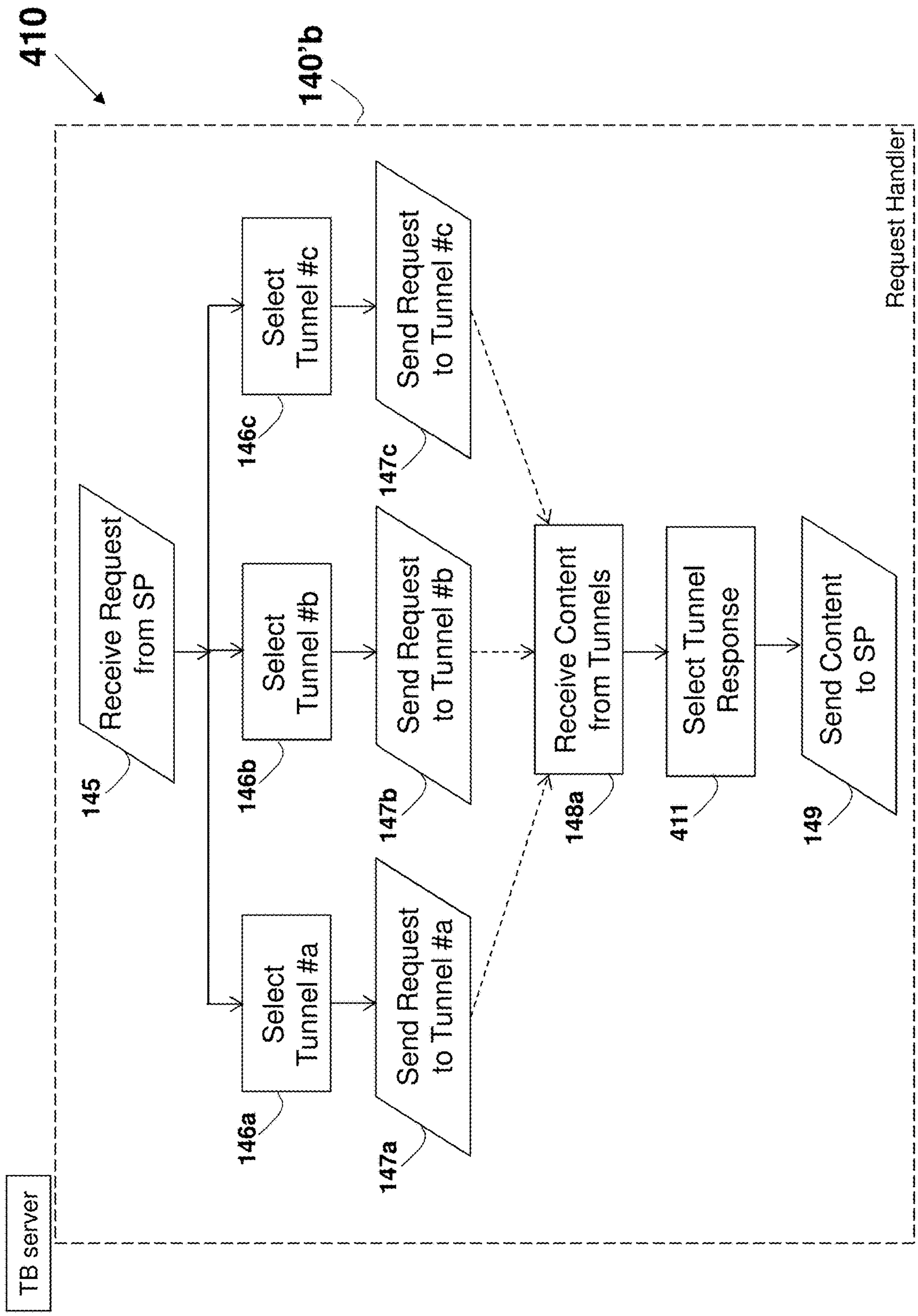
FIG. 41 illustrates schematically a simplified flowchart relating to a TB server that selects and employs three tunnel devices in parallel.

A "Request Handler" flow chart 140'*b* shown in FIG. 41 is based on the "Request Handler" flow chart 140*b*, where multiple tunnel devices are selected and used. In this example, three tunnel devices, designated as #a, #b, and #c, are selected and used. For example, the tunnel device #a may correspond to the tunnel device #4 33*d*, and the tunnel device #b may correspond to the tunnel device #1 33*a*, as illustrated in the messaging scheme 400 in FIG. 40. Instead of selecting a single tunnel device as illustrated by the "Select Tunnel" step 146 shown in the flowchart 140*b* in FIG. 14, three different or distinct tunnel devices are selected as part of a "Select Tunnel #a" step 146*a*, a "Select Tunnel #b" step 146*b*, and a "Select Tunnel #c" step 146*c*. Each of these selecting steps may be identical, similar, or different from, the "Select Tunnel" step 146 shown in the flowchart 140*b* in FIG. 14, or any other selecting step described herein. After the selecting, instead of employing a single tunnel device as illustrated by the "Send Request to Tunnel" step 147 shown in the flowchart 140*b* in FIG. 14, three distinct or different requests are sent to the three selected tunnel devices, as part of a "Send Request to Tunnel #a" step 147*a*, a "Send Request to Tunnel #b" step 147*b*, and a "Send Request to Tunnel #c" step 147*c*. Each of these request sending steps may be identical, similar, or different from, the "Send Request to Tunnel" step 147 shown in the flowchart 140*b* in FIG. 14, or any other request sending step described herein.

While in the flow chart 140*b* shown in FIG. 14 the TB server 71 waits for a single response from the single selected tunnel device, the "Request Handler" flow chart 140'*b* shown in FIG. 41 waits for three responses, one from each of the three selected tunnel devices, in response to the "Send Request to Tunnel #a" step 147*a*, the "Send Request to Tunnel #b" step 147*b*, and the "Send Request to Tunnel #c" step 147*c*, as part of a "Receive Content from Tunnels" step 148*a*. In case where the three selected tunnel devices are operative and available to serve as tunnel devices, three (typically identical) responses are expected, one from each of the selected tunnel device. However, in case of a failure or unavailability of one (or more) of the tunnel devices, no response is expected within a pre-defined time period. A handling of the responses is performed as part of a "Select Tunnel Response" step 411. For example, for sake of speedy response, the first received response, via the quickest fetching path, is used for sending to requesting client device 31*a*, such as via the SP server 72, as part of the "Send Content to SF" step 149. In such a case, the two later received responses may be discarded.

Figure 41A:
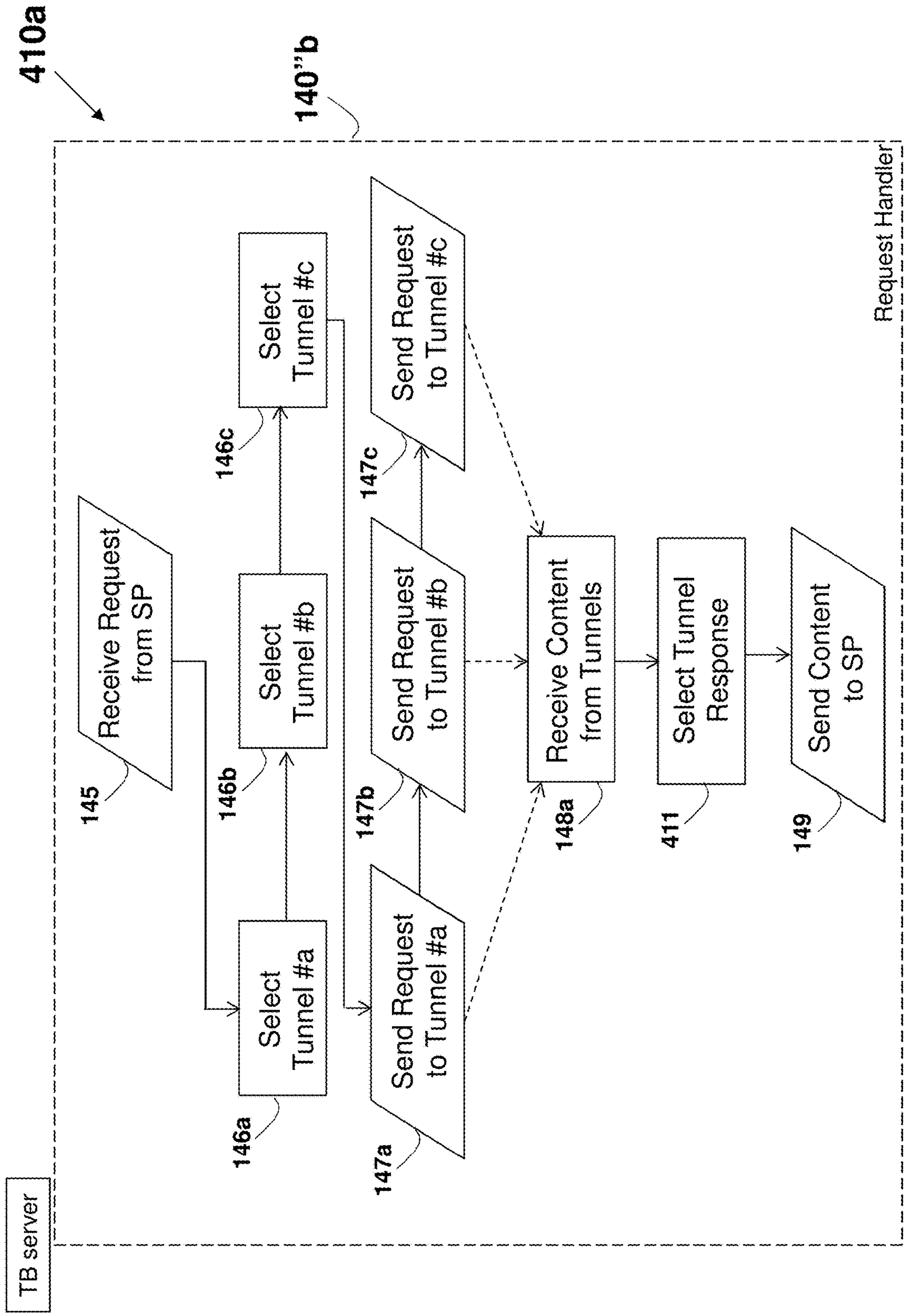
FIG. 41*a* illustrates schematically a simplified flowchart relating to a TB server that sequentially selects and employs three tunnel devices.

In one example, the "Select Tunnel #a" step 146*a*, the "Select Tunnel #b" step 146*b*, and the "Select Tunnel #c" step 146*c*, may be performed, in whole or in part, in parallel. Alternatively or in addition, these selecting steps may be performed sequentially. Similarly, the "Send Request to Tunnel #a" step 147*a*, the "Send Request to Tunnel #b" step 147*b*, and the "Send Request to Tunnel #c" step 147*c*, may be performed, in whole or in part, in parallel. Alternatively or in addition, these request sending steps may be performed sequentially. An example of a sequential operation is illustrated in a flow chart 140"*b* shown in FIG. 41*a*. In such a scheme, only after the completion of the selection of all of the tunnel devices they are used for fetching the content. As shown, after the first tunnel device is selected as part of the "Select Tunnel #a" step 146*a*, the second one is selected as part of the "Select Tunnel #b" step 146*b*, followed by selecting the third tunnel device as part of the "Select Tunnel #c" step 146*c*. After the selection is completed, the first selected tunnel device is used as part of the "Send Request to Tunnel #a" step 147*a*, followed by using the second selected one as part of the "Send Request to Tunnel #b" step 147*b*, and then followed by fetching using the third selected tunnel device as part of the "Send Request to Tunnel #c" step 147*c*.

Figure 42:
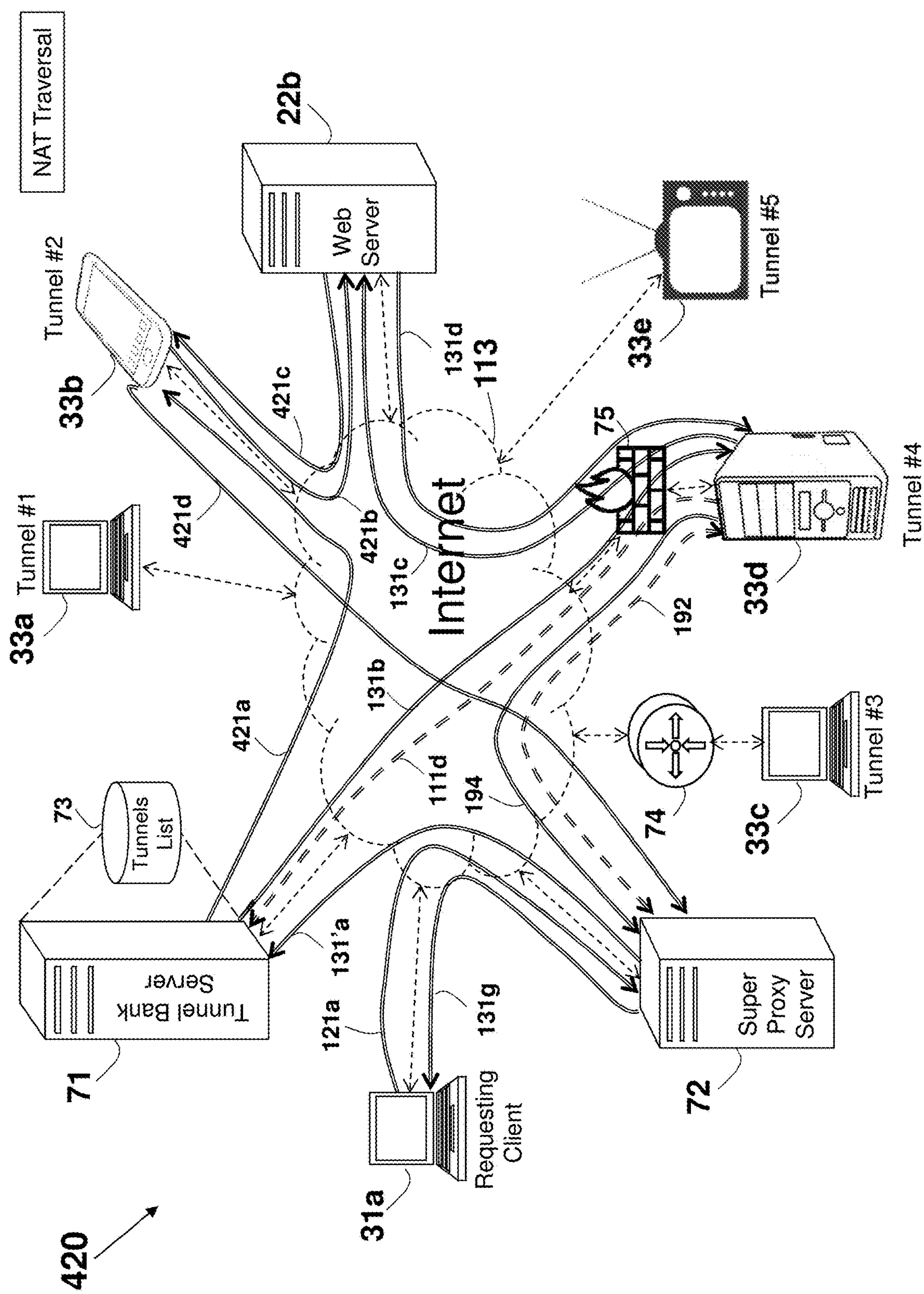
FIG. 42 depicts schematically messages exchanged over the Internet in an alternative scheme for fetching content from the web server to the client device via two selected tunnel device, the TB server, and the SP server.

While the messaging chart 400 shown in FIG. 40 illustrated the scenario where the fetched content is routed via the TB server 71 based on the messaging chart 130 shown in FIG. 13, the NAT traversal scheme may be equally used for a scenario of multiple tunnel devices. Such a messaging chart 420 is shown in FIG. 42, based on the chart 190*b* shown in FIG. 19*b*. In addition to fetching the content by using the selected tunnel device #4 33*d*, the TB server 71 further selects the tunnel device #2 33*b*, as an example, as another tunnel device to be used. In parallel to, or after, the tunnel device #4 33*d* is selected and accessed for the content. Upon completing the selection of the tunnel #2 33*b*, the TB server 71 forwards the requested content identification to the selected tunnel #2 33*b*, shown as a message path 421*a* in the messaging chart 420 shown in FIG. 42.

In response to the request message 421*a*, the selected tunnel #2 33*b* sends a request for the identified content to the appropriate server that stores the required content, exampled to be the web server 22*b*, shown as a message path 421*b* in the messaging chart 420 in FIG. 42. Thus, the "Using Tunnel" phase 84 is completed where the request arrives at the content source, namely the web server 22*b*. The message sent over the message path 421*b* may use a proprietary protocol, agreed upon between the two communicating nodes. Preferably, the HTTP or HTTPS protocol may be used, where the web server 22*b* executes a server side protocol, and the tunnel #2 33*b* may execute a client side protocol. Further, any tunneling protocol or mechanism may be used where the selected tunnel, which is the tunnel #2 33*b* in the example herein, serves as a tunnel between the TB server 71 and the web server 22*b*.

The requested content is then fetched from the web server 22*b* to the requesting client 31*a*, as part of the "Content Fetching" phase 85, along the 'opposite' route of the request flow. As shown in a messaging chart 420 shown in FIG. 42, the content is first sent from the web server 22*b* to the selected tunnel #2 33*b* along a message path 421*c*, which in turn sends it to the SP server 72 along a message path 421*d*, which in turn sends it to the requesting client 31*a* along a message path 131*g*, completing the second request/response cycle from the client device 31*a* point of view. The protocol or protocols, as well as the messages format, or any other attribute or functionality involved with the using of the tunnel device #2 33*b* may be identical, similar, or different, from the corresponding protocols or message formats used as part of employing the tunnel device #4 33*d*. For example, the content request path 421*a* relating to employing the tunnel device #2 33*b* may be identical, similar, or different, from the corresponding request path 131*b* relating to the employing the tunnel device #4 33*d*. In one example, the content request path 421*a* may use Socket Secure (SOCKS) based protocol, while the corresponding request path 131*b* may use, or may be based on, HTTP Proxy protocol. In case of selecting and using more than two tunnel devices as exampled in the messaging chart 420, each the process of fetching content from each such selected device may be identical, similar, or different from any other.

Figure 42A:
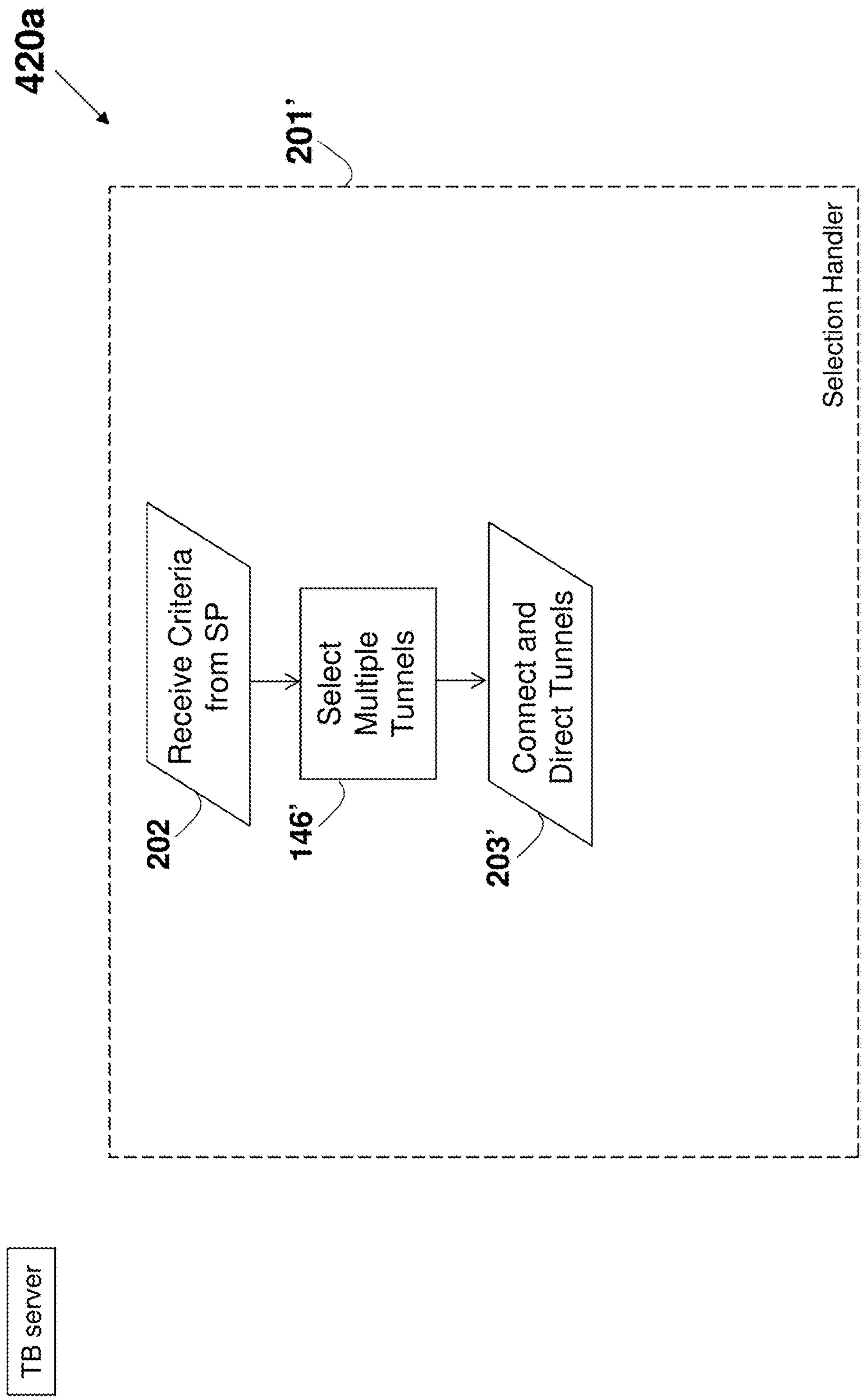
FIG. 42*a* illustrates schematically another simplified flowchart relating to a TB server that selects multiple tunnel devices.
Figure 42B:
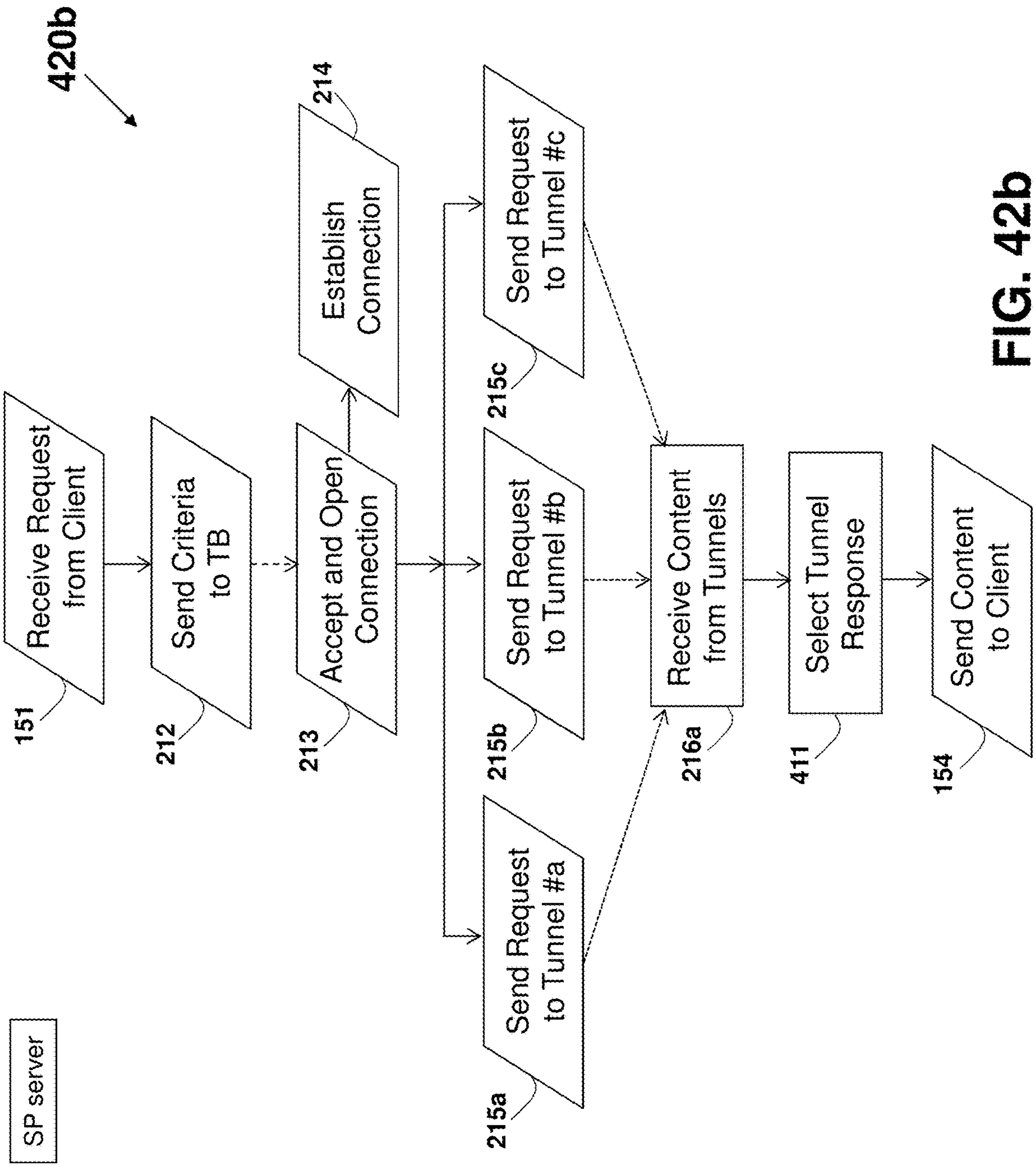
FIG. 42*b* illustrates schematically another simplified flowchart relating to a SP server that uses three selected tunnel devices in parallel.

The TB server 71 operation in a NAT transversal scheme is shown in a flow chart 420*a* shown in FIG. 42*a*, based on the corresponding flow chart 201 shown in FIG. 20. As part of processing a content request from the client device 31*a*, the TB server 71 receives from the SP server 72, over the message path 131'*a* shown in the messaging chart 420, criteria (or a criterion) for selecting a tunnel device to be used for delivering the requested content, as part of a "Receive Criteria from SF" step 202. While as part of the "Receive Request from SP" step 145 that is part of the flow chart 140*b* the TB server 71 was also notified of the identification of the requested content, such identification is not required in this alternative scheme, since the TB server 71 is no longer part of the actual content request and fetching data paths. In one example, the same message, including also the content identification is sent from the SP server 72 to the TB server 71 over the message path 131'*a*, so that the "Receive Criteria from SP" step 202 may be rendered to be the same as the "Receive Request from SF" step 145 described above. Instead of selecting a single tunnel device as part of the step 146 in the flow chart 201, the TB server 71 select multiple tunnels (such as two in the example of the messaging chart 420) as part of a "Select Multiple Tunnels" step 146', followed by connecting and directing the selected tunnel devices as part of the "Connect and Direct Tunnels" step 203', in which each tunnel is handled according to the "Connect and Direct Tunnel" step 203.

Figure 42C:
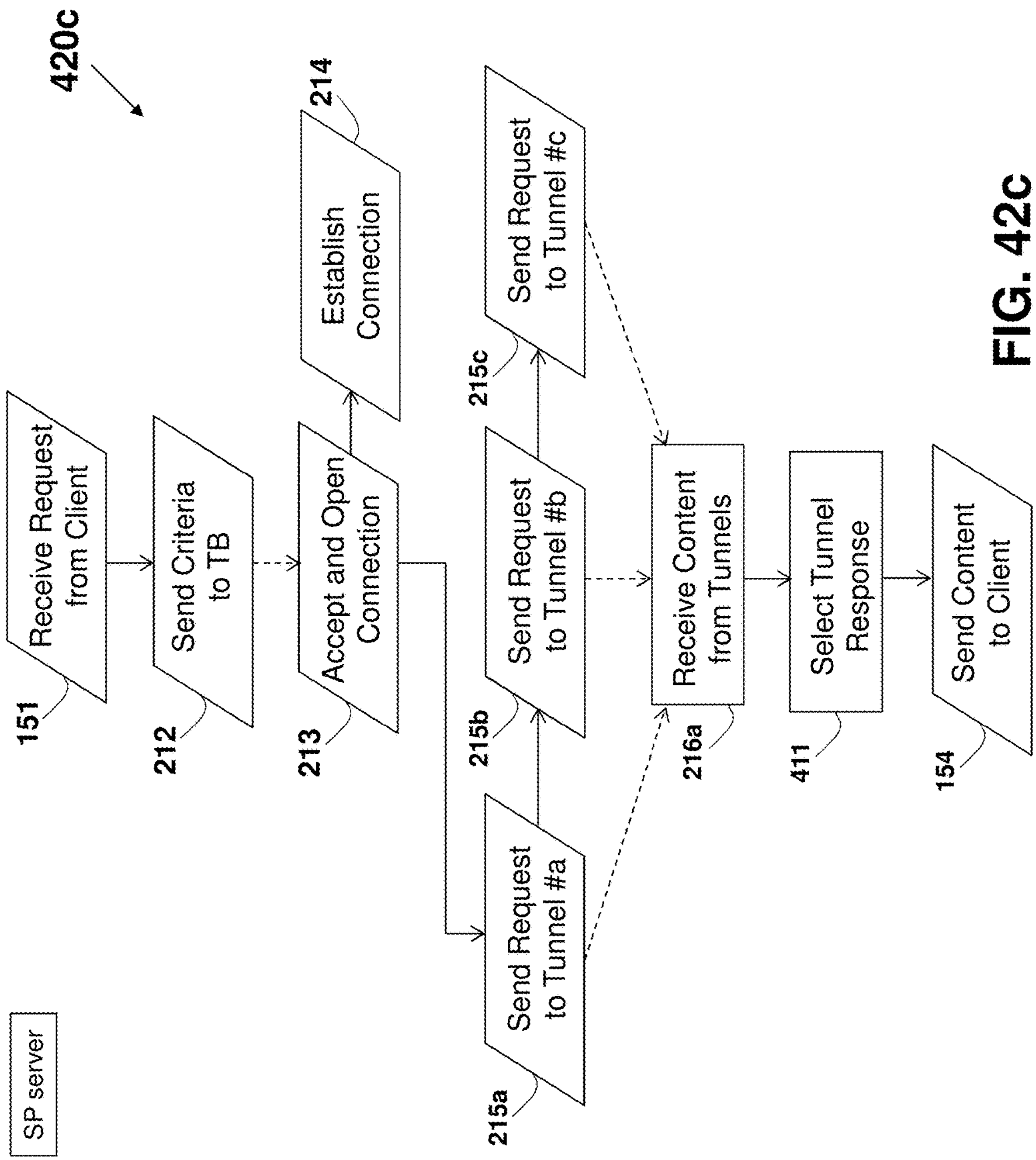
FIG. 42*c* illustrates schematically another simplified flowchart relating to a SP server that sequentially uses three selected tunnel devices.

The operation of the SP server 72 in a NAT traversal scheme using three tunnel devices for fetching the same content from the same web server 22*b* is described in a flow chart 420*b* shown in FIG. 42, which corresponds to the flow chart 210 shown in FIG. 21. The three tunnel devices are designated #a, #b, and #c. While exampled using three tunnel devices, any number of tunnel devices may equally be used. Instead of sending the request to a single selected tunnel device as described regarding the "Send Request to Tunnel" step 215 in the flow chart 210, the three selected tunnel devices are used as part of a "Send Request to Tunnel #a" step 215*a*, a "Send Request to Tunnel #b" step 215*b*, and a "Send Request to Tunnel #c" step 215*c*. The content fetched from the three tunnels is received as part of a "Receive Content from Tunnels" step 216*a* (corresponding to the "Receive Content from Tunnel" step 216 in the flow chart 210), and one of the responses, such as the first one received, is selected as part of the "Select Tunnel Response" step 411. In one example, the using of two (or three) multiple tunnel devices as part of the "Send Request to Tunnel #a" step 215*a*, the "Send Request to Tunnel #b" step 215*b*, and the "Send Request to Tunnel #c" step 215*c*, may be partly or fully in parallel. Alternatively or in addition, the using of the multiple tunnel devices may be sequential. An example of sequential operation is illustrated in a flow chart 420*c* shown in FIG. 42*c*. In this scheme, the "Send Request to Tunnel #b" step 215*b* is initiated only after the "Send Request to Tunnel #a" step 215*a* is completed, and the "Send Request to Tunnel #c" step 215*c* is initiated only after the "Send Request to Tunnel #b" step 215*b* is completed.

As exampled above, the requesting client 31*a* sends a request for content, and the SP server 72, the TB server 71, or any combination thereof, select and use multiple tunnel devices for fetching the requesting client device 31*a* the required content. Alternatively or in addition, the requesting client itself may initiate the using of multiple tunnels for the same requested content, as an alternative or in addition to the SP server 72, the TB server 71, or the combination thereof. In such a configuration, the client device 31*a* may initiate multiple requests for the same content, and the system (such as the SP server 72, the TB server 71, or any combination thereof) treats each such request as a separate and independent request, and as such selects and uses a different single tunnel device for each request. Thus, the system executes multiple times the URL fetch flow chart 87 shown in FIG. 8, where the same content request is involved in the "Content Request" step 82. Alternatively or in addition, the system (such as the SP server 72, the TB server 71, or any combination thereof) may select and use multiple different tunnel devices for each request, according to, or based on, any multiple tunnel selection or using scheme described herein, or any combination thereof. Such repeating mechanism for the same content requested may be used by the client device 31*a* to ensure that indeed the proper content is received, and there are no errors or mistakes in the system operation. For example, if the same content is indeed fetched as response to the multiple identical requests, it may be used as an indication that the proper content was received in response to the request.

The number of requests for the same content by a client device may me equal to, or more than, 2, 3, 4, 5, 6, 7, 8, 9, 10, 12, 15, 20, 30, 35, 40, 45, 50, 60, 70, or 100. Alternatively or in addition, the number of requests for the same content by a client device may be less than 3, 4, 5, 6, 7, 8, 9, 10, 12, 15, 20, 30, 35, 40, 45, 50, 60, 70, 100, or 150. Preferably, the requests may use the same tunnel selection criterions, be part of the same group, or associated with the same label. Alternatively or in addition, the requests may use the different tunnel selection criterions, be part of different groups, or be associated with different labels. Further, the requests for the same content by a client device may be partly or fully in parallel. Alternatively or in addition, the requests for the same content by a client device may be sequential. Further, the requests for the same content by a client device may be a combination of parallel and sequential steps. For example, the requesting mechanism may be sequential, where a first request is performed, and only afterwards a second one is performed, followed by a third one to be performed. Alternatively, the requests are processed together. Further, the second request may be initiated only after the first request was completed, to be followed by a third request after the second one is completed. Each of the requests may execute part of, or whole of, the client device request related functionalities, steps, or methods, such as the flow chart 160 shown in FIG. 16, the flow chart 160*a* shown in FIG. 16*a*, the flow chart 260 shown in FIG. 26, the flow chart 390*b* shown in FIG. 39*b*, or any combination thereof. The execution of such related functionalities, steps, or methods, may be executed in parallel, or sequentially, with the other selected tunnels.

Figure 43:
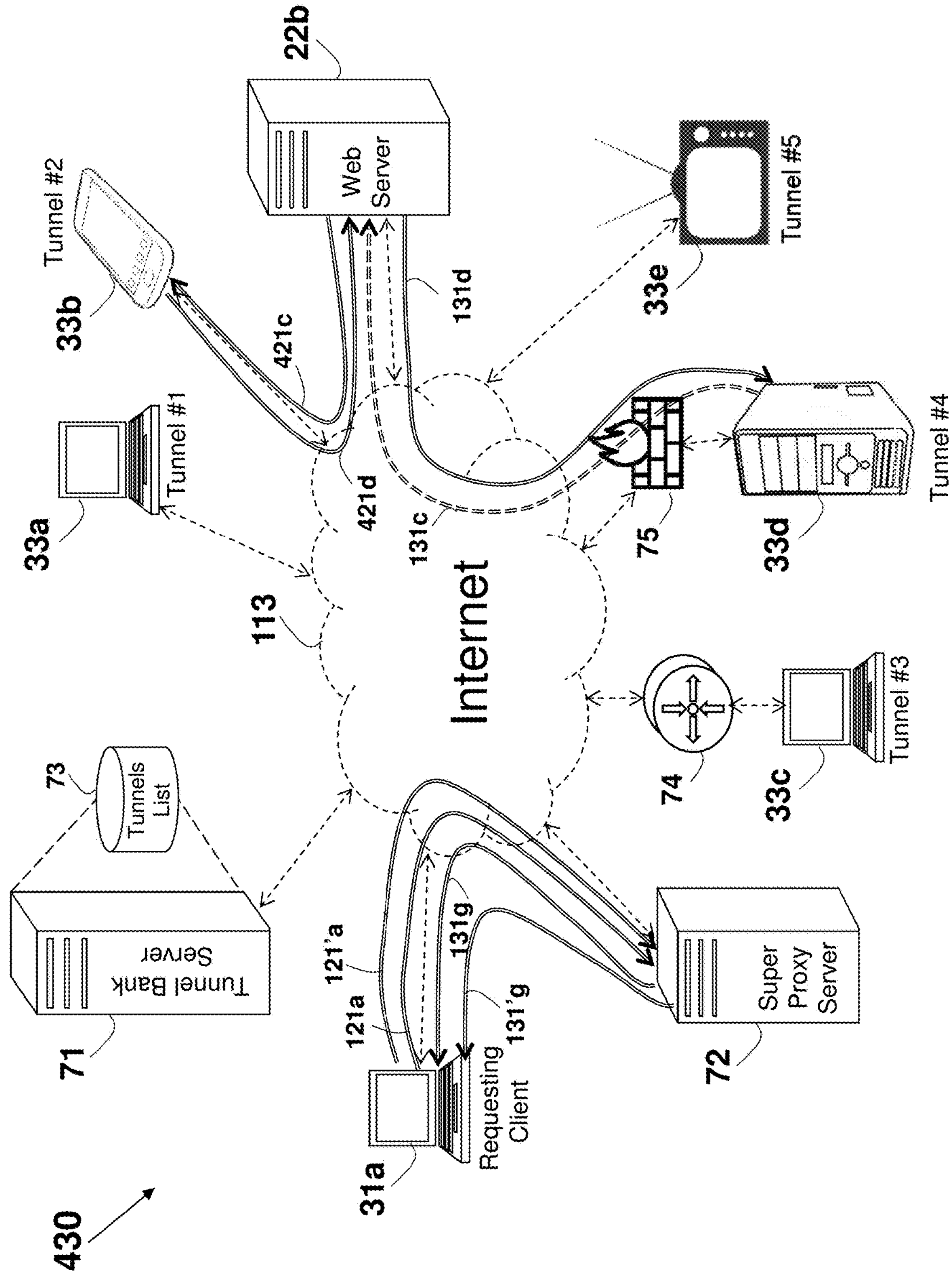
FIG. 43 depicts schematically messages exchanged over the Internet for fetching content from the web server to the client device using multiple tunnel devices, the TB server, and the SP server.

An example of using two requests for the same content by the requesting client 31*a* is illustrated in a messaging chart 430 shown in FIG. 43. As exampled herein, a first request over the path 121*a* is directed to the tunnel device #4 33*d* that relays the request to the web server 22*b* over the path 131*c*, and the path 131*d* describes the content path as a response of the web server 22*b* to the tunnel device #4 33*d*. The fetched content is then relayed (such as by using the SP proxy 72, the TB server 71, or any combination thereof) to the requesting client 31*a* over the data path 131*g*. Sequentially or in parallel, the client 31*a* may submit to the SP server 72 (over a data path 121'*a*) another request to the same content. The second request shown as the data path 121'*a* may be identical to the first one sent over the data path 121*a*, or may be different, such as providing different rules or criterions for selecting a tunnel device for serving the request. The second request over the path 121'*a* may be directed to the same, or to a different tunnel device, such as the tunnel device #2 33*b* that relays the request to the web server 22*b* over a data path 421*d*, and a data path 421*c* describes the content path as a response of the web server 22*b* to the tunnel device #2 33*b*. The fetched content is then relayed (such as by using the SP proxy 72, the TB server 71, or any combination thereof) to the requesting client 31*a* over a data path 131'*g*.

Figure 43A:
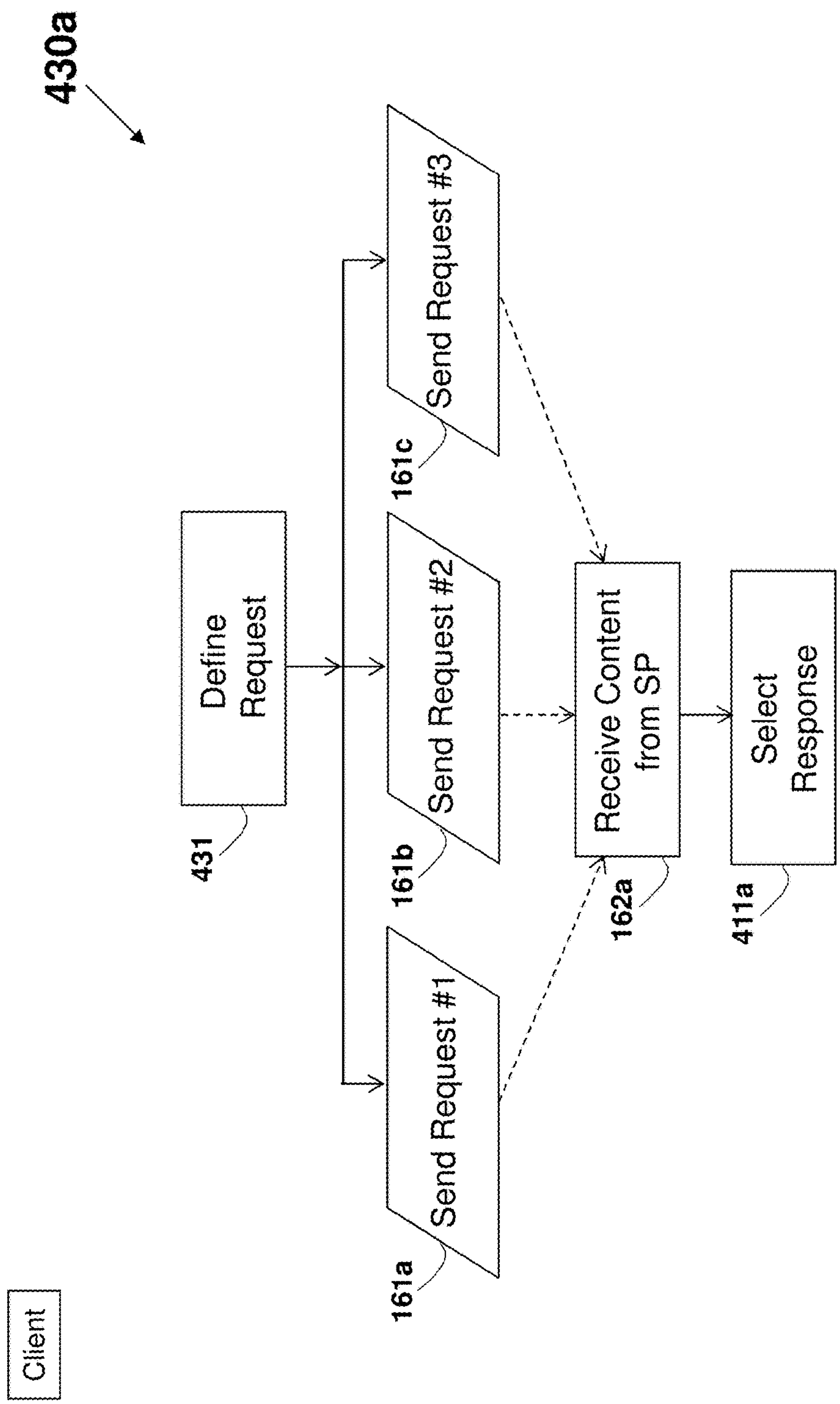
FIG. 43*a* illustrates schematically another simplified flowchart relating to a client device that uses three selected tunnel devices in parallel.
Figure 43B:
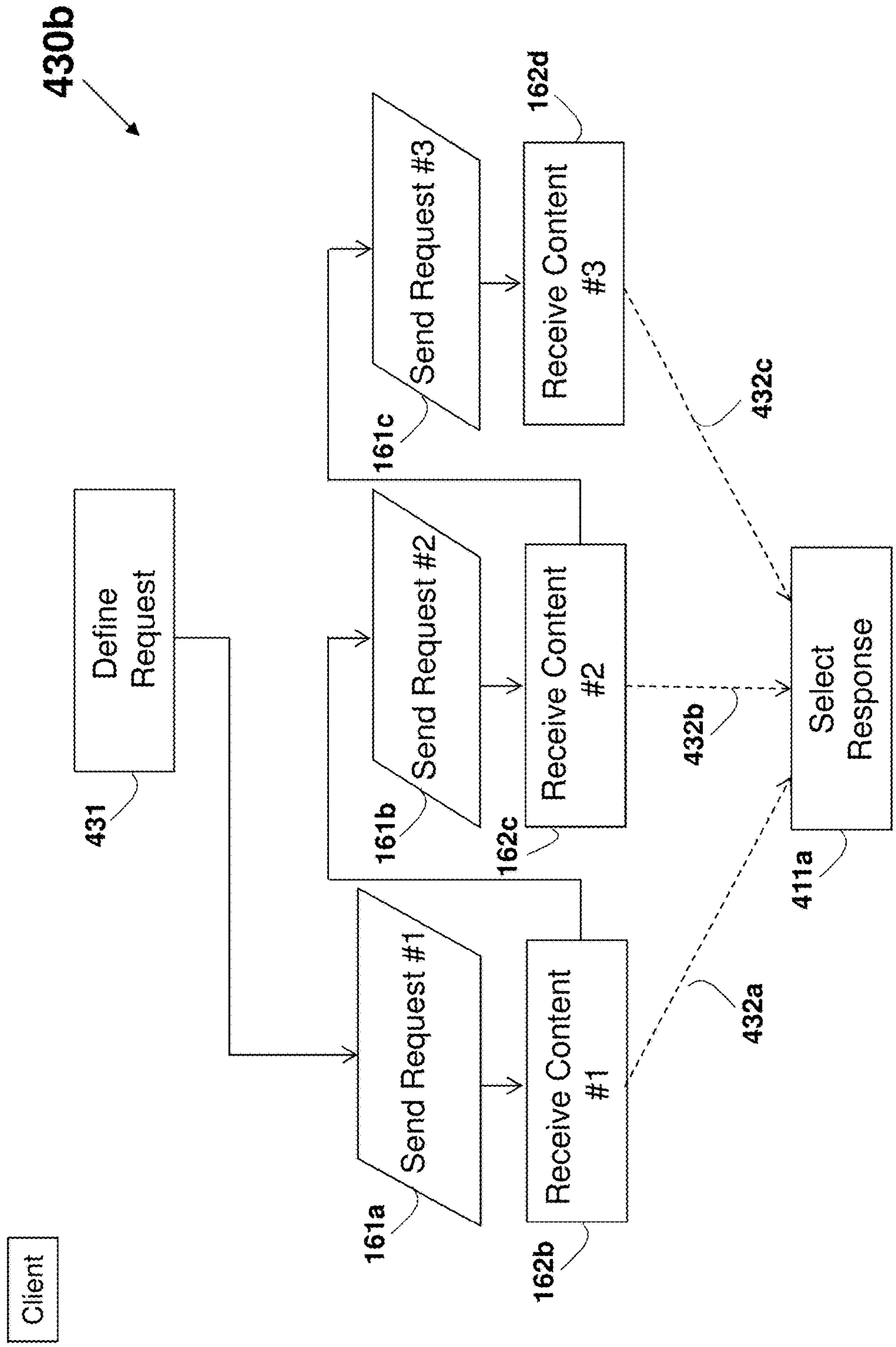
FIG. 43*b* illustrates schematically another simplified flowchart relating to a client device that sequentially uses three selected tunnel devices.

An example of sending three content requests for the same content by the client device 31*a* is illustrated in a flow chart 430*a* shown in FIG. 43*a*. As part of a "Define Request" step 431, the content request, intended to be used with multiple requests for the same content, is defined and prepared. Then three different requests are sent designated as #1, #2, and #3, where a first request is sent as part of a "Send Request #1" step 161*a*, a second request (for the same content as request #1) is sent as part of a "Send Request #2" step 161*b*, in parallel or sequential to the first request, and a third request (for the same content as request #1) is sent as part of a "Send Request #3" step 161*c*, in parallel or sequential to the first or second request. The three instances of the same content are fetched and received as part of a "Receive Content from SP" step 162*a*, and the content to be actually used by the client device 31*a* is selected in a "Select Response" step 411*a*. For example, the first received content may be used, while the other received later are discarded. In another example, the first two content instances received are checked to include the same content, and only then the content is used. Alternatively or in addition, the client device 31*a* may use sequential operation, where the requests for the same content are sequentially submitted, where a request is sent only after a content of a former request is obtained, as exampled in a flow chart 430*b* shown in FIG. 43*b*. A first request is sent as part of the "Send Request #1" step 161*a*, and the client device 31*a* waits until the content is received in response to the first request #1 as part of a "Receive Content #1" step 162*b*. At this stage, the client device 31*a* may use this fetched content as part of the "Select response" step 411*a*, as shown by the dashed line 432*a*. Alternatively or in addition, in response to receiving the response as part of the "Receive Content #1" step 162*b*, the client device 31*a* may initiate another request for the same content as part of a "Send Request #2" step 161*b*, and waits for a response as part of a "Receive Content #2" step 162*c*. At this stage, the client device 31*a* may use this second fetched content as part of the "Select response" step 411*a*, as shown by the dashed line 432*b*, or may select between the first and second responses. In one example, the received content may be used only if both fetched content are the same. Alternatively or in addition, in response to receiving the response as part of the "Receive Content #2" step 162c, the client device 31a may initiate a third request for the same content as part of a "Receive Content #3" step 162d. Alternatively or in addition, in response to receiving the response as part of the "Receive Content #2" step 162c, the client device 31a may initiate a third request for the same content as part of a "Send Request #3" step 161c, and waits for a response as part of a "Receive Content #3" step 162d. At this stage, the client device 31a may use this third fetched content as part of the "Select response" step 411a, as shown by the dashed line 432c, or may select between the first, second, and third responses (if different, for example).

A redundancy scheme is exampled herein in the messaging chart 400 where two tunnels (tunnel #1 33a and tunnel #4 33d) are used for fetching the same content from the same web server 22b. Similarly, a redundancy scheme is exampled herein in the flow chart 410 where three tunnels (designated #a, #b, and #c) are used for fetching the same content from the same web server 22b. Further, a redundancy may employ multiple requests from the client device 31a, wherein each request may use a different tunnel, a different data path, or both, as described in the flow chart 430a. Further, a redundancy may be used by employing multiple data paths or multiple components. Such a redundancy may be used in order to improve the accuracy, reliability, or availability. The redundancy may be further implemented where two or more components may be used for the same functionality. The components may be similar, substantially or fully the same, identical, different, substantially different, or distinct from each other, or any combination thereof. The redundant components may be concurrently operated, allowing for improved robustness and allowing for overcoming a single point of failure (SPOF), or alternatively one or more of the components serves as a backup. The redundancy may be a standby redundancy, which may be 'Cold Standby' and 'Hot Standby'. In the case three redundant components are used, Triple Modular Redundancy (TMR) may be used, and Quadruple Modular Redundancy (QMR) may be used in the case of four components. A 1:N Redundancy logic may be used for three or more components.

Deciding which unit is correct, such as by the TB server 71 receiving multiple content responses from selected multiple tunnel devices, or by the client device 31a when using multiple content requests, may be challenging if only two units are used. If more than two units are used, the problem is simpler, usually the majority wins or the two that agree win. In N Modular Redundancy, there are three main typologies: Dual Modular Redundancy, Triple Modular Redundancy, and Quadruple Redundancy. Quadruple Modular Redundancy (QMR) is fundamentally similar to TMR but using four units instead of three to increase the reliability. The obvious drawback is the 4× increase in system cost.

Dual Modular Redundancy (DMR) uses two functional equivalent units, thus either can control or support the system operation. The most challenging aspect of DMR is determining when to switch over to the secondary unit. Because both units are monitoring the application, a mechanism is needed to decide what to do if they disagree. Either a tiebreaker vote or simply the secondary unit may be designated as the default winner, assuming it is more trustworthy than the primary unit. Triple Modular Redundancy (TMR) uses three functionally equivalent units to provide a redundant backup. This approach is very common in aerospace applications where the cost of failure is extremely high. TMR is more reliable than DMR due to two main aspects. The most obvious reason is that two "standby" units are used instead of just one. The other reason is that in a technique called diversity platforms or diversity programming may be applied. In this technique, different software or hardware platforms are used on the redundant systems to prevent common mode failure. The voter decides which unit will actively control the application. With TMR, the decision of which system to trust is made democratically and the majority rules. If three different answers are obtained, the voter must decide which system to trust or shut down the entire system, thus the switchover decision is straightforward and fast.

Another redundancy topology is 1:N Redundancy, where a single backup is used for multiple systems, and this backup is able to function in the place of any single one of the active systems. This technique offers redundancy at a much lower cost than the other models by using one standby unit for several primary units. This approach only works well when the primary units all have very similar functions, thus allowing the standby to back up any of the primary units if one of them fails. While the redundant data paths, content requests, or selected tunnel devices, have been exampled with regard to the added reliability and availability, redundant data paths may as well be used in order to provide higher aggregated data rate, allowing for faster response and faster transfer of data over the multiple data paths.

Each of the devices denoted herein as servers, such as the SP server 72, the TB server 71, the web server 22b, or the dedicated tunnel 33a (when implemented as a server), may function as a server in the meaning of client/server architecture, providing services, functionalities, and resources, to other devices (clients), commonly in response to the clients' request. Each of the server devices may further employ, store, integrate, or operate a server-oriented operating system, such as the Microsoft Windows Server® (2003 R2, 2008, 2008 R2, 2012, or 2012 R2 variant), Linux™ (or GNU/Linux) variants (such as Debian based: Debian GNU/Linux, Debian GNU/kFreeBSD, or Debian GNU/Hurd, Fedora™, Gentoo™, Linspire™ Mandriva, Red Hat® Linux available from Red Hat, Inc. headquartered in Raleigh, North Carolina, U.S.A., Slackware®, SuSE, or Ubuntu®), or UNIX®, including commercial UNIX® variants such as Solaris™ (available from Oracle Corporation headquartered in Redwood City, California, U.S.A.), AIX® (available from IBM Corporation headquartered in Armonk, New York, U.S.A.), or Mac™ OS X (available from Apple Inc. headquartered in Cupertino, California, U.S.A.), or free variants such as FreeBSD®, OpenBSD, and NetBSD®. Alternatively or in addition, each of the devices denoted herein as servers, may equally function as a client in the meaning of client/server architecture.

Devices that are not denoted herein as servers, such as client devices (such as the client device 31a) or any of the tunnel devices (including the dedicated tunnel 33a when implemented as a server), may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers, may equally function as a server in the meaning of client/server architecture.

Figure 16A:
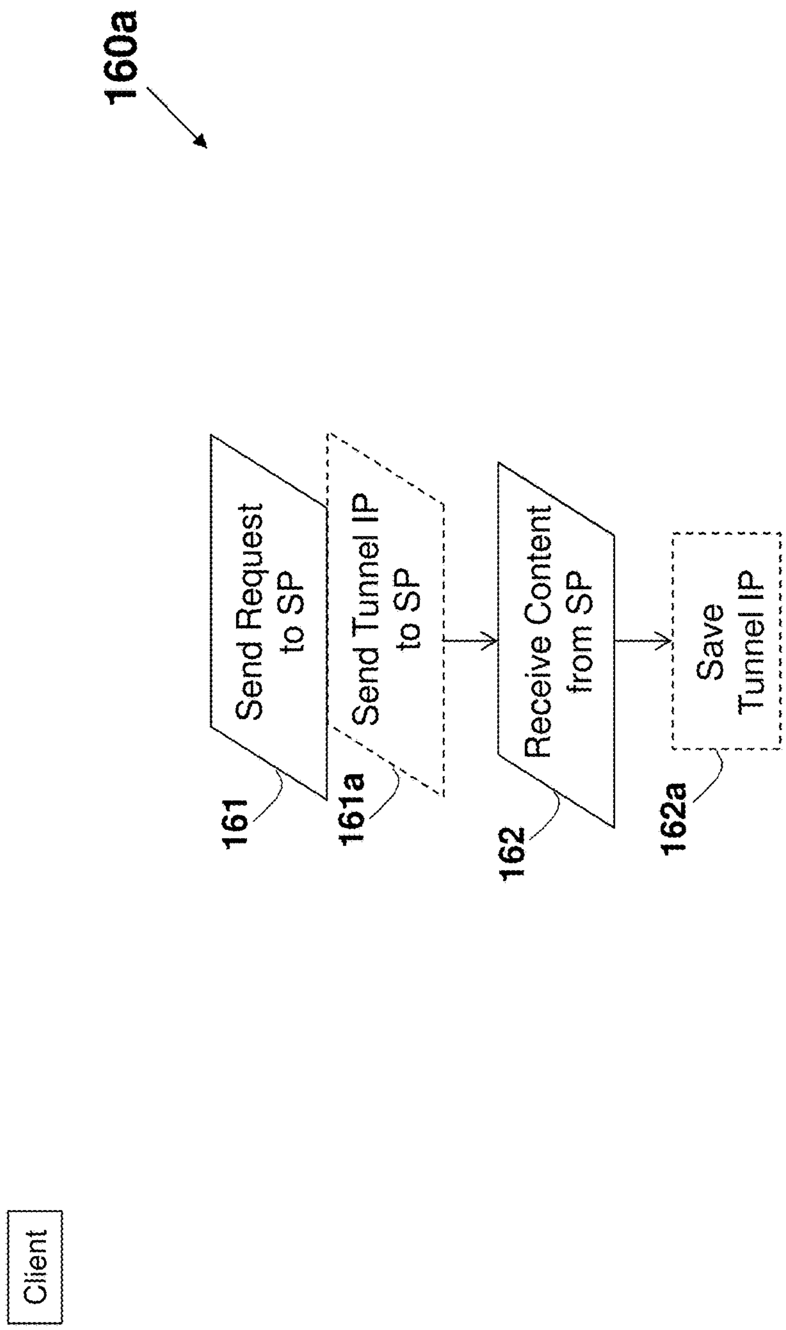

The method and system described herein allows for a client device (such as the client device 31*a* operation described in the flow chart 160 in FIG. 16 or the flow chart 160*a* in FIG. 16*a*) to effectively fetch content from a data server (such as the web server 22*b*). The method and system may be used by the client device for supporting an application, such as a web browser application, when the application is requesting a content from the Internet in general, and from a data server in particular. The request for Internet-related content may be intercepted by the 'client' application and process, initiating the client flowchart 160 shown in FIG. 16, or the flowchart 160*a* shown in FIG. 16*a*. In one example, the client device uses a communication-related application to be used by the application when no 'client' application is present, such as HTTP stack handling application. The request from the requesting application to the communication-related application is intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), a data copy, a DDE protocol, or mailslots.

Examples of web browsers include Microsoft Internet Explorer (available from Microsoft Corporation, headquartered in Redmond, Washington, U.S.A.), Google Chrome which is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Any communication between any two nodes may use the Socket Secure (SOCKS), WebSocket (ws), which may be WebSocket Secure (wss), or HTTP Proxy protocol. Further, any communication between any two nodes may use the HTTP or HTTPS protocol. In one example, a communication between the client device 31*a* or any tunnel device (such as the tunnel #1 33*a*, the tunnel #2 33*b*, the tunnel #3 33*c*, the tunnel #4 33*d*, or the tunnel #5 33*e*) and any server, such as the TB server 71, the SP server 72, or the Web Server 22*b*, may use the SOCKS, WebSocket or HTTP Proxy protocol, wherein the respective device, such as the client device 31*a* or the tunnel device, executes the respective SOCKS, WebSocket or HTTP Proxy client side protocol, and the respective server executes the respective SOCKS, WebSocket or HTTP Proxy server side protocol. Alternatively or in addition, the respective device, such as the client device 31*a* or the tunnel device, executes the respective SOCKS, WebSocket or HTTP Proxy server side protocol, and the respective server executes the respective SOCKS, WebSocket or HTTP Proxy client side protocol. Further, a communication between the client device 31*a* or any tunnel device (such as the tunnel #1 33*a*, the tunnel #2 33*b*, the tunnel #3 33*c*, the tunnel #4 33*d*, or the tunnel #5 33*e*) and any server, such as the TB server 71, the SP server 72, or the Web Server 22*b*, may use the HTTP (or HTTPS) protocol, wherein the respective device, such as the client device 31*a* or the tunnel device, executes the HTTP (or HTTPS) client side protocol, and the respective server executes the HTTP (or HTTPS) server side protocol. Alternatively or in addition, the respective device, such as the client device 31*a* or the tunnel device, executes the HTTP (or HTTPS) server side protocol, and the respective server executes the HTTP (or HTTPS) client side protocol.

The term 'network element' (or 'element') or 'network node' (or 'node') is used herein to include, but not limited to, the client device 31*a*, a tunnel device (such as the tunnel device #1 33*a*), the SP server 72, the TB server 71, or a web server (such as the web server #1 22*a*). Any memory, storage, database, or cache mentioned herein may consist of, comprise, use, or be included in, the local cache as described in U.S. Pat. No. 8,135,912 to the Shribman et al., entitled: "System and Method of Increasing Cache Size".

Any device, component, or apparatus herein, may be structured as, may be shaped or configured to serve as, or may be integrated with, a wearable device. In one example, any one or more of the tunnel devices herein, such as the tunnel device #1 33*a*, the tunnel device #2 33*b*, or the tunnel device #3 33*c*, may consists of, may comprise, may be integrated with, or may be part of, a wearable device. Similarly, any one or more of the client devices herein, such as the client device #1 31*a*, or the client device #2 31*b*, may consist of, may comprise, may be integrated with, or may be part of, a wearable device. Any wearable device or any apparatus or device herein may be wearable on an organ such as on the person head, and the organ may be eye, ear, face, cheek, nose, mouth, lip, forehead, or chin. Alternatively or in addition, wearable device or any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releasably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any system or device herein may use a virtualization. Any system or device herein may further comprise a Virtual Machine (VM) executing a virtualized application. Any device herein, or any part thereof, such as the client device, the web server, at least one of the tunnel devices, the first server, or the second server, may be implemented as virtual hardware as part of the VM. At least one of any action or step herein by any device may be executed as part of the virtualized application.

Any network herein may be used with a virtualization, and any network herein may be executed as a virtualized network as part of a Virtual Machine (VM). The virtualization may be implemented by a host computer that may implement the VM, and any method herein may further comprise executing, by the host computer, a hypervisor or a Virtual Machine Monitor (VMM), and the virtualized may use or interface virtual hardware. Any virtualization herein may include, may be based on, or may use, full virtualization, para-virtualization, or hardware assisted virtualization. For example, any communication between two entities selected from a group consisting of the client device, the web server, at least one of the multiple tunnel devices, the first server, and the second server, may be executed as a virtualized network as part of a Virtual Machine (VM).

Any method herein, any step herein, any flow-chart herein, or any part thereof, may be used with a virtualization, and at least one of the steps or methods herein may be executed as part of a virtualized application as part of a Virtual Machine (VM). Any device herein, such as the analyzer device, the first device, or any part thereof, may be implemented as virtual hardware. Any virtualization herein may be used with an host computer that implement the VM, and may further comprising executing, by the host computer, a hypervisor or a Virtual Machine Monitor (VMM). Any virtualized application herein or any or hardware virtualization herein may use or may interface virtual hardware. Any virtualization herein may include, may be based on, or may use, full virtualization, para-virtualization, or hardware assisted virtualization.

Any operating system herein may be used with a virtualization, and any operating system herein may be executed as a guest operating system as part of a Virtual Machine (VM). The virtualization may be implemented by a host computer that may implement the VM, and any method herein may further comprise executing, by the host computer, a hypervisor or a Virtual Machine Monitor (VMM), and the guest operating system may use or interface virtual hardware. Any such virtualization herein may include, may be based on, or may use, full virtualization, para-virtualization, or hardware assisted virtualization.

Any element or entity herein, such as the client device, the web server, at least one of the multiple tunnel devices, the first server, and the second server, may be implemented as virtualized entity. Any virtualization may include, may be based on, or may use, desktop virtualization, network virtualization, storage virtualization, application virtualization, server virtualization, or any combination thereof. Further, any virtualization herein may include, may be based on, or may use, full virtualization, para-virtualization, or hardware assisted virtualization. Further, any virtualization herein may include, may be based on, or may use, a virtual machine (VM) on a host computer that executes a hypervisor or Virtual Machine Monitor (VMM), and the operating system may be a guest operating system that may use or interface a virtual hardware.

Any method herein may be used with a virtualization, where at least one of the steps may be executed as part of a virtualized application as part of a Virtual Machine (VM). Alternatively or in addition, the client device or any part thereof, the web server or any part thereof, at least one of the multiple tunnel devices or any part thereof, the first server or any part thereof, or the second server or any part thereof, may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices that may be selected from a group consisting of the client device, the web server, at least one of the multiple tunnel devices, the first server, and the second server, may be implemented as virtual hardware, and the at least two devices may be virtualized by the same host computer that implements the VM.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

For example, any two actions or steps of sending, any two actions or steps of receiving, any two actions or steps of selecting, any two actions or steps of processing, or any combination thereof, may be performed in full or in part in parallel by the same entity (e.g., server, client, or tunnel) or separated entities, using multitasking or multiprocessing. Similarly, any steps of sending and receiving, sending and selecting, sending and processing, receiving and selecting, receiving and processing, or any combination thereof, may be performed in full or in part in parallel by the same entity (e.g., server, client, or tunnel) or separated entities, using multitasking or multiprocessing.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for a software compatibility with variants of Unix and other operating systems, such as POSIX.1-2008 that is simultaneously IEEE STD. 1003.1™—2008 entitled: "*Standard for Information Technology—Portable Operating System Interface* (*POSIX*®) *Description*", and The Open Group Technical Standard Base Specifications, Issue 7, IEEE STD. 1003.1™, 2013 Edition.

Any server, client, tunnel, or other device herein, such as the SP server 72, the TB server 71, the client device 31*a*, the tunnel device #1 33*a*, the tunnel device #2 33*b*, the tunnel device #3 33*c*, the tunnel device #4 33*d*, the tunnel device #5 33*e*, or any combination thereof, may execute any part of, or whole of, any one or more of the JavaScript program code of the modules, subroutines, programs, or functions included in any of the U.S. Provisional Application Ser. No. 62/550,834, which was filed on Aug. 28, 2017, U.S. Provisional Application Ser. No. 62/563,157, which was filed on Sep. 26, 2017, U.S. Provisional Application Ser. No. 62/624,208, which was filed on Jan. 31, 2018, U.S. Provisional Application Ser. No. 62/684,211, which was filed on Jun. 13, 2018, or any combination thereof.

Any server, client, tunnel, or other device herein, such as the SP server 72, the TB server 71, the client device 31*a*, the tunnel device #1 33*a*, the tunnel device #2 33*b*, the tunnel device #3 33*c*, the tunnel device #4 33*d*, the tunnel device #5 33*e*, or any combination thereof, may comprise any element or functionality, or may execute any step, method, or action, described in the "BACKGROUND" section above, including in any of the documents incorporated therein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

Any system or apparatus herein may further be operative for storing, operating, or using, an operating system. Any system herein may comprise a Virtual Machine (VM) for virtualization, and the operating system may be executed as a guest operating system. Any system herein may further comprise a host computer that implements the VM, and the host computer may be operative for executing a hypervisor or a Virtual Machine Monitor (VMM), and the guest operating system may use or may interface virtual hardware. Any virtualization herein, such as any operating system virtualization, may include, may be based on, or may use, full virtualization, para-virtualization, or hardware assisted virtualization.

The term 'host' or 'network host' is used herein to include, but not limited to, a computer or other device connected to a computer network, such as the Internet. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address auto configuration methods. Network hosts that participate in applications that use the client-server model of computing, are classified as server or client systems. Network hosts may also function as nodes in peer-to-peer applications, in which all nodes share and consume resources in an equipotent manner.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein is used herein to include as applicable, but not limited to, a software integration, a hardware integration, or any combination thereof.

Any networking protocol may be utilized for exchanging information between the network elements (e.g., clients, tunnels, peers, servers) within the network (such as the Internet). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies. Any network herein, such as the first network or the second network, may be implemented as a virtualized network as part of a Virtual Machine (VM). Any system herein may comprise a host computer that implements the VM. The host computer may further be operative for executing a hypervisor or a Virtual Machine Monitor (VMM). Any virtualized network herein may use or may interface virtual hardware. Any virtualization herein may include, may be based on, or may use, full virtualization, para-virtualization, or hardware assisted virtualization.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Some embodiments may be used in conjunction with various devices, network elements, and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (AMMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

While the communication sessions between the elements herein, such as between servers and clients, are exampled to be over the Internet 113 using Internet Protocol (IP) or TCP/IP, any other communication protocols may be equally used, such as a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards. For example, each of, or all of, the communication path 111*a* between the tunnel device #1 33*a* and the TB server 71, the communication path 111*b* between the tunnel device #2 33*b* and the TB server 71, the communication path 111*c* between the tunnel device #3 33*c* and the TB server 71, the communication path 111*d* between the tunnel device #4 33*d* and the TB server 71, and the communication path 111*e* between the tunnel device #5 33*e* and the TB server 71, may use any one of the protocols associated with a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards. Similarly, each of, or all of, the communication path 121*a* between the client device 31*a* and the SP server 72, the communication path 131*a* between the SP server 72 and the TB server 71, the communication path 131*c* or 131*d* between the tunnel device #4 33*d* and the web server 22*b*, and the communication path 191 or 192 between the SP server 72 and the tunnel device #4 33*d*, may use a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Generally, program modules include routines, programs, objects, components, data structures, etc., that performs particular tasks or implement particular abstract data types. The term "application program" (also referred to as 'application', 'software application', or 'application software') is used herein to include, but not limited to, a computer program designed to perform a specific function directly for a user, or for another application program.

Application software is typically a set of one or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source, software. Most applications are designed to help people perform an activity.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

Any of the arrangements or actions described herein (or any part thereof) may be implemented as a system, a method, and/or a computer program product. The computer program product may include a computer readable storage medium (or media) having computer readable program instructions thereon for causing a processor to carry out aspects of the present invention. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a Random Access Memory (RAM), a Read-Only Memory (ROM), an Erasable Programmable Read-Only Memory (EPROM or Flash memory), a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Any computer readable program instructions described herein may be downloaded to respective computing/processing devices from a computer readable storage medium or to an external computer or external storage device via a network, for example, the Internet, a local area network, a wide area network and/or a wireless network. Any network herein may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network mentioned herein. In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects of the present invention.

Aspects of the various arrangements described herein with reference to flowchart illustrations and/or block diagrams of methods, apparatus (systems), and computer program products according to embodiments of the invention. Further, each block of the flowchart illustrations and/or block diagrams, and combinations of blocks in the flowchart illustrations and/or block diagrams, may be implemented by computer readable program instructions.

Any computer readable program instructions or steps herein may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any program described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The invention claimed is:

1. A method for fetching a content identified by a content identifier from a web server by using a wearable device that is wearable on a person and is addressable in the Internet using a first IP address, the method is implemented by using first and second servers that are each connected to the Internet and are each addressable in the Internet using a respective IP address, the method implemented by the wearable device comprising:

establishing a connection over the Internet with the first server, wherein the first server is selected from a plurality of servers;

sending, to the first server over the established connection, a second message that comprises at least one value relating to at least one attribute type associated with the wearable device;

monitoring or metering, a utilization or a processor in the wearable device;

responsive to being in a non-idle state, determining, if an idling condition is met, wherein the idling condition is determined to be met based on, or according to, the monitored or metered resource utilization being under a threshold;

responsive to the determination that the idling condition is met, shifting to an idle state;

responsive to being in the idle state, determining if an idling condition is met; and responsive to the determination that the idling condition is not met, shifting to the non-idle state;

sending, to the first server over the established connection, a first status message in response to shifting to the idle state;

sending, to the first server over the established connection, a second status message in response to shifting to a non-idle state;

responsive to being in the idle state, receiving, from the first or second server, a first message that comprises the content identifier;

sending, to the web server, a content request that is a HyperText Transfer Protocol (HTTP) or a HTTP Secure (HTTPS) request, that comprises the content identifier;

receiving, from the web server, the content, in response to the content request; and sending, to the first or the second server, the received content, wherein the wearable device is associated with a name or an identifier of a continent, a country, a region, a city, a street, a ZIP code, or a time-zone.

2. The method according to claim 1, wherein the first message is received from the first server, and the content is sent to the second server in response to the first message.

3. The method according to claim 1, wherein the established connection is a TCP connection using 'Active OPEN', 'Passive OPEN', or TCP keepalive mechanism.

4. The method according to claim 1, wherein the established connection is uses, or is based on, Virtual Private Network (VPN).

5. The method according to claim 1, wherein the sending, to the first or second server of the content comprises exclusively sending, to the first server, the content; or sending, to the second server, the content.

6. The method according to claim 1, wherein the first message comprises the IP address of the second server.

7. The method according to claim 1, wherein the communication over the Internet with the first or second server uses Transmission Control Protocol over Internet Protocol (TCP/IP) protocol or connection.

8. The method according to claim 1, wherein the communication over the Internet with the first or second server, is based on, uses, or is compatible with, HTTP Proxy protocol or connection, wherein the first or second server serves as an HTTP Proxy server and the wearable device serves as an HTTP Proxy client.

9. The method according to claim 1, wherein the wearable device comprises a network interface or a network transceiver for communication over a network, the method further comprising metering, an amount of data transmitted to, or received from, the network during a time interval, and wherein the idling condition is further determined to be met based on, or according to, the metered amount of data being under a threshold level.

10. The method according to claim 1, further comprising using a Domain Name System (DNS) server, wherein the content identifier comprises a domain name, the method further comprising performing, using the DNS server, a DNS resolution for obtaining a numerical IP address, and wherein the first message or the content request comprises the obtained numerical IP address.

11. The method according to claim 1, wherein the content comprises a web-page or a web-site, and wherein the content identifier is Uniform Resource Identifier (URI) or Uniform Resource Locator (URL).

12. The method according to claim 1, wherein each of the IP addresses is in IPv4 or IPv6 form.

13. The method according to claim 1, wherein the communication over the Internet with the first or second server is based on, uses, or is compatible with, HTTP Proxy protocol or connection, wherein the respective first or second server serves as an HTTP Proxy server respectively and the wearable device serves as an HTTP Proxy client.

14. The method according to claim 1, wherein the wearable device is associated with a single IP address.

15. The method according to claim 1, further comprising storing, operating, or using, a mobile operating system.

16. A non-transitory computer readable medium containing computer instructions that, when executed by a computer processor, cause the processor to perform the method according to claim 1.

17. The method according to claim 1, wherein at least part of steps of claim 1 are included in a Software Development Kit (SDK) that is provided as a non-transitory computer readable medium containing computer instructions, and wherein the method further comprising installing the SDK.

18. The method according to claim 1, further comprising configuring the wearable device to be wearable on an organ of the person head.

19. The method according to claim 1, further comprising in response to the receiving of the first message, initiating a communication, with the second server.

20. The method according to claim 19, wherein the initiating of the communication uses, or is based on, a Network Address Translator (NAT) traversal scheme.

21. The method according to claim 20, wherein the NAT traversal scheme is according to Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350.

22. The method according to claim 20, wherein the NAT traversal scheme is based on Traversal Using Relays around NAT (TURN), Socket Secure (SOCKS), NAT 'hole punching', Session Traversal Utilities for NAT (STUN), Interactive Connectivity Establishment, (ICE), UPnP Internet Gateway Device Protocol (IGDP), or Application-Level Gateway (ALG).

23. The method according to claim 1, wherein the communication over the Internet with the first or second server, is based on, uses, or is compatible with, Socket Secure (SOCKS) protocol or connection, wherein the first or second server serves as a SOCKS server and the wearable device serves as a SOCKS client.

24. The method according to claim 23, wherein the SOCKS protocol or connection is according to, based on, or is compatible with, SOCKS4, SOCKS4a, or SOCKS5.

25. The method according to claim 23, wherein the SOCKS protocol or connection is according to, based on, or is compatible with, IETF RFC 1928, IETF RFC 1929, IETF RFC 1961, or IETF RFC 3089.

26. The method according to claim 23, wherein the SOCKS protocol or connection is according to, based on, or is compatible with, SOCKS4, SOCKS4a, or SOCKS5.

27. The method according to claim 23, wherein the SOCKS protocol or connection is according to, based on, or is compatible with, IETF RFC 1928, IETF RFC 1929, IETF RFC 1961, or IETF RFC 3089.

28. The method according to claim 1, further comprising operating, an operating system or a program process or thread, and wherein the idling condition is further determined to be met based on activating or executing the process or thread by the operating system or the program.

29. The method according to claim 28, wherein the process or thread comprises a low-priority or background task, an idle process, or a screensaver.

30. The method according to claim 28, wherein the process or thread comprises using an entire screen for displaying.

31. The method according to claim 1, wherein the wearable device comprises an input device for obtaining an input from a human operator, the method further comprising sensing, using the input device, the input, and wherein the idling condition is further determined to be met based on not receiving an input from the input device for a pre-set time interval.

32. The method according to claim 31, wherein the input device comprises a pointing device, a keyboard, a touch-screen, or a microphone.

33. The method according to claim 1, wherein the wearable device comprises a motion sensor for sensing motion, acceleration, vibration, or location change of the wearable device, the method further comprising sensing, using the motion sensor, the wearable device motion, acceleration, vibration, or location change, and wherein the idling condition is further determined to be met based on, or according to, respectively sensing the motion, the vibration, the acceleration, or the location change being under a threshold.

34. The method according to claim 33, wherein the motion sensor comprises an accelerometer, gyroscope, vibration sensor, or a Global Positioning System (GPS) receiver.

35. The method according to claim 1, wherein the wearable device comprises a battery, the method further comprising metering or sensing, a battery charging level, and wherein the idling condition is further determined to be met based on, or according to, the metered or sensed charge level being over a threshold level.

36. The method according to claim 35, wherein the metering or sensing uses a Battery Management System (BMS).

37. The method according to claim 35, wherein the threshold level is above one of either 40%, 50%, 60%, 70%, 80%, or 90% of the battery defined full charge capacity level.

38. The method according to claim 1, wherein the wearable device is associated with a first value relating to a first attribute type.

39. The method according to claim 38, wherein the first value comprises a numeric value or an identifier of a feature, a characteristic, or a property of the first attribute type.

40. The method according to claim 38, further comprising sending, to the first server, the first value to the first server.

41. The method according to claim 38, further for use with a second attribute type, and wherein the wearable device is associated with a second value relating to the second attribute type, and wherein the method further comprising, sending, to the first server, the second value.

42. The method according to claim 38, wherein the first value is based on IP geolocation.

43. The method according to claim 42, wherein the geolocation is based on W3C Geolocation API.

44. The method according to claim 42, for use with a database that associates IP addresses to geographical locations.

45. The method according to claim 38, wherein the first attribute type comprises Internet Service Provider (ISP) or Autonomous System Number (ASN).

46. The method according to claim 45, wherein the first value comprises a name or an identifier of the ISP or the ASN number.

47. The method according to claim 38, wherein the first attribute type corresponds to a hardware of the wearable device.

48. The method according to claim 47, wherein the first attribute type comprises the hardware type of the wearable device.

49. The method according to claim 48, wherein the first values comprise stationary or portable values, respectively based on the wearable device being stationary or portable.

50. The method according to claim 38, wherein the first attribute type comprises a type of software application installed, used, or operated, in the wearable device.

51. The method according to claim 50, wherein the first values comprise the type, make, model, or version of the software.

52. The method according to claim 50, wherein the software type comprises an operating system.

53. The method according to claim 38, wherein the first attribute type corresponds to a communication property, feature of a communication link of the wearable device.

54. The method according to claim 53, wherein the first attribute type corresponds to a bandwidth (BW) or Round-Trip delay Time (RTT) of the communication link, and the first value is the respective estimation or measurement of the BW or RTT.

55. The method according to claim 53, wherein the communication link corresponds to the connection to the Internet of the wearable device.

56. The method according to claim 55, wherein the communication link corresponds to a communication link with the web server, the first server, or the second server.

57. The method according to claim 53, wherein the first attribute type corresponds to the technology or scheme used by the wearable device for connecting to the Internet.

58. The method according to claim 57, wherein the first values comprise wired or wireless values, respectively based on the wearable device being connected to the Internet using wired or wireless connection.

59. The method according to claim 1, wherein each of the plurality of servers is connectable to the Internet, addressable in the Internet using a respective IP address, the method further comprising selecting, the first server from the plurality of servers.

60. The method according to claim 59, wherein the first server is randomly selected from the plurality of servers.

61. The method according to claim 60, wherein the first server is randomly selected using one or more random numbers generated by a random number generator.

62. The method according to claim 61, wherein the random number generator is hardware based.

63. The method according to claim 62, wherein the random number generator is using thermal noise, shot noise, nuclear decaying radiation, photoelectric effect, or quantum phenomena.

64. The method according to claim 61, wherein the random number generator is software based.

65. The method according to claim 64, wherein the random number generator is based on executing an algorithm for generating pseudo-random numbers.

66. The method according to claim 1, wherein each of the plurality of servers is connectable to the Internet, addressable in the Internet using a respective IP address, the method further comprising: selecting, the first server from the plurality of servers; and sending, to the selected first server, a second message.

67. The method according to claim 66, wherein the first server is randomly selected from the plurality of servers.

68. The method according to claim 67, wherein the first server is randomly selected using one or more random numbers generated by a random number generator.

69. The method according to claim 68, wherein the random number generator is hardware based.

70. The method according to claim 69, wherein the random number generator is using thermal noise, shot noise, nuclear decaying radiation, photoelectric effect, or quantum phenomena.

71. The method according to claim 68, wherein the random number generator is software based.

72. The method according to claim 71, wherein the random number generator is based on executing an algorithm for generating pseudo-random numbers.

73. The method according to claim 72, wherein each of the plurality of servers is associated with a one of more attribute values relating to an attribute type, and wherein the first server is selected from the plurality of servers based on, or according to, the respective one of more attribute values.

74. The method according to claim 73, wherein the attribute type is a geographical location, and wherein one of more attribute values comprise a name or an identifier of a continent, a country, a region, a city, a street, a ZIP code, or a timezone.

75. The method according to claim 74, wherein the one of more attribute values is based on actual geographical location or on IP geolocation.

76. The method according to claim 75, wherein the geolocation is based on W3C Geolocation API.

77. The method according to claim 1, wherein the wearable device is associated with multiple IP addresses.

78. The method according to claim 77, wherein the wearable device is associated with more than 1,000, 2,000, 5,000, 10,000, 20,000, 50,000 or 100,000 distinct IP addresses.

79. The method according to claim 1, further comprising storing, operating, or using, a web browser.

80. The method according to claim 79, wherein the web browser is a mobile web browser.

81. The method according to claim 1, wherein the receiving from the first or second server of the first message comprises receiving of the first message over a wireless network, wherein the sending to the web server of the content request comprises sending of the content request over the wireless network, wherein the receiving from the web server of the content comprises receiving of the content over the wireless network, and wherein the sending to the first or second server of the content comprises sending of the content over the wireless network.

82. The method according to claim 81, wherein the receiving from the first or second server of the first message comprises receiving of the first message over a Wireless Wide Area Network (WWAN), wherein the sending to the web server of the content request comprises sending of the content request over the Wireless Wide Area Network (WWAN), wherein the receiving from the web server of the content comprises receiving of the content over the Wireless Wide Area Network (WWAN), and wherein the sending to the first or second server of the content comprises sending of the content over the Wireless Wide Area Network (WWAN).

83. The method according to claim 81, wherein the wireless network comprises, or consists of, a WiMAX network, and the WiMAX network is according to, compatible with, or based on, IEEE 802.16-2009.

84. The method according to claim 81, wherein the receiving from the first or second server of the first message comprises receiving of the first message over a cellular telephone network, wherein the sending to the web server of the content request comprises sending of the content request over the cellular telephone network, wherein the receiving from the web server of the content comprises receiving of the content over the cellular telephone network, and wherein the sending to the first or second server of the content comprises sending of the content over the cellular telephone network.

85. The method according to claim 84, wherein the cellular telephone network is a Third Generation (3G) network that uses a protocol selected from the group consisting of UMTS W-CDMA, UMTS HSPA, UMTS TDD, CDMA2000 1×RTT, CDMA2000 EV-DO, and GSM EDGE-Evolution, or wherein the cellular telephone network uses a protocol selected from the group consisting of a Fourth Generation (4G) network that uses HSPA+, Mobile WiMAX, LTE, LTE-Advanced, MBWA, or is based on IEEE 802.20-2008.

86. The method according to claim 81, wherein the receiving from the first or second server of the first message comprises receiving of the first message over a Wireless Personal Area Network (WPAN), wherein the sending to the web server of the content request comprises sending of the content request over the WPAN, wherein the receiving from the web server of the content comprises receiving of the content over the WPAN, and wherein the sending to the first or second server of the content comprises sending of the content over the WPAN.

87. The method according to claim 86, wherein the WPAN is according to, compatible with, or based on, IEEE 802.15.1-2005 standards, or wherein the WPAN is a wireless control network that is according to, or based on, IEEE 802.15.4-2003 standards.

88. The method according to claim 81, wherein the receiving from the first or second server of the first message comprises receiving of the first message over a Wireless Local Area Network (WLAN), wherein the sending to the web server of the content request comprises sending of the content request over the WLAN, wherein the receiving from the web server of the content comprises receiving of the content over the WLAN, and wherein the sending to the first or second server of the content comprises sending of the content over the WLAN.

89. The method according to claim 88, wherein the WLAN is according to, compatible with, or is based on, a standard selected from the group consisting of IEEE 802.11-2012, IEEE 802.11a, IEEE 802.11b, IEEE 802.11g, IEEE 802.11n, and IEEE 802.11ac.

* * * * *